US012665799B2

(12) United States Patent
Murakami

(10) Patent No.: US 12,665,799 B2
(45) Date of Patent: Jun. 23, 2026

(54) COMMUNICATION DEVICE AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 136 days.

(21) Appl. No.: 18/713,781

(22) PCT Filed: Dec. 14, 2022

(86) PCT No.: PCT/JP2022/046007
§ 371 (c)(1),
(2) Date: May 28, 2024

(87) PCT Pub. No.: WO2023/112956
PCT Pub. Date: Jun. 22, 2023

(65) Prior Publication Data
US 2025/0039028 A1 Jan. 30, 2025

(30) Foreign Application Priority Data
Dec. 16, 2021 (JP) ................................ 2021-204450

(51) Int. Cl.
*H04B 7/0413* (2017.01)
*H04L 27/26* (2006.01)

(52) U.S. Cl.
CPC ....... *H04L 27/2627* (2013.01); *H04B 7/0413* (2013.01)

(58) Field of Classification Search
CPC ......................... H04B 7/0413; H04L 27/2627
See application file for complete search history.

(56) References Cited

U.S. PATENT DOCUMENTS

2015/0103680 A1* 4/2015 Anand ................ H04W 72/569 370/336
2016/0323755 A1 11/2016 Cordeiro et al.
(Continued)

FOREIGN PATENT DOCUMENTS

JP 2018518855 A 7/2018
JP 2021510951 A 4/2021
WO 2016031343 A1 3/2016

OTHER PUBLICATIONS

International Search Report, mailed Jan. 24, 2023, for International Application No. PCT/JP2022/046007, 4 pages.

*Primary Examiner* — Rahel Guarino
(74) *Attorney, Agent, or Firm* — Seed Intellectual Property Law Group LLP

(57) ABSTRACT

The purpose of the present invention is to both suppress any decrease in data transmission efficiency in a device for transmitting data and suppress any decrease in received data quality in other devices. This communication device performs communication using a frequency band that is can be used in a wireless system, the communication device comprising a signal processing unit for generating a modulated signal, and a transmission unit for transmitting the modulated signal. The frequency band that can be used in the wireless system is configured from a plurality of channels. The transmission unit transmits the modulated signal using a first channel among the plurality of channels in a first time slot, and transmits the modulated signal using a second channel different from the first channel in a second time slot that follows the first time slot.

9 Claims, 104 Drawing Sheets

(56) References Cited

U.S. PATENT DOCUMENTS

| | | | | |
|---|---|---|---|---|
| 2017/0311324 | A1* | 10/2017 | Jung .................... | H04B 7/0617 |
| 2020/0106576 | A1 | 4/2020 | Kimura et al. | |
| 2020/0313823 | A1 | 10/2020 | Zhang et al. | |
| 2020/0359323 | A1* | 11/2020 | Beale .................. | H04J 13/0062 |

* cited by examiner

FIG. 29
150
RADIO COMMUNICATION DEVICE
100
RADIO COMMUNICATION DEVICE

COMMUNICATION DEVICE AND COMMUNICATION METHOD

TECHNICAL FIELD

The present disclosure relates to a communication apparatus and a communication method.

BACKGROUND ART

An exemplary system using a frequency equal to or higher than 52.6 GHz is a communication system using a 60 GHz band.

A scheme disclosed in Patent Literature 1 is one of a communication method for extending a communication distance. FIG. 29 illustrates an exemplary communication state of radio communication devices disclosed in Patent Literature 1.

For example, radio communication device 001 transmits a sector sweep signal. After that, radio communication device 051 transmits a sector sweep signal. Then, radio communication device 051 transmits a signal including feedback information on the sector sweep to radio communication device 001.

Following this procedure, radio communication device 001 determines a method of "transmit beamforming and/or receive beamforming", and radio communication device 051 also determines a method of "transmit beamforming and/or receive beamforming". This extends the communication distance between radio communication device 001 and radio communication device 051.

CITATION LIST

Patent Literature

PTL 1
Japanese Unexamined Patent Application Publication (Translation of PCT Application) No. 2018-518855

SUMMARY OF INVENTION

Technical Problem

For example, in radio communication systems such as 5th Generation (5G)(cellular system) and Institute of Electrical and Electronics Engineers (IEEE) 802.11ad/ay, challenges remain in developing a mechanism capable of both preventing a decrease in data transmission efficiency in an apparatus that transmits data and reducing a decrease in data reception quality in another apparatus.

One non-limiting and exemplary embodiment facilitates providing a technique to both prevent a decrease in data transmission efficiency in an apparatus that transmits data and reduce a decrease in data reception quality in another apparatus.

Solution to Problem

A communication apparatus according to an embodiment of the present disclosure is a communication apparatus that performs communication using a frequency band available in a radio system, the communication apparatus including: a signal processor that generates a modulation signal; and a transmitter that transmits the modulation signal, in which the frequency band available in the radio system includes a plurality of channels, and the transmitter transmits the modulation signal in a first time period using a first channel of the plurality of channels, and transmits the modulation signal in a second time period following the first time period using a second channel different from the first channel.

A communication apparatus according to an embodiment of the present disclosure is a communication apparatus that belongs to a first radio system and performs communication using a frequency band available in the first radio system, the communication apparatus including: a signal processor that generates a modulation signal; and a transmitter that transmits the modulation signal, in which a frequency band available in the first radio system overlaps with a frequency band available in a second radio system, the frequency band available in the second radio system includes a plurality of channels, and the transmitter transmits the modulation signal in a first time period using a frequency band which is within the frequency band available in the first radio system and which overlaps with a first channel of the plurality of channels, and transmits the modulation signal in a second time period following the first time period using a frequency band which is within the frequency band available in the first radio system and which overlaps with a second channel different from the first channel.

A communication method according to an embodiment of the present disclosure is a communication method by a communication apparatus that performs communication using a frequency band available in a radio system, in which the frequency band available in the radio system includes a plurality of channels, and the communication apparatus generates a modulation signal, transmits the modulation signal in a first time period using a first channel of the plurality of channels, and transmits the modulation signal in a second time period following the first time period using a second channel different from the first channel.

A communication method according to an embodiment of the present disclosure is a communication method by a communication apparatus that belongs to a first radio system and that performs communication using a frequency band available in the first radio system, in which a frequency band available in the first radio system overlaps with a frequency band available in a second radio system, the frequency band available in the second radio system includes a plurality of channels, and the communication apparatus generates a modulation signal, transmits the modulation signal in a first time period using a frequency band which is within the frequency band available in the first radio system and which overlaps with a first channel of the plurality of channels, and transmits the modulation signal in a second time period following the first time period using a frequency band which is within the frequency band available in the first radio system and which overlaps with a second channel different from the first channel.

It should be noted that general or specific embodiments may be implemented as a system, an apparatus, a method, an integrated circuit, a computer program, a storage medium, or any selective combination thereof.

Advantageous Effects of Invention

According to anon-limiting and exemplary embodiment of the present disclosure, it is possible to both prevent a decrease in data transmission efficiency in an apparatus that transmits data and reduce a decrease in data reception quality in another apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

Embodiment 1

In Embodiment 1, a description will be given of a communication system, a communication apparatus, and a communication method.

Figure 1A:
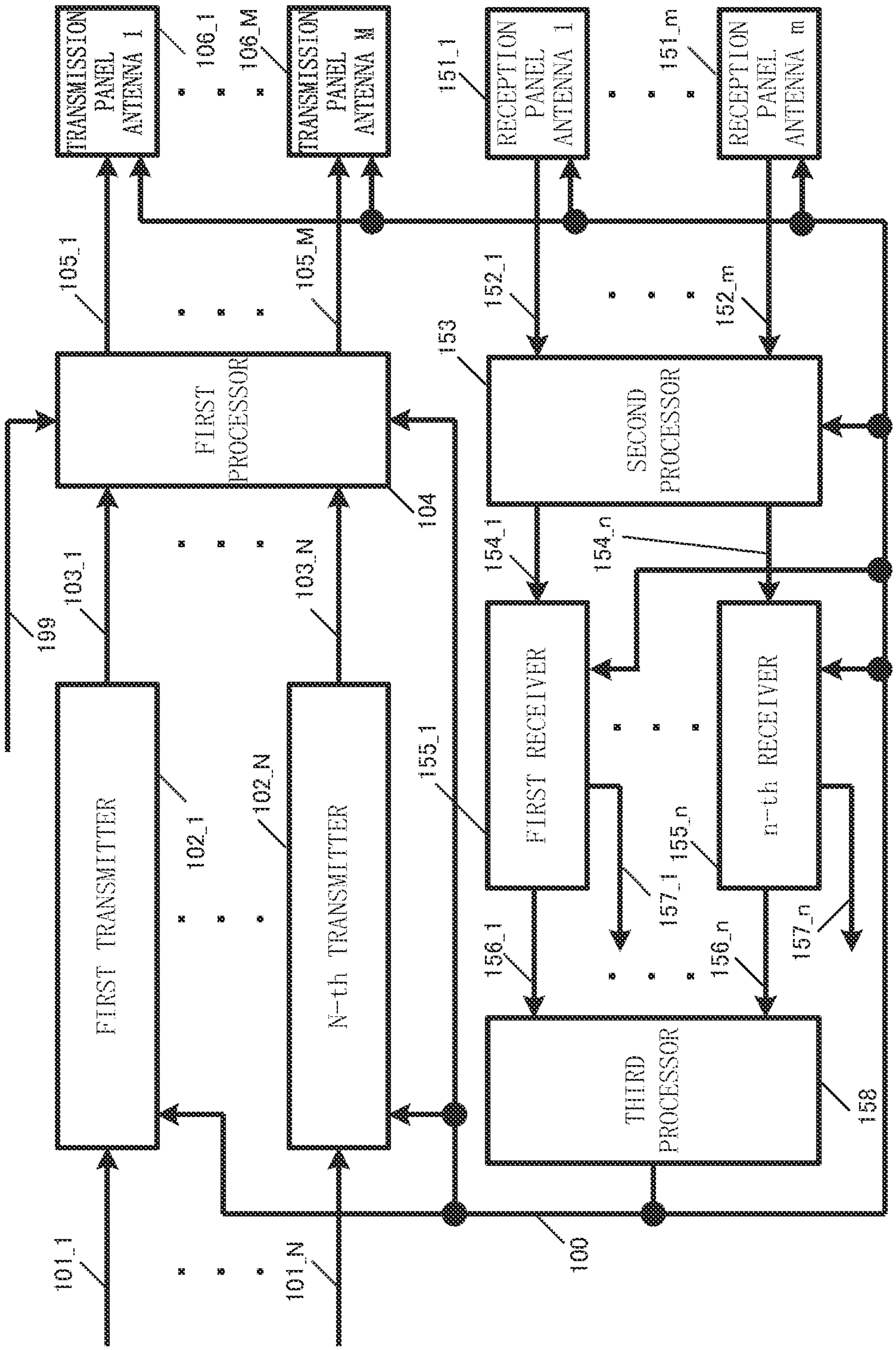
FIG. 1A illustrates an exemplary configuration of a communication apparatus in Embodiment 1.

FIG. 1A illustrates an exemplary configuration of a communication apparatus, such as a base station, an access point, a terminal, a repeater, gNodeB (gNB), and user equipment (UE) in Embodiment 1.

Note that a radio system of new radio (NR) will be exemplified in the following description. The NR radio system includes a base station and a terminal, for example. The base station of NR may be referred to as gNB. The terminal of NR may be referred to as UE. Note that the names are not limited to these. The terminal of NR may also be referred to as "NR-UE" below.

The communication apparatus in FIG. 1A includes N transmitters, which are "first transmitter 102_1 to N-th transmitter 102_N". Note that N is an integer equal to or greater than 1 or an integer equal to or greater than 2.

The communication apparatus in FIG. 1A also includes M transmission panel antennas, which are "transmission panel antenna 1 labeled 106_1 to transmission panel antenna M labeled 106_M", for transmission. Note that M is an integer equal to or greater than 1 or an integer equal to or greater than 2.

The communication apparatus in FIG. 1A includes n receivers, which are "first receiver 155_1 to n-th receiver 155_n". Note that n is an integer equal to or greater than 1 or an integer equal to or greater than 2.

The communication apparatus in FIG. 1A includes m reception panel antennas, which are "reception panel antenna 1 labeled 151_1 to reception panel antenna m labeled 151_m", for reception. Note that m is an integer equal to or greater than 1 or an integer equal to or greater than 2.

The i-th transmitter 102_i takes control signal 100 and i-th data 101_i as input, performs processing such as error correction coding and mapping based on a modulation scheme, and outputs i-th modulation signal 103_i. Note that i is an integer from 1 to N (both inclusive).

Note that i-th data 101_i may be configured to include data of one or more users. In this case, an error correction code, a modulation scheme, and a transmission method may be configured for each user.

First processor 104 takes i-th modulation signal 103_i (i is an integer from 1 to N (both inclusive)), control signal 100, and reference signal 199 as input, controls a transmission timing and a channel, and outputs j-th transmission signal 105j (j is an integer from 1 to M (both inclusive)) based on frame configuration information included in control signal 100. Note that some of i-th modulation signals 103_i may include no signal, and some of j-th transmission signals 105_j may include no signal.

Then, j-th transmission signal 105j is outputted as a radio wave from transmission panel antenna j labeled 106_j. Note that transmission panel antenna j labeled 106j may perform beamforming and change the transmission directivity taking control signal 100 as input. In addition, transmission panel antenna j labeled 106j may be switched by control signal 100 in transmitting a modulation signal to a communication counterpart. This will be described later.

Reception panel antenna i labeled 151_i receives i-th received signal 152_i. Note that reception panel antenna i labeled 151_i may perform beamforming and change the reception directivity taking control signal 100 as input. This will be described later.

Second processor 153 performs processing such as frequency conversion taking i-th received signal 152_i and control signal 100 as input, and outputs j-th signal-processing-subjected signal (i.e., j-th signal that has been subjected to signal processing) 154j. Note that some of i-th received signals 152_i may include no signal, and some of j-th signal-processing-subjected signals 154_j may include no signal.

Then, j-th receiver 155j takes j-th signal-processing-subjected signal 154_j and control signal 100 as input, performs processing such as demodulation and error correction decoding on j-th signal-processing-subjected signal 154j based on control signal 100, and outputs j-th control data 156_j and j-th data 157j.

Note that j-th control data 156j may be configured to include control data of one or more users. In addition, j-th data 157_j may be configured to include data of one or more users.

Third processor 158 takes j-th control data 156j as input, generates control signal 100 based on information obtained from the communication counterpart, and outputs generated control signal 100.

Incidentally, first processor 104 of the communication apparatus in FIG. 1A may perform processing for transmit beamforming (transmission directivity control), for example, precoding processing. Meanwhile, second processor 153 may perform processing for reception directivity control. As another example, first processor 104 may perform processing of outputting first modulation signal 103_1 as first transmission signal 105_1, second modulation signal 103_2 as second transmission signal 105_2, and third modulation signal 103_3 as third transmission signal 105_3, for example. Alternatively, first processor 104 may perform processing of outputting second modulation signal 103_2 as first transmission signal 105_1. In addition, second processor 153 may perform processing of outputting first received signal 152_1 as first signal-processing-subjected signal 154_1, second received signal 152_2 as second signal-processing-subjected signal 154_2, and third received signal 152_3 as third signal-processing-subjected signal 154_3. Alternatively, the second processor 153 may perform processing of outputting first received signal 152_1 as second signal-processing-subjected signal 154_2.

The configuration in FIG. 1A may include a processor not illustrated in FIG. 1A. For example, an interleaver for sorting symbols and/or data, a padder for padding, and the like may be included in the communication apparatus. Moreover, the communication apparatus in FIG. 1A (also in FIG. 1B and FIG. 1C) may perform transmission and/or reception corresponding to multiple input multiple output (MIMO) transmission for transmitting a plurality of modulation signals (a plurality of streams), using a plurality of antennas. Further, the communication apparatus in FIG. 1A (also in FIG. 1B and FIG. 1C) may perform transmission corresponding to multi-user MIMO transmission for transmitting, using a first frequency (band), modulation signals to a plurality of terminals in a first time period at least.

Figure 1B:
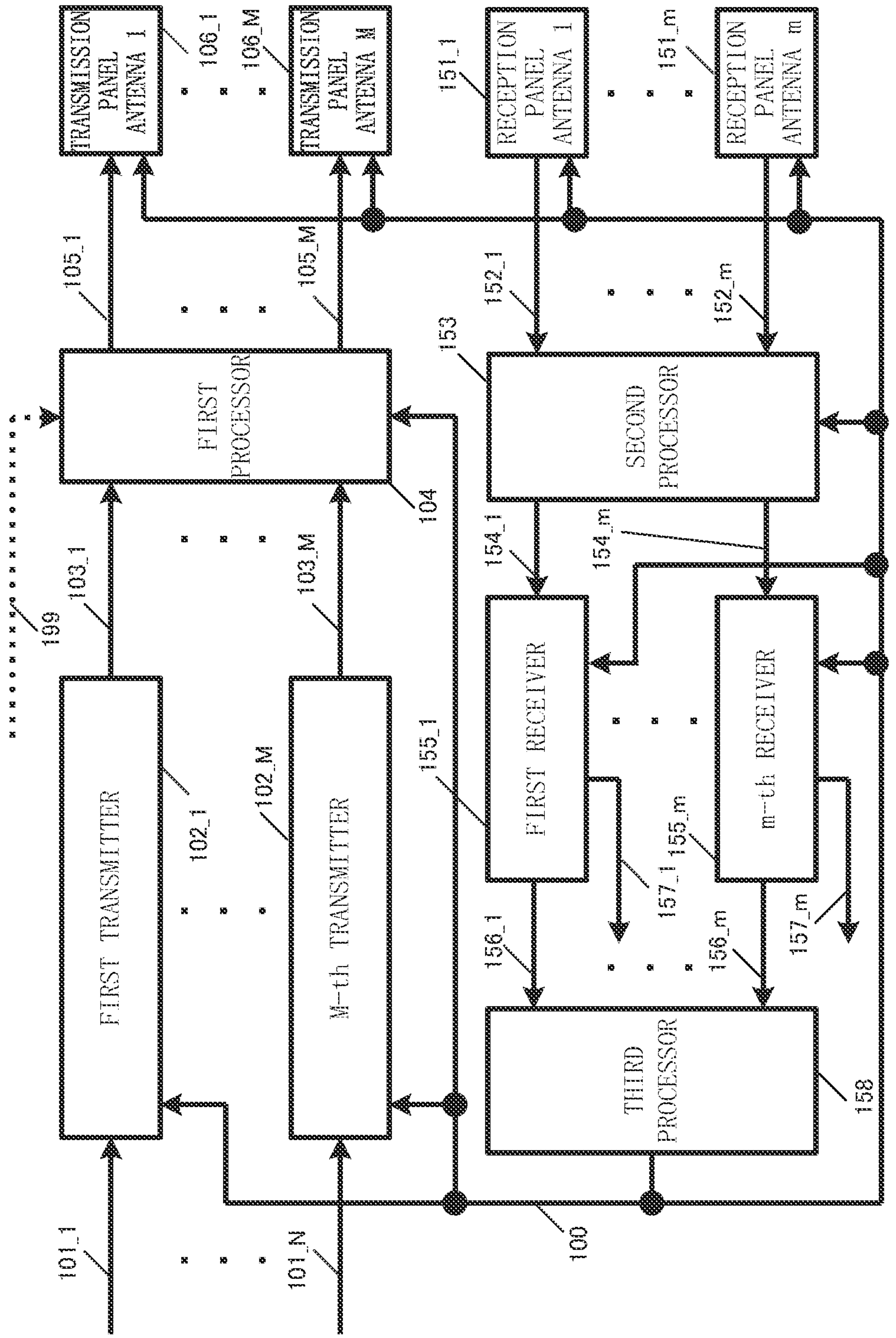
FIG. 1B illustrates an exemplary configuration of the communication apparatus different from the configuration in FIG. 1A in Embodiment 1.

FIG. 1B illustrates an exemplary configuration of the communication apparatus in Embodiment 1, such as a base station, an access point, a terminal, a repeater, etc., different from the configuration in FIG. 1A. In FIG. 1B, the components that operate in the same manner as in FIG. 1A are denoted by the same reference signs, and detailed descriptions thereof will be omitted.

The configuration in FIG. 1B is characterized in that the number of transmitters and the number of transmission panel antennas are the same. In this case, first processor 104 may perform processing for transmit beamforming (transmission directivity control), for example, precoding processing. First processor 104 may output y-th modulation signal 103_y as x-th transmission signal 105_x. Note that x is an integer from 1 to M (both inclusive), and y is an integer from 1 to M (both inclusive).

In addition, the number of receivers and the number of reception panel antennas are the same. In this case, second processor 153 may perform processing for the reception directivity control. Second processor 153 may output y-th received signal 152_y as x-th signal-processing-subjected signal 154_x. Note that x is an integer from 1 to m (both inclusive), and y is an integer from 1 to m (both inclusive).

Figure 1C:
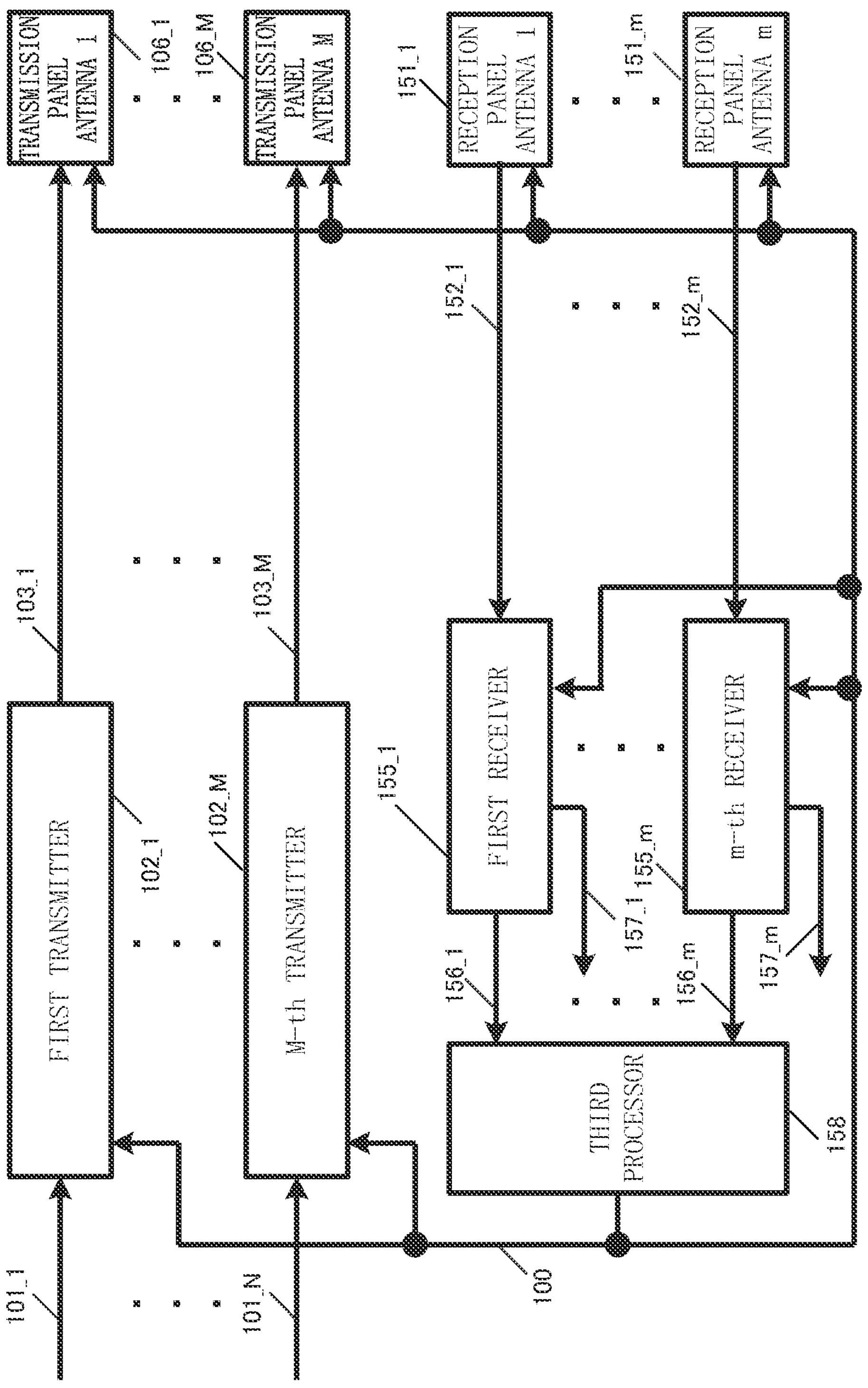
FIG. 1C illustrates an exemplary configuration of the communication apparatus different from the configurations in FIGS. 1A and 1B in Embodiment 1.

FIG. 1C illustrates an exemplary configuration of the communication apparatus in Embodiment 1, such as a base station, an access point, a terminal, a repeater, etc., different from the configurations in FIGS. 1A and 1B. In FIG. 1C, the components that operate in the same manner as in FIG. 1A are denoted by the same reference signs, and detailed descriptions thereof will be omitted.

The configuration in FIG. 1C is characterized in that the number of transmitters and the number of transmission panel antennas are the same and the first processor is not present. In addition, the number of receivers and the number of reception panel antennas are the same and the second processor is not present.

Note that FIGS. 1A, 1B, and 1C illustrate exemplary configurations of the communication apparatus, such as a base station, an access point, a terminal, a repeater, etc., and the configuration of the communication apparatus is not limited to these examples.

Figure 2:
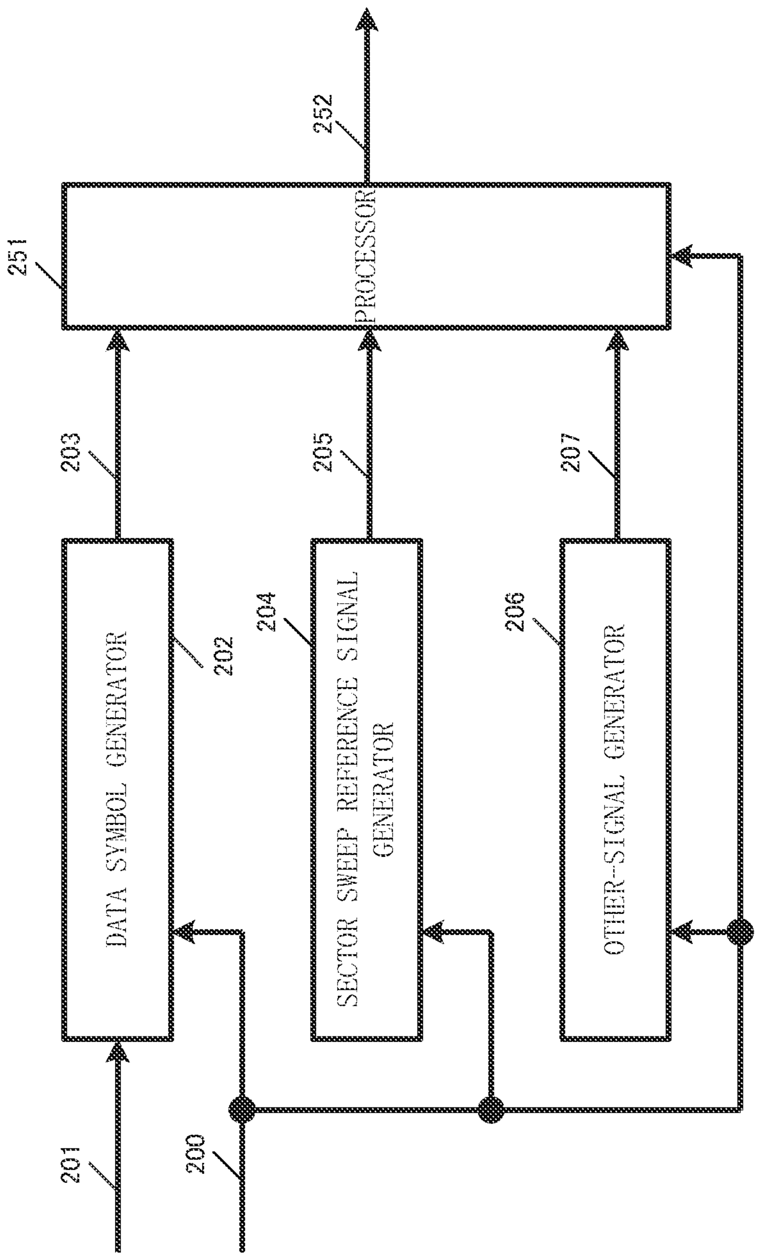
FIG. 2 illustrates an exemplary configuration of an i-th transmitter.

FIG. 2 illustrates an exemplary configuration of i-th transmitter 102_*i*. Note that i is "an integer from 1 to N (both inclusive)" or "an integer from 1 to M (both inclusive)".

Data symbol generator 202 takes data 201 and control signal 200 as input, performs error correction coding, mapping, signal processing for transmission, etc. on the basis of information on an error correction coding method, information on a modulation scheme, information on a transmission method, information on a frame configuration method, etc. included in control signal 200, and outputs data symbol modulation signal 203. Note that data 201 corresponds to i-th data 101_*i*, and control signal 200 corresponds to control signal 100. Thus, data 201 may include data of one or more users.

Sector sweep reference signal (i.e., reference signal for sector sweep) generator 204 takes control signal 200 as input, generates sector sweep reference signal 205 based on the frame configuration information included in control signal 200, and outputs the generated signal. Note that sector sweep reference signal 205 is a signal transmitted to determine a transmit beam and/or receive beam to be used for communicating with a communication counterpart.

Other-signal generator 206 takes control signal 200 as input, generates other signals 207 based on the control signal, and outputs the generated signals.

Processor 251 takes data symbol modulation signal 203, sector sweep reference signal 205, other signals 207, and control signal 200 as input, generates frame configuration-based modulation signal (i.e., modulation signal in accordance with frame configuration) 252 based on the frame configuration information included in control signal 200, and outputs the generated signal. Note that frame configuration-based modulation signal 252 corresponds to i-th modulation signal 103_*i*. Specific examples of the frame configuration will be described later in detail.

Figure 3:
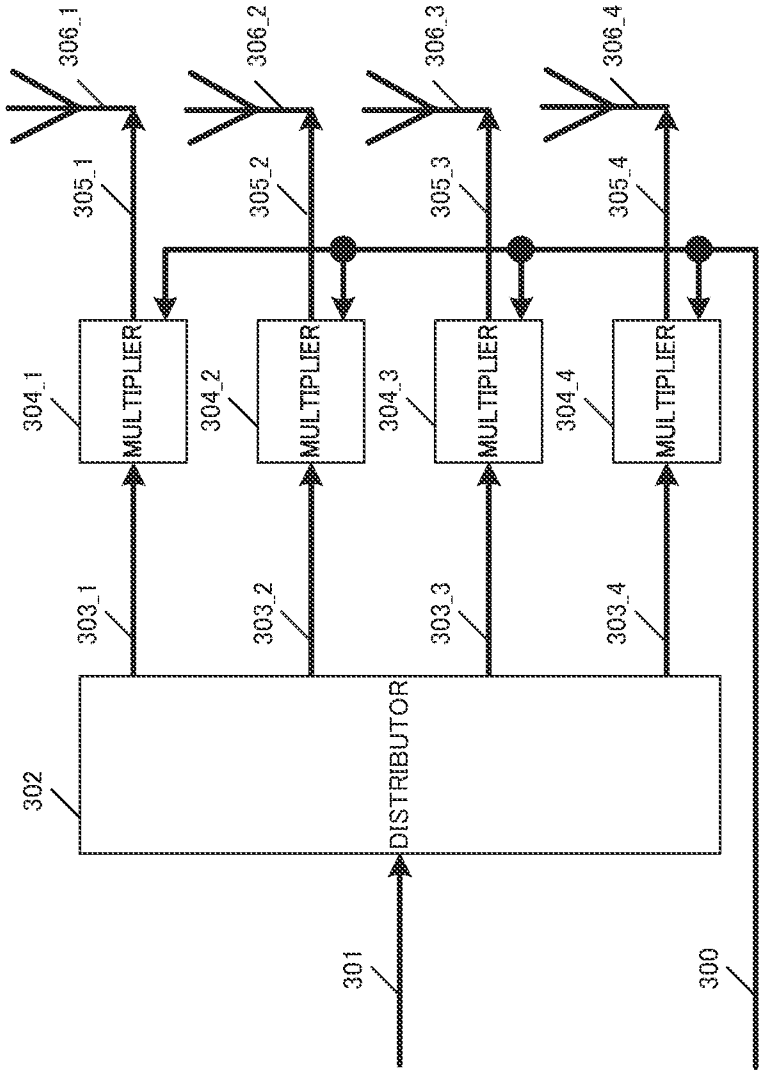
FIG. 3 illustrates an exemplary configuration of transmission panel antenna i in FIGS. 1A, 1B, and 1C.

FIG. 3 illustrates an exemplary configuration of transmission panel antenna i labeled 106_*i* in FIGS. 1A, 1B, and 1C. Note that i is "an integer from 1 to M (both inclusive)". Distributor 302 takes transmission signal 301 as input, performs distribution, and outputs first transmission signal 303_1, second transmission signal 303_2, third transmission signal 303_3, and fourth transmission signal 303_4. Note that transmission signal 301 corresponds to "i-th transmission signal 105_*i* in FIGS. 1A and 1B" or "i-th modulation signal 103_*i* in FIG. 1C".

Multiplier 304_1 takes first transmission signal 303_1 and control signal 300 as input, multiplies first transmission signal 303_1 by a multiplication coefficient based on control signal 300, generates and outputs coefficient-multiplication-subjected first transmission signal (i.e., first transmission signal that has been subjected to the coefficient multiplication) 305_1. Then, coefficient-multiplication-subjected first transmission signal 305_1 is outputted from antenna 306_1 as a radio wave. Note that control signal 300 corresponds to control signal 100.

A specific description follows. First transmission signal 303_1 is represented by tx1(t). Note that t represents time. When the multiplication coefficient is w1, coefficient-multiplication-subjected first transmission signal 305_1 can be expressed as tx1(t)×w1. Note that tx1(t) can be represented by a complex number, and thus, it may be a real number. Likewise, w1 can be represented by a complex number, and thus, it may be a real number.

Multiplier 304_2 takes second transmission signal 303_2 and control signal 300 as input, multiplies second transmission signal 303_2 by a multiplication coefficient based on control signal 300, generates and outputs coefficient-multiplication-subjected second transmission signal 305_2. Then, coefficient-multiplication-subjected second transmission signal 305_2 is outputted from antenna 306_2 as a radio wave.

A specific description follows. Second transmission signal 303_2 is represented by tx2(t). Note that t represents time. When the multiplication coefficient is w2, coefficient-multiplication-subjected second transmission signal 305_2 can be expressed as tx2(t)×w2. Note that tx2(t) can be represented by a complex number, and thus, it may be a real number. Likewise, w2 can be represented by a complex number, and thus, it may be a real number.

Multiplier 304_3 takes third transmission signal 303_3 and control signal 300 as input, multiplies third transmission signal 303_3 by a multiplication coefficient based on control signal 300, generates and outputs coefficient-multiplication-subjected third transmission signal 305_3. Then, coefficient-multiplication-subjected third transmission signal 305_3 is outputted from antenna 306_3 as a radio wave.

A specific description follows. Third transmission signal 303_3 is represented by tx3(t). Note that t represents time. When the multiplication coefficient is w3, coefficient-multiplication-subjected third transmission signal 305_3 can be expressed as tx3(t)×w3. Note that tx3(t) can be represented by a complex number, and thus, it may be a real number. Likewise, w3 can be represented by a complex number, and thus, it may be a real number.

Multiplier 304_4 takes fourth transmission signal 303_4 and control signal 300 as input, multiplies fourth transmission signal 3034 by a multiplication coefficient based on control signal 3X), generates and outputs coefficient-multiplication-subjected fourth transmission signal 305_4. Then, coefficient-multiplication-subjected fourth transmission signal 3054 is outputted from antenna 306_4 as a radio wave.

A specific description follows. Fourth transmission signal 3034 is represented by tx4(t). Note that t represents time. When the multiplication coefficient is w4, coefficient-multiplication-subjected fourth transmission signal 305_4 can be expressed as tx4(t)×w4. Note that tx4(t) can be represented by a complex number, and thus, it may be a real number. Likewise, w4 can be represented by a complex number, and thus, it may be a real number.

Note that "an absolute value of w1, an absolute value of w2, an absolute value of w3, and an absolute value of w4 may be equal to each other". This corresponds to a case where a phase change has been performed. It is needless to say that the absolute value of w1, the absolute value of w2, the absolute value of w3, and the absolute value of w4 need not be equal to each other.

The respective values of w1, w2, w3, and w4 may be switched for each frame, each slot, each mini-slot, each multiple-symbols, or each symbol. The switch timings of the respective values of w1, w2, w3, and w4 are not limited to the above examples.

Further, FIG. 3 illustrates an example of the transmission panel antenna composed of four antennas (and four multipliers), but the number of antennas is not limited to four and the transmission panel antenna only needs to be composed of two or more antennas.

Note that transmission panel antenna i labeled 106_*i* in FIGS. 1A, 1B, and 1C may perform directivity control by changing the characteristics of the antenna itself, and in this case, transmission panel antenna i labeled 106_*i* may be composed of one or more antennas.

Figure 4:
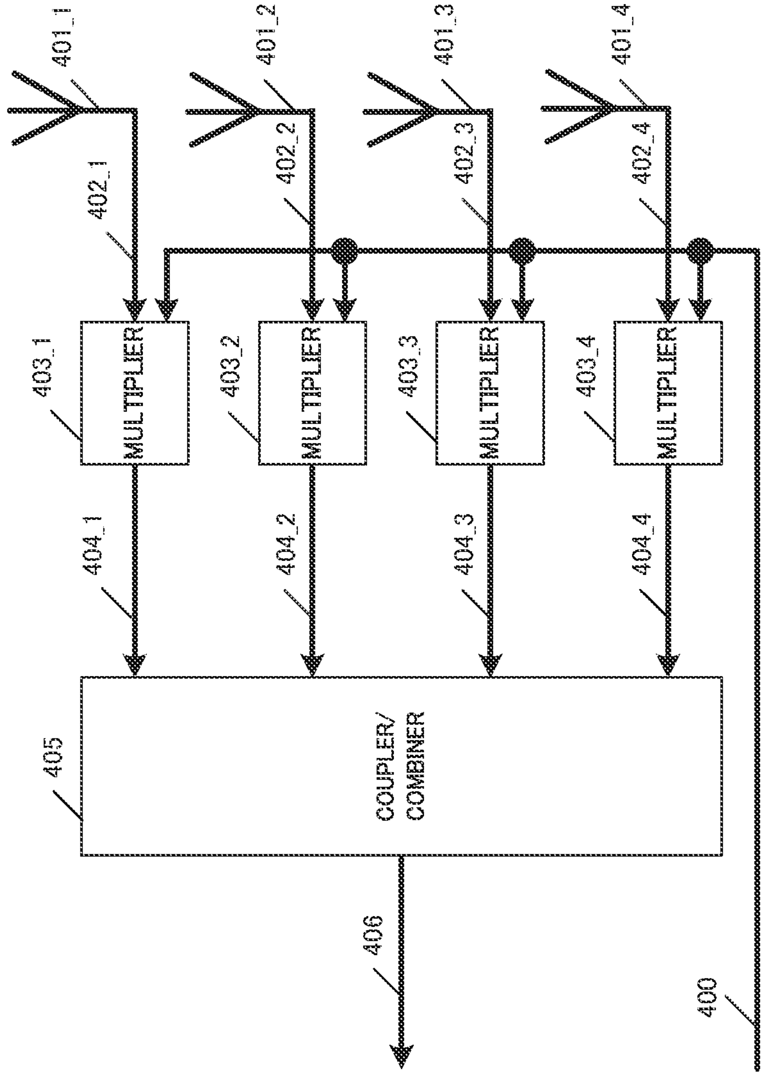
FIG. 4 illustrates an exemplary configuration of reception panel antenna i in FIGS. 1A, 1B, and 1C.

FIG. 4 illustrates an exemplary configuration of reception panel antenna i labeled 151_*i* in FIGS. 1A, 1B, and 1C. Note that i is "an integer from 1 to m (both inclusive)".

Multiplier 403_1 takes first received signal 402_1 received at antenna 401_1 and control signal 400 as input, multiplies first received signal 402_1 by a multiplication coefficient based on control signal 400, and outputs coefficient-multiplication-subjected first received signal 404_1.

A specific description follows. First received signal 402_1 is represented by rx1(t). Note that t represents time. When the multiplication coefficient is d1, coefficient-multiplication-subjected first received signal 4041 can be expressed as rx1(t)×d1. Note that rx1(t) can be represented by a complex number, and thus, it may be a real number. Likewise, d1 can be represented by a complex number, and thus, it may be a real number.

Multiplier 403_2 takes second received signal 4022 received at antenna 401_2 and control signal 400 as input, multiplies second received signal 402_2 by a multiplication coefficient based on control signal 400, and outputs coefficient-multiplication-subjected second received signal 404_2.

A specific description follows. Second received signal 402_2 is represented by rx2(t). Note that t represents time. When the multiplication coefficient is d2, coefficient-multiplication-subjected second received signal 404_2 can be expressed as rx2(t)×d2. Note that rx2(t) can be represented by a complex number, and thus, it may be a real number. Likewise, d2 can be represented by a complex number, and thus, it may be a real number.

Multiplier 403_3 takes third received signal 402_3 received at antenna 401_3 and control signal 400 as input, multiplies third received signal 402_3 by a multiplication coefficient based on control signal 400, and outputs coefficient-multiplication-subjected third received signal 404_3.

A specific description follows. Third received signal 402_3 is represented by rx3(t). Note that t represents time. When the multiplication coefficient is d3, coefficient-multiplication-subjected third received signal 4043 can be expressed as rx3(t)×d3. Note that rx3(t) can be represented by a complex number, and thus, it may be a real number. Likewise, d3 can be represented by a complex number, and thus, it may be a real number.

Multiplier 403_4 takes fourth received signal 4024 received at antenna 401_4 and control signal 400 as input, multiplies fourth received signal 402_4 by a multiplication coefficient based on control signal 400, and outputs coefficient-multiplication-subjected fourth received signal 404_4.

A specific description follows. Fourth received signal 4024 is represented by rx4(t). Note that t represents time. When the multiplication coefficient is d4, coefficient-multiplication-subjected fourth received signal 404_4 can be expressed as rx4(t)×d4. Note that rx4(t) can be represented by a complex number, and thus, it may be a real number. Likewise, d4 can be represented by a complex number, and thus, it may be a real number.

Coupler/combiner 405 takes coefficient-multiplication-subjected first received signal 404_1, coefficient-multiplication-subjected second received signal 404_2, coefficient-multiplication-subjected third received signal 404_3, and coefficient-multiplication-subjected fourth received signal 4044 as input, combines coefficient-multiplication-subjected first received signal 404_1, coefficient-multiplication-subjected second received signal 404_2, coefficient-multiplication-subjected third received signal 404_3, and coefficient-multiplication-subjected fourth received signal 404_4, and outputs modulation signal 406. Note that modulation signal 406 is expressed as rx1(t)×d1+rx2(t)×d2+rx3(t)×d3+rx4(t)×d4.

Note that control signal 400 corresponds to control signal 100, and modulation signal 406 corresponds to i-th received signal 152_*i*.

In addition, "an absolute value of d1, an absolute value of d2, an absolute value of d3, and an absolute value of d4 may be equal to each other". This corresponds to a case where a phase change has been performed. It is needless to say that the absolute value of d1, the absolute value of d2, the absolute value of d3, and the absolute value of d4 need not be equal to each other.

The respective values of d1, d2, d3, and d4 may be switched for each frame, each slot, each mini-slot, each multiple-symbols, or each symbol. The switch timings of the respective values of d1, d2, d3, and d4 are not limited to the above examples.

Further, FIG. 4 illustrates an example of the reception panel antenna composed of four antennas (and four multipliers), but the number of antennas is not limited to four and the reception panel antenna only needs to be composed of two or more antennas.

Note that reception panel antenna i labeled 151_*i* in FIGS. 1A, 1B, and 1C may perform directivity control by changing the characteristics of the antenna itself, and in this case, reception panel antenna i labeled 151_*i* may be composed of one or more antennas.

In the present embodiment, in a case where the communication apparatus in FIGS. 1A, 1B, and 1C is a base station or gNodeB (gNB), for example, it supports multi-carrier transmission such as orthogonal frequency division multiplexing (OFDM). The base station or gNB in FIGS. 1A, 1B, and 1C may also support orthogonal frequency division multiple access (OFDMA).

Figure 5:
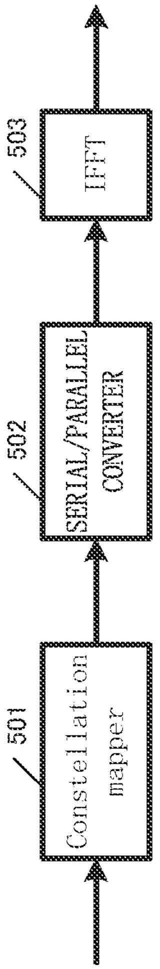
FIG. 5 illustrates an exemplary configuration of a transmission apparatus in a case of using an OFDM scheme.

FIG. 5 illustrates an exemplary configuration of a transmission apparatus in a case of using an OFDM scheme. As illustrated in FIG. 5, the transmission apparatus is composed of, for example, constellation mapper 501, serial/parallel converter 502, and inverse fast Fourier transform (IFFT) 503.

Constellation mapper 501, for example, takes data as input, performs mapping based on the configured modulation scheme, and outputs the modulation signal.

Serial/parallel converter 502 converts serial signals into parallel signals. Note that serial/parallel converter 502 need not be present when parallel signals are already obtained.

IFFT 503 performs IFFT processing on an input signal, and outputs the modulation signal based on the OFDM scheme. Note that IFFT 503 may be an inverse Fourier transformer performing inverse Fourier transform.

The transmission apparatus in a case of using the OFDM scheme may include another processor (e.g., error correction encoder, interleaver, etc.), and the configuration is not limited to that in FIG. 5.

In the present embodiment, in a case where the communication apparatus in FIGS. 1A, 1B, and 1C is a base station or gNB, for example, it may support multi-carrier reception such as in the OFDM scheme or may support single-carrier reception such as in a single-carrier scheme based on discrete Fourier transform (DFT), for example. The following description is about an exemplary configuration of a reception part in a single-carrier scheme.

Figure 6:
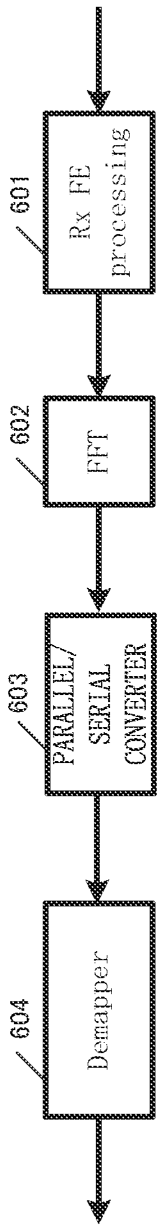
FIG. 6 illustrates an exemplary configuration of a reception apparatus in a case of using an OFDM scheme.

FIG. 6 illustrates an exemplary configuration of a reception apparatus in a case of using the OFDM scheme. As illustrated in FIG. 6, the reception apparatus in a case of using the OFDM scheme is composed of receiver (Rx) front end (FE) processing 601, fast Fourier transform (FFT) 602, parallel/serial converter 603, and demapper 604.

Rx FE processing 601 performs processing of a reception front end.

FFT 602 performs FFT processing on the input signal.

Parallel/serial converter 603 converts parallel signals into serial signals. Note that parallel/serial converter 603 need not be present when serial signals are already obtained.

Demapper 604 performs demodulation processing based on the transmission method and modulation scheme.

Note that the reception apparatus may include another processor (e.g., de-interleaver, decoder for error correction coding, etc.), and the configuration is not limited to that in FIG. 6.

Figure 7:
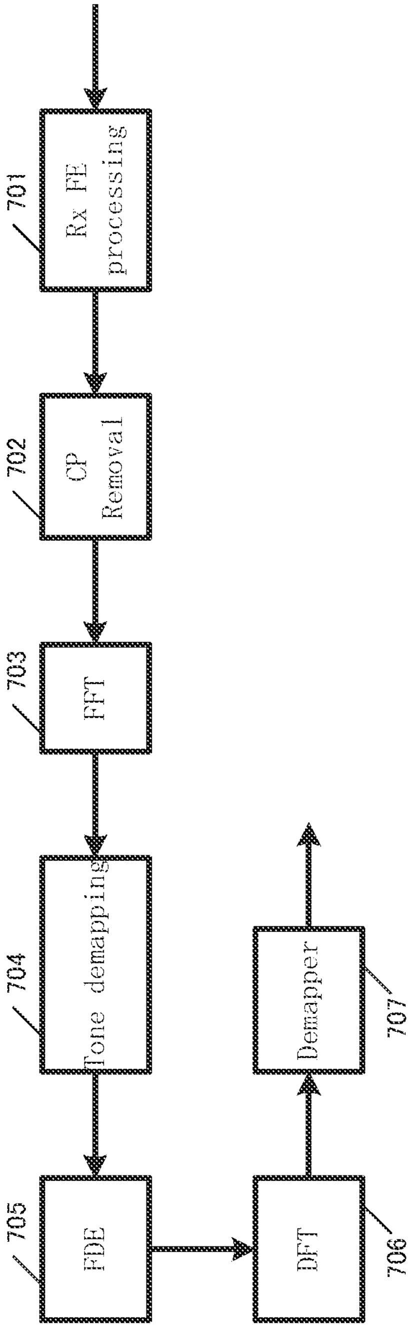
FIG. 7 illustrates an exemplary configuration of the reception apparatus in a case of using a single-carrier scheme based on DFT.

FIG. 7 illustrates an exemplary configuration of the reception apparatus in a case of using a single-carrier scheme based on DFT. As illustrated in FIG. 7, the reception apparatus is composed of receiver (Rx) FE processing 701, CP removal 702, fast Fourier transform (FFT) 703, tone demapping 704, frequency domain equalization (FDE) 705, DFT 706, and demapper 707. Note that the reception apparatus may include a processor other than the above.

Figure 8:
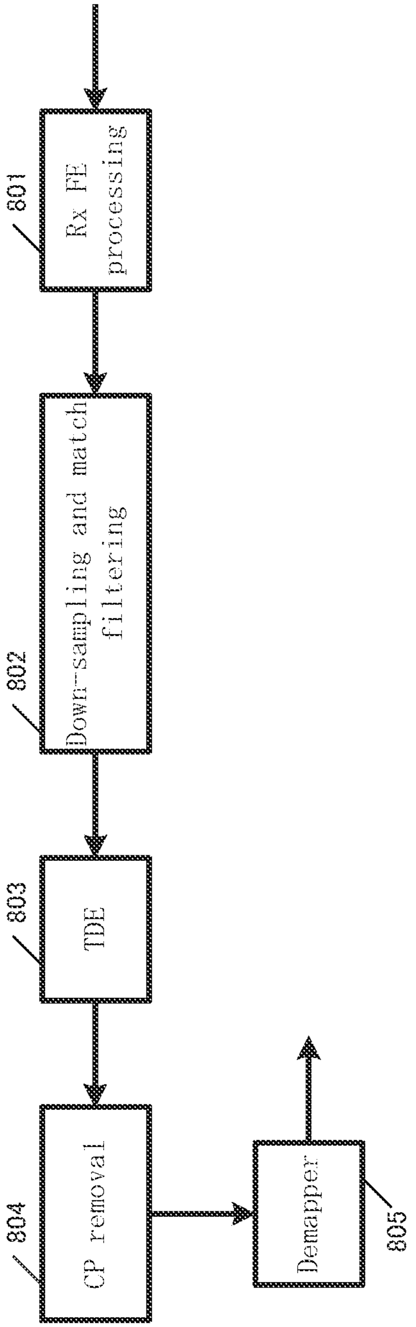
FIG. 8 illustrates an exemplary configuration of the reception apparatus in a case of using a single-carrier scheme based on time domain.

FIG. 8 illustrates an exemplary configuration of the reception apparatus in a case of using a single-carrier scheme based on time domain. As illustrated in FIG. 8, the reception apparatus is composed of receiver (Rx) FE processing 801, down-sampling and match filtering 802, time domain equalization (TDE) 803, CP removal 804, and demapper 805. Note that the reception apparatus may include a processor other than the above.

Although exemplary reception methods in single-carrier schemes and exemplary configurations of the reception apparatus have been described above, the reception method in a single-carrier scheme and the reception apparatus are not limited to these. For example, examples of the single-carrier scheme include "discrete Fourier transform (DFT)-spread orthogonal frequency division multiplexing (OFDM)" (DFT-S OFDM), "trajectory constrained DFT-spread OFDM", "constrained DFT-spread OFDM" (constrained DFT-S OFDM), "OFDM based single carrier (SC)", "single carrier (SC)-frequency division multiple access (FDMA)", "guard interval DFT-spread OFDM", a time-domain implementation single carrier scheme (e.g., single carrier (SC)-QAM), and the like.

Figure 9:
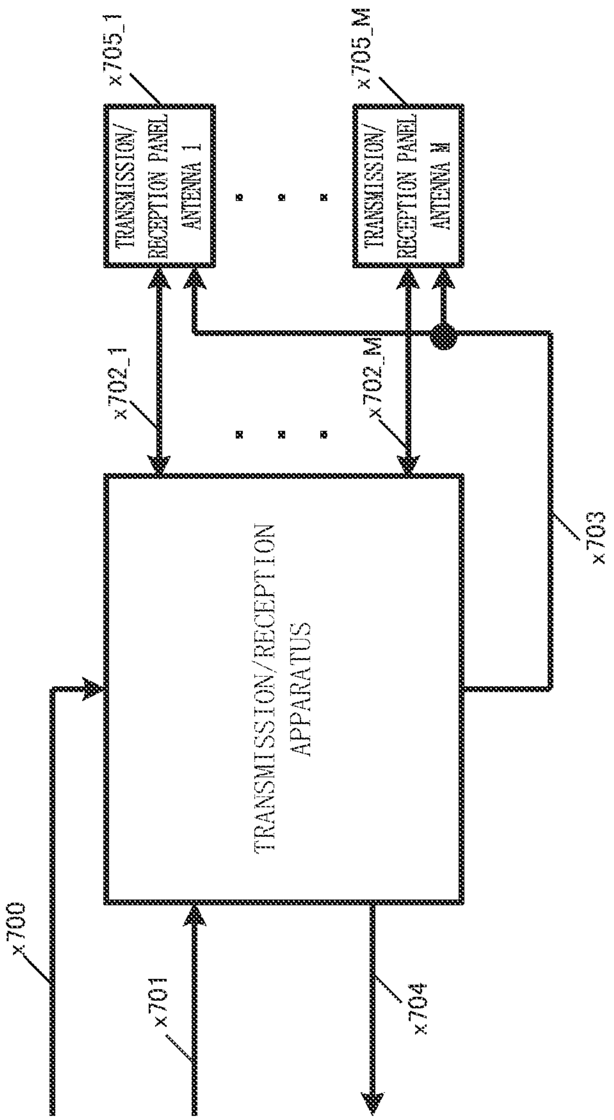
FIG. 9 illustrates an exemplary configuration of gNB and NR-UE.

FIG. 9 illustrates an exemplary configuration of an NR apparatus (communication apparatus) such as gNB and NR-UE other than those in FIGS. 1A, 1B, and 1C, for example. Transmission/reception panel antenna i labeled x705_*i* in FIG. 9 is an antenna including components in FIGS. 3 and 4, for example. Here, i is an integer from 1 to M (both inclusive), and M is an integer equal to or greater than 1 or an integer equal to or greater than 2. Thus, transmission/reception panel antenna i labeled x705_*i* can perform transmit beamforming (transmission directivity control) and receive beamforming (reception directivity control).

Note that specific operations of transmit beamforming (transmission directivity control) and receive beamforming (reception directivity control) have already been described, and the apparatus performs transmit beamforming (transmission directivity control) to transmit a sector sweep reference signal, feedback signal, frame, slot, modulation signal, data symbol, and the like.

Figure 10:
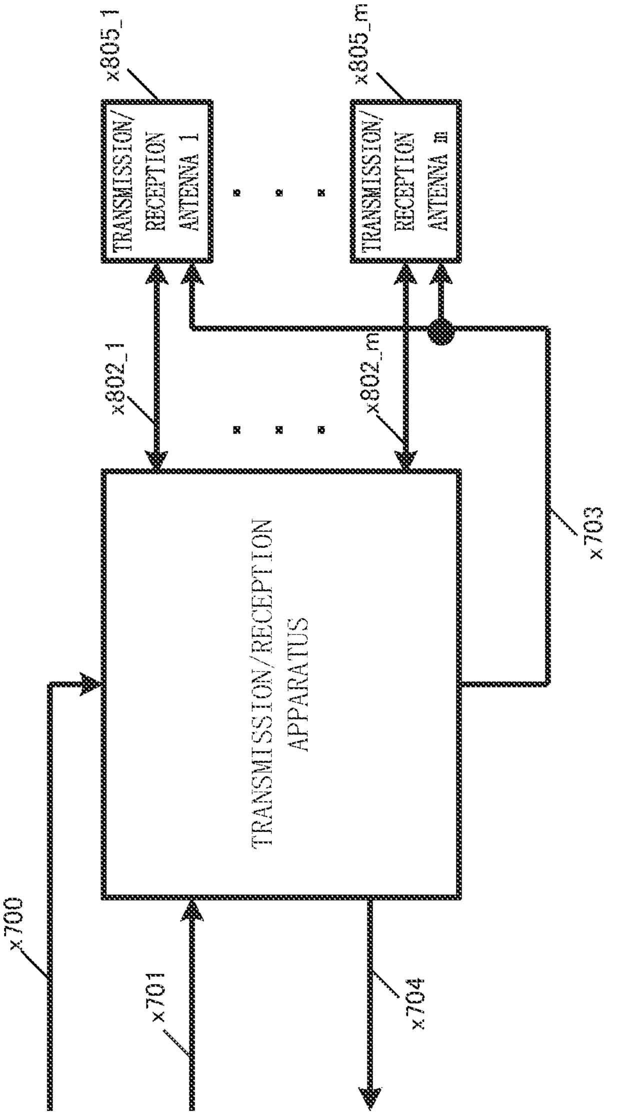
FIG. 10 illustrates another exemplary configuration of gNB and NR-UE.

FIG. 10 illustrates another exemplary configuration of the NR apparatus (communication apparatus) such as gNB and NR-UE. In FIG. 10, the components that operate in the same manner as in FIG. 9 are denoted by the same reference signs, and the descriptions thereof will be omitted.

In a case where the gNB has the configuration in FIG. 10, transmit beamforming (transmission directivity control) and receive beamforming (reception directivity control) are performed using one or more of "transmission/reception antenna 1 labeled x805_1 to transmission/reception antenna m labeled x805_*m*".

Then, the gNB with the configuration in FIG. 10 performs transmit beamforming (transmission directivity control) and transmits sector sweep reference signals, for example.

For example, the gNB with the configuration in FIG. 10 uses a first transmit beam to transmit a first sector sweep reference signal, use a second transmit beam to transmit a second sector sweep reference signal, and so forth.

The gNB then determines "transmit beamforming and receive beamforming" to be used for communication with each terminal, and transmits and receives a feedback signal, frame, slot, modulation signal, data symbol, and the like.

In a case where the NR-UE has the configuration in FIG. 10, transmit beamforming (transmission directivity control) and receive beamforming (reception directivity control) are performed using one or more of "transmission/reception antenna 1 labeled x805_1 to transmission/reception antenna m labeled x805_*m*".

Then, the NR-UE with the configuration in FIG. 10 performs transmit beamforming (transmission directivity control) and transmits sector sweep reference signals.

For example, the NR-UE with the configuration in FIG. 10 uses a first transmit beam to transmit a first sector sweep reference signal, uses a second transmit beam to transmit a second sector sweep reference signal, and so forth.

The NR-UE then determines "transmit beamforming and receive beamforming" to be used for communication with the gNB, and transmits and receives a feedback signal, frame, slot, modulation signal, data symbol, and the like.

Note that a configuration of "the communication apparatus such as gNB and NR-UE" is not limited to those in FIGS. 1A, 1B, 1C, 9 and 10, and they are merely examples.

The transmission/reception panel antenna (x705_1 to x705_M) in FIG. 9 may be composed of a single antenna or a plurality of antennas. In addition, the transmission/reception panel antenna (x705_1 to x705_M) may be composed of a single antenna element or a plurality of antenna elements. A configuration of the transmission/reception panel antenna (x705_1 to x705_M) is not limited to the configuration described in the present embodiment.

The transmission/reception antenna (x805_1 to x805_*m*) in FIG. 10 may be composed of a single antenna or a plurality of antennas. In addition, the transmission/reception antenna (x805_1 to x805_*m*) may be composed of a single antenna element or a plurality of antenna elements. A configuration of the transmission/reception antenna (x805_1 to x805_*m*) is not limited to the configuration described in the present embodiment.

Note that, for example, in a case where transmission/reception panel antenna i labeled x705_*i* in FIG. 9 uses the transmission panel antenna in the configuration of FIG. 3 and the reception panel antenna in the configuration of FIG. 4 together, transmission antenna 306_1 in FIG. 3 and reception antenna 401_1 in FIG. 4 are used together as a single antenna, and multiplier 304_1 and multiplier 403_1 are connected to this single antenna.

Likewise, transmission antenna 306_2 in FIG. 3 and reception antenna 401_2 in FIG. 4 are used together as a single antenna, and multiplier 304_2 and multiplier 403_2 are connected to this single antenna. In addition, transmission antenna 306_3 in FIG. 3 and reception antenna 401_3 in FIG. 4 are used together as a single antenna, and multiplier 304_3 and multiplier 403_3 are connected to this single antenna. Then, transmission antenna 306_4 in FIG. 3 and reception antenna 401_4 in FIG. 4 are used together as a single antenna, and multiplier 304_4 and multiplier 403_4 are connected to this single antenna.

Regarding Omni-Directional Antenna

In a case where the gNB and NR-UE have the configuration in FIG. 9, signal reception is performed by using one or more of "transmission/reception panel antenna 1 labeled x705_1 to transmission/reception panel antenna M labeled x705_M".

In each of "transmission/reception panel antenna 1 labeled x705_1 to transmission/reception panel antenna M labeled x705_M", certain receive beamforming (reception directivity control) is configured for antennas composing the transmission/reception panel antenna.

Note that not all antennas composing the transmission/reception panel antenna need to be used for signal reception, and the configuration of receive beamforming (reception directivity control) may or may not be fixed in time.

The method of using the transmission/reception panel antenna in omni-directional reception is not limited to the above example.

In a case where the gNB and NR-UE have the configuration in FIG. 10, signal reception is performed by using one or more of "transmission/reception antenna 1 labeled x805_1 to transmission/reception antenna m labeled x805_*m*".

In each of "transmission/reception antenna 1 labeled x805_1 to transmission/reception antenna m labeled x805_*m*", certain receive beamforming (reception directivity control) is configured for antennas composing the transmission/reception antenna.

Note that not all antennas composing the transmission/reception antenna need to be used for signal reception.

The method of using the transmission/reception antenna in omni-directional reception is not limited to the above example.

In some cases, radio systems using different radio communication schemes share "a licensed band and/or an unlicensed band". For example, the NR system in a frequency band from 52.6 GHz to 71 GHz (both inclusive) and a radio system of IEEE 802.11ad/ay sometimes share "a licensed band and/or an unlicensed band". A description will be given of exemplary operations in the case where radio systems using different radio communication schemes share "a licensed band and/or an unlicensed band". Note that operations described in the present embodiment are applicable to a case where a frequency (band) is shared.

Figure 11:
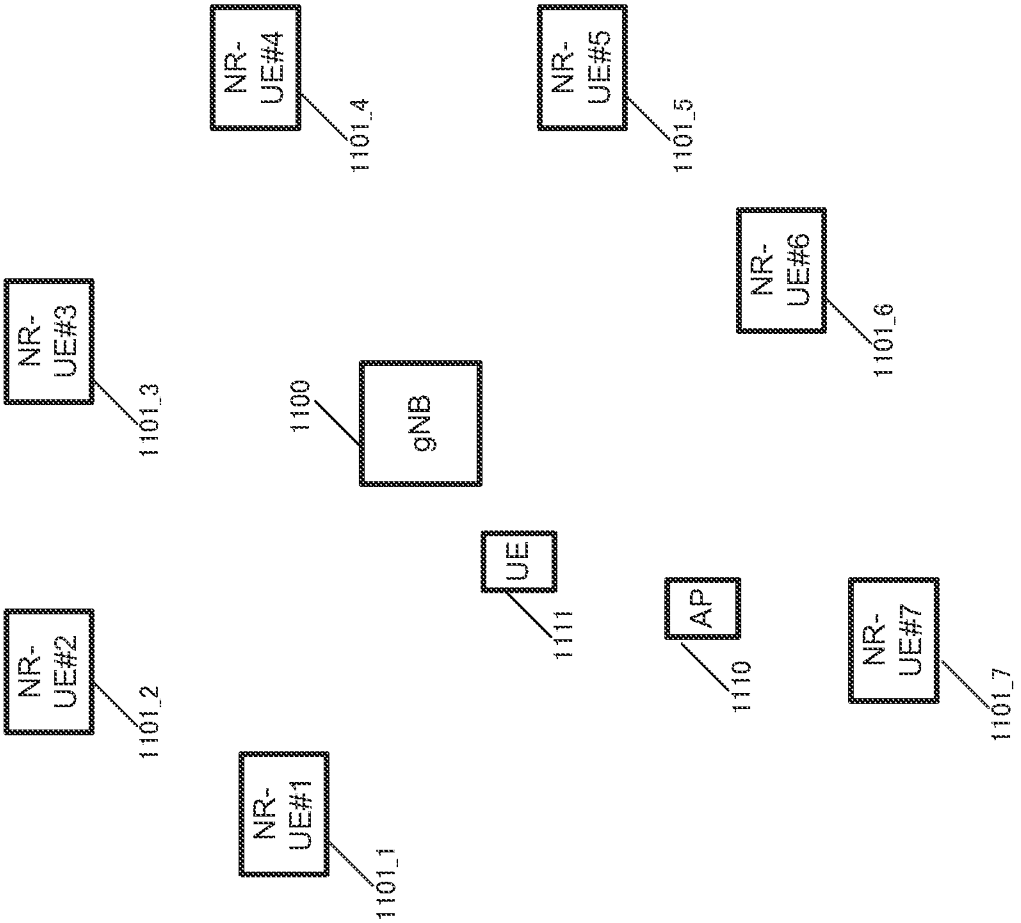
FIG. 11 illustrates an exemplary radio system.

FIG. 11 illustrates an exemplary radio system. In FIG. 11, a radio system of NR and a radio system of IEEE 802.11ad and/or IEEE 802.11ay are present in a certain space. In the following, IEEE 802.11ad and/or IEEE 802.11ay are sometimes referred to as the first standard.

The NR radio system includes gNB and terminals, for example. In FIG. 11, gNB 1100 is present. The terminal of NR may be referred to as UE. Note that the name thereof is not limited to this. In the following, the terminal of NR is sometimes referred to as "NR-UE". For example, NR-UE #1 labeled 1101_1 to NR-UE #7 labeled 11017 are present in FIG. 11.

The radio system specified in the first standard includes a base station and a terminal. The base station specified in the first standard may be referred to as an access point (AP). For example, AP 1110 is present in FIG. 11. The terminal specified in the first standard may be referred to as UE. For example, UE 1111 is present in FIG. 11.

The radio system of NR and the radio system specified in the first standard share "a licensed band and/or an unlicensed band". The radio system of NR and the radio system specified in the first standard can occupy the "licensed band and/or unlicensed band" based on Listen Before Talk (LBT), for example.

As a simple method, the radio system of NR and/or the radio system specified in the first standard performs "carrier sensing and/or LBT" and starts communication when a channel is available, for example. Meanwhile, the radio system of NR and/or the radio system specified in the first standard stands by to start communication when a channel is in use.

Next, LBT related to the present invention will be described.

Figure 12:
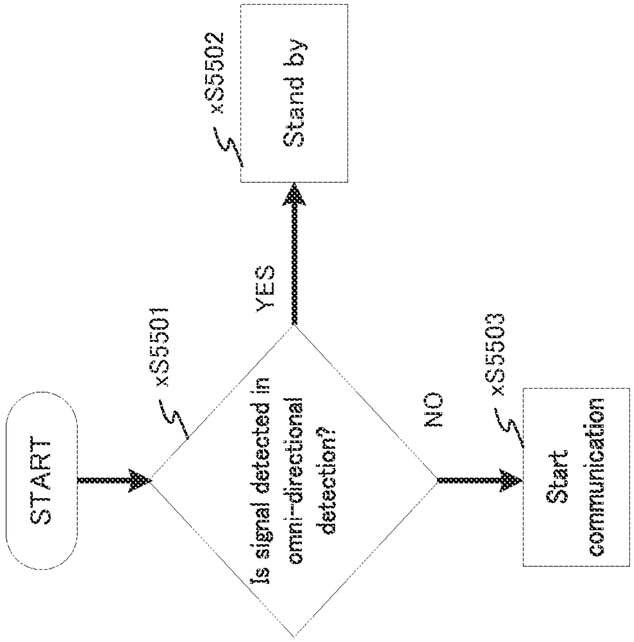
FIG. 12 is a flowchart describing an exemplary operation of gNB in omni-directional LBT.

Regarding Omni-Directional LBT:

FIG. 12 is a flowchart describing an exemplary operation of the gNB in omni-directional LBT. The gNB determines whether a signal is detected in omni-directional detection (xS5501).

When a signal is detected in the omni-directional detection (YES in xS5501), the gNB stands by for communication (xS5502). For example, the gNB determines that another apparatus (another gNB, NR-UE, AP, or first standard-UE) occupies a channel in the "licensed band and/or unlicensed band" and stands by without transmitting a signal.

When no signal is detected (no signal can be detected) in the omni-directional detection (NO in xS5501), the gNB starts communication (xS5503). For example, the gNB determines that another apparatus (another gNB, NR-UE, AP, or first standard-UE) does not occupy a channel in the "licensed band and/or unlicensed band" and starts communication.

As a method of signal detection, the gNB may determine that a signal is present when the power at the time of reception is greater than a threshold and that a signal is not present when the power is less than the threshold. As another method, the gNB may determine that a signal is present when the signal can be demodulated and that a signal is not present when the signal cannot be demodulated. Although two examples have been described as methods of signal detection, the present disclosure is not limited to these. In addition, the above description is about an exemplary operation of the gNB, but the NR-UE operates in the same manner. Note that, although the signal detected by the gNB and NR-UE is assumed to be a signal based on the first standard, it may be a signal other than the signal of the first standard or may be an NR signal, which causes interference.

Regarding Stand-By:

In some cases, the gNB and NR-UE "stand by" when the omni-directional reception is performed and a signal is detected. For example, the gNB and NR-UE stand by without transmitting a signal as illustrated in xS5502 of FIG. 12.

The gNB and NR-UE may restart the operation of the omni-directional LBT when a certain amount of time has passed. Alternatively, when the omni-directional reception is performed and a signal is detected, the gNB and NR-UE may again perform the omni-directional reception and check whether a signal is present.

Figure 13:
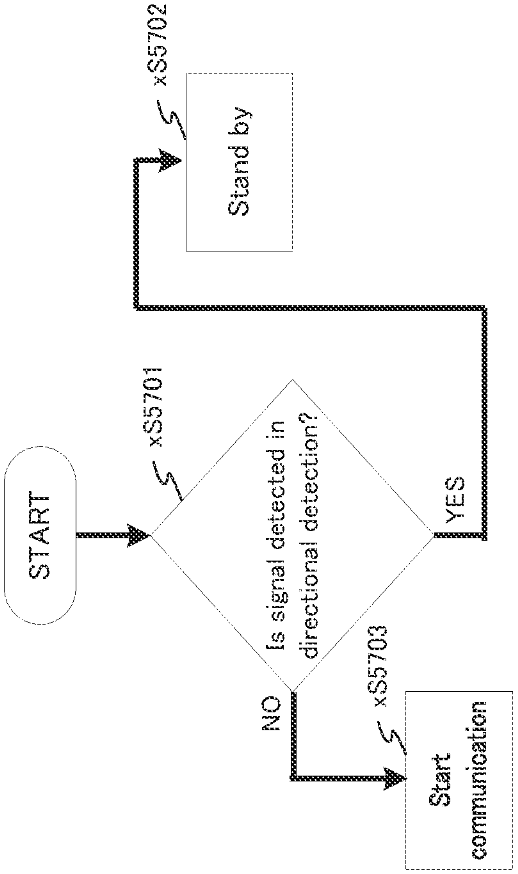
FIG. 13 is a flowchart describing an exemplary operation of gNB in directional LBT.

Regarding Directional LBT:

FIG. 13 is a flowchart describing an exemplary operation of the gNB in the directional LBT. The gNB determines whether a signal is detected in the directional detection (xS5701).

When a signal is detected in the directional detection (YES in xS5701), the gNB stands by for communication (xS5702). For example, the gNB determines that another apparatus (another gNB, NR-UE, AP, or first standard-UE) occupies a channel in the "licensed band and/or unlicensed band" and stands by without transmitting a signal.

When no signal is detected (no signal can be detected) in the directional detection (NO in xS5701), the gNB starts communication (xS5703). For example, the gNB determines that another apparatus (another gNB, NR-UE, AP, or first standard-UE) does not occupy a channel in the "licensed band and/or unlicensed band" and starts communication.

As a method of signal detection, the gNB may determine that a signal is present when the power at the time of reception is greater than a threshold and that a signal is not present when the power is less than the threshold. As another method, the gNB may determine that a signal is present when the signal can be demodulated and that a signal is not present when the signal cannot be demodulated. Two examples have been described but the method is not limited to the examples. In addition, the above description is about an exemplary operation of the gNB, but the NR-UE operates in the same manner. Note that, although the signal detected by the gNB and NR-UE is assumed to be a signal based on the first standard, it may be a signal other than the signal of the first standard or may be an NR signal, which causes interference.

Figure 14:
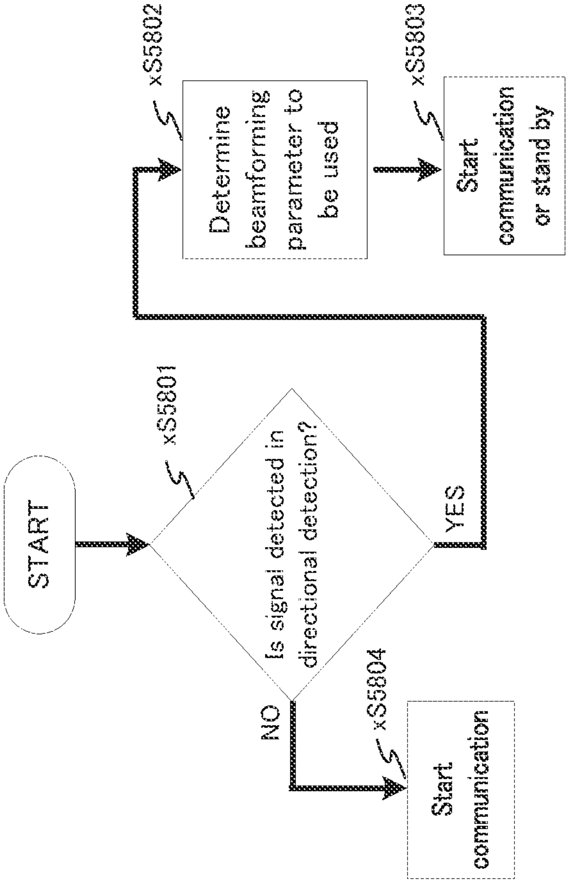
FIG. 14 is a flowchart describing an exemplary operation of gNB in directional LBT.

FIG. 14 is a flowchart describing an exemplary operation of the gNB in the directional LBT In FIG. 14, the gNB specifies a beam direction in which signal interference occurs. The gNB stands by without transmitting a signal in the specified beam direction, and transmits a signal (starts communication) in a direction other than the specified beam direction.

The gNB determines whether a signal is detected in the directional detection (xS5801).

When a signal is detected in the directional detection (YES in xS5801), the gNB determines a beamforming parameter to be used for signal transmission (xS5802). For example, the gNB may determine a beamforming parameter in a direction other than the direction in which a signal is detected in the directional detection.

Upon determining the beamforming parameter in xS5802, the gNB starts communication or stands by, using the determined beamforming parameter (xS5803). For example, the gNB may determine that another apparatus (another gNB, NR-UE. AP, or first standard-UE) occupies a channel of the "licensed band and/or unlicensed band" in the direction in which a signal is detected in the directional detection, and stand by without transmitting a signal. The gNB may determine that another apparatus (another gNB, NR-UE, AP, or first standard-UE) does not occupy a channel of the "licensed band and/or unlicensed band" in a direction other than the direction in which a signal is detected in the directional detection, and starts communication.

When no signal is detected (no signal can be detected) in the directional detection (NO in xS5801), the gNB starts communication (xS5804). For example, the gNB determines that another apparatus (another gNB, NR-UE, AP, or first standard-UE) does not occupy a channel in the "licensed band and/or unlicensed band" and starts communication.

As a method of signal detection, the gNB may determine that a signal is present when the power at the time of reception is greater than a threshold and that a signal is not present when the power is less than the threshold. As another method, the gNB may determine that a signal is present when the signal can be demodulated and that a signal is not present when the signal cannot be demodulated. Two examples have been described but the method is not limited to the examples. In addition, the above description is about an exemplary operation of the gNB, but the NR-UE operates in the same manner. Note that, although the signal detected by the gNB and NR-UE is assumed to be a signal based on the first standard, it may be a signal other than the signal of the first standard or may be an NR signal, which causes interference.

Regarding Directional Antenna:

In a case where the gNB and NR-UE have the configuration in FIG. 9, signal reception is performed by using one of "transmission/reception panel antenna 1 labeled x705_1 to transmission/reception panel antenna M labeled x705_M".

In detecting a signal in the directional reception, each transmission panel antenna performs, for example, four types of receive beamforming (reception directivity control).

In detecting a signal in the directional reception, the gNB and NR-UE perform, for example, receive beamforming (reception directivity control) according to the first parameter, receive beamforming (reception directivity control) according to the second parameter, receive beamforming (reception directivity control) according to the third parameter, and receive beamforming (reception directivity control) according to the fourth parameter in transmission/reception panel antenna 1 labeled x705_1.

Further, in detecting a signal in the directional reception, the gNB and NR-UE perform receive beamforming (reception directivity control) according to the fifth parameter, receive beamforming (reception directivity control) according to the sixth parameter, receive beamforming (reception directivity control) according to the seventh parameter, and receive beamforming (reception directivity control) according to the eighth parameter in transmission/reception panel antenna 2 labeled x705_2.

Thus, in detecting a signal in the directional reception, receive beamforming (reception directivity control) according to the (4×i−3)-th parameter, receive beamforming (reception directivity control) according to the (4×i−2)-th parameter, receive beamforming (reception directivity control) according to the (4×i−1)-th parameter, and receive beamforming (reception directivity control) according to the (4×i)-th parameter are performed in transmission/reception panel antenna i labeled **x705_*i***. Note that i is an integer from 1 to M (both inclusive).

Then, the gNB and NR-UE perform receive beamforming (reception directivity control) according to the first parameter, and confirm whether a signal is present. Accordingly, the gNB and NR-UE use transmission/reception panel antenna 1 labeled x705_1.

The gNB and NR-UE perform receive beamforming (reception directivity control) according to the second parameter, and confirm whether a signal is present. Accordingly, the gNB and NR-UE use transmission/reception panel antenna 1 labeled x705_1.

The gNB and NR-UE perform receive beamforming (reception directivity control) according to the third parameter, and confirm whether a signal is present. Accordingly, the gNB and NR-UE use transmission/reception panel antenna 1 labeled x705_1.

The gNB and NR-UE perform receive beamforming (reception directivity control) according to the fourth parameter, and confirm whether a signal is present. Accordingly, the gNB and NR-UE use transmission/reception panel antenna 1 labeled x705_1.

The gNB and NR-UE perform receive beamforming (reception directivity control) according to the fifth parameter, and confirm whether a signal is present. Accordingly, the gNB and NR-UE use transmission/reception panel antenna 2 labeled x705_2.

The gNB and NR-UE perform receive beamforming (reception directivity control) according to the sixth parameter, and confirm whether a signal is present. Accordingly, the gNB and NR-UE use transmission/reception panel antenna 2 labeled x705_2.

The gNB and NR-UE perform receive beamforming (reception directivity control) according to the seventh parameter, and confirm whether a signal is present. Accordingly, the gNB and NR-UE use transmission/reception panel antenna 2 labeled x705_2.

The gNB and NR-UE perform receive beamforming (reception directivity control) according to the eighth parameter, and confirm whether a signal is present. Accordingly, the gNB and NR-UE use transmission/reception panel antenna 2 labeled x705_2.

Thus, the gNB and NR-UE perform receive beamforming (reception directivity control) according to the (4×i−3)-th parameter, and confirm whether a signal is present. Accordingly, the gNB and NR-UE use transmission/reception panel antenna i labeled x705_*i*.

The gNB and NR-UE perform receive beamforming (reception directivity control) according to the (4×i−2)-th parameter, and confirm whether a signal is present. Accordingly, the gNB and NR-UE use transmission/reception panel antenna i labeled x705_*i*.

The gNB and NR-UE perform receive beamforming (reception directivity control) according to the (4×i−1)-th parameter, and confirm whether a signal is present. Accordingly, the gNB and NR-UE use transmission/reception panel antenna i labeled x705_*i*.

The gNB and NR-UE perform receive beamforming (reception directivity control) according to the (4×i)-th parameter, and confirm whether a signal is present. Accordingly, the gNB and NR-UE use transmission/reception panel antenna i labeled x705_*i*.

Note that i is an integer from 1 to M (both inclusive).

Another example will be described. In a case where the gNB and NR-UE have the configuration in FIG. 10, signal reception is performed by using one or more of "transmission/reception antenna 1 labeled x805_1 to transmission/reception antenna m labeled x805_*m*" and performing receive beamforming (reception directivity control).

In detecting a signal in the directional reception, g types of receive beamforming (reception directivity control) are performed by using one or more of "transmission/reception antenna 1 labeled x805_1 to transmission/reception antenna m labeled x805_*m*". Note that g is an integer equal to or greater than 2.

The gNB and NR-UE perform receive beamforming (reception directivity control) according to the first parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the second parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the third parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the fourth parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the fifth parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the sixth parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the seventh parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the eighth parameter by using one or more of "transmission/reception antenna 1 labeled x805_1 to transmission/reception antenna m labeled x805_*m*", and confirm whether a signal is present.

Thus, the gNB and NR-UE perform receive beamforming (reception directivity control) according to the i-th parameter by using one or more of "transmission/reception antenna 1 labeled x805_1 to transmission/reception antenna m labeled x805_*m*", and confirm whether a signal is present. Note that i is an integer from 1 to g (both inclusive).

Regarding Stand-By:

In some cases, the gNB and NR-UE "stand by" when the directional reception is performed and a signal is detected. For example, the gNB and NR-UE stand by without transmitting a signal.

The gNB and NR-UE may restart the operation of the directional LBT when a certain amount of time has passed. Alternatively, when the directional reception is performed and a signal is detected, the gNB and NR-UE may again perform the directional reception and check whether a signal is present.

Regarding "Determining Beamforming Parameter to be Used" in xS5802 of FIG. 14:

Descriptions will be separately given of a case where the gNB and NR-UE have the configuration in FIG. 9 and a case where the gNB and NR-UE have the configuration in FIG. 10.

1) Case where the gNB and NR-UE have the Configuration in FIG. 9:

As described above, the gNB and NR-UE perform receive beamforming (reception directivity control) according to the (4×i−3)-th parameter, and confirm whether a signal is present.

In addition, the gNB and NR-UE perform receive beamforming (reception directivity control) according to the (4×i−2)-th parameter, and confirm whether a signal is present.

Then, the gNB and NR-UE perform receive beamforming (reception directivity control) according to the (4×i−1)-th parameter, and confirm whether a signal is present.

The gNB and NR-UE perform receive beamforming (reception directivity control) according to the (4×i)-th parameter, and confirm whether a signal is present.

Note that i is an integer from 1 to M (both inclusive).

When confirming that a signal is present, the gNB and NR-UE do not use the parameter at that time to transmit a modulation signal. When not confirming that a signal is present (detecting no signal), the gNB and NR-UE can use the parameter at that time to transmit a modulation signal.

For example, the gNB and NR-UE perform receive beamforming (reception directivity control) according to the first parameter, and confirm whether a signal is present. At this time, the gNB and NR-UE use transmission/reception panel antenna 1 labeled x705_1.

When detecting a signal, the gNB and NR-UE do not transmit a modulation signal using the first parameter. When detecting no signal, the gNB and NR-UE can transmit a modulation signal using the first parameter.

For example, the gNB and NR-UE perform receive beamforming (reception directivity control) according to the fifth parameter, and confirm whether a signal is present. At this time, the gNB and NR-UE use transmission/reception panel antenna 2 labeled x705_2.

When detecting a signal, the gNB and NR-UE do not transmit a modulation signal using the fifth parameter. When detecting no signal, the gNB and NR-UE can transmit a modulation signal using the fifth parameter.

Similar processing is performed for beamforming parameters in the other reception periods.

2) Case where the gNB and NR-UE have the Configuration in FIG. 10:

As described above, the gNB and NR-UE perform receive beamforming (reception directivity control) according to the i-th parameter by using one or more of "transmission/reception antenna 1 labeled x805_1 to transmission/reception antenna m labeled x805_*m***", and confirm whether a signal is detected. Note that i is an integer from 1 to g (both inclusive).

When detecting a signal, the gNB and NR-UE do not transmit a modulation signal using the parameter at that time. When detecting no signal, the gNB and NR-UE can transmit a modulation signal using the parameter at that time.

For example, the gNB and NR-UE perform receive beamforming (reception directivity control) according to the first parameter by using one or more of "transmission/reception antenna 1 labeled x805_1 to transmission/reception antenna m labeled x805_*m***", and confirm whether a signal is detected.

When detecting a signal, the gNB and NR-UE do not transmit a modulation signal using the first parameter. When detecting no signal, the gNB and NR-UE can transmit a modulation signal using the first parameter.

For example, the gNB and NR-UE perform receive beamforming (reception directivity control) according to the fifth parameter by using one or more of "transmission/reception antenna 1 labeled x805_1 to transmission/reception antenna m labeled x805_*m***", and confirm whether a signal is detected.

When detecting a signal, the gNB and NR-UE do not transmit a modulation signal using the fifth parameter. When detecting no signal, the gNB and NR-UE can transmit a modulation signal using the fifth parameter.

Similar processing is performed for beamforming parameters in the other reception periods.

Note that the gNB and NR-UE may perform the omni-directional LBT and directional LBT processing. The methods of the omni-directional LBT and directional LBT processing are not limited to the above example.

Exemplary methods of performing LBT have been described above.

In terms of LBT, the following areas may be considered.

Area (or country) where LBT is not performed

Area (or country) where LBT may be performed

Area (or country) where LBT is necessary

In this case, the following two modes are preferably included in an NR apparatus such as gNB and NR-UE.

"LBT mode" to perform LBT

"No-LBT mode" not to perform LBT

An NR apparatus in the "LBT mode" performs LBT before transmitting a modulation signal.

An NR apparatus in the "no-LBT mode" transmits a modulation signal without performing LBT.

Note that the following three types of NR apparatuses may, for example, be present.

NR apparatus with both "LBT mode" and "no-LBT mode"

NR apparatus with "LBT mode"

NR apparatus with "no-LBT mode" (NR apparatus without LBT function)

A case where an NR apparatus performs LBT and does not transmit a modulation signal causes a problem of reduced data transmission efficiency because the communication with a communication counterpart is stalled. When an NR apparatus transmits a modulation signal without performing LBT, another apparatus is possibly present and interfered with. This causes a problem of reduced data reception quality for the own apparatus and/or another apparatus.

To address the problems, the present invention provides a communication apparatus and a communication method for improving data reception quality of the NR apparatus and/or another apparatus.

An exemplary method on the OFDM method will be described below. For example, 120 kHz, 240 kHz, 480 kHz, and 960 kHz are supported as subcarrier spacing (SCS), and an NR apparatus selects any of "SCS of 120 kHz", "SCS of 240 kHz", "SCS of 480 kHz", and "SCS of 960 kHz" and performs transmission and/or reception of a modulation signal of the selected SCS value.

In this case, a system can be configured in which the time length of an OFDM symbol varies depending on the SCS value.

For example, when the NR apparatus selects the SCS of 960 kHz, the time length of the OFDM symbol is 7.2 micro (p) seconds.

In this case, when the NR apparatus selects the SCS of 480 kHz, the time length of the OFDM symbol is 14.4 micro (p) seconds.

When the NR apparatus selects the SCS of 240 kHz, the time length of the OFDM symbol is 28.8 micro (p) seconds.

When the NR apparatus selects the SCS of 120 kHz, the time length of the OFDM symbol is 57.6 micro (p) seconds.

As described above, the case of applying OFDM in which the time length of an OFDM symbol is shorter as the SCS value is greater will be considered. Note that the SCS values and the values of the time length of an OFDM symbol are merely examples and not limited to these values.

Figure 15:
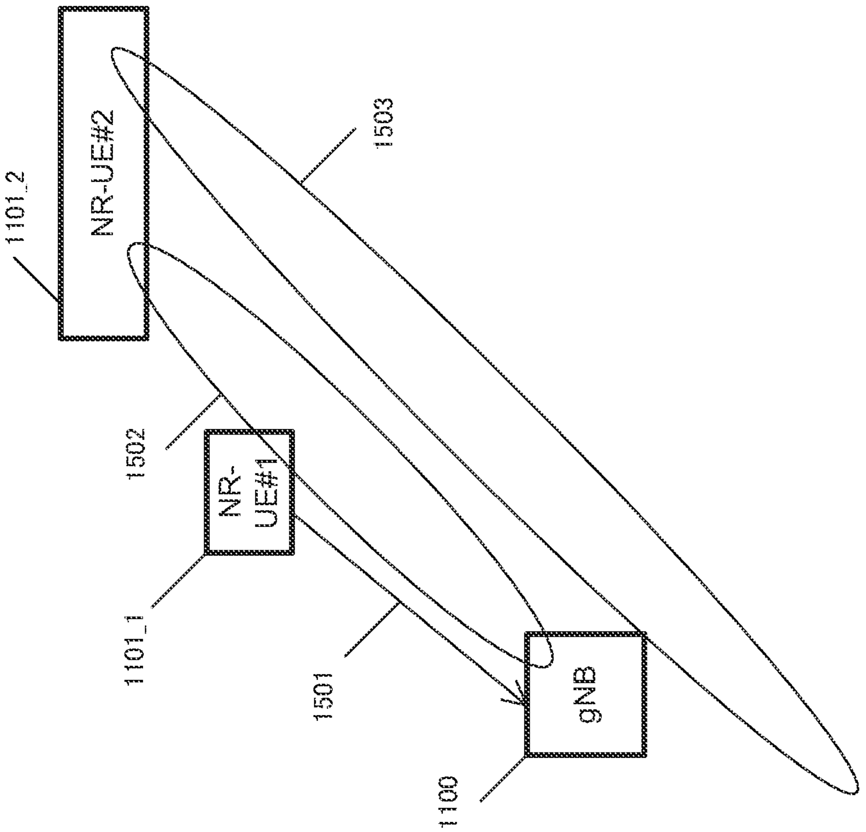
FIG. 15 illustrates a specific example of a communication state.

FIG. 15 illustrates a specific example of a communication state. Note that, in FIG. 15, the components that operate in the same manner as in FIG. 11 are denoted by the same reference signs, and the descriptions thereof will be omitted.

For example, NR-UE #1 labeled 1101_1 in FIG. 15 transmits a modulation signal to gNB 1100 (1501).

For example, gNB 1100 transmits a modulation signal to NR-UE #1 labeled 1101_1 using transmit beam 1502.

At this time, transmit beam 1502 reaches NR-UE #2 labeled 1101_2, and transmit beam 1502 interferes with NR-UE #2 labeled 1101_2. Thus, NR-UE #2 labeled 1101_2 may perform LBT before transmitting a modulation signal using transmit beam 1503.

Meanwhile, gNB 1100 performs LBT before transmitting a modulation signal using transmit beam 1502 and controls the transmission of the modulation signal using transmit beam 1502. At this time, when gNB 1100 does not transmit the modulation signal using transmit beam 1502 based on the result of LBT, the data transmission efficiency is reduced.

Figure 16A:
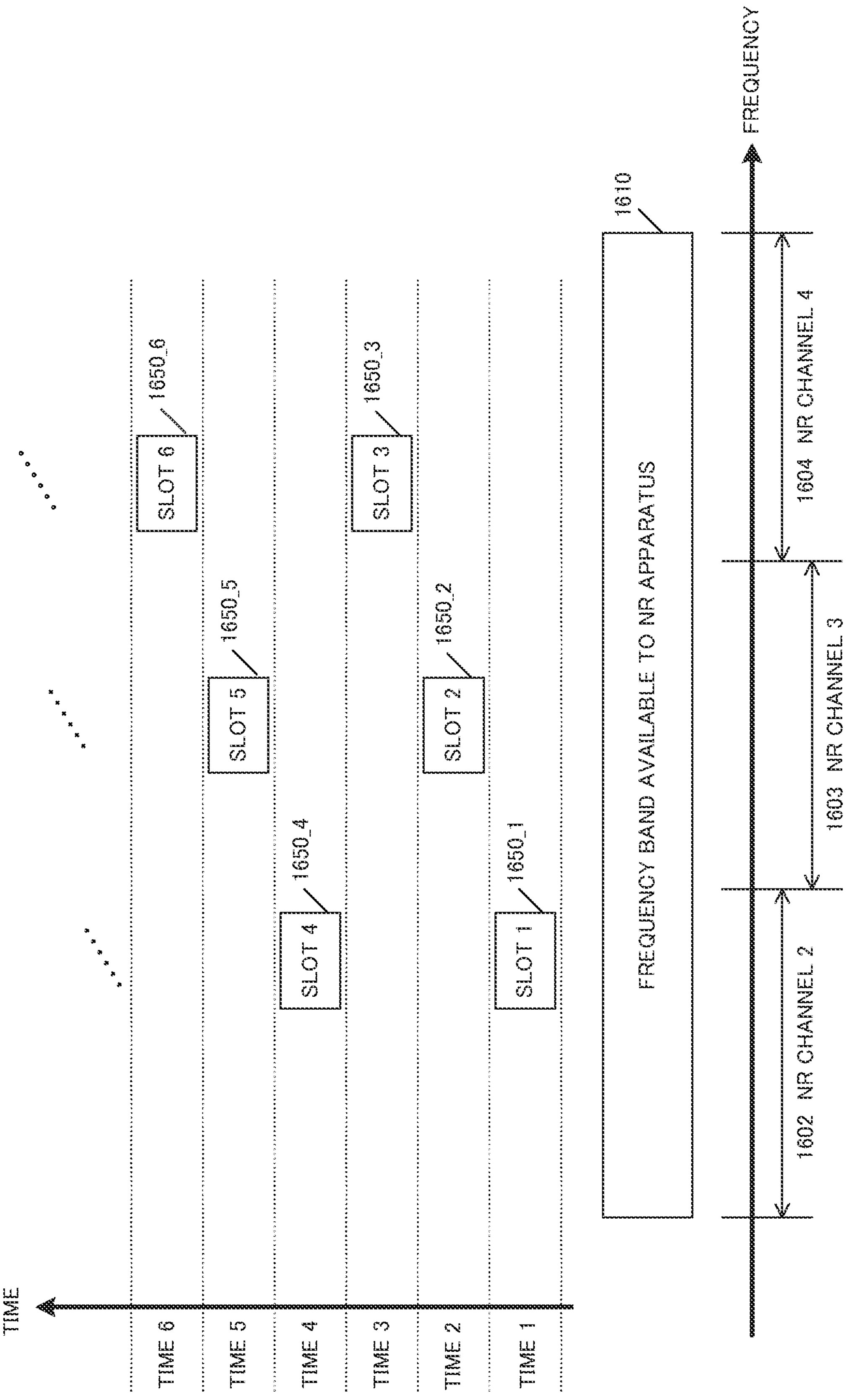
FIG. 16A illustrates an exemplary configuration of slots for a modulation signal transmitted by gNB.

FIG. 16A illustrates a communication method to address these issues.

FIG. 16A illustrates, for example, an exemplary configuration of slots for a modulation signal transmitted by gNB 1100 in FIG. 15, and the horizontal axis represents frequency while the vertical axis represents time.

As illustrated in FIG. 16A, NR channel 2 labeled 1602, NR channel 3 labeled 1603, and NR channel 4 labeled 1604 are present for the frequency axis. In FIG. 16A, for example. "frequency band 1610 used by an NR apparatus" is present, and gNB 1100 in FIG. 15 transmits a modulation signal using "frequency band 1610 used by an NR apparatus", for example. Note that, in the example of FIG. 16A, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 16A, gNB 1100 transmits a modulation signal to a communication counterpart such as NR-UE #1 labeled 1101_1 in FIG. 15, for example, in the following manner: at time 1, gNB 1100 transmits a modulation signal in slot 1 labeled 1650_1 included in NR channel 2 labeled 1602, at time 2, gNB 1100 transmits a modulation signal in slot 2 labeled 1650_2 included in NR channel 3 labeled 1603; at time 3, gNB 1100 transmits a modulation signal in slot 3 labeled 1650_3 included in NR channel 4 labeled 1604; at time 4, gNB 1100 transmits a modulation signal in slot 4 labeled 1650_4 included in NR channel 2 labeled 1602; at time 5, gNB 1100 transmits a modulation signal in slot 5 labeled 1650_5 included in NR channel 3 labeled 1603; at time 6, gNB 1100 transmits a modulation signal in slot 6 labeled 1650_6 included in NR channel 4 labeled 1604, and so forth.

gNB 1100 transmits these modulation signals subjected to frequency hopping (FH) as in the example of FIG. 16A. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4". "slot 5 labeled 1650_5", "slot 6 labeled 1650_6", and so forth.

For example, the frequency of "slot 1 labeled 1650_1" and the frequency of "slot 4 labeled 1650_4" may be the same or overlapped partially.

Likewise, the frequency of "slot 2 labeled 1650_2" and the frequency of "slot 5 labeled 1650_5" may, for example, be the same or overlapped partially.

For example, the frequency of "slot 3 labeled 1650_3" and the frequency of "slot 6 labeled 1650_6" may be the same or overlapped partially.

Note that, although not illustrated in FIG. 16A, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

Figure 16B:
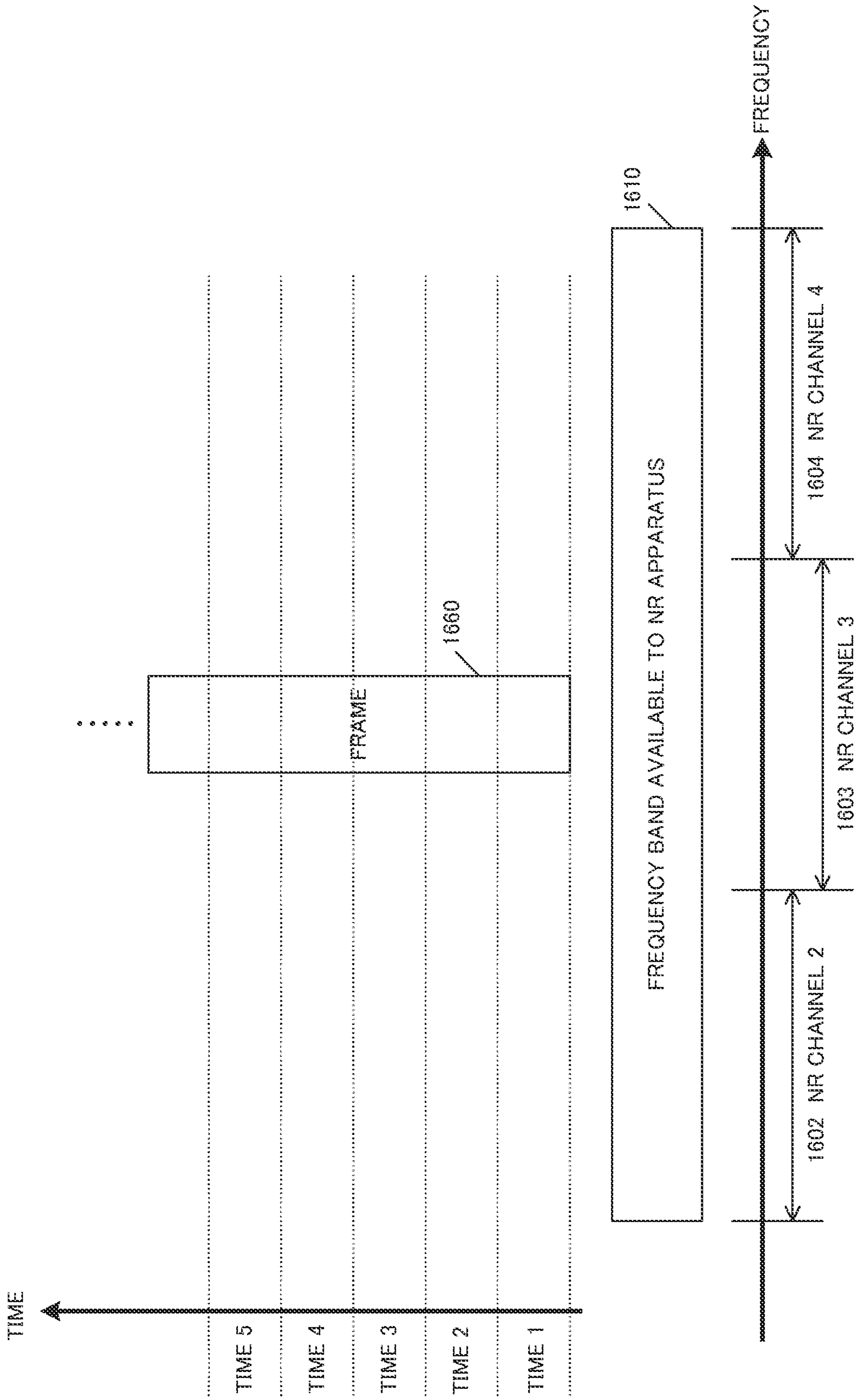
FIG. 16B illustrates an exemplary configuration of slots for a modulation signal transmitted by gNB.

FIG. 16B illustrates, for example, an exemplary configuration of a frame for a modulation signal transmitted by gNB 1100 in FIG. 15, and the horizontal axis represents frequency while the vertical axis represents time. Note that, in FIG. 16B, components that operate in the same manner as in FIG. 16A are denoted by the same reference signs.

As illustrated in FIG. 16B, NR channel 2 labeled 1602, NR channel 3 labeled 1603, and NR channel 4 labeled 1604 are present for the frequency axis. In FIG. 16B, for example, "frequency band 1610 used by an NR apparatus" is present, and gNB 1100 in FIG. 15 transmits a modulation signal using "frequency band 1610 used by an NR apparatus", for example. Note that, in the example of FIG. 16B, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 16B, gNB 1100 transmits a modulation signal to a communication counterpart such as NR-UE #1 labeled 1101_1 in FIG. 15, for example, in the following manner.

At time 1, time 2, time 3, time 4, time 5, and so forth, gNB 1100 transmits a modulation signal in frame 1660 included in NR channel 3 labeled 1603.

Note that frame 1660 includes data to be transmitted to NR-UE #1 being the communication counterpart labeled 1101_1.

Note that, although not illustrated in FIG. 16B, the modulation signal transmitted by gNB 1100 may include a frame, symbol, slot, etc. other than "frame 1660" addressed to NR-UE #1 labeled 1101_1.

In FIG. 15, it is assumed that gNB 1100 transmits a modulation signal in frame 1660 as in FIG. 16B using transmit beam 1502.

Then, NR-UE #2 labeled 1101_2 detects transmit beam 1502 transmitted by gNB 1100, and NR-UE #2 labeled 1101_2 detects a signal when performing LBT on the frequency in which frame 1660 in NR channel 3 labeled 1603 in FIG. 16B is present. Thus, NR-UE #2 labeled 1101_2 does not transmit a modulation signal using transmit beam 1503 in FIG. 15 for the frequency in which frame 1600 in NR channel 3 labeled 1603 in FIG. 16B is present. This reduces the data transmission efficiency of the system.

In addition, when NR-UE #2 labeled 1101_2 transmits a modulation signal using transmit beam 1503 in FIG. 15 without performing LBT on the frequency in which frame 1600 in NR channel 3 labeled 1603 in FIG. 16B is present, another apparatus may be interfered with. This reduces the transmission efficiency of the system.

Meanwhile, in FIG. 15, it is assumed that gNB 1100 transmits modulation signals in "slot 1 labeled 1650_1, slot 2 labeled 1650_2, slot 3 labeled 1650_3, slot 4 labeled 1650_4, slot 5 labeled 1650_5, slot 6 labeled 1650_6, and so forth" as in FIG. 16A using transmit beam 1502.

When the modulation signals are transmitted in this manner, the situation will be any of "a case where the modulation signals are present in NR channel 2 labeled 1602", "a case where the modulation signals are present in NR channel 3 labeled 1603", and "a case where the modulation signals are present in NR channel 4 labeled 1604" in FIG. 16A, and the frequencies (channels) in which the modulation signals are present are temporally distributed.

When gNB 1100 transmits a modulation signal using NR channel 3 labeled 1603 as in FIG. 16B and NR-UE #2 labeled 1101_2 in FIG. 15 uses NR channel 3 labeled 1603, interference possibly occurs. This may significantly reduce the data transmission efficiency. In contrast, when gNB 1100 transmits a modulation signal using FH with a plurality of NR channels such as "NR channel 2 labeled 1602", "NR channel 3 labeled 1603", and "NR channel 4 labeled 1604" as in FIG. 16A, gNB 1100) does not occupy a fixed NR channel. Thus, gNB 1100 is less likely to interfere with another apparatus, thereby increasing the probability of preventing reduction in data transmission efficiency.

Next, a description will be given of an exemplary operation of an NR apparatus in the "area (or country) where LBT is not performed".

In the "area (or country) where LBT is not performed", LBT is not performed before an NR apparatus transmits a modulation signal. For example, an NR apparatus with both the "LBT mode" and "no-LBT mode" operates the "no-LBT mode". In the "area (or country) where LBT is not performed", an NR apparatus with "no-LBT mode" and an NR apparatus without an LBT function may be present.

In this case, such NR apparatuses may transmit modulation signals by the communication method using FH as in the example of FIG. 16A (not limited to the example of FIG. 16A, however) as one of modes that are less likely to cause interference to another apparatus. Note that such NR apparatuses may include a mode of transmitting a modulation signal by a communication method using FH other than that in FIG. 16A, or may include a mode of transmitting a modulation signal without performing FH. A variation of the "communication method using FH as in the example of FIG. 16A" that is less likely to cause interference to another apparatus will be described later.

Next, a description will be given of an exemplary operation of an NR apparatus in the "area (or country) where LBT may be performed".

In the "area (or country) where LBT may be performed", an NR apparatus may "perform LBT" or may "not perform LBT" before transmitting a modulation signal.

When an NR apparatus with both the "LBT mode" and "no-LBT mode" performs LBT, the NR apparatus operates the "LBT mode" and performs LBT before transmitting a modulation signal.

Meanwhile, when an NR apparatus with both the "LBT mode" and "no-LBT mode" does not perform LBT, the "no-LBT mode" is operated, and at this time, applying a communication method that causes less interference to another apparatus improves the data transmission efficiency of the system. Thus, the NR apparatus may transmit a modulation signal by the communication method using FH as in the example of FIG. 16A (not limited to the example of FIG. 16A, however) as one of methods of the "no-LBT mode".

Note that the NR apparatus with both the "LBT mode" and "no-LBT mode" may include a mode of transmitting a modulation signal by a communication method using FH other than in FIG. 16A, or may include a mode of transmitting a modulation signal without performing FH. A variation of the "communication method using FH as in the example of FIG. 16A" that causes less interference to another apparatus will be described later.

In the "area (or country) where LBT may be performed", an NR apparatus with "no-LBT mode" and an NR apparatus without an LBT function may be present. In this case, such NR apparatuses may transmit modulation signals by the communication method using FH as in the example of FIG. 16A (not limited to the example of FIG. 16A, however). This reduces interference to another apparatus and produces an effect of improving data transmission efficiency of the system.

Note that such NR apparatuses may include a mode of transmitting a modulation signal by a communication method using FH other than in FIG. 16A, or may include a mode of transmitting a modulation signal without performing FH. A variation of the "communication method using FH as in the example of FIG. 16A" that causes less interference to another apparatus will be described later.

In the "area (or country) where LBT is necessary", an NR apparatus "performs LBT" before transmitting a modulation signal. In this case, the "LBT mode" is operated in the NR apparatus.

At this time, the NR apparatus performs LBT before transmitting a modulation signal, and when determining that the modulation signal can be transmitted, the NR apparatus may transmit modulation signals by the communication method using FH as in the example of FIG. 16A (not limited to the example of FIG. 16A, however). This reduces interference to another apparatus and produces an effect of improving data transmission efficiency of the system.

Note that the NR apparatus may include a mode of transmitting a modulation signal by a communication method using FH other than that in FIG. 16A, or may include a mode of transmitting a modulation signal without performing FH. A variation of the "communication method using FH as in the example of FIG. 16A" that causes less interference to another apparatus will be described later.

Figure 16C:
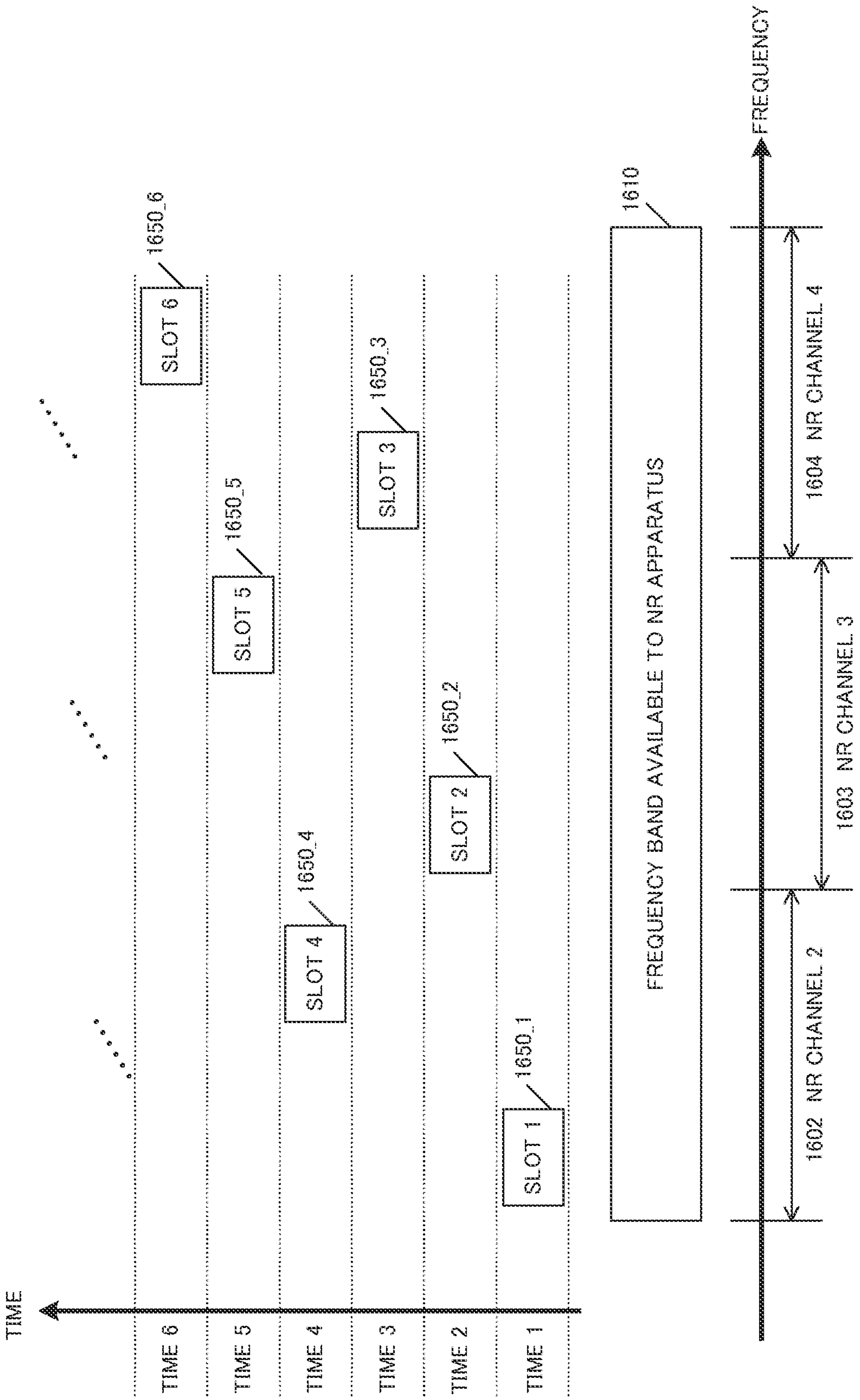
FIG. 16C illustrates an exemplary configuration of slots for a modulation signal transmitted by gNB.
Figure 16D:
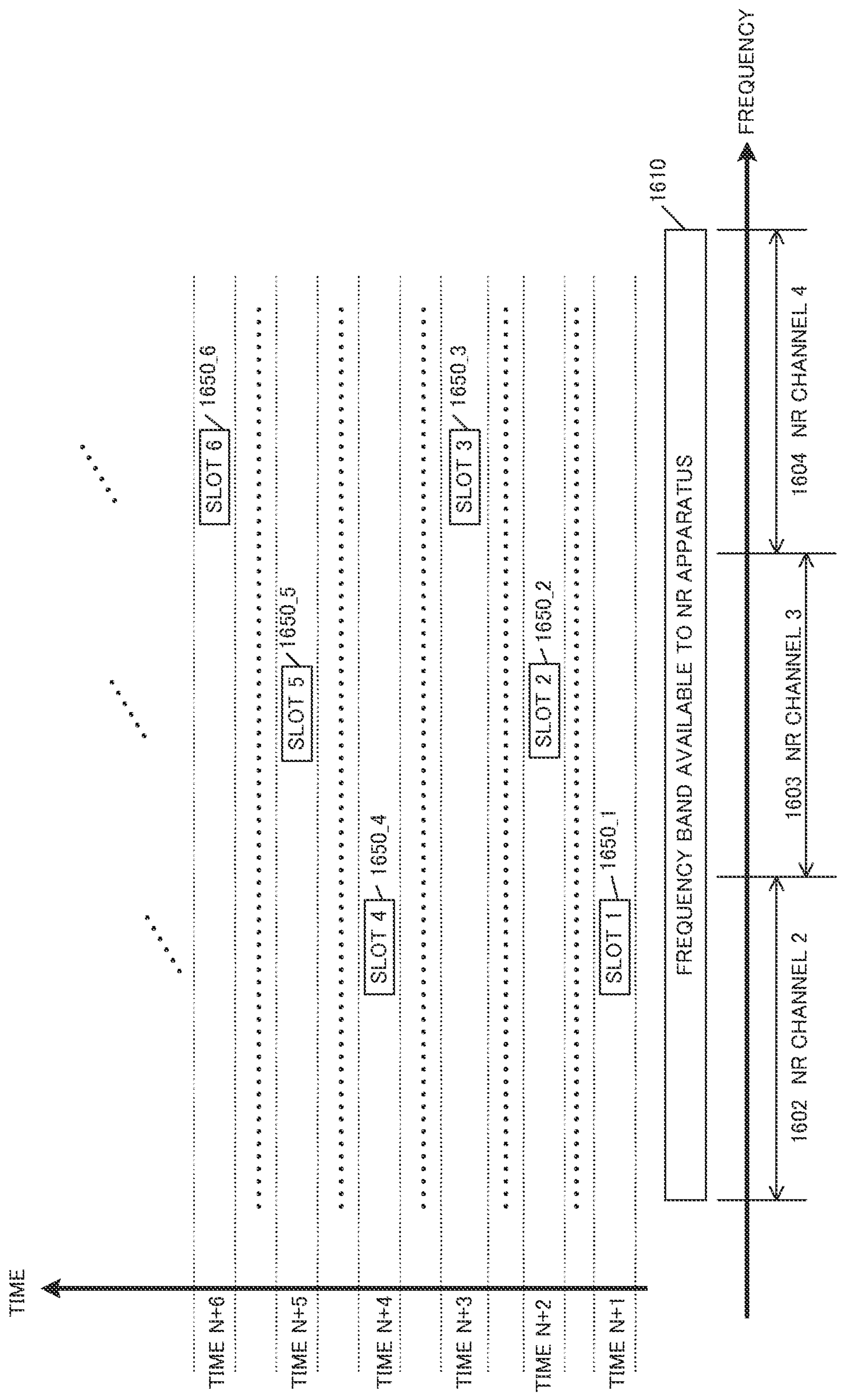
FIG. 16D illustrates an exemplary configuration of slots for a modulation signal transmitted by gNB.
Figure 16E:
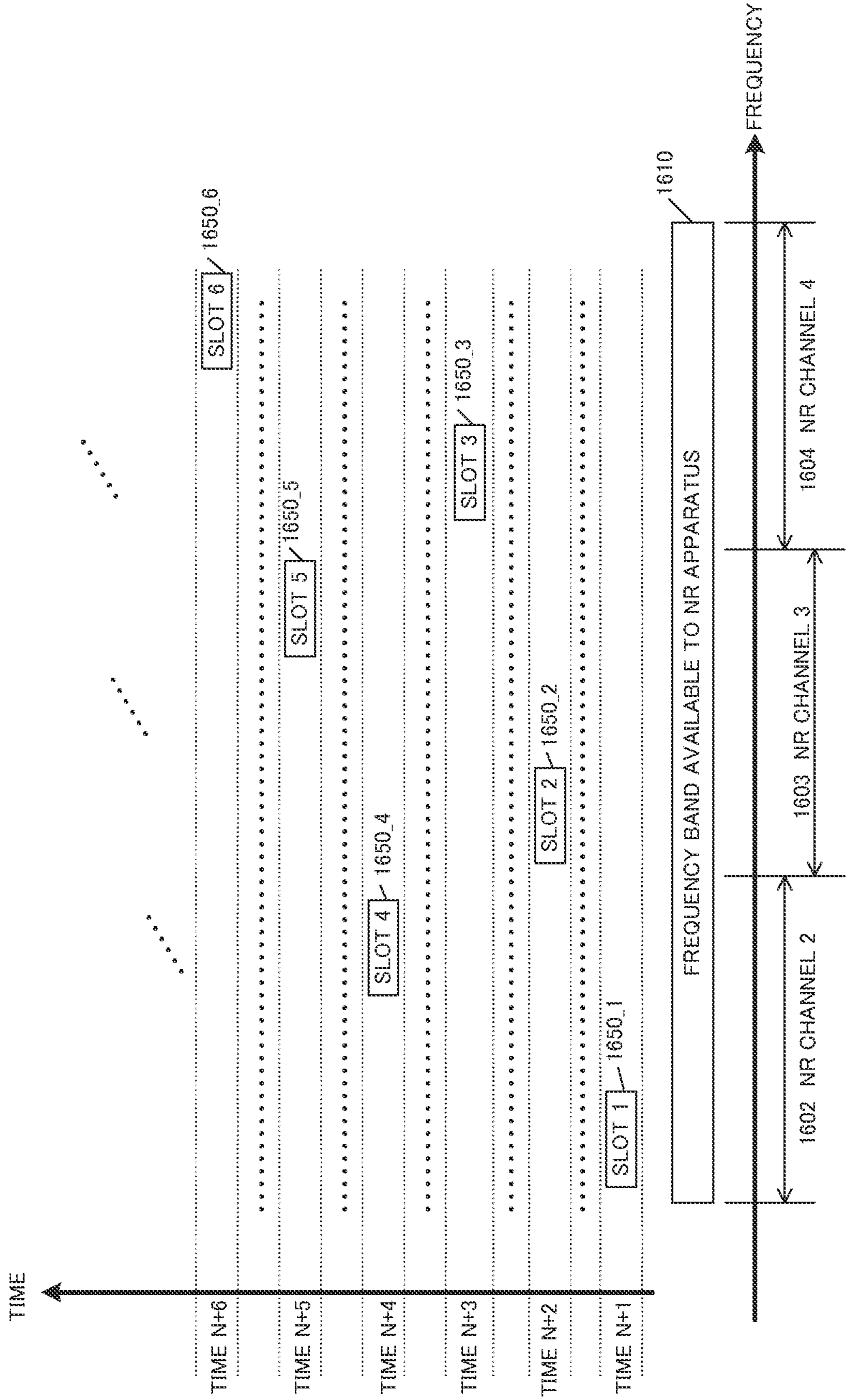
FIG. 16E illustrates an exemplary configuration of slots for a modulation signal transmitted by gNB.

The variation of the "communication method using FH as in the example of FIG. 16A" that causes less interference to another apparatus includes communication methods using FH in FIGS. 16C, 16D, and 16E.

FIG. 16C illustrates, for example, an exemplary configuration of slots for a modulation signal transmitted by gNB 1100 in FIG. 15, and the horizontal axis represents frequency while the vertical axis represents time. Note that, in FIG. 16C, components that operate in the same manner as in FIG. 16A are denoted by the same reference signs, and the description thereof will be partially omitted.

As illustrated in FIG. 16C, NR channel 2 labeled 1602. NR channel 3 labeled 1603, and NR channel 4 labeled 1604 are present for the frequency axis. In FIG. 16C, for example, "frequency band 1610 used by an NR apparatus" is present, and gNB 1100 in FIG. 15 transmits a modulation signal using "frequency band 1610 used by an NR apparatus", for example. Note that, in the example of FIG. 16C, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 16C, gNB 1100 transmits a modulation signal to a communication counterpart such as NR-UE #1 labeled 1101_1 in FIG. 15, for example, in the following manner: at time 1, gNB 1100 transmits a modulation signal in slot 1 labeled 1650_1 included in NR channel 2 labeled 1602; at time 2, gNB 1100 transmits a modulation signal in slot 2 labeled 1650_2 included in NR channel 3 labeled 1603; at time 3, gNB 1100 transmits a modulation signal in slot 3 labeled 1650_3 included in NR channel 4 labeled 1604; at time 4, gNB 1100 transmits a modulation signal in slot 4 labeled 1650_4 included in NR channel 2 labeled 1602, at time 5, gNB 1100 transmits a modulation signal in slot 5 labeled 1650_5 included in NR channel 3 labeled 1603; at time 6, gNB 1100 transmits a modulation signal in slot 6 labeled 1650_6 included in NR channel 4 labeled 1604, and so forth.

gNB 1100 transmits these modulation signals subjected to FH as in the example of FIG. 16C. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

As in the example of FIG. 16C, the frequency of "slot 1 labeled 1650_1" and the frequency of "slot 4 labeled 1650_4" included in NR channel 2 labeled 1602 may be configured to be different from each other, i.e., configured not to be overlapped.

In addition, the frequency of "slot 2 labeled 1650_2" and the frequency of "slot 5 labeled 1650_5" included in NR channel 3 labeled 1603 may be configured to be different from each other, i.e., configured not to be overlapped.

Further, the frequency of "slot 3 labeled 1650_3" and the frequency of "slot 6 labeled 1650_6" included in NR channel 4 labeled 1604 may be configured to be different from each other, i.e., configured not to be overlapped.

Alternatively, as in the example of FIG. 16A, the frequency of "slot 1 labeled 1650_1" and the frequency of "slot 4 labeled 1650_4" included in NR channel 2 labeled 1602 may be configured to be the same or overlapped partially.

In addition, the frequency of "slot 2 labeled 1650_2" and the frequency of "slot 5 labeled 1650_5" included in NR channel 3 labeled 1603 may be configured to be the same or overlapped partially.

Further, the frequency of "slot 3 labeled 1650_3" and the frequency of "slot 6 labeled 1650_6" included in NR channel 4 labeled 1604 may be configured to be the same or overlapped partially.

Note that, although not illustrated in FIG. 16C, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

FIG. 16D illustrates, for example, an exemplary configuration of slots for a modulation signal transmitted by gNB 1100 in FIG. 15, and the horizontal axis represents frequency while the vertical axis represents time. Note that, in FIG. 16D, components that operate in the same manner as in FIG. 16A are denoted by the same reference signs, and the description thereof will be partially omitted.

As illustrated in FIG. 16D, NR channel 2 labeled 1602, NR channel 3 labeled 1603, and NR channel 4 labeled 1604 are present for the frequency axis. In FIG. 16D, for example, "frequency band 1610 used by an NR apparatus" is present, and gNB 1100 in FIG. 15 transmits a modulation signal using "frequency band 1610 used by an NR apparatus", for example. Note that, in the example of FIG. 16D, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 16D, gNB 1100 transmits a modulation signal to a communication counterpart such as NR-UE #1 labeled 1101_1 in FIG. 15, for example, in the following manner: at time N+1, gNB 1100 transmits a modulation signal in slot 1 labeled 1650_1 included in NR channel 2 labeled 1602; at time N+2, gNB 1100 transmits a modulation signal in slot 2 labeled 1650_2 included in NR channel 3 labeled 1603; at time N+3, gNB 1100 transmits a modulation signal in slot 3 labeled 1650_3 included in NR channel 4 labeled 1604; at time N+4, gNB 1100 transmits a modulation signal in slot 4 labeled 1650_4 included in NR channel 2 labeled 1602; at time N+5, gNB 1100 transmits a modulation signal in slot 5 labeled 1650_5 included in NR channel 3 labeled 1603; at time N+6, gNB 1100 transmits a modulation signal in slot 6 labeled 1650_6 included in NR channel 4 labeled 1604, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present between time N+i and time N+i+1. Here, N is an integer equal to or greater than 0, and i is an integer equal to or greater than 1.

gNB 1100 transmits these modulation signals subjected to FH as in the example of FIG. 16D. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5". "slot 6 labeled 1650_6", and so forth.

For example, the frequency of "slot 1 labeled 1650_1" and the frequency of "slot 4 labeled 1650_4" may be the same or overlapped partially.

Likewise, the frequency of "slot 2 labeled 1650_2" and the frequency of "slot 5 labeled 1650_5" may be the same or overlapped partially.

For example, the frequency of "slot 3 labeled 1650_3" and the frequency of "slot 6 labeled 1650_6" may be the same or overlapped partially.

Note that, although not illustrated in FIG. 16D, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

FIG. 16E illustrates, for example, an exemplary configuration of slots for a modulation signal transmitted by gNB 1100 in FIG. 15, and the horizontal axis represents frequency while the vertical axis represents time. Note that, in FIG. 16E, components that operate in the same manner as in FIG. 16A are denoted by the same reference signs, and the description thereof will be partially omitted.

As illustrated in FIG. 16E, NR channel 2 labeled 1602, NR channel 3 labeled 1603, and NR channel 4 labeled 1604 are present for the frequency axis. In FIG. 16E, for example, "frequency band 1610 used by an NR apparatus" is present, and gNB 1100 in FIG. 15 transmits a modulation signal using "frequency band 1610 used by an NR apparatus", for example. Note that, in the example of FIG. 16E, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 16E, gNB 1100 transmits a modulation signal to a communication counterpart such as NR-UE #1 labeled 1101_1 in FIG. 15, for example, in the following manner: at time N+1, gNB 1100 transmits a modulation signal in slot 1 labeled 1650_1 included in NR channel 2 labeled 1602, at time N+2, gNB 1100 transmits a modulation signal in slot 2 labeled 1650_2 included in NR channel 3 labeled 1603; at time N+3, gNB 1100 transmits a modulation signal in slot 3 labeled 1650_3 included in NR channel 4 labeled 1604; at time N+4, gNB 1100 transmits a modulation signal in slot 4 labeled 1650_4 included in NR channel 2 labeled 1602; at time N+5, gNB 1100 transmits a modulation signal in slot 5 labeled 1650_5 included in NR channel 3 labeled 1603, at time N+6, gNB 1100 transmits a modulation signal in slot 6 labeled 1650_6 included in NR channel 4 labeled 1604, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present between time N+i and time N+i+1. Here, N is an integer equal to or greater than 0, and i is an integer equal to or greater than 1.

gNB 1100 transmits these modulation signals subjected to FH as in the example of FIG. 16E. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5". "slot 6 labeled 1650_6", and so forth.

As in the example of FIG. 16E, the frequency of "slot 1 labeled 1650_1" and the frequency of "slot 4 labeled 1650_4" included in NR channel 2 labeled 1602 may be configured to be different from each other, i.e., configured not to be overlapped.

In addition, the frequency of "slot 2 labeled 1650_2" and the frequency of "slot 5 labeled 1650_5" included in NR channel 3 labeled 1603 may be configured to be different from each other, i.e., configured not to be overlapped.

Further, the frequency of "slot 3 labeled 1650_3" and the frequency of "slot 6 labeled 1650_6" included in NR channel 4 labeled 1604 may be configured to be different from each other, i.e., configured not to be overlapped.

Note that, although not illustrated in FIG. 16E, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

Although exemplary slot arrangements for FH have been described above with reference to FIGS. 16A, 16C, 16D, and 16E, the slot arrangement method of the present disclosure is not limited to these examples, and slots may be arranged or configured using two or more slot arrangement/configuration methods of the "slot arrangement/configuration method in FIG. 16A", the "slot arrangement/configuration method in FIG. 16C", the "slot arrangement/configuration method in FIG. 16D", and the "slot arrangement/configuration method in FIG. 16E", for example.

In FIGS. 16A, 16C, 16D, and 16E, for example, the slots are arranged on the time axis in the order of "NR channel 2 labeled 1602", "NR channel 3 labeled 1603", "NR channel 4 labeled 1604", "NR channel 2 labeled 1602", "NR channel 3 labeled 1603", "NR channel 4 labeled 1604", and so forth, but the slot arrangement is not limited to this. For example, the order of NR channels to which the slots belong is not limited to this example.

Further, as long as FH is performed such that slots are placed in any of "NR channel 2 labeled 1602", "NR channel 3 labeled 1603", and "NR channel 4 labeled 1604" on the time axis, and the NR channels to which the slots belong are switched as time passes, the same as the above description can be implemented and the same effects can be obtained as well.

Further, in the cases of FIGS. 16A, 16C, 16D, and 16E, the number of NR channels to which the slots belong is three, which are "NR channel 2 labeled 1602, NR channel 3 labeled 1603, and NR channel 4 labeled 1604", but the present disclosure is not limited to this, and the same as the above description can be implemented and the same effects can be obtained as long as the number of NR channels to which the slots belong in FH is two or more.

Thus, a method of using time and frequency in FH in transmitting a modulation signal by gNB is not limited to the examples of FIGS. 16A, 16C, 16D, and 16E, and the number of NR channels to which slots belong in FH only needs to be two or more.

As in FIGS. 16D and 16E, slot i is present in time N+i. (N is an integer equal to or greater than 0, and i is an integer equal to or greater than 1.)

For example, slot h is present in time N+h, slot (h+1) is present in time N+h+1, and slot (h+2) is present in time N+h+2. Note that h is an integer equal to or greater than 1.

In this case, when the NR channel to which slot h belongs and the NR channel to which slot (h+1) belongs are different from each other, and the NR channel to which slot (h+1) belongs and the NR channel to which slot (h+2) belongs are different from each other, less interference is caused and the probability of preventing reduction in data transmission efficiency is increased.

In the following, a description will be given of exemplary slot arrangement on the frequency and time axes other than those in "FIGS. 16A, 16C, 16D, and 16E".

Figure 16F:
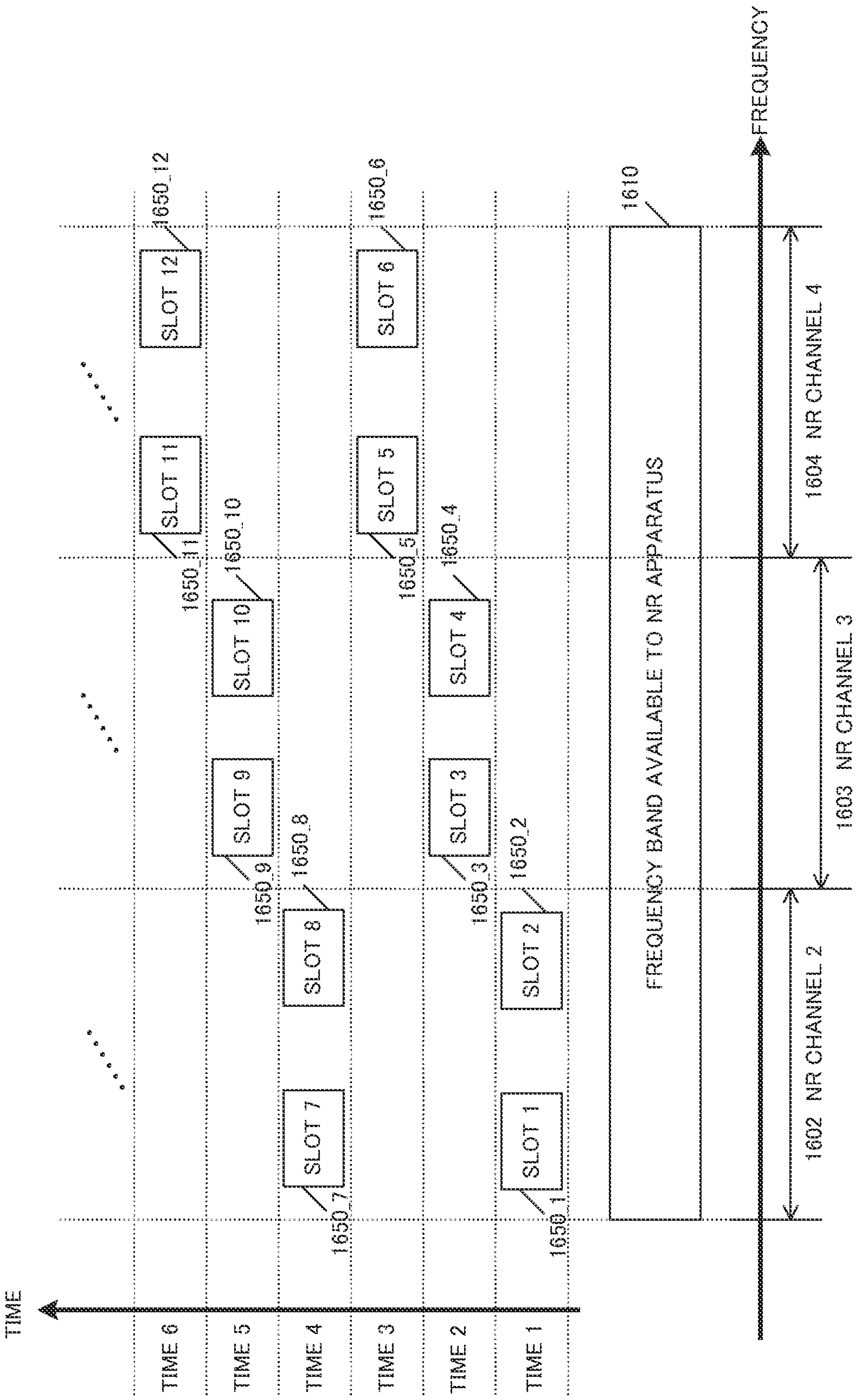
FIG. 16F illustrates an exemplary configuration of slots for a modulation signal transmitted by gNB.

FIG. 16F illustrates, for example, an exemplary configuration of slots for a modulation signal transmitted by gNB 1100 in FIG. 15, and the horizontal axis represents frequency while the vertical axis represents time. Note that, in FIG. 16F, components that operate in the same manner as in FIG. 16A are denoted by the same reference signs, and the description thereof will be partially omitted.

As illustrated in FIG. 16F, NR channel 2 labeled 1602. NR channel 3 labeled 1603, and NR channel 4 labeled 1604 are present for the frequency axis. In FIG. 16F, for example, "frequency band 1610 used by an NR apparatus" is present, and gNB 1100 in FIG. 15 transmits a modulation signal using "frequency band 1610 used by an NR apparatus", for example. Note that, in the example of FIG. 16F, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 16F, gNB 1100 transmits modulation signals to a communication counterpart such as NR-UE #1 labeled 1101_1 in FIG. 15, for example, in the following manner: at time 1, gNB 1100 transmits modulation signals in "slot 1 labeled 1650_1 and slot 2 labeled 1650_2" included in NR channel 2 labeled 1602; at time 2, gNB 1100 transmits modulation signals in "slot 3 labeled 1650_3 and slot 4 labeled 1650_4" included in NR channel 3 labeled 1603; at time 3, gNB 1100 transmits modulation signals in "slot 5 labeled 1650_5 and slot 6 labeled 1650_6" included in NR channel 4 labeled 1604; at time 4, gNB 1100 transmits modulation signals in "slot 7 labeled 1650_7 and slot 8 labeled 1650_8" included in NR channel 2 labeled 1602; at time 5, gNB 1100 transmits modulation signals in "slot 9 labeled 1650_9 and slot 10 labeled 1650_10" included in NR channel 3 labeled 1603; at time 6, gNB 1100 transmits modulation signals in "slot 11 labeled 1650_11 and slot 12 labeled 1650_12" included in NR channel 4 labeled 1604, and so forth.

The gNB transmits these modulation signals subjected to FH as in the example of FIG. 16F. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

In the example of FIG. 16F, "slot 1 labeled 1650_1 and slot 2 labeled 1650_2" are present at time 1, and "slot 1 labeled 1650_1 and slot 2 labeled 1650_2" are present in NR channel 2 labeled 1602.

In addition, "slot 3 labeled 1650_3 and slot 4 labeled 16504" are present at time 2, and "slot 3 labeled 1650_3 and slot 4 labeled 16504" are present in NR channel 3 labeled 1603.

"Slot 5 labeled 1650_5 and slot 6 labeled 1650_6" are present at time 3, and "slot 5 labeled 1650_5 and slot 6 labeled 1650_6" are present in NR channel 4 labeled 1604.

"Slot 7 labeled 1650_7 and slot 8 labeled 1650_8" are present at time 4, and "slot 7 labeled 1650_7 and slot 8 labeled 1650_8" are present in NR channel 2 labeled 1602.

"Slot 9 labeled 1650_9 and slot 10 labeled 1650_10" are present at time 5, and "slot 9 labeled 1650_9 and slot 10 labeled 1650_10" are present in NR channel 3 labeled 1603.

"Slot 11 labeled 1650_11 and slot 12 labeled 1650_12" are present at time 6, and "slot 11 labeled 1650_11 and slot 12 labeled 1650_12" are present in NR channel 4 labeled 1604.

Features in FIG. 16F in this case are as follows.

A plurality of slots belonging to the first NR channel are present at the first time.

For example, "slot 1 labeled 1650_1 and slot 2 labeled 1650_2" (a plurality of slots) belonging to NR channel 2 labeled 1602 (the first NR channel) are present at time 1 (the first time).

Note that the above feature is found at time 2, time 3, and so forth.

FH is configured such that a plurality of slots that are present at the first time are present in the first NR channel and an NR channel to which plurality of slots belong is switched as time passes.

For example, "slot 1 labeled 1650_1 and slot 2 labeled 16502" (a plurality of slots) belonging to NR channel 2 labeled 1602 are present at time 1, and "slot 3 labeled 1650_3 and slot 4 labeled 1650_4" (a plurality of slots) belonging to NR channel 3 labeled 1603 are present at time 2.

Note that, although not illustrated in FIG. 16F, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1.

The above-described manner leads to the similar effects to those described in the examples of FIGS. 16A, 16C, 16D, and 16E.

Note that the slot arrangement method in the frequency and time domains is not limited to the example of FIG. 16F.

Also in FIG. 16F, the plurality of slots are arranged on the time axis in the order of "NR channel 2 labeled 1602", "NR channel 3 labeled 1603", "NR channel 4 labeled 1604", "NR channel 2 labeled 1602", "NR channel 3 labeled 1603", "NR channel 4 labeled 1604", and so forth, but the slot arrangement is not limited to this. For example, the order of NR channels to which the plurality of slots belong is not limited to this example.

For example, as long as FH is performed such that a plurality of slots are placed in any of "NR channel 2 labeled 1602", "NR channel 3 labeled 1603", and "NR channel 4 labeled 1604" on the time axis, and the NR channel to which the plurality of slots belong is switched as time passes, the same as the above description can be implemented and the same effects can be obtained as well.

Further, in the case of FIG. 16F, the number of NR channels to which the plurality of slots present at certain time belong is three, which are "NR channel 2 labeled 1602, NR channel 3 labeled 1603, and NR channel 4 labeled 1604", but the present disclosure is not limited to this, and the same as the above description can be implemented and the same effects can be obtained as long as the number of NR channels to which the plurality of slots belong in FH is two or more.

Thus, a method of using time and frequency in FH in transmitting a modulation signal by gNB is not limited to the example of FIG. 16F, and the number of NR channels to which a plurality of slots present at certain time belong in FH only needs to be one or more.

Figure 16G:
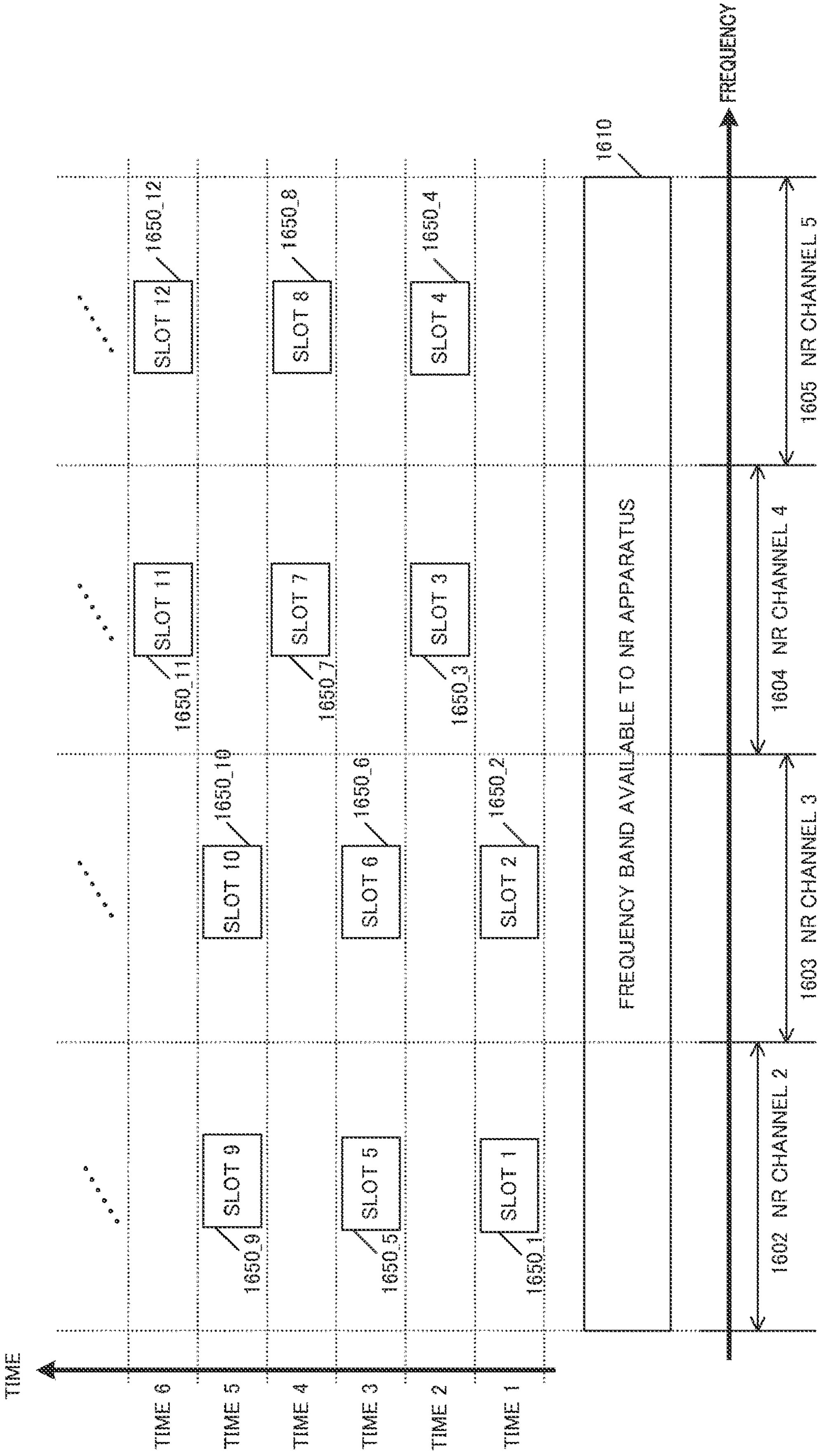
FIG. 16G illustrates an exemplary configuration of slots for a modulation signal transmitted by gNB.

FIG. 16G illustrates, for example, an exemplary configuration of slots for a modulation signal transmitted by gNB 1100 in FIG. 15, and the horizontal axis represents frequency while the vertical axis represents time. Note that, in FIG. 16G, components that operate in the same manner as in FIG. 16A are denoted by the same reference signs, and the description thereof will be partially omitted.

As illustrated in FIG. 16G, NR channel 2 labeled 1602, NR channel 3 labeled 1603, NR channel 4 labeled 1604, and NR channel 5 labeled 1605 are present for the frequency axis. In FIG. 16G, for example, "frequency band 1610 used by an NR apparatus" is present, and gNB 1100 in FIG. 15 transmits a modulation signal using "frequency band 1610 used by an NR apparatus", for example. Note that, in the example of FIG. 160, "frequency band 1610 used by an NR apparatus" includes "all or part of NR channel 2 labeled 1602", "all or part of NR channel 3 labeled 1603", "all or part of NR channel 4 labeled 1604", and "all or part of NR channel 5 labeled 1605".

Then, as illustrated in FIG. 16G, gNB 1100 transmits a modulation signal to a communication counterpart such as NR-UE #1 labeled 1101_1 in FIG. 15, for example, in the following manner: at time 1, gNB 1100 transmits modulation signals in slot 1 labeled 1650_1 included in NR channel 2 labeled 1602 and slot 2 labeled 1650_2 included in NR channel 3 labeled 1603; at time 2, gNB 1100 transmits modulation signals in slot 3 labeled 1650_3 included in NR channel 4 labeled 1604 and slot 4 labeled 1650_4 included in NR channel 5 labeled 1605; at time 3, gNB 1100 transmits modulation signals in slot 5 labeled 1650_5 included in NR channel 2 labeled 1602 and slot 6 labeled 1650_6 included in NR channel 3 labeled 1603; at time 4, gNB 1100 transmits modulation signals in slot 7 labeled 1650_7 included in NR channel 4 labeled 1604 and slot 8 labeled 1650_8 included in NR channel 5 labeled 1605; at time 5, gNB 1100 transmits modulation signals in slot 9 labeled 1650_9 included in NR channel 2 labeled 1602 and slot 10 labeled 1650_10 included in NR channel 3 labeled 1603, at time 6, gNB 1100 transmits modulation signals in slot 11 labeled 1650_11 included in NR channel 4 labeled 1604 and slot 12 labeled 1650_12 included in NR channel 5 labeled 1605, and so forth.

The gNB transmits these modulation signals subjected to FH as in the example of FIG. 16G. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

In the example of FIG. 16G, "slot 1 labeled 1650_1 and slot 2 labeled 1650_2" are present at time 1, slot 1 labeled 1650_1 is present in NR channel 2 labeled 1602, and slot 2 labeled 16502 is present in NR channel 3 labeled 1603.

In addition, "slot 3 labeled 1650_3 and slot 4 labeled 16504" are present at time 2, slot 3 labeled 1650_3 is present in NR channel 4 labeled 1604, and slot 4 labeled 1650_4 is present in NR channel 5 labeled 1605.

"Slot 5 labeled 1650_5 and slot 6 labeled 1650_6" are present at time 3, slot 5 labeled 1650_5 is present in NR channel 2 labeled 1602, and slot 6 labeled 1650_6 is present in NR channel 3 labeled 1603.

"Slot 7 labeled 1650_7 and slot 8 labeled 1650_8" are present at time 4, slot 7 labeled 16507 is present in NR channel 4 labeled 1604, and slot 8 labeled 1650_8 is present in NR channel 5 labeled 1605.

"Slot 9 labeled 1650_9 and slot 10 labeled 1650_10" are present at time 5, slot 9 labeled 1650_9 is present in NR channel 2 labeled 1602, and slot 10 labeled 1650_10 is present in NR channel 3 labeled 1603.

"Slot 11 labeled 1650_11 and slot 12 labeled 1650_12" are present at time 6, slot 11 labeled 1650_11 is present in NR channel 4 labeled 1604, and slot 12 labeled 1650_12 is present in NR channel 5 labeled 1605.

Features in FIG. 16G in this case are as follows.

A plurality of slots are present at the first time, at least one of the plurality of slots belongs to the first NR channel, and at least one of the plurality of slots belongs to the second NR channel.

For example, at least slot 1 labeled 1650_1 belonging to NR channel 2 labeled 1602 (the first NR channel) and slot 2 labeled 1650_2 belonging to NR channel 3 labeled 1603 (the second NR channel) are present at time 1 (the first time).

Note that the above feature is found at time 2, time 3, and so forth.

FH is configured such that NR channels to which the plurality of slots belong are switched as time passes.

For example, slot 1 labeled 1650_1 belonging to NR channel 2 labeled 1602 and slot 2 labeled 16502 belonging to NR channel 3 labeled 1603 are present at time 1, and slot 3 labeled 1650_3 belonging to NR channel 4 labeled 1604 and slot 4 labeled 1650_4 belonging to NR channel 5 labeled 1605 are present at time 2.

Note that, although not illustrated in FIG. 16G, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1.

The above-described manner leads to the similar effects to those described in the examples of FIGS. 16A, 16C, 16D, and 16E.

Note that the slot arrangement method in the frequency and time domains is not limited to the example of FIG. 16G.

Also in FIG. 16G, the plurality of slots are arranged on the time axis in the order of "NR channel 2 labeled 1602 and NR channel 3 labeled 1603", "NR channel 4 labeled 1604 and NR channel 5 labeled 1605", "NR channel 2 labeled 1602 and NR channel 3 labeled 1603", "NR channel 4 labeled 1604 and NR channel 5 labeled 1605", and so forth, but the slot arrangement is not limited to this. For example, the order of NR channels to which the plurality of slots belong is not limited to this example.

For example, as long as FH is performed such that a plurality of slots are placed in a plurality of NR channels at certain time on the time axis, and the plurality of NR channels to which the plurality of slots belong are switched as time passes, the same as the above description can be implemented and the same effects can be obtained as well.

Further, in the case of FIG. 16G, the number of NR channels to which the plurality of slots present at certain time belong is four, which are "NR channel 2 labeled 1602, NR channel 3 labeled 1603, NR channel 4 labeled 1604, and NR channel 5 labeled 1605", but the present disclosure is not limited to this, and the same as the above description can be implemented and the same effects can be obtained as long as the number of NR channels to which the plurality of slots belong in FH is two or more.

Thus, a method of using time and frequency in FH in transmitting a modulation signal by gNB is not limited to the example of FIG. 16G, and the number of NR channels to which a plurality of slots present at certain time belong in FH only needs to be two or more.

Figure 16H:
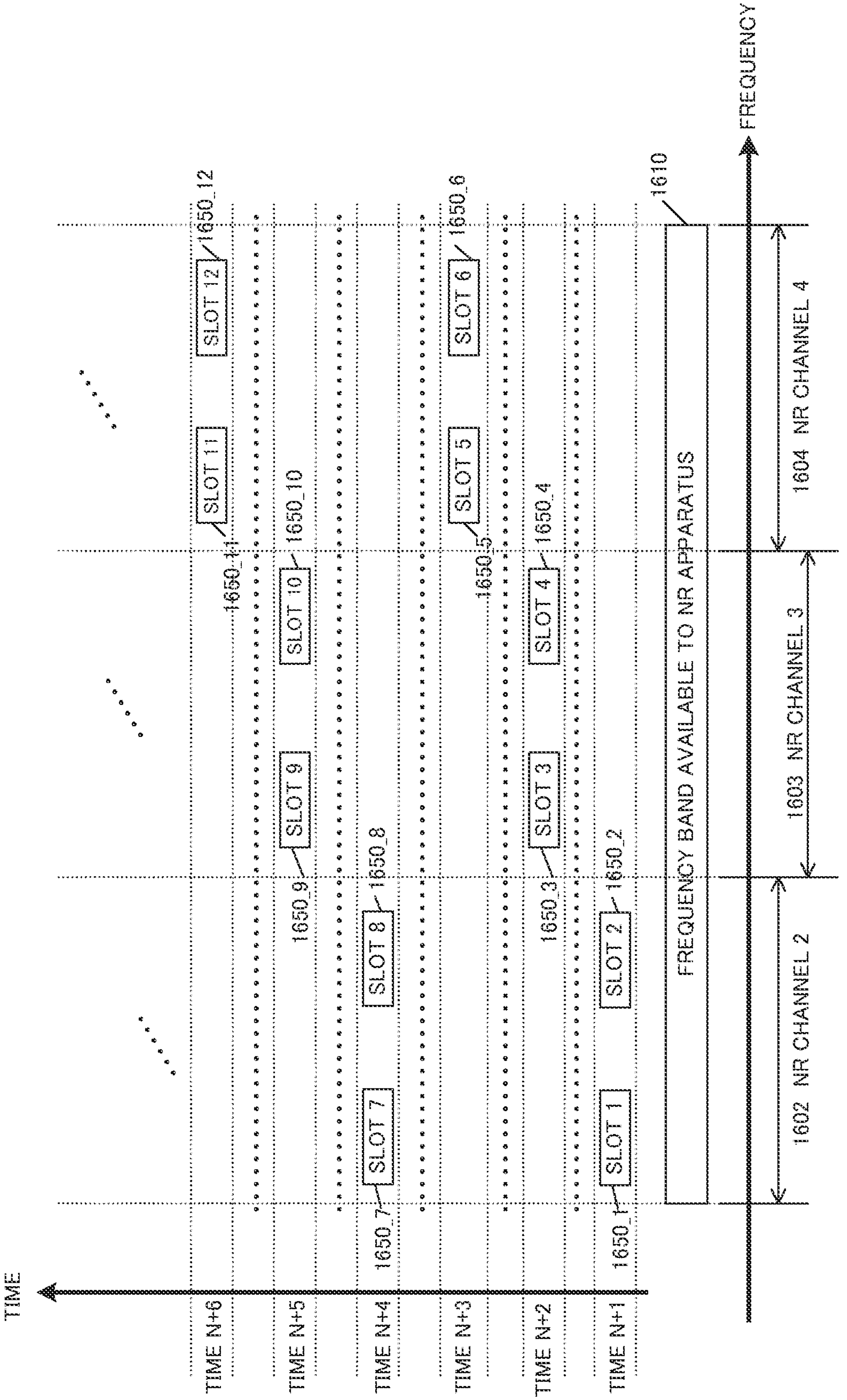
FIG. 16H illustrates an exemplary configuration of slots for a modulation signal transmitted by gNB.

FIG. 16H illustrates, for example, an exemplary configuration of slots for a modulation signal transmitted by gNB 1100 in FIG. 15, and the horizontal axis represents frequency while the vertical axis represents time. Note that, in FIG. 16H, components that operate in the same manner as in FIG. 16A are denoted by the same reference signs, and the description thereof will be partially omitted.

As illustrated in FIG. 16H, NR channel 2 labeled 1602, NR channel 3 labeled 1603, and NR channel 4 labeled 1604 are present for the frequency axis. In FIG. 16H, for example, "frequency band 1610 used by an NR apparatus" is present, and gNB 1100 in FIG. 15 transmits a modulation signal using "frequency band 1610 used by an NR apparatus", for example. Note that, in the example of FIG. 16H, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 16H, gNB 1100 transmits modulation signals to a communication counterpart such as NR-UE #1 labeled 1101_1 in FIG. 15, for example, in the following manner: at time N+1, gNB 1100 transmits modulation signals in "slot 1 labeled 1650_1 and slot 2 labeled 1650_2" included in NR channel 2 labeled 1602; at time N+2, gNB 1100 transmits modulation signals in "slot 3 labeled 1650_3 and slot 4 labeled 1650_4" included in NR channel 3 labeled 1603; at time N+3, gNB 1100 transmits modulation signals in "slot 5 labeled 1650_5 and slot 6 labeled 1650_6" included in NR channel 4 labeled 1604; at time N+4, gNB 1100 transmits modulation signals in "slot 7 labeled 1650_7 and slot 8 labeled 1650_8" included in NR channel 2 labeled 1602; at time N+5, gNB 1100 transmits modulation signals in "slot 9 labeled 1650_9 and slot 10 labeled 1650_10" included in NR channel 3 labeled 1603; at time N+6, gNB 1100 transmits modulation signals in "slot 11 labeled 1650_11 and slot 12 labeled 1650_12" included in NR channel 4 labeled 1604, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present between time N+i and time N+i+1. Here, N is an integer equal to or greater than 0, and i is an integer equal to or greater than 1.

The gNB transmits these modulation signals subjected to FH as in the example of FIG. 16H. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", "slot 10 labeled 1650_10", "slot 1I labeled 1650_11", "slot 12 labeled 1650_12", and so forth.

In the example of FIG. 16H, "slot 1 labeled 1650_1 and slot 2 labeled 1650_2" are present at time N+1, and "slot 1 labeled 1650_1 and slot 2 labeled 1650_2" are present in NR channel 2 labeled 1602.

In addition, "slot 3 labeled 1650_3 and slot 4 labeled 1650_4" are present at time N+2, and "slot 3 labeled 1650_3 and slot 4 labeled 1650_4" are present in NR channel 3 labeled 1603.

"Slot 5 labeled 1650_5 and slot 6 labeled 1650_6" are present at time N+3, and "slot 5 labeled 1650_5 and slot 6 labeled 1650_6" are present in NR channel 4 labeled 1604.

"Slot 7 labeled 1650_7 and slot 8 labeled 1650_8" are present at time N+4, and "slot 7 labeled 1650_7 and slot 8 labeled 1650_8" are present in NR channel 2 labeled 1602.

"Slot 9 labeled 1650_9 and slot 10 labeled 1650_10" are present at time N+5, and "slot 9 labeled 1650_9 and slot 10 labeled 1650_10" are present in NR channel 3 labeled 1603.

"Slot 11 labeled 1650_11 and slot 12 labeled 1650_12" are present at time N+6, and "slot 11 labeled 1650_11 and slot 12 labeled 1650_12" are present in NR channel 4 labeled 1604.

Features in FIG. 16H in this case are as follows.

A plurality of slots belonging to the first NR channel are present at the first time.

For example, "slot 1 labeled 1650_1 and slot 2 labeled 1650_2" (a plurality of slots) belonging to NR channel 2 labeled 1602 (the first NR channel) are present at time N+1 (the first time).

Note that the above feature is found at time N+2, time N+3, and so forth.

FH is configured such that a plurality of slots that are present at the first time are present in the first NR channel and an NR channel to which the plurality of slots belong is switched as time passes.

For example, "slot 1 labeled 1650_1 and slot 2 labeled 1650_2" (a plurality of slots) belonging to NR channel 2 labeled 1602 are present at time N+1, and "slot 3 labeled 1650_3 and slot 4 labeled 1650_4" (a plurality of slots) belonging to NR channel 3 labeled 1603 are present at time N+2.

Note that, although not illustrated in FIG. 16H, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1.

The above-described manner leads to the similar effects to those described in FIGS. 16A, 16C, 16D, and 16E.

Note that the slot arrangement method in the frequency and time domains is not limited to the example of FIG. 16H.

Also in FIG. 16H, the plurality of slots are arranged on the time axis in the order of "NR channel 2 labeled 1602", "NR channel 3 labeled 1603", "NR channel 4 labeled 1604", "NR channel 2 labeled 1602", "NR channel 3 labeled 1603", "NR channel 4 labeled 1604", and so forth, but the slot arrangement is not limited to this. For example, the order of NR channels to which the plurality of slots belong is not limited to this example.

For example, as long as FH is performed such that a plurality of slots are placed in any of "NR channel 2 labeled 1602", "NR channel 3 labeled 1603", and "NR channel 4 labeled 1604" on the time axis, and the NR channel to which the plurality of slots belong is switched as time passes, the same as the above description can be implemented and the same effects can be obtained as well.

Further, in the case of FIG. 16H, the number of NR channels to which the plurality of slots present at certain time belong is three, which are "NR channel 2 labeled 1602, NR channel 3 labeled 1603, and NR channel 4 labeled 1604", but the present disclosure is not limited to this, and the same as the above description can be implemented and the same effects can be obtained as long as the number of NR channels to which the plurality of slots belong in FH is two or more.

Thus, a method of using time and frequency in FH in transmitting a modulation signal by gNB is not limited to the example of FIG. 16H, and the number of NR channels to which a plurality of slots present at certain time belong in FH only needs to be one or more.

Figure 16I:
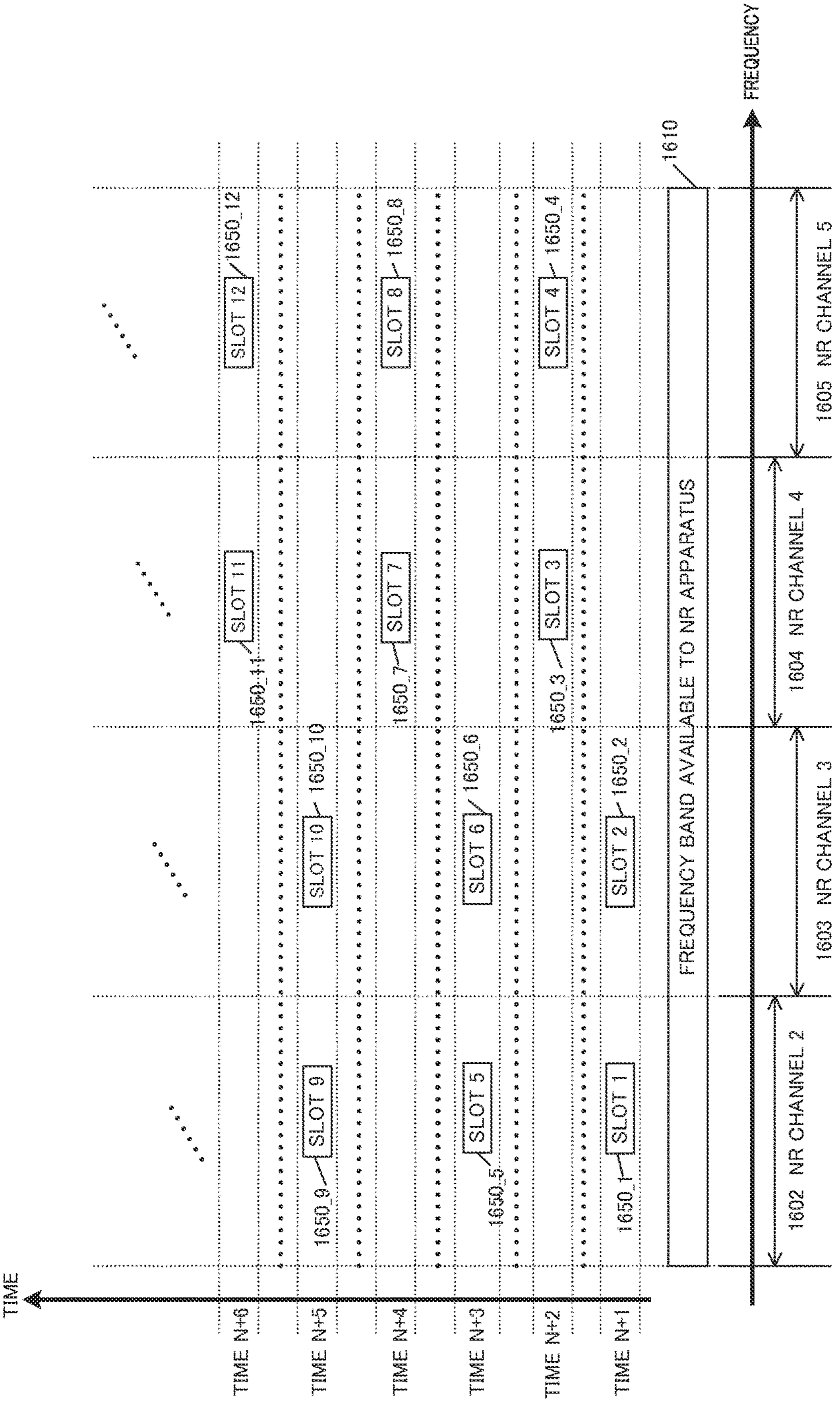
FIG. 16I illustrates an exemplary configuration of slots for a modulation signal transmitted by gNB.

FIG. 16I illustrates, for example, an exemplary configuration of slots for a modulation signal transmitted by gNB 1100 in FIG. 15, and the horizontal axis represents frequency while the vertical axis represents time. Note that, in FIG. 16I, components that operate in the same manner as in FIG. 16A are denoted by the same reference signs, and the description thereof will be partially omitted.

As illustrated in FIG. 16I, NR channel 2 labeled 1602, NR channel 3 labeled 1603, NR channel 4 labeled 1604, and NR channel 5 labeled 1605 are present for the frequency axis. In FIG. 16I, for example. "frequency band 1610 used by an NR apparatus" is present, and gNB 1100 in FIG. 15 transmits a modulation signal using "frequency band 1610 used by an NR apparatus", for example. Note that, in the example of FIG. 16I, "frequency band 1610 used by an NR apparatus" includes "all or part of NR channel 2 labeled 1602", "all or part of NR channel 3 labeled 1603", "all or part of NR channel 4 labeled 1604", and "all or part of NR channel 5 labeled 1605".

Then, as illustrated in FIG. 16I, gNB 1100 transmits modulation signals to a communication counterpart such as NR-UE #1 labeled 1101_1 in FIG. 15, for example, in the following manner: at time N+1, gNB 1100 transmits modulation signals in slot 1 labeled 1650_1 included in NR channel 2 labeled 1602 and slot 2 labeled 1650_2 included in NR channel 3 labeled 1603; at time N+2, gNB 1100 transmits modulation signals in slot 3 labeled 1650_3 included in NR channel 4 labeled 1604 and slot 4 labeled 1650_4 included in NR channel 5 labeled 1605; at time N+3, gNB 11X) transmits modulation signals in slot labeled 1650_5 included in NR channel 2 labeled 1602 and slot 6 labeled 1650_6 included in NR channel 3 labeled 1603; at time N+4, gNB 1100 transmits modulation signals in slot 7 labeled 1650_7 included in NR channel 4 labeled 1604 and slot 8 labeled 1650_8 included in NR channel 5 labeled 1605; at time N+5, gNB 1100 transmits modulation signals in slot 9 labeled 1650_9 included in NR channel 2 labeled 1602 and slot 10 labeled 1650_10 included in NR channel 3 labeled 1603; at time N+6, gNB 1100 transmits modulation signals in slot 11 labeled 1650_11 included in NR channel 4 labeled 1604 and slot 12 labeled 1650_12 included in NR channel 5 labeled 1605, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present between time N+i and time N+i+1. Here, N is an integer equal to or greater than 0, and i is an integer equal to or greater than 1.

The gNB transmits these modulation signals subjected to FH as in the example of FIG. 16I. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5". "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

In the example of FIG. 16I, "slot 1 labeled 1650_1 and slot 2 labeled 1650_2" are present at time N+1, slot 1 labeled 1650_1 is present in NR channel 2 labeled 1602, and slot 2 labeled 1650_2 is present in NR channel 3 labeled 1603.

In addition, "slot 3 labeled 1650_3 and slot 4 labeled 1650_4" are present at time N+2, slot 3 labeled 1650_3 is present in NR channel 4 labeled 1604, and slot 4 labeled 1650_4 is present in NR channel 5 labeled 1605.

"Slot 5 labeled 1650_5 and slot 6 labeled 1650_6" are present at time N+3, slot 5 labeled 16505 is present in NR channel 2 labeled 1602, and slot 6 labeled 1650_6 is present in NR channel 3 labeled 1603.

"Slot 7 labeled 1650_7 and slot 8 labeled 1650_8" are present at time N+4, slot 7 labeled 1650_7 is present in NR channel 4 labeled 1604, and slot 8 labeled 1650_8 is present in NR channel 5 labeled 1605.

"Slot 9 labeled 1650_9 and slot 10 labeled 1650_10" are present at time N+5, slot 9 labeled 1650_9 is present in NR channel 2 labeled 1602, and slot 10 labeled 1650_10 is present in NR channel 3 labeled 1603.

"Slot 11 labeled 1650_11 and slot 12 labeled 1650_12" are present at time N+6, slot 11 labeled 1650_11 is present in NR channel 4 labeled 1604, and slot 12 labeled 1650_12 is present in NR channel 5 labeled 1605.

Features in FIG. 16I in this case are as follows.

A plurality of slots are present at the first time, at least one of the plurality of slots belongs to the first NR channel, and at least one of the plurality of slots belongs to the second NR channel.

For example, at least slot 1 labeled 1650_1 belonging to NR channel 2 labeled 1602 (the first NR channel) and slot 2 labeled 1650_2 belonging to NR channel 3 labeled 1603 (the second NR channel) are present at time N+1 (the first time).

Note that the above feature is found at time N+2, time N+3, and so forth.

FH is configured such that NR channels to which the plurality of slots belong are switched as time passes.

For example, slot 1 labeled 1650_1 belonging to NR channel 2 labeled 1602 and slot 2 labeled 16502 belonging to NR channel 3 labeled 1603 are present at time N+1, and slot 3 labeled 16503 belonging to NR channel 4 labeled 1604 and slot 4 labeled 1650_4 belonging to NR channel 5 labeled 1605 are present at time N+2.

Note that, although not illustrated in FIG. 16I, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1.

The above-described manner leads to the similar effects to those described in FIGS. 16A, 16C, 16D, and 16E.

Note that the slot arrangement method in the frequency and time domains is not limited to the example of FIG. 16I.

Also in FIG. 16I, the plurality of slots are arranged on the time axis in the order of "NR channel 2 labeled 1602 and NR channel 3 labeled 1603", "NR channel 4 labeled 1604 and NR channel 5 labeled 1605", "NR channel 2 labeled 1602 and NR channel 3 labeled 1603", "NR channel 4 labeled 1604 and NR channel 5 labeled 1605", and so forth, but the slot arrangement is not limited to this. For example, the order of NR channels to which the plurality of slots belong is not limited to this example.

For example, as long as FH is performed such that a plurality of slots are placed in a plurality of NR channels at certain time on the time axis, and the plurality of NR channels to which the plurality of slots belong are switched as time passes, the same as the above description can be implemented and the same effects can be obtained as well.

Further, in the case of FIG. 16I, the number of NR channels to which the plurality of slots present at certain time belong is four, which are "NR channel 2 labeled 1602, NR channel 3 labeled 1603, NR channel 4 labeled 1604, and NR channel 5 labeled 1605", but the present disclosure is not limited to this, and the same as the above description can be implemented and the same effects can be obtained as long as the number of NR channels to which the plurality of slots belong in FH is two or more.

Thus, a method of using time and frequency in FH in transmitting a modulation signal by gNB is not limited to the example of FIG. 16I, and the number of NR channels to which a plurality of slots present at certain time belong in FH only needs to be two or more.

Note that, although the term "slot" is used in the description using FIGS. 16A, 16C, 16D, 16E, 16F, 16G, 16H, 16I, etc., the name is not limited thereto and may be a symbol, OFDM symbol (part of OFDM symbol), or frame, for example.

In the NR system, for example, a slot may be composed of 1 to 14 (both inclusive) OFDM symbols (parts of OFDM symbols).

An exemplary method of suitably configuring a slot in the NR system will be described.

For example, in the NR system of 52.6 GHz or higher (and 71 GHz or lower), e.g., 60 GHz band, the deferral period is specified as 8 micro (p) seconds for energy measurement. Accordingly, when a slot length is 8 micro (p) seconds or shorter and the first NR apparatus transmits a modulation signal including a slot, another NR apparatus need not detect the modulation signal of the slot by LBT. Thus, another NR apparatus can possibly transmit a modulation signal without performing LBT.

To this end, an NR apparatus transmits a modulation signal while performing FH by configuring SCS of OFDM to be 960 kHz and configuring one slot with one OFDM symbol (part of one OFDM symbol). In this manner, the time length of one slot is, for example, 7.2 micro (p) seconds, and the NR apparatus can transmit a modulation signal subjected to FH without performing LBT. Note that the FH method described thus far is considered as one of suitable methods as FH, but the FH method is not necessarily limited to this FH method.

In addition, the SCS of OFDM is not limited to 960 kHz. Note that these FH methods may be referred to as FH methods in which the frequency is switched slot by slot.

The above description is about the "FH method by configuring SCS of OFDM to be 960 kHz and configuring one slot with one OFDM symbol (part of one OFDM symbol)", but an "FH method by configuring SCS of OFDM to be 960 kHz and configuring one slot with two or more OFDM symbols (parts of OFDM symbols)" may be applied. In terms of exemplary FH in this case, FIGS. 17A, 17B, 17C, 17D, 17E, 17F, 17G, and 17H will be described. Note that, the SCS of OFDM is not limited to 960 kHz.

Figure 17A:
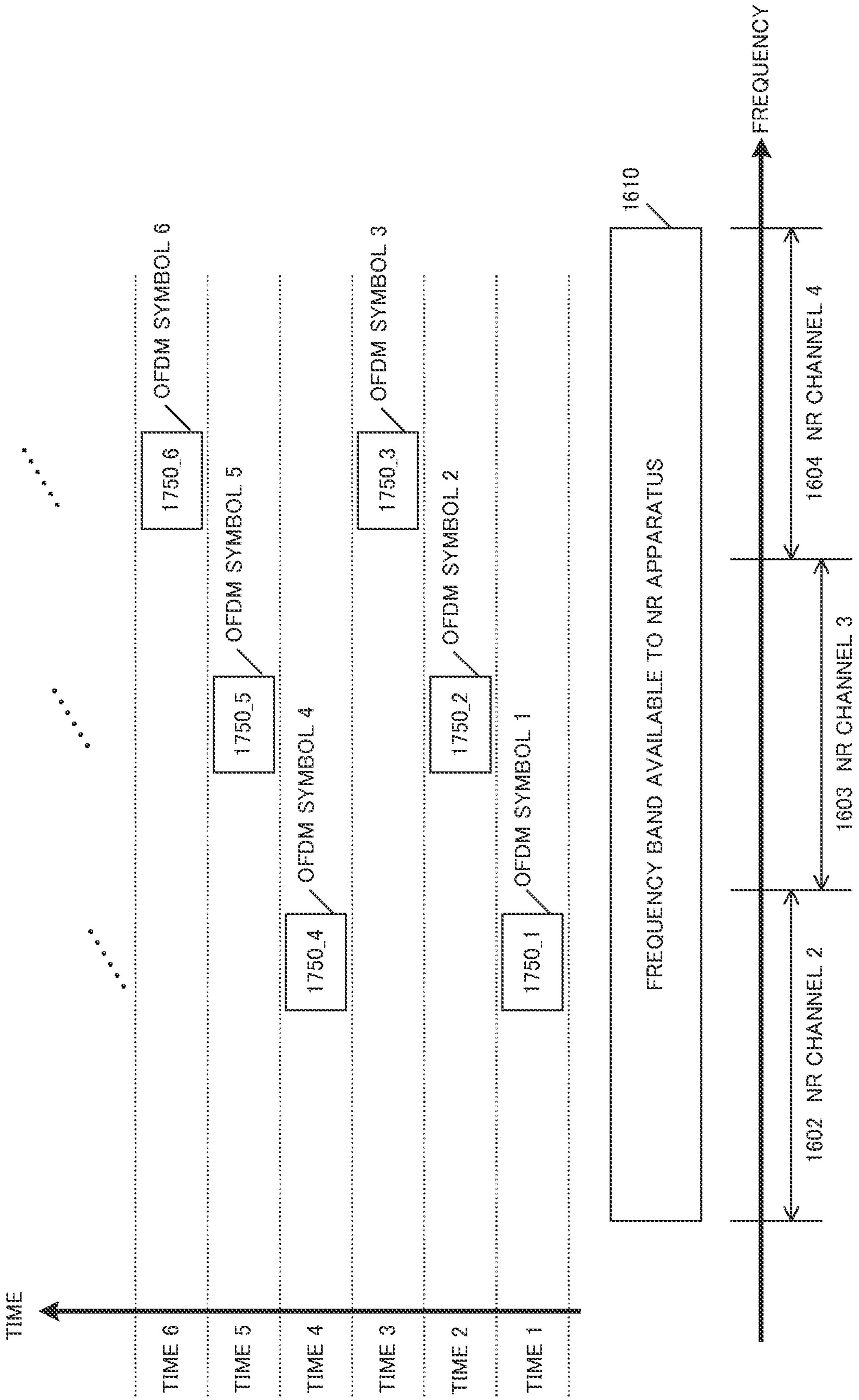
FIG. 17A illustrates an exemplary configuration of OFDM symbols for a modulation signal transmitted by gNB.

FIG. 17A illustrates, for example, an exemplary configuration of OFDM symbols (parts of OFDM symbols) for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 17A, NR channel 2 labeled 1602, NR channel 3 labeled 1603, and NR channel 4 labeled 1604 are present for the frequency axis. In FIG. 17A, for example, "frequency band 1610 used by an NR apparatus" is present, and gNB 1100 in FIG. 15 transmits a modulation signal using "frequency band 1610 used by an NR apparatus", for example. Note that, in the example of FIG. 17A, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 17A, gNB 1100 transmits modulation signals to a communication counterpart such as NR-UE #1 labeled 1101_1 in FIG. 15, for example, in the following manner: at time 1, gNB 1100 transmits a modulation signal in OFDM symbol 1 (part of OFDM symbol 1) labeled 1750_1 included in NR channel 2 labeled 1602, at time 2, gNB 1100 transmits a modulation signal in OFDM symbol 2 (part of OFDM symbol 2) labeled 1750_2 included in NR channel 3 labeled 1603; at time 3, gNB 1100 transmits a modulation signal in OFDM symbol 3 (part of OFDM symbol 3) labeled 1750_3 included in NR channel 4 labeled 1604; at time 4, gNB 1100 transmits a modulation signal in OFDM symbol 4 (part of OFDM symbol 4) labeled 1750_4 included in NR channel 2 labeled 1602; at time 5, gNB 1100 transmits a modulation signal in OFDM symbol 5 (part of OFDM symbol 5) labeled 1750_5 included in NR channel 3 labeled 1603; at time 6, gNB 1100 transmits a modulation signal in OFDM symbol 6 (part of OFDM symbol 6) labeled 1750_6 included in NR channel 4 labeled 1604, and so forth.

The gNB transmits these modulation signals subjected to frequency hopping (FH) as in the example of FIG. 17A. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be the same or overlapped partially.

Likewise, for example, the frequency of "OFDM symbol 2 (part of OFDM symbol 2) labeled 1750_2" and the frequency of "OFDM symbol 5 (part of OFDM symbol 5) labeled 1750_5" may be the same or overlapped partially.

For example, the frequency of "OFDM symbol 3 (part of OFDM symbol 3) labeled 1750_3" and the frequency of "OFDM symbol 6 (part of OFDM symbol 6) labeled 1750_6" may be the same or overlapped partially.

Note that, although not illustrated in FIG. 17A, the modulation signal transmitted by gNB 1100 may include a frame, symbol, slot, etc. other than "'OFDM symbol 1 (part of OFDM symbol 1) labeled 1750_1', 'OFDM symbol 2 (part of OFDM symbol 2) labeled 1750_2', 'OFDM symbol 3 (part of OFDM symbol 3) labeled 1750_3', 'OFDM symbol 4 (part of OFDM symbol 4) labeled 1750_4', 'OFDM symbol 5 (part of OFDM symbol 5) labeled 1750_5', 'OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 17504", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

Figure 17B:
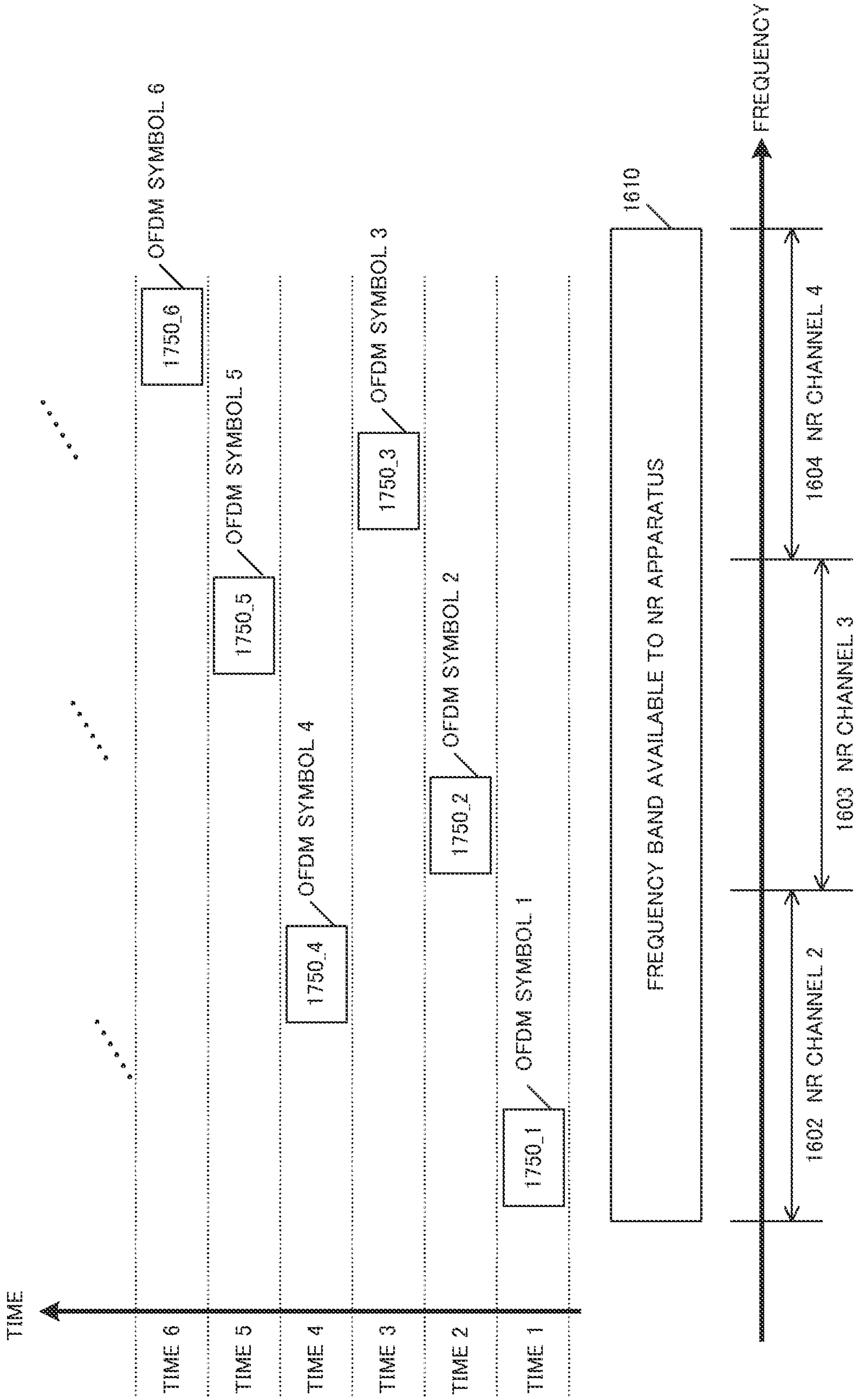
FIG. 17B illustrates an exemplary configuration of OFDM symbols for a modulation signal transmitted by gNB.

FIG. 17B illustrates, for example, an exemplary configuration of OFDM symbols (parts of OFDM symbols) for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 17B, NR channel 2 labeled 1602, NR channel 3 labeled 1603, and NR channel 4 labeled 1604 are present for the frequency axis. In FIG. 17B, for example, "frequency band 1610 used by an NR apparatus" is present, and gNB 1100 in FIG. 15 transmits a modulation signal using "frequency band 1610 used by an NR apparatus", for example. Note that, in the example of FIG. 17B, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 17B, gNB 1100 transmits modulation signals to a communication counterpart such as NR-UE #1 labeled 1101_1 in FIG. 15, for example, in the following manner: at time 1, gNB 1100 transmits a modulation signal in OFDM symbol 1 (part of OFDM symbol 1) labeled 1750_1 included in NR channel 2 labeled 1602; at time 2, gNB 1100 transmits a modulation signal in OFDM symbol 2 (part of OFDM symbol 2) labeled 1750_2 included in NR channel 3 labeled 1603; at time 3, gNB 1100 transmits a modulation signal in OFDM symbol 3 (part of OFDM symbol 3) labeled 1750_3 included in NR channel 4 labeled 1604; at time 4, gNB 1100 transmits a modulation signal in OFDM symbol 4 (part of OFDM symbol 4) labeled 1750_4 included in NR channel 2 labeled 1602, at time 5, gNB 1100 transmits a modulation signal in OFDM symbol 5 (part of OFDM symbol 5) labeled 1750_5 included in NR channel 3 labeled 1603; at time 6, gNB 1100 transmits a modulation signal in OFDM symbol 6 (part of OFDM symbol 6) labeled 1750_6 included in NR channel 4 labeled 1604, and so forth.

The gNB transmits these modulation signals subjected to frequency hopping (FH) as in the example of FIG. 17B. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be configured to be different from each other, i.e., configured not to be overlapped with each other.

Likewise, for example, the frequency of "OFDM symbol 2 (part of OFDM symbol 2) labeled 1750_2" and the frequency of "OFDM symbol 5 (part of OFDM symbol 5) labeled 1750_5" may be configured to be different from each other, i.e., configured not to be overlapped with each other.

For example, the frequency of "OFDM symbol 3 (part of OFDM symbol 3) labeled 1750_3" and the frequency of "OFDM symbol 6 (part of OFDM symbol 6) labeled 1750_6" may be configured to be different from each other, i.e., configured not to be overlapped with each other.

Note that, although not illustrated in FIG. 17B, the modulation signal transmitted by gNB 100 may include a frame, symbol, slot, etc. other than "'OFDM symbol 1 (part of OFDM symbol 1) labeled 1750_1', 'OFDM symbol 2 (part of OFDM symbol 2) labeled 1750_2', 'OFDM symbol 3 (part of OFDM symbol 3) labeled 1750_3', 'OFDM symbol 4 (part of OFDM symbol 4) labeled 1750_4', 'OFDM symbol 5 (part of OFDM symbol 5) labeled 1750_5', 'OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

Figure 17C:
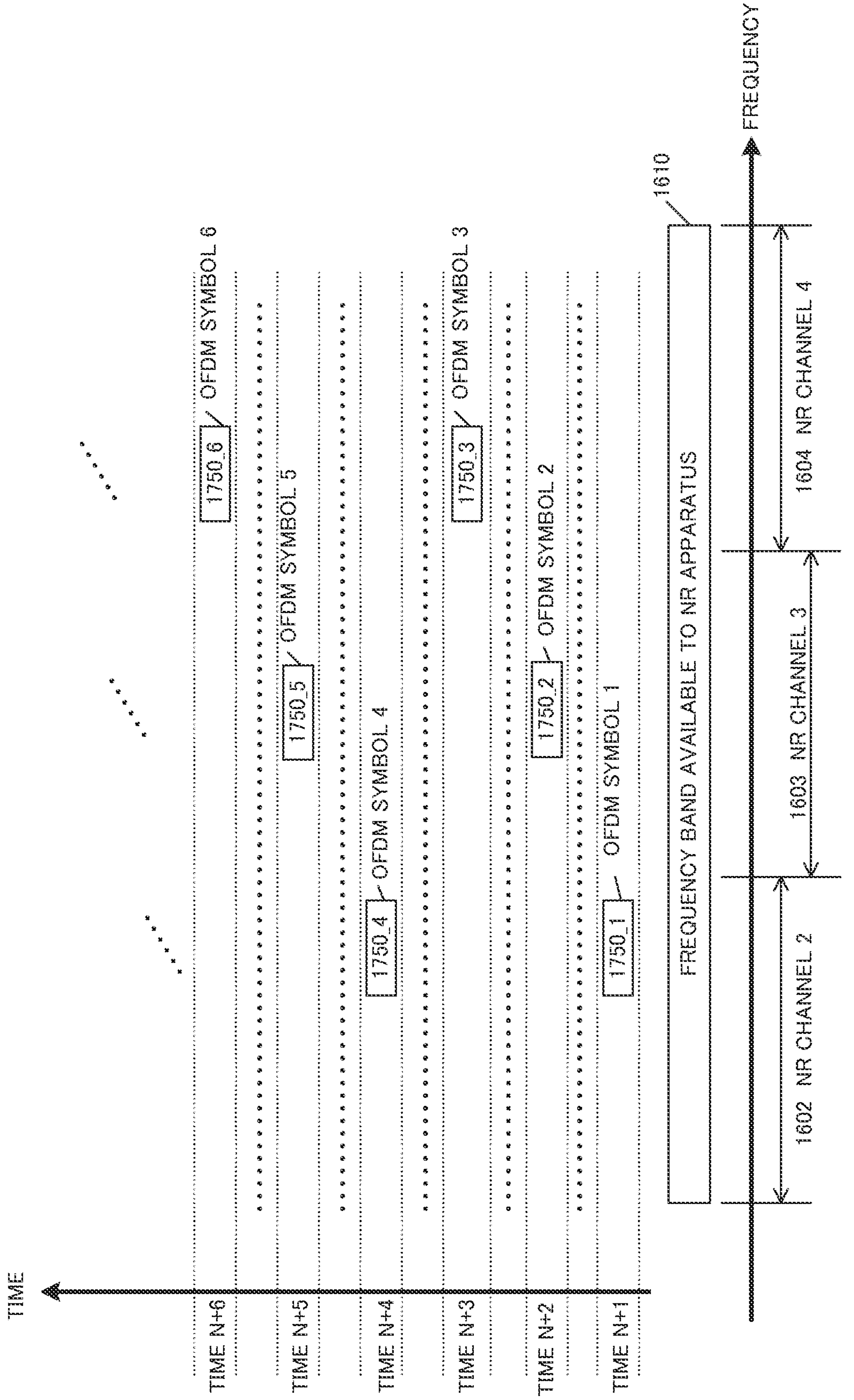
FIG. 17C illustrates an exemplary configuration of OFDM symbols for a modulation signal transmitted by gNB.

FIG. 17C illustrates, for example, an exemplary configuration of OFDM symbols (parts of OFDM symbols) for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 17C, NR channel 2 labeled 1602, NR channel 3 labeled 1603, and NR channel 4 labeled 1604 are present for the frequency axis. In FIG. 17C, for example, "frequency band 1610 used by an NR apparatus" is present, and gNB 1100 in FIG. 15 transmits a modulation signal using "frequency band 1610 used by an NR apparatus", for example. Note that, in the example of FIG. 17C, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 17C, gNB 1100 transmits modulation signals to a communication counterpart such as NR-UE #1 labeled 1101_1 in FIG. 15, for example, in the following manner: at time N+1, gNB 1100 transmits a modulation signal in OFDM symbol 1 (part of OFDM symbol 1) labeled 1750_1 included in NR channel 2 labeled 1602; at time N+2, gNB 1100 transmits a modulation signal in OFDM symbol 2 (part of OFDM symbol 2) labeled 1750_2 included in NR channel 3 labeled 1603; at time N+3, gNB 1100 transmits a modulation signal in OFDM symbol 3 (part of OFDM symbol 3) labeled 1750_3 included in NR channel 4 labeled 1604; at time N+4, gNB 1100 transmits a modulation signal in OFDM symbol 4 (part of OFDM symbol 4) labeled 1750_4 included in NR channel 2 labeled 1602; at time N+5, gNB 1100 transmits a modulation signal in OFDM symbol 5 (part of OFDM symbol 5) labeled 1750_5 included in NR channel 3 labeled 1603; at time N+6, gNB 1100 transmits a modulation signal in OFDM symbol 6 (part of OFDM symbol 6) labeled 1750_6 included in NR channel 4 labeled 1604, and so forth.

Note that another "frame, symbol, signal, etc" may be present between time N+1 and time N+2.

Note that another "frame, symbol, signal, etc." may be present between time N+2 and time N+3, or other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency hopping (FH) as in the example of FIG. 17C. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be the same or overlapped partially.

Likewise, for example, the frequency of "OFDM symbol 2 (part of OFDM symbol 2) labeled 1750_2" and the frequency of "OFDM symbol 5 (part of OFDM symbol 5) labeled 1750_5" may be the same or overlapped partially.

For example, the frequency of "OFDM symbol 3 (part of OFDM symbol 3) labeled 1750_3" and the frequency of "OFDM symbol 6 (part of OFDM symbol 6) labeled 1750_6" may be the same or overlapped partially.

Note that, although not illustrated in FIG. 17C, the modulation signal transmitted by gNB 1100 may include a frame, symbol, slot, etc. other than "'OFDM symbol 1 (part of OFDM symbol 1) labeled 1750_1', 'OFDM symbol 2 (part of OFDM symbol 2) labeled 1750_2', 'OFDM symbol 3 (part of OFDM symbol 3) labeled 1750_3', 'OFDM symbol 4 (part of OFDM symbol 4) labeled 1750_4', 'OFDM symbol 5 (part of OFDM symbol 5) labeled 1750_5', 'OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 17501", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

Figure 17D:
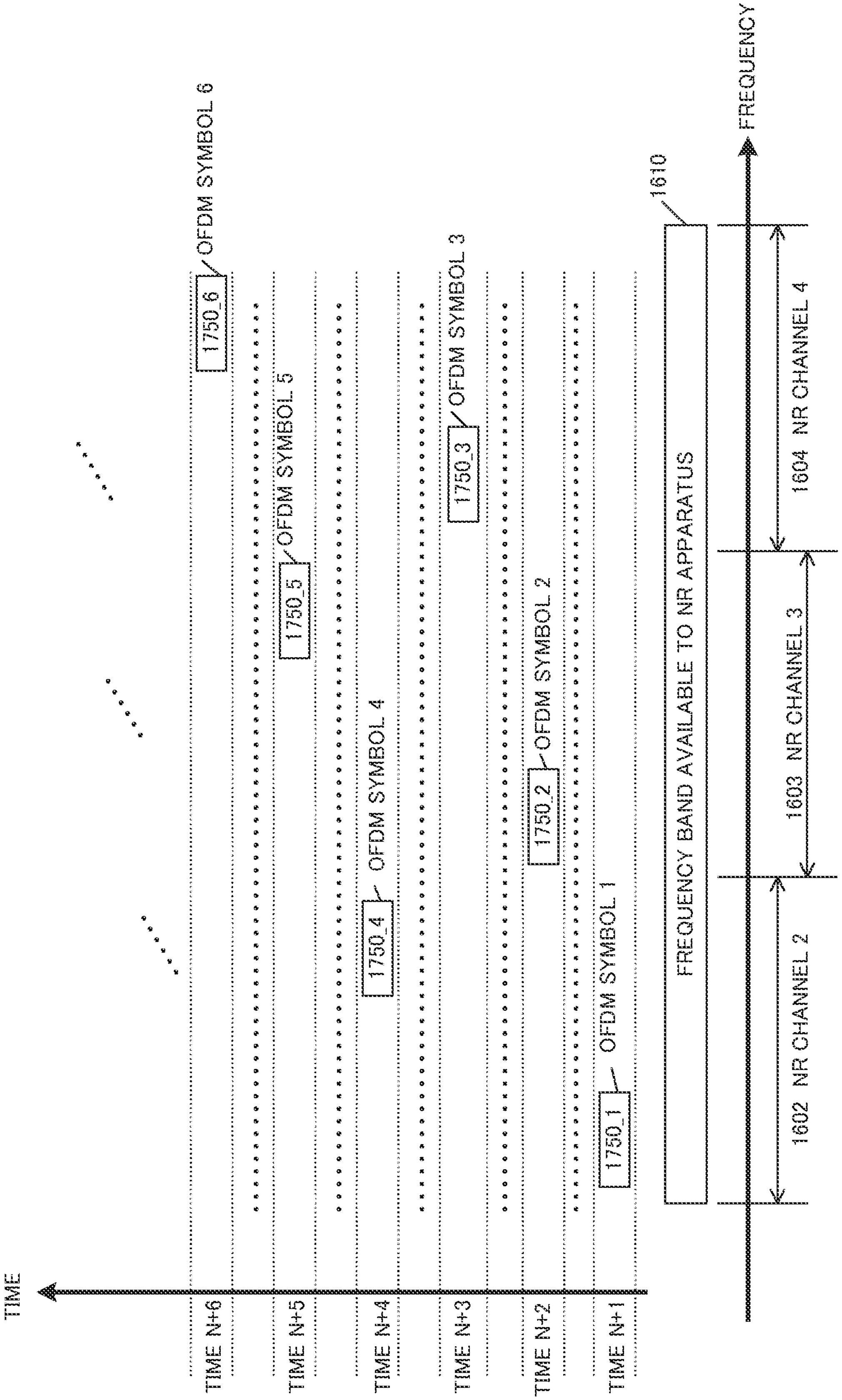
FIG. 17D illustrates an exemplary configuration of OFDM symbols for a modulation signal transmitted by gNB.

FIG. 17D illustrates, for example, an exemplary configuration of OFDM symbols (parts of OFDM symbols) for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 17D, NR channel 2 labeled 1602, NR channel 3 labeled 1603, and NR channel 4 labeled 1604 are present for the frequency axis. In FIG. 17D, for example, "frequency band 1610 used by an NR apparatus" is present, and gNB 1100 in FIG. 15 transmits a modulation signal using "frequency band 1610 used by an NR apparatus", for example. Note that, in the example of FIG. 17D, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 17D, gNB 1100 transmits modulation signals to a communication counterpart such as NR-UE #1 labeled 1101_1 in FIG. 15, for example, in the following manner: at time N+1, gNB 1100 transmits a modulation signal in OFDM symbol 1 (part of OFDM symbol 1) labeled 1750_1 included in NR channel 2 labeled 1602; at time N+2, gNB 1100 transmits a modulation signal in OFDM symbol 2 (part of OFDM symbol 2) labeled 1750_2 included in NR channel 3 labeled 1603; at time N+3, gNB 1100 transmits a modulation signal in OFDM symbol 3 (part of OFDM symbol 3) labeled 1750_3 included in NR channel 4 labeled 1604; at time N+4, gNB 1100 transmits a modulation signal in OFDM symbol 4 (part of OFDM symbol 4) labeled 1750_4 included in NR channel 2 labeled 1602; at time N+5, gNB 1100 transmits a modulation signal in OFDM symbol 5 (part of OFDM symbol 5) labeled 1750_5 included in NR channel 3 labeled 1603; at time N+6, gNB 1100 transmits a modulation signal in OFDM symbol 6 (part of OFDM symbol 6) labeled 1750_6 included in NR channel 4 labeled 1604, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency hopping (FH) as in the example of FIG. 17D. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be configured to be different from each other, i.e., configured not to be overlapped with each other.

Likewise, for example, the frequency of "OFDM symbol 2 (part of OFDM symbol 2) labeled 1750_2" and the frequency of "OFDM symbol 5 (part of OFDM symbol 5) labeled 1750_5" may be configured to be different from each other, i.e., configured not to be overlapped with each other.

For example, the frequency of "OFDM symbol 3 (part of OFDM symbol 3) labeled 1750_3" and the frequency of "OFDM symbol 6 (part of OFDM symbol 6) labeled 1750_6" may be configured to be different from each other, i.e., configured not to be overlapped with each other.

Note that, although not illustrated in FIG. 17D, the modulation signal transmitted by gNB 1100 may include a frame, symbol, slot, etc. other than "'OFDM symbol 1 (part of OFDM symbol 1) labeled 1750_1', 'OFDM symbol 2 (part of OFDM symbol 2) labeled 1750_2', 'OFDM symbol 3 (part of OFDM symbol 3) labeled 1750_3', 'OFDM symbol 4 (part of OFDM symbol 4) labeled 1750_4', 'OFDM symbol 5 (part of OFDM symbol 5) labeled 1750_5', 'OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

In the following, a description will be given of exemplary arrangement of OFDM symbols (parts of OFDM symbols) on the frequency and time axes other than those in "FIGS. 17A, 17B, 17C, and 17D".

Figure 17E:
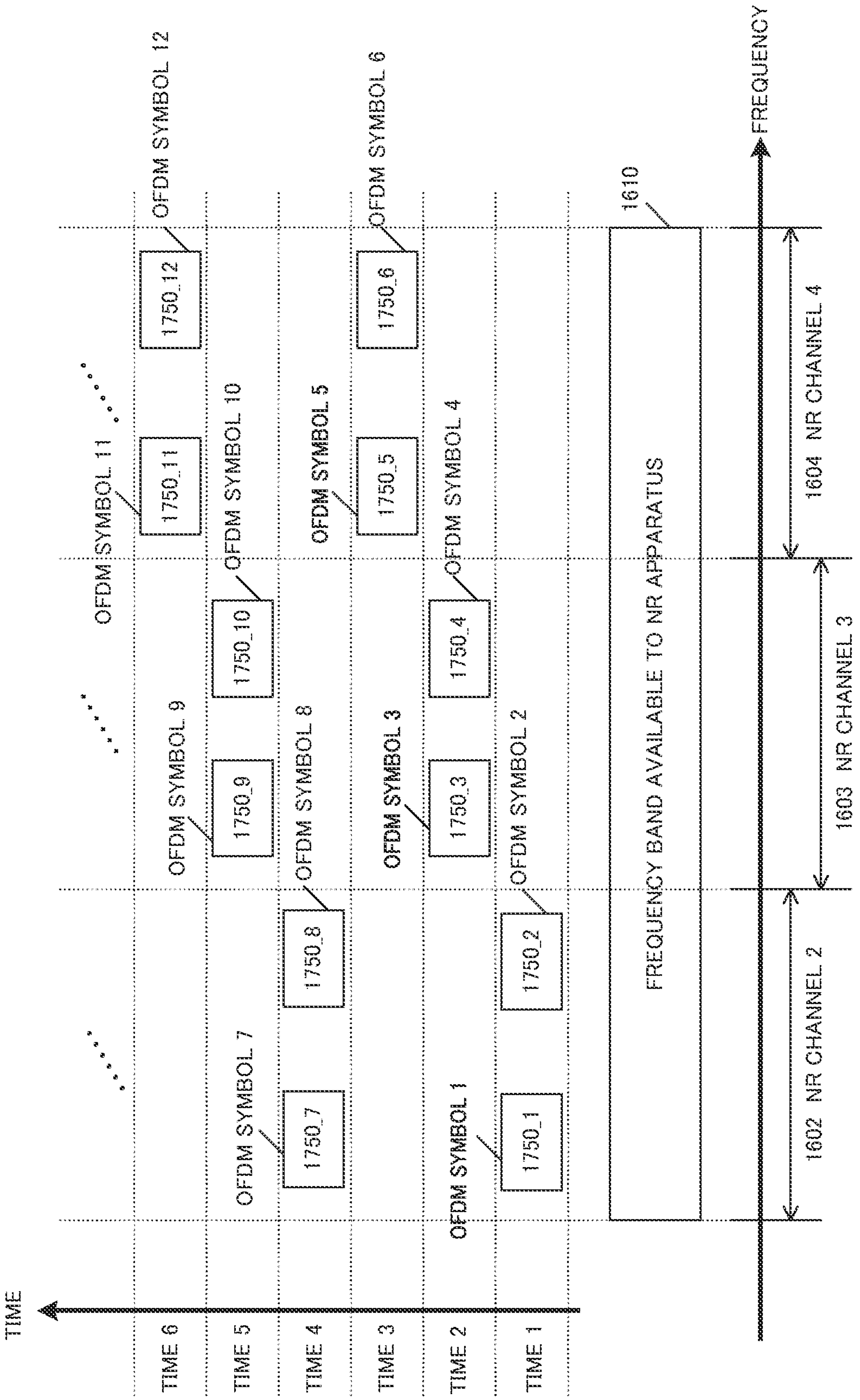
FIG. 17E illustrates an exemplary configuration of OFDM symbols for a modulation signal transmitted by gNB.

FIG. 17E illustrates, for example, an exemplary configuration of OFDM symbols (parts of OFDM symbols) for a modulation signal transmitted by gNB 1100 in FIG. 15, and the horizontal axis represents frequency while the vertical axis represents time. Note that, in FIG. 17E, components that operate in the same manner as in FIG. 16A are denoted by the same reference signs, and the description thereof will be partially omitted.

As illustrated in FIG. 17E, NR channel 2 labeled 1602, NR channel 3 labeled 1603, and NR channel 4 labeled 1604 are present for the frequency axis. In FIG. 17E, for example, "frequency band 1610 used by an NR apparatus" is present, and gNB 1100 in FIG. 15 transmits a modulation signal using "frequency band 1610 used by an NR apparatus", for example. Note that, in the example of FIG. 17E. "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 17E, gNB 1100 transmits modulation signals to a communication counterpart such as NR-UE #1 labeled 1101_1 in FIG. 15, for example, in the following manner: at time 1, gNB 1100 transmits modulation signals in "OFDM symbol (part of OFDM symbol) 1 labeled 1750_1 and OFDM symbol (part of OFDM symbol) 2 labeled 1750_2" included in NR channel 2 labeled 1602; at time 2, gNB 1100 transmits modulation signals in "OFDM symbol (part of OFDM symbol) 3 labeled 1750_3 and OFDM symbol (part of OFDM symbol) 4 labeled 1750_4" included in NR channel 3 labeled 1603, at time 3, gNB 1100 transmits modulation signals in "OFDM symbol (part of OFDM symbol) 5 labeled 1750_5 and OFDM symbol (part of OFDM symbol) 6 labeled 1750_6" included in NR channel 4 labeled 1604; at time 4, gNB 1100 transmits modulation signals in "OFDM symbol (part of OFDM symbol) 7 labeled 1750_7 and OFDM symbol (part of OFDM symbol) 8 labeled 1750_8" included in NR channel 2 labeled 1602, at time 5, gNB 1100 transmits modulation signals in "OFDM symbol (part of OFDM symbol) 9 labeled 1750_9 and OFDM symbol (part of OFDM symbol) 10 labeled 1750_10" included in NR channel 3 labeled 1603; at time 6, gNB 1100 transmits modulation signals in "OFDM symbol (part of OFDM symbol) 11 labeled 1750_11 and OFDM symbol (part of OFDM symbol) 12 labeled 1750_12" included in NR channel 4 labeled 1604, and so forth.

The gNB transmits these modulation signals subjected to FH as in the example of FIG. 17E. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 1l labeled 1750_11", "OFDM symbol (part of OFDM symbol) 12 labeled 1750_12", and so forth.

In the example of FIG. 17E, "OFDM symbol (part of OFDM symbol) 1 labeled 1750_1 and OFDM symbol (part of OFDM symbol) 2 labeled 1750_2" are present at time 1, and "OFDM symbol (part of OFDM symbol) 1 labeled 1750_1 and OFDM symbol (part of OFDM symbol) 2 labeled 1750_2" are present in NR channel 2 labeled 1602.

In addition, "OFDM symbol (part of OFDM symbol) 3 labeled 1750_3 and OFDM symbol (part of OFDM symbol) 4 labeled 1750_4" are present at time 2, and "OFDM symbol (part of OFDM symbol) 3 labeled 1750_3 and OFDM symbol (part of OFDM symbol) 4 labeled 1750_4" are present in NR channel 3 labeled 1603.

"OFDM symbol (part of OFDM symbol) 5 labeled 1750_5 and OFDM symbol (part of OFDM symbol) 6 labeled 1750_6" are present at time 3, and "OFDM symbol (part of OFDM symbol) 5 labeled 1750_5 and OFDM symbol (part of OFDM symbol) 6 labeled 1750_6" are present in NR channel 4 labeled 1604.

"OFDM symbol (part of OFDM symbol) 7 labeled 1750_7 and OFDM symbol (part of OFDM symbol) 8 labeled 1750_8" are present at time 4, and "OFDM symbol (part of OFDM symbol) 7 labeled 1750_7 and OFDM symbol (part of OFDM symbol) 8 labeled 1750_8" are present in NR channel 2 labeled 1602.

"OFDM symbol (part of OFDM symbol) 9 labeled 1750_9 and OFDM symbol (part of OFDM symbol) 10 labeled 1750_10" are present at time 5, and "OFDM symbol (part of OFDM symbol) 9 labeled 1750_9 and OFDM symbol (part of OFDM symbol) 10 labeled 1750_10" are present in NR channel 3 labeled 1603.

"OFDM symbol (part of OFDM symbol) 11 labeled 1750_11 and OFDM symbol (part of OFDM symbol) 12 labeled 1750_12" are present at time 6, and "OFDM symbol (part of OFDM symbol) 11 labeled 1750_11 and OFDM symbol (part of OFDM symbol) 12 labeled 1750_12" are present in NR channel 4 labeled 1604.

Features in FIG. 17E in this case are as follows.

A plurality of OFDM symbols (parts of OFDM symbols) belonging to the first NR channel are present at the first time.

For example, "OFDM symbol (part of OFDM symbol) 1 labeled 1750_1 and OFDM symbol (part of OFDM symbol) 2 labeled 1750_2" (a plurality of OFDM symbols (parts of OFDM symbols)) belonging to NR channel 2 labeled 1602 (the first NR channel) are present at time 1 (the first time).

Note that the above feature is found at time 2, time 3, and so forth.

FH is configured such that a plurality of OFDM symbols (parts of OFDM symbols) that are present at the first time are present in the first NR channel and an NR channel to which the plurality of OFDM symbols (parts of OFDM symbols) belong is switched as time passes.

For example, "OFDM symbol (part of OFDM symbol) I labeled 1750_1 and OFDM symbol (part of OFDM symbol) 2 labeled 1750_2" (a plurality of OFDM symbols (parts of OFDM symbols)) belonging to NR channel 2 labeled 1602 are present at time 1, and "OFDM symbol (part of OFDM symbol) 3 labeled 1750_3 and OFDM symbol (part of OFDM symbol) 4 labeled 1750_4" (a plurality of OFDM symbols (parts of OFDM symbols)) belonging to NR channel 3 labeled 1603 are present at time 2.

Note that, although not illustrated in FIG. 17E, the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1750_9', 'OFDM symbol (part of OFDM symbol) 10 labeled 1750_10', 'OFDM symbol (part of OFDM symbol) 11 labeled 1750_11', 'OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

The above-described manner leads to the similar effects to those described in the examples of FIGS. 17A, 17B, 17C, and 17D.

Note that the arrangement method for OFDM symbols (parts of OFDM symbols) in the frequency and time domains is not limited to the example of FIG. 17E.

Also in FIG. 17E, the plurality of OFDM symbols (parts of OFDM symbols) are arranged on the time axis in the order of "NR channel 2 labeled 1602", "NR channel 3 labeled 1603", "NR channel 4 labeled 1604", "NR channel 2 labeled 1602", "NR channel 3 labeled 1603", "NR channel 4 labeled 1604", and so forth, but the arrangement of OFDM symbols (parts of OFDM symbols) is not limited to this. For example, the order of NR channels to which the plurality of OFDM symbols (parts of OFDM symbols) belong is not limited to this example.

For example, as long as FH is performed such that a plurality of OFDM symbols (parts of OFDM symbols) are placed in any of "NR channel 2 labeled 1602", "NR channel 3 labeled 1603", and "NR channel 4 labeled 1604" on the time axis, and the NR channel to which the plurality of OFDM symbols (parts of OFDM symbols) belong is switched as time passes, the same as the above description can be implemented and the same effects can be obtained as well.

Further, in the case of FIG. 17E, the number of NR channels to which the plurality of OFDM symbols (parts of OFDM symbols) present at certain time belong is three, which are "NR channel 2 labeled 1602, NR channel 3 labeled 1603, and NR channel 4 labeled 1604", but the present disclosure is not limited to this, and the same as the above description can be implemented and the same effects can be obtained as long as the number of NR channels to which the plurality of OFDM symbols (parts of OFDM symbols) belong in FH is two or more.

Thus, a method of using time and frequency in FH in transmitting a modulation signal by gNB is not limited to the example of FIG. 17E, and the number of NR channels to which a plurality of OFDM symbols (parts of OFDM symbols) present at certain time belong in FH only needs to be one or more.

Figure 17F:
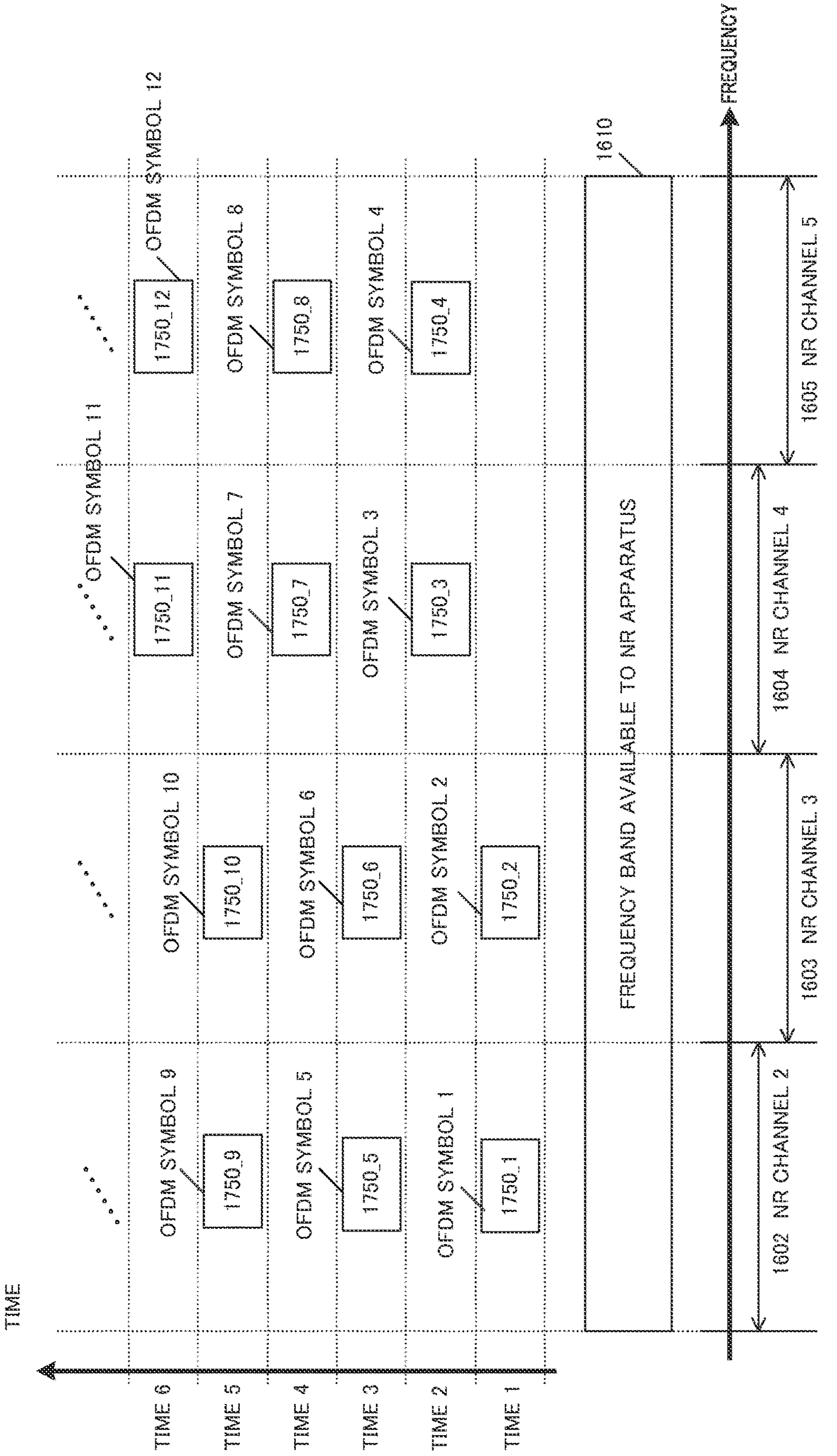
FIG. 17F illustrates an exemplary configuration of OFDM symbols for a modulation signal transmitted by gNB.

FIG. 17F illustrates, for example, an exemplary configuration of OFDM symbols (parts of OFDM symbols) for a modulation signal transmitted by gNB 1100 in FIG. 15, and the horizontal axis represents frequency while the vertical axis represents time. Note that, in FIG. 17F, components that operate in the same manner as in FIG. 16A are denoted by the same reference signs, and the description thereof will be partially omitted.

As illustrated in FIG. 17F, NR channel 2 labeled 1602, NR channel 3 labeled 1603, NR channel 4 labeled 1604, and NR channel 5 labeled 1605 are present for the frequency axis. In FIG. 17F, for example, "frequency band 1610 used by an NR apparatus" is present, and gNB 1100 in FIG. 15 transmits a modulation signal using "frequency band 1610 used by an NR apparatus", for example. Note that, in the example of FIG. 17F, "frequency band 1610 used by an NR apparatus" includes "all or part of NR channel 2 labeled 1602", "all or part of NR channel 3 labeled 1603", "all or part of NR channel 4 labeled 1604", and "all or part of NR channel 5 labeled 1605".

Then, as illustrated in FIG. 17F, gNB 1100 transmits modulation signals to a communication counterpart such as NR-UE #1 labeled 1101_1 in FIG. 15, for example, in the following manner, at time 1, gNB 1100 transmits modulation signals in OFDM symbol (part of OFDM symbol) I labeled 1750_1 included in NR channel 2 labeled 1602 and OFDM symbol (part of OFDM symbol) 2 labeled 1750_2 included in NR channel 3 labeled 1603; at time 2, gNB 1100 transmits modulation signals in OFDM symbol (part of OFDM symbol) 3 labeled 1750_3 included in NR channel 4 labeled 1604 and OFDM symbol (part of OFDM symbol) 4 labeled 1750_4 included in NR channel 5 labeled 1605; at time 3, gNB 1100 transmits modulation signals in OFDM symbol (part of OFDM symbol) 5 labeled 1750_5 included in NR channel 2 labeled 1602 and OFDM symbol (part of OFDM symbol) 6 labeled 1750_6 included in NR channel 3 labeled 1603; at time 4, gNB 110 transmits modulation signals in OFDM symbol (part of OFDM symbol) 7 labeled 1750_7 included in NR channel 4 labeled 1604 and OFDM symbol (part of OFDM symbol) 8 labeled 1750_8 included in NR channel 5 labeled 1605; at time 5, gNB 1100 transmits modulation signals in OFDM symbol (part of OFDM symbol) 9 labeled 1750_9 included in NR channel 2 labeled 1602 and OFDM symbol (part of OFDM symbol) 10 labeled 1750_10 included in NR channel 3 labeled 1603; at time 6, gNB 1100 transmits modulation signals in OFDM symbol (part of OFDM symbol) 11 labeled 1750_11 included in NR channel 4 labeled 1604 and OFDM symbol (part of OFDM symbol) 12 labeled 1750_12 included in NR channel 5 labeled 1605, and so forth.

The gNB transmits these modulation signals subjected to FH as in the example of FIG. 17F. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth.

In the example of FIG. 17F, "OFDM symbol (part of OFDM symbol) I labeled 1750_1 and OFDM symbol (part of OFDM symbol) 2 labeled 1750_2" are present at time 1, OFDM symbol (part of OFDM symbol) 1 labeled 1750_1 is present in NR channel 2 labeled 1602, and OFDM symbol (part of OFDM symbol) 2 labeled 17502 is present in NR channel 3 labeled 1603.

In addition, "OFDM symbol (part of OFDM symbol) 3 labeled 1750_3 and OFDM symbol (part of OFDM symbol) 4 labeled 1750_4" are present at time 2, OFDM symbol (part of OFDM symbol) 3 labeled 1750_3 is present in NR channel 4 labeled 1604, and OFDM symbol (part of OFDM symbol) 4 labeled 17504 is present in NR channel 5 labeled 1605.

"OFDM symbol (part of OFDM symbol) 5 labeled 1750_5 and OFDM symbol (part of OFDM symbol) 6 labeled 1750_6" are present at time 3, OFDM symbol (part of OFDM symbol) 5 labeled 1750_5 is present in NR channel 2 labeled 1602, and OFDM symbol (part of OFDM symbol) 6 labeled 17506 is present in NR channel 3 labeled 1603.

"OFDM symbol (part of OFDM symbol) 7 labeled 1750_7 and OFDM symbol (part of OFDM symbol) 8 labeled 1750_8" are present at time 4, OFDM symbol (part of OFDM symbol) 7 labeled 17507 is present in NR channel 4 labeled 1604, and OFDM symbol (part of OFDM symbol) 8 labeled 1750_8 is present in NR channel 5 labeled 1605.

"OFDM symbol (part of OFDM symbol) 9 labeled 1750_9 and OFDM symbol (part of OFDM symbol) 10 labeled 1750_10" are present at time 5, OFDM symbol (part of OFDM symbol) 9 labeled 1750_9 is present in NR channel 2 labeled 1602, and OFDM symbol (part of OFDM symbol) 10 labeled 1750_10 is present in NR channel 3 labeled 1603.

"OFDM symbol (part of OFDM symbol) 11 labeled 1750_11 and OFDM symbol (part of OFDM symbol) 12 labeled 1750_12" are present at time 6. OFDM symbol (part of OFDM symbol) 11 labeled 1750_11 is present in NR channel 4 labeled 1604, and OFDM symbol (part of OFDM symbol) 12 labeled 1750_12 is present in NR channel 5 labeled 1605.

Features in FIG. 17F in this case are as follows.

A plurality of OFDM symbols (parts of OFDM symbols) are present at the first time, at least one of the plurality of OFDM symbols (parts of OFDM symbols) belongs to the first NR channel, and at least one of the plurality of OFDM symbols (parts of OFDM symbols) belongs to the second NR channel.

For example, at time 1 (the first time), OFDM symbol (part of OFDM symbol) I labeled 1750_1 belonging to NR channel 2 labeled 1602 (the first NR channel) and OFDM symbol (part of OFDM symbol) 2 labeled 1750_2 belonging to NR channel 3 labeled 1603 (the second NR channel) are present at least.

Note that the above feature is found at time 2, time 3, and so forth.

FH is configured such that NR channels to which the plurality of OFDM symbols (parts of OFDM symbols) belong are switched as time passes.

For example, OFDM symbol (part of OFDM symbol) 1 labeled 1750_1 belonging to NR channel 2 labeled 1602 and OFDM symbol (part of OFDM symbol) 2 labeled 1750_2 belonging to NR channel 3 labeled 1603 are present at time 1, and OFDM symbol (part of OFDM symbol) 3 labeled 1750_3 belonging to NR channel 4 labeled 1604 and OFDM symbol (part of OFDM symbol) 4 labeled 1750_4 belonging to NR channel 5 labeled 1605 are present at time 2.

Note that, although not illustrated in FIG. 17F, the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1750_9', 'OFDM symbol (part of OFDM symbol) 10 labeled 1750_10', 'OFDM symbol (part of OFDM symbol) 11 labeled 1750_11', 'OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

The above-described manner leads to the similar effects to those described in the examples of FIGS. 17A, 17B, 17C, and 17D.

Note that the arrangement method for OFDM symbols (parts of OFDM symbols) in the frequency and time domains is not limited to the example of FIG. 17F.

Also in FIG. 17F, the plurality of OFDM symbols (parts of OFDM symbols) are arranged on the time axis in the order of "NR channel 2 labeled 1602 and NR channel 3 labeled 1603", "NR channel 4 labeled 1604 and NR channel 5 labeled 1605", "NR channel 2 labeled 1602 and NR channel 3 labeled 1603", "NR channel 4 labeled 1604 and NR channel 5 labeled 1605", and so forth, but the arrangement of OFDM symbols (parts of OFDM symbols) is not limited to this. For example, the order of NR channels to which the plurality of OFDM symbols (parts of OFDM symbols) belong is not limited to this example.

For example, as long as FH is performed such that a plurality of OFDM symbols (parts of OFDM symbols) are placed in a plurality of NR channels on the time axis, and the plurality of NR channels to which the plurality of OFDM symbols (parts of OFDM symbols) belong are switched as time passes, the same as the above description can be implemented and the same effects can be obtained as well.

Further, in the case of FIG. 17F, the number of NR channels to which the plurality of OFDM symbols (parts of OFDM symbols) present at certain time belong is four, which are "NR channel 2 labeled 1602, NR channel 3 labeled 1603, NR channel 4 labeled 1604, and NR channel 5 labeled 1605", but the present disclosure is not limited to this, and the same as the above description can be implemented and the same effects can be obtained as long as the number of NR channels to which the plurality of OFDM symbols (parts of OFDM symbols) belong in FH is two or more.

Thus, a method of using time and frequency in FH in transmitting a modulation signal by gNB is not limited to the example of FIG. 17F, and the number of NR channels to which a plurality of OFDM symbols (parts of OFDM symbols) present at certain time belong in FH only needs to be two or more.

Figure 17G:
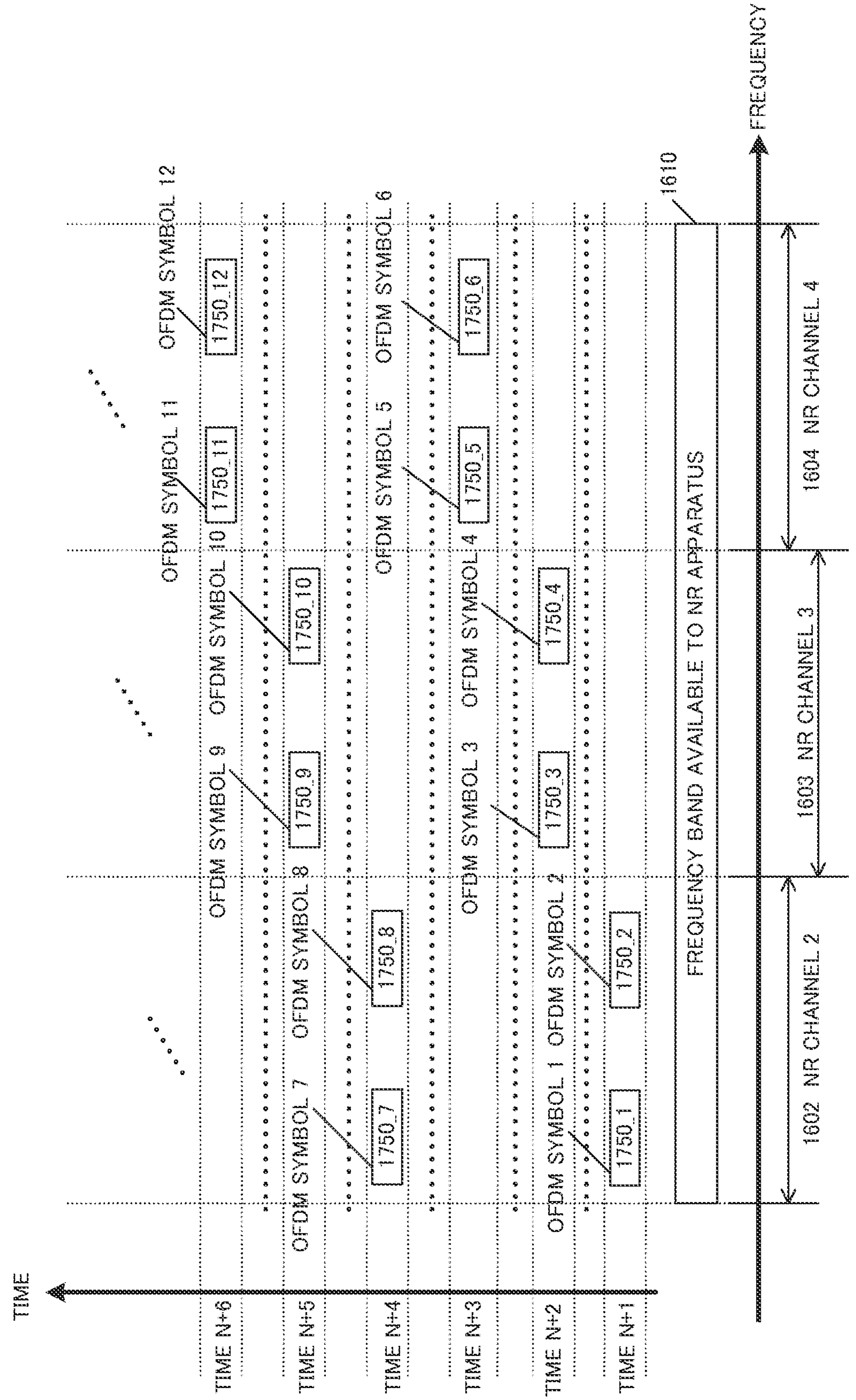
FIG. 17G illustrates an exemplary configuration of OFDM symbols for a modulation signal transmitted by gNB.

FIG. 17G illustrates, for example, an exemplary configuration of OFDM symbol (part of OFDM symbol) for a modulation signal transmitted by gNB 1100 in FIG. 15, and the horizontal axis represents frequency while the vertical axis represents time. Note that, in FIG. 17G, components that operate in the same manner as in FIG. 16A are denoted by the same reference signs, and the description thereof will be partially omitted.

As illustrated in FIG. 17G, NR channel 2 labeled 1602, NR channel 3 labeled 1603, and NR channel 4 labeled 1604 are present for the frequency axis. In FIG. 17G, for example. "frequency band 1610 used by an NR apparatus" is present, and gNB 1100 in FIG. 15 transmits a modulation signal using "frequency band 1610 used by an NR apparatus", for example. Note that, in the example of FIG. 17G, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 17G, gNB 1100 transmits modulation signals to a communication counterpart such as NR-UE #1 labeled 1101_1 in FIG. 15, for example, in the following manner: at time N+1, gNB 1100 transmits modulation signals in "OFDM symbol (part of OFDM symbol) 1 labeled 1750_1 and OFDM symbol (part of OFDM symbol) 2 labeled 1750_2" included in NR channel 2 labeled 1602; at time N+2, gNB 1100 transmits modulation signals in "OFDM symbol (part of OFDM symbol) 3 labeled 1750_3 and OFDM symbol (part of OFDM symbol) 4 labeled

1750_4" included in NR channel 3 labeled 1603; at time N+3, gNB 1100 transmits modulation signals in "OFDM symbol (part of OFDM symbol) 5 labeled 1750_5 and OFDM symbol (part of OFDM symbol) 6 labeled 1750_6" included in NR channel 4 labeled 1604; at time N+4, gNB 1100 transmits modulation signals in "OFDM symbol (part of OFDM symbol) 7 labeled 1750_7 and OFDM symbol (part of OFDM symbol) 8 labeled 1750_8" included in NR channel 2 labeled 1602, at time N+5, gNB 1100 transmits modulation signals in "OFDM symbol (part of OFDM symbol) 9 labeled 1750_9 and OFDM symbol (part of OFDM symbol) 10 labeled 1750_10" included in NR channel 3 labeled 1603; at time N+6, gNB 1100 transmits modulation signals in "OFDM symbol (part of OFDM symbol) 11 labeled 1750_11 and OFDM symbol (part of OFDM symbol) 12 labeled 1750_12" included in NR channel 4 labeled 1604, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present between time N+i and time N+i+1. Here, N is an integer equal to or greater than 0, and i is an integer equal to or greater than 1.

The gNB transmits these modulation signals subjected to FH as in the example of FIG. 17G. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth.

In the example of FIG. 17G, "OFDM symbol (part of OFDM symbol) I labeled 1750_1 and OFDM symbol (part of OFDM symbol) 2 labeled 1750_2" are present at time N+1, and "OFDM symbol (part of OFDM symbol) 1 labeled 1750_1 and OFDM symbol (part of OFDM symbol) 2 labeled 1750_2" are present in NR channel 2 labeled 1602.

In addition, "OFDM symbol (part of OFDM symbol) 3 labeled 1750_3 and OFDM symbol (part of OFDM symbol) 4 labeled 1750_4" are present at time N+2, and "OFDM symbol (part of OFDM symbol) 3 labeled 1750_3 and OFDM symbol (part of OFDM symbol) 4 labeled 1750_4" are present in NR channel 3 labeled 1603.

"OFDM symbol (part of OFDM symbol) 5 labeled 1750_5 and OFDM symbol (part of OFDM symbol) 6 labeled 1750_6" are present at time N+3, and "OFDM symbol (part of OFDM symbol) 5 labeled 1750_5 and OFDM symbol (part of OFDM symbol) 6 labeled 1750_6" are present in NR channel 4 labeled 1604.

"OFDM symbol (part of OFDM symbol) 7 labeled 1750_7 and OFDM symbol (part of OFDM symbol) 8 labeled 1750_8" are present at time N+4, and "OFDM symbol (part of OFDM symbol) 7 labeled 1750_7 and OFDM symbol (part of OFDM symbol) 8 labeled 1750_8" are present in NR channel 2 labeled 1602.

"OFDM symbol (part of OFDM symbol) 9 labeled 1750_9 and OFDM symbol (part of OFDM symbol) 10 labeled 1750_10" are present at time N+5, and "OFDM symbol (part of OFDM symbol) 9 labeled 1750_9 and OFDM symbol (part of OFDM symbol) 10 labeled 1750_10" are present in NR channel 3 labeled 1603.

"OFDM symbol (part of OFDM symbol) 11 labeled 1750_11 and OFDM symbol (part of OFDM symbol) 12 labeled 1750_12" are present at time N+6, and "OFDM symbol (part of OFDM symbol) 11 labeled 1750_11 and OFDM symbol (part of OFDM symbol) 12 labeled 1750_12" are present in NR channel 4 labeled 1604.

Features in FIG. 17G in this case are as follows.

A plurality of OFDM symbols (parts of OFDM symbols) belonging to the first NR channel are present at the first time.

For example, "OFDM symbol (part of OFDM symbol) I labeled 1750_1 and OFDM symbol (part of OFDM symbol) 2 labeled 1750_2" (a plurality of OFDM symbols (parts of OFDM symbols)) belonging to NR channel 2 labeled 1602 (the first NR channel) are present at time N+1 (the first time).

Note that the above feature is found at time N+2, time N+3, and so forth.

FH is configured such that a plurality of OFDM symbols (parts of OFDM symbols) that are present at the first time are present in the first NR channel and an NR channel to which the plurality of OFDM symbols (parts of OFDM symbols) belong is switched as time passes.

For example, "OFDM symbol (part of OFDM symbol) 1 labeled 1750_1 and OFDM symbol (part of OFDM symbol) 2 labeled 1750_2" (a plurality of OFDM symbols (parts of OFDM symbols)) belonging to NR channel 2 labeled 1602 are present at time N+1, and "OFDM symbol (part of OFDM symbol) 3 labeled 1750_3 and OFDM symbol (part of OFDM symbol) 4 labeled 1750_4" (a plurality of OFDM symbols (parts of OFDM symbols)) belonging to NR channel 3 labeled 1603 are present at time N+2.

Note that, although not illustrated in FIG. 17G, the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 17504', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1750_9', 'OFDM symbol (part of OFDM symbol) 10 labeled 1750_10', 'OFDM symbol (part of OFDM symbol) 11 labeled 1750_11, OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

The above-described manner leads to the similar effects to those described in the examples of FIGS. 17A, 17B, 17C, and 17D.

Note that the arrangement method for OFDM symbol (part of OFDM symbol) in the frequency and time domains is not limited to the example of FIG. 17G.

Also in FIG. 17G, the plurality of OFDM symbols (parts of OFDM symbols) are arranged on the time axis in the order of "NR channel 2 labeled 1602", "NR channel 3 labeled 1603", "NR channel 4 labeled 1604", "NR channel 2 labeled 1602", "NR channel 3 labeled 1603", "NR channel 4 labeled 1604", and so forth, but the arrangement of OFDM symbols (parts of OFDM symbols) is not limited to this. For example, the order of NR channels to which the plurality of OFDM symbols (parts of OFDM symbols) belong is not limited to this example.

For example, as long as FH is performed such that a plurality of OFDM symbols (parts of OFDM symbols) are placed in any of "NR channel 2 labeled 1602", "NR channel 3 labeled 1603", and "NR channel 4 labeled 1604" on the time axis, and the NR channel to which the plurality of OFDM symbols (parts of OFDM symbols) belong is switched as time passes, the same as the above description can be implemented and the same effects can be obtained as well.

Further, in the case of FIG. 17G, the number of NR channels to which the plurality of OFDM symbols (parts of OFDM symbols) present at certain time belong is three, which are "NR channel 2 labeled 1602, NR channel 3 labeled 1603, and NR channel 4 labeled 1604", but the present disclosure is not limited to this, and the same as the above description can be implemented and the same effects can be obtained as long as the number of NR channels to which the plurality of OFDM symbols (parts of OFDM symbols) belong in FH is two or more.

Thus, a method of using time and frequency in FH in transmitting a modulation signal by gNB is not limited to the example of FIG. 17G, and the number of NR channels to which a plurality of OFDM symbols (parts of OFDM symbols) present at certain time belong in FH only needs to be one or more.

Figure 17H:
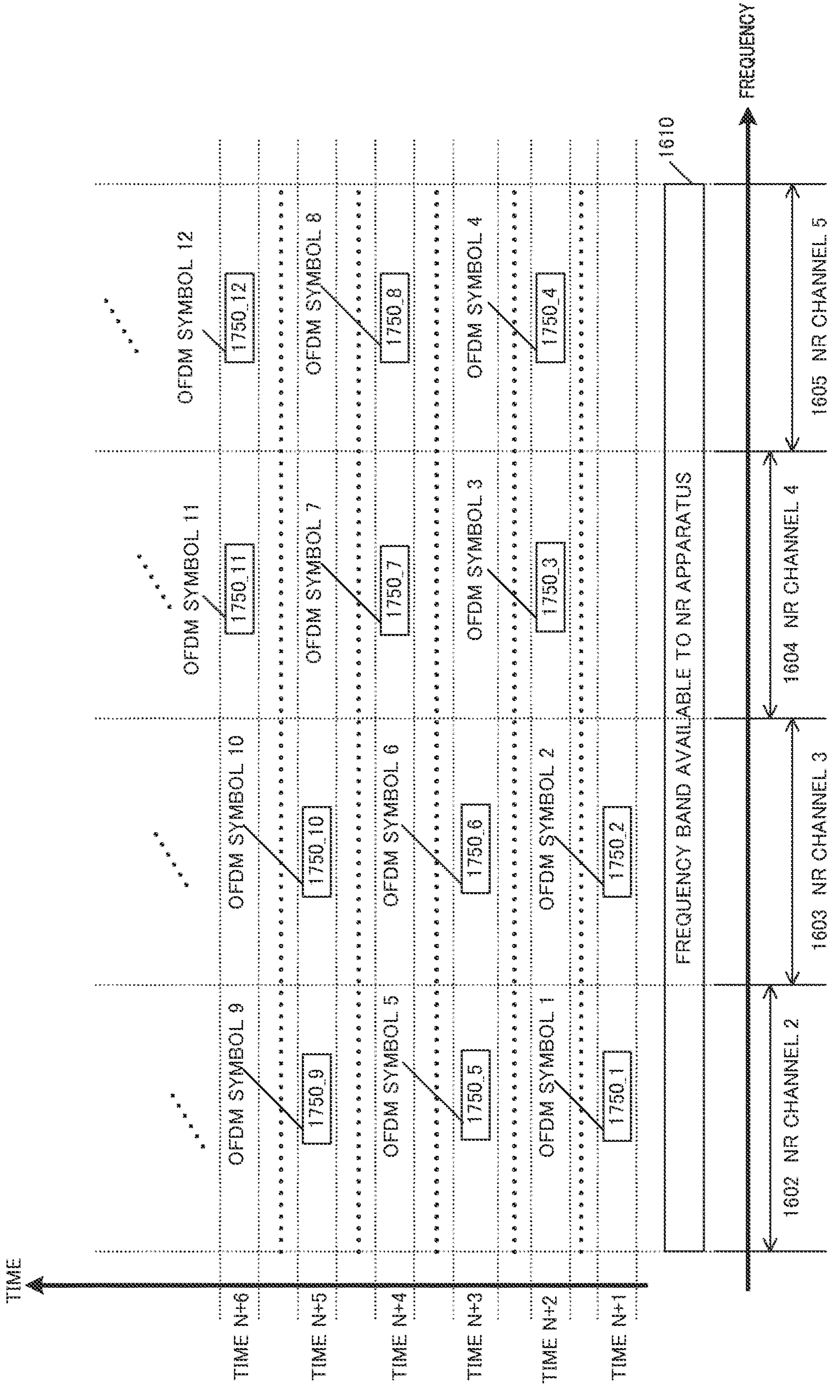
FIG. 17H illustrates an exemplary configuration of OFDM symbols for a modulation signal transmitted by gNB.

FIG. 17H illustrates, for example, an exemplary configuration of OFDM symbol (part of OFDM symbol) for a modulation signal transmitted by gNB 1100 in FIG. 15, and the horizontal axis represents frequency while the vertical axis represents time. Note that, in FIG. 17H, components that operate in the same manner as in FIG. 16A are denoted by the same reference signs, and the description thereof will be partially omitted.

As illustrated in FIG. 17H. NR channel 2 labeled 1602. NR channel 3 labeled 1603, NR channel 4 labeled 1604, and NR channel 5 labeled 1605 are present for the frequency axis. In FIG. 17H, for example, "frequency band 1610 used by an NR apparatus" is present, and gNB 1100 in FIG. 15 transmits a modulation signal using "frequency band 1610 used by an NR apparatus", for example. Note that, in the example of FIG. 17H, "frequency band 1610 used by an NR apparatus" includes "all or part of NR channel 2 labeled 1602", "all or part of NR channel 3 labeled 1603", "all or part of NR channel 4 labeled 1604", and "all or part of NR channel 5 labeled 1605".

Then, as illustrated in FIG. 17H, gNB 1100 transmits modulation signals to a communication counterpart such as NR-UE #1 labeled 1101_1 in FIG. 15, for example, in the following manner: at time N+1, gNB 1100 transmits modulation signals in OFDM symbol (part of OFDM symbol) I labeled 1750_1 included in NR channel 2 labeled 1602 and OFDM symbol (part of OFDM symbol) 2 labeled 1750_2 included in NR channel 3 labeled 1603; at time N+2, gNB 1100 transmits modulation signals in OFDM symbol (part of OFDM symbol) 3 labeled 1750_3 included in NR channel 4 labeled 1604 and OFDM symbol (part of OFDM symbol) 4 labeled 1750_4 included in NR channel 5 labeled 1605; at time N+3, gNB 1100 transmits modulation signals in OFDM symbol (part of OFDM symbol) 5 labeled 1750_5 included in NR channel 2 labeled 1602 and OFDM symbol (part of OFDM symbol) 6 labeled 1750_6 included in NR channel 3 labeled 1603; at time N+4, gNB 1100 transmits modulation signals in OFDM symbol (part of OFDM symbol) 7 labeled 1750_7 included in NR channel 4 labeled 1604 and OFDM symbol (part of OFDM symbol) 8 labeled 1750_8 included in NR channel 5 labeled 1605; at time N+5, gNB 1100 transmits modulation signals in OFDM symbol (part of OFDM symbol) 9 labeled 1750_9 included in NR channel 2 labeled 1602 and OFDM symbol (part of OFDM symbol) 10 labeled 1750_10 included in NR channel 3 labeled 1603; at time N+6, gNB 1100 transmits modulation signals in OFDM symbol (part of OFDM symbol) 11 labeled 1750_11 included in NR channel 4 labeled 1604 and OFDM symbol (part of OFDM symbol) 12 labeled 1750_12 included in NR channel 5 labeled 1605, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present between time N+i and time N+i+1. Here, N is an integer equal to or greater than 0, and i is an integer equal to or greater than 1.

The gNB transmits these modulation signals subjected to FH as in the example of FIG. 17H. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth.

In the example of FIG. 17H, "OFDM symbol (part of OFDM symbol) 1 labeled 1750_1 and OFDM symbol (part of OFDM symbol) 2 labeled 1750_2" are present at time N+1, OFDM symbol (part of OFDM symbol) I labeled 1750_1 is present in NR channel 2 labeled 1602, and OFDM symbol (part of OFDM symbol) 2 labeled 17502 is present in NR channel 3 labeled 1603.

In addition, "OFDM symbol (part of OFDM symbol) 3 labeled 1750_3 and OFDM symbol (part of OFDM symbol) 4 labeled 1750_4" are present at time N+2, OFDM symbol (part of OFDM symbol) 3 labeled 1750_3 is present in NR channel 4 labeled 1604, and OFDM symbol (part of OFDM symbol) 4 labeled 17504 is present in NR channel 5 labeled 1605.

"OFDM symbol (part of OFDM symbol) 5 labeled 1750_5 and OFDM symbol (part of OFDM symbol) 6 labeled 1750_6" are present at time N+3, OFDM symbol (part of OFDM symbol) 5 labeled 1750_5 is present in NR channel 2 labeled 1602, and OFDM symbol (part of OFDM symbol) 6 labeled 1750_6 is present in NR channel 3 labeled 1603.

"OFDM symbol (part of OFDM symbol) 7 labeled 1750_7 and OFDM symbol (part of OFDM symbol) 8 labeled 1750_8" are present at time N+4, OFDM symbol (part of OFDM symbol) 7 labeled 1750_7 is present in NR channel 4 labeled 1604, and OFDM symbol (part of OFDM symbol) 8 labeled 1750_8 is present in NR channel 5 labeled 1605.

"OFDM symbol (part of OFDM symbol) 9 labeled 1750_9 and OFDM symbol (part of OFDM symbol) 10 labeled 1750_10" are present at time N+5, OFDM symbol (part of OFDM symbol) 9 labeled 17509 is present in NR channel 2 labeled 1602, and OFDM symbol (part of OFDM symbol) 10 labeled 1750_10 is present in NR channel 3 labeled 1603.

"OFDM symbol (part of OFDM symbol) 11 labeled 1750_11 and OFDM symbol (part of OFDM symbol) 12 labeled 1750_12" are present at time N+6, OFDM symbol (part of OFDM symbol) 11 labeled 1750_11 is present in NR channel 4 labeled 1604, and OFDM symbol (part of OFDM symbol) 12 labeled 1750_12 is present in NR channel 5 labeled 1605.

Features in FIG. 17H in this case are as follows.

A plurality of OFDM symbols (parts of OFDM symbols) are present at the first time, at least one of the plurality of OFDM symbols (parts of OFDM symbols) belongs to the first NR channel, and at least one of the plurality of OFDM symbols (parts of OFDM symbols) belongs to the second NR channel.

For example, at time N+1 (the first time), OFDM symbol (part of OFDM symbol) 1 labeled 1750_1 belonging to NR channel 2 labeled 1602 (the first NR channel) and OFDM symbol (part of OFDM symbol) 2 labeled 1650_2 belonging to NR channel 3 labeled 1603 (the second NR channel) are present at least.

Note that the above feature is found at time N+2, time N+3, and so forth.

FH is configured such that NR channels to which the plurality of OFDM symbols (parts of OFDM symbols) belong are switched as time passes.

For example, OFDM symbol (part of OFDM symbol) 1 labeled 1750_1 belonging to NR channel 2 labeled 1602 and OFDM symbol (part of OFDM symbol) 2 labeled 1750_2 belonging to NR channel 3 labeled 1603 are present at time N+1, and OFDM symbol (part of OFDM symbol) 3 labeled 1750_3 belonging to NR channel 4 labeled 1604 and OFDM symbol (part of OFDM symbol) 4 labeled 1750_4 belonging to NR channel 5 labeled 1605 are present at time N+2.

Note that, although not illustrated in FIG. 17H, the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1750_9', 'OFDM symbol (part of OFDM symbol) 10 labeled 1750_10', 'OFDM symbol (part of OFDM symbol) 11 labeled 1750_11', 'OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6" belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

The above-described manner leads to the similar effects to those described in the examples of FIGS. 17A, 17B, 17C, and 17D.

Note that the arrangement method for OFDM symbol (part of OFDM symbol) in the frequency and time domains is not limited to the example of FIG. 17H.

Also in FIG. 17H, the plurality of OFDM symbols (parts of OFDM symbols) are arranged on the time axis in the order of "NR channel 2 labeled 1602 and NR channel 3 labeled 1603", "NR channel 4 labeled 1604 and NR channel 5 labeled 1605", "NR channel 2 labeled 1602 and NR channel 3 labeled 1603", "NR channel 4 labeled 1604 and NR channel 5 labeled 1605", and so forth, but the arrangement of OFDM symbols (parts of OFDM symbols) is not limited to this. For example, the order of NR channels to which the plurality of OFDM symbols (parts of OFDM symbols) belong is not limited to this example.

For example, as long as FH is performed such that a plurality of OFDM symbols (parts of OFDM symbols) are placed in a plurality of NR channels on the time axis, and the plurality of NR channels to which the plurality of OFDM symbols (parts of OFDM symbols) belong are switched as time passes, the same as the above description can be implemented and the same effects can be obtained as well.

Further, in the case of FIG. 17H, the number of NR channels to which the plurality of OFDM symbols (parts of OFDM symbols) present at certain time belong is four, which are "NR channel 2 labeled 1602, NR channel 3 labeled 1603, NR channel 4 labeled 1604, and NR channel 5 labeled 1605", but the present disclosure is not limited to this, and the same as the above description can be implemented and the same effects can be obtained as long as the number of NR channels to which the plurality of OFDM symbols (parts of OFDM symbols) belong in FH is two or more.

Thus, a method of using time and frequency in FH in transmitting a modulation signal by gNB is not limited to the example of FIG. 17H, and the number of NR channels to which a plurality of OFDM symbols (parts of OFDM symbols) present at certain time belong in FH only needs to be two or more.

While a description has been given of an example related to the configuration value of SCS of OFDM and the number of OFDM symbols (parts of OFDM symbols) composing a slot when an NR apparatus performs FH as described above, the following is preferably satisfied in the present disclosure to reduce interference to another apparatus regardless of performing LBT or not.

A plurality of SCS values are available as the SCS of OFDM, and an NR apparatus selects an SCS value to be used in generating and transmitting a modulation signal among the plurality of SCS values. At this time, the NR apparatus selects the greatest SCS value to reduce interference.

Thus, when the NR apparatus has the "no-LBT mode", for example, the "no-LBT mode" preferably has the function of enabling to select the greatest SCS value at least.

A plurality values are available as "the number of OFDM symbols (parts of OFDM symbols) composing a slot", and an NR apparatus selects "the number of OFDM symbols (parts of OFDM symbols) composing a slot" to be used in generating and transmitting a modulation signal among the plurality of values. At this time, the NR apparatus selects the smallest value among the plurality of values as "the number of OFDM symbols (parts of OFDM symbols) composing a slot" to reduce interference.

Thus, when the NR apparatus has the "no-LBT mode", for example, the "no-LBT mode" preferably has the function of enabling to select the smallest number among "the numbers of OFDM symbols (parts of OFDM symbols) composing a slot".

Taking the above into the consideration, an exemplary relationship between the "LBT mode" and the "no-LBT mode" will be described.

The description will be based on the NR system of 52.6 GHz or higher (and 71 GHz or lower), e.g., 60 GHz band, by way of example. It is assumed that an NR apparatus supports (has) the "LBT mode" and/or the "no-LBT mode".

In the "LBT mode", 120 kHz, 240 kHz, 480 kHz, and 960 kHz are supported as the SCS value of OFDM. Thus, the NR apparatus selects any of 120 kHz, 240 kHz, 480 kHz, and 960 kHz as the SCS value of OFDM when transmitting and receiving a modulation signal in the "LBT mode".

In the "no-LBT mode", 960 kHz, for example, is supported as the SCS value of OFDM. Thus, the NR apparatus selects 960 kHz as the SCS value of OFDM when transmitting and receiving a modulation signal in the "no-LBT mode".

As another example for the "no-LBT mode", it is assumed that 480 kHz and 960 kHz, for example, are supported as the SCS value of OFDM in the "no-LBT mode". Thus, the NR apparatus selects either 480 kHz or 960 kHz as the SCS value of OFDM when transmitting and receiving a modulation signal in the "no-LBT mode".

The above description is given as an example, and when the minimum supported value of the SCS of OFDM in the "LBT mode" is A (Hz) and the minimum supported value of the SCS of OFDM in the "no-LBT mode" is B (Hz), for example, it is also suitable to configure that B is greater than A (B>A). Note that A and B are real numbers greater than 0.

The above manner produces an effect that an NR apparatus is less likely to cause interference to another apparatus when selecting the "no-LBT mode" and transmitting a modulation signal.

Note that the above effect can be obtained when a modulation signal is transmitted, regardless of whether "the NR apparatus performs FH or not" in the "LBT mode" or the "no-LBT mode", but a greater effect is possibly expected with FH.

A description related to a slot will be given based on the NR system of 52.6 GHz or higher (and 71 GHz or lower), e.g., 60 GHz band, by way of example. It is assumed that an NR apparatus supports (has) the "LBT mode" and/or the "no-LBT mode".

In the "LBT mode", it is assumed that integers from 1 to 14 (both inclusive) or integers from 2 to 14 (both inclusive) are supported as the number of OFDM symbols (part of one OFDM symbol) composing one slot. Thus, when transmitting and receiving a modulation signal in the "LBT mode", the NR apparatus selects any of integers from 1 to 14 (both inclusive) or any of integers from 2 to 14 (both inclusive) as the number of OFDM symbols (part of one OFDM symbol) composing one slot.

In the "no-LBT mode", it is assumed that 1 or integers from 1 to 4 (both inclusive), for example, are supported as the number of OFDM symbols (part of one OFDM symbol) composing one slot. Thus, when transmitting and receiving a modulation signal in the "no-LBT mode", the NR apparatus selects 1 or any of integers from 1 to 4 (both inclusive) as the number of OFDM symbols (part of one OFDM symbol) composing one slot.

The above description is given as an example, and when the maximum supported value of "the number of OFDM symbols (part of one OFDM symbol) composing one slot" in the "LBT mode" is X and the maximum supported value of "the number of OFDM symbols (part of one OFDM symbol) composing one slot" in the "no-LBT mode" is Y, for example, it is also suitable to configure that X is greater than Y (X>Y). Note that X and Y are integers greater than 1.

The above manner produces an effect that an NR apparatus is less likely to cause interference to another apparatus when selecting the "no-LBT mode" and transmitting a modulation signal.

Note that the above effect can be obtained when a modulation signal is transmitted, regardless of whether "the NR apparatus performs FH or not" in the "LBT mode" or the "no-LBT mode", but a greater effect is possibly expected with FH.

A description will be given of "the SCS value" and "the number of OFDM symbols (part of one OFDM symbol) composing one slot", in particular, in the "area (or country) where LBT is not performed", the "area (or country) where LBT may be performed", and the "area (or country) where LBT is necessary".

The description will be based on the NR system of 52.6 GHz or higher (and 71 GHz or lower), e.g., 60 GHz band, by way of example.

It is assumed that an NR apparatus operates in the mode of performing LBT in the "area (or country) where LBT may be performed" and the "area (or country) where LBT is necessary".

In the "mode of performing LBT", 120 kHz, 240 kHz, 480 kHz, and 960 kHz are supported as the SCS value of OFDM. Thus, the NR apparatus selects any of 120 kHz, 240 kHz, 480 kHz, and 960 kHz as the SCS value of OFDM when transmitting and receiving a modulation signal in the "mode of performing LBT".

It is assumed that an NR apparatus operates in the mode of not performing LBT in the "area (or country) where LBT is not performed" and the "area (or country) where LBT may be performed".

In the "mode of not performing LBT", 960 kHz, for example, is supported as the SCS value of OFDM. Thus, the NR apparatus selects 960 kHz as the SCS value of OFDM when transmitting and receiving a modulation signal in the "mode of not performing LBT".

As another example for the "mode of not performing LBT", it is assumed that 480 kHz and 960 kHz, for example, are supported as the SCS value of OFDM in the "mode of not performing LBT". Thus, the NR apparatus selects either 480 kHz or 960 kHz as the SCS value of OFDM when transmitting and receiving a modulation signal in the "mode of not performing LBT".

The above description is given as an example, and when the minimum supported value of the SCS of OFDM in the "mode of performing LBT" is A (Hz) and the minimum supported value of the SCS of OFDM in the "mode of not performing LBT" is B (Hz), for example, it is also suitable to configure that B is greater than A (B>A). Note that A and B are real numbers greater than 0.

The above manner produces an effect that an NR apparatus is less likely to cause interference to another apparatus when operating in the "mode of not performing LBT" and transmitting a modulation signal.

Note that the above effect can be obtained when a modulation signal is transmitted, regardless of whether "the NR apparatus performs FH or not" in an operation in the "mode of performing LBT" or in an operation in the "mode of not performing LBT", but a greater effect is possibly expected with FH.

The description will be based on the NR system of 52.6 GHz or higher (and 71 GHz or lower), e.g., 60 GHz band, by way of example.

It is assumed that an NR apparatus operates in the mode of performing LBT in the "area (or country) where LBT may be performed" and the "area (or country) where LBT is necessary".

In the "mode of performing LBT", it is assumed that integers from 1 to 14 (both inclusive) or integers from 2 to 14 (both inclusive) are supported as the number of OFDM symbols (part of one OFDM symbol) composing one slot. Thus, when transmitting and receiving a modulation signal in the "mode of performing LBT", the NR apparatus selects any of integers from 1 to 14 (both inclusive) or any of integers from 2 to 14 (both inclusive) as the number of OFDM symbols (part of one OFDM symbol) composing one slot.

It is assumed that an NR apparatus operates in the mode of not performing LBT in the "area (or country) where LBT is not performed" and the "area (or country) where LBT may be performed".

In the "mode of not performing LBT", it is assumed that 1 or integers from 1 to 4 (both inclusive), for example, are supported as the number of OFDM symbols (part of one OFDM symbol) composing one slot. Thus, when transmitting and receiving a modulation signal in the "mode of not performing LBT", the NR apparatus selects 1 or any of integers from 1 to 4 (both inclusive) as the number of OFDM symbols (part of one OFDM symbol) composing one slot.

The above description is given as an example, and when the maximum supported value of "the number of OFDM symbols (part of one OFDM symbol) composing one slot" in the "mode of performing LBT" is X and the maximum supported value of "the number of OFDM symbols (part of one OFDM symbol) composing one slot" in the "mode of not performing LBT" is Y, for example, it is also suitable to configure that X is greater than Y (X>Y). Note that X and Y are integers greater than 1.

The above manner produces an effect that an NR apparatus is less likely to cause interference to another apparatus when operating in the "mode of not performing LBT" and transmitting a modulation signal.

Note that the above effect can be obtained when a modulation signal is transmitted, regardless of whether "the NR apparatus performs FH or not" in an operation in the "mode of performing LBT" or in an operation in the "mode of not performing LBT", but a greater effect is possibly expected with FH.

Although FIGS. 16A, 16C, 16D, 16E, 16F, 16G, 16H, and 16I illustrate exemplary arrangement of slots that transmit data on the frequency and time axes, a signal other than the slots, e.g., a reference signal (RS) such as a demodulation reference signal (DMRS) and a phase tracking reference signal (PTRS), may be present in a modulation signal to be transmitted. For example, RS such as DMRS and PTRS may be present at any of the times in the frequency where a slot is present.

In addition, to indicate information on the frequencies where slots that transmit data are present (information on frequency hopping) and information on FH (the number of OFDM symbols composing a slot, the time at which the slot is placed, the interval of frequency hopping, etc.) to a communication counterpart, a frame for transmitting control information including such information may be placed on the frequency and time axes in FIGS. 16A, 16C, 16D, 16E, 16F, 16G, 16H, and 16I.

In FIGS. 16A, 16C, 16D, 16E, 16F, 16G, 16H, and 16I, each slot (e.g., slot 1 labeled 1650_1, slot 2 labeled 1650_2, slot 3 labeled 1650_3, and so forth) may be composed of a plurality of slots. To be more specific. "slot 1 labeled 1650_1" in FIGS. 16A, 16C, 16D, 16E, 16F, 16G, 16H, and 16I, for example, may be composed of a plurality of slots. In addition, the plurality of slots may be transmitted in the same frequency at the same time using a plurality of antennas, for example. That is, each slot in FIGS. 16A, 16C, 16D, 16E, 16F, 16G, 16H, and 16I may be transmitted using multiple input multiple output (MIMO).

A description will be given with reference to FIG. 16A, by way of example. It is assumed that slot 1 labeled 1650_1 is composed of a plurality of slots. In this case, the plurality of slots are present at time 1 in the frequency where slot 1 labeled 1650_1 is placed in FIG. 16A, and are transmitted using a plurality of antennas, for example.

Likewise, it is assumed that slot i labeled **1650_*i* is composed of a plurality of slots in FIG. 16A. In this case, the plurality of slots are transmitted at time i in the frequency where slot i labeled 1650_*i* is placed in FIG. 16**A using a plurality of antennas, for example. Note that i is an integer equal to or greater than 1.

Note that this applies to FIGS. 16C, 16D, 16E, 16F, 16G, 16H, and 16I as well.

Although FIGS. 17A, 17B, 17C, 17D, 17E, 17F, 17G, and 17H illustrate exemplary arrangement of OFDM symbols (parts of OFDM symbols) that transmit data on the frequency and time axes, a signal other than the OFDM symbols (parts of OFDM symbols), e.g., RS such as DMRS and PTRS, may be present in a modulation signal to be transmitted. For example, RS such as DMRS and PTRS may be present at any of the times in the frequency where an OFDM symbol (part of OFDM symbol) is present.

In addition, to indicate information on the frequencies where OFDM symbols (parts of OFDM symbols) that transmit data are present (information on frequency hopping) and information on FH (the number of OFDM symbols composing a slot, the time at which the slot is placed, the interval of frequency hopping, etc.) to a communication counterpart, a frame for transmitting control information including such information may be placed on the frequency and time axes in FIGS. 17A, 17B, 17C, 17D, 17E, 17F, 17G, and 17H.

In FIGS. 17A, 17B, 17C, 17D, 17E, 17F, 17G, and 17H, each OFDM symbol (part of OFDM symbol), e.g., OFDM symbol (part of OFDM symbol) I labeled 1750_1. OFDM symbol (part of OFDM symbol) 2 labeled 1750_2, OFDM symbol (part of OFDM symbol) 3 labeled 1750_3, and so forth, may be composed of a plurality of OFDM symbols (parts of OFDM symbols). To be more specific, "OFDM symbol (part of OFDM symbol) 1 labeled 1750_1" in FIGS. 17A, 17B, 17C, 17D, 17E, 17F, 17G, and 17H, for example, may be composed of a plurality of OFDM symbols (parts of OFDM symbols). In addition, the plurality of OFDM symbols (parts of OFDM symbols) may be transmitted in the same frequency at the same time using a plurality of antennas, for example. That is, each OFDM symbol (part of OFDM symbol) in FIGS. 17A, 17B, 17C, 17D, 17E, 17F, 17G, and 17H may be transmitted using MIMO.

A description will be given with reference to FIG. 17A, by way of example. It is assumed that OFDM symbol (part of OFDM symbol) 1 labeled 1750_1 is composed of a plurality of slots. In this case, the plurality of OFDM symbols (parts of OFDM symbols) are placed at time 1 in the frequency where OFDM symbol (part of OFDM symbol) 1 labeled 1750_1 is placed in FIG. 17A, and are transmitted using a plurality of antennas, for example.

Likewise, OFDM symbol (part of OFDM symbol) i labeled **1750_*i* in FIG. 17A may be composed of OFDM symbols (parts of OFDM symbols). In this case, the plurality of OFDM symbols (parts of OFDM symbols) are placed at time i in the frequency where OFDM symbol (part of OFDM symbol) i labeled 1750_*i* is placed in FIG. 17**A, and are transmitted using a plurality of antennas, for example. Note that i is an integer equal to or greater than 1.

Note that this applies to FIGS. 17B, 17C, 17D, 17E, 17F, 17G, and 17H as well.

Transmitting a modulation signal by an NR apparatus in the above manner produces an effect that interference to another apparatus is less likely to be caused.

Note that a frequency diversity effect can be obtained by introducing FH. This produces an effect of improving data reception quality, for example.

Not only gNB performs transmission of a modulation signal by FH exemplified in FIGS. 16A, 16C, 16D, 16E, 16F, 16G, 16H, 16I, 17A, 17B, 17C, 17D, 17E, 17F, 17G, and 17H. NR-UE, a repeater, a transmission (Tx)/reception (Rx) point (TRP), and an apparatus or system including a communication apparatus may perform transmission of a modulation signal by FH exemplified in FIGS. 16A, 16C, 16D, 16E, 16F, 16G, 16H, 16I, 17A, 17B, 17C, 17D, 17E, 17F, 17G, and 17H.

A configuration of NR channels composing "frequency band 1610 used by an NR apparatus" is not limited to those in FIGS. 16A, 16C, 16D, 16E, 16F, 16G, 16H, 16I, 17A, 17B, 17C, 17D, 17E, 17F, 17G, and 17H, and the same can be implemented and the same effects can be obtained as long as "frequency band 1610 used by an NR apparatus" includes a plurality of "all or part of NR channels".

The "NR channels" in FIGS. 16A, 16B, 16C, 16D, 16E, 16F, 16G, 16H, 16I, 17A, 17B, 17C, 17D, 17E, 17F, 17G, and 17H may be referred to as NR operating band(s), NR band(s), or component carrier (CC).

In the following, an example different from the above will be described.

Figure 18:
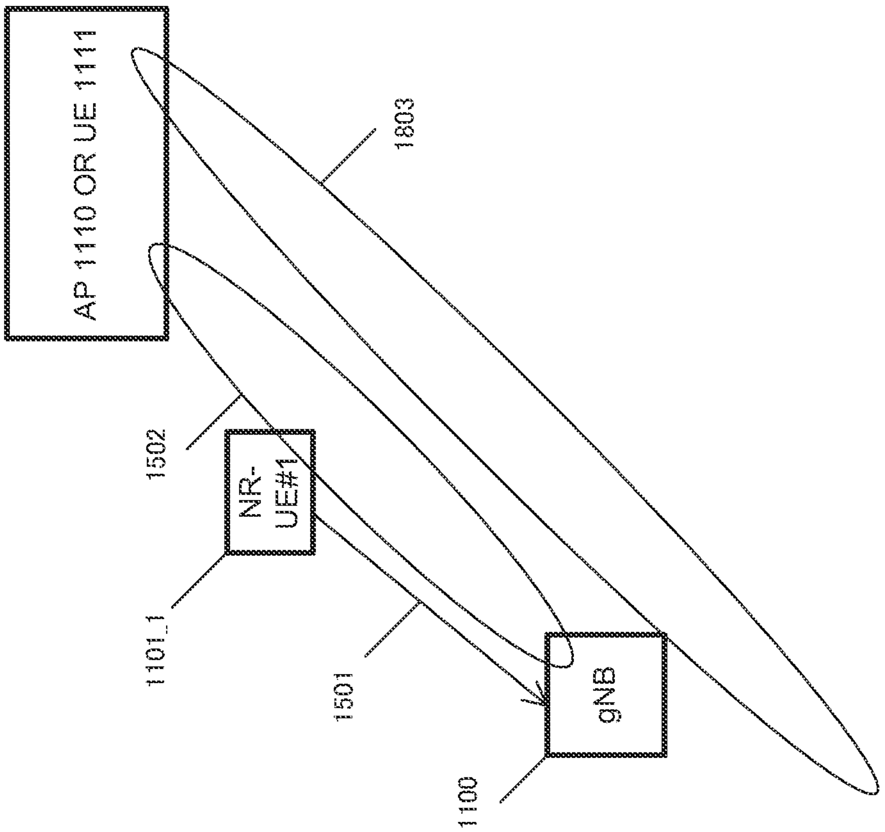
FIG. 18 illustrates a specific example of a communication state.

FIG. 18 illustrates a specific example of a communication state. Note that, in FIG. 18, the components that operate in the same manner as in FIGS. 11 and 15 are denoted by the same reference signs, and the descriptions thereof will be omitted.

For example, NR-UE #1 labeled 1101_1 in FIG. 18 transmits a modulation signal to gNB 1100 (1501).

For example, gNB 1100 transmits a modulation signal to NR-UE #1 labeled 1101_1 using transmit beam 1502.

At this time, transmit beam 1502 reaches "AP 1110 or UE 1111", and transmit beam 1502 interferes with "AP 1110 or UE 1111". In such a situation, "AP 1110 or UE 1111" sometimes transmits a modulation signal using transmit beam 1803.

Meanwhile, gNB 1100 performs LBT before transmitting a modulation signal using transmit beam 1502 and controls the transmission of the modulation signal using transmit beam 1502. At this time, when gNB 1100 does not transmit a modulation signal using transmit beam 1502 based on the result of LBT, the data transmission efficiency is reduced.

Figure 19A:
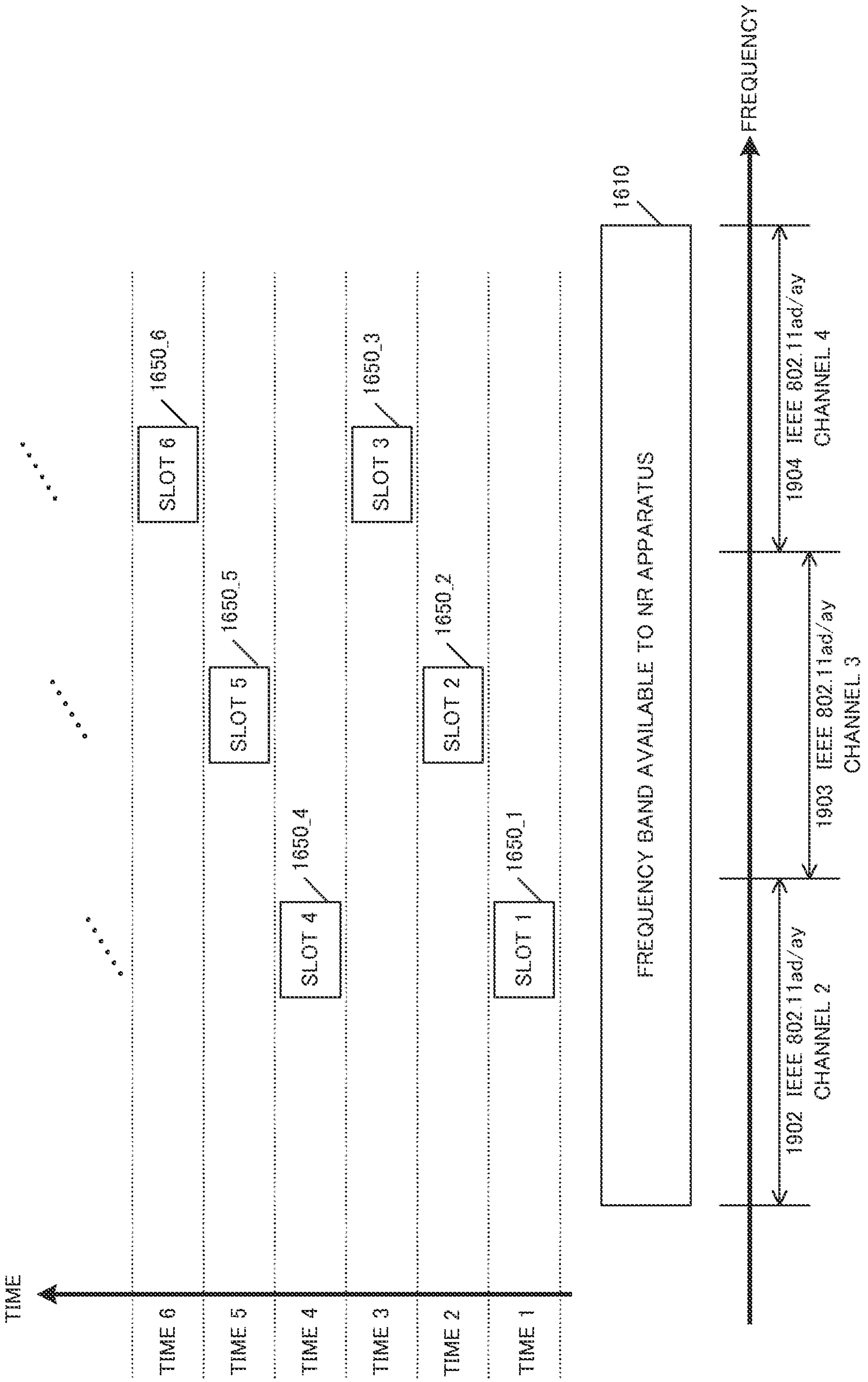
FIG. 19A illustrates an exemplary configuration of slots for a modulation signal transmitted by gNB.

FIG. 19A illustrates a communication method to address these issues.

FIG. 19A illustrates, for example, an exemplary configuration of slots for a modulation signal transmitted by gNB 1100 in FIG. 18, and the horizontal axis represents frequency while the vertical axis represents time. Note that, in FIG. 19A, components that operate in the same manner as in FIG. 16A are denoted by the same reference signs, and the description thereof will be partially omitted. Note that a modulation signal transmitted by gNB 1100 is a modulation signal of NR, for example.

As illustrated in FIG. 19A, "IEEE 802.11ad and/or IEEE 802.11ay channel 2" labeled 1902, IEEE 802.11ad and/or IEEE 802.11ay channel 3" labeled 1903, and IEEE 802.11ad and/or IEEE 802.11ay channel 4" labeled 1904 are present for the frequency axis. In FIG. 19A, for example, "frequency band 1610 used by an NR apparatus" is present, and gNB 1100 in FIG. 18 transmits a modulation signal using "frequency band 1610 used by an NR apparatus", for example.

Note that, in the example of FIG. 19A, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Note that the bandwidth of the "IEEE 802.11ad and/or IEEE 802.11ay channel" is 2.16 GHz.

Then, as illustrated in FIG. 19A, gNB 1100 transmits modulation signals to a communication counterpart such as NR-UE #1 labeled 1101_1 in FIG. 18, for example, in the following manner: at time 1, gNB 1100 transmits a modulation signal in slot 1 labeled 1650_1 included in "IEEE 802.11ad and/or IEEE 802.11ay channel 2" labeled 1902; at time 2, gNB 1100 transmits a modulation signal in slot 2 labeled 1650_2 included in "IEEE 802.11ad and/or IEEE 802.11ay channel 3" labeled 1903; at time 3, gNB 1100 transmits a modulation signal in slot 3 labeled 1650_3 included in "IEEE 802.11ad and/or IEEE 802.11ay channel 4" labeled 1904; at time 4, gNB 1100 transmits a modulation signal in slot 4 labeled 1650_4 included in "IEEE 802.11ad and/or IEEE 802.11ay channel 2" labeled 1902; at time 5, gNB 1100 transmits a modulation signal in slot 5 labeled 1650_5 included in "IEEE 802.11ad and/or IEEE 802.11ay channel 3" labeled 1903; at time 6, gNB 1100 transmits a modulation signal in slot 6 labeled 1650_6 included in "IEEE 802.11ad and/or IEEE 802.11ay channel 4" labeled 1904, and so forth.

The gNB transmits these modulation signals subjected to frequency hopping (FH) as in the example of FIG. 19A. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

For example, the frequency of "slot 1 labeled 1650_1" and the frequency of "slot 4 labeled 1650_4" may be the same or overlapped partially.

Likewise, the frequency of "slot 2 labeled 1650_2" and the frequency of "slot 5 labeled 1650_5" may, for example, be the same or overlapped partially.

For example, the frequency of "slot 3 labeled 1650_3" and the frequency of "slot 6 labeled 1650_6" may be the same or overlapped partially.

Note that, although not illustrated in FIG. 19A, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19A, NR channels for the modulation signals transmitted by gNB 1100 are not illustrated.

Figure 19B:
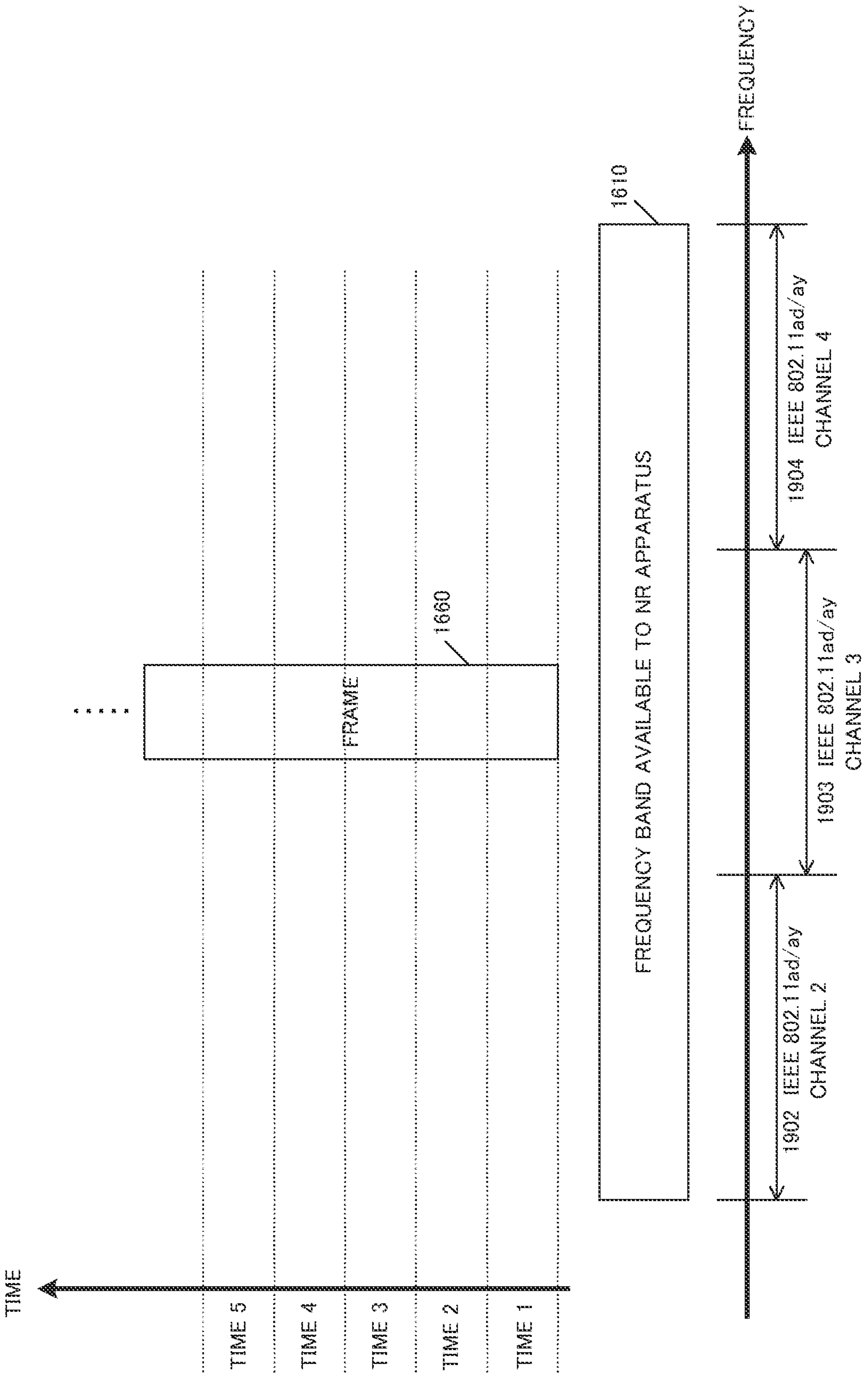
FIG. 19B illustrates an exemplary configuration of slots for a modulation signal transmitted by gNB.

FIG. 19B illustrates an exemplary configuration of a frame for a modulation signal transmitted by gNB 1100 in FIG. 18, and the horizontal axis represents frequency while the vertical axis represents time. Note that, in FIG. 19B, components that operate in the same manner as in FIGS. 16A and 19A are denoted by the same reference signs. Note that a modulation signal transmitted by gNB 1100 is a modulation signal of NR, for example.

As illustrated in FIG. 19B, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 19B, for example, "frequency band 1610 used by an NR apparatus" is present, and gNB 1100 in FIG. 18 transmits a modulation signal using "frequency band 1610 used by an NR apparatus", for example. Note that, in the example of FIG. 19B, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 19B, gNB 110) transmits modulation signals to a communication counterpart such as NR-UE #1 labeled 1101_1 in FIG. 18, for example, in the following manner: at time 1, time 2, time 3, time 4, time 5, and so forth, gNB 1100 transmits a modulation signal in frame 1660 included in "IEEE 802.11ad and/or IEEE 802.11ay channel 3" labeled 1903.

Note that frame 1660 includes data to be transmitted to NR-UE #1 being the communication counterpart labeled 1101_1.

Note that, although not illustrated in FIG. 19B, the modulation signal transmitted by gNB 1100 may include a frame, symbol, slot, etc. other than "frame 1660" addressed to NR-UE #1 labeled 1101_1. In FIG. 19B, NR channels for the modulation signals transmitted by gNB 1100 are not illustrated.

In FIG. 18, it is assumed that gNB 1100 transmits a modulation signal in frame 1660 as in FIG. 19B using transmit beam 1502.

Then, "AP 1110 or UE 1111" detects transmit beam 1502 transmitted by gNB 1100, and "AP 1110 or UE 1111" detects a signal when performing signal detection (corresponding to LBT) for the frequency in which frame 1660 in "IEEE 802.11ad and/or IEEE 802.11ay channel 3" labeled 1903 in FIG. 19B is present. Thus, "AP 1110 or UE 1111" does not transmit a modulation signal using transmit beam 1803 in FIG. 18 for the frequency in which frame 1600 in "IEEE 802.11ad and/or IEEE 802.11ay channel 3" labeled 1903 in FIG. 19B is present. This reduces the data transmission efficiency of the system.

In addition, when "AP 1110 or UE 1111" transmits a modulation signal using transmit beam 1803 in FIG. 18 without performing signal detection for the frequency in which frame 1600 in "IEEE 802.11ad and/or IEEE 802.11ay channel 3" labeled 1903 in FIG. 19B is present, another apparatus may be interfered with. This reduces the transmission efficiency of the system.

Meanwhile, in FIG. 18, it is assumed that gNB 1100 transmits modulation signals in "slot 1 labeled 1650_1, slot 2 labeled 1650_2, slot 3 labeled 1650_3, slot 4 labeled 1650_4, slot 5 labeled 1650_5, slot 6 labeled 1650_6, and so forth" as in FIG. 19A using transmit beam 1502.

When the modulation signals are transmitted in this manner, the situation will be any of "a case where the modulation signals are present in "IEEE 802.11ad and/or IEEE 802.11ay channel 2' labeled 1902", "a case where the modulation signals are present in "IEEE 802.11ad and/or IEEE 802.11ay channel 3' labeled 1903", and "a case where the modulation signals are present in "IEEE 802.11ad and/or IEEE 802.11ay channel 4' labeled 1904" in FIG. 19A, and the frequencies (channels) in which the modulation signals are present are temporally distributed.

When gNB 1100 transmits a modulation signal using "IEEE 802.11ad and/or IEEE 802.11ay channel 3" labeled 1903 as in FIG. 19B and "AP 1110 or UE 1111" in FIG. 18 uses "IEEE 802.11ad and/or IEEE 802.11 ay channel 3" labeled 1903, interference possibly occurs. This may significantly reduce the data transmission efficiency. In contrast, when gNB 1100 transmits a modulation signal using FH with a plurality of IEEE 802.11ad and/or IEEE 802.11ay channels such as "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 as in FIG. 19A, gNB 100 does not occupy a fixed IEEE 802.11 ad and/or IEEE 802.11ay channel. Thus, gNB 1100 is less likely to interfere with another apparatus, thereby increasing the probability of preventing reduction in data transmission efficiency.

A description will be given of an exemplary operation of an NR apparatus in the "area (or country) where LBT is not performed".

In the "area (or country) where LBT is not performed". LBT is not performed before an NR apparatus transmits a modulation signal. For example, an NR apparatus with both the "LBT mode" and "no-LBT mode" operates the "no-LBT mode". In the "area (or country) where LBT is not performed", an NR apparatus with "no-LBT mode" and an NR apparatus without an LBT function may be present.

In this case, such NR apparatuses may transmit modulation signals by the communication method using FH as in the example of FIG. 19A (not limited to the example of FIG. 19A, however) as one of modes that are less likely to cause interference to another apparatus. Note that such NR apparatuses may include a mode of transmitting a modulation signal by a communication method using FH other than that in FIG. 19A, or may include a mode of transmitting a modulation signal without performing FH. A variation of the "communication method using FH as in the example of FIG. 19A" that is less likely to cause interference to another apparatus will be described later.

A description will be given of an exemplary operation of an NR apparatus in the "area (or country) where LBT may be performed".

In the "area (or country) where LBT may be performed", an NR apparatus may "perform LBT" or may "not perform LBT" before transmitting a modulation signal.

When an NR apparatus with both the "LBT mode" and "no-LBT mode" performs LBT, the NR apparatus operates the "LBT mode" and performs LBT before transmitting a modulation signal.

Meanwhile, when an NR apparatus with both the "LBT mode" and "no-LBT mode" does not perform LBT, the "no-LBT mode" is operated, and at this time, applying a communication method that causes less interference to another apparatus improves the data transmission efficiency of the system. Thus, an NR apparatus may transmit a modulation signal by the communication method using FH as in the example of FIG. 19A (not limited to the example of FIG. 19A, however) as one of methods of the "no-LBT mode".

Note that the NR apparatus with both the "LBT mode" and "no-LBT mode" may include a mode of transmitting a modulation signal by a communication method using FH other than in FIG. 19A, or may include a mode of transmitting a modulation signal without performing FH. A variation of the "communication method using FH as in the example of FIG. 19A" that causes less interference to another apparatus will be described later.

In the "area (or country) where LBT may be performed", an NR apparatus with "no-LBT mode" and an NR apparatus without an LBT function may be present. In this case, such NR apparatuses may transmit modulation signals by the communication method using FH as in the example of FIG. 19A (not limited to the example of FIG. 19A, however). This reduces interference to another apparatus and produces an effect of improving data transmission efficiency of the system.

Note that such NR apparatuses may include a mode of transmitting a modulation signal by a communication method using FH other than that in FIG. 19A, or may include a mode of transmitting a modulation signal without performing FH. A variation of the "communication method using FH as in the example of FIG. 19A" that causes less interference to another apparatus will be described later.

In the "area (or country) where LBT is necessary", an NR apparatus "performs LBT" before transmitting a modulation signal. In this case, the "LBT mode" is operated in the NR apparatus.

At this time, the NR apparatus performs LBT before transmitting a modulation signal, and when determining that the modulation signal can be transmitted, the NR apparatus may transmit modulation signals by the communication method using FH as in the example of FIG. 19A (not limited to the example of FIG. 19A, however). This reduces interference to another apparatus and produces an effect of improving data transmission efficiency of the system.

Note that the NR apparatus may include a mode of transmitting a modulation signal by a communication method using FH other than that in FIG. 19A, or may include a mode of transmitting a modulation signal without performing FH. A variation of the "communication method using FH as in the example of FIG. 19A" that causes less interference to another apparatus will be described later.

Figure 19C:
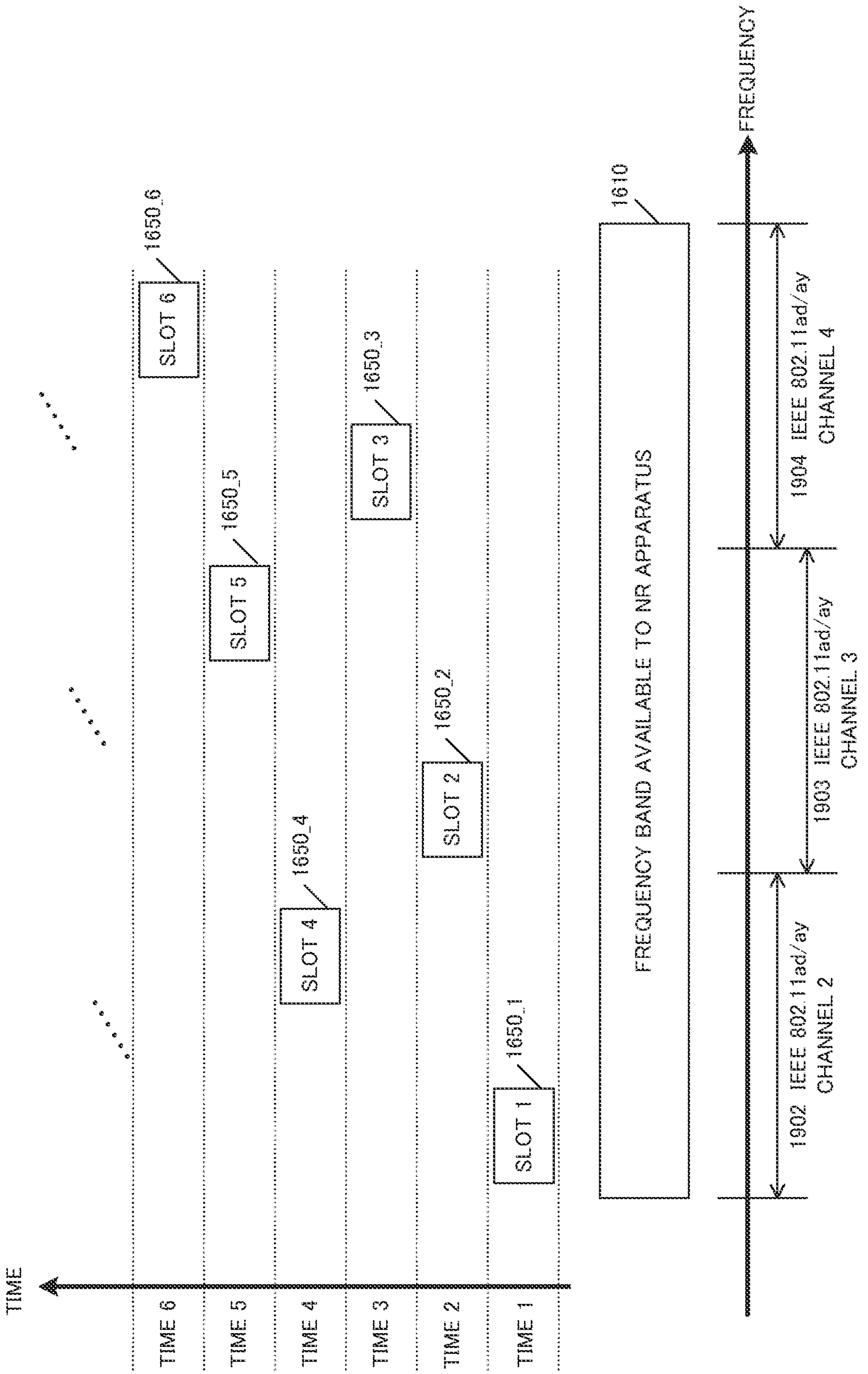
FIG. 19C illustrates an exemplary configuration of slots for a modulation signal transmitted by gNB.
Figure 19D:
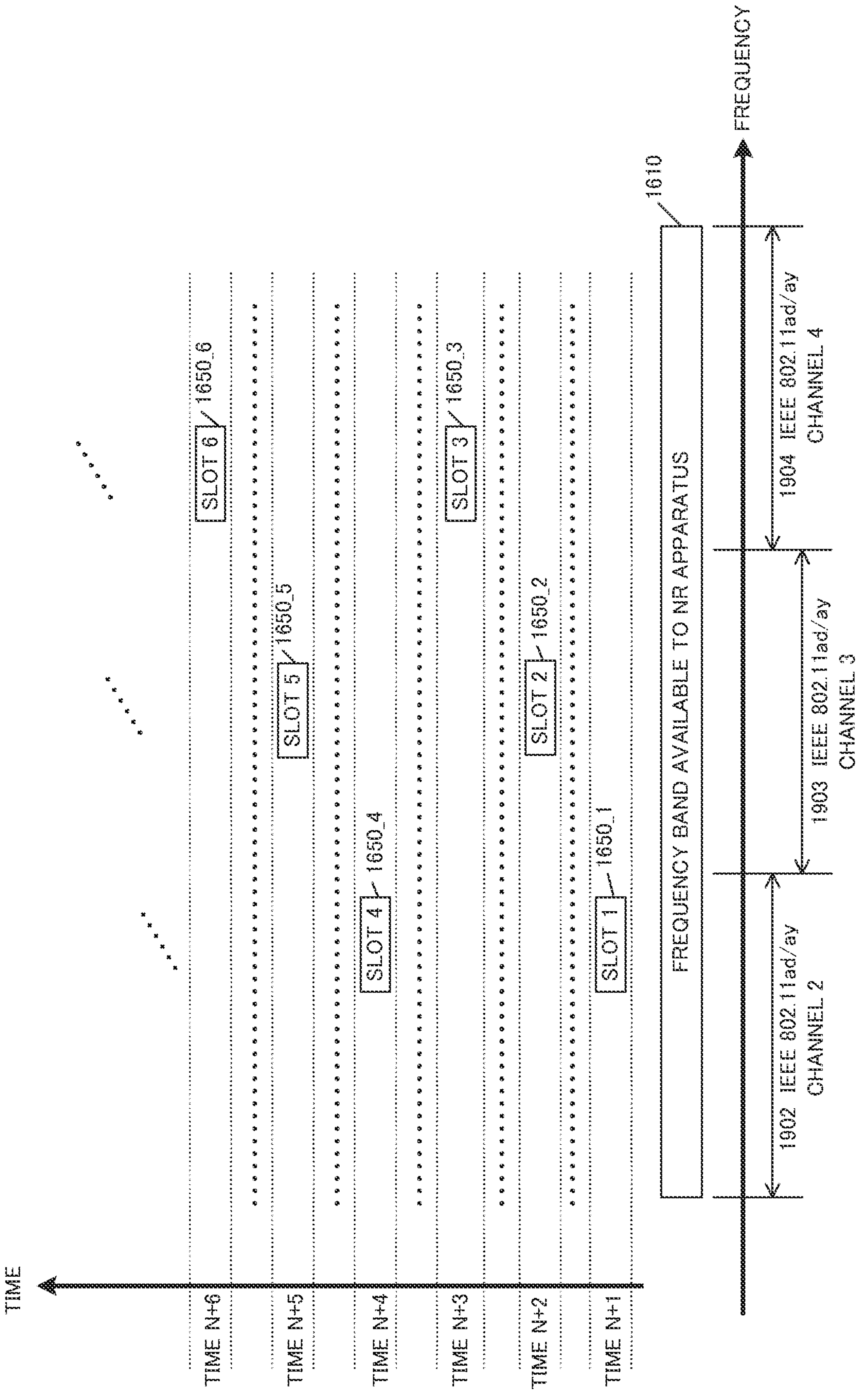
FIG. 19D illustrates an exemplary configuration of slots for a modulation signal transmitted by gNB.
Figure 19E:
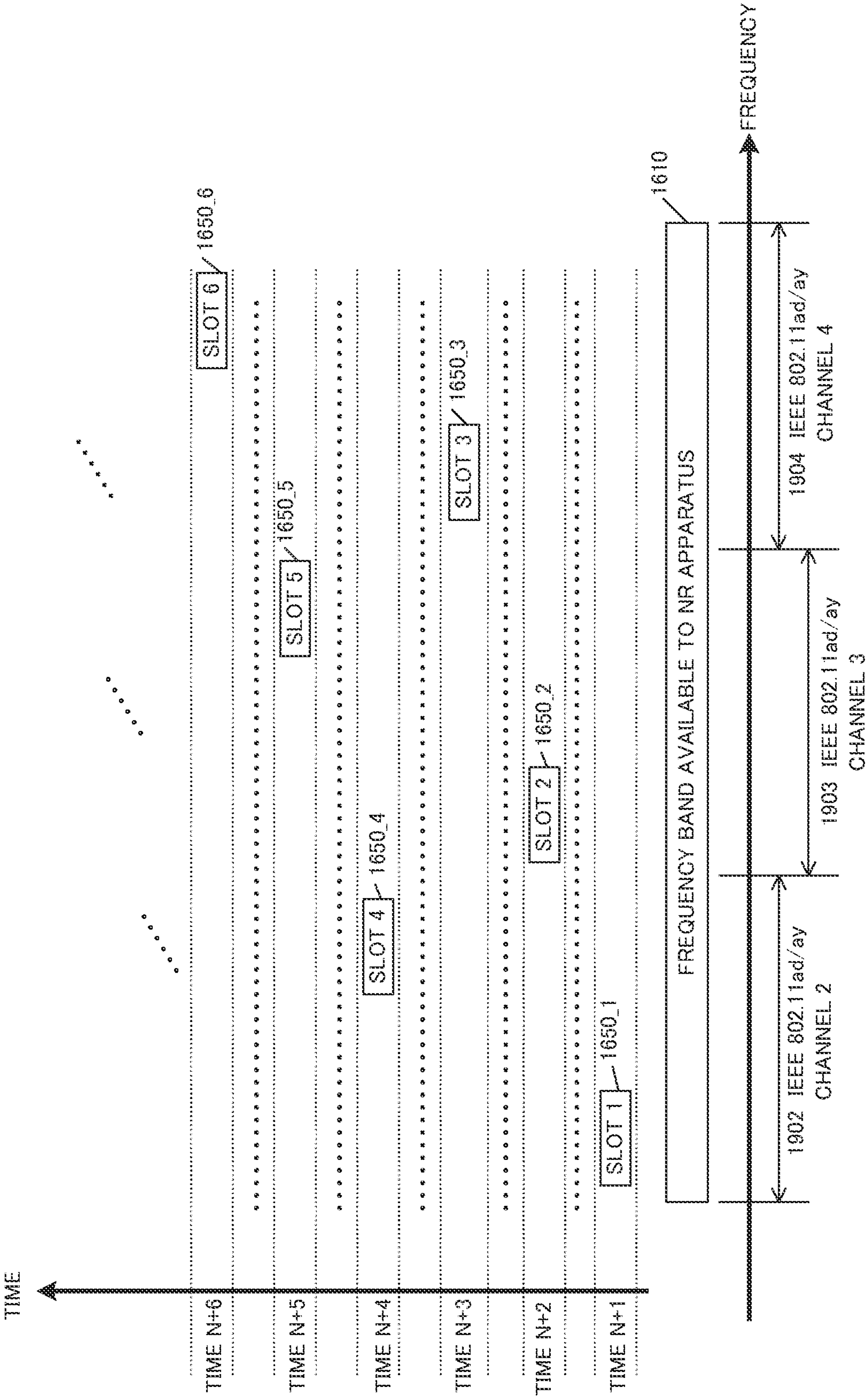
FIG. 19E illustrates an exemplary configuration of slots for a modulation signal transmitted by gNB.

The variation of the "communication method using FH as in the example of FIG. 19A" that causes less interference to another apparatus includes communication methods using FH in FIGS. 19C, 19D, and 19E.

FIG. 19C illustrates, for example, an exemplary configuration of slots for a modulation signal transmitted by gNB 1100 in FIG. 18, and the horizontal axis represents frequency while the vertical axis represents time. Note that, in FIG. 19C, components that operate in the same manner as in FIGS. 16A and 19A are denoted by the same reference signs, and the description thereof will be partially omitted.

As illustrated in FIG. 19C, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 19C, for example, "frequency band 1610 used by an NR apparatus" is present, and gNB 1100 in FIG. 18 transmits a modulation signal using "frequency band 1610 used by an NR apparatus", for example. Note that, in the example of FIG. 19C, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 19C, gNB 1100 transmits modulation signals to a communication counterpart such as NR-UE #1 labeled 1101_1 in FIG. 18, for example, in the following manner: at time 1, gNB 1100 transmits a modulation signal in slot 1 labeled 1650_1 included in "IEEE 802.11ad and/or IEEE 802.11ay channel 2" labeled 1902, at time 2, gNB 1100 transmits a modulation signal in slot 2 labeled 1650_2 included in "IEEE 802.11ad and/or IEEE 802.11ay channel 3" labeled 1903, at time 3, gNB 1100 transmits a modulation signal in slot 3 labeled 1650_3 included in "IEEE 802.11ad and/or IEEE 802.11ay channel 4" labeled 1904, at time 4, gNB 110 transmits a modulation signal in slot 4 labeled 1650_4 included in "IEEE 802.11ad and/or IEEE 802.11ay channel 2" labeled 1902, at time 5, gNB 1100 transmits a modulation signal in slot 5 labeled 1650_5 included in "IEEE 802.11ad and/or IEEE 802.11ay channel 3" labeled 1903, at time 6, gNB 1100 transmits a modulation signal in slot 6 labeled 1650_6 included in "IEEE 802.11ad and/or IEEE 802.11ay channel 4" labeled 1904, and so forth.

The gNB transmits these modulation signals subjected to FH as in the example of FIG. 19C. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

As in the example of FIG. 19C, the frequency of "slot 1 labeled 1650_1" and the frequency of "slot 4 labeled 1650_4" included in NR channel 2 labeled 1602 may be configured to be different from each other, i.e., configured not to be overlapped.

In addition, the frequency of "slot 2 labeled 1650_2" and the frequency of "slot 5 labeled 1650_5" included in NR channel 3 labeled 1603 may be configured to be different from each other, i.e., configured not to be overlapped.

Further, the frequency of "slot 3 labeled 1650_3" and the frequency of "slot 6 labeled 1650_6" included in NR channel 4 labeled 1604 may be configured to be different from each other, i.e., configured not to be overlapped.

Alternatively, as in the example of FIG. 19A, the frequency of "slot 1 labeled 1650_1" and the frequency of "slot 4 labeled 1650_4" included in NR channel 2 labeled 1602 may be configured to be the same or overlapped partially.

In addition, the frequency of "slot 2 labeled 1650_2" and the frequency of "slot 5 labeled 1650_5" included in NR channel 3 labeled 1603 may be configured to be the same or overlapped partially.

Further, the frequency of "slot 3 labeled 1650_3" and the frequency of "slot 6 labeled 1650_6" included in NR channel 4 labeled 1604 may be configured to be the same or overlapped partially.

Note that, although not illustrated in FIG. 19C, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19C, NR channels for the modulation signals transmitted by gNB 1100 are not illustrated.

FIG. 19D illustrates, for example, an exemplary configuration of slots for a modulation signal transmitted by gNB 1100 in FIG. 18, and the horizontal axis represents frequency while the vertical axis represents time. Note that, in FIG. 19D, components that operate in the same manner as in FIGS. 16A and 19A are denoted by the same reference signs, and the description thereof will be partially omitted.

As illustrated in FIG. 19D, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 19D, for example, "frequency band 1610 used by an NR apparatus" is present, and gNB 1100 in FIG. 18 transmits a modulation signal using "frequency band 1610 used by an NR apparatus", for example. Note that, in the example of FIG. 19D, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 19D, gNB 1100 transmits modulation signals to a communication counterpart such as NR-UE #1 labeled 1101_1 in FIG. 18, for example, in the following manner: at time N+1, gNB 1100 transmits a modulation signal in slot 1 labeled 1650_1 included in "IEEE 802.11ad and/or IEEE 802.11ay channel 2" labeled 1902, at time N+2, gNB 1100 transmits a modulation signal in slot 2 labeled 1650_2 included in "IEEE 802.11ad and/or IEEE 802.11ay channel 3" labeled 1903, at time N+3, gNB 1100 transmits a modulation signal in slot 3 labeled 1650_3 included in "IEEE 802.11ad and/or IEEE 802.11ay channel 4" labeled 1904, at time N+4, gNB 1100 transmits a modulation signal in slot 4 labeled 1650_4 included in "IEEE 802.11ad and/or IEEE 802.11ay channel 2" labeled 1902, at time N+5, gNB 1100 transmits a modulation signal in slot 5 labeled 1650_5 included in "IEEE 802.11ad and/or IEEE 802.11ay channel 3" labeled 1903, at time N+6, gNB 1100 transmits a modulation signal in slot 6 labeled 1650_6 included in "IEEE 802.11ad and/or IEEE 802.11ay channel 4" labeled 1904, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 19D. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

For example, the frequency of "slot 1 labeled 1650_1" and the frequency of "slot 4 labeled 1650_4" may be the same or overlapped partially.

Likewise, the frequency of "slot 2 labeled 1650_2" and the frequency of "slot 5 labeled 1650_5" may, for example, be the same or overlapped partially.

For example, the frequency of "slot 3 labeled 1650_3" and the frequency of "slot 6 labeled 1650_6" may be the same or overlapped partially.

Note that, although not illustrated in FIG. 19D, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19D, NR channels for the modulation signals transmitted by gNB 1100 are not illustrated.

FIG. 19E illustrates, for example, an exemplary configuration of slots for a modulation signal transmitted by gNB 1100 in FIG. 18, and the horizontal axis represents frequency while the vertical axis represents time. Note that, in FIG. 19E, components that operate in the same manner as in FIGS. 16A and 19A are denoted by the same reference signs, and the description thereof will be partially omitted.

As illustrated in FIG. 19E, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 19E, for example, "frequency band 1610 used by an NR apparatus" is present, and gNB 1100 in FIG. 18 transmits a modulation signal using "frequency band 1610 used by an NR apparatus", for example. Note that, in the example of FIG. 19E, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 19E, gNB 1100 transmits modulation signals to a communication counterpart such as NR-UE #1 labeled 1101_1 in FIG. 18, for example, in the following manner: at time N+1, gNB 1100 transmits a modulation signal in slot 1 labeled 1650_1 included in "IEEE 802.11ad and/or IEEE 802.11ay channel 2" labeled 1902, at time N+2, gNB 1100 transmits a modulation signal in slot 2 labeled 1650_2 included in "IEEE 802.11ad and/or IEEE 802.11ay channel 3" labeled 1903, at time N+3, gNB 1100 transmits a modulation signal in slot 3 labeled 1650_3 included in "IEEE 802.11ad and/or IEEE 802.11ay channel 4" labeled 1904, at time N+4, gNB 1100 transmits a modulation signal in slot 4 labeled 1650_4 included in "IEEE 802.11ad and/or IEEE 802.11ay channel 2" labeled 1902, at time N+5, gNB 1100 transmits a modulation signal in slot 5 labeled 1650_5 included in "IEEE 802.11ad and/or IEEE 802.11ay channel 3" labeled 1903, at time N+6, gNB 1100 transmits a modulation signal in slot 6 labeled 1650_6 included in "IEEE 802.11ad and/or IEEE 802.11ay channel 4" labeled 1904, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 19E. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

As in the example of FIG. 19E, the frequency of "slot 1 labeled 1650_1" and the frequency of "slot 4 labeled 1650_4" included in NR channel 2 labeled 1602 may be configured to be different from each other, i.e., configured not to be overlapped.

In addition, the frequency of "slot 2 labeled 1650_2" and the frequency of "slot 5 labeled 1650_5" included in NR channel 3 labeled 1603 may be configured to be different from each other, i.e., configured not to be overlapped.

Further, the frequency of "slot 3 labeled 1650_3" and the frequency of "slot 6 labeled 1650_6" included in NR channel 4 labeled 1604 may be configured to be different from each other, i.e., configured not to be overlapped.

Note that, although not illustrated in FIG. 19E, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19E, NR channels for the modulation signals transmitted by gNB 1100 are not illustrated.

In the following, a description will be given of exemplary slot arrangement on the frequency and time axes other than those in "FIGS. 19A, 19C, 19D, and 19E".

Figure 19F:
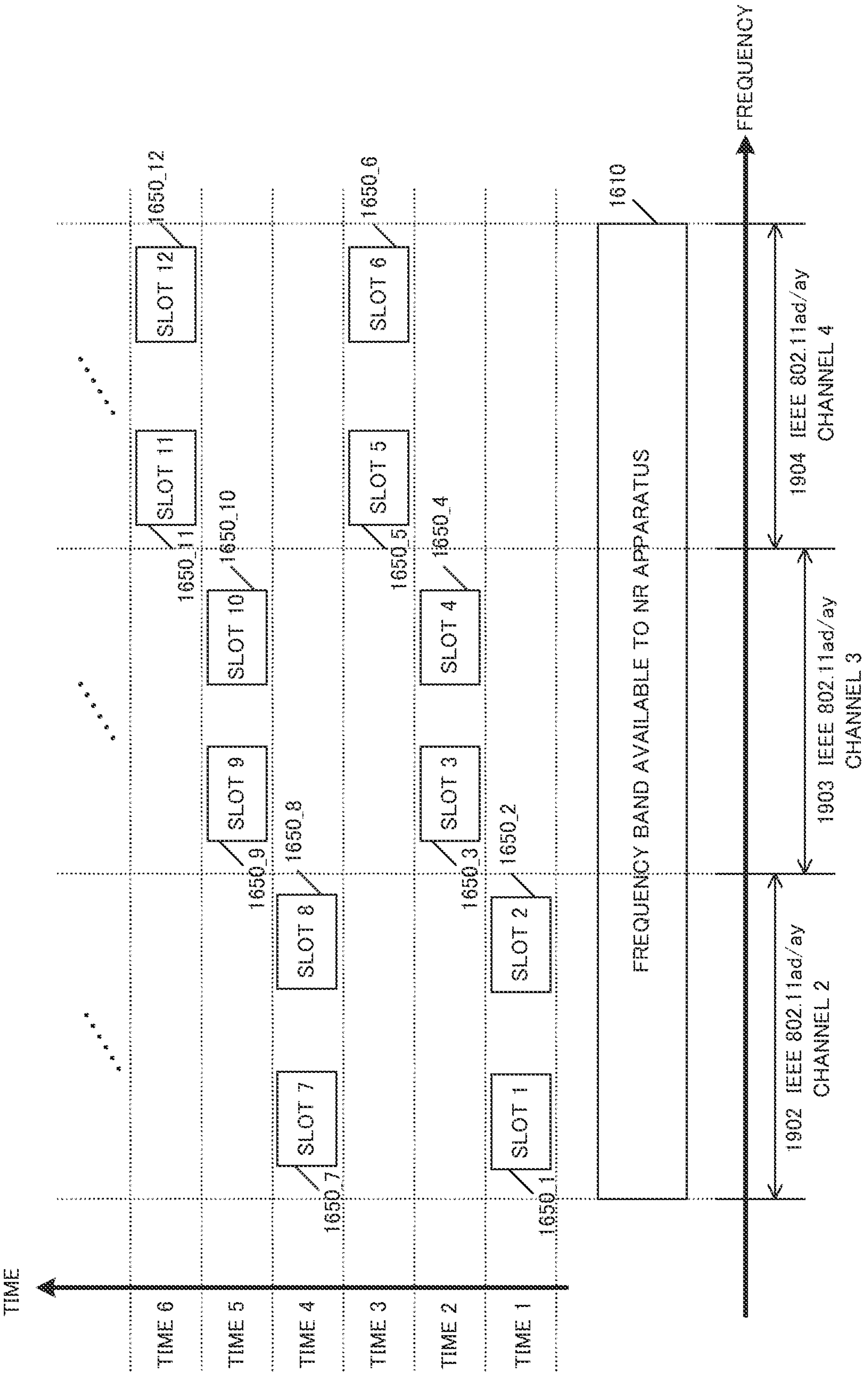
FIG. 19F illustrates an exemplary configuration of slots for a modulation signal transmitted by gNB.

FIG. 19F illustrates, for example, an exemplary configuration of slots for a modulation signal transmitted by gNB 1100 in FIG. 18, and the horizontal axis represents frequency while the vertical axis represents time. Note that, in FIG. 19F, components that operate in the same manner as in FIGS. 16A and 19A are denoted by the same reference signs, and the description thereof will be partially omitted.

As illustrated in FIG. 19F, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 19F, for example. "frequency band 1610 used by an NR apparatus" is present, and gNB 1100 in FIG. 18 transmits a modulation signal using "frequency band 1610 used by an NR apparatus", for example. Note that, in the example of FIG. 19F, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 19F, gNB 1100 transmits modulation signals to a communication counterpart such as NR-UE #1 labeled 1101_1 in FIG. 18, for example, in the following manner: at time 1, gNB 1100 transmits a modulation signal in slot 1 labeled 1650_1 and slot 2 labeled 1650_2 included in "IEEE 802.11ad and/or IEEE 802.11ay channel 2" labeled 1902, at time 2, gNB 1100 transmits a modulation signal in slot 3 labeled 1650_3 and slot 4 labeled 1650_4 included in "IEEE 802.11ad and/or IEEE 802.11ay channel 3" labeled 1903, at time 3, gNB 1100 transmits a modulation signal in slot 5 labeled 1650_5 and slot 6 labeled 1650_6 included in "IEEE 802.11ad and/or IEEE 802.11ay channel 4" labeled 1904, at time 4, gNB 1100 transmits a modulation signal in slot 7 labeled 1650_7 and slot 8 labeled 1650_8 included in "IEEE 802.11ad and/or IEEE 802.11ay channel 2" labeled 1902, at time 5, gNB 1100 transmits a modulation signal in slot 9 labeled 1650_9 and slot 10 labeled 1650_10 included in "IEEE 802.11ad and/or IEEE 802.11ay channel 3" labeled 1903, at time 6, gNB 1100 transmits a modulation signal in slot 11 labeled 1650_11 and slot 12 labeled 1650_12 included in "IEEE 802.11ad and/or IEEE 802.11ay channel 4" labeled 1904, and so forth.

The gNB transmits these modulation signals subjected to FH as in the example of FIG. 19F. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

In the example of FIG. 19F, "slot 1 labeled 1650_1 and slot 2 labeled 1650_2" are present at time 1, and "slot 1 labeled 1650_1 and slot 2 labeled 1650_2" are present in "IEEE 802.11ad and/or IEEE 802.11ay channel 2" labeled 1902.

In addition, "slot 3 labeled 1650_3 and slot 4 labeled 16504" are present at time 2, and "slot 3 labeled 1650_3 and slot 4 labeled 1650_4" are present in "IEEE 802.11ad and/or IEEE 802.11ay channel 3" labeled 1903.

In addition, "slot 5 labeled 1650_5 and slot 6 labeled 1650_6" are present at time 3, and "slot 5 labeled 1650_5 and slot 6 labeled 1650_6" are present in "IEEE 802.11ad and/or IEEE 802.11ay channel 4" labeled 1904.

In addition, "slot 7 labeled 1650_7 and slot 8 labeled 1650_8" are present at time 4, and "slot 7 labeled 1650_7 and slot 8 labeled 1650_8" are present in "IEEE 802.11ad and/or IEEE 802.11ay channel 2" labeled 1902.

The slots, "slot 9 labeled 1650_9 and slot 10 labeled 1650_10", are present at time 5, and "slot 9 labeled 1650_9 and slot 10 labeled 1650_10" are present in "IEEE 802.11ad and/or IEEE 802.11ay channel 3" labeled 1903.

The slots, "slot 11 labeled 1650_11 and slot 12 labeled 1650_12" are present at time 6, and "slot 11 labeled 1650_11 and slot 12 labeled 1650_12" are present in "IEEE 802.11ad and/or IEEE 802.11ay channel 4" labeled 1904.

Features in FIG. 19F in this case are as follows.

A plurality of slots belonging to the first "IEEE 802.11ad and/or IEEE 802.11ay channel" are present at the first time.

For example, "slot 1 labeled 1650_1 and slot 2 labeled 1650_2" (a plurality of slots) belonging to "IEEE 802.11ad and/or IEEE 802.11ay channel 2" labeled 1902 (the first "IEEE 802.11ad and/or IEEE 802.11ay channel") are present at time 1 (the first time).

Note that the above feature is found at time 2, time 3, and so forth.

FH is configured such that a plurality of slots that are present at the first time are present in the first "IEEE 802.11ad and/or IEEE 802.11ay channel" and an "IEEE 802.11 ad and/or IEEE 802.11ay channel" to which the plurality of slots belong is switched as time passes.

For example, "slot 1 labeled 1650_1 and slot 2 labeled 1650_2" (a plurality of slots) belonging to "IEEE 802.11ad and/or IEEE 802.11ay channel 2" labeled 1902 are present at time 1, and "slot 3 labeled 1650_3 and slot 4 labeled 1650_4" (a plurality of slots) belonging to "IEEE 802.11 ad and/or IEEE 802.11 ay channel 3" labeled 1903 are present at time 2.

Note that, although not illustrated in FIG. 19F, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1. In FIG. 19F, NR channels for the modulation signals transmitted by gNB 1100 are not illustrated.

The above-described manner leads to the similar effects to those described in the examples of FIGS. 19A, 19C, 19D, and 19E.

Note that the arrangement method for slots in the frequency and time domains is not limited to the example of FIG. 19F.

Also in FIG. 19F, the plurality of slots are arranged on the time axis in the order of "IEEE 802.11ad and/or IEEE 802.11ay channel 2" labeled 1902, "IEEE 802.11ad and/or IEEE 802.11 ay channel 3" labeled 1903, "IEEE 802.11 ad and/or IEEE 802.11ay channel 4" labeled 1904, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and so forth, but the slot arrangement is not limited to this. For example, the order of IEEE 802.11ad and/or IEEE 802.11ay channels to which the plurality of slots belong is not limited to this example.

For example, as long as FH is performed such that a plurality of slots are placed in any of "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 on the time axis, and the "IEEE 802.11ad and/or IEEE 802.11ay channel" to which the plurality of slots belong is switched as time passes, the same as the above description can be implemented and the same effects can be obtained as well.

Further, in the case of FIG. 19F, the number of "IEEE 802.11ad and/or IEEE 802.11ay channels" to which the plurality of slots present at certain time belong is three, which are "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904, but the present disclosure is not limited to this, and the same as the above description can be implemented and the same effects can be obtained as long as the number of "IEEE 802.11ad and/or IEEE 802.11ay channels" to which the plurality of slots belong in FH is two or more.

Thus, a method of using time and frequency in FH in transmitting a modulation signal by gNB is not limited to the example of FIG. 19F, and the number of "IEEE 802.11ad and/or IEEE 802.11ay channels" to which a plurality of slots present at certain time belong in FH only needs to be two or more.

Figure 19G:
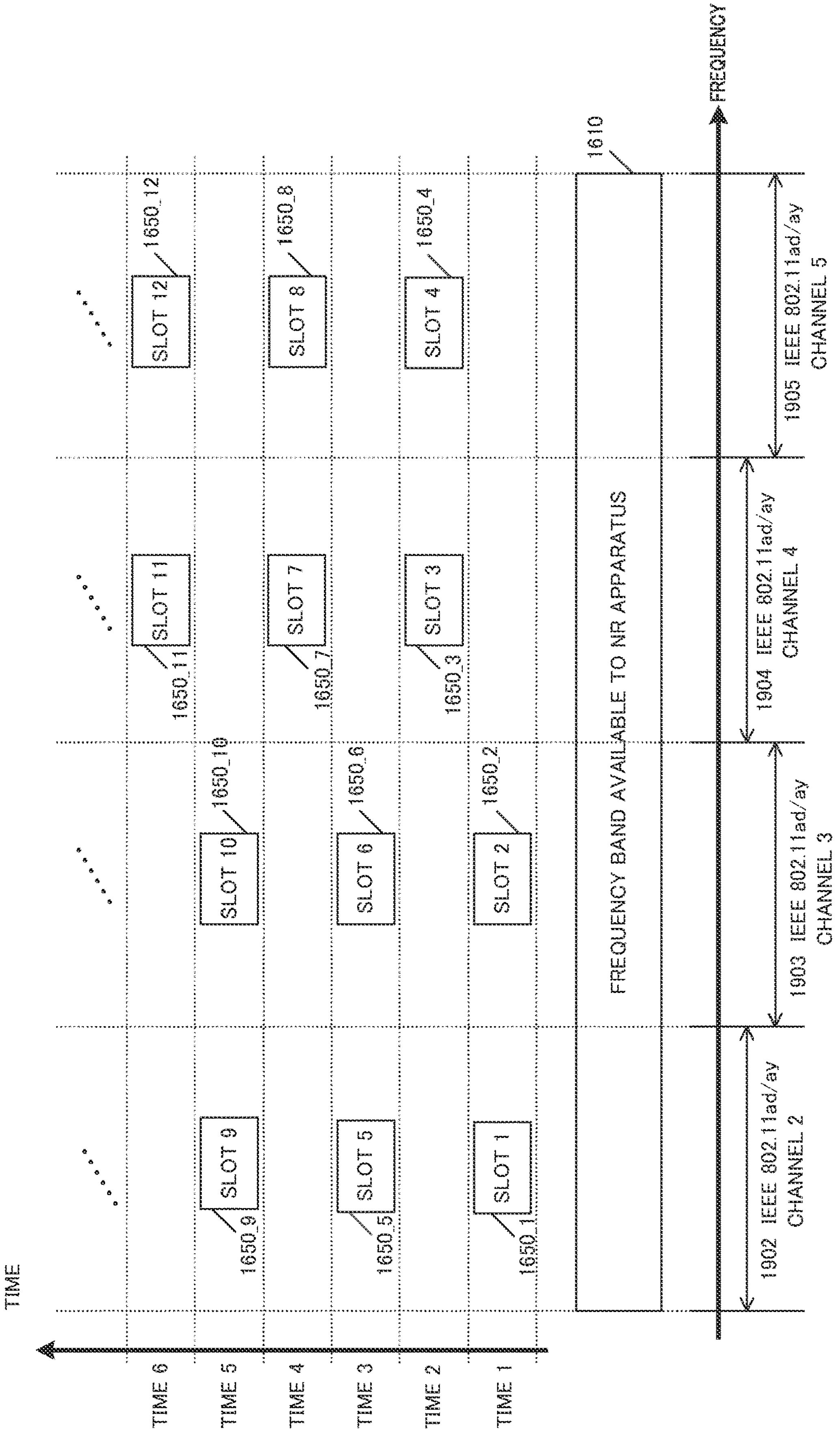
FIG. 19G illustrates an exemplary configuration of slots for a modulation signal transmitted by gNB.

FIG. 19G illustrates, for example, an exemplary configuration of slots for a modulation signal transmitted by gNB 1100 in FIG. 18, and the horizontal axis represents frequency while the vertical axis represents time. Note that, in FIG. 19G, components that operate in the same manner as in FIGS. 16A and 19A are denoted by the same reference signs, and the description thereof will be partially omitted.

As illustrated in FIG. 19G, "IEEE 802.11ad and/or IEEE 802.11ay channel 2" labeled 1902, "IEEE 802.11ad and/or IEEE 802.1ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 19G, for example, "frequency band 1610 used by an NR apparatus" is present, and gNB 1100 in FIG. 18 transmits a modulation signal using "frequency band 1610 used by an NR apparatus", for example. Note that, in the example of FIG. 19G, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", "all or part of 'IEEE 802.11ad and/or IEEE 802.11ay channel 4' labeled 1904", and "all or part of 'IEEE 802.11 ad and/or IEEE 802.11ay channel 5" labeled 1905".

Then, as illustrated in FIG. 19G, gNB 1100 transmits modulation signals to a communication counterpart such as NR-UE #1 labeled 1101_1 in FIG. 18, for example, in the following manner: at time 1, gNB 1100 transmits a modulation signal in slot 1 labeled 1650_1 included in "IEEE 802.11ad and/or IEEE 802.11ay channel 2" labeled 1902 and slot 2 labeled 16502 included in "IEEE 802.11ad and/or IEEE 802.11 ay channel 3" labeled 1903, at time 2, gNB 1100 transmits a modulation signal in slot 3 labeled 1650_3 included in "IEEE 802.11ad and/or IEEE 802.11ay channel 4" labeled 1904 and slot 4 labeled 1650_4 included in "IEEE 802.11ad and/or IEEE 802.11ay channel 5" labeled 1905, at time 3, gNB 1100 transmits a modulation signal in slot 5 labeled 1650_5 included in "IEEE 802.11ad and/or IEEE 802.11ay channel 2" labeled 1902 and slot 6 labeled 1650_6 included in "IEEE 802.11ad and/or IEEE 802.11ay channel 3" labeled 1903, at time 4, gNB 1100 transmits a modulation signal in slot 7 labeled 1650_7 included in "IEEE 802.11ad and/or IEEE 802.11ay channel 4" labeled 1904 and slot 8 labeled 1650_8 included in "IEEE 802.11ad and/or IEEE 802.11ay channel 5" labeled 1905, at time 5, gNB 1100 transmits a modulation signal in slot 9 labeled 1650_9 included in "IEEE 802.11ad and/or IEEE 802.11ay channel 2" labeled 1902 and slot 10 labeled 1650_10 included in "IEEE 802.11ad and/or IEEE 802.11ay channel 3" labeled 1903, at time 6, gNB 1100 transmits a modulation signal in slot 11 labeled 1650_11 included in "IEEE 802.11ad and/or IEEE 802.11ay channel 4" labeled 1904 and slot 12 labeled 1650_12 included in "IEEE 802.11ad and/or IEEE 802.11ay channel 5" labeled 1905, and so forth.

The gNB transmits these modulation signals subjected to FH as in the example of FIG. 19G. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5". "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

In the example of FIG. 19G, "slot 1 labeled 1650_1 and slot 2 labeled 1650_2" are present at time 1, slot 1 labeled 1650_1 is present in "IEEE 802.11ad and/or IEEE 802.11ay channel 2" labeled 1902, and slot 2 labeled 16502 is present in "IEEE 802.11ad and/or IEEE 802.11ay channel 3" labeled 1903.

In addition, "slot 3 labeled 1650_3 and slot 4 labeled 1650_4" are present at time 2, slot 3 labeled 16503 is present in "IEEE 802.11ad and/or IEEE 802.11ay channel 4" labeled 1904, and slot 4 labeled 1650_4 is present in "IEEE 802.11ad and/or IEEE 802.11ay channel 5" labeled 1905.

The slots, "slot 5 labeled 1650_5 and slot 6 labeled 1650_6", are present at time 3, slot 5 labeled 16505 is present in "IEEE 802.11ad and/or IEEE 802.11ay channel 2" labeled 1902, and slot 6 labeled 1650_6 is present in "IEEE 802.11ad and/or IEEE 802.11ay channel 3" labeled 1903.

The slots, "slot 7 labeled 1650_7 and slot 8 labeled 1650_8", are present at time 4, slot 7 labeled 16507 is present in "IEEE 802.11ad and/or IEEE 802.11ay channel 4" labeled 1904, and slot 8 labeled 1650_8 is present in "IEEE 802.11ad and/or IEEE 802.11ay channel 5" labeled 1905.

The slots, "slot 9 labeled 1650_9 and slot 10 labeled 1650_10", are present at time 5, slot 9 labeled 16509 is present in "IEEE 802.11ad and/or IEEE 802.11ay channel 2" labeled 1902, and slot 10 labeled 165010 is present in "IEEE 802.11ad and/or IEEE 802.11ay channel 3" labeled 1903.

The slots, "slot 11 labeled 1650_11 and slot 12 labeled 1650_12", are present at time 6, slot 11 labeled 1650_11 is present in "IEEE 802.11ad and/or IEEE 802.11ay channel 4" labeled 1904, and slot 12 labeled 1650_12 is present in "IEEE 802.11ad and/or IEEE 802.11ay channel 5" labeled 1905.

Features in FIG. 19G in this case are as follows.

A plurality of slots are present at the first time, at least one of the plurality of slots belongs to the first "IEEE 802.11ad and/or IEEE 802.11ay channel", and at least one of the plurality of slots belongs to the second "IEEE 802.11ad and/or IEEE 802.11ay channel".

For example, at least slot 1 labeled 1650_1 belonging to "IEEE 802.11ad and/or IEEE 802.11ay channel 2" labeled 1902 (the first "IEEE 802.11ad and/or IEEE 802.11ay channel") and slot 2 labeled 1650_2 belonging to "IEEE 802.11ad and/or IEEE 802.11ay channel 3" labeled 1903 (the second "IEEE 802.11ad and/or IEEE 802.11ay channel") are present at time 1 (the first time).

Note that the above feature is found at time 2, time 3, and so forth.

FH is configured such that "IEEE 802.11ad and/or IEEE 802.11ay channels" to which the plurality of slots belong are switched as time passes.

For example, slot 1 labeled 1650_1 belonging to "IEEE 802.11ad and/or IEEE 802.11ay channel 2" labeled 1902 and slot 2 labeled 1650_2 belonging to "IEEE 802.11ad and/or IEEE 802.11ay channel 3" labeled 1903 are present at time 1, and slot 3 labeled 1650_3 belonging to "IEEE 802.11ad and/or IEEE 802.11ay channel 4" labeled 1904 and slot 4 labeled 16504 belonging to "IEEE 802.11ad and/or IEEE 802.11ay channel 5" labeled 1905 are present at time 2.

Note that, although not illustrated in FIG. 19G, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1. In FIG. 19G. NR channels for the modulation signals transmitted by gNB 1100 are not illustrated.

The above-described manner leads to the similar effects to those described in the examples of FIGS. 19A, 19C, 19D, and 19E.

Note that the arrangement method for slots in the frequency and time domains is not limited to the example of FIG. 19G.

Also in FIG. 19G, the plurality of slots are arranged on the time axis in the order of "'IEEE 802.11ad and/or IEEE 802.11ay channel 2' labeled 1902 and 'IEEE 802.11ad and/or IEEE 802.11ay channel 3' labeled 1903", and "'IEEE 802.11ad and/or IEEE 802.11ay channel 4' labeled 1904 and 'IEEE 802.11ad and/or IEEE 802.11 ay channel 5' labeled 1905", "'IEEE 802.11ad and/or IEEE 802.11ay channel 2' labeled 1902 and 'IEEE 802.11ad and/or IEEE 802.11ay channel 3' labeled 1903", and "'IEEE 802.11ad and/or IEEE 802.11ay channel 4' labeled 1904 and 'IEEE 802.11ad and/or IEEE 802.11ay channel 5' labeled 1905", and so forth, but the slot arrangement is not limited to this. For example, the order of IEEE 802.11ad and/or IEEE 802.11ay channels to which the plurality of slots belong is not limited to this example.

For example, as long as FH is performed such that a plurality of slots are placed in a plurality of "IEEE 802.11ad and/or IEEE 802.11ay channels" at certain time on the time axis, and the plurality of "IEEE 802.11ad and/or IEEE 802.11ay channels" to which the plurality of slots belong are switched as time passes, the same as the above description can be implemented and the same effects can be obtained as well.

Further, in the case of FIG. 19G, the number of "IEEE 802.11ad and/or IEEE 802.11ay channels" to which the plurality of slots present at certain time belong is four, which are "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905, but the present disclosure is not limited to this, and the same as the above description can be implemented and the same effects can be obtained as long as the number of "IEEE 802.11ad and/or IEEE 802.11 ay channels" to which the plurality of slots belong in FH is two or more.

Thus, a method of using time and frequency in FH in transmitting a modulation signal by gNB is not limited to the example of FIG. 19G, and the number of "IEEE 802.11ad and/or IEEE 802.11ay channels" to which a plurality of slots present at certain time belong in FH only needs to be two or more.

Figure 19H:
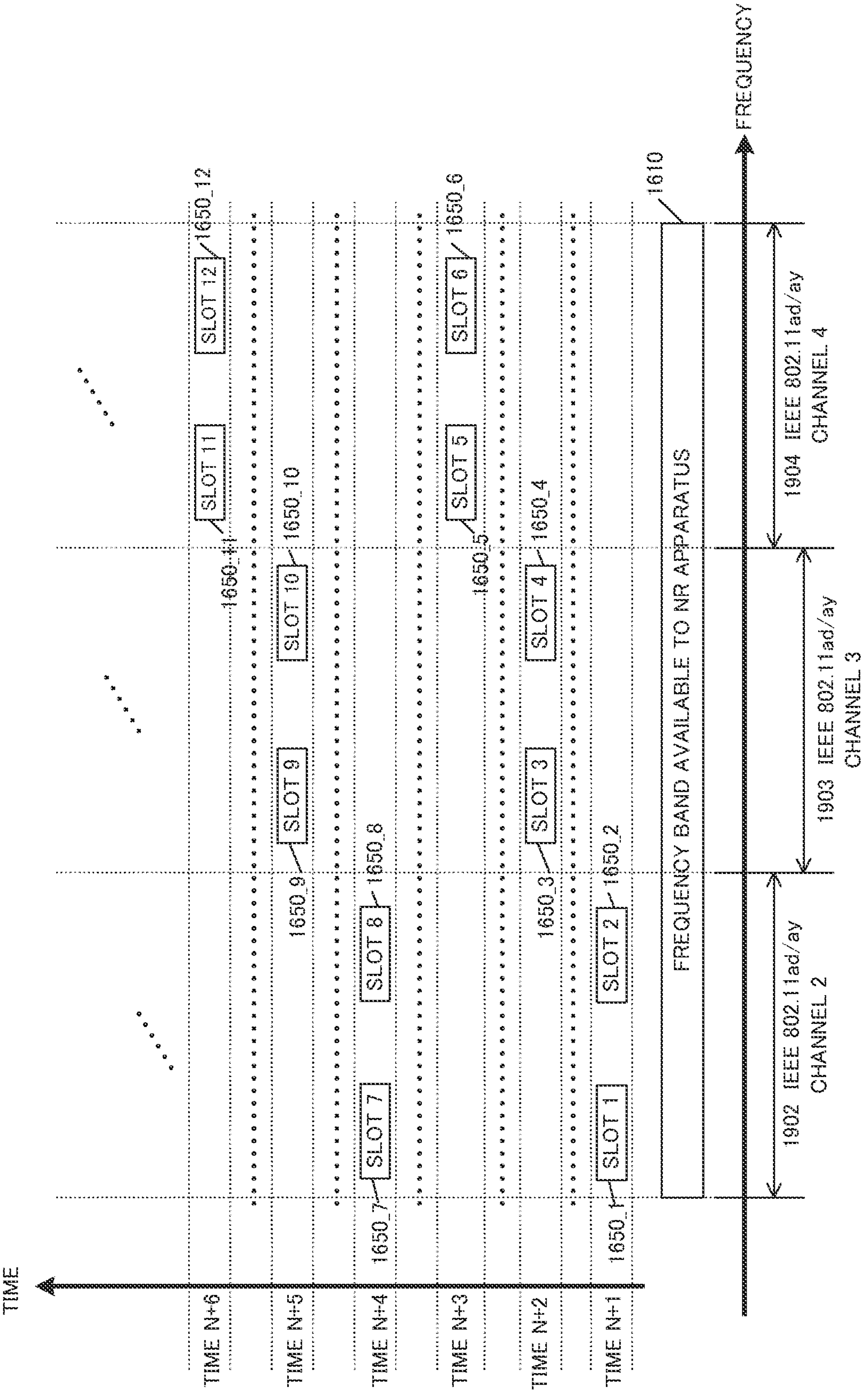
FIG. 19H illustrates an exemplary configuration of slots for a modulation signal transmitted by gNB.

FIG. 19H illustrates, for example, an exemplary configuration of slots for a modulation signal transmitted by gNB 1100 in FIG. 18, and the horizontal axis represents frequency while the vertical axis represents time. Note that, in FIG. 19H, components that operate in the same manner as in FIGS. 16A and 19A are denoted by the same reference signs, and the description thereof will be partially omitted.

As illustrated in FIG. 19H. "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 19H, for example, "frequency band 1610 used by an NR apparatus" is present, and gNB 1100 in FIG. 18 transmits a modulation signal using "frequency band 1610 used by an NR apparatus", for example. Note that, in the example of FIG. 19H, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 19H, gNB 1100 transmits modulation signals to a communication counterpart such as NR-UE #1 labeled 1101_1 in FIG. 18, for example, in the following manner: at time N+1, gNB 1100 transmits a modulation signal in slot 1 labeled 1650_1 and slot 2 labeled 1650-2 included in "IEEE 802.11ad and/or IEEE 802.11ay channel 2" labeled 1902, at time N+2, gNB 1100 transmits a modulation signal in slot 3 labeled 1650_3 and slot 4 labeled 1650_4 included in "IEEE 802.11ad and/or IEEE 802.11ay channel 3" labeled 1903, at time N+3, gNB 1100 transmits a modulation signal in slot 5 labeled 1650_5 and slot 6 labeled 1650_6 included in "IEEE 802.11ad and/or IEEE 802.11ay channel 4" labeled 1904, at time N+4, gNB 1100 transmits a modulation signal in slot 7 labeled 1650_7 and slot 8 labeled 1650_8 included in "IEEE 802.11ad and/or IEEE 802.11ay channel 2" labeled 1902, at time N+5, gNB 1100 transmits a modulation signal in slot 9 labeled 1650_9 and slot 10 labeled 1650_10 included in "IEEE 802.11ad and/or IEEE 802.11ay channel 3" labeled 1903, at time N+6, gNB 1100 transmits a modulation signal in slot 11 labeled 1650_11 and slot 12 labeled 1650_12 included in "IEEE 802.11ad and/or IEEE 802.11ay channel 4" labeled 1904, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 19H. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

In the example of FIG. 19H, "slot 1 labeled 1650_1 and slot 2 labeled 1650_2" are present at time N+1, and "slot 1 labeled 1650_1 and slot 2 labeled 1650_2" are present in "IEEE 802.11ad and/or IEEE 802.11ay channel 2" labeled 1902.

In addition, "slot 3 labeled 1650_3 and slot 4 labeled 16504" are present at time N+2, and "slot 3 labeled 1650_3 and slot 4 labeled 1650_4" are present in "IEEE 802.11ad and/or IEEE 802.11ay channel 3" labeled 1903.

The slots, "slot 5 labeled 1650_5 and slot 6 labeled 1650_6", are present at time N+3, and "slot 5 labeled 1650_5 and slot 6 labeled 1650_6" are present in "IEEE 802.11ad and/or IEEE 802.11ay channel 4" labeled 1904.

The slots, "slot 7 labeled 1650_7 and slot 8 labeled 1650_8", are present at time N+4, and "slot 7 labeled 1650_7 and slot 8 labeled 1650_8" are present in "IEEE 802.11ad and/or IEEE 802.11ay channel 2" labeled 1902.

The slots, "slot 9 labeled 1650_9 and slot 10 labeled 1650_10", are present at time N+5, and "slot 9 labeled 1650_9 and slot 10 labeled 1650_10" are present in "IEEE 802.11ad and/or IEEE 802.11ay channel 3" labeled 1903.

The slots, "slot 11 labeled 1650_11 and slot 12 labeled 1650_12" are present at time N+6, and "slot 11 labeled 1650_11 and slot 12 labeled 1650_12" are present in "IEEE 802.11ad and/or IEEE 802.11ay channel 4" labeled 1904.

Features in FIG. 19H in this case are as follows.

A plurality of slots belonging to the first "IEEE 802.11ad and/or IEEE 802.11ay channel" are present at the first time.

For example, "slot 1 labeled 1650_1 and slot 2 labeled 1650_2" (a plurality of slots) belonging to "IEEE 802.11ad and/or IEEE 802.11ay channel 2" labeled 1902 (the first "IEEE 802.11ad and/or IEEE 802.11ay channel") are present at time N+1 (the first time).

Note that the above feature is found at time N+2, time N+3, and so forth.

FH is configured such that a plurality of slots that are present at the first time are present in the first "IEEE 802.11ad and/or IEEE 802.11ay channel" and an "IEEE 802.11ad and/or IEEE 802.11ay channel" to which the plurality of slots belong is switched as time passes.

For example, "slot 1 labeled 1650_1 and slot 2 labeled 1650_2" (a plurality of slots) belonging to "IEEE 802.11ad and/or IEEE 802.11ay channel 2" labeled 1902 are present at time N+1, and "slot 3 labeled 1650_3 and slot 4 labeled 1650_4" (a plurality of slots) belonging to "IEEE 802.11ad and/or IEEE 802.11ay channel 3" labeled 1903 are present at time N+2.

Note that, although not illustrated in FIG. 19H, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1. In FIG. 19H, NR channels for the modulation signals transmitted by gNB 1100 are not illustrated.

The above-described manner leads to the similar effects to those described in the examples of FIGS. 19A, 19C, 19D, and 19E.

Note that the arrangement method for slots in the frequency and time domains is not limited to the example of FIG. 19H.

Also in FIG. 19H, the plurality of slots are arranged on the time axis in the order of "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, "IEEE 802.11ad and/or IEEE 802.1ay channel 2" labeled 1902, "IEEE 802.11ad and/or IEEE 802.1 ay channel 3" labeled 1903, "IEEE 802.11ad and/or IEEE 802.11ay channel 4" labeled 1904, and so forth, but the slot arrangement is not limited to this. For example, the order of IEEE 802.11ad and/or IEEE 802.11ay channels to which the plurality of slots belong is not limited to this example.

For example, as long as FH is performed such that a plurality of slots are placed in any of "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 on the time axis, and the "IEEE 802.11ad and/or IEEE 802.11ay channel" to which the plurality of slots belong is switched as time passes, the same as the above description can be implemented and the same effects can be obtained as well.

Further, in the case of FIG. 19H, the number of "IEEE 802.11ad and/or IEEE 802.11ay channels" to which the plurality of slots present at certain time belong is three, which are "IEEE 802.11 ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904, but the present disclosure is not limited to this, and the same as the above description can be implemented and the same effects can be obtained as long as the number of "IEEE 802.11ad and/or IEEE 802.11ay channels" to which the plurality of slots belong in FH is two or more.

Thus, a method of using time and frequency in FH in transmitting a modulation signal by gNB is not limited to the example of FIG. 19H, and the number of "IEEE 802.11ad and/or IEEE 802.11ay channels" to which a plurality of slots present at certain time belong in FH only needs to be one or more.

Figure 19I:
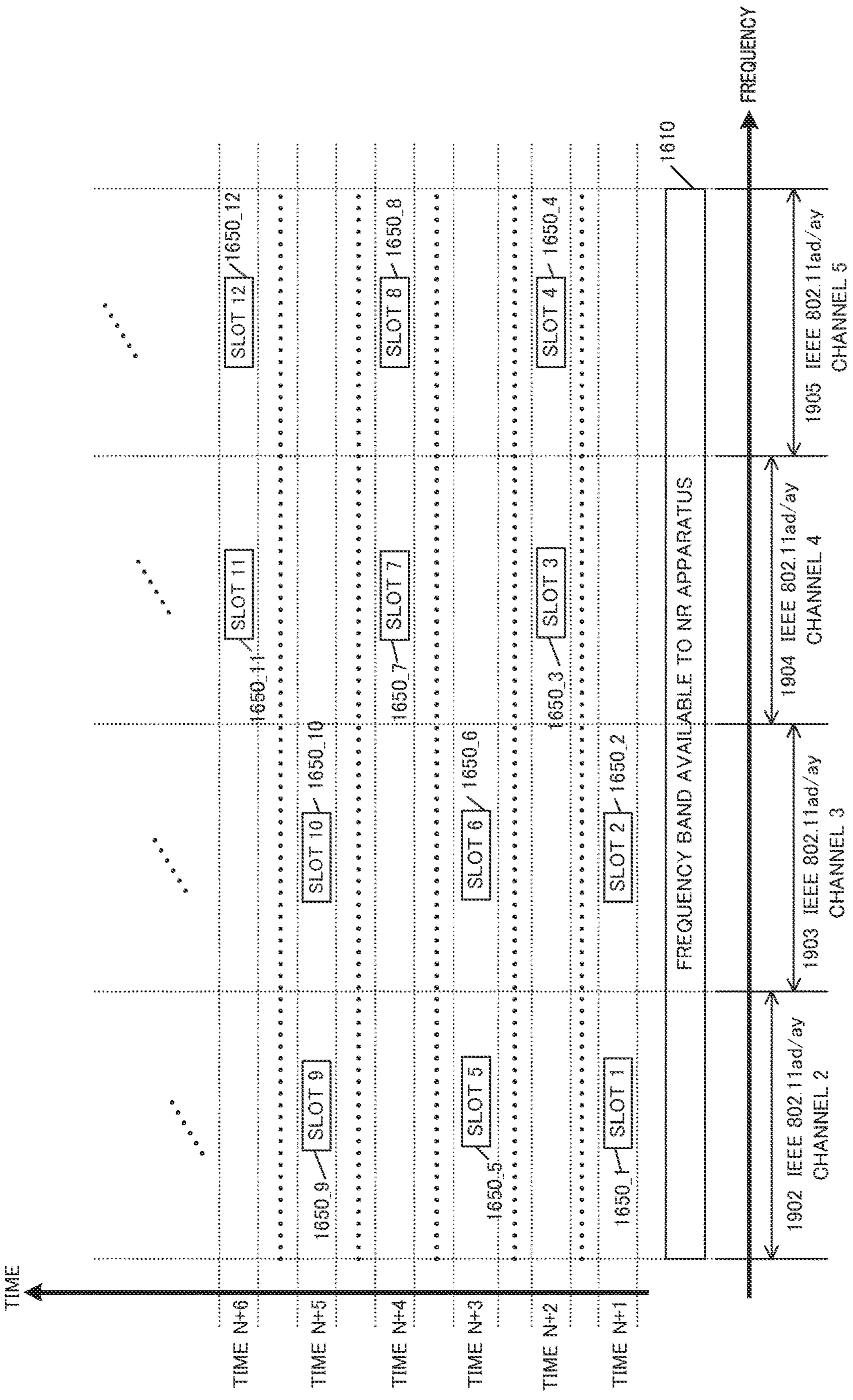
FIG. 19I illustrates an exemplary configuration of slots for a modulation signal transmitted by gNB.

FIG. 19I illustrates, for example, an exemplary configuration of slots for a modulation signal transmitted by gNB 1100 in FIG. 18, and the horizontal axis represents frequency while the vertical axis represents time. Note that, in FIG. 19I, components that operate in the same manner as in FIGS. 16A and 19A are denoted by the same reference signs, and the description thereof will be partially omitted.

As illustrated in FIG. 19I, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 19I, for example, "frequency band 1610 used by an NR apparatus" is present, and gNB 1100 in FIG. 18 transmits a modulation signal using "frequency band 1610 used by an NR apparatus", for example. Note that, in the example of FIG. 19I, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", "all or part of 'IEEE 802.11ad and/or IEEE 802.11ay channel 4' labeled 1904", and "all or part of 'IEEE 802.11ad and/or IEEE 802.11ay channel 5" labeled 1905".

Then, as illustrated in FIG. 19I, gNB 1100 transmits modulation signals to a communication counterpart such as NR-UE #1 labeled 1101_1 in FIG. 18, for example, in the following manner: at time N+1, gNB 1100 transmits a modulation signal in slot 1 labeled 1650_1 included in "IEEE 802.11ad and/or IEEE 802.11ay channel 2" labeled 1902 and slot 2 labeled 1650_2 included in "IEEE 802.11ad and/or IEEE 802.11ay channel 3" labeled 1903, at time N+2, gNB 1100 transmits a modulation signal in slot 3 labeled 1650_3 included in "IEEE 802.11ad and/or IEEE 802.11ay channel 4" labeled 1904 and slot 4 labeled 1650_4 included in "IEEE 802.11ad and/or IEEE 802.11ay channel 5" labeled 1905, at time N+3, gNB 1100 transmits a modulation signal in slot 5 labeled 1650_5 included in "IEEE 802.11ad and/or IEEE 802.11 ay channel 2" labeled 1902 and slot 6 labeled 1650_6 included in "IEEE 802.11ad and/or IEEE 802.11ay channel 3" labeled 1903, at time N+4, gNB 1100 transmits a modulation signal in slot 7 labeled 1650_7 included in "IEEE 802.11ad and/or IEEE 802.11ay channel 4" labeled 1904 and slot 8 labeled 1650_8 included in "IEEE 802.11ad and/or IEEE 802.11ay channel 5" labeled 1905, at time N+5, gNB 1100 transmits a modulation signal in slot 9 labeled 1650_9 included in "IEEE 802.11ad and/or IEEE 802.11ay channel 2" labeled 1902 and slot 10 labeled 1650_10 included in "IEEE 802.11ad and/or IEEE 802.11ay channel 3" labeled 1903, at time N+6, gNB 1100 transmits a modulation signal in slot 11 labeled 1650_11 included in "IEEE 802.11ad and/or IEEE 802.11ay channel 4" labeled 1904 and slot 12 labeled 1650_12 included in "IEEE 802.11ad and/or IEEE 802.11ay channel 5" labeled 1905, and so forth.

Note that another "frame, symbol, signal, etc." may be present between time N+1 and time N+2.

Note that another "frame, symbol, signal, etc." may be present between time N+2 and time N+3, or other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 19I. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

In the example of FIG. 19I, "slot 1 labeled 1650_1 and slot 2 labeled 1650_2" are present at time N+1, slot 1 labeled 1650_1 is present in "IEEE 802.11ad and/or IEEE 802.11ay channel 2" labeled 1902, and slot 2 labeled 1650_2 is present in "IEEE 802.11ad and/or IEEE 802.11ay channel 3" labeled 1903.

In addition, "slot 3 labeled 1650_3 and slot 4 labeled 1650_4" are present at time N+2, slot 3 labeled 1650_3 is present in "IEEE 802.11ad and/or IEEE 802.11ay channel 4" labeled 1904, and slot 4 labeled 1650_4 is present in "IEEE 802.11ad and/or IEEE 802.11ay channel 5" labeled 1905.

The slots, "slot 5 labeled 1650_5 and slot 6 labeled 1650_6", are present at time N+3, slot 5 labeled 1650_5 is present in "IEEE 802.11ad and/or IEEE 802.11ay channel 2" labeled 1902, and slot 6 labeled 1650_6 is present in "IEEE 802.11ad and/or IEEE 802.11ay channel 3" labeled 1903.

The slots, "slot 7 labeled 1650_7 and slot 8 labeled 1650_8", are present at time N+4, slot 7 labeled 1650_7 is present in "IEEE 802.11ad and/or IEEE 802.11ay channel 4"

labeled 1904, and slot 8 labeled 1650_8 is present in "IEEE 802.11ad and/or IEEE 802.11ay channel 5" labeled 1905.

The slots, "slot 9 labeled 1650_9 and slot 10 labeled 1650_10", are present at time N+5, slot 9 labeled 1650_9 is present in "IEEE 802.11ad and/or IEEE 802.11ay channel 2" labeled 1902, and slot 10 labeled 165010 is present in "IEEE 802.11ad and/or IEEE 802.11 ay channel 3" labeled 1903.

The slots, "slot 11 labeled 1650_11 and slot 12 labeled 1650_12", are present at time N+6, slot 11 labeled 1650_11 is present in "IEEE 802.11ad and/or IEEE 802.11ay channel 4" labeled 1904, and slot 12 labeled 165012 is present in "IEEE 802.11ad and/or IEEE 802.11ay channel 5" labeled 1905.

Features in FIG. 19I in this case are as follows.

A plurality of slots are present at the first time, at least one of the plurality of slots belongs to the first "IEEE 802.11ad and/or IEEE 802.11ay channel", and at least one of the plurality of slots belongs to the second "IEEE 802.11ad and/or IEEE 802.11ay channel".

For example, at least slot 1 labeled 16501 belonging to "IEEE 802.11ad and/or IEEE 802.11ay channel 2" labeled 1902 (the first "IEEE 802.11ad and/or IEEE 802.11ay channel") and slot 2 labeled 1650_2 belonging to "IEEE 802.11ad and/or IEEE 802.11ay channel 3" labeled 1903 (the second "IEEE 802.11ad and/or IEEE 802.11ay channel") are present at time N+1 (the first time).

Note that the above feature is found at time N+2, time N+3, and so forth.

FH is configured such that "IEEE 802.11ad and/or IEEE 802.11ay channels" to which the plurality of slots belong are switched as time passes.

For example, slot 1 labeled 1650_1 belonging to "IEEE 802.11ad and/or IEEE 802.11ay channel 2" labeled 1902 and slot 2 labeled 1650_2 belonging to "IEEE 802.11ad and/or IEEE 802.11ay channel 3" labeled 1903 are present at time N+1, and slot 3 labeled 1650_3 belonging to "IEEE 802.11ad and/or IEEE 802.11ay channel 4" labeled 1904 and slot 4 labeled 16504 belonging to "IEEE 802.11ad and/or IEEE 802.11ay channel 5" labeled 1905 are present at time N+2.

Note that, although not illustrated in FIG. 19I, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1. In FIG. 19I, NR channels for the modulation signals transmitted by gNB 1100 are not illustrated.

The above-described manner leads to the similar effects to those described in the examples of FIGS. 19A, 19C, 19D, and 19E.

Note that the arrangement method for slots in the frequency and time domains is not limited to the example of FIG. 19I.

Also in FIG. 19I, the plurality of slots are arranged on the time axis in the order of "'IEEE 802.11ad and/or IEEE 802.11ay channel 2' labeled 1902 and 'IEEE 802.11ad and/or IEEE 802.11ay channel 3' labeled 1903", and "'IEEE 802.11ad and/or IEEE 802.11ay channel 4' labeled 1904 and 'IEEE 802.11ad and/or IEEE 802.11ay channel 5' labeled 1905", "'IEEE 802.11ad and/or IEEE 802.11ay channel 2' labeled 1902 and 'IEEE 802.11ad and/or IEEE 802.11ay channel 3' labeled 1903", and "'IEEE 802.11ad and/or IEEE 802.11ay channel 4' labeled 1904 and 'IEEE 802.11ad and/or IEEE 802.11ay channel 5' labeled 1905", and so forth, but the slot arrangement is not limited to this. For example, the order of IEEE 802.11ad and/or IEEE 802.11ay channels to which the plurality of slots belong is not limited to this example.

For example, as long as FH is performed such that a plurality of slots are placed in a plurality of "IEEE 802.11ad and/or IEEE 802.11ay channels" at certain time on the time axis, and the plurality of "IEEE 802.11ad and/or IEEE 802.11ay channels" to which the plurality of slots belong are switched as time passes, the same as the above description can be implemented and the same effects can be obtained as well.

Further, in the case of FIG. 19I, the number of "IEEE 802.11ad and/or IEEE 802.11ay channels" to which the plurality of slots present at certain time belong is four, which are "IEEE 802.11 ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905, but the present disclosure is not limited to this, and the same as the above description can be implemented and the same effects can be obtained as long as the number of "IEEE 802.11ad and/or IEEE 802.11ay channels" to which the plurality of slots belong in FH is two or more.

Thus, a method of using time and frequency in FH in transmitting a modulation signal by gNB is not limited to the example of FIG. 19I, and the number of "IEEE 802.11ad and/or IEEE 802.11ay channels" to which a plurality of slots present at certain time belong in FH only needs to be two or more.

Figure 19J:
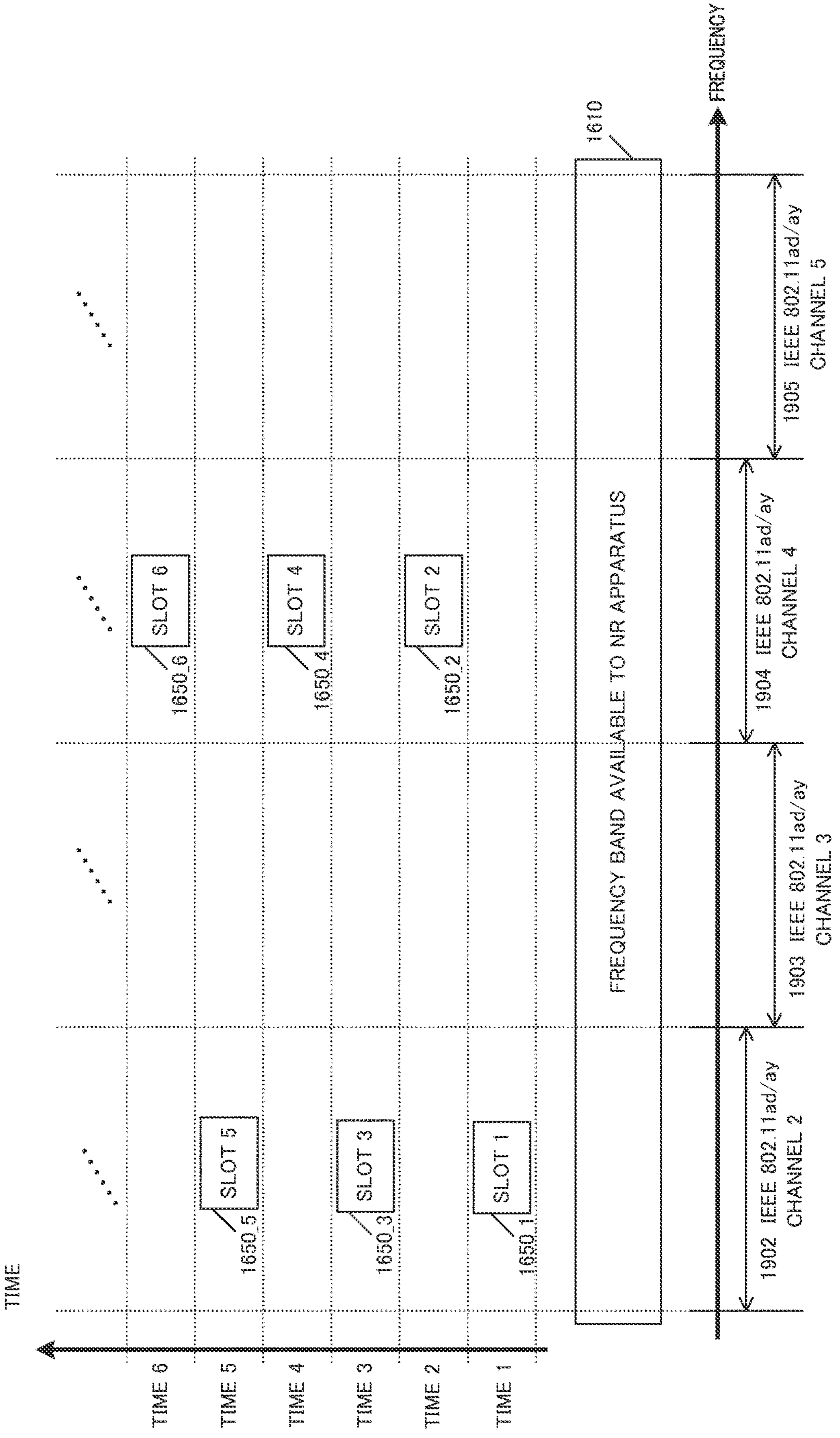
FIG. 19J illustrates an exemplary configuration of slots for a modulation signal transmitted by gNB.

FIG. 19J illustrates, for example, an exemplary configuration of slots for a modulation signal transmitted by gNB 1100 in FIG. 18, and the horizontal axis represents frequency while the vertical axis represents time. Note that, in FIG. 19J, components that operate in the same manner as in FIGS. 16A and 19A are denoted by the same reference signs, and the description thereof will be partially omitted.

As illustrated in FIG. 19J, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 19J, for example, "frequency band 1610 used by an NR apparatus" is present, and gNB 1100 in FIG. 18 transmits a modulation signal using "frequency band 1610 used by an NR apparatus", for example. Note that, in the example of FIG. 19J, "frequency band 1610 used by an NR apparatus" includes "all or part of 'IEEE 802.11ad and/or IEEE 802.11ay channel 2' labeled 1902" and "all or part of 'IEEE 802.11ad and/or IEEE 802.11ay channel 4' labeled 1904".

Then, as illustrated in FIG. 19J, gNB 1100 transmits modulation signals to a communication counterpart such as NR-UE #1 labeled 1101_1 in FIG. 18, for example, in the following manner: at time 1, gNB 1100 transmits a modulation signal in slot 1 labeled 1650_1 included in "IEEE 802.11ad and/or IEEE 802.11ay channel 2" labeled 1902, at time 2, gNB 1100 transmits a modulation signal in slot 2 labeled 1650_2 included in "IEEE 802.11ad and/or IEEE 802.11ay channel 4" labeled 1904, at time 3, gNB 1100 transmits a modulation signal in slot 3 labeled 1650_3 included in "IEEE 802.11ad and/or IEEE 802.11ay channel 2" labeled 1902, at time 4, gNB 1100 transmits a modulation signal in slot 4 labeled 1650_4 included in "IEEE 802.11ad and/or IEEE 802.11ay channel 4" labeled 1904, at time 5, gNB 1100 transmits a modulation signal in slot 5 labeled 1650_5 included in "IEEE 802.11ad and/or IEEE 802.11ay channel 2" labeled 1902, at time 6, gNB 1100 transmits a modulation signal in slot 6 labeled 1650_6 included in "IEEE 802.11ad and/or IEEE 802.11ay channel 4" labeled 1904, and so forth.

The gNB transmits these modulation signals subjected to FH as in the example of FIG. 19J. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

Features in FIG. 19J in this case are as follows.

When at least "the first 'IEEE 802.11ad and/or IEEE 802.11ay channel'" and "the second 'IEEE 802.11ad and/or IEEE 802.11ay channel'" in which the slots are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11 ay channel'".

For example, in FIG. 19J, slots are present in "IEEE 802.11ad and/or IEEE 802.11ay channel 2" labeled 1902 (the first "IEEE 802.11ad and/or IEEE 802.11ay channel") and slots are present in "IEEE 802.11ad and/or IEEE 802.11ay channel 4" labeled 1904 (the second "IEEE 802.11ad and/or IEEE 802.11ay channel").

In this case, "IEEE 802.11ad and/or IEEE 802.11ay channel 3" labeled 1903 is present between "'IEEE 802.11ad and/or IEEE 802.11 ay channel 2' labeled 1902" (the first 'IEEE 802.11ad and/or IEEE 802.11ay channel')" and "'IEEE 802.11ad and/or IEEE 802.11ay channel 4' labeled 1904 (the second 'IEEE 802.11ad and/or IEEE 802.11ay channel')", that is, one "IEEE 802.11ad and/or IEEE 802.11ay channel" is present in between.

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11 ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "slot 1 labeled 1650_1, slot 3 labeled 1650_3, slot 5 labeled 1650_5, and so forth" are present and a second modulation signal defined by IEEE 802.11ay is present at a part where "slot 2 labeled 1650_2, slot 4 labeled 1650_4, slot 6 labeled 1650_6, and so forth" are present in FIG. 19J, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 19J.

Note that, although not illustrated in FIG. 19J, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19J, NR channels for the modulation signals transmitted by gNB 1100 are not illustrated.

Further, the above-described operation leads to the similar effects to those described in the examples of FIGS. 19A, 19C, 19D, and 19E.

Note that the arrangement method for slots in the frequency and time domains is not limited to the example of FIG. 19J.

In FIG. 19J, the plurality of slots are arranged on the time axis in the order of "'IEEE 802.11ad and/or IEEE 802.11ay channel 2' labeled 1902", "'IEEE 802.11ad and/or IEEE 802.11ay channel 4' labeled 1904", "'IEEE 802.11ad and/or IEEE 802.11ay channel 2' labeled 1902", "'IEEE 802.11ad and/or IEEE 802.11ay channel 4' labeled 1904", and so forth, but the slot arrangement is not limited to this.

For example, while a single slot is present at time 1 in "IEEE 802.11ad and/or IEEE 802.11ay channel 2" labeled 1902 as seen in FIG. 19J in which slot 1 labeled 1650_1 is present at time 1 in "IEEE 802.11ad and/or IEEE 802.11ay channel 2" labeled 1902, a plurality of slots may be present at time 1 in "IEEE 802.11ad and/or IEEE 802.11ay channel 2" labeled 1902. The same applies to time 3, time 5, and so forth.

For example, while a single slot is present at time 2 in "IEEE 802.11ad and/or IEEE 802.11ay channel 4" labeled 1904 as seen in FIG. 19J in which slot 2 labeled 1650_2 is present at time 2 in "IEEE 802.11ad and/or IEEE 802.11ay channel 4" labeled 1904, a plurality of slots may be present at time 2 in "IEEE 802.11ad and/or IEEE 802.11ay channel 4" labeled 1904. The same applies to time 4, time 6, and so forth.

Figure 19K:
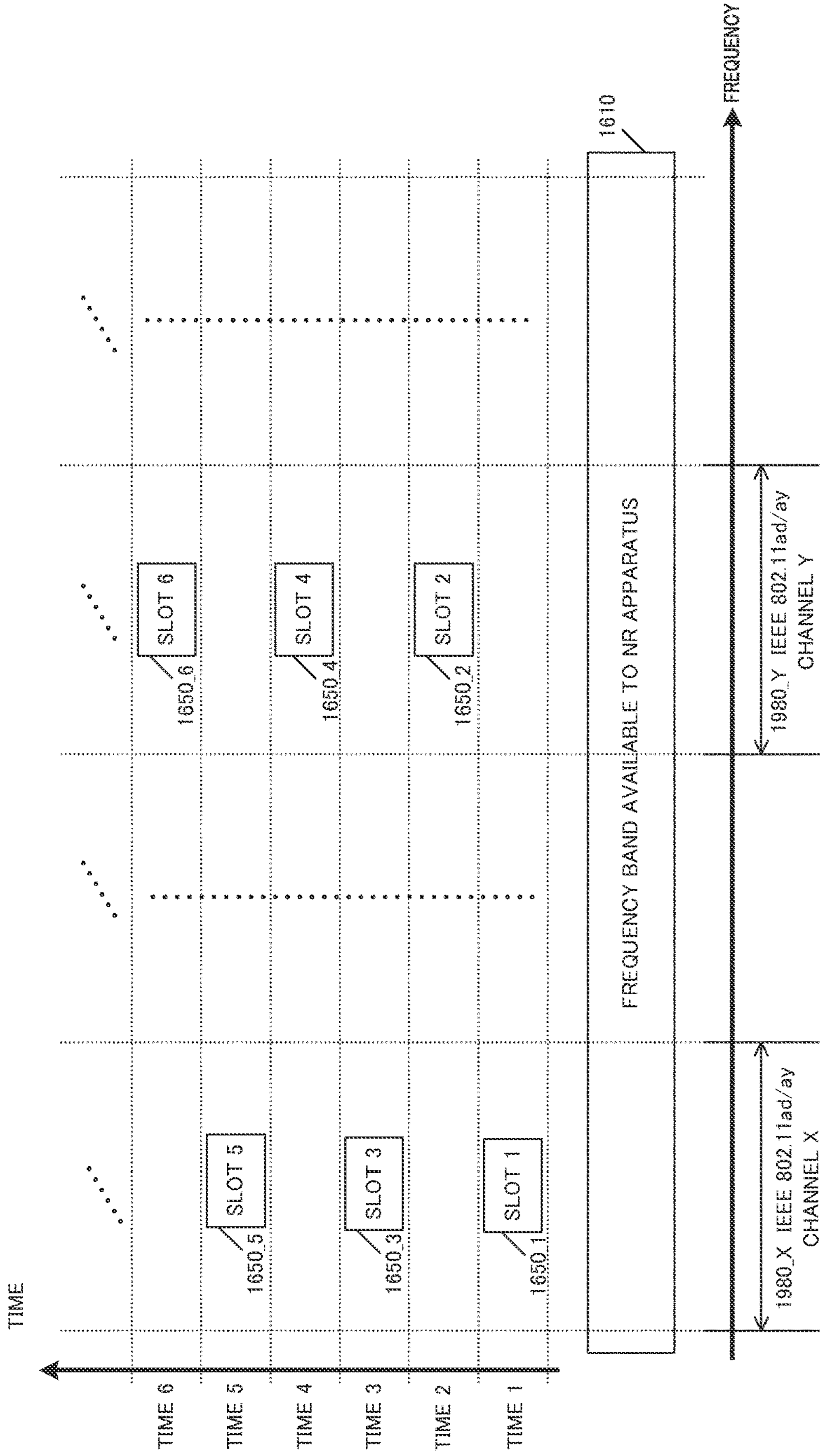
FIG. 19K illustrates an exemplary configuration of slots for a modulation signal transmitted by gNB.

FIG. 19K illustrates, for example, an exemplary configuration of slots for a modulation signal transmitted by gNB 1100 in FIG. 18, and the horizontal axis represents frequency while the vertical axis represents time. Note that, in FIG. 19K, components that operate in the same manner as in FIGS. 16A and 19A are denoted by the same reference signs, and the description thereof will be partially omitted.

As illustrated in FIG. 19K, "IEEE 802.11ad and/or IEEE 802.11ay channel X" labeled 1980_X and "IEEE 802.11ad and/or IEEE 802.11ay channel Y" labeled 1980_Y are present for the frequency axis. In FIG. 19K, for example, "frequency band 1610 used by an NR apparatus" is present, and gNB 1100 in FIG. 18 transmits a modulation signal using "frequency band 1610 used by an NR apparatus", for example. Note that, in the example of FIG. 19K, "frequency band 1610 used by an NR apparatus" includes "all or part of 'IEEE 802.11ad and/or IEEE 802.11ay channel X' labeled 1980_X" and "all or part of 'IEEE 802.11ad and/or IEEE 802.11ay channel Y' labeled 1980_Y".

Then, as illustrated in FIG. 19K, gNB 1100 transmits modulation signals to a communication counterpart such as NR-UE #1 labeled 1101_1 in FIG. 18, for example, in the following manner: at time 1, gNB 1100 transmits a modulation signal in slot 1 labeled 1650_1 included in "IEEE 802.11ad and/or IEEE 802.11ay channel X" labeled 1980_X, at time 2, gNB 1100 transmits a modulation signal in slot 2 labeled 1650_2 included in "IEEE 802.11ad and/or IEEE 802.11ay channel Y" labeled 1980_Y, at time 3, gNB 1100 transmits a modulation signal in slot 3 labeled 1650_3 included in "IEEE 802.11ad and/or IEEE 802.11ay channel X" labeled 1980_X, at time 4, gNB 1100 transmits a modulation signal in slot 4 labeled 1650_4 included in "IEEE 802.11ad and/or IEEE 802.11ay channel Y" labeled 1980_Y, at time 5, gNB 1100 transmits a modulation signal in slot 5 labeled 1650_5 included in "IEEE 802.11ad and/or IEEE 802.11 ay channel X" labeled 1980_X, at time 6, gNB 1100 transmits a modulation signal in slot 6 labeled 1650_6 included in "IEEE 802.11ad and/or IEEE 802.11ay channel Y" labeled 1980_Y, and so forth.

The gNB transmits these modulation signals subjected to FH as in the example of FIG. 19K. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

Features in FIG. 19K in this case are as follows.

When at least "the first 'IEEE 802.11ad and/or IEEE 802.11ay channel'" and "the second 'IEEE 802.11ad and/or IEEE 802.11ay channel'" in which the slots are present are present, one or more "IEEE 802.11 ad and/or IEEE 802.11 ay channels" are present between "the first 'IEEE 802.11ad and/or IEEE 802.11ay channel'" and "the second 'IEEE 802.11ad and/or IEEE 802.11ay channel'".

For example, in FIG. 19K, slots are present in "IEEE 802.11ad and/or IEEE 802.11ay channel X" labeled 1980_X (the first "IEEE 802.11ad and/or IEEE 802.11ay channel") and slots are present in "IEEE 802.11ad and/or IEEE 802.11 ay channel Y" labeled 1980_Y (the second "IEEE 802.11ad and/or IEEE 802.11ay channel").

In this case, one or more "IEEE 802.11ad and/or IEEE 802.11ay channels" are present between "IEEE 802.11ad and/or IEEE 802.11ay channel X" labeled 1980_X (the first "IEEE 802.11ad and/or IEEE 802.11ay channel") and "IEEE 802.11ad and/or IEEE 802.11ay channel Y" labeled 1980_Y (the second "IEEE 802.11ad and/or IEEE 802.11ay channel").

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "slot 1 labeled 1650_1, slot 3 labeled 1650_3, slot 5 labeled 1650_5, and so forth" are present and a second modulation signal defined by IEEE 802.11ay is present at a part where "slot 2 labeled 1650_2, slot 4 labeled 1650_4, slot 6 labeled 1650_6, and so forth" are present in FIG. 19K, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 19K.

Note that, although not illustrated in FIG. 19K, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19K, NR channels for the modulation signals transmitted by gNB 1100 are not illustrated.

Further, the above-described operation leads to the similar effects to those described in the examples of FIGS. 19A, 19C, 19D, and 19E.

Note that the arrangement method for slots in the frequency and time domains is not limited to the example of FIG. 19K.

In FIG. 19K, the plurality of slots are arranged on the time axis in the order of "IEEE 802.11ad and/or IEEE 802.11 ay channel X" labeled 1980_X, "IEEE 802.11ad and/or IEEE 802.11ay channel Y" labeled 1980_Y, "IEEE 802.11ad and/or IEEE 802.11ay channel X" labeled 1980_X, "IEEE 802.11ad and/or IEEE 802.11ay channel Y" labeled 1980_Y, and so forth, but the slot arrangement is not limited to this.

For example, while a single slot is present at time 1 in "IEEE 802.11ad and/or IEEE 802.11ay channel X" labeled 1980_X as seen in FIG. 19K in which slot 1 labeled 1650_1 is present at time 1 in "IEEE 802.11ad and/or IEEE 802.11ay channel X" labeled 1980_X, a plurality of slots may be present at time 1 in "IEEE 802.11ad and/or IEEE 802.11ay channel X" labeled 1980_X. The same applies to time 3, time 5, and so forth.

For example, while a single slot is present at time 2 in "IEEE 802.11ad and/or IEEE 802.11ay channel Y" labeled 1980_Y as seen in FIG. 19K in which slot 2 labeled 1650_2 is present at time 2 in "IEEE 802.11ad and/or IEEE 802.11ay channel Y" labeled 1980_Y, a plurality of slots may be present at time 2 in "IEEE 802.11ad and/or IEEE 802.11ay channel Y" labeled 1980_Y. The same applies to time 4, time 6, and so forth.

Although the channels in which slots are present in FIG. 19K are "IEEE 802.11ad and/or IEEE 802.11ay channel X" labeled 1980_X and "IEEE 802.11ad and/or IEEE 802.11ay channel Y" labeled 1980_Y, the same operation may also be performed when a slot is present in an "IEEE 802.11ad and/or IEEE 802.11ay channel" other than the above channels.

Figure 19L:
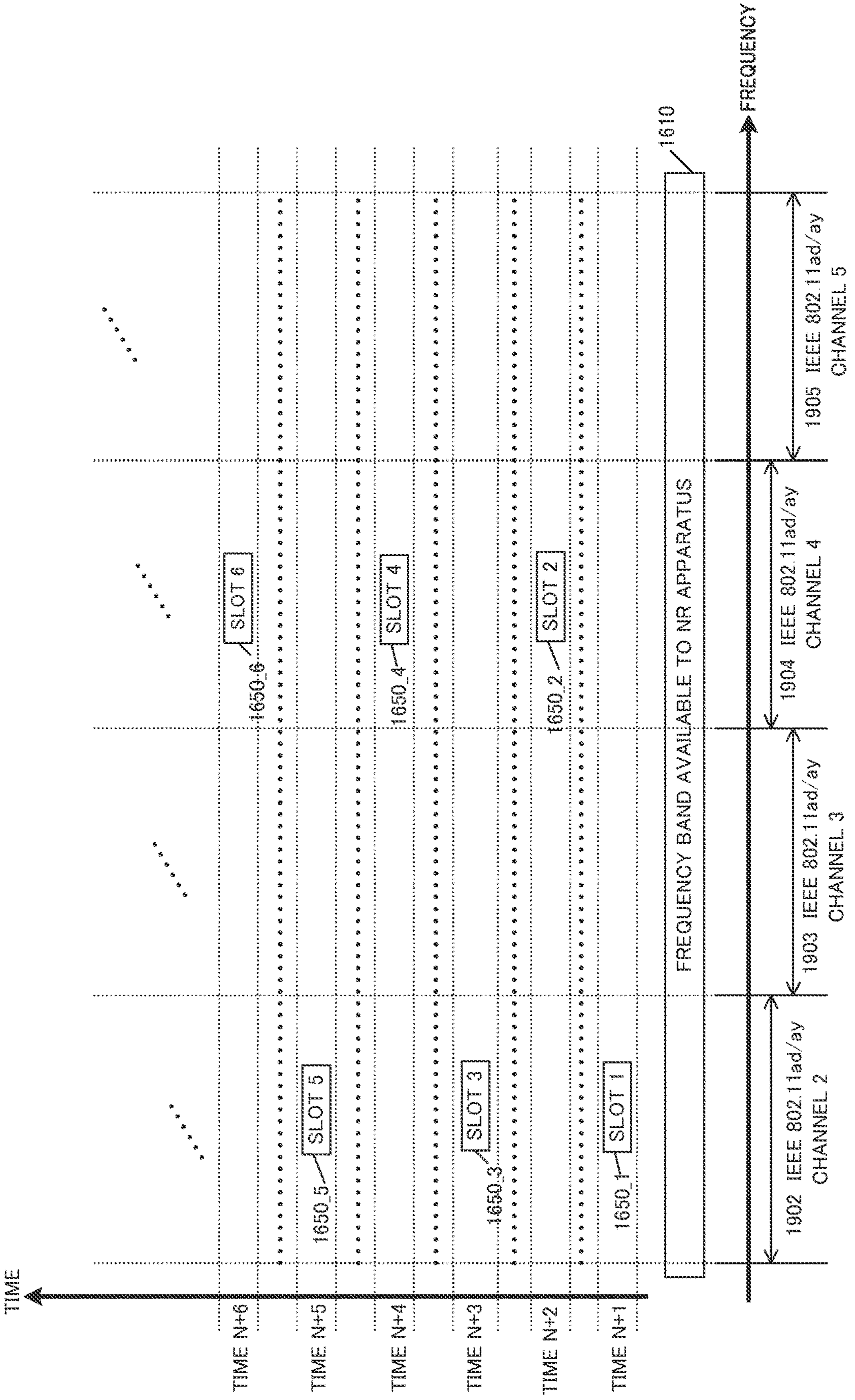
FIG. 19L illustrates an exemplary configuration of slots for a modulation signal transmitted by gNB.

FIG. 19L illustrates, for example, an exemplary configuration of slots for a modulation signal transmitted by gNB 1100 in FIG. 18, and the horizontal axis represents frequency while the vertical axis represents time. Note that, in FIG. 19L, components that operate in the same manner as in FIGS. 16A and 19A are denoted by the same reference signs, and the description thereof will be partially omitted.

As illustrated in FIG. 19L, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 19L, for example, "frequency band 1610 used by an NR apparatus" is present, and gNB 1100 in FIG. 18 transmits a modulation signal using "frequency band 1610 used by an NR apparatus", for example. Note that, in the example of FIG. 19L, "frequency band 1610 used by an NR apparatus" includes "all or part of 'IEEE 802.11ad and/or IEEE 802.11ay channel 2' labeled 1902" and "all or part of 'IEEE 802.11ad and/or IEEE 802.11ay channel 4' labeled 1904".

Then, as illustrated in FIG. 19L, gNB 1100 transmits modulation signals to a communication counterpart such as NR-UE #1 labeled 1101_1 in FIG. 18, for example, in the following manner: at time N+1, gNB 1100 transmits a modulation signal in slot 1 labeled 1650_1 included in "IEEE 802.11ad and/or IEEE 802.11ay channel 2" labeled 1902, at time N+2, gNB 1100 transmits a modulation signal in slot 2 labeled 1650_2 included in "IEEE 802.11 ad and/or IEEE 802.11ay channel 4" labeled 1904, at time N+3, gNB 1100 transmits a modulation signal in slot 3 labeled 1650_3 included in "IEEE 802.11ad and/or IEEE 802.11ay channel 2" labeled 1902, at time N+4, gNB 1100 transmits a modulation signal in slot 4 labeled 1650_4 included in "IEEE 802.11ad and/or IEEE 802.11ay channel 4" labeled 1904, at time N+5, gNB 1100 transmits a modulation signal in slot 5 labeled 1650_5 included in "IEEE 802.11ad and/or IEEE 802.11ay channel 2" labeled 1902, at time N+6, gNB 1100 transmits a modulation signal in slot 6 labeled 1650_6 included in "IEEE 802.11 ad and/or IEEE 802.11 ay channel 4" labeled 1904, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 19L. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5". "slot 6 labeled 1650_6", and so forth.

Features in FIG. 19L in this case are as follows.

When at least "the first 'IEEE 802.11 ad and/or IEEE 802.11ay channel'" and "the second 'IEEE 802.11ad and/or IEEE 802.11ay channel'" in which the slots are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11ay channel'".

For example, in FIG. 19L, slots are present in "IEEE 802.11ad and/or IEEE 802.11ay channel 2" labeled 1902 (the first "IEEE 802.11ad and/or IEEE 802.11ay channel") and slots are present in "IEEE 802.11ad and/or IEEE 802.11ay channel 4" labeled 1904 (the second "IEEE 802.11ad and/or IEEE 802.11ay channel").

In this case, "IEEE 802.11ad and/or IEEE 802.11ay channel 3" labeled 1903 is present between "'IEEE 802.11ad and/or IEEE 802.11ay channel 2' labeled 1902" (the first 'IEEE 802.11ad and/or IEEE 802.11ay channel')" and "'IEEE 802.11ad and/or IEEE 802.11ay channel 4' labeled 1904 (the second 'IEEE 802.11ad and/or IEEE 802.11ay channel')", that is, one "IEEE 802.11ad and/or IEEE 802.11 ay channel" is present in between.

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "slot 1 labeled 1650_1, slot 3 labeled 1650_3, slot 5 labeled 1650_5, and so forth" are present and a second modulation signal defined by IEEE 802.11ay is present at a part where "slot 2 labeled 1650_2, slot 4 labeled 1650_4, slot 6 labeled 1650_6, and so forth" are present in FIG. 19L, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 19L.

Note that, although not illustrated in FIG. 19L, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19L, NR channels for the modulation signals transmitted by gNB 1100 are not illustrated.

Further, the above-described operation leads to the similar effects to those described in the examples of FIGS. 19A, 19C. 19D, and 19E.

Note that the arrangement method for slots in the frequency and time domains is not limited to the example of FIG. 19L.

In FIG. 19L, the plurality of slots are arranged on the time axis in the order of "'IEEE 802.11ad and/or IEEE 802.11ay channel 2 labeled 1902", "IEEE 802.11ad and/or IEEE 802.11ay channel 4' labeled 1904", "'IEEE 802.11ad and/or IEEE 802.11ay channel 2' labeled 1902", "'IEEE 802.11ad and/or IEEE 802.11ay channel 4' labeled 1904", and so forth, but the slot arrangement is not limited to this.

For example, while a single slot is present at time N+1 in "IEEE 802.11ad and/or IEEE 802.11ay channel 2" labeled 1902 as seen in FIG. 19L in which slot 1 labeled 1650_1 is present at time N+1 in "IEEE 802.11ad and/or IEEE 802.11ay channel 2" labeled 1902, a plurality of slots may be present at time N+1 in "IEEE 802.11ad and/or IEEE 802.11ay channel 2" labeled 1902. The same applies to time N+3, time N+5, and so forth.

For example, while a single slot is present at time N+2 in "IEEE 802.11ad and/or IEEE 802.11ay channel 4" labeled 1904 as seen in FIG. 19L in which slot 2 labeled 1650_2 is present at time N+2 in "IEEE 802.11ad and/or IEEE 802.11ay channel 4" labeled 1904, a plurality of slots may be present at time N+2 in "IEEE 802.11ad and/or IEEE 802.11ay channel 4" labeled 1904. The same applies to time N+4, time N+6, and so forth.

Figure 19M:
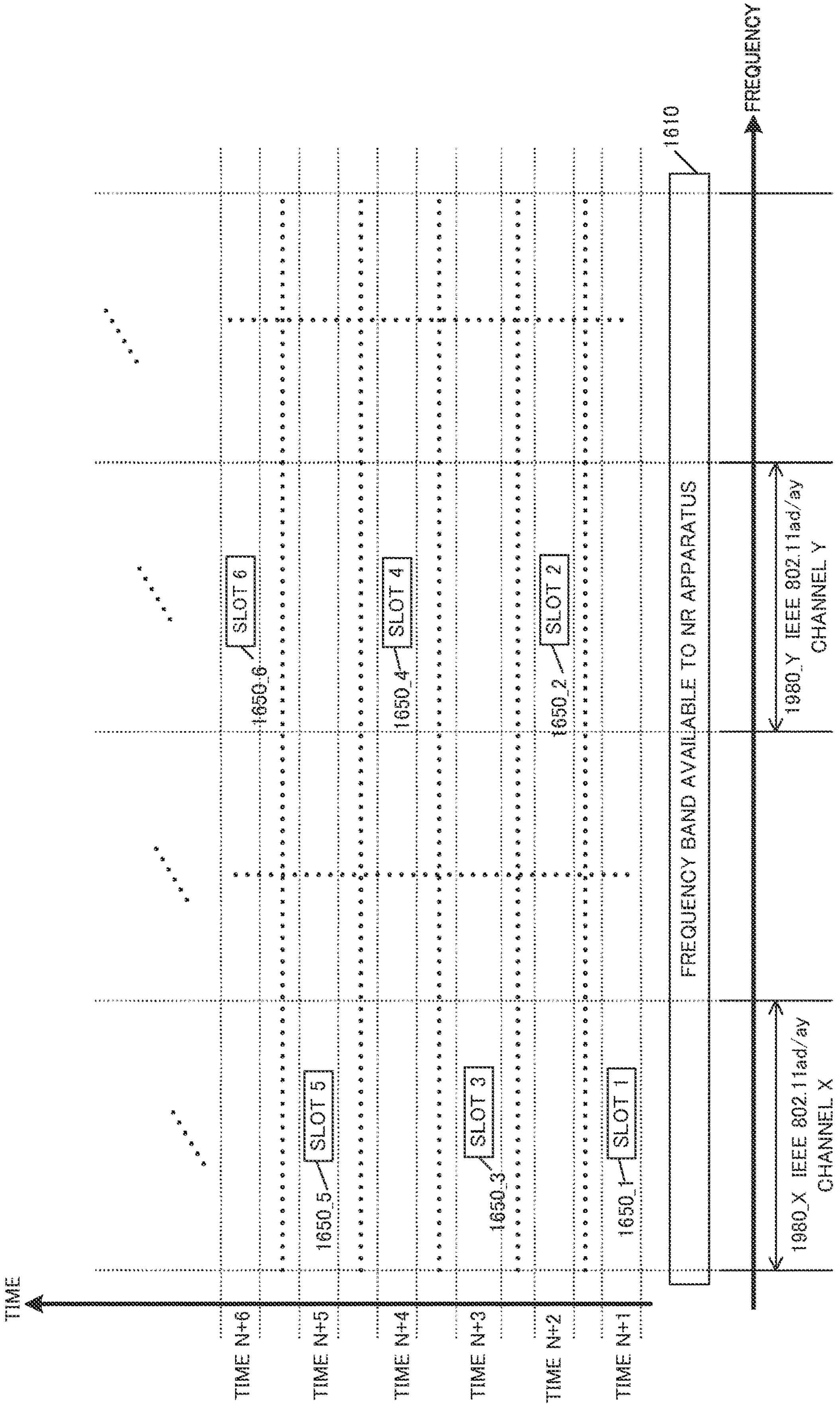
FIG. 19M illustrates an exemplary configuration of slots for a modulation signal transmitted by gNB.

FIG. 19M illustrates, for example, an exemplary configuration of slots for a modulation signal transmitted by gNB 1100 in FIG. 18, and the horizontal axis represents frequency while the vertical axis represents time. Note that, in FIG. 19M, components that operate in the same manner as in FIGS. 16A and 19A are denoted by the same reference signs, and the description thereof will be partially omitted.

As illustrated in FIG. 19M, "IEEE 802.11ad and/or IEEE 802.11ay channel X" labeled 1980_X and "IEEE 802.11ad and/or IEEE 802.11ay channel Y" labeled 1980_Y are present for the frequency axis. In FIG. 19M, for example, "frequency band 1610 used by an NR apparatus" is present, and gNB 1100 in FIG. 18 transmits a modulation signal using "frequency band 1610 used by an NR apparatus", for example. Note that, in the example of FIG. 19M, "frequency band 1610 used by an NR apparatus" includes "all or part of 'IEEE 802.11ad and/or IEEE 802.11ay channel X' labeled 1980_X" and "all or part of 'IEEE 802.11ad and/or IEEE 802.11ay channel Y' labeled 1980_Y".

Then, as illustrated in FIG. 19M, gNB 1100 transmits modulation signals to a communication counterpart such as NR-UE #1 labeled 1101_1 in FIG. 18, for example, in the following manner: at time N+1, gNB 1100 transmits a modulation signal in slot 1 labeled 1650_1 included in "IEEE 802.11ad and/or IEEE 802.11ay channel X" labeled 1980_X, at time N+2, gNB 1100 transmits a modulation signal in slot 2 labeled 1650_2 included in "IEEE 802.11ad and/or IEEE 802.11ay channel Y" labeled 1980_Y, at time N+3, gNB 1100 transmits a modulation signal in slot 3 labeled 1650_3 included in "IEEE 802.11ad and/or IEEE 802.11ay channel X" labeled 1980_X, at time N+4, gNB 1100 transmits a modulation signal in slot 4 labeled 1650_4 included in "IEEE 802.11ad and/or IEEE 802.11ay channel Y" labeled 1980_Y, at time N+5, gNB 1100 transmits a modulation signal in slot 5 labeled 1650_5 included in "IEEE 802.11ad and/or IEEE 802.11ay channel X" labeled 1980_X, at time N+6, gNB 1100 transmits a modulation signal in slot 6 labeled 1650_6 included in "IEEE 802.11ad and/or IEEE 802.11ay channel Y" labeled 1980_Y, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 19M. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5". "slot 6 labeled 1650_6", and so forth.

Features in FIG. 19M in this case are as follows.

When at least "the first 'IEEE 802.11ad and/or IEEE 802.11ay channel'" and "the second 'IEEE 802.11ad and/or IEEE 802.11ay channel'" in which the slots are present are present, one or more "IEEE 802.11ad and/or IEEE 802.11ay channels" are present between "the first 'IEEE 802.11 ad and/or IEEE 802.11ay channel'" and "the second 'IEEE 802.11 ad and/or IEEE 802.11ay channel'".

For example, in FIG. 19M, slots are present in "IEEE 802.11ad and/or IEEE 802.11ay channel X" labeled 1980_X (the first "IEEE 802.11ad and/or IEEE 802.11ay channel") and slots are present in "IEEE 802.11ad and/or IEEE 802.11ay channel Y" labeled 1980_Y (the second "IEEE 802.11ad and/or IEEE 802.11ay channel").

In this case, one or more "IEEE 802.11ad and/or IEEE 802.11ay channels" are present between "IEEE 802.11ad and/or IEEE 802.11ay channel X" labeled 1980_X (the first "IEEE 802.11ad and/or IEEE 802.11ay channel") and "IEEE 802.11ad and/or IEEE 802.11ay channel Y" labeled 1980_Y (the second "IEEE 802.11ad and/or IEEE 802.11ay channel").

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "slot 1 labeled 1650_1, slot 3 labeled 1650_3, slot 5 labeled 1650_5, and so forth" are present and a second modulation signal defined by IEEE 802.11ay is present at a part where "slot 2 labeled 1650_2, slot 4 labeled 1650_4, slot 6 labeled 1650_6, and so forth" are present in FIG. 19M, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 19M.

Note that, although not illustrated in FIG. 19M, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 19M, NR channels for the modulation signals transmitted by gNB 1100 are not illustrated.

Further, the above-described operation leads to the similar effects to those described in the examples of FIGS. 19A, 19C, 19D, and 19E.

Note that the arrangement method for slots in the frequency and time domains is not limited to the example of FIG. 19M.

In FIG. 19M, the plurality of slots are arranged on the time axis in the order of "IEEE 802.11ad and/or IEEE 802.11 ay channel X" labeled 1980_X, "IEEE 802.11ad and/or IEEE 802.11ay channel Y" labeled 1980_Y, "IEEE 802.11ad and/or IEEE 802.11ay channel X" labeled 1980_X, "IEEE 802.11ad and/or IEEE 802.11ay channel Y" labeled 1980_Y, and so forth, but the slot arrangement is not limited to this.

For example, while a single slot is present at time N+1 in "IEEE 802.11ad and/or IEEE 802.11ay channel X" labeled 1980_X as seen in FIG. 19M in which slot 1 labeled 1650_1 is present at time N+1 in "IEEE 802.11ad and/or IEEE 802.11ay channel X" labeled 1980_X, a plurality of slots may be present at time N+1 in "IEEE 802.11ad and/or IEEE 802.11ay channel X" labeled 1980_X. The same applies to time N+3, time N+5, and so forth.

For example, while a single slot is present at time N+2 in "IEEE 802.11ad and/or IEEE 802.11ay channel Y" labeled 1980_Y as seen in FIG. 19M in which slot 2 labeled 1650_2 is present at time N+2 in "IEEE 802.11ad and/or IEEE 802.11ay channel Y" labeled 1980_Y, a plurality of slots may be present at time N+2 in "IEEE 802.11ad and/or IEEE 802.11ay channel Y" labeled 1980_Y The same applies to time N+4, time N+6, and so forth.

Although the channels in which slots are present in FIG. 19M are "IEEE 802.11ad and/or IEEE 802.11ay channel X" labeled 1980_X and "IEEE 802.11ad and/or IEEE 802.11ay channel Y" labeled 1980_Y, the same operation may also be performed when a slot is present in an "IEEE 802.11ad and/or IEEE 802.11ay channel" other than the above channels.

Note that, although the term "slot" is used in the description using FIGS. 19A, 19C, 19D, 19E, 19F, 19G, 19H, 19I, 19J, 19K, 19L, 19M, etc., the name is not limited thereto and may be a symbol, OFDM symbol (part of OFDM symbol), or frame, for example.

In the NR system, for example, a slot may be composed of 1 to 14 (both inclusive) OFDM symbols (parts of OFDM symbols).

An exemplary method of suitably configuring a slot in the NR system will be described.

For example, in the NR system of 52.6 GHz or higher (and 71 GHz or lower), e.g., 60 GHz band, the deferral period is specified as 8 micro (p) seconds for energy measurement. Accordingly, when a slot length is 8 micro (p) seconds or shorter and the first NR apparatus transmits a modulation signal including a slot, another NR apparatus need not detect the modulation signal of the slot by LBT. Thus, another NR apparatus can possibly transmit a modulation signal without performing LBT.

With this regard, FH is performed by configuring SCS of OFDM to be 960 kHz and configuring one slot with one OFDM symbol (part of one OFDM symbol), and an NR apparatus transmits a modulation signal. In this manner, the time length of one slot is, for example, 7.2 micro (μ) seconds, and the NR apparatus can transmit a modulation signal subjected to FH without performing LBT. Note that the FH method described thus far is considered as one of suitable methods as FH, but the FH method is not necessarily limited to this FH method.

In addition, the SCS of OFDM is not limited to 960 kHz. Note that these FH methods may be referred to as FH methods in which the frequency is switched slot by slot.

The above description is about the "FH method by configuring SCS of OFDM to be 960 kHz and configuring one slot with one OFDM symbol (part of one OFDM symbol)", but an "FH method by configuring SCS of OFDM to be 960 kHz and configuring one slot with two or more OFDM symbols (parts of OFDM symbols)" may be applied. In terms of exemplary FH in this case, FIGS. 20A, 20B, 20C, 20D, 20E, 20F, 20G, 20H, 20I, 20J, 20K, and 20L will be described. Note that, the SCS of OFDM is not limited to 960 kHz.

Figure 20A:
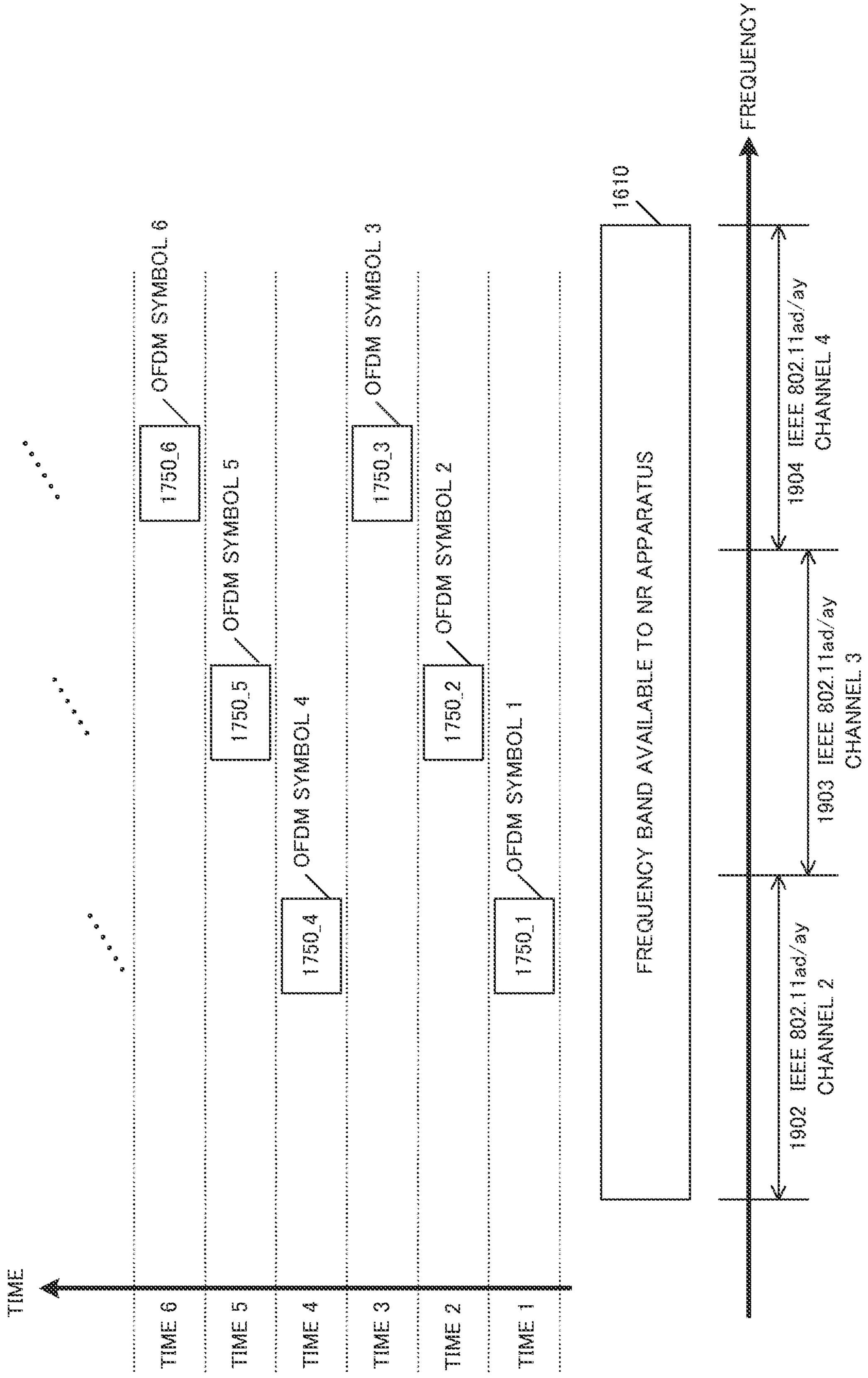
FIG. 20A illustrates an exemplary configuration of OFDM symbols for a modulation signal transmitted by gNB.

FIG. 20A illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 20A, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 20A, for example, "frequency band 1610 used by an NR apparatus" is present, and gNB 1100 in FIG. 18 transmits a modulation signal using "frequency band 1610 used by an NR apparatus", for example. Note that, in the example of FIG. 20A, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 20A, gNB 1100 transmits modulation signals to a communication counterpart such as NR-UE #1 labeled 1101_1 in FIG. 18, for example, in the following manner: at time 1, gNB 1100 transmits a modulation signal in OFDM symbol 1 (part of OFDM symbol 1) labeled 1750_1 included in "IEEE 802.11ad and/or IEEE 802.11ay channel 2" labeled 1902, at time 2, gNB 1100 transmits a modulation signal in OFDM symbol 2 (part of OFDM symbol 2) labeled 1750_2 included in "IEEE 802.11ad and/or IEEE 802.11ay channel 3" labeled 1903, at time 3, gNB 1100 transmits a modulation signal in OFDM symbol 3 (part of OFDM symbol 3) labeled 1750_3 included in "IEEE 802.11ad and/or IEEE 802.11ay channel 4" labeled 1904, at time 4, gNB 1100 transmits a modulation signal in OFDM symbol 4 (part of OFDM symbol 4) labeled 1750_4 included in "IEEE 802.11ad and/or IEEE 802.11ay channel 2" labeled 1902, at time 5, gNB 1100 transmits a modulation signal in OFDM symbol 5 (part of OFDM symbol 5) labeled 1750_5 included in "IEEE 802.11ad and/or IEEE 802.11ay channel 3" labeled 1903, at time 6, gNB 1100 transmits a modulation signal in OFDM symbol 6 (part of OFDM symbol 6) labeled 1750_6 included in "IEEE 802.11ad and/or IEEE 802.11ay channel 4" labeled 1904, and so forth.

The gNB transmits these modulation signals subjected to frequency hopping (FH) as in the example of FIG. 20A. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be the same or overlapped partially.

Likewise, for example, the frequency of "OFDM symbol 2 (part of OFDM symbol 2) labeled 1750_2" and the frequency of "OFDM symbol 5 (part of OFDM symbol 5) labeled 1750_5" may be the same or overlapped partially.

For example, the frequency of "OFDM symbol 3 (part of OFDM symbol 3) labeled 1750_3" and the frequency of "OFDM symbol 6 (part of OFDM symbol 6) labeled 1750_6" may be the same or overlapped partially.

Note that, although not illustrated in FIG. 20A, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 17504", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

Note that, in FIG. 20A, NR channels for the modulation signals transmitted by gNB 1100 are not illustrated.

Figure 20B:
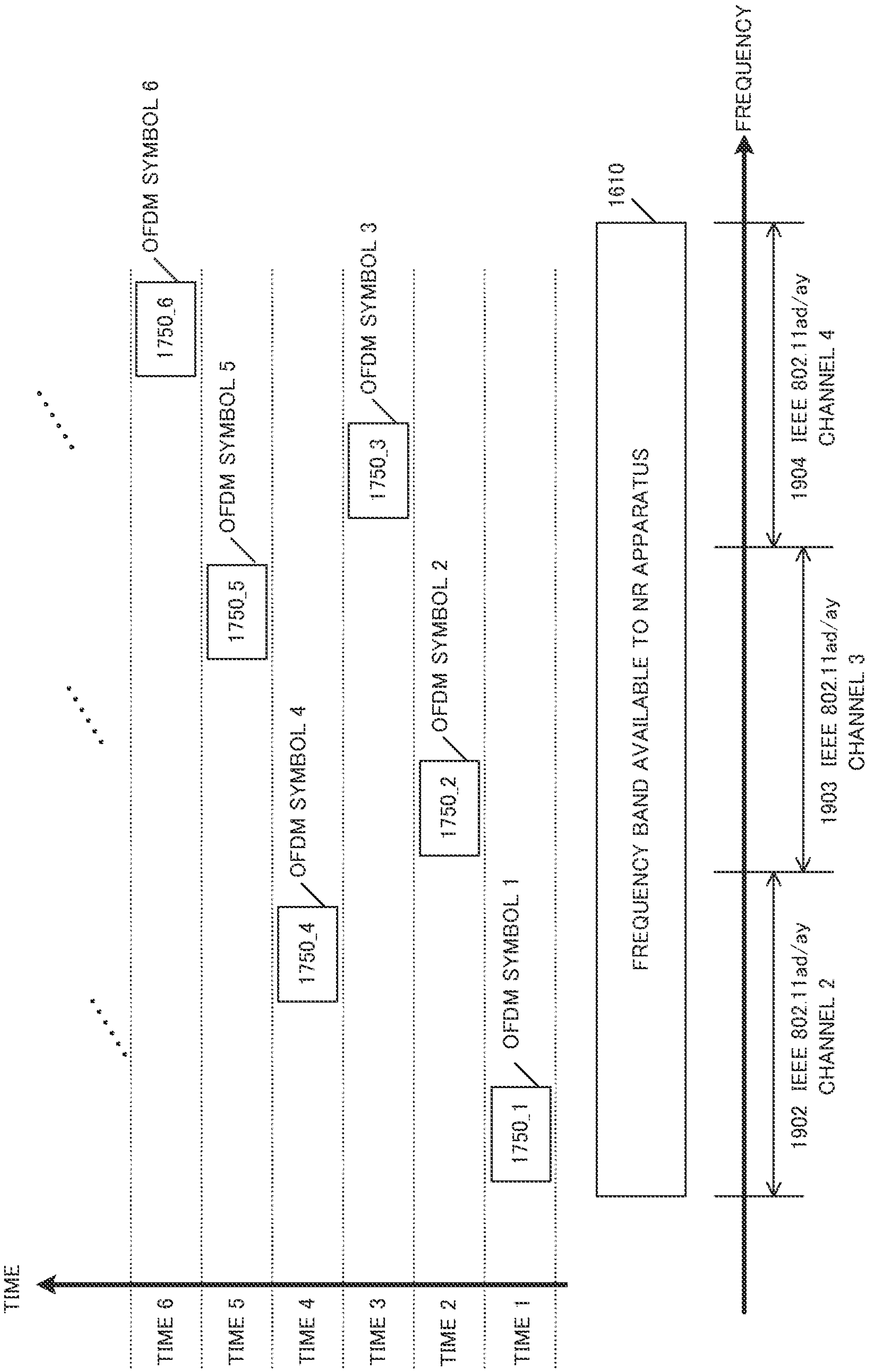
FIG. 20B illustrates an exemplary configuration of OFDM symbols for a modulation signal transmitted by gNB.

FIG. 20B illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 20B, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 20B, for example, "frequency band 1610 used by an NR apparatus" is present, and gNB 1100 in FIG. 18 transmits a modulation signal using "frequency band 1610 used by an NR apparatus", for example. Note that, in the example of FIG. 20B, "frequency band 1610 used by an NR apparatus" includes "all or part of 'IEEE 802.11ad and/or IEEE 802.11ay channel 2' labeled 1902", "all or part of 'IEEE 802.11 ad and/or IEEE 802.11 ay channel 3' labeled 1903", and "all or part of 'IEEE 802.11ad and/or IEEE 802.11ay channel 4' labeled 1904".

Then, as illustrated in FIG. 20B, gNB 1100 transmits modulation signals to a communication counterpart such as NR-UE #1 labeled 1101_1 in FIG. 18, for example, in the following manner: at time 1, gNB 1100 transmits a modulation signal in OFDM symbol 1 (part of OFDM symbol 1) labeled 1750_1 included in "IEEE 802.11ad and/or IEEE 802.11ay channel 2" labeled 1902, at time 2, gNB 1100 transmits a modulation signal in OFDM symbol 2 (part of OFDM symbol 2) labeled 1750_2 included in "IEEE 802.11ad and/or IEEE 802.11ay channel 3" labeled 1903, at time 3, gNB 1100 transmits a modulation signal in OFDM symbol 3 (part of OFDM symbol 3) labeled 1750_3 included in "IEEE 802.11ad and/or IEEE 802.11ay channel 4" labeled 1904, at time 4, gNB 1100 transmits a modulation signal in OFDM symbol 4 (part of OFDM symbol 4) labeled 1750_4 included in "IEEE 802.11ad and/or IEEE 802.11ay channel 2" labeled 1902, at time 5, gNB 1100 transmits a modulation signal in OFDM symbol 5 (part of OFDM symbol 5) labeled 1750_5 included in "IEEE 802.11ad and/or IEEE 802.11ay channel 3" labeled 1903, at time 6, gNB 1100 transmits a modulation signal in OFDM symbol 6 (part of OFDM symbol 6) labeled 1750_6 included in "IEEE 802.11ad and/or IEEE 802.11ay channel 4" labeled 1904, and so forth.

The gNB transmits these modulation signals subjected to frequency hopping (FH) as in the example of FIG. 20B. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be configured to be different from each other, i.e., configured not to be overlapped with each other.

Likewise, for example, the frequency of "OFDM symbol 2 (part of OFDM symbol 2) labeled 1750_2" and the frequency of "OFDM symbol 5 (part of OFDM symbol 5) labeled 1750_5" may be configured to be different from each other, i.e., configured not to be overlapped with each other.

For example, the frequency of "OFDM symbol 3 (part of OFDM symbol 3) labeled 1750_3" and the frequency of "OFDM symbol 6 (part of OFDM symbol 6) labeled 1750_6" may be configured to be different from each other, i.e., configured not to be overlapped with each other.

Note that, although not illustrated in FIG. 20B, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 17504", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

Note that, in FIG. 20B, NR channels for the modulation signals transmitted by gNB 1100 are not illustrated.

Figure 20C:
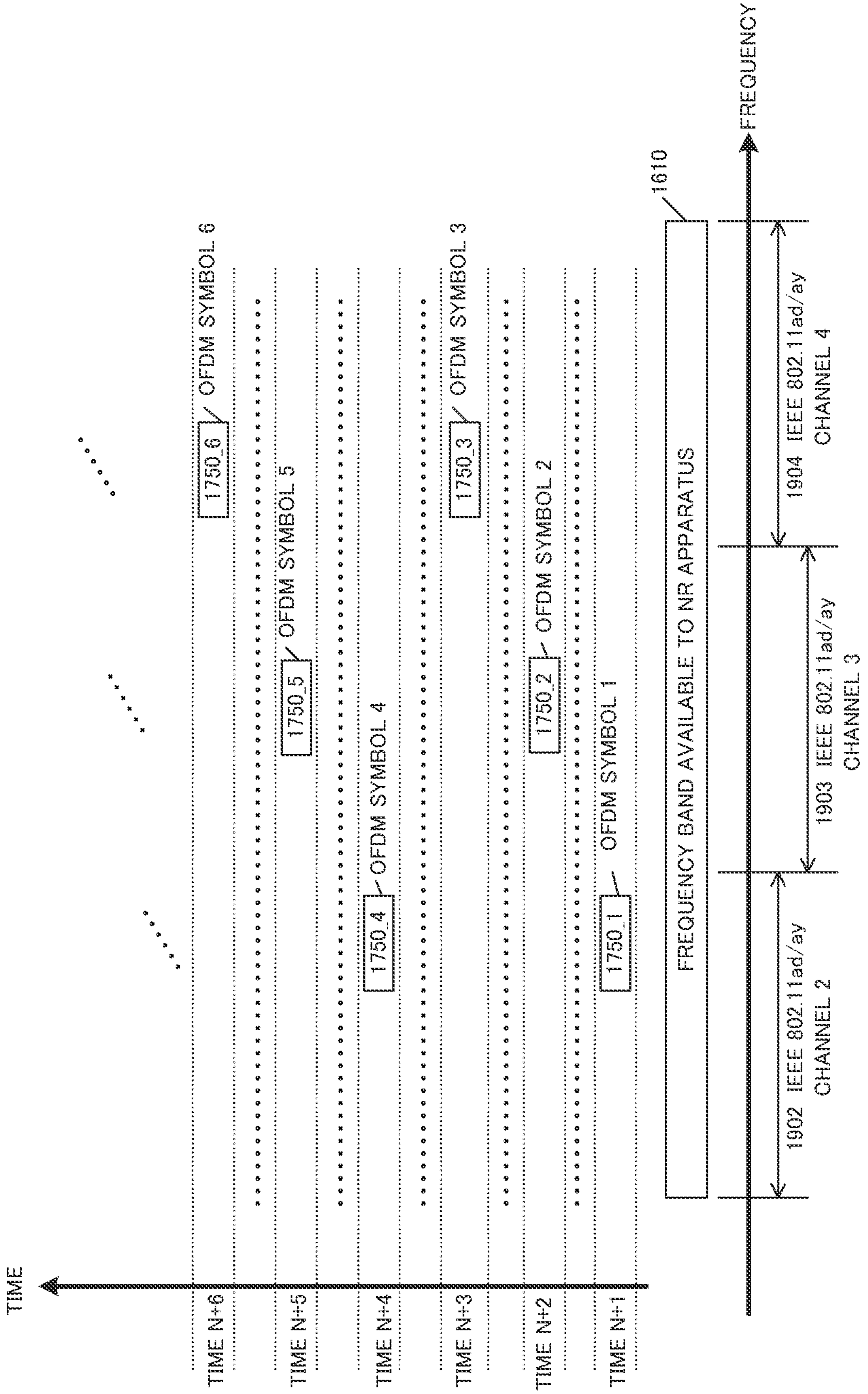
FIG. 20C illustrates an exemplary configuration of OFDM symbols for a modulation signal transmitted by gNB.

FIG. 20C illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 20C, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 20C, for example, "frequency band 1610 used by an NR apparatus" is present, and gNB 1100 in FIG. 18 transmits a modulation signal using "frequency band 1610 used by an NR apparatus", for example. Note that, in the example of FIG. 20C, "frequency band 1610 used by an NR apparatus" includes "all or part of 'IEEE 802.11ad and/or IEEE 802.11ay channel 2' labeled 1902", "all or part of 'IEEE 802.11 ad and/or IEEE 802.11 ay channel 3' labeled 1903", and "all or part of 'IEEE 802.11ad and/or IEEE 802.11ay channel 4' labeled 1904".

Then, as illustrated in FIG. 20C, gNB 1100 transmits modulation signals to a communication counterpart such as NR-UE #1 labeled 1101_1 in FIG. 18, for example, in the following manner: at time N+1, gNB 1100 transmits a modulation signal in OFDM symbol 1 (part of OFDM symbol 1) labeled 1750_1 included in "IEEE 802.11ad and/or IEEE 802.11ay channel 2" labeled 1902, at time N+2, gNB 1100 transmits a modulation signal in OFDM symbol 2 (part of OFDM symbol 2) labeled 1750_2 included in "IEEE 802.11ad and/or IEEE 802.11ay channel 3" labeled 1903, at time N+3, gNB 1100 transmits a modulation signal in OFDM symbol 3 (part of OFDM symbol 3) labeled 1750_3 included in "IEEE 802.11ad and/or IEEE 802.11ay channel 4" labeled 1904, at time N+4, gNB 1100 transmits a modulation signal in OFDM symbol 4 (part of OFDM symbol 4) labeled 1750_4 included in "IEEE 802.11ad and/or IEEE 802.11ay channel 2" labeled 1902, at time N+5, gNB 1100 transmits a modulation signal in OFDM symbol 5 (part of OFDM symbol 5) labeled 1750_5 included in "IEEE 802.11 ad and/or IEEE 802.11ay channel 3" labeled 1903, at time N+6, gNB 1100 transmits a modulation signal in OFDM symbol 6 (part of OFDM symbol 6) labeled 1750_6 included in "IEEE 802.11ad and/or IEEE 802.11ay channel 4" labeled 1904, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency hopping (FH) as in the example of FIG. 20C. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be the same or overlapped partially.

Likewise, for example, the frequency of "OFDM symbol 2 (part of OFDM symbol 2) labeled 1750_2" and the frequency of "OFDM symbol 5 (part of OFDM symbol 5) labeled 1750_5" may be the same or overlapped partially.

For example, the frequency of "OFDM symbol 3 (part of OFDM symbol 3) labeled 1750_3" and the frequency of "OFDM symbol 6 (part of OFDM symbol 6) labeled 1750_6" may be the same or overlapped partially.

Note that, although not illustrated in FIG. 20C, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

Note that, in FIG. 20C, NR channels for the modulation signals transmitted by gNB 1100 are not illustrated.

Figure 20D:
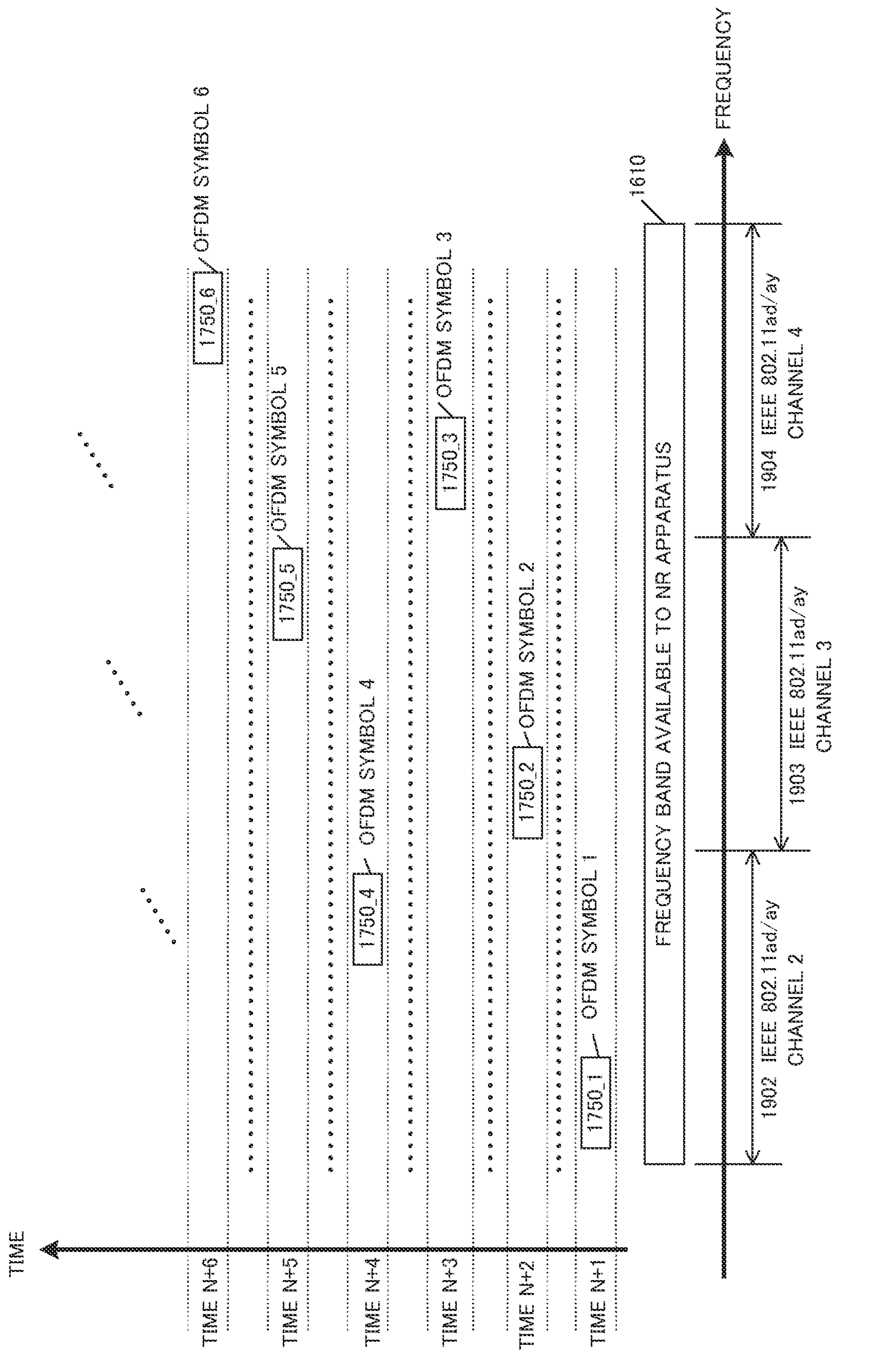
FIG. 20D illustrates an exemplary configuration of OFDM symbols for a modulation signal transmitted by gNB.

FIG. 20D illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 20D, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 20D, for example, "frequency band 1610 used by an NR apparatus" is present, and gNB 1100 in FIG. 18 transmits a modulation signal using "frequency band 1610 used by an NR apparatus", for example. Note that, in the example of FIG. 20D, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 20D, gNB 1100 transmits modulation signals to a communication counterpart such as NR-UE #1 labeled 1101_1 in FIG. 18, for example, in the following manner: at time N+1, gNB 1100 transmits a modulation signal in OFDM symbol 1 (part of OFDM symbol 1) labeled 1750_1 included in "IEEE 802.11ad and/or IEEE 802.11ay channel 2" labeled 1902, at time N+2, gNB 1100 transmits a modulation signal in OFDM symbol 2 (part of OFDM symbol 2) labeled 1750_2 included in "IEEE 802.11ad and/or IEEE 802.11ay channel 3" labeled 1903, at time N+3, gNB 1100 transmits a modulation signal in OFDM symbol 3 (part of OFDM symbol 3) labeled 1750_3 included in "IEEE 802.11ad and/or IEEE 802.11ay channel 4" labeled 1904, at time N+4, gNB 1100 transmits a modulation signal in OFDM symbol 4 (part of OFDM symbol 4) labeled 1750_4 included in "IEEE 802.11ad and/or IEEE 802.11ay channel 2" labeled 1902, at time N+5, gNB 1100 transmits a modulation signal in OFDM symbol 5 (part of OFDM symbol 5) labeled 1750_5 included in "IEEE 802.11ad and/or IEEE 802.11ay channel 3" labeled 1903, at time N+6, gNB 1100 transmits a modulation signal in OFDM symbol 6 (part of OFDM symbol 6) labeled 1750_6 included in "IEEE 802.11ad and/or IEEE 802.11ay channel 4" labeled 1904, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency hopping (FH) as in the example of FIG. 20D. Note that, for example, data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1" and the frequency of "OFDM symbol 4 (part of OFDM symbol 4) labeled 1750_4" may be configured to be different from each other, i.e., configured not to be overlapped with each other.

Likewise, for example, the frequency of "OFDM symbol 2 (part of OFDM symbol 2) labeled 1750_2" and the frequency of "OFDM symbol 5 (part of OFDM symbol 5) labeled 1750_5" may be configured to be different from each other, i.e., configured not to be overlapped with each other.

For example, the frequency of "OFDM symbol 3 (part of OFDM symbol 3) labeled 1750_3" and the frequency of "OFDM symbol 6 (part of OFDM symbol 6) labeled 1750_6" may be configured to be different from each other, i.e., configured not to be overlapped with each other.

Note that, although not illustrated in FIG. 20D, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 17504", "OFDM symbol 5 (part of OFDM symbol 5) labeled 1750_5", "OFDM symbol 6 (part of OFDM symbol 6) labeled 1750_6", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)".

Note that, in FIG. 20D, NR channels for the modulation signals transmitted by gNB 1100 are not illustrated.

In the following, a description will be given of exemplary arrangement of OFDM symbols (parts of OFDM symbols) on the frequency and time axes other than those in "FIGS. 20A, 20B, 20C, and 20D".

Figure 20E:
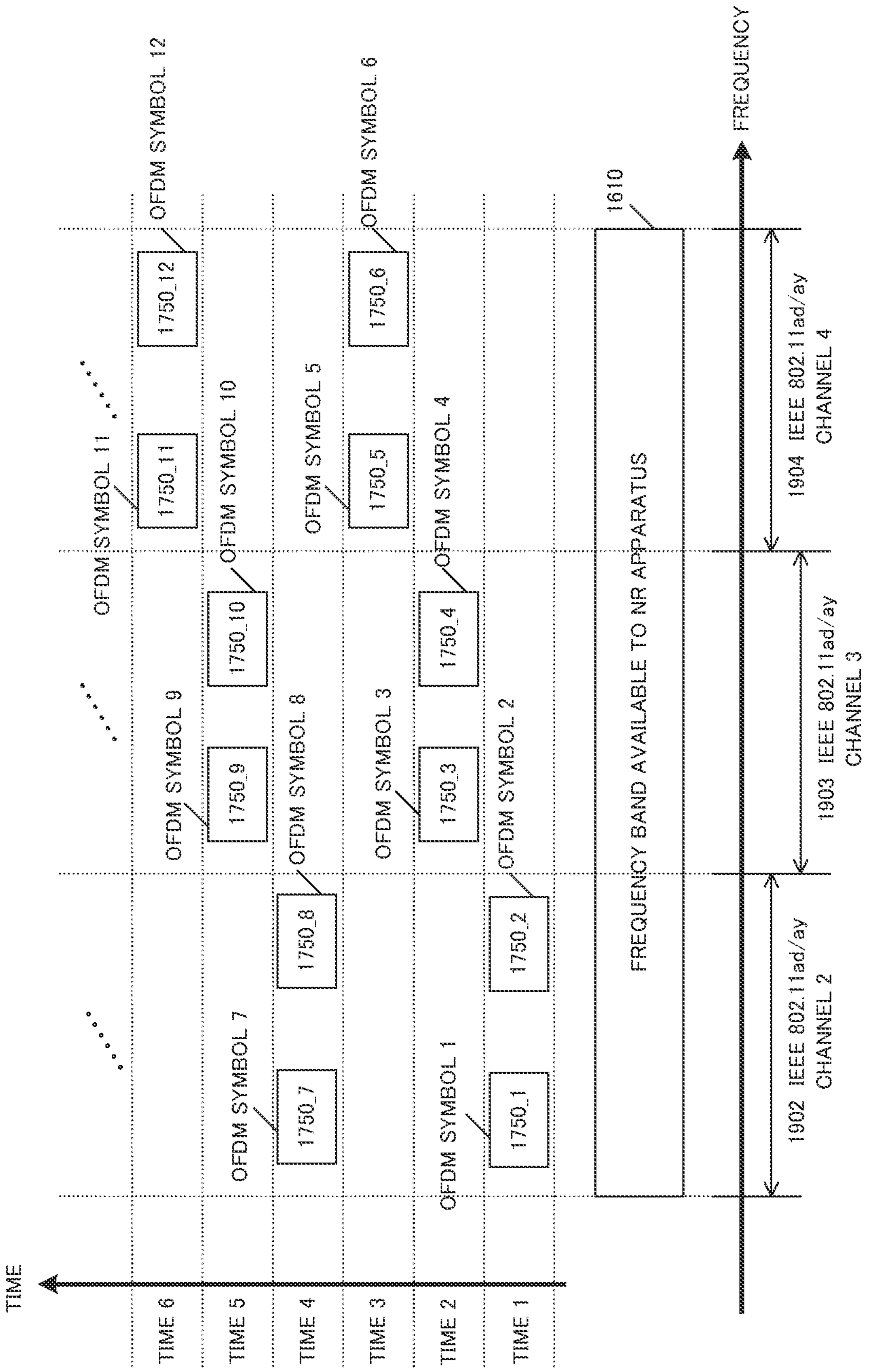
FIG. 20E illustrates an exemplary configuration of OFDM symbols for a modulation signal transmitted by gNB.

FIG. 20E illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that, in FIG. 20E, components that operate in the same manner as in FIGS. 16A, 17A, and 19A are denoted by the same reference signs, and the description thereof will be partially omitted.

As illustrated in FIG. 20E, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 20E, for example. "frequency band 1610 used by an NR apparatus" is present, and gNB 1100 in FIG. 18 transmits a modulation signal using "frequency band 1610 used by an NR apparatus", for example. Note that, in the example of FIG. 20E, "frequency band 1610 used by an NR apparatus" includes "all or part of 'IEEE 802.11ad and/or IEEE 802.11ay channel 2' labeled 1902", "all or part of 'IEEE 802.11 ad and/or IEEE 802.11 ay channel 3' labeled 1903", and "all or part of 'IEEE 802.11ad and/or IEEE 802.11ay channel 4' labeled 1904".

Then, as illustrated in FIG. 20E, gNB 1100 transmits modulation signals to a communication counterpart such as NR-UE #1 labeled 1101_1 in FIG. 18, for example, in the following manner: at time 1, gNB 1100 transmits modulation signals in "OFDM symbol (part of OFDM symbol) I labeled 1750_1 and OFDM symbol (part of OFDM symbol) 2 labeled 1750_2" included in "IEEE 802.11 ad and/or IEEE 802.11ay channel 2" labeled 1902, at time 2, gNB 1100 transmits modulation signals in "OFDM symbol (part of OFDM symbol) 3 labeled 1750_3 and OFDM symbol (part of OFDM symbol) 4 labeled 1750_4" included in "IEEE 802.11ad and/or IEEE 802.11ay channel 3" labeled 1903, at time 3, gNB 1100 transmits modulation signals in "OFDM symbol (part of OFDM symbol) 5 labeled 1750_5 and OFDM symbol (part of OFDM symbol) 6 labeled 1750_6" included in "IEEE 802.11ad and/or IEEE 802.11ay channel 4" labeled 1904, at time 4, gNB 1100 transmits modulation signals in "OFDM symbol (part of OFDM symbol) 7 labeled 1750_7 and OFDM symbol (part of OFDM symbol) 8 labeled 1750_8" included in "IEEE 802.11ad and/or IEEE 802.11ay channel 2" labeled 1902, at time 5, gNB 1100 transmits modulation signals in "OFDM symbol (part of OFDM symbol) 9 labeled 1750_9 and OFDM symbol (part of OFDM symbol) 10 labeled 1750_10" included in "IEEE 802.11ad and/or IEEE 802.11ay channel 3" labeled 1903, at time 6, gNB 1100 transmits modulation signals in "OFDM symbol (part of OFDM symbol) 11 labeled 1750_11 and OFDM symbol (part of OFDM symbol) 12 labeled 1750_12" included in "IEEE 802.11ad and/or IEEE 802.11ay channel 4" labeled 1904, and so forth.

The gNB transmits these modulation signals subjected to FH as in the example of FIG. 20E. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 11 labeled 1750_11" "OFDM symbol (part of OFDM symbol) 12 labeled 1750_12", and so forth.

In the example of FIG. 20E, "OFDM symbol (part of OFDM symbol) 1 labeled 1750_1 and OFDM symbol (part of OFDM symbol) 2 labeled 1750_2" are present at time 1, and "OFDM symbol (part of OFDM symbol) 1 labeled 1750_1 and OFDM symbol (part of OFDM symbol) 2 labeled 1750_2" are present in "IEEE 802.11ad and/or IEEE 802.11ay channel 2" labeled 1902.

In addition, "OFDM symbol (part of OFDM symbol) 3 labeled 1750_3 and OFDM symbol (part of OFDM symbol) 4 labeled 1750_4" are present at time 2, and "OFDM symbol (part of OFDM symbol) 3 labeled 1750_3 and OFDM symbol (part of OFDM symbol) 4 labeled 1750_4" are present in "IEEE 802.11ad and/or IEEE 802.11ay channel 3" labeled 1903.

The symbols, "OFDM symbol (part of OFDM symbol) 5 labeled 1750_5 and OFDM symbol (part of OFDM symbol) 6 labeled 1750_6," are present at time 3, and "OFDM symbol (part of OFDM symbol) 5 labeled 1750_5 and OFDM symbol (part of OFDM symbol) 6 labeled 1750_6" are present in "IEEE 802.11ad and/or IEEE 802.11ay channel 4" labeled 1904.

The symbols. "OFDM symbol (part of OFDM symbol) 7 labeled 1750_7 and OFDM symbol (part of OFDM symbol) 8 labeled 1750_8," are present at time 4, and "OFDM symbol (part of OFDM symbol) 7 labeled 1750_7 and OFDM symbol (part of OFDM symbol) 8 labeled 1750_8" are present in "IEEE 802.11ad and/or IEEE 802.11ay channel 2" labeled 1902.

The symbols, "OFDM symbol (part of OFDM symbol) 9 labeled 1750_9 and OFDM symbol (part of OFDM symbol) 10 labeled 1750_10," are present at time 5, and "OFDM symbol (part of OFDM symbol) 9 labeled 1750_9 and OFDM symbol (part of OFDM symbol) 10 labeled 1750_10" are present in "IEEE 802.11ad and/or IEEE 802.11ay channel 3" labeled 1903.

The symbols, "OFDM symbol (part of OFDM symbol) 11 labeled 1750_11 and OFDM symbol (part of OFDM symbol) 12 labeled 1750_12," are present at time 6, and "OFDM symbol (part of OFDM symbol) 11 labeled 1750_11 and OFDM symbol (part of OFDM symbol) 12 labeled 1750_12" are present in "IEEE 802.11ad and/or IEEE 802.11ay channel 4" labeled 1904.

Features in FIG. 20E in this case are as follows.

A plurality of OFDM symbols (parts of OFDM symbols) belonging to the first "IEEE 802.11 ad and/or IEEE 802.11ay channel" are present at the first time.

For example, "OFDM symbol (part of OFDM symbol) 1 labeled 1750_1 and OFDM symbol (part of OFDM symbol) 2 labeled 1750_2" (a plurality of OFDM symbols (parts of OFDM symbols)) belonging to "IEEE 802.11ad and/or IEEE 802.11ay channel 2" (the first "IEEE 802.11ad and/or IEEE 802.11ay channel") are present at time 1 (the first time).

Note that the above feature is found at time 2, time 3, and so forth.

FH is configured such that a plurality of OFDM symbols (parts of OFDM symbols) that are present at the first time are present in the first "IEEE 802.11ad and/or IEEE 802.11ay channel" and the "IEEE 802.11ad and/or IEEE 802.11ay channel" to which the plurality of OFDM symbols (parts of OFDM symbols) belong is switched as time passes.

For example, "OFDM symbol (part of OFDM symbol) I labeled 1750_1 and OFDM symbol (part of OFDM symbol) 2 labeled 1750_2" (a plurality of OFDM symbols (parts of OFDM symbols)) belonging to "IEEE 802.11ad and/or IEEE 802.11ay channel 2" labeled 1902 are present at time 1, and "OFDM symbol (part of OFDM symbol) 3 labeled 1750_3 and OFDM symbol (part of OFDM symbol) 4 labeled 1750_4" (a plurality of OFDM symbols (parts of OFDM symbols)) belonging to "IEEE 802.11ad and/or IEEE 802.11ay channel 3" labeled 1903 are present at time 2.

Note that, although not illustrated in FIG. 20E the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1650_9', 'OFDM symbol (part of OFDM symbol) 10 labeled 1750_10', 'OFDM symbol (part of OFDM symbol) 11 labeled 1750_11', 'OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)". In FIG. 20E, NR channels for the modulation signals transmitted by gNB 1100 are not illustrated.

The above-described manner leads to the similar effects to those described in the examples of FIGS. 20A, 20B, 20C, and 20D.

Note that the arrangement method for OFDM symbols (parts of OFDM symbols) in the frequency and time domains is not limited to the example of FIG. 20E.

Also in FIG. 20E, the plurality of OFDM symbols (parts of OFDM symbols) are arranged on the time axis in the order of "IEEE 802.11 ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and so forth, but the present disclosure is not limited to this arrangement of the plurality of OFDM symbols (parts of OFDM symbols). For example, the order of "IEEE 802.11ad and/or IEEE 802.11ay channels" to which the plurality of OFDM symbols (parts of OFDM symbols) belong is not limited to this example.

For example, as long as FH is performed such that a plurality of OFDM symbols (parts of OFDM symbols) are placed in any of "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 on the time axis, and the "IEEE 802.11ad and/or IEEE 802.11ay channel" to which the plurality of OFDM symbols (parts of OFDM symbols) belong is switched as time passes, the same as the above description can be implemented and the same effects can be obtained as well.

Further, in the case of FIG. 20E, the number of "IEEE 802.11ad and/or IEEE 802.11ay channels" to which the plurality of OFDM symbols (parts of OFDM symbols) present at certain time belong is three, which are "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904, but the present disclosure is not limited to this, and the same as the above description can be implemented and the same effects can be obtained as long as the number of "IEEE 802.11ad and/or IEEE 802.11ay channels" to which the plurality of OFDM symbols (parts of OFDM symbols) belong in FH is two or more.

Thus, a method of using time and frequency in FH in transmitting a modulation signal by gNB is not limited to the example of FIG. 20E, and the number of "IEEE 802.11ad and/or IEEE 802.11ay channels" to which a plurality of OFDM symbols (parts of OFDM symbols) present at certain time belong in FH only needs to be one or more.

Figure 20F:
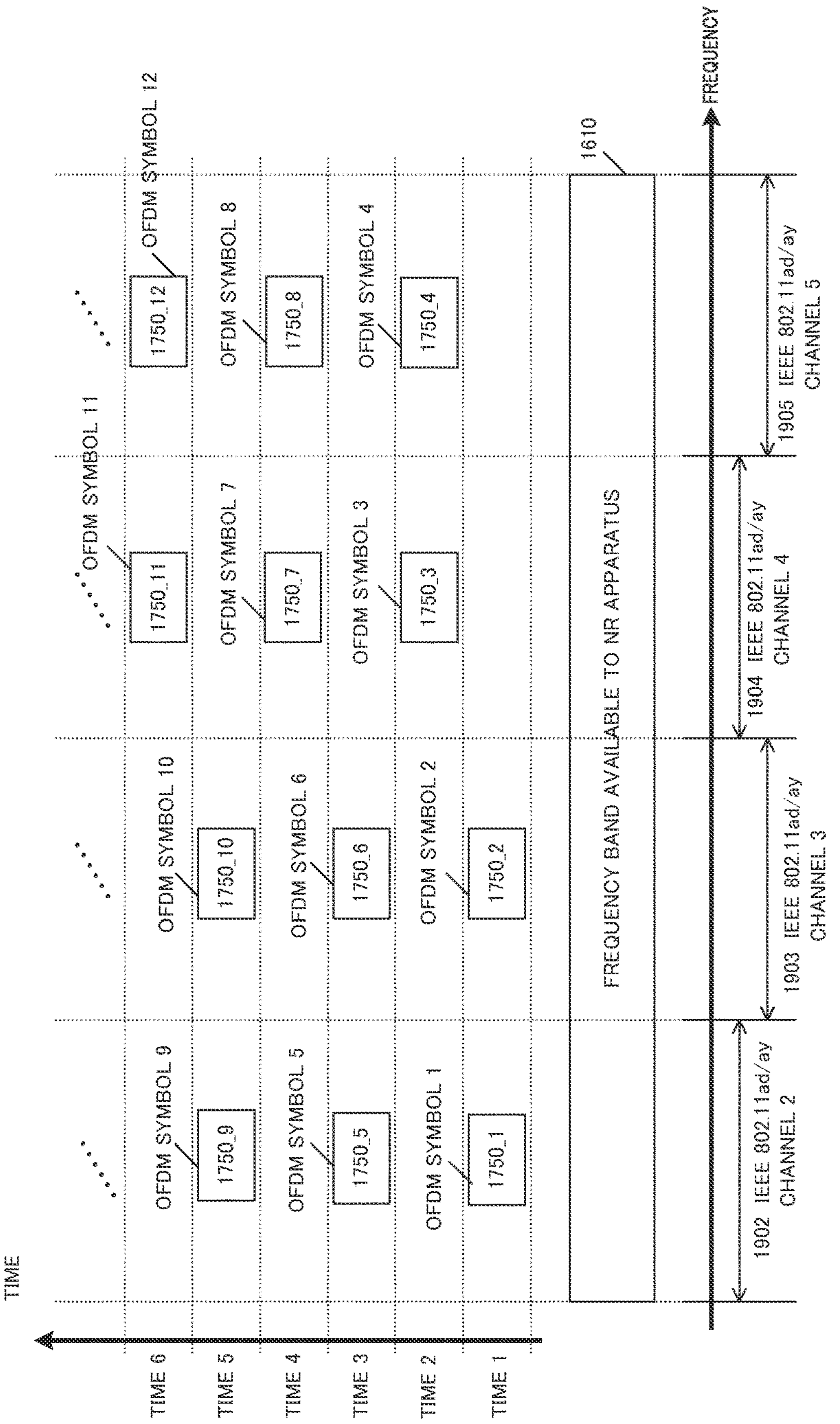
FIG. 20F illustrates an exemplary configuration of OFDM symbols for a modulation signal transmitted by gNB.

FIG. 20F illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that, in FIG. 20F, components that operate in the same manner as in FIGS. 16A, 17A, and 19A are denoted by the same reference signs, and the description thereof will be partially omitted.

As illustrated in FIG. 20F, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 20F, for example, "frequency band 1610 used by an NR apparatus" is present, and gNB 1100 in FIG. 18 transmits a modulation signal using "frequency band 1610 used by an NR apparatus", for example. Note that, in the example of FIG. 20F, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", "all or part of 'IEEE 802.11ad and/or IEEE 802.11ay channel 4' labeled 1904", and "all or part of 'IEEE 802.11ad and/or IEEE 802.11ay channel 5" labeled 1905".

Then, as illustrated in FIG. 20F, gNB 1100 transmits modulation signals to a communication counterpart such as NR-UE #1 labeled 1101_1 in FIG. 18, for example, in the following manner: at time 1, gNB 1100 transmits modulation signals in "OFDM symbol (part of OFDM symbol) 1 labeled 1750_1 included in "IEEE 802.11ad and/or IEEE 802.11ay channel 2" labeled 1902 and OFDM symbol (part of OFDM symbol) 2 labeled 1750_2" included in "IEEE 802.11ad and/or IEEE 802.11ay channel 3" labeled 1903, at time 2, gNB 1100 transmits modulation signals in "OFDM symbol (part of OFDM symbol) 3 labeled 1750_3 included in "IEEE 802.11ad and/or IEEE 802.11ay channel 4" labeled 1904 and OFDM symbol (part of OFDM symbol) 4 labeled 1750_4" included in "IEEE 802.11ad and/or IEEE 802.11ay channel 5" labeled 1905, at time 3, gNB 1100 transmits modulation signals in "OFDM symbol (part of OFDM symbol) 5 labeled 1750_5 included in "IEEE 802.11ad and/or IEEE 802.11ay channel 2" labeled 1902 and OFDM symbol (part of OFDM symbol) 6 labeled 1750_6" included in "IEEE 802.11ad and/or IEEE 802.11ay channel 3" labeled 1903, at time 4, gNB 1100 transmits modulation signals in "OFDM symbol (part of OFDM symbol) 7 labeled 1750_7 included in "IEEE 802.11ad and/or IEEE 802.11ay channel 4" labeled 1904 and OFDM symbol (part of OFDM symbol) 8 labeled 1750_8" included in "IEEE 802.11ad and/or IEEE 802.11ay channel 5" labeled 1905, at time 5, gNB 1100 transmits modulation signals in "OFDM symbol (part of OFDM symbol) 9 labeled 1750_9 included in "IEEE 802.11ad and/or IEEE 802.11ay channel 2" labeled 1902 and OFDM symbol (part of OFDM symbol) 10 labeled 1750_10" included in "IEEE 802.11ad and/or IEEE 802.11ay channel 3" labeled 1903, at time 6, gNB 1100 transmits modulation signals in "OFDM symbol (part of OFDM symbol) 11 labeled 1750_11 included in "IEEE 802.11ad and/or IEEE 802.11ay channel 4" labeled 1904 and OFDM symbol (part of OFDM symbol) 12 labeled 1750_12" included in "IEEE 802.11ad and/or IEEE 802.11ay channel 5" labeled 1905, and so forth.

The gNB transmits these modulation signals subjected to FH as in the example of FIG. 20F. Note that data to be transmitted to NR-UE #1 being the communication counterpart labeled 1101_1 is included in the OFDM symbols (parts of OFDM symbols) such as "OFDM symbol (part of OFDM symbol) I labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 17504", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth.

In the example of FIG. 20F, "OFDM symbol (part of OFDM symbol) 1 labeled 1750_1 and OFDM symbol (part of OFDM symbol) 2 labeled 1750_2" are present at time 1, OFDM symbol (part of OFDM symbol) 1 labeled 1750_1 is present in "IEEE 802.11ad and/or IEEE 802.11ay channel 2" labeled 1902 and OFDM symbol (part of OFDM symbol) 2 labeled 1750_2 is present in "IEEE 802.11ad and/or IEEE 802.11ay channel 3" labeled 1903.

In addition, "OFDM symbol (part of OFDM symbol) 3 labeled 1750_3 and OFDM symbol (part of OFDM symbol) 4 labeled 1750_4" are present at time 2, OFDM symbol (part of OFDM symbol) 3 labeled 1750_3 is present in "IEEE 802.11ad and/or IEEE 802.11ay channel 4" labeled 1904, and OFDM symbol (part of OFDM symbol) 4 labeled 1750_4 is present in "IEEE 802.11ad and/or IEEE 802.11ay channel 5" labeled 1905.

The symbols, "OFDM symbol (part of OFDM symbol) 5 labeled 1750_5 and OFDM symbol (part of OFDM symbol) 6 labeled 1750_6," are present at time 3. OFDM symbol (part of OFDM symbol) 5 labeled 1750_5 is present in "IEEE 802.11ad and/or IEEE 802.11ay channel 2 labeled 1902, and OFDM symbol (part of OFDM symbol) 6 labeled 1750_6 is present in "IEEE 802.11 ad and/or IEEE 802.11ay channel 3" labeled 1903.

The symbols, "OFDM symbol (part of OFDM symbol) 7 labeled 1750_7 and OFDM symbol (part of OFDM symbol) 8 labeled 1750_8," are present at time 4, OFDM symbol (part of OFDM symbol) 7 labeled 1750_7 is present in "IEEE 802.11ad and/or IEEE 802.11ay channel 4" labeled 1904, and OFDM symbol (part of OFDM symbol) 8 labeled 1750_8 is present in "IEEE 802.11ad and/or IEEE 802.11ay channel 5" labeled 1905.

The symbols, "OFDM symbol (part of OFDM symbol) 9 labeled 1750_9 and OFDM symbol (part of OFDM symbol) 10 labeled 1750_10," are present at time 5. OFDM symbol (part of OFDM symbol) 9 labeled 1750_9 is present in "IEEE 802.11ad and/or IEEE 802.11ay channel 2" labeled 1902, and OFDM symbol (part of OFDM symbol) 10 labeled 1750_10 is present in "IEEE 802.11ad and/or IEEE 802.11ay channel 3" labeled 1903.

The symbols, "OFDM symbol (part of OFDM symbol) 11 labeled 1750_11 and OFDM symbol (part of OFDM symbol) 12 labeled 1750_12." are present at time 6, OFDM symbol (part of OFDM symbol) 11 labeled 1750_11 is present in "IEEE 802.11ad and/or IEEE 802.11ay channel 4" labeled 1904, and OFDM symbol (part of OFDM symbol) 12 labeled 1750_12 is present in "IEEE 802.11ad and/or IEEE 802.11ay channel 5" labeled 1905.

Features in FIG. 20F in this case are as follows.

A plurality of OFDM symbols (parts of OFDM symbols) are present at the first time, at least one of the plurality of OFDM symbols (parts of OFDM symbols) belongs to the first "IEEE 802.11 ad and/or IEEE 802.11 ay channel", and at least one of the plurality of OFDM symbols (parts of OFDM symbols) belongs to the second "IEEE 802.11ad and/or IEEE 802.11ay channel".

For example, at least OFDM symbol (part of OFDM symbol) 1 labeled 1750_1 belonging to "IEEE 802.11ad and/or IEEE 802.11ay channel 2" labeled 1902 (the first "IEEE 802.11ad and/or IEEE 802.11ay channel") and OFDM symbol (part of OFDM symbol) 2 labeled 1750_2 belonging to "IEEE 802.11ad and/or IEEE 802.11 ay channel 3" labeled 1903 (the second "IEEE 802.11ad and/or IEEE 802.11ay channel") are present at time 1 (the first time).

Note that the above feature is found at time 2, time 3, and so forth.

FH is configured such that the "IEEE 802.11ad and/or IEEE 802.11ay channels" to which the plurality of OFDM symbols (parts of OFDM symbols) belong are switched as time passes.

For example, OFDM symbol (part of OFDM symbol) 10 labeled 1750_1 belonging to "IEEE 802.11ad and/or IEEE 802.11ay channel 2" labeled 1902 and OFDM symbol (part of OFDM symbol) 2 labeled 1750_2 belonging to "IEEE 802.11ad and/or IEEE 802.11ay channel 3" labeled 1903 are present at time 1, and OFDM symbol (part of OFDM symbol) 3 labeled 1750_3 belonging to "IEEE 802.11ad and/or IEEE 802.11ay channel 4" labeled 1904 and OFDM symbol (part of OFDM symbol) 4 labeled 1750_4 belonging to "IEEE 802.11ad and/or IEEE 802.11ay channel 5" labeled 1905 are present at time 2.

Note that, although not illustrated in FIG. 20F the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1650_9', 'OFDM symbol (part of OFDM symbol) 10 labeled 1750_10', 'OFDM symbol (part of OFDM symbol) 11 labeled 1750_11', 'OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)". In FIG. 20F, NR channels for the modulation signals transmitted by gNB 1100 are not illustrated.

The above-described manner leads to the similar effects to those described in the examples of FIGS. 20A, 20B, 20C, and 20D.

Note that the arrangement method for OFDM symbols (parts of OFDM symbols) in the frequency and time domains is not limited to the example of FIG. 20F.

Also in FIG. 20F, the plurality of OFDM symbols (parts of OFDM symbols) are arranged on the time axis in the order of "'IEEE 802.11ad and/or IEEE 802.11ay channel 2' labeled 1902 and 'IEEE 802.11ad and/or IEEE 802.11ay channel 3' labeled 1903", and "'IEEE 802.11ad and/or IEEE 802.11ay channel 4' labeled 1904 and 'IEEE 802.11ad and/or IEEE 802.11ay channel 5' labeled 1905", "'IEEE 802.11ad and/or IEEE 802.11ay channel 2' labeled 1902 and 'IEEE 802.11ad and/or IEEE 802.11ay channel 3' labeled 1903", "'IEEE 802.11ad and/or IEEE 802.11ay channel 4' labeled 1904 and 'IEEE 802.11ad and/or IEEE 802.11ay channel 5' labeled 1905", and so forth, but the present disclosure is not limited to this arrangement of OFDM symbols (parts of OFDM symbols). For example, the order of "IEEE 802.11ad and/or IEEE 802.11ay channels" to which the plurality of OFDM symbols (parts of OFDM symbols) belong is not limited to this example.

For example, as long as FH is performed such that a plurality of OFDM symbols (parts of OFDM symbols) are placed in a plurality of "IEEE 802.11ad and/or IEEE 802.11ay channels" on the time axis, and the plurality of "IEEE 802.11ad and/or IEEE 802.11ay channels" to which the plurality of OFDM symbols (parts of OFDM symbols) belong are switched as time passes, the same as the above description can be implemented and the same effects can be obtained as well.

Further, in the case of FIG. 20F, the number of NR channels to which the plurality of OFDM symbols (parts of OFDM symbols) present at certain time belong is four, which are "IEEE 802.11 ad and/or IEEE 802.11ay channel 2" labeled 1902, "IEEE 802.11 ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905, but the present disclosure is not limited to this, and the same as the above description can be implemented and the same effects can be obtained as long as the number of "IEEE 802.11ad and/or IEEE 802.11ay channels" to which the plurality of OFDM symbols (parts of OFDM symbols) belong in FH is two or more.

Thus, a method of using time and frequency in FH in transmitting a modulation signal by gNB is not limited to the example of FIG. 20F, and the number of "IEEE 802.11ad and/or IEEE 802.11ay channels" to which a plurality of OFDM symbols (parts of OFDM symbols) present at certain time belong in FH only needs to be two or more.

Figure 20G:
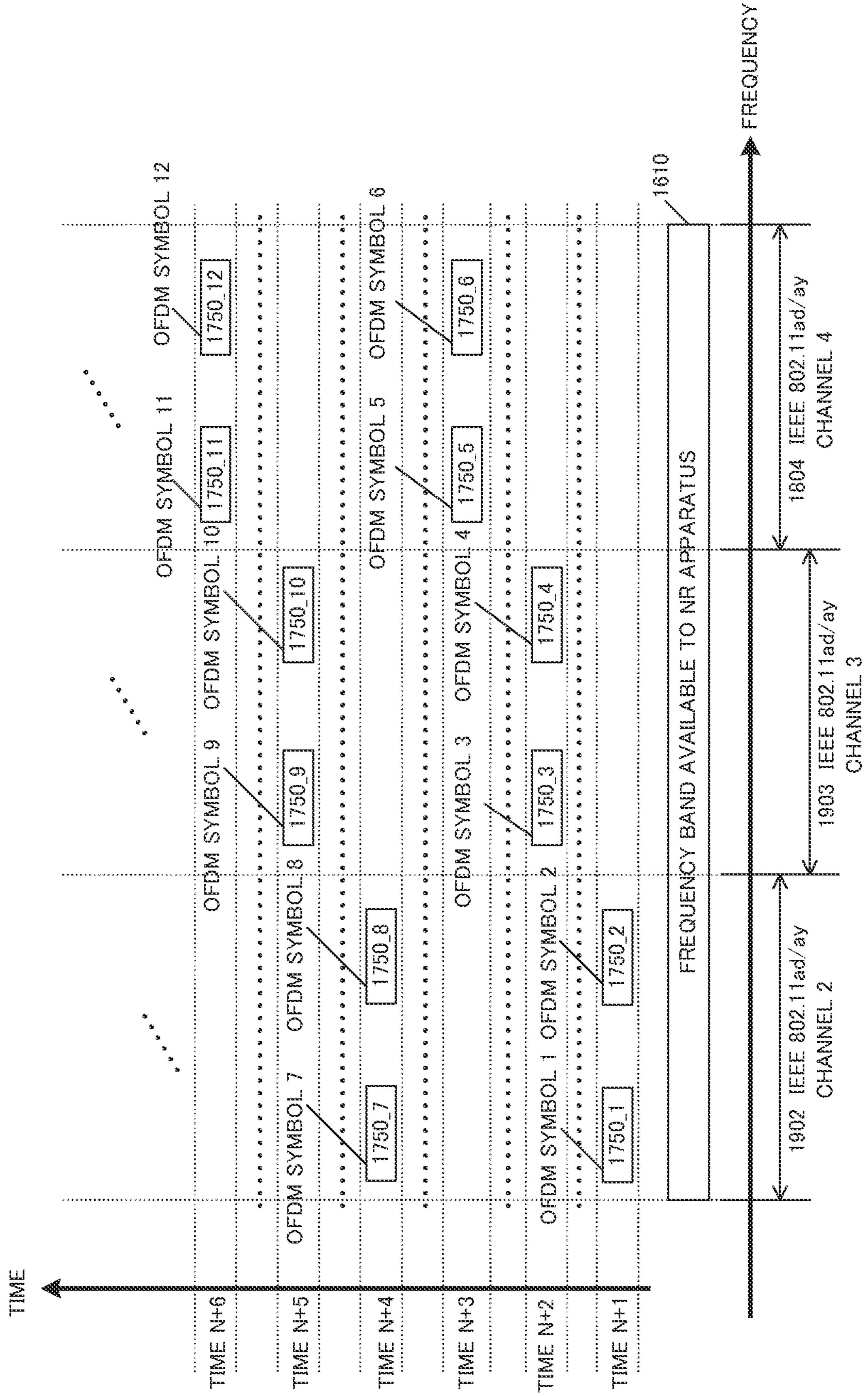
FIG. 20G illustrates an exemplary configuration of OFDM symbols for a modulation signal transmitted by gNB.

FIG. 20G illustrates, for example, an exemplary configuration of slots for a modulation signal transmitted by gNB 1100 in FIG. 18, and the horizontal axis represents frequency while the vertical axis represents time. Note that, in FIG. 20G, components that operate in the same manner as in FIGS. 16A, 17A, and 19A are denoted by the same reference signs, and the description thereof will be partially omitted.

As illustrated in FIG. 20G, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 20G, for example, "frequency band 1610 used by an NR apparatus" is present, and gNB 1100 in FIG. 18 transmits a modulation signal using "frequency band 1610 used by an NR apparatus", for example. Note that, in the example of FIG. 20G, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 20G, gNB 1100 transmits modulation signals to a communication counterpart such as NR-UE #1 labeled 1101_1 in FIG. 18, for example, in the following manner: at time N+1, gNB 1100 transmits modulation signals in "OFDM symbol (part of OFDM symbol) 1 labeled 1750_1 and OFDM symbol (part of OFDM symbol) 2 labeled 1750_2" included in "IEEE 802.11ad and/or IEEE 802.11ay channel 2" labeled 1902, at time N+2, gNB 1100 transmits modulation signals in "OFDM symbol (part of OFDM symbol) 3 labeled 1750_3 and OFDM symbol (part of OFDM symbol) 4 labeled 1750_4" included in "IEEE 802.11ad and/or IEEE 802.11ay channel 3" labeled 1903, at time N+3, gNB 100 transmits modulation signals in "OFDM symbol (part of OFDM symbol) 5 labeled 1750_5 and OFDM symbol (part of OFDM symbol) 6 labeled 1750_6" included in "IEEE 802.11ad and/or IEEE 802.11ay channel 4" labeled 1904, at time N+4, gNB 1100 transmits modulation signals in "OFDM symbol (part of OFDM symbol) 7 labeled 1750_7 and OFDM symbol (part of OFDM symbol) 8 labeled 1750_8" included in "IEEE 802.11ad and/or IEEE 802.11ay channel 2" labeled 1902, at time N+5, gNB 1100 transmits modulation signals in "OFDM symbol (part of OFDM symbol) 9 labeled 1750_9 and OFDM symbol (part of OFDM symbol) 10 labeled 1750_10" included in "IEEE 802.11ad and/or IEEE 802.11ay channel 3" labeled 1903, at time N+6, gNB 1100 transmits modulation signals in "OFDM symbol (part of OFDM symbol) 11 labeled 1750_11 and OFDM symbol (part of OFDM symbol) 12 labeled 1750_12" included in "IEEE 802.11ad and/or IEEE 802.11ay channel 4" labeled 1904, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 20G. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth.

In the example of FIG. 20G, "OFDM symbol (part of OFDM symbol) 1 labeled 1750_1 and OFDM symbol (part of OFDM symbol) 2 labeled 1750_2" are present at time N+1, and "OFDM symbol (part of OFDM symbol) I labeled 1750_1 and OFDM symbol (part of OFDM symbol) 2 labeled 1750_2" are present in "IEEE 802.11ad and/or IEEE 802.11ay channel 2" labeled 1902.

In addition, "OFDM symbol (part of OFDM symbol) 3 labeled 1750_3 and OFDM symbol (part of OFDM symbol) 4 labeled 1750_4" are present at time N+2, and "OFDM symbol (part of OFDM symbol) 3 labeled 1750_3 and OFDM symbol (part of OFDM symbol) 4 labeled 1750_4" are present in "IEEE 802.11ad and/or IEEE 802.11ay channel 3" labeled 1903.

The symbols, "OFDM symbol (part of OFDM symbol) 5 labeled 1750_5 and OFDM symbol (part of OFDM symbol) 6 labeled 1750_6," are present at time N+3, and "OFDM symbol (part of OFDM symbol) 5 labeled 1750_5 and OFDM symbol (part of OFDM symbol) 6 labeled 1750_6" are present in "IEEE 802.11ad and/or IEEE 802.11ay channel 4" labeled 1904.

The symbols, "OFDM symbol (part of OFDM symbol) 7 labeled 1750_7 and OFDM symbol (part of OFDM symbol) 8 labeled 1750_8," are present at time N+4, and "OFDM symbol (part of OFDM symbol) 7 labeled 1750_7 and OFDM symbol (part of OFDM symbol) 8 labeled 1750_8" are present in "IEEE 802.11ad and/or IEEE 802.11ay channel 2" labeled 1902.

The symbols, "OFDM symbol (part of OFDM symbol) 9 labeled 1750_9 and OFDM symbol (part of OFDM symbol) 10 labeled 1750_10," are present at time N+5, and "OFDM symbol (part of OFDM symbol) 9 labeled 1750_9 and OFDM symbol (part of OFDM symbol) 10 labeled 1750_10" are present in "IEEE 802.11ad and/or IEEE 802.11ay channel 3" labeled 1903.

The symbols, "OFDM symbol (part of OFDM symbol) 11 labeled 1750_11 and OFDM symbol (part of OFDM symbol) 12 labeled 1750_12," are present at time N+6, and "OFDM symbol (part of OFDM symbol) 11 labeled 1750_11 and OFDM symbol (part of OFDM symbol) 12 labeled 1750_12" are present in "IEEE 802.11ad and/or IEEE 802.11ay channel 4" labeled 1904.

Features in FIG. 20G in this case are as follows.

A plurality of OFDM symbols (parts of OFDM symbols) belonging to the first "IEEE 802.11ad and/or IEEE 802.11ay channel" are present at the first time.

For example, "OFDM symbol (part of OFDM symbol) 1 labeled 1750_1 and OFDM symbol (part of OFDM symbol) 2 labeled 1750_2" (a plurality of OFDM symbols (parts of OFDM symbols)) belonging to "IEEE 802.11ad and/or IEEE 802.11ay channel 2" labeled 1902 (the first "IEEE 802.11ad and/or IEEE 802.11ay channel") are present at time N+1 (the first time).

Note that the above feature is found at time N+2, time N+3, and so forth.

FH is configured such that a plurality of OFDM symbols (parts of OFDM symbols) that are present at the first time are present in the first "IEEE 802.11ad and/or IEEE 802.11ay channel" and the "IEEE 802.11ad and/or IEEE 802.11ay channel" to which the plurality of OFDM symbols (parts of OFDM symbols) belong is switched as time passes.

For example, "OFDM symbol (part of OFDM symbol) 1 labeled 1750_1 and OFDM symbol (part of OFDM symbol) 2 labeled 1750_2" (a plurality of OFDM symbols (parts of OFDM symbols)) belonging to "IEEE 802.11 ad and/or IEEE 802.11 ay channel 2" labeled 1902 are present at time N+1, and "OFDM symbol (part of OFDM symbol) 3 labeled 1750_3 and OFDM symbol (part of OFDM symbol) 4 labeled 1750_4" (a plurality of OFDM symbols (parts of OFDM symbols)) belonging to "IEEE 802.11ad and/or IEEE 802.11ay channel 3" labeled 1903 are present at time N+2.

Note that, although not illustrated in FIG. 20G the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1650_9', 'OFDM symbol (part of OFDM symbol) 10 labeled 1750_10', 'OFDM symbol (part of OFDM symbol) 11 labeled 1750_11', 'OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 175010", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)". In FIG. 20G, NR channels for the modulation signals transmitted by gNB 1100 are not illustrated.

The above-described manner leads to the similar effects to those described in the examples of FIGS. 20A, 20B, 20C, and 20D.

Note that the arrangement method for slots in the frequency and time domains is not limited to the example of FIG. 20G.

Also in FIG. 20G, the plurality of OFDM symbols (parts of OFDM symbols) are arranged on the time axis in the order of "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, "IEEE 802.11ad and/or IEEE 802.11ay channel 2" labeled 1902, "IEEE 802.11ad and/or IEEE 802.11 ay channel 3" labeled 1903, "IEEE 802.11ad and/or IEEE 802.11ay channel 4" labeled 1904, and so forth, but the present disclosure is not limited to this arrangement of the plurality of OFDM symbols (parts of OFDM symbols). For example, the order of "IEEE 802.11ad and/or IEEE 802.11ay channels" to which the plurality of OFDM symbols (parts of OFDM symbols) belong is not limited to this example.

For example, as long as FH is performed such that a plurality of OFDM symbols (parts of OFDM symbols) are placed in any of "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 on the time axis, and the "IEEE 802.11ad and/or IEEE 802.11ay channel" to which the plurality of OFDM symbols (parts of OFDM symbols) belong is switched as time passes, the same as the above description can be implemented and the same effects can be obtained as well.

Further, in the case of FIG. 20G, the number of NR channels to which the plurality of OFDM symbols (parts of OFDM symbols) present at certain time belong is three, which are "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904, but the present disclosure is not limited to this, and the same as the above description can be implemented and the same effects can be obtained as long as the number of "IEEE 802.11ad and/or IEEE 802.11ay channels" to which the plurality of OFDM symbols (parts of OFDM symbols) belong in FH is two or more.

Thus, a method of using time and frequency in FH in transmitting a modulation signal by gNB is not limited to the example of FIG. 20G, and the number of "IEEE 802.11ad and/or IEEE 802.11ay channels" to which a plurality of OFDM symbols (parts of OFDM symbols) present at certain time belong in FH only needs to be one or more.

Figure 20H:
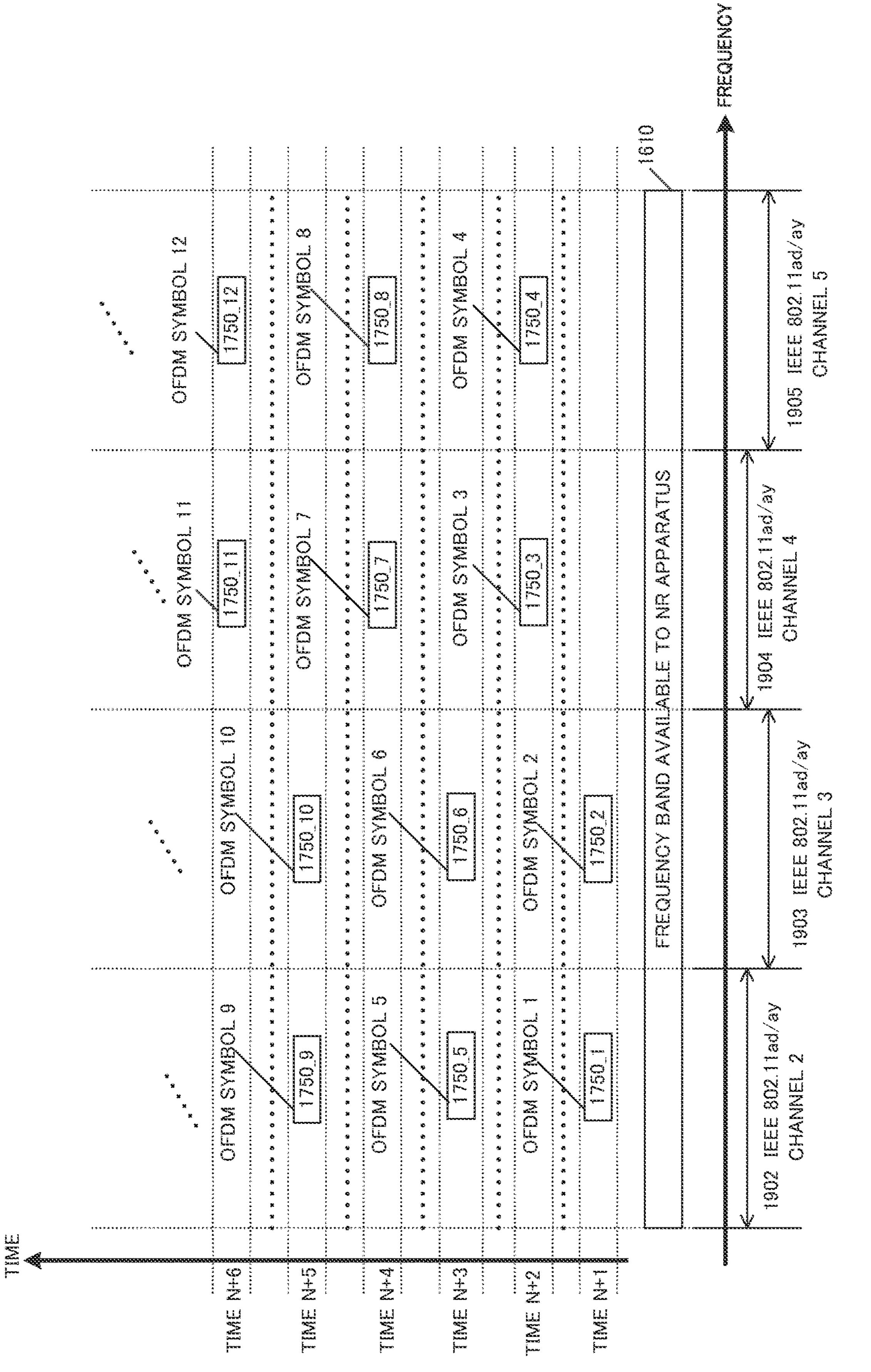
FIG. 20H illustrates an exemplary configuration of OFDM symbols for a modulation signal transmitted by gNB.

FIG. 20H illustrates, for example, an exemplary configuration of slots for a modulation signal transmitted by gNB 1100 in FIG. 18, and the horizontal axis represents frequency while the vertical axis represents time. Note that, in FIG. 20H, components that operate in the same manner as in FIGS. 16A, 17A, and 19A are denoted by the same reference signs, and the description thereof will be partially omitted.

As illustrated in FIG. 20H, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 20H, for example. "frequency band 1610 used by an NR apparatus" is present, and gNB 1100 in FIG. 18 transmits a modulation signal using "frequency band 1610 used by an NR apparatus" for example. Note that, in the example of FIG. 20H, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", "all or part of 'IEEE 802.11ad and/or IEEE 802.11ay channel 4' labeled 1904", and "all or part of 'IEEE 802.11ad and/or IEEE 802.11ay channel 5" labeled 1905".

Then, as illustrated in FIG. 20H, gNB 1100 transmits modulation signals to a communication counterpart such as NR-UE #1 labeled 1101_1 in FIG. 18, for example, in the following manner: at time N+1, gNB 1100 transmits modulation signals in "OFDM symbol (part of OFDM symbol) 1 labeled 1750_1 included in "IEEE 802.11ad and/or IEEE 802.11ay channel 2" labeled 1902 and OFDM symbol (part of OFDM symbol) 2 labeled 1750_2" included in "IEEE 802.11ad and/or IEEE 802.11ay channel 3" labeled 1903, at time N+2, gNB 1100 transmits modulation signals in "OFDM symbol (part of OFDM symbol) 3 labeled 1750_3 included in "IEEE 802.11ad and/or IEEE 802.11ay channel 4" labeled 1904 and OFDM symbol (part of OFDM symbol) 4 labeled 1750_4" included in "IEEE 802.11ad and/or IEEE 802.11ay channel 5" labeled 1905, at time N+3, gNB 1100 transmits modulation signals in "OFDM symbol (part of OFDM symbol) 5 labeled 1750_5 included in "IEEE 802.11ad and/or IEEE 802.11ay channel 2" labeled 1902 and OFDM symbol (part of OFDM symbol) 6 labeled 1750_6" included in "IEEE 802.11ad and/or IEEE 802.11ay channel 3" labeled 1903, at time N+4, gNB 1100 transmits modulation signals in "OFDM symbol (part of OFDM symbol) 7 labeled 1750_7 included in "IEEE 802.11ad and/or IEEE 802.11ay channel 4" labeled 1904 and OFDM symbol (part of OFDM symbol) 8 labeled 1750_8" included in "IEEE 802.11ad and/or IEEE 802.11ay channel 5" labeled 1905, at time N+5, gNB I 100 transmits modulation signals in "OFDM symbol (part of OFDM symbol) 9 labeled 1750_9 included in "IEEE 802.11ad and/or IEEE 802.11ay channel 2" labeled 1902 and OFDM symbol (part of OFDM symbol) 10 labeled 1750_10" included in "IEEE 802.11ad and/or IEEE 802.11ay channel 3" labeled 1903, at time N+6, gNB 1100 transmits modulation signals in "OFDM symbol (part of OFDM symbol) 11 labeled 1750_11 included in "IEEE 802.11ad and/or IEEE 802.11ay channel 4" labeled 1904 and OFDM symbol (part of OFDM symbol) 12 labeled 1750_12" included in "IEEE 802.11ad and/or IEEE 802.11ay channel 5" labeled 1905, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 20H. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1750_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth.

In the example of FIG. 20H, "OFDM symbol (part of OFDM symbol) 1 labeled 1750_1 and OFDM symbol (part of OFDM symbol) 2 labeled 1750_2" are present at time N+1, OFDM symbol (part of OFDM symbol) 1 labeled 1750_1 is present in "IEEE 802.11ad and/or IEEE 802.11ay channel 2" labeled 1902 and OFDM symbol (part of OFDM symbol) 2 labeled 1750_2 is present in "IEEE 802.11ad and/or IEEE 802.11ay channel 3" labeled 1903.

In addition, "OFDM symbol (part of OFDM symbol) 3 labeled 1750_3 and OFDM symbol (part of OFDM symbol) 4 labeled 1750_4" are present at time N+2, OFDM symbol (part of OFDM symbol) 3 labeled 1750_3 is present in "IEEE 802.11ad and/or IEEE 802.11ay channel 4" labeled 1904, and OFDM symbol (part of OFDM symbol) 4 labeled 1750_4 is present in "IEEE 802.11ad and/or IEEE 802.11ay channel 5" labeled 1905.

The symbols, "OFDM symbol (part of OFDM symbol) 5 labeled 1750_5 and OFDM symbol (part of OFDM symbol) 6 labeled 1750_6," are present at time N+3, OFDM symbol (part of OFDM symbol) 5 labeled 1750_5 is present in "IEEE 802.11 ad and/or IEEE 802.11ay channel 2 labeled 1902, and OFDM symbol (part of OFDM symbol) 6 labeled 1750_6 is present in "IEEE 802.11ad and/or IEEE 802.11ay channel 3" labeled 1903.

The symbols, "OFDM symbol (part of OFDM symbol) 7 labeled 1750_7 and OFDM symbol (part of OFDM symbol) 8 labeled 1750_8," are present at time N+4, OFDM symbol (part of OFDM symbol) 7 labeled 17507 is present in "IEEE 802.11ad and/or IEEE 802.11ay channel 4" labeled 1904, and OFDM symbol (part of OFDM symbol) 8 labeled 1750_8 is present in "IEEE 802.11ad and/or IEEE 802.11ay channel 5" labeled 1905.

The symbols, "OFDM symbol (part of OFDM symbol) 9 labeled 1750_9 and OFDM symbol (part of OFDM symbol) 10 labeled 1750_10," are present at time N+5, OFDM symbol (part of OFDM symbol) 9 labeled 1750_9 is present in "IEEE 802.11ad and/or IEEE 802.11 ay channel 2" labeled 1902, and OFDM symbol (part of OFDM symbol) 10 labeled 1750_10 is present in "IEEE 802.11ad and/or IEEE 802.11ay channel 3" labeled 1903.

The symbols, "OFDM symbol (part of OFDM symbol) 11 labeled 1750_11 and OFDM symbol (part of OFDM symbol) 12 labeled 1750_12," are present at time N+6, OFDM symbol (part of OFDM symbol) 11 labeled 1750_11 is present in "IEEE 802.11ad and/or IEEE 802.11ay channel 4" labeled 1904, and OFDM symbol (part of OFDM symbol) 12 labeled 1750_12 is present in "IEEE 802.11ad and/or IEEE 802.11ay channel 5" labeled 1905.

Features in FIG. 20H in this case are as follows.

A plurality of OFDM symbols (parts of OFDM symbols) are present at the first time, at least one of the plurality of OFDM symbols (parts of OFDM symbols) belongs to the first "IEEE 802.11ad and/or IEEE 802.11ay channel", and at least one of the plurality of OFDM symbols (parts of OFDM symbols) belongs to the second "IEEE 802.11ad and/or IEEE 802.11ay channel".

For example, at least OFDM symbol (part of OFDM symbol) I labeled 1750_1 belonging to "IEEE 802.11ad and/or IEEE 802.11ay channel 2" labeled 1902 (the first "IEEE 802.11ad and/or IEEE 802.11ay channel") and OFDM symbol (part of OFDM symbol) 2 labeled 1750_2 belonging to "IEEE 802.11ad and/or IEEE 802.11ay channel 3" labeled 1903 (the second "IEEE 802.11ad and/or IEEE 802.11ay channel") are present at time N+1 (the first time).

Note that the above feature is found at time N+2, time N+3, and so forth.

FH is configured such that the "IEEE 802.11ad and/or IEEE 802.11ay channels" to which the plurality of OFDM symbols (parts of OFDM symbols) belong are switched as time passes.

For example, OFDM symbol (part of OFDM symbol) 1 labeled 1750_1 belonging to "IEEE 802.11ad and/or IEEE 802.1 ay channel 2" labeled 1902 and OFDM symbol (part of OFDM symbol) 2 labeled 1750_2 belonging to "IEEE 802.11ad and/or IEEE 802.11ay channel 3" labeled 1903 are present at time N+1, and OFDM symbol (part of OFDM symbol) 3 labeled 1750_3 belonging to "IEEE 802.11ad and/or IEEE 802.11ay channel 4" labeled 1904 and OFDM symbol (part of OFDM symbol) 4 labeled 1750_4 belonging to "IEEE 802.11ad and/or IEEE 802.11ay channel 5" labeled 1905 are present at time N+2.

Note that, although not illustrated in FIG. 20H the modulation signal transmitted by gNB 1100 may include a frame, symbol, slot, etc. other than "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', 'OFDM symbol (part of OFDM symbol) 7 labeled 1750_7', 'OFDM symbol (part of OFDM symbol) 8 labeled 1750_8', 'OFDM symbol (part of OFDM symbol) 9 labeled 1650_9', 'OFDM symbol (part of OFDM symbol) 10 labeled 1750_10', 'OFDM symbol (part of OFDM symbol) 11 labeled 1750_11', 'OFDM symbol (part of OFDM symbol) 12 labeled 1750_12', and so forth" addressed to NR-UE #1 labeled 1101_1.

Further, the OFDM symbol (part of OFDM symbol) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 17504", "OFDM symbol 5 (part of OFDM symbol 5) labeled 1750_5", "OFDM symbol 6 (part of OFDM symbol 6) labeled 1750_6", "OFDM symbol (part of OFDM symbol) 7 labeled 1750_7", "OFDM symbol (part of OFDM symbol) 8 labeled 1750_8", "OFDM symbol (part of OFDM symbol) 9 labeled 1650_9", "OFDM symbol (part of OFDM symbol) 10 labeled 1750_10", "OFDM symbol (part of OFDM symbol) 11 labeled 1750_11", "OFDM symbol (part of OFDM symbol) 12 labeled 1750_12", and so forth may be composed of a single OFDM symbol (part of a single OFDM symbol) or may be composed of a plurality of OFDM symbols (parts of a plurality of OFDM symbols).

For example, it is assumed that a slot is composed of three "OFDM symbols (parts of OFDM symbols)". That is, "OFDM symbol 1 (part of OFDM symbol 1) labeled 1750_1", "OFDM symbol 2 (part of OFDM symbol 2) labeled 1750_2", and "OFDM symbol 3 (part of OFDM symbol 3) labeled 1750_3" belong to the first slot, "OFDM symbol 4 (part of OFDM symbol 4) labeled 1750_4", "OFDM symbol 5 (part of OFDM symbol 5) labeled 1750_5", and "OFDM symbol 6 (part of OFDM symbol 6) labeled 1750_6", belong to the second slot, and so forth. The FH method may be a method of transmitting a signal by dividing a slot into a plurality of frequencies. Note that this example is based on a method of configuring each slot with three "OFDM symbols (parts of OFDM symbols)", but the same can be implemented by a method of configuring each slot with one or more than two "OFDM symbols (parts of OFDM symbols)". In FIG. 20H, NR channels for the modulation signals transmitted by gNB 1100 are not illustrated.

The above-described manner leads to the similar effects to those described in the examples of FIGS. 20A, 20B, 20C, and 20D.

Note that the arrangement method for slots in the frequency and time domains is not limited to the example of FIG. 20H.

Also in FIG. 20H, the plurality of OFDM symbols (parts of OFDM symbols) are arranged on the time axis in the order of "'IEEE 802.11ad and/or IEEE 802.11ay channel 2' labeled 1902 and 'IEEE 802.11ad and/or IEEE 802.11ay channel 3' labeled 1903", "'IEEE 802.11ad and/or IEEE 802.11ay channel 4' labeled 1904 and 'IEEE 802.11ad and/or IEEE 802.11ay channel 5' labeled 1905", "'IEEE 802.11ad and/or IEEE 802.11ay channel 2' labeled 1902 and 'IEEE 802.11ad and/or IEEE 802.11ay channel 3' labeled 1903", "'IEEE 802.11ad and/or IEEE 802.11ay channel 4' labeled 1904 and 'IEEE 802.11ad and/or IEEE 802.11ay channel 5' labeled 1905", and so forth, but the present disclosure is not limited to this arrangement of OFDM symbols (parts of OFDM symbols). For example, the order of "IEEE 802.11ad and/or IEEE 802.11ay channels" to which the plurality of OFDM symbols (parts of OFDM symbols) belong is not limited to this example.

For example, as long as FH is performed such that a plurality of OFDM symbols (parts of OFDM symbols) are placed in a plurality of "IEEE 802.11ad and/or IEEE 802.11ay channels" on the time axis, and the plurality of "IEEE 802.11ad and/or IEEE 802.11ay channels" to which the plurality of OFDM symbols (parts of OFDM symbols) belong are switched as time passes, the same as the above description can be implemented and the same effects can be obtained as well.

Further, in the case of FIG. 20H, the number of NR channels to which the plurality of OFDM symbols (parts of OFDM symbols) present at certain time belong is four, which are "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905, but the present disclosure is not limited to this, and the same as the above description can be implemented and the same effects can be obtained as long as the number of "IEEE 802.11ad and/or IEEE 802.11ay channels" to which the plurality of OFDM symbols (parts of OFDM symbols) belong in FH is two or more.

Thus, a method of using time and frequency in FH in transmitting a modulation signal by gNB is not limited to the example of FIG. 20H, and the number of "IEEE 802.11ad and/or IEEE 802.11ay channels" to which a plurality of OFDM symbols (parts of OFDM symbols) present at certain time belong in FH only needs to be two or more.

Figure 20I:
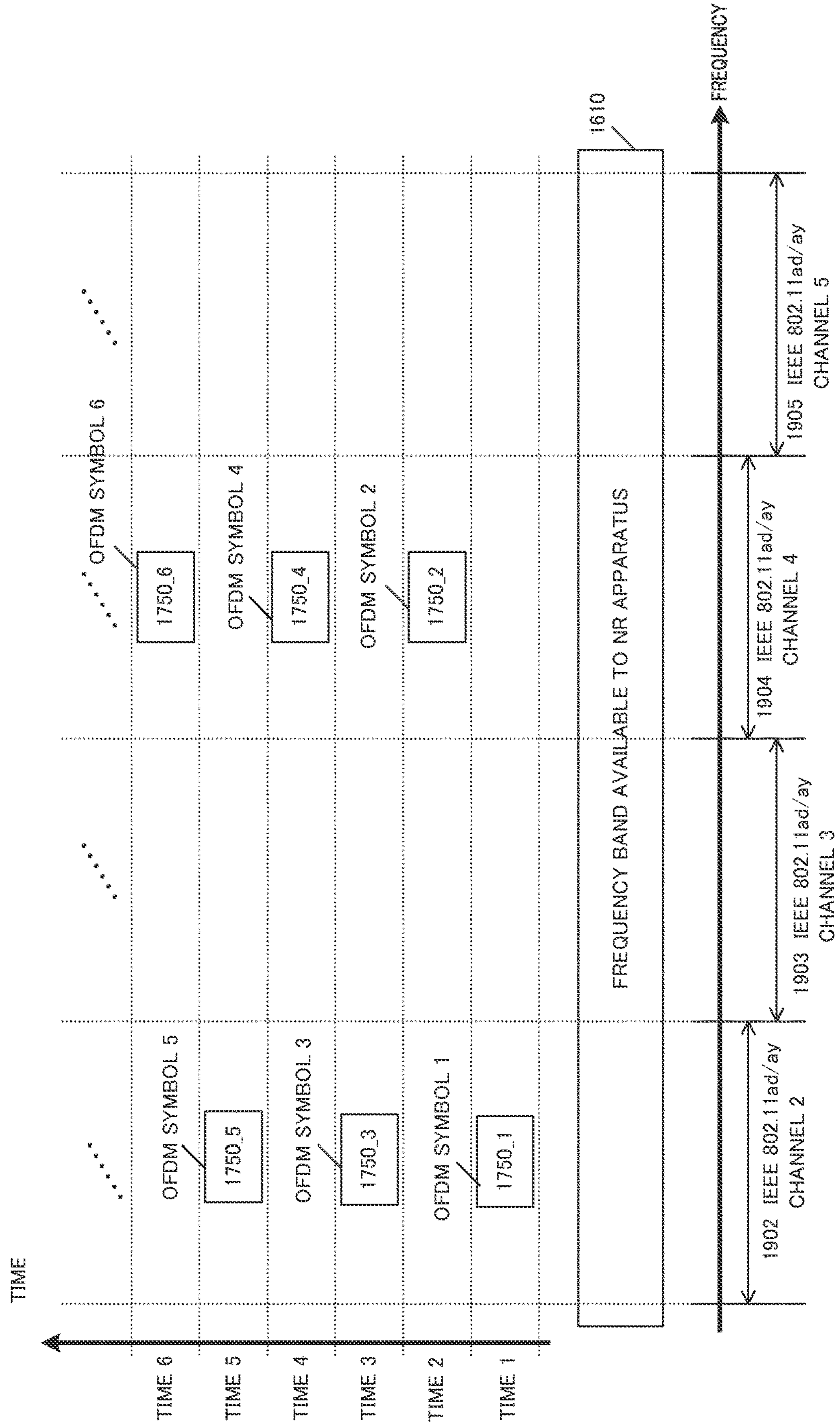
FIG. 20I illustrates an exemplary configuration of OFDM symbols for a modulation signal transmitted by gNB.

FIG. 20I illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that, in FIG. 20I, components that operate in the same manner as in FIGS. 16A, 17A, and 19A are denoted by the same reference signs, and the description thereof will be partially omitted.

As illustrated in FIG. 20I, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 20I, for example. "frequency band 1610 used by an NR apparatus" is present, and gNB 1100 in FIG. 18 transmits a modulation signal using "frequency band 1610 used by an NR apparatus", for example. Note that, in the example of FIG. 20I, "frequency band 1610 used by an NR apparatus" includes "all or part of 'IEEE 802.11ad and/or IEEE 802.11ay channel 2' labeled 1902" and "all or part of 'IEEE 802.11ad and/or IEEE 802.11ay channel 4' labeled 1904".

Then, as illustrated in FIG. 20I, gNB 1100 transmits modulation signals to a communication counterpart such as NR-UE #1 labeled 1101_1 in FIG. 18, for example, in the following manner: at time 1, gNB 1100 transmits a modulation signal in OFDM symbol (part of OFDM symbol) 1 labeled 1750_1 included in "IEEE 802.11ad and/or IEEE 802.11ay channel 2" labeled 1902, at time 2, gNB 1100 transmits a modulation signal in OFDM symbol (part of OFDM symbol) 2 labeled 1750_2 included in "IEEE 802.11ad and/or IEEE 802.11ay channel 4" labeled 1904, at time 3, gNB 1100 transmits a modulation signal in OFDM symbol (part of OFDM symbol) 3 labeled 1750_3 included in "IEEE 802.11ad and/or IEEE 802.11ay channel 2" labeled 1902, at time 4, gNB 1100 transmits a modulation signal in OFDM symbol (part of OFDM symbol) 4 labeled 1750_4 included in "IEEE 802.11ad and/or IEEE 802.11ay channel 4" labeled 1904, at time 5, gNB 1100 transmits a modulation signal in OFDM symbol (part of OFDM symbol) 5 labeled 1750_5 included in "IEEE 802.11ad and/or IEEE 802.11ay channel 2" labeled 1902, at time 6, gNB 1100 transmits a modulation signal in OFDM symbol (part of OFDM symbol) 6 labeled 1750_6 included in "IEEE 802.11ad and/or IEEE 802.11ay channel 4" labeled 1904, and so forth.

The gNB transmits these modulation signals subjected to FH as in the example of FIG. 20I. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

Features in FIG. 20I in this case are as follows.

When at least "the first 'IEEE 802.11ad and/or IEEE 802.11 ay channel'" and "the second 'IEEE 802.11ad and/or IEEE 802.11ay channel'" in which the OFDM symbols (parts of OFDM symbols) are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11ay channel'".

For example, in FIG. 20I, the OFDM symbols (parts of OFDM symbols) are present in "IEEE 802.11ad and/or IEEE 802.11ay channel 2" labeled 1902 (the first "IEEE 802.11ad and/or IEEE 802.11ay channel") and the OFDM symbols (parts of OFDM symbols) are present in "IEEE 802.11ad and/or IEEE 802.11ay channel 4" labeled 1904 (the second "IEEE 802.11ad and/or IEEE 802.11ay channel").

In this case, "IEEE 802.11ad and/or IEEE 802.11ay channel 3" labeled 1903 is present between "'IEEE 802.11ad and/or IEEE 802.11ay channel 2' labeled 1902"

(the first 'IEEE 802.11ad and/or IEEE 802.11ay channel')" and "'IEEE 802.11ad and/or IEEE 802.11ay channel 4' labeled 1904 (the second 'IEEE 802.11ad and/or IEEE 802.11ay channel')", that is, one "IEEE 802.11ad and/or IEEE 802.11ay channel" is present in between.

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11 ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "OFDM symbol (part of OFDM symbol) 1 labeled 1750_1, OFDM symbol (part of OFDM symbol) 3 labeled 1750_3. OFDM symbol (part of OFDM symbol) 5 labeled 1750_5, and so forth" are present and a second modulation signal defined by IEEE 802.11ay is present at a part where "OFDM symbol (part of OFDM symbol) 2 labeled 1750_2, OFDM symbol (part of OFDM symbol) 4 labeled 1750_4. OFDM symbol (part of OFDM symbol) 6 labeled 1750_6, and so forth" are present in FIG. 20I, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 20I.

Note that, although not illustrated in FIG. 20I, the modulation signal transmitted by gNB 1100 may include a frame, symbol, slot, etc. other than "OFDM symbol (part of OFDM symbol) 1 labeled 1750_1", the "OFDM symbol (part of OFDM symbol) labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 20I, NR channels for the modulation signals transmitted by gNB 1100 are not illustrated.

Further, the above-described operation leads to the similar effects to those described in the examples of FIGS. 20A, 20B, 20C, and 20D.

Note that the arrangement method for OFDM symbols (parts of OFDM symbols) in the frequency and time domains is not limited to the example of FIG. 20I.

Also in FIG. 20I, the plurality of OFDM symbols (parts of OFDM symbols) are arranged on the time axis in the order of "'IEEE 802.11ad and/or IEEE 802.11ay channel 2' labeled 1902", "'IEEE 802.11ad and/or IEEE 802.11ay channel 4' labeled 1904", "'IEEE 802.11ad and/or IEEE 802.11ay channel 2' labeled 1902", "'IEEE 802.11ad and/or IEEE 802.11ay channel 4' labeled 1904", and so forth, but the present disclosure is not limited to this arrangement of the plurality of OFDM symbols (parts of OFDM symbols).

For example, while a single OFDM symbol (part of OFDM symbol) is present at time 1 in "IEEE 802.11 ad and/or IEEE 802.11ay channel 2" labeled 1902 as seen in FIG. 20I in which OFDM symbol (part of OFDM symbol) 1 labeled 1750_1 is present at time 1 in "IEEE 802.11ad and/or IEEE 802.11ay channel 2" labeled 1902, a plurality of OFDM symbols (parts of OFDM symbols) may be present at time 1 in "IEEE 802.11ad and/or IEEE 802.11ay channel 2" labeled 1902. The same applies to time 3, time 5, and so forth.

For example, while a single OFDM symbol (part of OFDM symbol) is present at time 2 in "IEEE 802.11ad and/or IEEE 802.11ay channel 4" labeled 1904 as seen in FIG. 20I in which OFDM symbol (part of OFDM symbol) 2 labeled 1750_2 is present at time 2 in "IEEE 802.11ad and/or IEEE 802.11ay channel 4" labeled 1904, a plurality of OFDM symbols (parts of OFDM symbols) may be present at time 2 in "IEEE 802.11ad and/or IEEE 802.11ay channel 4" labeled 1904. The same applies to time 4, time 6, and so forth.

Figure 20J:
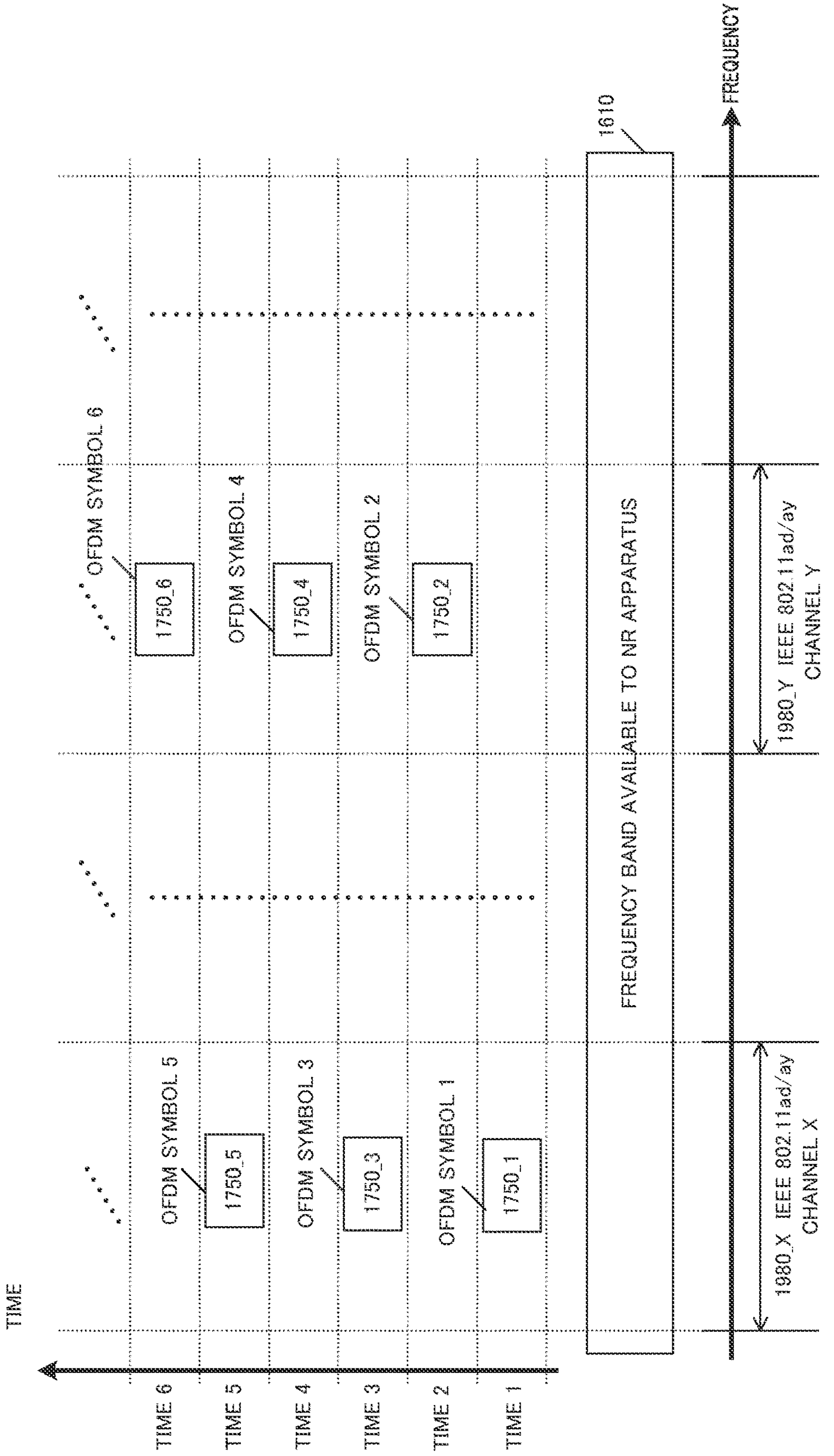
FIG. 20J illustrates an exemplary configuration of OFDM symbols for a modulation signal transmitted by gNB.

FIG. 20J illustrates, for example, an exemplary configuration of OFDM symbols (parts of OFDM symbols) for a modulation signal transmitted by gNB 1100 in FIG. 18, and the horizontal axis represents frequency while the vertical axis represents time. Note that, in FIG. 203, components that operate in the same manner as in FIGS. 16A, 17A, and 19A are denoted by the same reference signs, and the description thereof will be partially omitted.

As illustrated in FIG. 20J, "IEEE 802.11ad and/or IEEE 802.11ay channel X" labeled 1980_X and "IEEE 802.11 ad and/or IEEE 802.11 ay channel Y" labeled 1980_Y are present for the frequency axis. In FIG. 20J, for example, "frequency band 1610 used by an NR apparatus" is present, and gNB 1100 in FIG. 18 transmits a modulation signal using "frequency band 1610 used by an NR apparatus", for example. Note that, in the example of FIG. 20J, "frequency band 1610 used by an NR apparatus" includes "all or part of 'IEEE 802.11ad and/or IEEE 802.11ay channel X' labeled 1980_X" and "all or part of 'IEEE 802.11ad and/or IEEE 802.11ay channel Y' labeled 1980_Y".

Then, as illustrated in FIG. 20J, gNB 1100 transmits modulation signals to a communication counterpart such as NR-UE #1 labeled 1101_1 in FIG. 18, for example, in the following manner: at time 1, gNB 1100 transmits a modulation signal in OFDM symbol (part of OFDM symbol) 1 labeled 1750_1 included in "IEEE 802.11ad and/or IEEE 802.11ay channel X" labeled 1980_X, at time 2, gNB 1100 transmits a modulation signal in OFDM symbol (part of OFDM symbol) 2 labeled 1750_2 included in "IEEE 802.11ad and/or IEEE 802.11ay channel Y" labeled 1980_Y, at time 3, gNB 1100 transmits a modulation signal in OFDM symbol (part of OFDM symbol) 3 labeled 1750_3 included in "IEEE 802.11ad and/or IEEE 802.11ay channel X" labeled 1980_X, at time 4, gNB 1100 transmits a modulation signal in OFDM symbol (part of OFDM symbol) 4 labeled 1750_4 included in "IEEE 802.11ad and/or IEEE 802.11ay channel Y" labeled 1980_Y, at time 5, gNB 1100 transmits a modulation signal in OFDM symbol (part of OFDM symbol) 5 labeled 1750_5 included in "IEEE 802.11ad and/or IEEE 802.11ay channel X" labeled 1980_X, at time 6, gNB 1100 transmits a modulation signal in OFDM symbol (part of OFDM symbol) 6 labeled 1750_6 included in "IEEE 802.11ad and/or IEEE 802.11ay channel Y" labeled 1980_Y, and so forth.

The gNB transmits these modulation signals subjected to FH as in the example of FIG. 20J. Note that data to be transmitted to NR-UE #1 being the communication counterpart labeled 1101_1 is included in the slots such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

Features in FIG. 20J in this case are as follows.

When at least "the first 'IEEE 802.11ad and/or IEEE 802.11ay channel'" and "the second 'IEEE 802.11ad and/or IEEE 802.11ay channel'" in which the OFDM symbols (parts of OFDM symbols) are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11ay channel'".

For example, in FIG. 20J, the OFDM symbols (parts of OFDM symbols) are present in "IEEE 802.11ad and/or IEEE 802.11ay channel X" labeled 1980_X (the first "IEEE 802.11ad and/or IEEE 802.11ay channel") and the OFDM symbols (parts of OFDM symbols) are present in "IEEE 802.11 ad and/or IEEE 802.11ay channel Y" labeled 1980_Y (the second "IEEE 802.11ad and/or IEEE 802.11ay channel").

In this case, one or more "IEEE 802.11ad and/or IEEE 802.11ay channels" are present between "IEEE 802.11ad and/or IEEE 802.11ay channel X" labeled 1980_X (the first "IEEE 802.11ad and/or IEEE 802.11ay channel") and "IEEE 802.11ad and/or IEEE 802.11ay channel Y" labeled 1980_Y (the second "IEEE 802.11ad and/or IEEE 802.11ay channel").

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "OFDM symbol (part of OFDM symbol) I labeled 17501, OFDM symbol (part of OFDM symbol) 3 labeled 1750_3, OFDM symbol (part of OFDM symbol) 5 labeled 1750_5, and so forth" are present and a second modulation signal defined by IEEE 802.11 ay is present at a part where "OFDM symbol (part of OFDM symbol) 2 labeled 1750_2. OFDM symbol (part of OFDM symbol) 4 labeled 1750_4, OFDM symbol (part of OFDM symbol) 6 labeled 1750_6, and so forth" are present in FIG. 20J, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 20J.

Note that, although not illustrated in FIG. 20J, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 20J. NR channels for the modulation signals transmitted by gNB 1100 are not illustrated.

Further, the above-described operation leads to the similar effects to those described in the examples of FIGS. 20A, 20B, 20C, and 20D.

Note that the arrangement method for OFDM symbols (parts of OFDM symbols) in the frequency and time domains is not limited to the example of FIG. 20J.

Also in FIG. 20J, the plurality of OFDM symbols (parts of OFDM symbols) are arranged on the time axis in the order of "'IEEE 802.11ad and/or IEEE 802.11ay channel X' labeled 1980_X", "'IEEE 802.11ad and/or IEEE 802.11ay channel Y' labeled 1980_Y". "'IEEE 802.11ad and/or IEEE 802.11ay channel X' labeled 1980_X", "'IEEE 802.11ad and/or IEEE 802.11ay channel Y' labeled 1980_Y", and so forth, but the present disclosure is not limited to this arrangement of the plurality of OFDM symbols (parts of OFDM symbols).

For example, while a single OFDM symbol (part of OFDM symbol) is present at time 1 in "IEEE 802.11ad and/or IEEE 802.11ay channel X" labeled 1980_X as seen in FIG. 20J in which OFDM symbol (part of OFDM symbol) 1 labeled 1750_1 is present at time 1 in "IEEE 802.11ad and/or IEEE 802.11ay channel X" labeled 1980_X, a plurality of OFDM symbols (parts of OFDM symbols) may be present at time 1 in "IEEE 802.11ad and/or IEEE 802.11ay channel X" labeled 1980_X. The same applies to time 3, time 5, and so forth.

For example, while a single OFDM symbol (part of OFDM symbol) is present at time 2 in "IEEE 802.11ad and/or IEEE 802.11ay channel Y" labeled 1980_Y as seen in FIG. 203 in which OFDM symbol (part of OFDM symbol) 2 labeled 1750_2 is present at time 2 in "IEEE 802.11 ad and/or IEEE 802.11ay channel Y" labeled 1980_Y, a plurality of OFDM symbols (parts of OFDM symbols) may be present at time 2 in "IEEE 802.11 ad and/or IEEE 802.11ay channel Y" labeled 1980_Y. The same applies to time 4, time 6, and so forth.

Although the channels in which the OFDM symbols (parts of OFDM symbols) are present in FIG. 20J are "IEEE 802.11ad and/or IEEE 802.11ay channel X" labeled 1980_X and "IEEE 802.11ad and/or IEEE 802.11ay channel Y" labeled 1980_Y, the same operation may also be performed when an OFDM symbol (part of OFDM symbol) is present in an "IEEE 802.11ad and/or IEEE 802.11ay channel" other than the above channels.

Figure 20K:
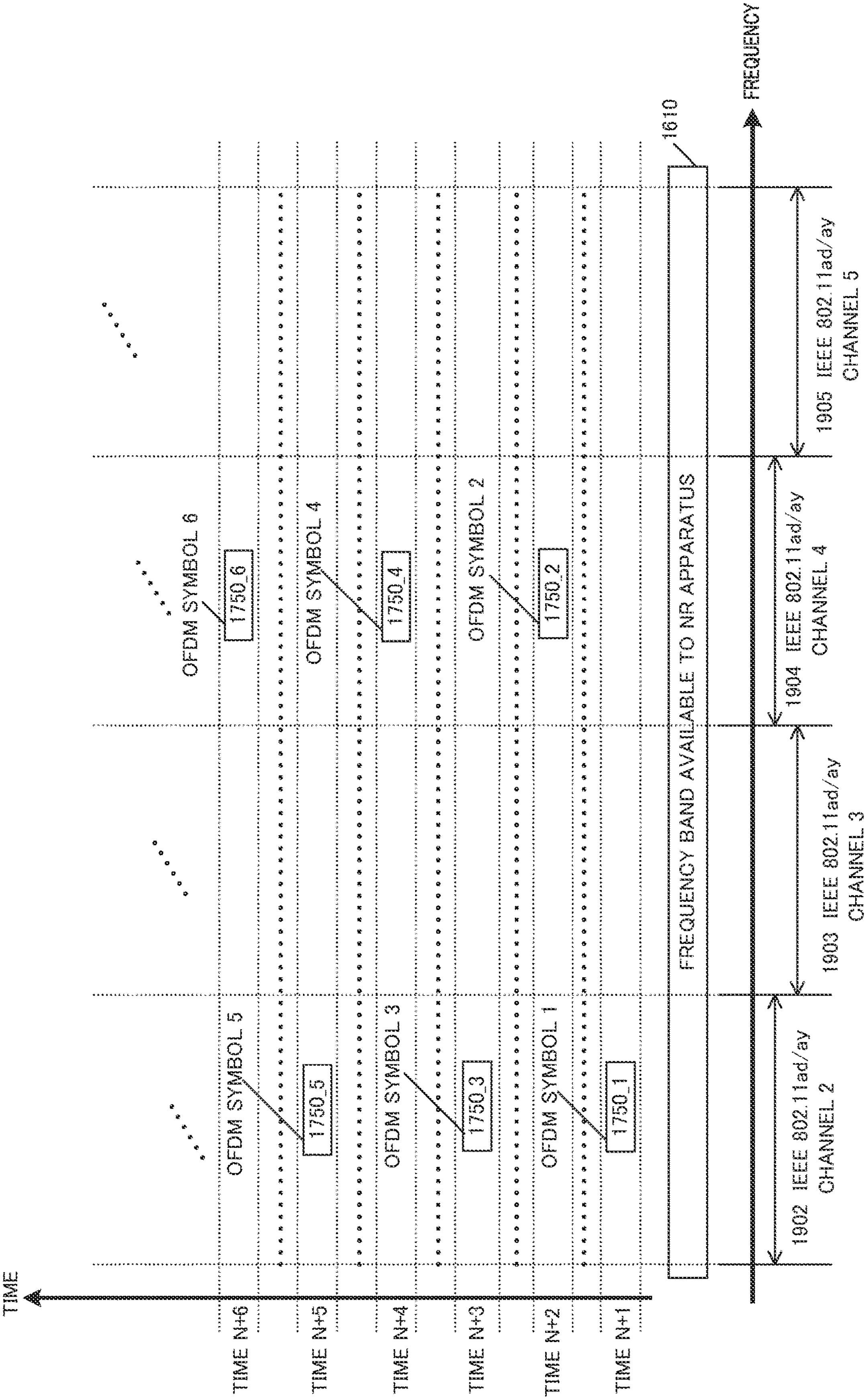
FIG. 20K illustrates an exemplary configuration of OFDM symbols for a modulation signal transmitted by gNB.

FIG. 20K illustrates, for example, an exemplary configuration of slots for a modulation signal transmitted by gNB 1100 in FIG. 18, and the horizontal axis represents frequency while the vertical axis represents time. Note that, in FIG. 20K, components that operate in the same manner as in FIGS. 16A, 17A, and 19A are denoted by the same reference signs, and the description thereof will be partially omitted.

As illustrated in FIG. 20K, "IEEE 802.11ad and/or IEEE 802.11ay channel 2" labeled 1902, "IEEE 802.11ad and/or IEEE 802.11ay channel 3" labeled 1903, "IEEE 802.11ad and/or IEEE 802.11ay channel 4" labeled 1904, and "IEEE 802.11ad and/or IEEE 802.11ay channel 5" labeled 1905 are present for the frequency axis. In FIG. 20K, for example. "frequency band 1610 used by an NR apparatus" is present, and gNB 1100 in FIG. 18 transmits a modulation signal using "frequency band 1610 used by an NR apparatus", for example. Note that, in the example of FIG. 20K, "frequency band 1610 used by an NR apparatus" includes "all or part of 'IEEE 802.11ad and/or IEEE 802.11ay channel 2' labeled 1902" and "all or part of 'IEEE 802.11ad and/or IEEE 802.11ay channel 4' labeled 1904".

Then, as illustrated in FIG. 20K, gNB 1100 transmits modulation signals to a communication counterpart such as NR-UE #1 labeled 1101_1 in FIG. 18, for example, in the following manner: at time N+1, gNB 1100 transmits a modulation signal in OFDM symbol (part of OFDM symbol) 1 labeled 1750_1 included in "IEEE 802.11ad and/or IEEE 802.11ay channel 2" labeled 1902, at time N+2, gNB 1100 transmits a modulation signal in OFDM symbol (part of OFDM symbol) 2 labeled 1750_2 included in "IEEE 802.11ad and/or IEEE 802.11ay channel 4" labeled 1904, at time N+3, gNB 1100 transmits a modulation signal in OFDM symbol (part of OFDM symbol) 3 labeled 1750_3 included in "IEEE 802.11ad and/or IEEE 802.11ay channel 2" labeled 1902, at time N+4, gNB 1100 transmits a modulation signal in OFDM symbol (part of OFDM symbol) 4 labeled 1750_4 included in "IEEE 802.11ad and/or IEEE 802.11ay channel 4" labeled 1904, at time N+5, gNB 1100 transmits a modulation signal in OFDM symbol (part of OFDM symbol) 5 labeled 1750_5 included in "IEEE 802.11ad and/or IEEE 802.11ay channel 2" labeled 1902, at time N+6, gNB 1100 transmits a modulation signal in OFDM symbol (part of OFDM symbol) 6 labeled 1750_6 included in "IEEE 802.11ad and/or IEEE 802.11ay channel 4" labeled 1904, and so forth.

Note that another "frame, symbol, signal, etc." may be present between time N+I and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 20K. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

Features in FIG. 20K in this case are as follows.

When at least "the first 'IEEE 802.11ad and/or IEEE 802.11ay channel'" and "the second 'IEEE 802.11ad and/or IEEE 802.11ay channel'" in which the OFDM symbols (parts of OFDM symbols) are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11ay channel'".

For example, in FIG. 20K, the OFDM symbols (parts of OFDM symbols) are present in "IEEE 802.11ad and/or IEEE 802.11ay channel 2" labeled 1902 (the first "IEEE 802.11ad and/or IEEE 802.11ay channel") and the OFDM symbols (parts of OFDM symbols) are present in "IEEE 802.11ad and/or IEEE 802.11ay channel 4" labeled 1904 (the second "IEEE 802.11ad and/or IEEE 802.11ay channel").

In this case, "IEEE 802.11ad and/or IEEE 802.11ay channel 3" labeled 1903 is present between "'IEEE 802.11ad and/or IEEE 802.11ay channel 2' labeled 1902" (the first 'IEEE 802.11ad and/or IEEE 802.11ay channel')" and "'IEEE 802.11ad and/or IEEE 802.11ay channel 4' labeled 1904 (the second 'IEEE 802.11ad and/or IEEE 802.11ay channel')", that is, one "IEEE 802.11ad and/or IEEE 802.11ay channel" is present in between.

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "OFDM symbol (part of OFDM symbol) 1 labeled 1750_1, OFDM symbol (part of OFDM symbol) 3 labeled 1750_3, OFDM symbol (part of OFDM symbol) 5 labeled 1750_5, and so forth" are present and a second modulation signal defined by IEEE 802.11 ay is present at a part where "OFDM symbol (part of OFDM symbol) 2 labeled 1750_2. OFDM symbol (part of OFDM symbol) 4 labeled 1750_4, OFDM symbol (part of OFDM symbol) 6 labeled 1750_6, and so forth" are present in FIG. 20K, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 20K.

Note that, although not illustrated in FIG. 20K, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 20K, NR channels for the modulation signals transmitted by gNB 1100 are not illustrated.

Further, the above-described operation leads to the similar effects to those described in the examples of FIGS. 20A, 20B, 20C, and 20D.

Note that the arrangement method for OFDM symbols (parts of OFDM symbols) in the frequency and time domains is not limited to the example of FIG. 20K.

Also in FIG. 20K, the plurality of OFDM symbols (parts of OFDM symbols) are arranged on the time axis in the order of "'IEEE 802.11ad and/or IEEE 802.11ay channel 2' labeled 1902", "'IEEE 802.11ad and/or IEEE 802.11ay channel 4' labeled 1904", "'IEEE 802.11ad and/or IEEE 802.11ay channel 2' labeled 1902", "'IEEE 802.11ad and/or IEEE 802.11ay channel 4' labeled 1904", and so forth, but the present disclosure is not limited to this arrangement of the plurality of OFDM symbols (parts of OFDM symbols).

For example, while a single OFDM symbol (part of OFDM symbol) is present at time N+1 in "IEEE 802.11ad and/or IEEE 802.11ay channel 2" labeled 1902 as seen in FIG. 20K in which OFDM symbol (part of OFDM symbol) 1 labeled 1750_1 is present at time N+1 in "IEEE 802.11ad and/or IEEE 802.11ay channel 2" labeled 1902, a plurality of OFDM symbols (parts of OFDM symbols) may be present at time N+1 in "IEEE 802.11ad and/or IEEE 802.11ay channel 2" labeled 1902. The same applies to time N+3, time N+5, and so forth.

For example, while a single OFDM symbol (part of OFDM symbol) is present at time N+2 in "IEEE 802.11ad and/or IEEE 802.11ay channel 4" labeled 1904 as seen in FIG. 20K in which OFDM symbol (part of OFDM symbol) 2 labeled 1750_2 is present at time N+2 in "IEEE 802.11 ad and/or IEEE 802.11ay channel 4" labeled 1904, a plurality of OFDM symbols (parts of OFDM symbols) may be present at time N+2 in "IEEE 802.11 ad and/or IEEE 802.11ay channel 4" labeled 1904. The same applies to time N+4, time N+6, and so forth.

Figure 20L:
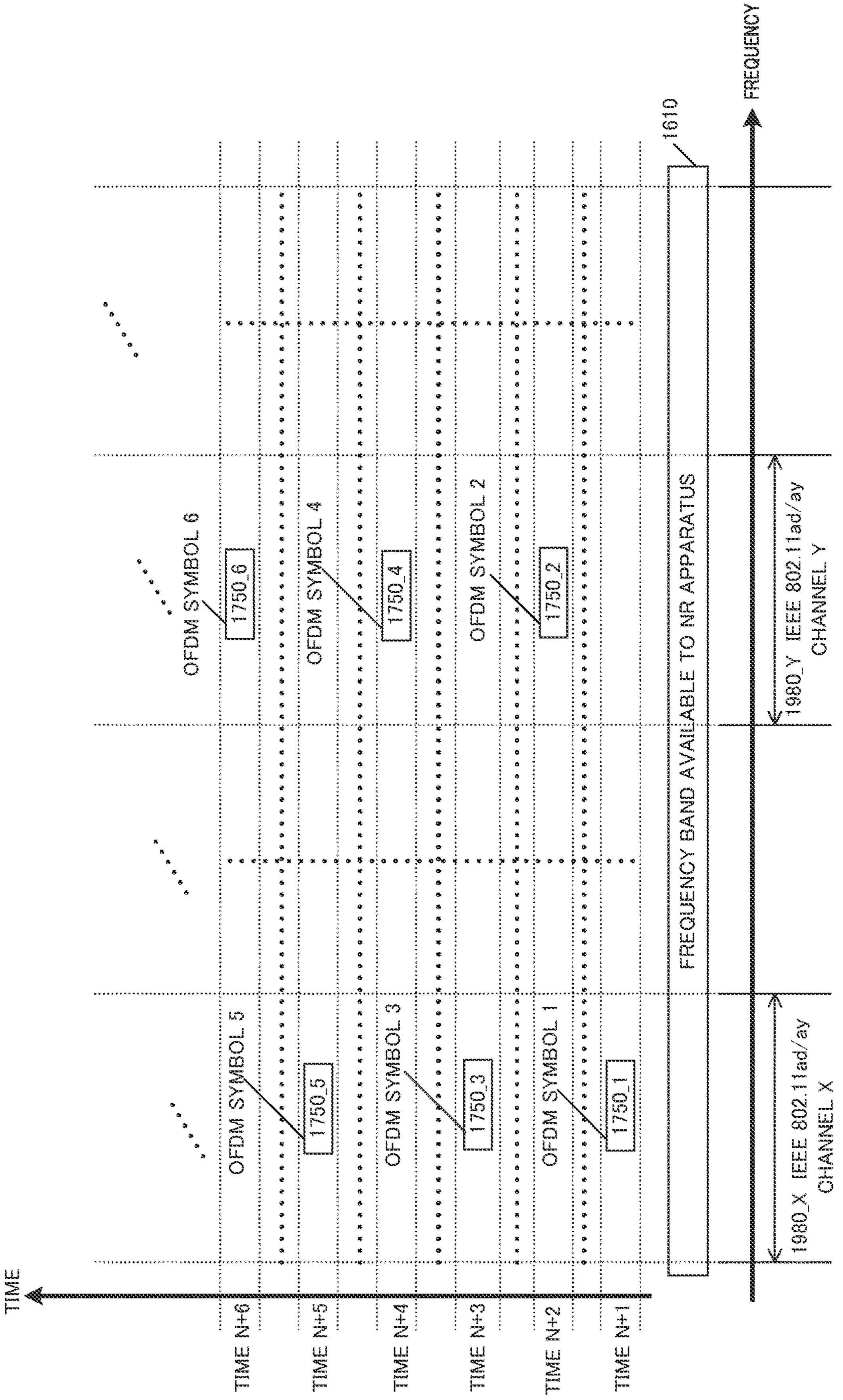
FIG. 20L illustrates an exemplary configuration of OFDM symbols for a modulation signal transmitted by gNB.

FIG. 20L illustrates, for example, an exemplary configuration of slots for a modulation signal transmitted by gNB 1100 in FIG. 18, and the horizontal axis represents frequency while the vertical axis represents time. Note that, in FIG. 20L, components that operate in the same manner as in FIGS. 16A, 17A, and 19A are denoted by the same reference signs, and the description thereof will be partially omitted.

As illustrated in FIG. 20L, "IEEE 802.11ad and/or IEEE 802.11ay channel X" labeled 1980_X and "IEEE 802.11ad and/or IEEE 802.11ay channel Y" labeled 1980_Y are present for the frequency axis. In FIG. 20L, for example, "frequency band 1610 used by an NR apparatus" is present, and gNB 1100 in FIG. 18 transmits a modulation signal using "frequency band 1610 used by an NR apparatus", for example. Note that, in the example of FIG. 20L, "frequency band 1610 used by an NR apparatus" includes "all or part of 'IEEE 802.11ad and/or IEEE 802.11ay channel X' labeled 1980_X" and "all or part of 'IEEE 802.11ad and/or IEEE 802.11ay channel Y' labeled 1980_Y".

Then, as illustrated in FIG. 20L, gNB 1100 transmits modulation signals to a communication counterpart such as NR-UE #1 labeled 1101_1 in FIG. 18, for example, in the following manner: at time N+1, gNB 1100 transmits a modulation signal in OFDM symbol (part of OFDM symbol) I labeled 1750_1 included in "IEEE 802.11ad and/or IEEE 802.11 ay channel X" labeled 1980_X, at time N+2, gNB 1100 transmits a modulation signal in OFDM symbol (part of OFDM symbol) 2 labeled 1750_2 included in "IEEE 802.11ad and/or IEEE 802.11ay channel Y" labeled 1980_Y, at time N+3, gNB 1100 transmits a modulation signal in OFDM symbol (part of OFDM symbol) 3 labeled 1750_3 included in "IEEE 802.11ad and/or IEEE 802.11ay channel X" labeled 1980_X, at time N+4, gNB 1100 transmits a modulation signal in OFDM symbol (part of OFDM symbol) 4 labeled 1750_4 included in "IEEE 802.11ad and/or IEEE 802.11ay channel Y" labeled 1980_Y, at time N+5, gNB 1100 transmits a modulation signal in OFDM symbol (part of OFDM symbol) 5 labeled 1750_5 included in "IEEE 802.11ad and/or IEEE 802.11ay channel X" labeled 1980_X, at time N+6, gNB 1100 transmits a modulation signal in OFDM symbol (part of OFDM symbol) 6 labeled 1750_6 included in "IEEE 802.11ad and/or IEEE 802.11ay channel Y" labeled 1980_Y, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to FH as in the example of FIG. 20L. Note that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

Features in FIG. 20L in this case are as follows.

When at least "the first 'IEEE 802.11ad and/or IEEE 802.11ay channel'" and "the second 'IEEE 802.11ad and/or IEEE 802.11ay channel'" in which the OFDM symbols (parts of OFDM symbols) are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11ay channel'".

For example, in FIG. 20L, the OFDM symbols (parts of OFDM symbols) are present in "IEEE 802.11ad and/or IEEE 802.11ay channel X" labeled 1980_X (the first "IEEE 802.11ad and/or IEEE 802.11ay channel") and the OFDM symbols (parts of OFDM symbols) are present in "IEEE 802.11ad and/or IEEE 802.11ay channel Y" labeled 1980_Y (the second "IEEE 802.11ad and/or IEEE 802.11ay channel").

In this case, one or more "IEEE 802.11ad and/or IEEE 802.11ay channels" are present between "IEEE 802.11ad and/or IEEE 802.11ay channel X" labeled 1980_X (the first "IEEE 802.11ad and/or IEEE 802.11ay channel") and "IEEE 802.11ad and/or IEEE 802.11ay channel Y" labeled 1980Y (the second "IEEE 802.11ad and/or IEEE 802.11ay channel").

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "OFDM symbol (part of OFDM symbol) 1 labeled 1750_1. OFDM symbol (part of OFDM symbol) 3 labeled 1750_3, OFDM symbol (part of OFDM symbol) 5 labeled 1750_5, and so forth" are present and a second modulation signal defined by IEEE 802.11ay is present at a part where "OFDM symbol (part of OFDM symbol) 2 labeled 1750_2. OFDM symbol (part of OFDM symbol) 4 labeled 1750_4, OFDM symbol (part of OFDM symbol) 6 labeled 1750_6, and so forth" are present in FIG. 20L, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 20L.

Note that, although not illustrated in FIG. 20L, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 20L, NR channels for the modulation signals transmitted by gNB 1100 are not illustrated.

Further, the above-described operation leads to the similar effects to those described in the examples of FIGS. 20A, 20B, 20C, and 20D.

Note that the arrangement method for OFDM symbols (parts of OFDM symbols) in the frequency and time domains is not limited to the example of FIG. 20L.

Also in FIG. 20L, the plurality of OFDM symbols (parts of OFDM symbols) are arranged on the time axis in the order of "'IEEE 802.11ad and/or IEEE 802.11ay channel X' labeled 1980_X", "'IEEE 802.11ad and/or IEEE 802.11ay channel Y' labeled 1980_Y", "'IEEE 802.11ad and/or IEEE 802.11ay channel X' labeled 1980_X", "'IEEE 802.11ad and/or IEEE 802.11ay channel Y' labeled 1980_Y", and so forth, but the present disclosure is not limited to this arrangement of the plurality of OFDM symbols (parts of OFDM symbols).

For example, while a single OFDM symbol (part of OFDM symbol) is present at time N+1 in "IEEE 802.11ad and/or IEEE 802.11ay channel X" labeled 1980_X as seen in FIG. 20L in which OFDM symbol (part of OFDM symbol) 1 labeled 1750_1 is present at time N+1 in "IEEE 802.11ad and/or IEEE 802.11ay channel X" labeled 1980_X, a plurality of OFDM symbols (parts of OFDM symbols) may be present at time N+1 in "IEEE 802.11ad and/or IEEE 802.11ay channel X" labeled 1980_X. The same applies to time N+3, time N+5, and so forth.

For example, while a single OFDM symbol (part of OFDM symbol) is present at time N+2 in "IEEE 802.11ad and/or IEEE 802.11ay channel Y" labeled 1980_Y as seen in FIG. 20L in which OFDM symbol (part of OFDM symbol) 2 labeled 17502 is present at time N+2 in "IEEE 802.11 ad and/or IEEE 802.11 ay channel Y" labeled 1980_Y, a plurality of OFDM symbols (parts of OFDM symbols) may be present at time N+2 in "IEEE 802.11ad and/or IEEE 802.11ay channel Y" labeled 1980_Y. The same applies to time N+4, time N+6, and so forth.

Although the channels in which the OFDM symbols (parts of OFDM symbols) are present in FIG. 20L are "IEEE 802.11ad and/or IEEE 802.11ay channel X" labeled 1980_X and "IEEE 802.11ad and/or IEEE 802.11ay channel Y" labeled 1980_Y, the same operation may also be performed when an OFDM symbol (part of OFDM symbol) is present in an "IEEE 802.11ad and/or IEEE 802.11ay channel" other than the above channels.

While a description has been given of an example related to the configuration value of SCS of OFDM and the number of OFDM symbols (parts of OFDM symbols) composing a slot when an NR apparatus performs FH as described above, the following is preferably satisfied in the present disclosure to reduce interference to another apparatus regardless of performing LBT or not.

A plurality of SCS values are available as the SCS of OFDM, and an NR apparatus selects an SCS value to be used in generating and transmitting a modulation signal among the plurality of SCS values. At this time, the NR apparatus selects the greatest SCS value to reduce interference.

Thus, when the NR apparatus has the "no-LBT mode", for example, the "no-LBT mode" preferably has the function of enabling to select the greatest SCS value at least.

A plurality values are available as "the number of OFDM symbols (parts of OFDM symbols) composing a slot", and an NR apparatus selects "the number of OFDM symbols (parts of OFDM symbols) composing a slot" to be used in generating and transmitting a modulation signal among the plurality of values. At this time, the NR apparatus selects the smallest value among the plurality of values as "the number of OFDM symbols (parts of OFDM symbols) composing a slot" to reduce interference.

Thus, when the NR apparatus has the "no-LBT mode", for example, the "no-LBT mode" preferably has the function of enabling to select the smallest number among "the numbers of OFDM symbols (parts of OFDM symbols) composing a slot".

Taking the above into the consideration, an exemplary relationship between the "LBT mode" and the "no-LBT mode" will be described.

The description will be based on the NR system of 52.6 GHz or higher (and 71 GHz or lower), e.g., 60 GHz band, by way of example. It is assumed that an NR apparatus supports (has) the "LBT mode" and/or the "no-LBT mode".

In the "LBT mode", 120 kHz, 240 kHz, 480 kHz, and 960 kHz are supported as the SCS value of OFDM. Thus, the NR apparatus selects any of 120 kHz, 240 kHz, 480 kHz, and 960 kHz as the SCS value of OFDM when transmitting and receiving a modulation signal in the "LBT mode".

In the "no-LBT mode", 960 kHz, for example, is supported as the SCS value of OFDM. Thus, the NR apparatus selects 960 kHz as the SCS value of OFDM when transmitting and receiving a modulation signal in the "no-LBT mode".

As another example for the "no-LBT mode", it is assumed that 480 kHz and 960 kHz, for example, are supported as the SCS value of OFDM in the "no-LBT mode". Thus, the NR apparatus selects either 480 kHz or 960 kHz as the SCS value of OFDM when transmitting and receiving a modulation signal in the "no-LBT mode".

The above description is given as an example, and when the minimum supported value of the SCS of OFDM in the "LBT mode" is A (Hz) and the minimum supported value of the SCS of OFDM in the "no-LBT mode" is B (Hz), for example, it is also suitable to configure that B is greater than A (B>A). Note that A and B are real numbers greater than 0.

The above manner produces an effect that an NR apparatus is less likely to cause interference to another apparatus when selecting the "no-LBT mode" and transmitting a modulation signal.

Note that the above effect can be obtained when a modulation signal is transmitted, regardless of whether "the NR apparatus performs FH or not" in the "LBT mode" or the "no-LBT mode", but a greater effect is possibly expected with FH.

A description related to a slot will be given based on the NR system of 52.6 GHz or higher (and 71 GHz or lower), e.g., 60 GHz band, by way of example. It is assumed that an NR apparatus supports (has) the "LBT mode" and/or the "no-LBT mode".

In the "LBT mode", it is assumed that integers from 1 to 14 (both inclusive) or integers from 2 to 14 (both inclusive) are supported as the number of OFDM symbols (part of one OFDM symbol) composing one slot. Thus, when transmitting and receiving a modulation signal in the "LBT mode", the NR apparatus selects any of integers from 1 to 14 (both inclusive) or any of integers from 2 to 14 (both inclusive) as the number of OFDM symbols (part of one OFDM symbol) composing one slot.

In the “no-LBT mode”, it is assumed that 1 or integers from 1 to 4 (both inclusive), for example, are supported as the number of OFDM symbols (part of one OFDM symbol) composing one slot. Thus, when transmitting and receiving a modulation signal in the “no-LBT mode”, the NR apparatus selects 1 or any of integers from 1 to 4 (both inclusive) as the number of OFDM symbols (part of one OFDM symbol) composing one slot.

The above description is given as an example, and when the maximum supported value of “the number of OFDM symbols (part of one OFDM symbol) composing one slot” in the “LBT mode” is X and the maximum supported value of “the number of OFDM symbols (part of one OFDM symbol) composing one slot” in the “no-LBT mode” is Y, for example, it is also suitable to configure that X is greater than Y (X>Y). Note that X and Y are integers greater than 1.

The above manner produces an effect that an NR apparatus is less likely to cause interference to another apparatus when selecting the “no-LBT mode” and transmitting a modulation signal.

Note that the above effect can be obtained when a modulation signal is transmitted, regardless of whether “the NR apparatus performs FH or not” in the “LBT mode” or the “no-LBT mode”, but a greater effect is possibly expected with FH.

A description will be given of “the SCS value” and “the number of OFDM symbols (part of one OFDM symbol) composing one slot”, in particular, in the “area (or country) where LBT is not performed”, the “area (or country) where LBT may be performed”, and the “area (or country) where LBT is necessary”.

The description will be based on the NR system of 52.6 GHz or higher (and 71 GHz or lower), e.g., 60 GHz band, by way of example.

It is assumed that an NR apparatus operates in the mode of performing LBT in the “area (or country) where LBT may be performed” and the “area (or country) where LBT is necessary”.

In the “mode of performing LBT”, 120 kHz, 240 kHz, 480 kHz, and %0 kHz are supported as the SCS value of OFDM. Thus, the NR apparatus selects any of 120 kHz, 240 kHz, 480 kHz, and 960 kHz as the SCS value of OFDM when transmitting and receiving a modulation signal in the “mode of performing LBT”.

It is assumed that an NR apparatus operates in the mode of not performing LBT in the “area (or country) where LBT is not performed” and the “area (or country) where LBT may be performed”.

In the “mode of not performing LBT”, 960 kHz, for example, is supported as the SCS value of OFDM. Thus, the NR apparatus selects 960 kHz as the SCS value of OFDM when transmitting and receiving a modulation signal in the “mode of not performing LBT”.

As another example for the “mode of not performing LBT”, it is assumed that 480 kHz and 960 kHz, for example, are supported as the SCS value of OFDM in the “mode of not performing LBT”. Thus, the NR apparatus selects either 480 kHz or 960 kHz as the SCS value of OFDM when transmitting and receiving a modulation signal in the “mode of not performing LBT”.

The above description is given as an example, and when the minimum supported value of the SCS of OFDM in the “mode of performing LBT” is A (Hz) and the minimum supported value of the SCS of OFDM in the “mode of not performing LBT” is B (Hz), for example, it is also suitable to configure that B is greater than A (B>A). Note that A and B are real numbers greater than 0.

The above manner produces an effect that an NR apparatus is less likely to cause interference to another apparatus when operating in the “mode of not performing LBT” and transmitting a modulation signal.

Note that the above effect can be obtained when a modulation signal is transmitted, regardless of whether “the NR apparatus performs FH or not” in an operation in the “mode of performing LBT” or in an operation in the “mode of not performing LBT”, but a greater effect is possibly expected with FH.

The description will be based on the NR system of 52.6 GHz or higher (and 71 GHz or lower), e.g., 60 GHz band, by way of example.

It is assumed that an NR apparatus operates in the mode of performing LBT in the “area (or country) where LBT may be performed” and the “area (or country) where LBT is necessary”.

In the “mode of performing LBT”, it is assumed that integers from 1 to 14 (both inclusive) or integers from 2 to 14 (both inclusive) are supported as the number of OFDM symbols (part of one OFDM symbol) composing one slot. Thus, when transmitting and receiving a modulation signal in the “mode of performing LBT”, the NR apparatus selects any of integers from 1 to 14 (both inclusive) or any of integers from 2 to 14 (both inclusive) as the number of OFDM symbols (part of one OFDM symbol) composing one slot.

It is assumed that an NR apparatus operates in the mode of not performing LBT in the “area (or country) where LBT is not performed” and the “area (or country) where LBT may be performed”.

In the “mode of not performing LBT”, it is assumed that 1 or integers from 1 to 4 (both inclusive), for example, are supported as the number of OFDM symbols (part of one OFDM symbol) composing one slot. Thus, when transmitting and receiving a modulation signal in the “mode of not performing LBT”, the NR apparatus selects 1 or any of integers from 1 to 4 (both inclusive) as the number of OFDM symbols (part of one OFDM symbol) composing one slot.

The above description is given as an example, and when the maximum supported value of “the number of OFDM symbols (part of one OFDM symbol) composing one slot” in the “mode of performing LBT” is X and the maximum supported value of “the number of OFDM symbols (part of one OFDM symbol) composing one slot” in the “mode of not performing LBT” is Y, for example, it is also suitable to configure that X is greater than Y (X>Y). Note that X and Y are integers greater than 1.

The above manner produces an effect that an NR apparatus is less likely to cause interference to another apparatus when operating in the “mode of not performing LBT” and transmitting a modulation signal.

Note that the above effect can be obtained when a modulation signal is transmitted, regardless of whether “the NR apparatus performs FH or not” in an operation in the “mode of performing LBT” or in an operation in the “mode of not performing LBT”, but a greater effect is possibly expected with FH.

Although FIGS. 19A, 19C, 19D, 19E, 19F, 19G, 19H, 19I, 19J, 19K, 19L, and 19M illustrate exemplary arrangement of slots that transmit data on the frequency and time axes, a signal other than the slots, e.g., a reference signal (RS) such as a demodulation reference signal (DMRS) and a phase tracking reference signal (PTRS), may be present in a modulation signal to be transmitted. For example, RS such as DMRS and PTRS may be present at any of the times in the frequency where a slot is present.

In addition, to indicate information on the frequencies where slots that transmit data are present (information on frequency hopping) and information on FH (the number of OFDM symbols composing a slot, the time at which the slot is placed, the interval of frequency hopping, etc.) to a communication counterpart, a frame for transmitting control information including such information may be placed on the frequency and time axes in FIGS. 19A, 19C, 19D, 19E, 19F, 190, 19H, 19I, 19J, 19K, 19L, and 19M.

In FIGS. 19A, 19C, 19D, 19E, 19F, 19G, 19H, 19I, 19J, 19K, 19L, and 19M, each slot (e.g., slot 1 labeled 1650_1, slot 2 labeled 1650_2, slot 3 labeled 1650_3, and so forth) may be composed of a plurality of slots. To be more specific, "slot 1 labeled 1650_1" in FIGS. 19A, 19C, 19D, 19E, 19F, 19G, 19H, 19I, 19J, 19K, 19L, and 19M, for example, may be composed of a plurality of slots. In addition, the plurality of slots may be transmitted in the same frequency at the same time using a plurality of antennas, for example. That is, each slot in FIGS. 19A, 19C, 19D, 19E, 19F, 19G, 19H, 19I, 19J, 19K, 19L, and 19M may be transmitted using multiple input multiple output (MIMO).

A description will be given with reference to FIG. 19A, by way of example. It is assumed that slot 1 labeled 1650_1 is composed of a plurality of slots. In this case, the plurality of slots are present at time 1 in the frequency where slot 1 labeled 1650_1 is placed in FIG. 19A, and are transmitted using a plurality of antennas, for example.

Likewise, it is assumed that slot i labeled **1650_*i* is composed of a plurality of slots in FIG. 19A. In this case, the plurality of slots are transmitted at time i in the frequency where slot i labeled 1650_*i* is placed in FIG. 19**A using a plurality of antennas, for example. Note that i is an integer equal to or greater than 1.

Note that this applies to FIGS. 19C, 19D, 19E, 19F, 19G, 19H, 19I, 19J, 19K, 19L, and 19M as well.

Although FIGS. 20A, 20B, 20C, 20D, 20E, 20F, 20G, 20H, 20I, 20J, 20K, and 20L illustrate exemplary arrangement of OFDM symbols (parts of OFDM symbols) that transmit data on the frequency and time axes, a signal other than the OFDM symbols (parts of OFDM symbols), e.g., RS such as DMRS and PTRS, may be present in a modulation signal to be transmitted. For example, RS such as DMRS and PTRS may be present at any of the times in the frequency where an OFDM symbol (part of OFDM symbol) is present.

In addition, to indicate information on the frequencies where OFDM symbols (parts of OFDM symbols) that transmit data are present (information on frequency hopping) and information on FH (the number of OFDM symbols composing a slot, the time at which the slot is placed, the interval of frequency hopping, etc.) to a communication counterpart, a frame for transmitting control information including such information may be placed on the frequency and time axes in FIGS. 20A, 20B, 20C, 20D, 20E, 20F, 20G, 20H, 20I, 20J, 20K, and 20L.

In FIGS. 20A, 20B, 20C, 20D, 20E, 20F, 20G, 20H, 20I, 20J, 20K, and 20L, each OFDM symbol (part of OFDM symbol), e.g., OFDM symbol (part of OFDM symbol) I labeled 1750_1, OFDM symbol (part of OFDM symbol) 2 labeled 1750_2, OFDM symbol (part of OFDM symbol) 3 labeled 1750_3, and so forth, may be composed of a plurality of OFDM symbols (parts of OFDM symbols). To be more specific, "OFDM symbol (part of OFDM symbol) 1 labeled 1750_1" in FIGS. 20A, 20B, 20C, 20D, 20E, 20F, 20G, 20H, 20I, 20J, 20K, and 20L, for example, may be composed of a plurality of OFDM symbols (parts of OFDM symbols). In addition, the plurality of OFDM symbols (parts of OFDM symbols) may be transmitted in the same frequency at the same time using a plurality of antennas, for example. That is, each OFDM symbol (part of OFDM symbol) in FIGS. 20A, 20B, 20C, 20D, 20E, 20F, 20G, 20H, 20I, 20J, 20K, and 20L may be transmitted using MIMO.

A description will be given with reference to FIG. 20A, by way of example. It is assumed that OFDM symbol (part of OFDM symbol) 1 labeled 1750_1 is composed of a plurality of slots. In this case, the plurality of OFDM symbols (parts of OFDM symbols) are placed at time 1 in the frequency where OFDM symbol (part of OFDM symbol) 1 labeled 1750_1 is placed in FIG. 20A, and are transmitted using a plurality of antennas, for example.

Likewise, OFDM symbol (part of OFDM symbol) i labeled **1750_*i* in FIG. 20A may be composed of OFDM symbols (parts of OFDM symbols). In this case, the plurality of OFDM symbols (parts of OFDM symbols) are placed at time i in the frequency where OFDM symbol (part of OFDM symbol) i labeled 1750_*i* is placed in FIG. 20**A, and are transmitted using a plurality of antennas, for example. Note that i is an integer equal to or greater than 1.

Note that this applies to FIGS. 20B, 20C, 20D, 20E, 20F, 20G, 20H, 20I, 20J, 20K, and 20L as well.

Transmitting a modulation signal by an NR apparatus in the above manner produces an effect that interference to another apparatus is less likely to be caused.

Note that a frequency diversity effect can be obtained by introducing FH. This produces an effect of improving data reception quality, for example.

Not only gNB performs transmission of a modulation signal by FH exemplified in FIGS. 19A, 19C, 19D, 19E, 19F, 19G, 19H, 19I, 19J, 19K, 19L, 19M, 20A, 20B, 20C, 20D, 20E, 20F, 20G, 20H, 20I, 20J, 20K, and 20L. NR-UE, a repeater, a transmission (Tx)/reception (Rx) point (TRP), and an apparatus or system including a communication apparatus may perform transmission of a modulation signal by FH exemplified in FIGS. 19A, 19C, 19D, 19E, 19F, 19G, 19H, 19I, 19J, 19K, 19L, 19M, 20A, 20B, 20C, 20D, 20E, 20F, 20G. 20H, 20I, 20J, 20K, and 20L.

A configuration of IEEE 802.11ad and/or IEEE 802.11ay channels composing "frequency band 1610 used by an NR apparatus" is not limited to those in FIGS. 19A, 19C, 19D, 19E, 19F, 19G, 19H, 19I, 19J, 19K. 19L, 19M, 20A, 20B, 20C, 20D, 20E, 20F, 20G, 20H, 20I, 20J, 20K, and 20L. The same as described above can be implemented and the same effects can be obtained as long as "frequency band 1610 used by an NR apparatus" includes a plurality of "all or part of IEEE 802.11ad and/or IEEE 802.11ay channels".

The NR apparatuses such as, e.g., gNB, NR-UE, repeater, TRP, and a communication apparatus may support two or more of the communication methods (frames) in "FIGS. 16A, 16C, 16D, 16E, 16F, 16G, 16H, and 16I", "FIGS. 17A, 17B, 17C, 17D, 17E, 17F, 17G, and 17H", "FIGS. 19A, 19C, 19D, 19E, 19F, 19G, 19H, 19I, 19J, 19K, 19L, 19M, 20A, 20B, 20C, 20D, 20E, 20F, 20G, 20H, 20I, 20J, 20K, and 20L", and may select at least one of the two or more communication methods (frames) to generate and transmit a modulation signal. Note that the NR apparatuses may generate and transmit the modulation signal using a plurality of communication methods (frames) of the two or more communication methods (frames).

In addition, the NR apparatuses such as, e.g., gNB. NR-UE, repeater, TRP, and a communication apparatus may support "one, two, three, or more" of the communication methods (frames) in "FIGS. 16A, 16B, 16C, 16D, 16E, 16F, 16G, 16H, and 16I", "FIGS. 17A, 17B, 17C, 17D, 17E, 17F, 17G, and 17H", "FIGS. 19A, 19B, 19C, 19D, 19E, 19F, 19G, 19H, 19I, 19J, 19K, 19L, 19M, 20A, 20B, 20C, 20D, 20E, 20F, 20G, 20H, 20I, 20J, 20K, and 20L", and may select at least one of the "one, two, three, or more" communication methods (frames) to generate and transmit a modulation signal. Note that the NR apparatuses may generate and transmit the modulation signal using a plurality of communication methods (frames) of the "one, two, three, or more" communication methods (frames).

In this case, the NR apparatuses transmit control information including information on the communication method (frame) being used. Examples of the "information on the communication method (frame) being used" include, but not limited to, "information on a frequency being used", "information on a (sub)carrier being used", "information on a FH method (e.g., periodicity, information on a frequency being used, information on specific frequency allocation for frequency hopping, or the like)", "information on an apparatus serving as an addressee of a modulation signal", and the like.

FIGS. 1A, 1B, 1C, 9, and 10 illustrate the configuration of the NR apparatuses such as, e.g., gNB, NR-UE, repeater, TRP, and a communication apparatus. The NR apparatuses are capable of generating a plurality of transmission beams (performing a transmission directivity control) as illustrated in these figures.

Thus, the NR apparatuses are capable of performing FH as described below.

Method 1:

For example, a plurality of slots are present on the time and frequency axes in "FIGS. 16A, 16C, 16D, 16E, 16F, 16G, 16H, and 16I", and the NR apparatuses transmit the plurality of slots using an identical transmit beam.

Method 2:

For example, a plurality of slots are present on the time and frequency axes in "FIGS. 16A, 16C, 16D, 16E, 16F, 16G, 16H, and 16I", and the NR apparatuses transmit the plurality of slots using a plurality of transmit beams. That is, a set of i and j satisfying that "a transmit beam used in slot i differs from a transmit beam used in slot j" exists. Note that i #j holds true. In addition, i and j are an integer equal to or greater than 1, for example.

Method 3:

For example, a plurality of OFDM symbols (parts of OFDM symbols) are present on the time and frequency axes in "FIGS. 17A, 17B, 17C, 17D, 17E, 17F, 17G, and 17H", and the NR apparatuses transmit the plurality of OFDM symbols (parts of OFDM symbols) using an identical transmit beam.

Method 4:

For example, a plurality of OFDM symbols (parts of OFDM symbols) are present on the time and frequency axes in "FIGS. 17A, 17B, 17C, 17D, 17E, 17F, 17G, and 17H", and the NR apparatuses transmit the plurality of OFDM symbols (parts of OFDM symbols) using a plurality of transmit beams. That is, a set of i and j satisfying that "a transmit beam used in an OFDM symbol (part of an OFDM symbol) i differs from a transmit beam used in an OFDM symbol (part of an OFDM symbol) j" exists. Note that i≠j holds true. In addition, i and j are an integer equal to or greater than 1, for example.

Method 5:

For example, a plurality of slots are present on the time and frequency axes in "FIGS. 19A, 19C, 19D, 19E, 19F, 19G, 19H, 19I, 19J, 19K, 19L, and 19M", and the NR apparatuses transmit the plurality of slots using an identical transmit beam.

Method 6:

For example, a plurality of slots are present on the time and frequency axes in "FIGS. 19A, 19C, 19D, 19E, 19F, 19G, 19H, 19I, 19J, 19K, 19L, and 19M", and the NR apparatuses transmit the plurality of slots using a plurality of transmit beams. That is, a set of i and j satisfying that "a transmit beam used in slot i differs from a transmit beam used in slot j" exists. Note that i j holds true. In addition, i and j are an integer equal to or greater than 1, for example.

Method 7:

For example, a plurality of OFDM symbols (parts of OFDM symbols) are present on the time and frequency axes in "FIGS. 20A, 20B, 20C, 20D, 20E, 20F, 20G, 20H, 20I, 20I, 20K, and 20L", and the NR apparatuses transmit the plurality of OFDM symbols (parts of OFDM symbols) using an identical transmit beam.

Method 8:

For example, a plurality of OFDM symbols (parts of OFDM symbols) are present on the time and frequency axes in "FIGS. 20A, 20B, 20C, 20D, 20E, 20F, 20G, 20H, 20I, 20J, 20K, and 20L", and the NR apparatuses transmit the plurality of OFDM symbols (parts of OFDM symbols) using a plurality of transmit beams. That is, a set of i and j satisfying that "a transmit beam used in an OFDM symbol (part of an OFDM symbol) i differs from a transmit beam used in an OFDM symbol (part of an OFDM symbol) j" exists. Note that i≠j holds true. In addition, i and j are an integer equal to or greater than 1, for example.

For example, a plurality of slots are present on the time and frequency axes in "FIGS. 16A, 16B, 16C, 16D, 16E, 16F. 16G, 16H, and 16I", and slot i and slot j satisfying the following exists Note that i #j holds true. In addition, i and j are an integer equal to or greater than 1, for example.

Conditions:

Slot i and slot j include the same data. Alternatively, slot i and slot j are configured to include the same content while "differing from each other in terms of conditions, such as a compression ratio and/or a configuration". Alternatively, slot i and slot j include partly the same data.

Likewise, for example, a plurality of OFDM symbols (parts of OFDM symbols) are present on the time and frequency axes in "FIGS. 17A, 17B, 17C, 17D, 17E, 17F, 17G, and 17H", and OFDM symbol (part of an OFDM symbol) i and OFDM symbol (part of an OFDM symbol) j are present. Note that i #j holds true. In addition, i and j are an integer equal to or greater than 1, for example.

Conditions:

OFDM symbol (part of OFDM symbol) i and OFDM symbol (part of OFDM symbol) j include the same data. Alternatively, OFDM symbol (part of OFDM symbol) i and OFDM symbol (part of OFDM symbol) j are configured to include the same content while "differing from each other in terms of conditions, such as a compression ratio and/or a configuration". Alternatively, OFDM symbol (part of OFDM symbol) i and OFDM symbol (part of OFDM symbol) j include partly the same data.

In addition, for example, a plurality of slots are present on the time and frequency axes in "FIGS. 19A, 19C, 19D, 19E, 19F, 19G, 19H, 19I, 19J, 19K, 19L, and 19M", and slot i and slot j satisfying the following exists. Note that i #j holds true. In addition, i and j are an integer equal to or greater than 1, for example.

Conditions:

Slot i and slot j include the same data. Alternatively, slot i and slot j are configured to include the same content while "differing from each other in terms of conditions, such as a compression ratio and/or a configuration". Alternatively, slot i and slot j include partly the same data.

Likewise, for example, a plurality of OFDM symbols (parts of OFDM symbols) are present on the time and frequency axes in "FIGS. 20A, 20B, 20C, 20D, 20E, 20F, 20G, 20H, 20I, 20J, 20K, and 20L", and an OFDM symbol (part of an OFDM symbol) i and OFDM symbol (part of an OFDM symbol) j are present. Note that i #j holds true. In addition, i and j are an integer equal to or greater than 1, for example.

Conditions:

OFDM symbol (part of OFDM symbol) i and OFDM symbol (part of OFDM symbol) j include the same data. Alternatively, OFDM symbol (part of OFDM symbol) i and OFDM symbol (part of OFDM symbol) j are configured to include the same content while "differing from each other in terms of conditions, such as a compression ratio and/or a configuration". OFDM symbol (part of OFDM symbol) i and OFDM symbol (part of OFDM symbol) j include the same data.

The above operation produces an effect of improving data reception quality, for example.

A description will be given of an exemplary case as in FIG. 11 where gNB communicates with NR-UE through any one of the methods in "FIGS. 16A, 16C, 16D, 16E, 16F, 16G, 16H, and 16I", "FIGS. 17A, 17B, 17C, 17D, 17E, 17F, 17G, and 17H", "FIGS. 19A, 19C, 19D, 19E, 19F, 19G, 19H, 19I, 19J, 19K, 19L, 19M, 20A, 20B, 20C, 20D, 20E, 20F, 20G, 20H, 20I, 20J, 20K, and 20L".

The gNB and NR-UE have a configuration in FIG. 1A, 1B. 1C, 9 or 10, for example. The NR-UE transmits a modulation signal including "UE capability information" 2100 illustrated in FIG. 21A to the gNB.

Figure 21A:
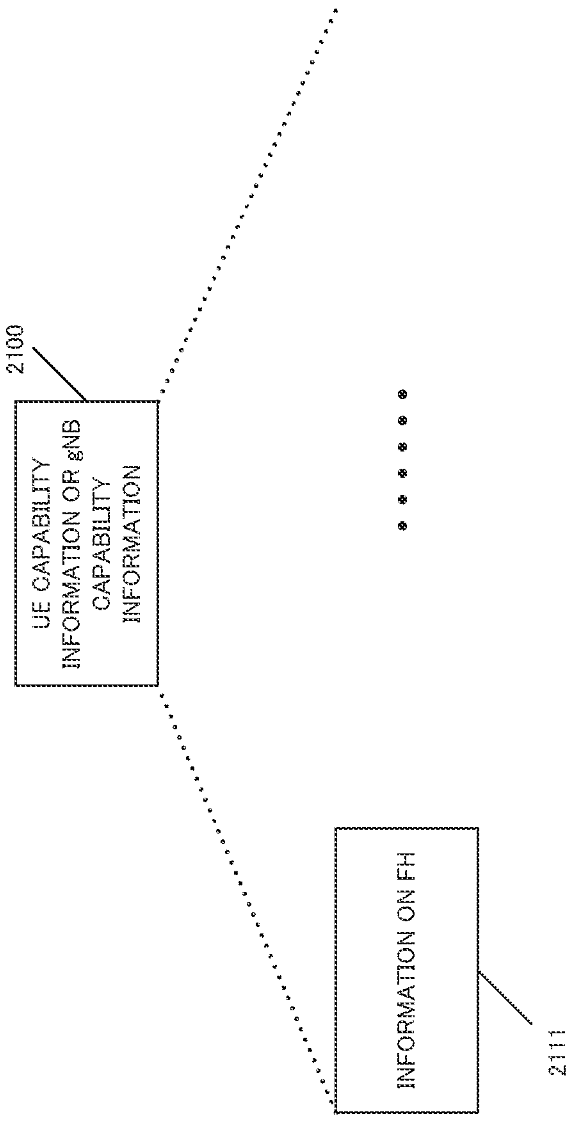
FIG. 21A illustrates an exemplary configuration of UE capability information or gNB capability information.

At this time, "UE capability information 2100" may include "information 2111 on FH" as illustrated in FIG. 21A.

The gNB transmits a modulation signal including "gNB capability information" 2100 illustrated in FIG. 21A to NR-UE.

Figure 21B:
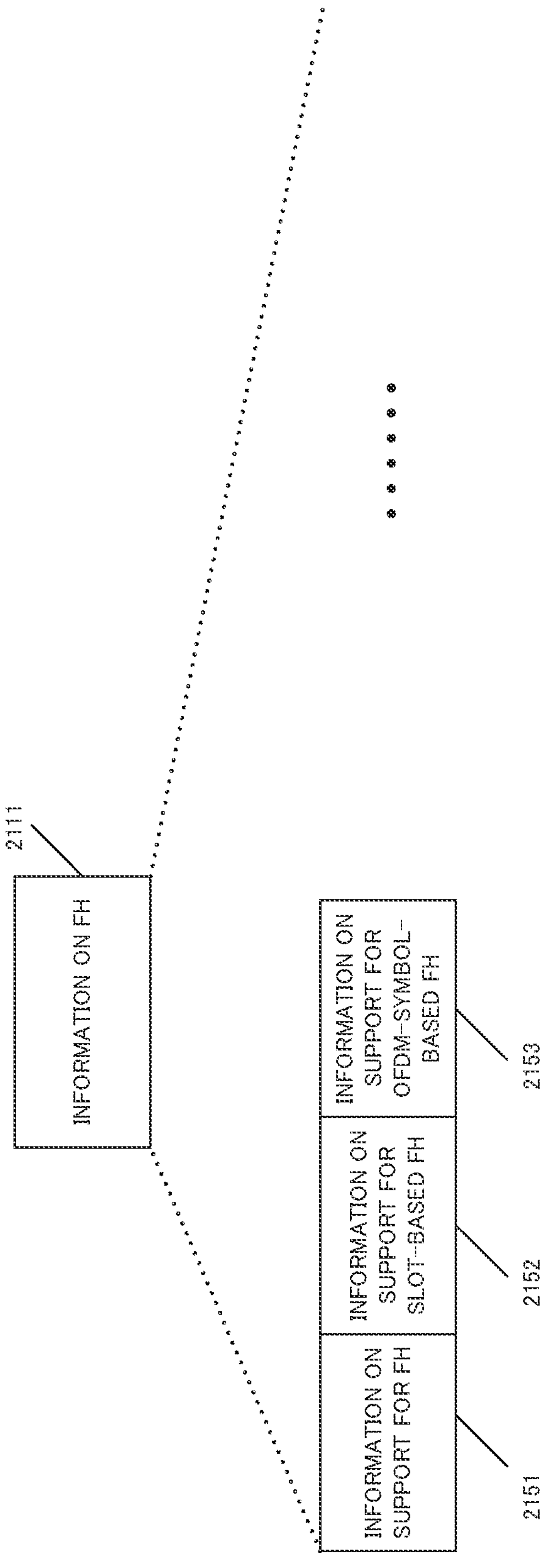
FIG. 21B illustrates an exemplary configuration of information on FH.

FIG. 21B illustrates an exemplary configuration of "information 2111 on FH" in FIG. 21A. As illustrated in FIG. 21B, "information 2111 on FH" includes at least one of "information 2151 on support for FH", "information 2152 on support for slot-based FH", and "information 2153 on support for FH on a basis of an OFDM symbol (part of the OFDM symbol)".

The "information 2151 on support for FH" is information on whether or not an NR apparatus such as "gNB, NR-UE, or the like" supports communication using FH, and a communication counterpart of the NR apparatus is capable of knowing "whether or not the NR apparatus supports communication using FH" by obtaining "information 2151 on support for FH". Accordingly, based on "information 2151 on support for FH", the communication counterpart of the NR apparatus determines whether or not to perform the communication using FH with the NR apparatus, and performs transmission or reception of the modulation signal.

Note that, when there are a plurality of NR-UEs, each of the NR-UEs may transmit "UE capability information" 2100 including "information 2151 on support for FH", and the gNB can know the state of "whether or not each terminal supports communication using F".

The "information 2152 on support for slot-based FH" is information on whether or not an NR apparatus such as "gNB, NR-UE, or the like" supports communication using slot-based FH, and a communication counterpart of the NR apparatus is capable of knowing "whether or not the NR apparatus supports communication using slot-based FH" by obtaining "information 2152 on support for slot-based FH". Accordingly, based on "information 2152 on support for slot-based FH", the communication counterpart of the NR apparatus determines whether or not to perform the communication using slot-based FH with the NR apparatus, and performs transmission or reception of the modulation signal.

Note, for example, that the slot-based FH means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M". Further, when there are a plurality of NR-UEs, each of the NR-UEs may transmit "UE capability information" 2100 including "information 2152 on support for slot-based FH", and the gNB can know the state of "whether or not each terminal supports communication using slot-based FH".

The "information 2153 on support for FH on a basis of an OFDM symbol (part of the OFDM symbol)" is information on whether or not an NR apparatus such as "gNB, NR-UE, or the like" supports communication using FH on a basis of an OFDM symbol (part of the OFDM symbol), and a communication counterpart of the NR apparatus is capable of knowing "whether or not the NR apparatus supports communication using FH on a basis of an OFDM symbol (part of the OFDM symbol)" by obtaining "information 2153 on support for FH on a basis of an OFDM symbol (part of the OFDM symbol)". Accordingly, based on "information 2153 on support for FH on a basis of an OFDM symbol (part of the OFDM symbol)", the communication counterpart of the NR apparatus determines whether or not to perform the communication using FH on a basis of an OFDM symbol (part of the OFDM symbol) with the NR apparatus, and performs transmission or reception of the modulation signal.

Note, for example, that the FH on a basis of an OFDM symbol (part of the OFDM symbol) means FH on a basis of an OFDM symbol (part of the OFDM symbol) in "FIGS. 17A, 17B, 17C, 17D, 17E, 17F, 17G, and 17H", and "FIGS. 20A, 20B, 20C, 20D, 20E, 20F, 20G, 20H, 20I, 203, 20K, and 20L". Further, when there are a plurality of NR-UEs, each of the NR-UEs may transmit "UE capability information" 2100 including "information 2153 on support for FH on a basis of an OFDM symbol (part of the OFDM symbol) ", and the gNB can know the state of "whether or not each terminal supports communication using FH on a basis of an OFDM symbol (part of the OFDM symbol)".

Figure 21C:
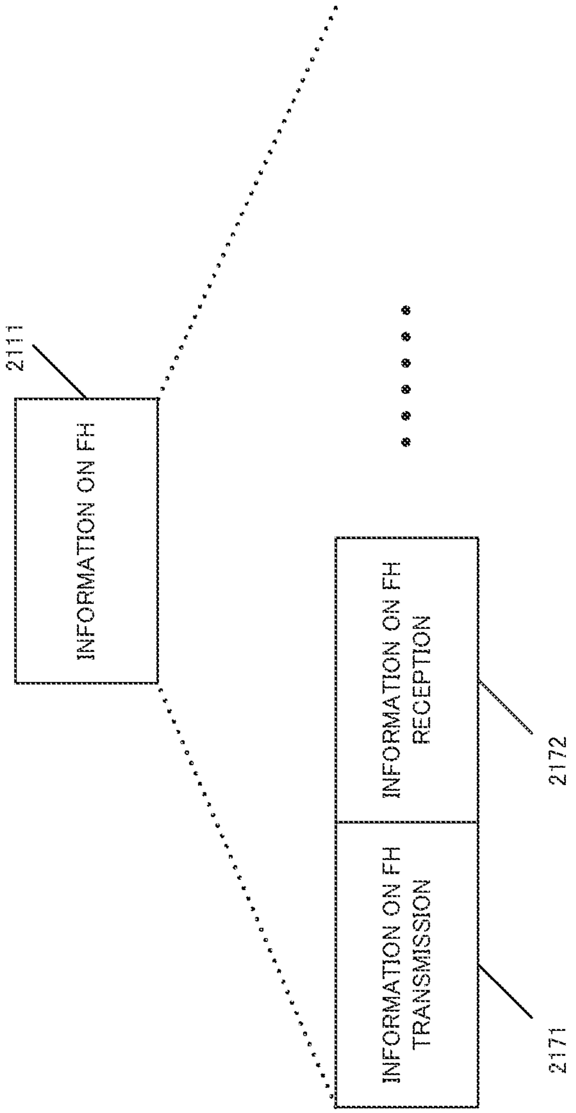
FIG. 21C illustrates an exemplary configuration of information on FH.

FIG. 21C illustrates an exemplary configuration of "information 2111 on FH" in FIG. 21A, which is different from that of FIG. 21B. As illustrated in FIG. 21C, "information 2111 on FH" includes at least one of "information 2171 on FH transmission" and "information 2172 on FH reception".

The "information 2171 on FH transmission" is information indicating the status of FH transmission of the NR apparatus such as "gNB. NR-UE, or the like", and "information 2172 on FH reception" indicates the status of FH reception of the NR apparatus such as "gNB. NR-UE, or the like".

Figure 21D:
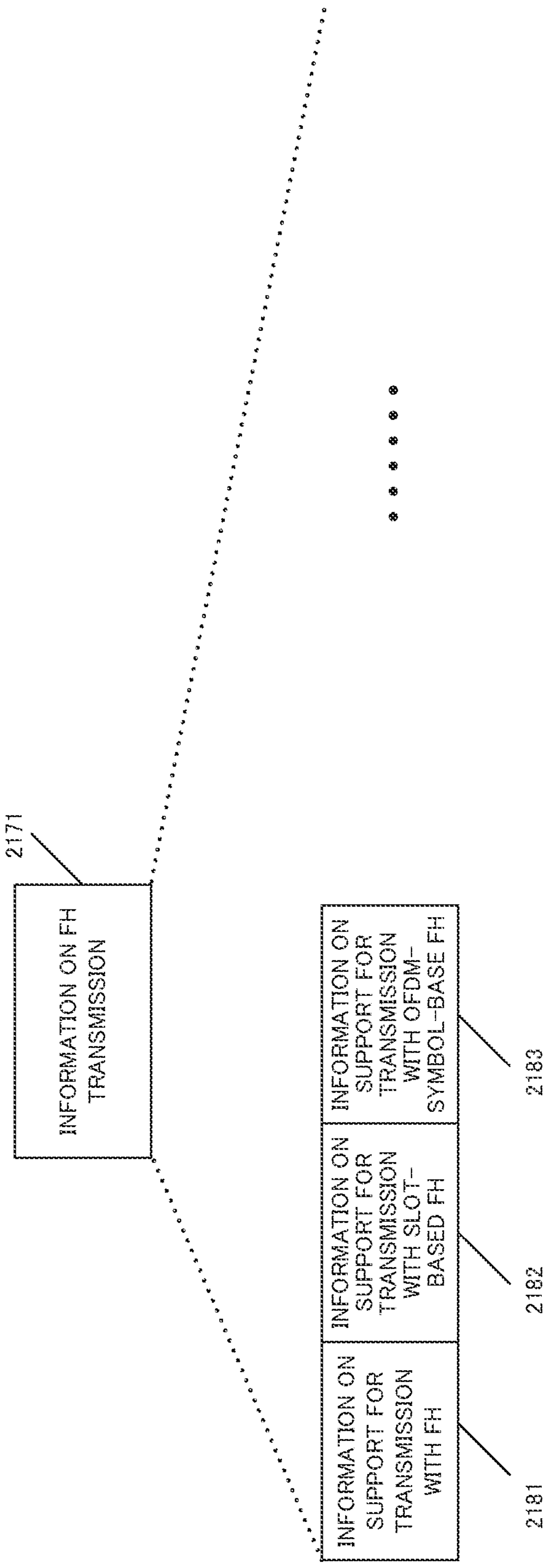
FIG. 21D illustrates an exemplary configuration of information on FH transmission.

FIG. 21D illustrates an exemplary configuration of "information 2171 on FH transmission" in FIG. 21C. As illustrated in FIG. 21D, "information 2171 on FH transmission" includes at least one of "information 2181 on support for transmission with FH" and "information 2182 on support for transmission with slot-based FH", and "information 2183 on support for transmission with FH on a basis of an OFDM symbol (part of the OFDM symbol)".

The "information 2181 on support for transmission with FH" is information on whether or not an NR apparatus such as "gNB. NR-UE, or the like" supports transmission of a modulation signal using FH, and a communication counterpart of the NR apparatus is capable of knowing "whether or not the NR apparatus supports transmission of a modulation signal using FH" by obtaining "information 2181 on support for transmission with FH". Accordingly, based on "information 2181 on support for transmission with FH", the communication counterpart of the NR apparatus determines whether or not to perform the transmission of a modulation signal using FH to the NR apparatus, and performs transmission of the modulation signal.

Note that, when there are a plurality of NR-UEs, each of the NR-UEs may transmit "UE capability information" 2100 including "information 2181 on support for transmission with FH", and the gNB can know the state of "whether or not each terminal supports transmission of the modulation signal using FH".

The "information 2182 on support for transmission with slot-based FH" is information on whether or not an NR apparatus such as "gNB, NR-UE, or the like" supports transmission of a modulation signal using slot-based FH, and a communication counterpart of the NR apparatus is capable of knowing "whether or not the NR apparatus supports transmission of a modulation signal using slot-based FH" by obtaining "information 2182 on support for transmission with slot-based FH". Accordingly, based on "information 2182 on support for transmission with slot-based FH", the communication counterpart of the NR apparatus determines whether or not to perform the transmission of a modulation signal using slot-based FH to the NR apparatus, and performs transmission of the modulation signal.

Note, for example, that the slot-based FH means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M". Further, when there are a plurality of NR-UEs, each of the NR-UEs may transmit "UE capability information" 2100 including "information 2182 on support for transmission with slot-based FH", and the gNB can know the state of "whether or not each terminal supports transmission of the modulation signal using slot-based FH".

The "information 2183 on support for transmission with FH on a basis of an OFDM symbol (part of the OFDM symbol)" is information on whether or not an NR apparatus such as "gNB, NR-UE, or the like" supports transmission of a modulation signal using FH on a basis of an OFDM symbol (part of the OFDM symbol), and a communication counterpart of the NR apparatus is capable of knowing "whether or not the NR apparatus supports transmission of the modulation signal using FH on a basis of an OFDM symbol (part of the OFDM symbol)" by obtaining "information 2183 on support for transmission with FH on a basis of an OFDM symbol (part of the OFDM symbol)". Accordingly, based on "information 2183 on support for transmission with FH on a basis of an OFDM symbol (part of the OFDM symbol)", the communication counterpart of the NR apparatus determines whether or not to perform the transmission of the modulation signal using FH on a basis of an OFDM symbol (part of the OFDM symbol) to the NR apparatus, and performs transmission of the modulation signal.

Note, for example, that the FH on a basis of an OFDM symbol (part of the OFDM symbol) means FH on a basis of an OFDM symbol (part of the OFDM symbol) in "FIGS. 17A, 17B, 17C, 17D, 17E, 17F, 17G, and 17H", and "FIGS. 20A, 20B, 20C, 20D, 20E, 20F, 20G, 20H, 20I, 203, 20K, and 20L". Further, when there are a plurality of NR-UEs, each of the NR-UEs may transmit "UE capability information" 2100 including "information 2183 on support for transmission with FH on a basis of an OFDM symbol (part of the OFDM symbol)", and the gNB can know the state of "whether or not each terminal supports transmission of a modulation signal using FH on a basis of an OFDM symbol (part of the OFDM symbol)".

Figure 21E:
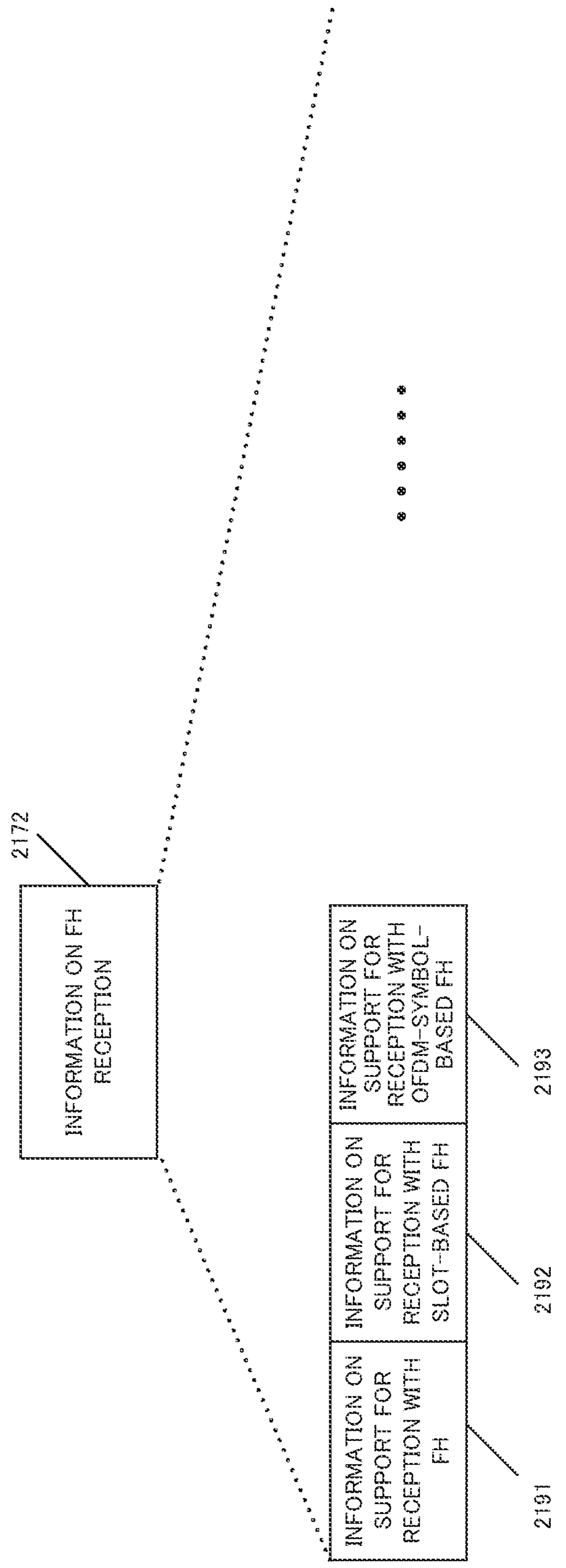
FIG. 21E illustrates an exemplary configuration of information on FH reception.

FIG. 21E illustrates an exemplary configuration of "information 2172 on FH reception" in FIG. 21C. As illustrated in FIG. 21E, "information 2172 on FH reception" includes at least one of "information 2191 on support for reception with FH" and "information 2192 on support for reception with slot-based FH", and "information 2193 on support for reception with FH on a basis of an OFDM symbol (part of the OFDM symbol)".

The "information 2191 on support for reception with FH" is information on whether or not an NR apparatus such as "gNB, NR-UE, or the like" supports reception of a modulation signal using FH, and a communication counterpart of the NR apparatus is capable of knowing "whether or not the NR apparatus supports reception of a modulation signal using FH" by obtaining "information 2191 on support for reception with FH". Accordingly, based on "information 2191 on support for reception with FH", the communication counterpart of the NR apparatus determines whether or not to perform the reception of a modulation signal using FH from the NR apparatus, and performs reception of the modulation signal.

Note that, when there are a plurality of NR-UEs, each of the NR-UEs may transmit "UE capability information" 2100 including "information 2191 on support for reception with FH", and the gNB can know the state of "whether or not each terminal supports reception of the modulation signal using FH".

The "information 2192 on support for reception with slot-based FH" is information on whether or not an NR apparatus such as "gNB, NR-UE, or the like" supports reception of a modulation signal using slot-based FH, and a communication counterpart of the NR apparatus is capable of knowing "whether or not the NR apparatus supports reception of a modulation signal using slot-based FH" by obtaining "information 2192 on support for reception with slot-based FH". Accordingly, based on "information 2192 on support for reception with slot-based FH", the communication counterpart of the NR apparatus determines whether or not to perform the reception of a modulation signal using slot-based FH from the NR apparatus, and performs reception of the modulation signal.

Note, for example, that the slot-based FH means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M", Further, when there are a plurality of NR-UEs, each of the NR-UEs may transmit "UE capability information" 2100 including "information 2192 on support for reception with slot-based FH", and the gNB can know the state of "whether or not each terminal supports reception of the modulation signal using slot-based FH".

The "information 2193 on support for reception with FH on a basis of an OFDM symbol (part of the OFDM symbol)" is information on whether or not an NR apparatus such as "gNB, NR-UE, or the like" supports reception of a modulation signal using FH on a basis of an OFDM symbol (part of the OFDM symbol), and a communication counterpart of the NR apparatus is capable of knowing "whether or not the NR apparatus supports reception of the modulation signal using FH on a basis of an OFDM symbol (part of the OFDM symbol)" by obtaining "information 2193 on support for reception with FH on a basis of an OFDM symbol (part of the OFDM symbol)". Accordingly, based on "information 2193 on support for reception with FH on a basis of an OFDM symbol (part of the OFDM symbol)", the communication counterpart of the NR apparatus determines whether or not to perform the reception of the modulation signal using FH on a basis of an OFDM symbol (part of the OFDM symbol) from the NR apparatus, and performs transmission or reception of the modulation signal.

Note, for example, that the FH on a basis of an OFDM symbol (part of the OFDM symbol) means FH on a basis of an OFDM symbol (part of the OFDM symbol) in "FIGS. 17A, 17B, 17C, 17D, 17E, 17F, 17G, and 17H", and "FIGS. 20A, 20B, 20C, 20D, 20E, 20F, 20G, 20H, 20I, 20J, 20K, and 20L". Further, when there are a plurality of NR-UEs, each of the NR-UEs may transmit "UE capability information" 2100 including "information 2193 on support for reception with FH on a basis of an OFDM symbol (part of the OFDM symbol)", and the gNB can know the state of "whether or not each terminal supports reception of a modulation signal using FH on a basis of an OFDM symbol (part of the OFDM symbol)".

The above operation allows the NR apparatus and the communication counterpart to appropriately perform communication using FH with each other and to obtain an effect of improving data reception quality by the communication using FH.

Slots in FIGS. 16A, 16B, 16C, 16D, 16E, 16F, 16G, 16H, and 16I" and "FIGS. 19A, 19C, 19D, 19E, 19F, 19G, 19H, 19I, 19J, 19K, 19L, and 19M" may, for example, belong to any of a paging channel (PCH), broadcast channel (BCH), downlink shared channel (DL-SCH), uplink shared channel (UL-SCH), broadcast control channel (BCCH), Paging control channel (PCCH), common control channel (CCCH), common search space, physical broadcast channel (PBCH), physical downlink control channel (PDCCH), physical downlink shared channel (PDSCH), physical uplink control channel (PUCCH), physical uplink shared channel (PUSCH), and the like. Note that the present disclosure is not limited to this.

Note that the OFDM symbols (parts of the OFDM symbols) in "FIGS. 17A, 17B, 17C, 17D, 17E, 17F, 17G, and 17H", and "FIGS. 20A, 20B, 20C, 20D, 20E, 20F, 20G, 20H, 20I, 20J, 20K, and 20L" may, for example, belong to any of the PCH, BCH, DL-SCH, UL-SCH, BCCH, PCCH, CCCH, common search space, PBCH, PDCCH, PDSCH, PUCCH, PUSCH, and the like. Note that the present disclosure is not limited to this.

Although the above description is based on the cases of OFDM, by way of example, the present disclosure is not limited to this and the same can be implemented by any multi-carrier systems.

By way of example, the same can also be implemented by a multi-carrier system in which a plurality of signals (carriers) of a single carrier system are arranged in a frequency axis direction. In this case, the "OFDM symbol (part of the OFDM symbol)" used in the above description may be considered as a symbol in implementation.

Examples of the single carrier system include "Discrete Fourier Transform (DFT)-Spread-Orthogonal Frequency Division Multiplexing (OFDM)" (DFT-S-OFDM), "Trajectory Constrained DFT-Spread OFDM", "Constrained DFT-Spread OFDM" (Constrained DFT-S OFDM), "OFDM based Single Carrier (SC)", "Single Carrier (SC)-Frequency Division Multiple Access (FDMA)", "Guard interval DFT-Spread OFDM", "time-domain implementation single carrier system (e.g., Single Carrier (SC)-QAM)", and the like.

A description will be given of another exemplary case as in FIG. 11 where gNB communicates with NR-UE through any one of the methods in "FIGS. 16A, 16C, 16D, 16E, 16F, 16G, 16H, and 16I", "FIGS. 17A, 17B, 17C, 17D, 17E, 17F. 17G, and 17H", "FIGS. 19A, 19C, 19D, 19E, 19F, 19G, 19H, 19I, 19J, 19K, 19L, 19M, 20A, 20B, 20C, 20D, 20E, 20F, 20G, 20H, 20I, 20J, 20K, and 20L".

The gNB and NR-UE have a configuration in FIG. 1A, 1B, 1C, 9 or 10, for example. The NR-UE transmits a modulation signal including "UE capability information 2100" illustrated in FIG. 21A to the gNB.

At this time. "UE capability information 2100" may include "information 2111 on FH" as illustrated in FIG. 21A.

The gNB transmits a modulation signal including "gNB capability information" 2100 illustrated in FIG. 21A to NR-UE.

Figure 22A:
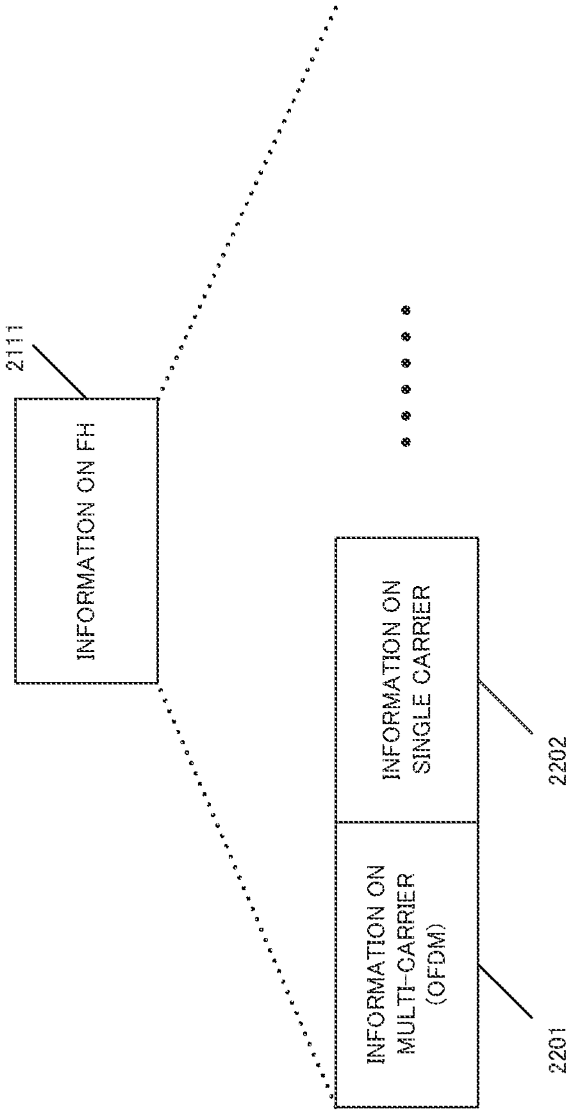
FIG. 22A illustrates an exemplary configuration of information on FH.

FIG. 22A illustrates an exemplary configuration of "information 2111 on FH" in FIG. 21A. As illustrated in FIG. 22A, "information 2111 on FH" includes at least one of "information 2201 on a multi-carrier (e.g., OFDM)" and "information 2202 on single carrier". Note that "information 2201 on a multi-carrier (e.g., OFDM)" and "information 2202 on single carrier" will be described below with reference to FIGS. 22B, 22C, 22D, 22E, 22F, and 22G.

Figure 22B:
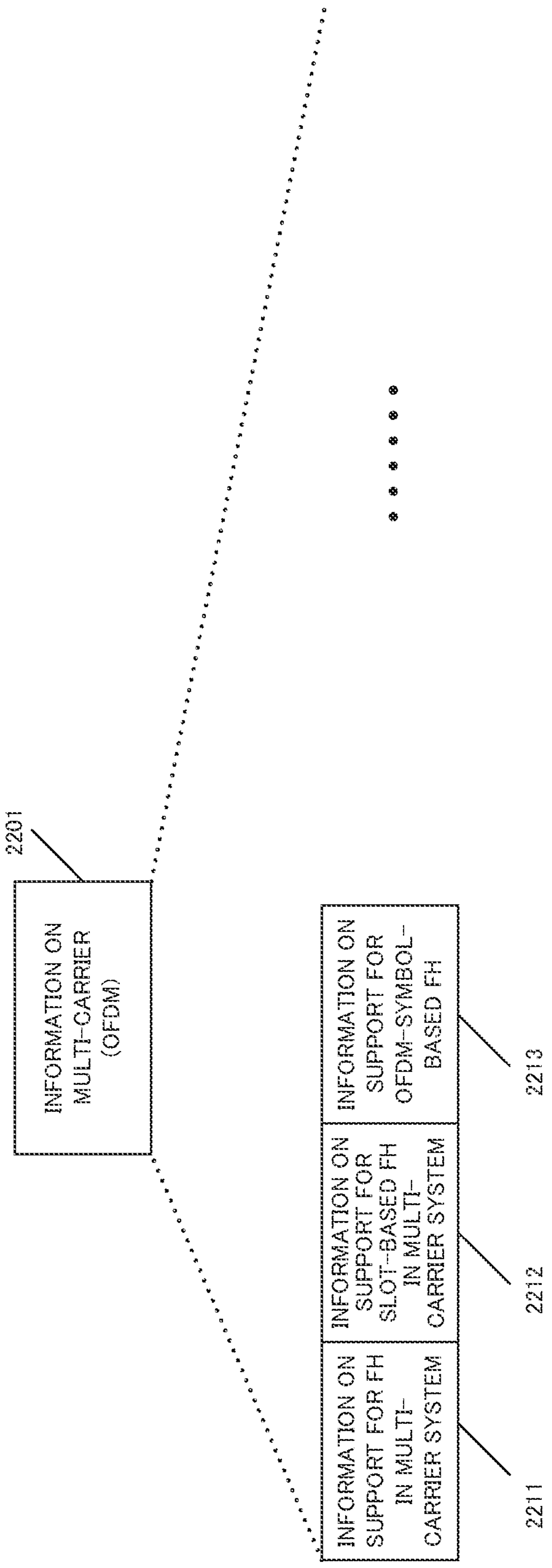
FIG. 22B illustrates an exemplary configuration of information on multi-carrier (OFDM)

FIG. 22B illustrates an exemplary configuration of "information 2201 on a multi-carrier (e.g., OFDM)". The "information 2201 on a multi-carrier (e.g., OFDM)" includes at least one of "information 2211 on support for FH in a multi-carrier system", "information 2212 on support for slot-based FH in a multi-carrier system (OFDM)", and "information 2213 on support for FH on a basis of an OFDM symbol (part of the OFDM symbol)".

The "information 2211 on support for FH in a multi-carrier system" is information on whether or not an NR apparatus such as "gNB, NR-UE, or the like" supports communication using FH in a multi-carrier system, and a communication counterpart of the NR apparatus is capable of knowing "whether or not the NR apparatus supports communication using FH in the multi-carrier system" by obtaining "information 2211 on support for FH in a multi-carrier system". Accordingly, based on "information 2211 on support for FH in a multi-carrier system", the communication counterpart of the NR apparatus determines whether or not to perform the communication using FH in the multi-carrier system with the NR apparatus, and performs transmission or reception of the modulation signal.

Note that, when there are a plurality of NR-UEs, each of the NR-UEs may transmit "UE capability information" 2100 including "information 2211 on support for FH in a multi-carrier system", and the gNB can know the state of "whether or not each terminal supports communication using FH in the multi-carrier system".

The "information 2212 on support for slot-based FH in a multi-carrier system" is information on whether or not an NR apparatus such as "gNB, NR-UE, or the like" supports communication using slot-based FH in a multi-carrier system, and a communication counterpart of the NR apparatus is capable of knowing "whether or not the NR apparatus supports communication using slot-based FH in the multi-carrier system" by obtaining "information 2212 on support for slot-based FH in a multi-carrier system". Accordingly, based on "information 2212 on support for slot-based FH in a multi-carrier system", the communication counterpart of the NR apparatus determines whether or not to perform the communication using slot-based FH in the multi-carrier system with the NR apparatus, and performs transmission or reception of the modulation signal.

Note, for example, that the slot-based FH in the multi-carrier system means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M".

Note that, when there are a plurality of NR-UEs, each of the NR-UEs may transmit "UE capability information" 2100 including "information 2212 on support for slot-based FH in a multi-carrier system", and the gNB can know the state of "whether or not each terminal supports communication using slot-based FH in the multi-carrier system".

The "information 2213 on support for FH on a basis of an OFDM symbol (part of the OFDM symbol)" is information on whether or not an NR apparatus such as "gNB, NR-UE, or the like" supports communication using FH on a basis of an OFDM symbol (part of the OFDM symbol), and a communication counterpart of the NR apparatus is capable of knowing "whether or not the NR apparatus supports communication using FH on a basis of an OFDM symbol (part of the OFDM symbol)" by obtaining "information 2213 on support for FH on a basis of an OFDM symbol (part of the OFDM symbol)". Accordingly, based on "information 2213 on support for FH on a basis of an OFDM symbol (part of the OFDM symbol)", the communication counterpart of the NR apparatus determines whether or not to perform the communication using FH on a basis of an OFDM symbol (part of the OFDM symbol) with the NR apparatus, and performs transmission or reception of the modulation signal.

Note, for example, that the FH on a basis of an OFDM symbol (part of the OFDM symbol) means FH on a basis of an OFDM symbol (part of the OFDM symbol) in "FIGS. 17A, 17B, 17C, 17D, 17E, 17F, 17G, and 17H", and "FIGS. 20A, 20B, 20C, 20D, 20E, 20F, 20G, 20H, 20I, 20J, 20K, and 20L". Further, when there are a plurality of NR-UEs, each of the NR-UEs may transmit "UE capability information" 2100 including "information 2213 on support for FH on a basis of an OFDM symbol (part of the OFDM symbol) ", and the gNB can know the state of "whether or not each terminal supports communication using FH on a basis of an OFDM symbol (part of the OFDM symbol)".

Figure 22C:
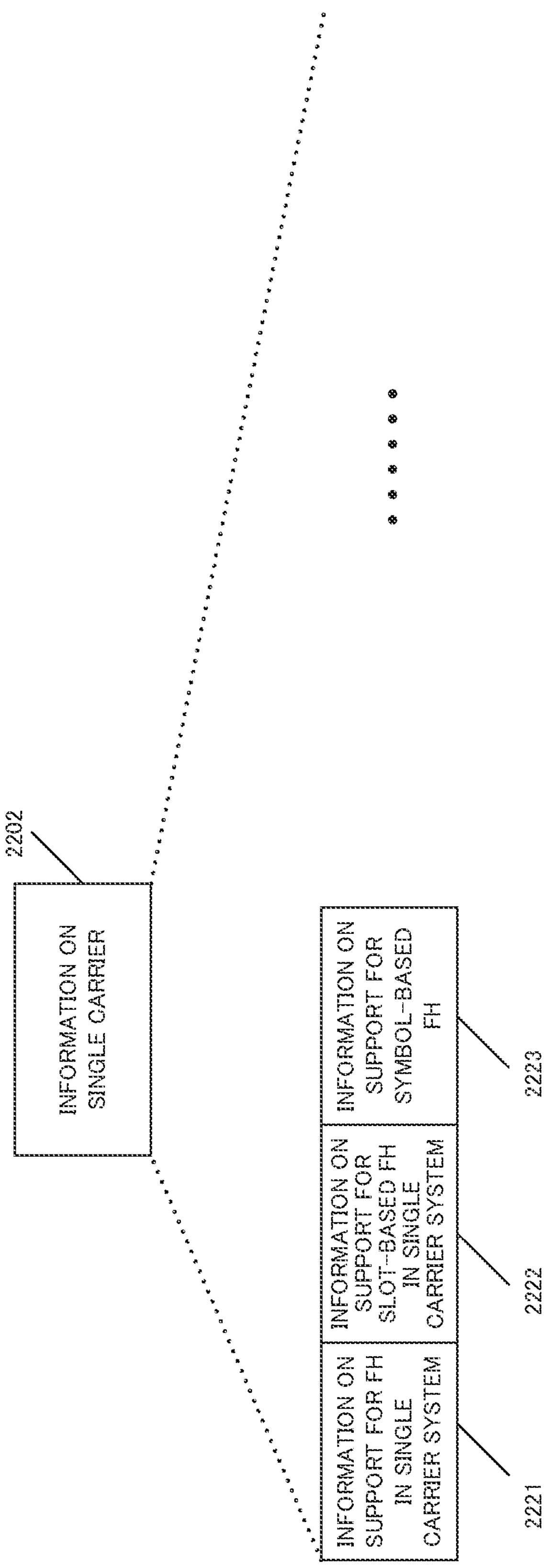
FIG. 22C illustrates an exemplary configuration of information on a single carrier.

FIG. 22C illustrates an exemplary configuration of "information 2202 on a single carrier". The "information 2202 on a single carrier" includes at least one of "information 2221 on support for FH in a single carrier system", "information 2222 on support for slot-based FH in a single carrier system", and "information 2223 on support for symbol-based FH".

Note that, as already described, FH using the single carrier system is a scheme for performing frequency hopping by arranging a plurality of modulation signals in single carrier systems in a frequency axis direction. Thus, while designation of "FH using the single carrier system" is used, the present disclosure is not limited to this designation, and the designation may also be "FH achieved by arranging a plurality of signals of a single carrier system on the frequency axis" or "FH in a multi-carrier system in which a plurality of signals of a single carrier system are arranged on the frequency axis", for example.

The "information 2221 on support for FH in a single carrier system" is information on whether or not an NR apparatus such as "gNB, NR-UE, or the like" supports communication using FH in a single carrier system, and a communication counterpart of the NR apparatus is capable of knowing "whether or not the NR apparatus supports communication using FH in the single carrier system" by obtaining "information 2221 on support for FH in a single carrier system". Accordingly, based on "information 2221 on support for FH in a single carrier system", the communication counterpart of the NR apparatus determines whether or not to perform the communication using FH in the single carrier with the NR apparatus, and performs transmission or reception of the modulation signal. Note that, when there are a plurality of NR-UEs, each of the NR-UEs may transmit "UE capability information" 2100 including "information 2221 on support for FH in a single carrier system", and the gNB can know the state of "whether or not each terminal supports communication using FH in the single carrier system".

The "information 2222 on support for slot-based FH in a single carrier system" is information on whether or not an NR apparatus such as "gNB, NR-UE, or the like" supports communication using slot-based FH in a single carrier system, and a communication counterpart of the NR apparatus is capable of knowing "whether or not the NR apparatus supports communication using slot-based FH in the single carrier system" by obtaining "information 2222 on support for slot-based FH in a single carrier system". Accordingly, based on "information 2222 on support for slot-based FH in a single carrier system", the communication counterpart of the NR apparatus determines whether or not to perform the communication using slot-based FH in the single carrier with the NR apparatus, and performs transmission or reception of the modulation signal.

Note, for example, that the slot-based FH in the single carrier system means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M". Note that, when there are a plurality of NR-UEs, each of the NR-UEs may transmit "UE capability information" 2100 including "information 2222 on support for slot-based FH in a single carrier system", and the gNB can know the state of "whether or not each terminal supports communication using slot-based FH in the single carrier system".

The "information 2223 on support for symbol-based FH" is information on whether or not an NR apparatus such as "gNB, NR-UE, or the like" supports communication using symbol-based FH, and a communication counterpart of the NR apparatus is capable of knowing "whether or not the NR apparatus supports communication using symbol-based FH" by obtaining "information 2223 on support for symbol-based FH". Accordingly, based on "information 2223 on support for symbol-based FH", the communication counterpart of the NR apparatus determines whether or not to perform the communication using symbol-based FH with the NR apparatus, and performs transmission or reception of the modulation signal.

Note that the symbol-based FH means FH based on symbols, for example, in "FIGS. 17A, 17B, 17C, 17D, 17E, 17F, 17G, and 17H" and "FIGS. 20A, 20B, 20C, 20D, 20E, 20F, 20G, 20H, 20I, 20J, 20K, and 20L". Further, when there are a plurality of NR-UEs, each of the NR-UEs may transmit "UE capability information" 2100 including "information 2223 on support for symbol-based FH", and the gNB can know the state of "whether or not each terminal supports communication using symbol-based FH".

Figure 22D:
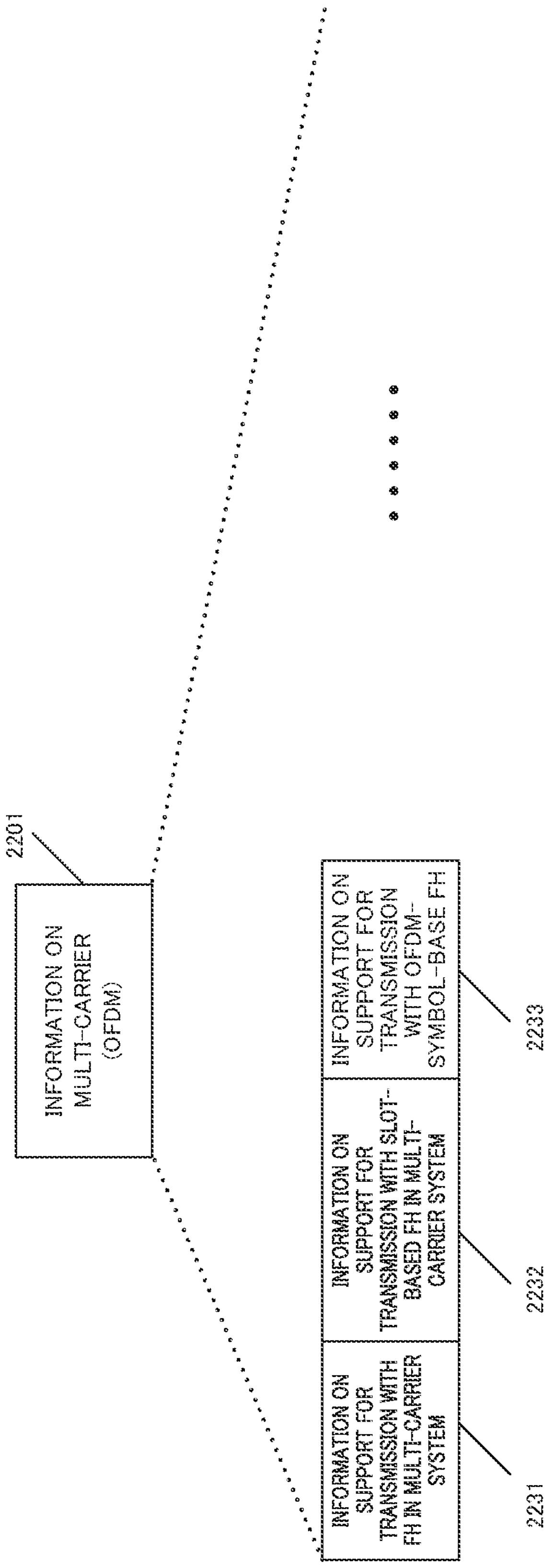
FIG. 22D illustrates an exemplary configuration of information on multi-carrier (OFDM)

FIG. 22D illustrates an exemplary configuration of "information 2201 on a multi-carrier (e.g., OFDM)". The "information 2201 on a multi-carrier (e.g., OFDM)" includes at least one of "information 2231 on support for transmission with FH in a multi-carrier system", "information 2232 on support for transmission with slot-based FH in a multi-carrier system", and "information 2233 on support for transmission with FH on a basis of an OFDM symbol (part of the OFDM symbol)".

The "information 2231 on support for transmission with FH in a multi-carrier system" is information on whether or not an NR apparatus such as "gNB, NR-UE, or the like" supports transmission of a modulation signal using FH in a multi-carrier system, and a communication counterpart of the NR apparatus is capable of knowing "whether or not the NR apparatus supports transmission of the modulation signal using FH in the multi-carrier system" by obtaining "information 2231 on support for transmission with FH in a multi-carrier system". Accordingly, based on "information 2231 on support for transmission with FH in a multi-carrier system", the communication counterpart of the NR apparatus determines whether or not to perform the transmission of the modulation signal using FH in the multi-carrier system to the NR apparatus, and performs transmission of the modulation signal.

Note that, when there are a plurality of NR-UEs, each of the NR-UEs may transmit "UE capability information" 2100 including "information 2231 on support for transmission with FH in a multi-carrier system", and the gNB can know the state of "whether or not each terminal supports transmission of the modulation signal using FH in the multi-carrier system".

The "information 2232 on support for transmission with slot-based FH in a multi-carrier system" is information on whether or not an NR apparatus such as "gNB, NR-UE, or the like" supports transmission of the modulation signal using slot-based FH in a multi-carrier system, and a communication counterpart of the NR apparatus is capable of knowing "whether or not the NR apparatus supports transmission of the modulation signal using slot-based FH in the multi-carrier system" by obtaining "information 2232 on support for transmission with slot-based FH in a multi-carrier system". Accordingly, based on "information 2232 on support for transmission with slot-based FH in a multi-carrier system", the communication counterpart of the NR apparatus determines whether or not to perform the transmission of the modulation signal using slot-based FH in the multi-carrier system to the NR apparatus, and performs transmission of the modulation signal.

Note, for example, that the slot-based FH in the multi-carrier system means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M". Note that, when there are a plurality of NR-UEs, each of the NR-UEs may transmit "UE capability information" 2100 including "information 2232 on support for transmission with slot-based FH in a multi-carrier system", and the gNB can know the state of "whether or not each terminal supports transmission of the modulation signal using slot-based FH in the multi-carrier system".

The "information 2233 on support for transmission with FH on a basis of an OFDM symbol (part of the OFDM symbol)" is information on whether or not an NR apparatus such as "gNB, NR-UE, or the like" supports transmission of a modulation signal using FH on a basis of an OFDM symbol (part of the OFDM symbol), and a communication counterpart of the NR apparatus is capable of knowing "whether or not the NR apparatus supports transmission of the modulation signal using FH on a basis of an OFDM symbol (part of the OFDM symbol)" by obtaining "information 2233 on support for transmission with FH on a basis of an OFDM symbol (part of the OFDM symbol)". Accordingly, based on "information 2233 on support for transmission with FH on a basis of an OFDM symbol (part of the OFDM symbol)", the communication counterpart of the NR apparatus determines whether or not to perform the transmission of the modulation signal using FH on a basis of an OFDM symbol (part of the OFDM symbol) to the NR apparatus, and performs transmission of the modulation signal.

Note, for example, that the FH on a basis of an OFDM symbol (part of the OFDM symbol) means FH on a basis of an OFDM symbol (part of the OFDM symbol) in "FIGS. 17A, 17B, 17C, 17D, 17E, 17F, 17G, and 17H", and "FIGS. 20A, 20B, 20C, 20D, 20E, 20F, 20G, 20H, 20I, 20J, 20K, and 20L". Further, when there are a plurality of NR-UEs, each of the NR-UEs may transmit "UE capability information" 2100 including "information 2233 on support for transmission with FH on a basis of an OFDM symbol (part of the OFDM symbol)", and the gNB can know the state of "whether or not each terminal supports transmission of a modulation signal using FH on a basis of an OFDM symbol (part of the OFDM symbol)".

Figure 22E:
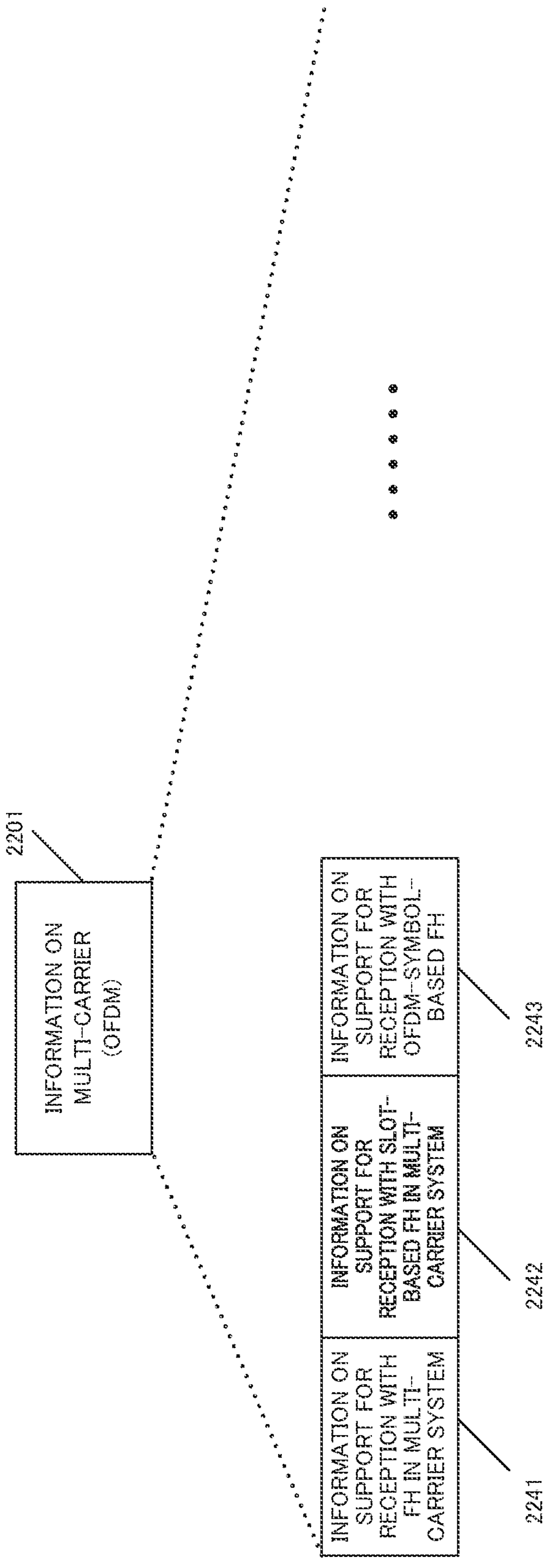
FIG. 22E illustrates an exemplary configuration of information on multi-carrier (OFDM)

FIG. 22E illustrates an exemplary configuration of "information 2201 on a multi-carrier (e.g., OFDM)". The "information 2201 on a multi-carrier (e.g., OFDM)" includes at least one of "information 2241 on support for reception with FH in a multi-carrier system", "information 2242 on support for reception with slot-based FH in a multi-carrier system", and "information 2243 on support for reception with FH on a basis of an OFDM symbol (part of the OFDM symbol)".

The "information 2241 on support for reception with FH in a multi-carrier system" is information on whether or not an NR apparatus such as "gNB, NR-UE, or the like" supports reception of a modulation signal using FH in a multi-carrier system, and a communication counterpart of the NR apparatus is capable of knowing "whether or not the NR apparatus supports reception of the modulation signal using FH in the multi-carrier system" by obtaining "information 2241 on support for reception with FH in a multi-carrier system". Accordingly, based on "information 2241 on support for reception with FH in a multi-carrier system", the communication counterpart of the NR apparatus determines whether or not to perform the reception of the modulation signal using FH in the multi-carrier system from the NR apparatus, and performs reception of the modulation signal.

Note that, when there are a plurality of NR-UEs, each of the NR-UEs may transmit "UE capability information" 2100 including "information 2241 on support for reception with FH in a multi-carrier system", and the gNB can know the state of "whether or not each terminal supports reception of the modulation signal using FH in the multi-carrier system".

The "information 2242 on support for reception with slot-based FH in a multi-carrier system" is information on whether or not an NR apparatus such as "gNB, NR-UE, or the like" supports reception of the modulation signal using slot-based FH in a multi-carrier system, and a communication counterpart of the NR apparatus is capable of knowing "whether or not the NR apparatus supports reception of the modulation signal using slot-based FH in the multi-carrier system" by obtaining "information 2242 on support for reception with slot-based FH in a multi-carrier system". Accordingly, based on "information 2242 on support for reception with slot-based FH in a multi-carrier system", the communication counterpart of the NR apparatus determines whether or not to perform the reception of the modulation signal using slot-based FH in the multi-carrier system from the NR apparatus, and performs reception of the modulation signal.

Note, for example, that the slot-based FH in the multi-carrier system means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M". Note that, when there are a plurality of NR-UEs, each of the NR-UEs may transmit "UE capability information" 2100 including "information 2242 on support for reception with slot-based FH in a multi-carrier system", and the gNB can know the state of "whether or not each terminal supports reception of the modulation signal using slot-based FH in the multi-carrier system".

The "information 2243 on support for reception with FH on a basis of an OFDM symbol (part of the OFDM symbol)" is information on whether or not an NR apparatus such as "gNB, NR-UE, or the like" supports reception of a modulation signal using FH on a basis of an OFDM symbol (part of the OFDM symbol), and a communication counterpart of the NR apparatus is capable of knowing "whether or not the NR apparatus supports reception of the modulation signal using FH on a basis of an OFDM symbol (part of the OFDM symbol)" by obtaining "information 2243 on support for reception with FH on a basis of an OFDM symbol (part of the OFDM symbol)". Accordingly, based on "information 2243 on support for reception with FH on a basis of an OFDM symbol (part of the OFDM symbol)", the communication counterpart of the NR apparatus determines whether or not to perform the reception of the modulation signal using FH on a basis of an OFDM symbol (part of the OFDM symbol) from the NR apparatus, and performs transmission or reception of the modulation signal.

Note, for example, that the FH on a basis of an OFDM symbol (part of the OFDM symbol) means FH on a basis of an OFDM symbol (part of the OFDM symbol) in "FIGS. 17A, 17B, 17C, 17D, 17E, 17F, 17G, and 17H", and "FIGS. 20A, 20B, 20C, 20D, 20E, 20F, 20G, 20H, 20I, 203, 20K, and 20L". Further, when there are a plurality of NR-UEs, each of the NR-UEs may transmit "UE capability information" 2100 including "information 2243 on support for reception with FH on a basis of an OFDM symbol (part of the OFDM symbol)", and the gNB can know the state of "whether or not each terminal supports reception of a modulation signal using FH on a basis of an OFDM symbol (part of the OFDM symbol)".

Figure 22F:
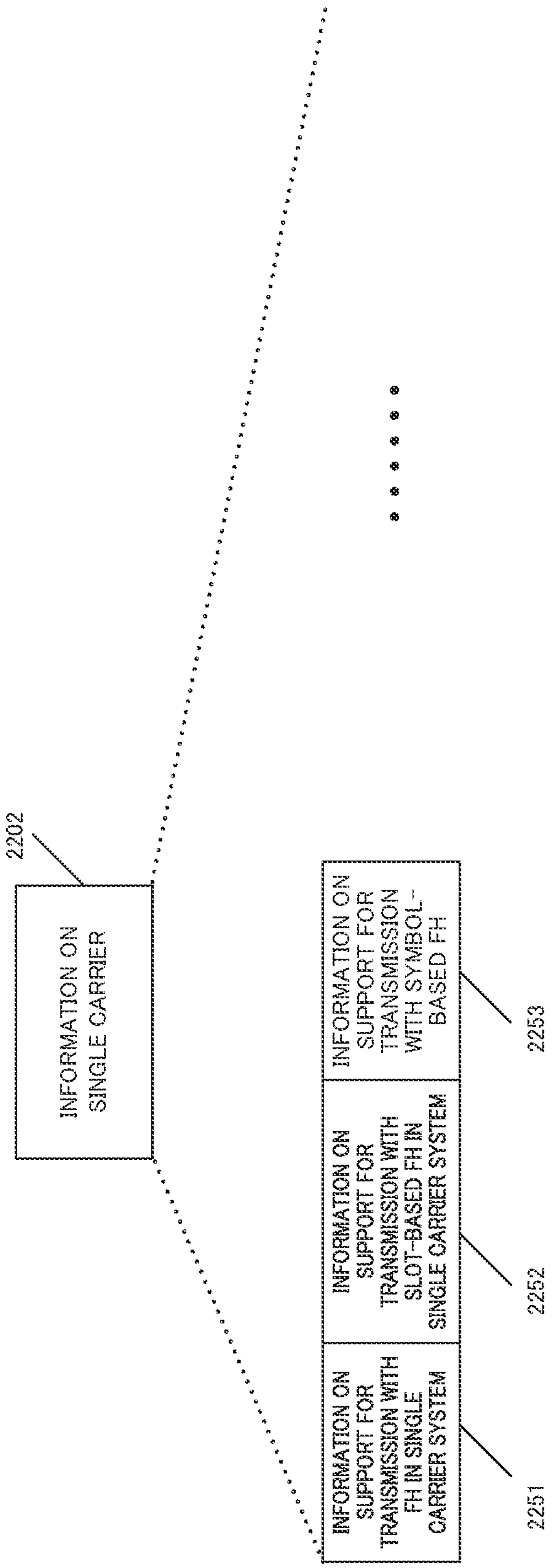
FIG. 22F illustrates an exemplary configuration of information on a single carrier.

FIG. 22F illustrates an exemplary configuration of "information 2202 on a single carrier". The "information 2202 on a single carrier" includes at least one of "information 2251 on support for transmission with FH in a single carrier system", "information 2252 on support for transmission with slot-based FH in a single carrier system", and "information 2253 on support for transmission with symbol-based FH".

Note that, as already described, FH using the single carrier system is a system for performing frequency hopping by arranging a plurality of modulation signals in single carrier systems in a frequency axis direction. Thus, while designation of "FH using the single carrier system" is used, the present disclosure is not limited to this designation, and the designation may also be "FH achieved by arranging a plurality of signals of a single carrier system on the frequency axis" or "FH in a multi-carrier system in which a plurality of signals of a single carrier system are arranged on the frequency axis", for example.

The "information 2251 on support for transmission with FH in a single carrier system" is information on whether or not an NR apparatus such as "gNB, NR-UE, or the like" supports transmission of a modulation signal using FH in a single carrier system, and a communication counterpart of the NR apparatus is capable of knowing "whether or not the NR apparatus supports transmission of the modulation signal using FH in the single carrier system" by obtaining "information 2251 on support for transmission with FH in a single carrier system". Accordingly, based on "information 2251 on support for transmission with FH in a single carrier system", the communication counterpart of the NR apparatus determines whether or not to perform the transmission of the modulation signal using FH in the single carrier system to the NR apparatus, and performs transmission of the modulation signal.

Note that, when there are a plurality of NR-UEs, each of the NR-UEs may transmit "UE capability information" 2100 including "information 2251 on support for transmission with FH in a single carrier system", and the gNB can know the state of "whether or not each terminal supports transmission of the modulation signal using FH in the single carrier system".

The "information 2252 on support for transmission with slot-based FH in a single carrier system" is information on whether or not an NR apparatus such as "gNB, NR-UE, or the like" supports transmission of the modulation signal using slot-based FH in a single carrier system, and a communication counterpart of the NR apparatus is capable of knowing "whether or not the NR apparatus supports transmission of the modulation signal using slot-based FH in the single carrier system" by obtaining "information 2252 on support for transmission with slot-based FH in a single carrier system". Accordingly, based on "information 2252 on support for transmission with slot-based FH in a single carrier system", the communication counterpart of the NR apparatus determines whether or not to perform the transmission of the modulation signal using slot-based FH in the single carrier system to the NR apparatus, and performs transmission of the modulation signal.

Note, for example, that the slot-based FH in the single carrier system means FH based on slots in "FIGS. 16A, 16C, 16D, 16E, 16F, 16G, 16H, and 16I", and "FIGS. 19A, 19C, 19D, 19E, 19F, 19G, 19H, 19I, 19J, 19K, 19L, and 19M". Note that, when there are a plurality of NR-UEs, each of the NR-UEs may transmit "UE capability information" 2100 including "information 2252 on support for transmission with slot-based FH in a single carrier system", and the gNB can know the state of "whether or not each terminal supports transmission of the modulation signal using slot-based FH in the single carrier system".

The "information 2253 on support for transmission with symbol-based FH" is information on whether or not an NR apparatus such as "gNB, NR-UE, or the like" supports transmission of a modulation signal using symbol-based FH, and a communication counterpart of the NR apparatus is capable of knowing "whether or not the NR apparatus supports transmission of a modulation signal using symbol-based FH" by obtaining "information 2253 on support for transmission with symbol-based FH". Accordingly, based on "information 2253 on support for transmission with symbol-based FH", the communication counterpart of the NR apparatus determines whether or not to perform the transmission of a modulation signal using symbol-based FH to the NR apparatus, and performs transmission of the modulation signal.

Note that the symbol-based FH means FH based on symbols, for example, in "FIGS. 17A, 17B, 17C, 17D, 17E, 17F, 17G, and 17H" and "FIGS. 20A, 20B, 20C, 20D, 20E, 20F, 20G, 20H, 20I, 20J, 20K, and 20L". Further, when there are a plurality of NR-UEs, each of the NR-UEs may transmit "UE capability information" 2100 including "information 2253 on support for transmission with symbol-based FH", and the gNB can know the state of "whether or not each terminal supports transmission of the modulation signal using symbol-based FH".

Figure 22G:
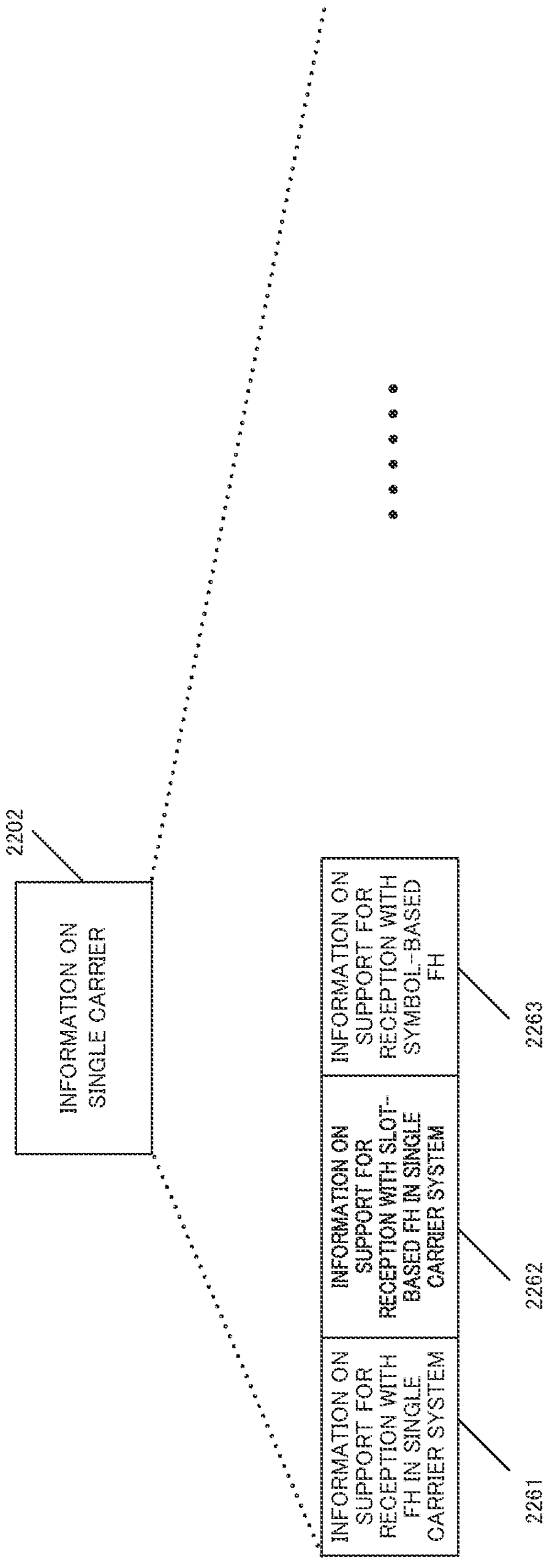
FIG. 22G illustrates an exemplary configuration of information on a single carrier.

FIG. 22G illustrates an exemplary configuration of "information 2202 on a single carrier". The "information 2202 on a single carrier" includes at least one of "information 2261 on support for reception with FH in a single carrier system", "information 2262 on support for reception with slot-based FH in a single carrier system", and "information 2263 on support for reception with symbol-based FH".

Note that, as already described, FH using the single carrier system is a system for performing frequency hopping by arranging a plurality of modulation signals in single carrier systems in a frequency axis direction. Thus, while designation of "FH using the single carrier system" is used, the present disclosure is not limited to this designation, and the designation may also be "FH achieved by arranging a plurality of signals of a single carrier system on the frequency axis" or "FH in a multi-carrier system in which a plurality of signals of a single carrier system are arranged on the frequency axis", for example.

The "information 2261 on support for reception with FH in a single carrier system" is information on whether or not an NR apparatus such as "gNB, NR-UE, or the like" supports reception of a modulation signal using FH in a single carrier system, and a communication counterpart of the NR apparatus is capable of knowing "whether or not the NR apparatus supports reception of the modulation signal using FH in the single carrier system" by obtaining "information 2261 on support for reception with FH in a single carrier system". Accordingly, based on "information 2261 on support for reception with FH in a single carrier system", the communication counterpart of the NR apparatus determines whether or not to perform the reception of the modulation signal using FH in the single carrier system to the NR apparatus, and performs reception of the modulation signal.

Note that, when there are a plurality of NR-UEs, each of the NR-UEs may transmit "UE capability information" 2100 including "information 2261 on support for reception with FH in a single carrier system", and the gNB can know the state of "whether or not each terminal supports reception of the modulation signal using FH in the single carrier system".

The "information 2262 on support for reception with slot-based FH in a single carrier system" is information on whether or not an NR apparatus such as "gNB, NR-UE, or the like" supports reception of the modulation signal using slot-based FH in a single carrier system, and a communication counterpart of the NR apparatus is capable of knowing "whether or not the NR apparatus supports reception of the modulation signal using slot-based FH in the single carrier system" by obtaining "information 2262 on support for reception with slot-based FH in a single carrier system". Accordingly, based on "information 2262 on support for reception with slot-based FH in a single carrier system", the communication counterpart of the NR apparatus determines whether or not to perform the reception of the modulation signal using slot-based FH in the single carrier system to the NR apparatus, and performs reception of the modulation signal.

Note, for example, that the slot-based FH in the single carrier system means FH based on slots in "FIGS. 16A, 16C, 16D. 16E, 16F, 16G. 16H, and 16I", and "FIGS. 19A, 19C, 19D, 19E, 19F, 19G, 19H, 19I, 19J, 19K, 19L, and 19M". Note that, when there are a plurality of NR-UEs, each of the NR-UEs may transmit "UE capability information" 2100 including "information 2262 on support for reception with slot-based FH in a single carrier system", and the gNB can know the state of "whether or not each terminal supports reception of the modulation signal using slot-based FH in the single carrier system".

The "information 2263 on support for reception with symbol-based FH" is information on whether or not an NR apparatus such as "gNB, NR-UE, or the like" supports reception of a modulation signal using symbol-based FH, and a communication counterpart of the NR apparatus is capable of knowing "whether or not the NR apparatus supports reception of a modulation signal using symbol-based FH" by obtaining "information 2263 on support for reception with symbol-based FH". Accordingly, based on "information 2263 on support for reception with symbol-based FH", the communication counterpart of the NR apparatus determines whether or not to perform the reception of a modulation signal using symbol-based FH from the NR apparatus, and performs reception of the modulation signal.

Note that the symbol-based FH means FH based on symbols, for example, in "FIGS. 17A, 17B, 17C, 17D, 17E, 17F, 17G, and 17H" and "FIGS. 20A, 20B, 20C, 20D, 20E, 20F, 20G, 20H, 20I, 20J, 20K, and 20L". Further, when there are a plurality of NR-UEs, each of the NR-UEs may transmit "UE capability information" 2100 including "information 2263 on support for reception with symbol-based FH", and the gNB can know the state of "whether or not each terminal supports reception of the modulation signal using symbol-based FH".

The above operation allows the NR apparatus and the communication counterpart to appropriately perform communication using FH with each other and to obtain an effect of improving data reception quality by the communication using FH.

Note that in the case based on FIGS. 21A, 21B, 21C, 21D, 21E, 22A, 22B, 22C, 22D, 22E, 22F, and 22G, presence of the following apparatuses as the NR apparatuses is appropriate:

- an NR apparatus not supporting transmission of a modulation signal to which FH is applied and not supporting reception of the modulation signal to which FH is applied:
- an NR apparatus only supporting transmission of a modulation signal to which FH is applied;
- an NR apparatus only supporting reception of a modulation signal to which FH is applied; and
- an NR apparatus supporting transmission of a modulation signal to which FH is applied and reception of the modulation signal to which FH is applied.

In addition, when the multi-carrier systems and single carrier systems exist, presence of the following apparatuses is appropriate as the NR apparatuses:

- an NR apparatus "not supporting transmission of a modulation signal to which FH in a multi-carrier system is applied", "not supporting reception of the modulation signal to which FH in the multi-carrier system is applied", "not supporting transmission of a modulation signal to which FH in a single carrier system is applied", and "not supporting reception of the modulation signal to which FH in the single carrier system is applied"; and
- an NR apparatus supporting one or more of "transmission of a modulation signal to which FH in a multi-carrier system is applied", "reception of the modulation signal to which FH in the multi-carrier system is applied", "transmission of a modulation signal to which FH in a single carrier system is applied", and "reception of the modulation signal to which FH in the single carrier system is applied".

Although the channels. "IEEE 802.11ad and/or IEEE 802.11ay channels", are illustrated in "FIGS. 19A, 19B, 19C, 19D, 19E, 19F, 19G, 19H, 19I, 19J, 19K, 19L, and 19M" and "FIGS. 20A, 20B, 20C, 20D, 20E, 20F, 20G, 20H, 20I, 20J, 20K, and 20L", it is possible to perform the same operation and to obtain the same effects also when "IEEE 802.11ad and/or IEEE 802.11 ay channels" are replaced with "channels of another standard".

FH methods in the present embodiment may be a frequency hopping method using a plurality of LBT subbands or a frequency hopping method using a plurality of bandwidth parts (BWPs).

A first FH method which includes a plurality of FH methods, examples of which are those in "FIGS. 16A, 16C, 16D, 16E, 16F, 16G, 16H, and 16I", "FIGS. 17A, 17B, 17C, 17D, 17E, 17F, 17G, 17H", "FIGS. 19A, 19C, 19D, 19E, 19F, 19G, 19H, 19I, 19J, 19K, 19L, and 19M", and "FIGS. 20A, 20B, 20C, 20D, 20E, 20F, 20G, 20H, 20I, 20J, 20K, and 20L" is assumed. Note that the first FH method may also be an FH method which does not include any of the FH methods in "FIGS. 16A, 16C, 16D, 16E, 16F, 16G, 16H, and 16I", "FIGS. 17A, 17B, 17C, 17D, 17E, 17F, 17G, 17H", "FIGS. 19A, 19C, 19D, 19E, 19F, 19G, 19H, 19I, 19J, 19K, 19L, and 19M", and "FIGS. 20A, 20B, 20C, 20D, 20E, 20F, 20G, 20H, 20I, 20J, 20K, and 20L".

Those FH methods included in the first FH method belong to either "FH requiring performance of LBT" or "FH not requiring performance of LBT" or to both FH.

When an NR apparatus existing in an area where LBT is mandatory performs transmission of a modulation signal with FH belonging to "FH requiring performance of LBT", the NR apparatus performs LBT before transmission of the modulation signal with FH to determine whether or not to transmit the modulation signal with FH.

When an NR apparatus existing in an area where LBT is mandatory performs transmission of a modulation signal with FH belonging to "FH not requiring performance of LBT", the NR apparatus does not need to perform LBT before transmission of the modulation signal with FH.

When an NR apparatus existing in an area where LBT is not mandatory performs transmission of a modulation signal with FH belonging to "FH requiring performance of LBT", the NR apparatus may transmit the modulation signal with FH without performing LBT.

When an NR apparatus existing in an area where LBT is not mandatory performs transmission of a modulation signal with FH belonging to "FH not requiring performance of LBT", the NR apparatus does not need to perform LBT before transmission of the modulation signal with FH.

In addition, when FH described in the present embodiment is performed, a case where the amount of data transmitted by an NR apparatus is small (the case of small data) (for example, a case where data for Internet of Things (IoT) is transmitted) is one preferred example of obtaining the advantages of the present embodiment described.

Note that in "FIGS. 16D, 16E, 16H, and 16I", "FIGS. 17C, 17D, 17G, and 17H", "FIGS. 19D, 19E, 19H, 19I, 19L, and 19M", and "FIGS. 20C, 20D, 20G, 20H, 20K, and 20L", time between time N+1 and time N+2 may be secured as retuning time for switching (carrier) frequencies or as a transient period.

In addition, in "FIGS. 16D, 16E, 16H, and 16I", "FIGS. 17C, 17D, 17G, and 17H", "FIGS. 19D, 19E, 19H, 19I, 19L, and 19M", and "FIGS. 20C, 20D, 20G, 20H, 20K, and 20L", time between time N+2 and time N+3 and so forth may be secured as the retuning time for switching (carrier) frequencies or as the transient period.

That is, in "FIGS. 16D, 16E, 16H, and 16I", "FIGS. 17C, 17D, 17G, and 17H", "FIGS. 19D, 19E, 19H, 19I, 19L, and 19M", and "FIGS. 20C, 20D, 20G, 20H, 20K, and 20L", time between time N+i and time N+i+1 may be secured as retuning time for switching (carrier) frequencies or as a transient period.

As is understood, the communication performed by the NR apparatuses such as gNB, NR-UE, and the like using FH exemplified by FH described in the present embodiment increases likelihood to reduce interference with other apparatuses. It is thus possible to obtain an effect of improving data reception quality and enhancing data transmission efficiency.

Note that the configuration of the NR apparatuses and the FH methods described in the present embodiment are merely an example, and the present disclosure is not limited to the examples described in the present embodiment.

Embodiment 2

With respect to present Embodiment 2, a variation of Embodiment 1 will be described. The figures in Embodiment 1 are sometimes used in the following description of Embodiment 2.

The configuration of the NR apparatuses such as gNB, NR-UE, and the like, antenna configuration, sector sweep, LBT, etc., have already been described in Embodiment 1, and the description thereof is thus omitted in Embodiment 2.

Figure 23A:
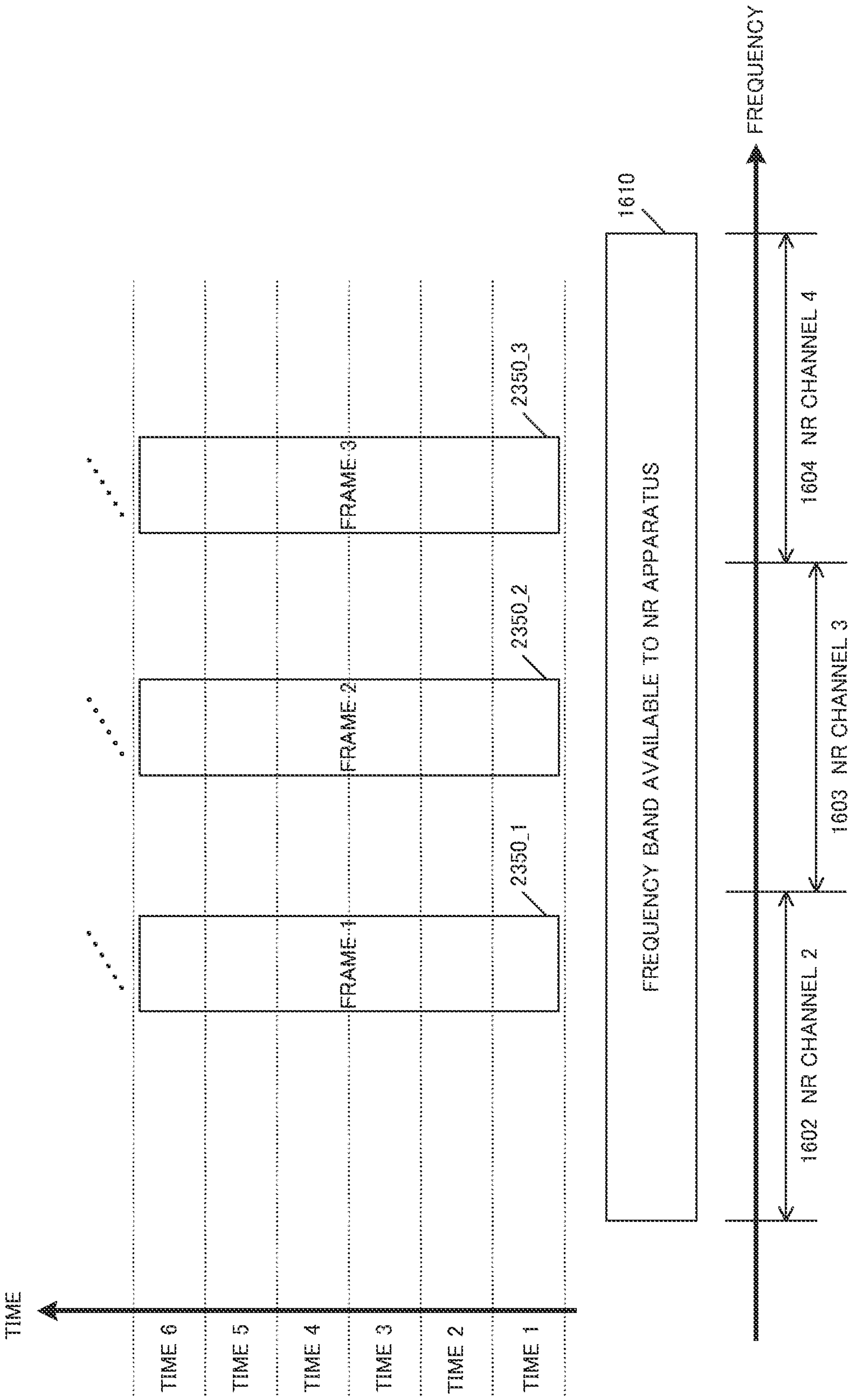
FIG. 23A illustrates an exemplary configuration of frames for a modulation signal transmitted by gNB.

FIG. 23A illustrates a communication method to address issues described as the example of communication status in above FIG. 15.

FIG. 23A illustrates an exemplary configuration of a frame for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 23A, NR channel 2 labeled 1602, NR channel 3 labeled 1603, and NR channel 4 labeled 1604 are present for the frequency axis. In FIG. 23A, for example, "frequency band 1610 used by an NR apparatus" is present, and gNB 1100 in FIG. 15 transmits a modulation signal using "frequency band 1610 used by an NR apparatus", for example. Note that, in the example of FIG. 23A, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 23A, gNB 1100 transmits modulation signals to a communication counterpart such as NR-UE #1 labeled 1101_1 in FIG. 15, for example, in the following manner. For example, at time 1, time 2, time 3, time 4, time 5, and time 6, gNB 1100 transmits modulation signals in "frame 1 labeled 2350_1 included in NR channel 2 labeled 1602", "frame 2 labeled 2350_2 included in NR channel 3 labeled 1603", and "frame 3 labeled 2350_3 included in NR channel 4 labeled 1604", respectively.

The gNB transmits these modulation signals subjected to frequency allocation as in the example of FIG. 23A. Note that "frame 1 labeled 2350_1", "frame 2 labeled 2350_2", and "frame 3 labeled 2350_3" include, for example, data to be transmitted to NR-UE #1 being the communication counterpart labeled 1101_1.

Note that, although not illustrated in FIG. 23A, the modulation signals transmitted by gNB 1100) may include a frame, symbol, slot, etc. other than "frame I labeled 2350_1", "frame 2 labeled 2350_2", and "frame 3 labeled 2350_3" addressed to NR-UE #1 labeled 1101_1.

In FIG. 15, it is assumed that gNB 1100 transmits a modulation signal in frame 1660 as in FIG. 16B using transmit beam 1502. Note that FIG. 16B has already been described, and thus the description thereof will be omitted.

Then, "NR-UE #2 labeled 1101_2" detects transmit beam 1502 transmitted by gNB 1100, and NR-UE #2 labeled 1101_2 detects a signal when performing LBT on the frequency in which frame 1600 in NR channel 3 labeled 1603 in FIG. 16B is present. Thus, NR-UE #2 labeled 1101_2 does not transmit a modulation signal using transmit beam 1503 in FIG. 15 for the frequency in which frame 1600 in NR channel 3 labeled 1603 in FIG. 16B is present. This reduces the data transmission efficiency of the system.

In addition, when NR-UE #2 labeled 1101_2 transmits a modulation signal using transmit beam 1503 in FIG. 15 without performing LBT on the frequency in which frame 1600 in NR channel 3 labeled 1603 in FIG. 16B is present, another apparatus may be interfered with. This reduces the transmission efficiency of the system.

Meanwhile, in FIG. 15, it is assumed that gNB 1100 transmits the modulation signals in "frame I labeled 2350_1", "frame 2 labeled 2350_2", and "frame 3 labeled 2350_3" as in FIG. 23A using transmit beam 1502.

When the modulation signals are transmitted in this manner, the modulation signals are present in "NR channel 2 labeled 1602", "NR channel 3 labeled 1603", and "NR channel 4 labeled 1604" in FIG. 23A, and the time intervals at which the modulation signals are present can be made shorter than in the case of FIG. 16B. For example, when data having a first amount of data is transmitted and when the transmission parameters (for example, the coding rate of an error correction code, the modulation scheme, the number of transmission modulation signals, and the like) are the same, the time interval in transmission of the data by the method in FIG. 23A is about ⅓ of the time interval in transmission of the data by the method in FIG. 16B. It is thus possible to reduce time of interference with other apparatuses, so as to obtain the effect of preventing a decrease in data transmission efficiency.

A description will be given of an exemplary operation of an NR apparatus in the "area (or country) where LBT is not performed".

In the "area (or country) where LBT is not performed". LBT is not performed before an NR apparatus transmits a modulation signal. For example, an NR apparatus with both the "LBT mode" and "no-LBT mode" operates the "no-LBT mode". In the "area (or country) where LBT is not performed", an NR apparatus with "no-LBT mode" and an NR apparatus without an LBT function may be present.

In this case, such NR apparatuses may transmit modulation signals using a communication method as in the example of FIG. 23A (not limited to the example of FIG. 23A, however) as one of modes that are less likely to cause interference to another apparatus. Note that such NR apparatuses may include a mode of transmitting a modulation signal by a communication method other than that in FIG. 23A. A variation of the "communication method as in the example of FIG. 23A" that is less likely to cause interference to another apparatus will be described later.

A description will be given of an exemplary operation of an NR apparatus in the "area (or country) where LBT may be performed".

In the "area (or country) where LBT may be performed", an NR apparatus may "perform LBT" or may "not perform LBT" before transmitting a modulation signal.

When an NR apparatus with both the "LBT mode" and "no-LBT mode" performs LBT, the NR apparatus operates the "LBT mode" and performs LBT before transmitting a modulation signal.

Meanwhile, when an NR apparatus with both the "LBT mode" and "no-LBT mode" does not perform LBT, the "no-LBT mode" is operated, and at this time, applying a communication method that causes less interference to another apparatus improves the data transmission efficiency of the system. Thus, an NR apparatus may transmit a modulation signal by a communication method as in the example of FIG. 23A (not limited to the example of FIG. 23A, however) as one of methods of the "no-LBT mode".

Note that the NR apparatus with both the "LBT mode" and "no-LBT mode" may include a mode of transmitting a modulation signal by a communication method other than that in FIG. 23A. A variation of the "communication method as in the example of FIG. 23A" that causes less interference to another apparatus will be described later.

In the "area (or country) where LBT may be performed", an NR apparatus with "no-LBT mode" and an NR apparatus without an LBT function may be present. In this case, such NR apparatuses may transmit modulation signals by a communication method as in the example of FIG. 23A (not limited to the example of FIG. 23A, however). This reduces interference to another apparatus and produces an effect of improving data transmission efficiency of the system.

Note that such NR apparatuses may include a mode of transmitting a modulation signal by a communication method other than that in FIG. 23A. A variation of the "communication method as in the example of FIG. 23A" that causes less interference to another apparatus will be described later.

In the "area (or country) w % here LBT is necessary", an NR apparatus "performs LBT" before transmitting a modulation signal. In this case, the "LBT mode" is operated in the NR apparatus.

At this time, the NR apparatus performs LBT before transmitting a modulation signal, and when determining that the modulation signal can be transmitted, the NR apparatus may transmit the modulation signal by the communication method as in the example of FIG. 23A (not limited to the example of FIG. 23A, however). This reduces interference to another apparatus and produces an effect of improving data transmission efficiency of the system.

Note that the NR apparatuses may include a mode of transmitting a modulation signal by a communication method other than that in FIG. 23A. A variation of the "communication method as in the example of FIG. 23A" that causes less interference to another apparatus will be described later.

Figure 23B:
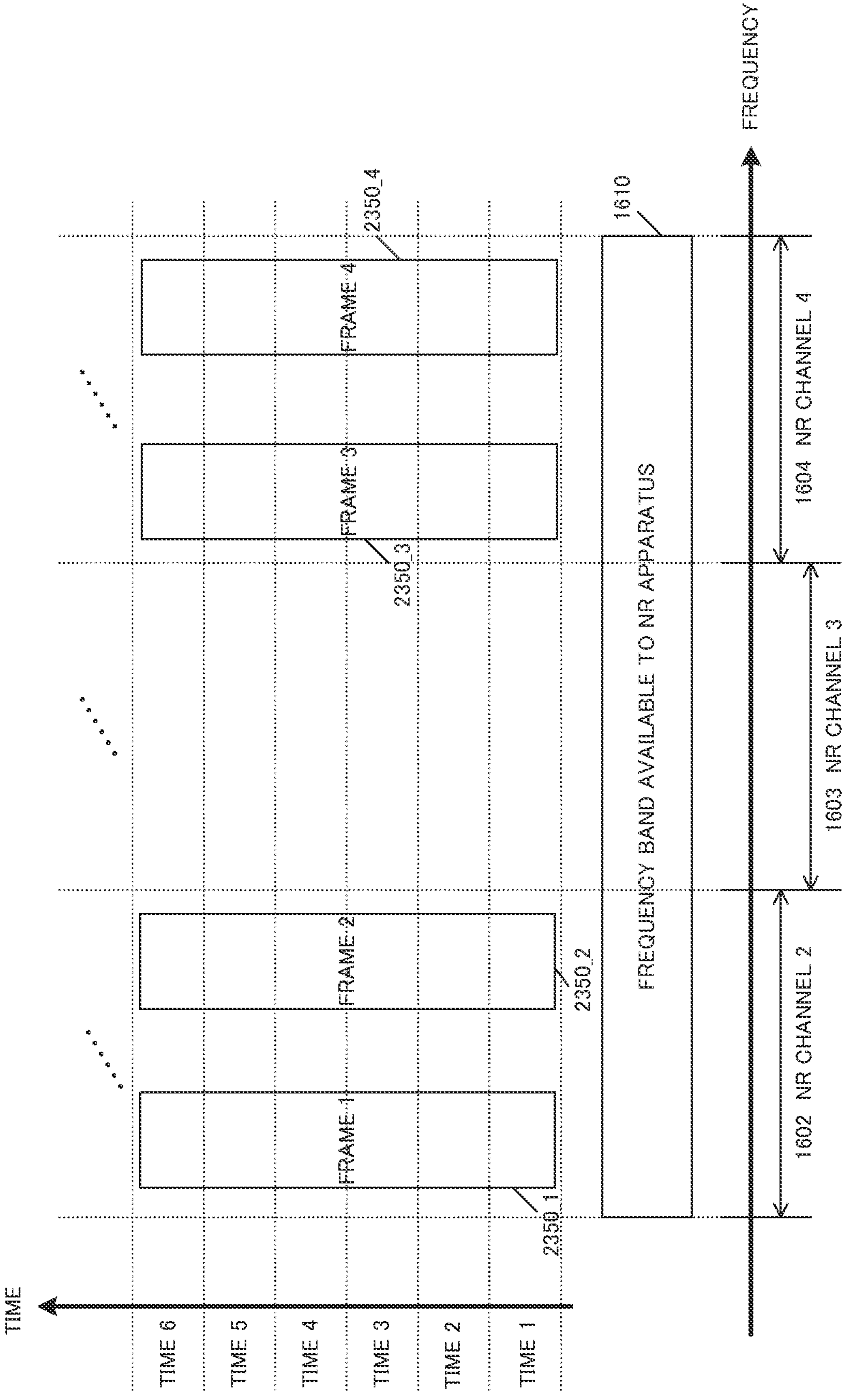
FIG. 23B illustrates an exemplary configuration of frames for a modulation signal transmitted by gNB.

The variation of the "communication method as in the example of FIG. 23A" that causes less interference to another apparatus includes a communication method in FIG. 23B.

FIG. 23B illustrates, for example, an exemplary configuration of slots for a modulation signal transmitted by gNB 1100 in FIG. 15, and the horizontal axis represents frequency while the vertical axis represents time. Note that, in FIG. 23B, components that operate in the same manner as in FIGS. 16A and 23A are denoted by the same reference signs, and the description thereof will be partially omitted.

As illustrated in FIG. 23B, NR channel 2 labeled 1602, NR channel 3 labeled 1603, and NR channel 4 labeled 1604 are present for the frequency axis. In FIG. 23B, for example, "frequency band 1610 used by an NR apparatus" is present, and gNB 1100 in FIG. 15 transmits a modulation signal using "frequency band 1610 used by an NR apparatus", for example. Note that, in the example of FIG. 23B, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 23B, gNB 1100 transmits a modulation signal to a communication counterpart such as NR-UE #1 labeled 1101_1 in FIG. 15, for example, in the following manner.

At time 1, time 2, time 3, time 4, time 5, and time 6, gNB 1100 transmits modulation signals in "frame I labeled 2350_1 included in NR channel 2 labeled 1602", "frame 2 labeled 2350_2 included in NR channel 2 labeled 1602", "frame 3 labeled 2350_3 included in NR channel 4 labeled 1604", and "frame 4 labeled 2350_4 included in NR channel 4 labeled 1604", for example.

The gNB transmits these modulation signals subjected to frequency allocation as in the example of FIG. 23B. Note that "frame 1 labeled 2350_1", "frame 2 labeled 2350_2", "frame 3 labeled 2350_3", and "frame 4 labeled 2350_4" include data to be transmitted to NR-UE #1 being the communication counterpart labeled 1101_1.

Note that, although not illustrated in FIG. 23B, the modulation signals transmitted by gNB 1100 may include a frame, symbol, slot, etc. other than "frame 1 labeled 2350_1", "frame 2 labeled 2350_2", "frame 3 labeled 2350_3", and "frame 4 labeled 2350_4" addressed to NR-UE #1 labeled 1101_1.

Although exemplary frame arrangements have been described above with reference to FIGS. 23A and 23B, the frame arrangement method is not limited to these examples, and frames may be arranged or configured using two or more frame arrangement/configuration methods of the "frame arrangement/configuration method in FIG. 23A" and the "frame arrangement/configuration method in FIG. 233", for example.

For example, the NR channels to which the frames belong in FIGS. 23A and 23B are not limited to this example.

Further, as long as a plurality of frames are placed in any of the NR channels, such as "NR channel 2 labeled 1602", "NR channel 3 labeled 1603", and "NR channel 4 labeled 1604" on the frequency axis, the same as the above description can be implemented and the same effects can be obtained as well.

Further, in the cases of FIGS. 23A and 23B, the number of NR channels to which the frames belong is two or three, but the present disclosure is not limited to this, and the same as the above description can be implemented and the same effects can be obtained as long as the number of NR channels to which the frames belong is two or more.

Thus, a method of using time and frequency for transmitting a modulation signal by gNB is not limited to the examples of FIGS. 23A and 23B, and the number of NR channels to which frames belong only needs to be two or more.

Further, one frame may be present in each NR channel as in FIG. 23A, or two or more frames (two frames in the case of FIG. 23B) may be present in each NR channel as in FIG. 23B.

In the following, a description will be given of exemplary slot arrangement on the frequency and time axes that is a variation of the arrangements in "FIGS. 23A and 23B" and is different from the arrangements in "FIGS. 23A and 233".

Figure 23C:
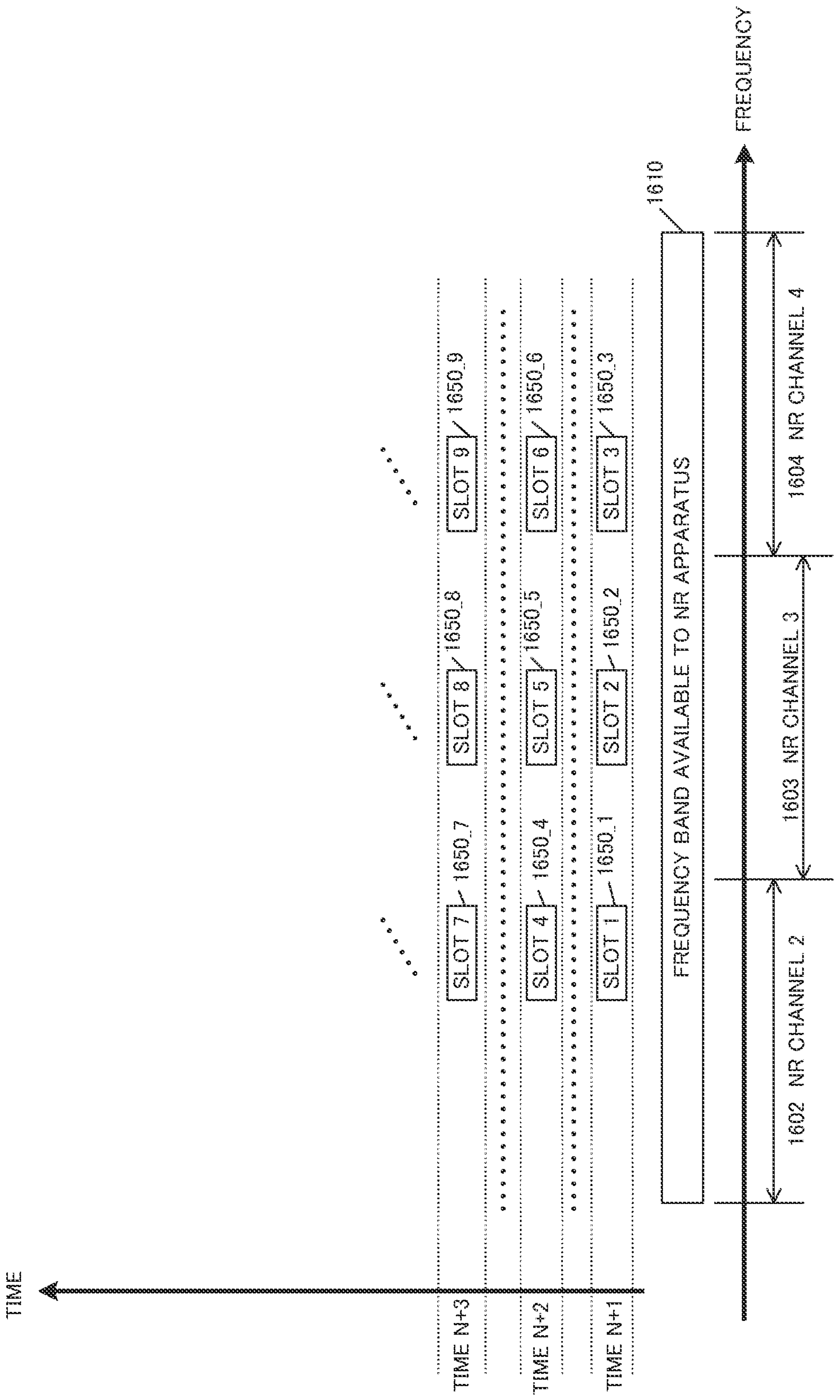
FIG. 23C illustrates an exemplary configuration of slots for a modulation signal transmitted by gNB.

FIG. 23C illustrates, for example, an exemplary configuration of slots for a modulation signal transmitted by gNB 1100 in FIG. 15, and the horizontal axis represents frequency while the vertical axis represents time. Note that, in FIG. 23C, components that operate in the same manner as in FIG. 16A are denoted by the same reference signs, and the description thereof will be partially omitted.

As illustrated in FIG. 23C, NR channel 2 labeled 1602, NR channel 3 labeled 1603, and NR channel 4 labeled 1604 are present for the frequency axis. In FIG. 23C, for example. "frequency band 1610 used by an NR apparatus" is present, and gNB 1100 in FIG. 15 transmits a modulation signal using "frequency band 1610 used by an NR apparatus", for example. Note that, in the example of FIG. 23C, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 23C, gNB 1100 transmits a modulation signal to a communication counterpart such as NR-UE #1 labeled 1101_1 in FIG. 15, for example, in the following manner: at time N+1, gNB 1100 transmits modulation signals in "slot 1 labeled 1650_1 included in NR channel 2 labeled 1602", "slot 2 labeled 1650_2 included in NR channel 3 labeled 1603", and "slot 3 labeled 1650_3 included in NR channel 4 labeled 1604", at time N+2, gNB 1100 transmits modulation signals in "slot 4 labeled 1650_4 included in NR channel 2 labeled 1602", "slot 5 labeled 1650_5 included in NR channel 3 labeled 1603", and "slot 6 labeled 1650_6 included in NR channel 4 labeled 1604", at time N+3, gNB 1100 transmits modulation signals in "slot 7 labeled 1650_7 included in NR channel 2 labeled 1602", "slot 8 labeled 1650_8 included in NR channel 3 labeled 1603", and "slot 9 labeled 1650_9 included in NR channel 4 labeled 1604", and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here. N is an integer equal to or greater than 0, and i is an integer equal to or greater than 1.

The gNB transmits these modulation signals as in the example of FIG. 23C. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 16505", "slot 6 labeled 1650_6", "slot 7 labeled 1650_7", "slot 8 labeled 1650_8", "slot 9 labeled 1650_9", and so forth.

For example, the frequency of "slot 1 labeled 1650_1", the frequency of "slot 4 labeled 1650_4", and the frequency of "slot 7 labeled 1650_7" may be the same or partially overlap each other.

Likewise, for example, the frequency of "slot 2 labeled 1650_2", the frequency of "slot 5 labeled 1650_5", and the frequency of "slot 8 labeled 1650_8" may be the same or partially overlap each other.

For example, the frequency of "slot 3 labeled 1650_3", the frequency of "slot 6 labeled 1650_6", and the frequency of "slot 9 labeled 1650_9" may be the same or partially overlap each other.

Note that, although not illustrated in FIG. 23C, the modulation signal transmitted by gNB 1100 may include a frame, symbol, slot, etc. other than "slot 1 labeled 1650_1", "slot 2 labeled 1650_2", "slot 3 labeled 1650_3", "slot 4 labeled 1650_4", "slot 5 labeled 1650_5", "slot 6 labeled

1650_6", "slot 7 labeled 1650_7", "slot 8 labeled 1650_8", "slot 9 labeled 1650_9', and so forth" addressed to NR-UE #1 labeled 1101_1.

Figure 23D:
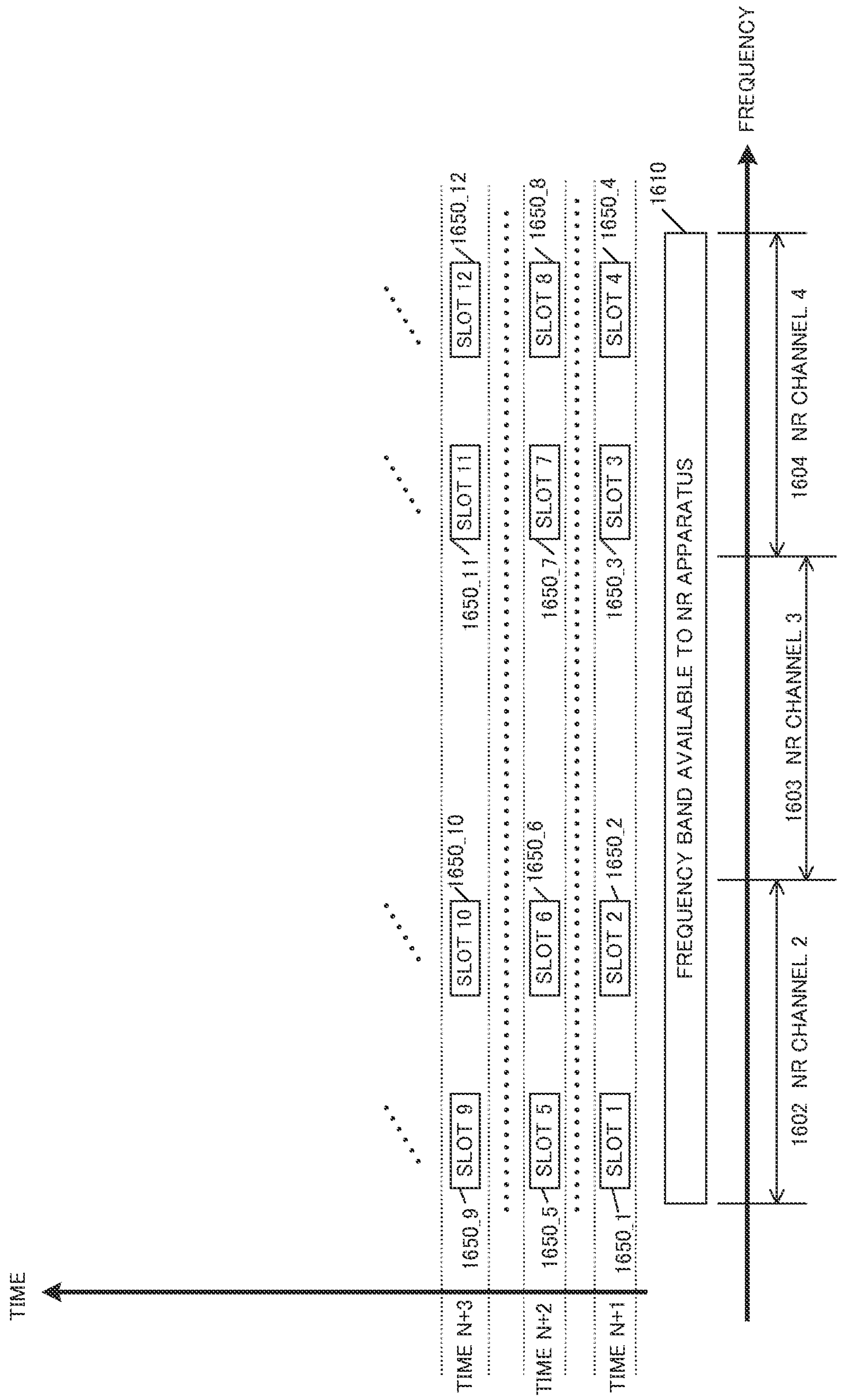
FIG. 23D illustrates an exemplary configuration of slots for a modulation signal transmitted by gNB.

FIG. 23D illustrates, for example, an exemplary configuration of slots for a modulation signal transmitted by gNB 1100 in FIG. 15, and the horizontal axis represents frequency while the vertical axis represents time. Note that, in FIG. 23D, components that operate in the same manner as in FIG. 16A are denoted by the same reference signs, and the description thereof will be partially omitted.

As illustrated in FIG. 23D. NR channel 2 labeled 1602. NR channel 3 labeled 1603, and NR channel 4 labeled 1604 are present for the frequency axis. In FIG. 23D, for example, "frequency band 1610 used by an NR apparatus" is present, and gNB 1100 in FIG. 15 transmits a modulation signal using "frequency band 1610 used by an NR apparatus", for example. Note that, in the example of FIG. 23D, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 23D, gNB 1100 transmits a modulation signal to a communication counterpart such as NR-UE #1 labeled 1101_1 in FIG. 15, for example, in the following manner: at time N+1, gNB 1100 transmits modulation signals in "slot I labeled 1650_1 included in NR channel 2 labeled 1602", "slot 2 labeled 1650_2 included in NR channel 2 labeled 1602", "slot 3 labeled 1650_3 included in NR channel 4 labeled 1604", and "slot 4 labeled 1650_4 included in NR channel 4 labeled 1604", at time N+2, gNB 1100 transmits modulation signals in "slot 5 labeled 1650_5 included in NR channel 2 labeled 1602", "slot 6 labeled 1650_6 included in NR channel 2 labeled 1602", "slot 7 labeled 1650_7 included in NR channel 4 labeled 1604", and "slot 8 labeled 1650_8 included in NR channel 4 labeled 1604", at time N+3, gNB 1100 transmits modulation signals in "slot 9 labeled 1650_9 included in NR channel 2 labeled 1602", "slot 10 labeled 1650_10 included in NR channel 2 labeled 1602", "slot 11 labeled 1650_11 included in NR channel 4 labeled 1604", and "slot 12 labeled 1650_12 included in NR channel 4 labeled 1604", and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals as in the example of FIG. 23D. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", "slot 10 labeled 1650_10", "slot 11 labeled 1650_11", "slot 12 labeled 1650_12", and so forth.

For example, the frequency of "slot 1 labeled 1650_1", the frequency of "slot 5 labeled 1650_5", and the frequency of "slot 9 labeled 1650_9" may be the same or partially overlap each other.

Likewise, for example, the frequency of "slot 2 labeled 1650_2", the frequency of "slot 6 labeled 1650_6", and the frequency of "slot 10 labeled 1650_10" may be the same or partially overlap each other.

For example, the frequency of "slot 3 labeled 1650_3", the frequency of "slot 7 labeled 1650_7", and the frequency of "slot 11 labeled 1650_11" may be the same or partially overlap each other.

For example, the frequency of "slot 4 labeled 1650_4", the frequency of "slot 8 labeled 1650_8", and the frequency of "slot 12 labeled 1650_12" may be the same or partially overlap each other.

Note that, although not illustrated in FIG. 23D, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 1650_9', 'slot 10 labeled 1650_10', 'slot 11 labeled 1650_11', 'slot 12 labeled 1650_12', and so forth" addressed to NR-UE #1 labeled 1101_1.

Although exemplary frame arrangements have been described above with reference to FIGS. 23C and 23D, the slot arrangement method is not limited to these examples, and slots may be arranged or configured using two or more slot arrangement/configuration methods of the "slot arrangement/configuration method in FIG. 23C" and the "slot arrangement/configuration method in FIG. 23D", for example.

For example, the orders of NR channels to which the slots belong in FIGS. 23C and 23D are not limited to these examples.

Further, as long as a plurality of slots are placed in any of the NR channels, such as "NR channel 2 labeled 1602", "NR channel 3 labeled 1603", and "NR channel 4 labeled 1604" on the frequency axis, the same as the above description can be implemented and the same effects can be obtained as well.

Further, in the cases of FIGS. 23C and 23D, the number of NR channels to which the slots belong is two or three, but the present disclosure is not limited to this, and the same as the above description can be implemented and the same effects can be obtained as long as the number of NR channels to which the slots belong is two or more.

Thus, a method of using time and frequency for transmitting a modulation signal by gNB is not limited to the examples of FIGS. 23C and 23D, and the number of NR channels to which slots belong only needs to be two or more.

Further, one slot may be present in each NR channel at a certain time as in FIG. 23C, or two or more slots (two slots in the case of FIG. 23D) may be present in each NR channel at a certain time as in FIG. 23D.

In the following, a description will be given of exemplary arrangement of OFDM symbols (parts of OFDM symbols) on the frequency and time axes that is a variation of the arrangements in "FIGS. 23A, 23B, 23C, and 23D" and is different from the arrangements in "FIGS. 23A, 23B, 23C, and 233".

Figure 23E:
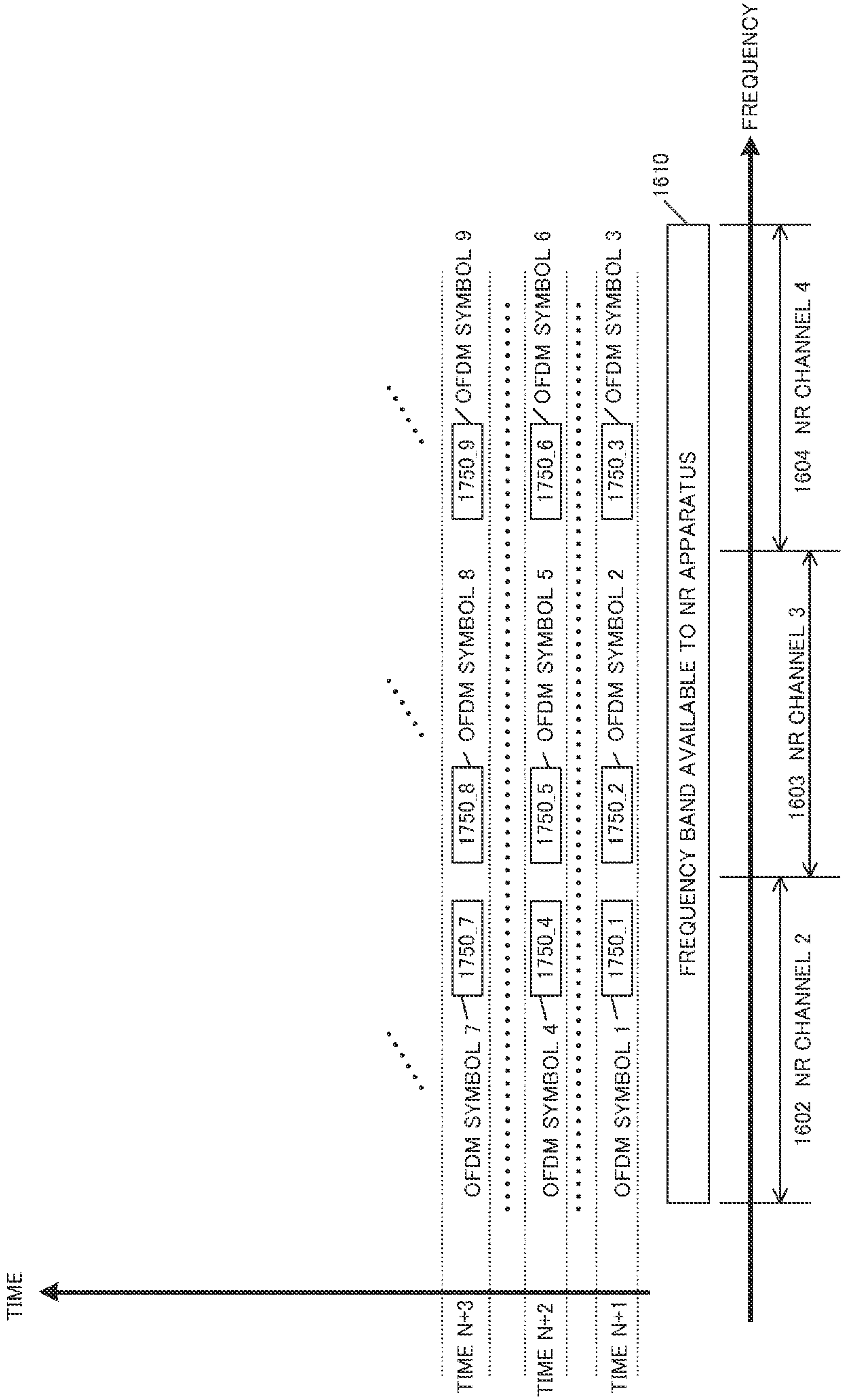
FIG. 23E illustrates an exemplary configuration of OFDM symbols for a modulation signal transmitted by gNB.

FIG. 23E illustrates, for example, an exemplary configuration of slots for a modulation signal transmitted by gNB 1100 in FIG. 15, and the horizontal axis represents frequency while the vertical axis represents time. Note that, in FIG. 23E, components that operate in the same manner as in FIGS. 16A and 17A are denoted by the same reference signs, and the description thereof will be partially omitted.

As illustrated in FIG. 23E, NR channel 2 labeled 1602, NR channel 3 labeled 1603, and NR channel 4 labeled 1604 are present for the frequency axis. In FIG. 23E, for example, "frequency band 1610 used by an NR apparatus" is present, and gNB 1100 in FIG. 15 transmits a modulation signal using "frequency band 1610 used by an NR apparatus", for example. Note that, in the example of FIG. 23E, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 23E, gNB 1100 transmits a modulation signal to a communication counterpart such as NR-UE #1 labeled 1101_1 in FIG. 15, for example, in the following manner: at time N+1, gNB 1100 transmits modulation signals in "OFDM symbol 1 (part of OFDM symbol 1) labeled 1750_1 included in NR channel 2 labeled 1602", "OFDM symbol 2 (part of OFDM symbol 2) labeled 1750_2 included in NR channel 3 labeled 1603", and "OFDM symbol 3 (part of OFDM symbol 3) labeled 1750_3 included in NR channel 4 labeled 1604", at time N+2, gNB 1100 transmits modulation signals in "OFDM symbol 4 (part of OFDM symbol 4) labeled 1750_4 included in NR channel 2 labeled 1602", "OFDM symbol 5 (part of OFDM symbol 5) labeled 1750_5 included in NR channel 3 labeled 1603", and OFDM symbol 6 (part of OFDM symbol 6) labeled 1750_6 included in NR channel 4 labeled 1604, at time N+3, gNB 1100 transmits modulation signals in "OFDM symbol 7 (part of OFDM symbol 7) labeled 1750_7 included in NR channel 2 labeled 1602", "OFDM symbol 8 (part of OFDM symbol 8) labeled 1750_8 included in NR channel 3 labeled 1603", and OFDM symbol 9 (part of OFDM symbol 9) labeled 1750_9 included in NR channel 4 labeled 1604, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals as in the example of FIG. 23E. Note that data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9", and so forth.

For example, the frequency of "OFDM symbol 1 (part of OFDM symbol 1) labeled 1750_1", the frequency of "OFDM symbol 4 (part of OFDM symbol 4) labeled 1750_4", and the frequency of "OFDM symbol 7 (part of OFDM symbol 7) labeled 1750_7" may be the same or may partially overlap each other.

Likewise, for example, the frequency of "OFDM symbol 2 (part of OFDM symbol 2) labeled 1750_2", the frequency of "OFDM symbol 5 (part of OFDM symbol 5) labeled 1750_5", and the frequency of "OFDM symbol 8 (part of OFDM symbol 8) labeled 1750_8" may be the same or may partially overlap each other.

For example, the frequency of "OFDM symbol 3 (part of OFDM symbol 3) labeled 1750_3", the frequency of "OFDM symbol 6 (part of OFDM symbol 6) labeled 1750_6", and the frequency of "OFDM symbol 9 (part of OFDM symbol 9) labeled 1750_9" may be the same or may partially overlap each other.

Note that, although not illustrated in FIG. 23E, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9', and so forth" addressed to NR-UE #1 labeled 1101_1.

Figure 23F:
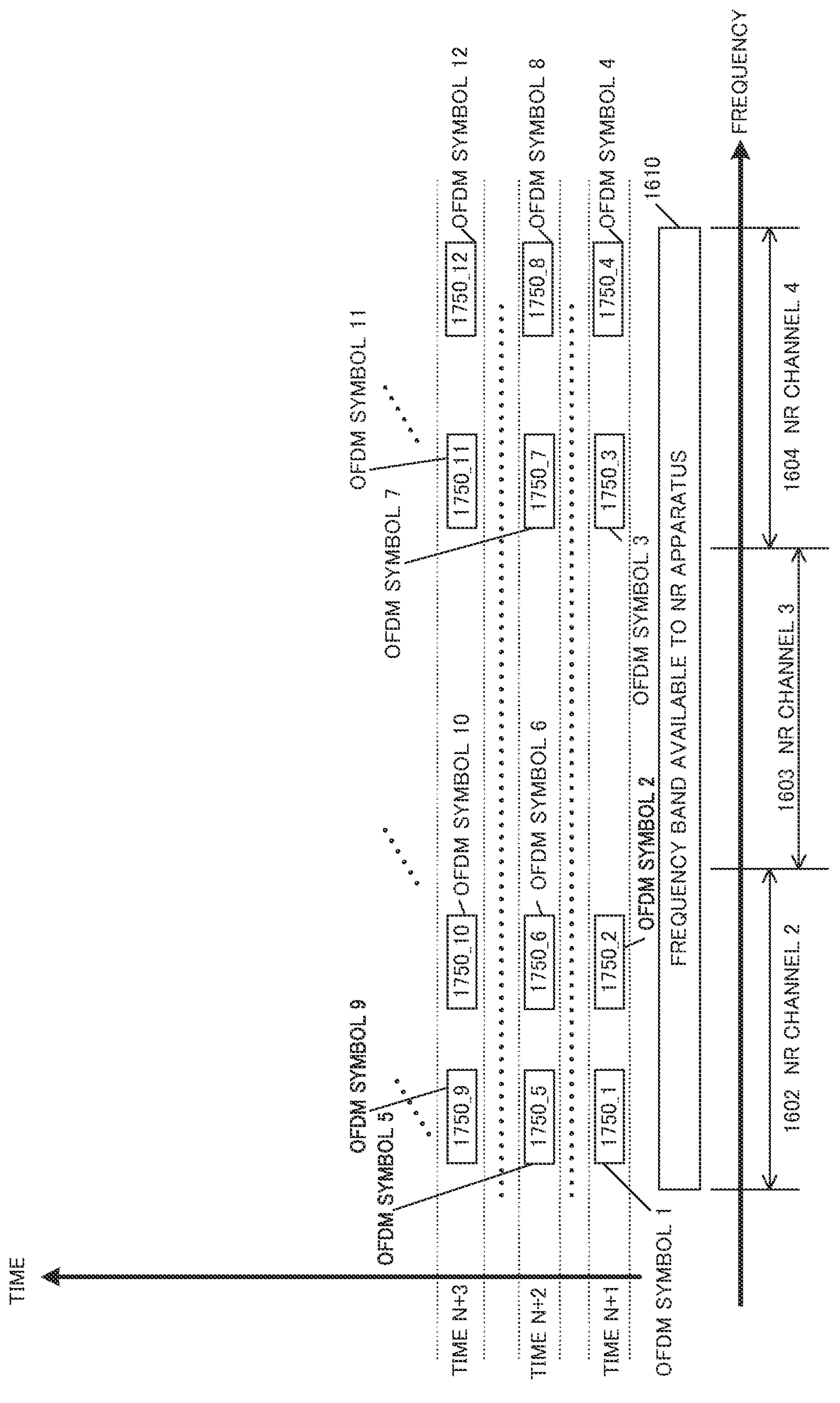
FIG. 23F illustrates an exemplary configuration of OFDM symbols for a modulation signal transmitted by gNB.

FIG. 23F illustrates, for example, an exemplary configuration of slots for a modulation signal transmitted by gNB 1100 in FIG. 15, and the horizontal axis represents frequency while the vertical axis represents time. Note that, in FIG. 23F, components that operate in the same manner as in FIGS. 16A and 17A are denoted by the same reference signs, and the description thereof will be partially omitted.

As illustrated in FIG. 23F, NR channel 2 labeled 1602, NR channel 3 labeled 1603, and NR channel 4 labeled 1604 are present for the frequency axis. In FIG. 23F, for example, "frequency band 1610 used by an NR apparatus" is present, and gNB 1100 in FIG. 15 transmits a modulation signal using "frequency band 1610 used by an NR apparatus", for example. Note that, in the example of FIG. 23F, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 23F, gNB 1100 transmits a modulation signal to a communication counterpart such as NR-UE #1 labeled 1101_1 in FIG. 15, for example, in the following manner: at time N+1, gNB 1100 transmits modulation signals in "OFDM symbol 1 (part of OFDM symbol 1) labeled 1750_1 included in NR channel 2 labeled 1602", "OFDM symbol 2 (part of OFDM symbol 2) labeled 1750_2 included in NR channel 2 labeled 1602", "OFDM symbol 3 (part of OFDM symbol 3) labeled 1750_3 included in NR channel 4 labeled 1604", and "OFDM symbol 4 (part of OFDM symbol 4) labeled 1750_4 included in NR channel 4 labeled 1604", at time N+2, gNB 1100 transmits modulation signals in "OFDM symbol 5 (part of OFDM symbol 5) labeled 1750_5 included in NR channel 2 labeled 1602", "OFDM symbol 6 (part of OFDM symbol 6) labeled 1750_6 included in NR channel 2 labeled 1602", "OFDM symbol 7 (part of OFDM symbol 7) labeled 1750_7 included in NR channel 4 labeled 1604", and "OFDM symbol 8 (part of OFDM symbol 8) labeled 1750_8 included in NR channel 4 labeled 1604", at time N+3, gNB 1100 transmits modulation signals in "OFDM symbol 9 (part of OFDM symbol 9) labeled 1750_9 included in NR channel 2 labeled 1602", "OFDM symbol 10 (part of OFDM symbol 10) labeled 1750_10 included in NR channel 2 labeled 1602", "OFDM symbol 11 (part of OFDM symbol 11) labeled 1750_11 included in NR channel 4 labeled 1604", and "OFDM symbol 12 (part of OFDM symbol 12) labeled 1750_12 included in NR channel 4 labeled 1604", and so forth.

Note that another "frame, symbol, signal, etc." may be present between time N+I and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals as in the example of FIG. 23F. Note that data to be transmitted to NR-UE #1 being the communication counterpart labeled 1101_1 is included in the OFDM symbols (part of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9", "OFDM symbol 10 (part of OFDM symbol 10) labeled 1750_10", "OFDM symbol 11 (part of OFDM symbol 11) labeled 1750_11", "OFDM symbol 12 (part of OFDM symbol 12) labeled 1750_12", and so forth.

For example, the frequency of "OFDM symbol 1 (part of OFDM symbol 1) labeled 1750_1", the frequency of "OFDM symbol 5 (part of OFDM symbol 5) labeled 1750_5", and the frequency of "OFDM symbol 9 (part of OFDM symbol 9) labeled 1750_9" may be the same or may partially overlap each other.

Likewise, for example, the frequency of "OFDM symbol 2 (part of OFDM symbol 2) labeled 1750_2", the frequency of "OFDM symbol 6 (part of OFDM symbol 6) labeled 1750_6", and the frequency of "OFDM symbol 10 (part of OFDM symbol 10) labeled 1750_10" may be the same or may partially overlap each other.

For example, the frequency of "OFDM symbol 3 (part of OFDM symbol 3) labeled 1750_3", the frequency of "OFDM symbol 7 (part of OFDM symbol 7) labeled 1750_7", and the frequency of "OFDM symbol 11 (part of OFDM symbol 11) labeled 1750_11" may be the same or may partially overlap each other.

Likewise, for example, the frequency of "OFDM symbol 4 (part of OFDM symbol 4) labeled 1750_4", the frequency of "OFDM symbol 8 (part of OFDM symbol 8) labeled 1750_8", and the frequency of "OFDM symbol 12 (part of OFDM symbol 12) labeled 1750_12" may be the same or may partially overlap each other.

Note that, although not illustrated in FIG. 23F, the modulation signal transmitted by gNB 1100 may include a frame, symbol, slot, etc. other than "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9", "OFDM symbol 10 (part of OFDM symbol 10) labeled 1750_10", "OFDM symbol 11 (part of OFDM symbol 11) labeled 1750_11", "OFDM symbol 12 (part of OFDM symbol 12) labeled 1750_12', and so forth" addressed to NR-UE #1 labeled 1101_1.

Although exemplary arrangements of OFDM symbols (parts of OFDM symbols) have been described above with reference to FIGS. 23E and 23F, the frame arrangement method is not limited to these examples, and the OFDM symbols (parts of OFDM symbols) may be arranged or configured using two or more arrangement/configuration methods of the "arrangement/configuration method for OFDM symbols (parts of OFDM symbols) in FIG. 23E" and the "arrangement/configuration method for OFDM symbols (parts of OFDM symbols) in FIG. 23F", for example.

For example, in FIGS. 23E and 23F, the orders of NR channels to which the plurality of OFDM symbols (parts of OFDM symbols) belong are not limited to these examples.

Further, as long as the OFDM symbols (parts of OFDM symbols) are placed in any of the NR channels, such as "NR channel 2 labeled 1602", "NR channel 3 labeled 1603", and "NR channel 4 labeled 1604" on the frequency axis, the same as the above description can be implemented and the same effects can be obtained as well.

Further, in the cases of FIGS. 23E and 23F, the number of NR channels to which the OFDM symbols (parts of OFDM symbols) belong is two or three, but the present disclosure is not limited to this, and the same as the above description can be implemented and the same effects can be obtained as long as the number of NR channels to which the OFDM symbols (parts of OFDM symbols) belong is two or more.

Thus, a method of using time and frequency for transmitting a modulation signal by gNB is not limited to the examples of FIGS. 23E and 23F, and the number of NR channels to which the OFDM symbols (parts of OFDM symbols) belong only needs to be two or more.

Further, one OFDM symbol (part of an OFDM symbol) may be present in each NR channel at a certain time as in FIG. 23E, or two or more OFDM symbols (parts of OFDM symbols) (two OFDM symbols (parts of OFDM symbols) in the case of FIG. 23F) may be present in each NR channel at a certain time as in FIG. 23F.

As is understood from the above, it is thus possible to reduce time of interference with other apparatuses as in the example of FIG. 23A, so as to obtain the effect of preventing a decrease in data transmission efficiency.

Note that the specific contents of the "slots, symbols (parts of OFDM symbols)", the specific contents of the "LBT mode" and the "no-LBT mode", the specific contents of the "mode for performing LBT, the mode for not performing LBT", the SCS of OFDM, and the like have been described in Embodiment 1, and thus detailed explanation thereof is omitted.

Although FIGS. 23A, 23B, 23C, 23D, 23E, and 23F illustrate exemplary arrangement of "frames, slots, and OFDM symbols (parts of OFDM symbols)" that transmit data on the frequency and time axes, a signal other than the "frames, slots, and OFDM symbols (parts of OFDM symbols)", e.g., RS such as DMRS and PTRS, may be present in a modulation signal to be transmitted. For example, RS such as DMRS and PTRS may be present at any of the times in the frequencies where the "frames, slots, OFDM symbols (parts of OFDM symbols)" are present.

In addition, to indicate information on the frequencies where the "frames, slots, and OFDM symbols (parts of OFDM symbols)" that transmit data are present (information on frequency hopping) and information on a communication method (information on multi-carrier/single carrier, SCS, the time at which the slot is placed, etc.) to a communication counterpart, a frame for transmitting control information including such information may be placed on the frequency and time axes in FIGS. 23A, 23B, 23C, 23D, 23E, and 23F.

In FIGS. 23A and 23B, each of the frames (e.g., frame 1 labeled 2350_1, frame 2 labeled 2350_2, frame 3 labeled 2350_3, and the like) may be composed of a plurality of frames. Specifically, for example, frame 1 labeled 2350_1 in FIGS. 23A and 23B may be composed of a plurality of frames. In addition, the plurality of frames may be transmitted in the same frequency at the same time using a plurality of antennas, for example. That is, each slot in FIGS. 23A and 23B may be transmitted using MIMO.

A description will be given with reference to FIG. 23A, by way of example. It is assumed that frame 1 labeled 2350_1 is composed of a plurality of frames. In this case, the plurality of frames are present at times 1 to 6 in the frequency where frame 1 labeled 2350_1 is placed in FIG. 23A, and are transmitted using a plurality of antennas, for example.

Note that the above feature applies to FIG. 23B as well.

In FIGS. 23C and 23D, each of the slots (e.g., slot 1 labeled 1650_1, slot 2 labeled 1650_2, slot 3 labeled 1650_3, and so forth) may be composed of a plurality of slots. To be more specific, "slot 1 labeled 1650_1" in FIGS. 23C and 23D, for example, may be composed of a plurality of slots. In addition, the plurality of slots may be transmitted in the same frequency at the same time using a plurality of antennas, for example. That is, each slot in FIGS. 23C and 23D may be transmitted using MIMO.

A description will be given with reference to FIG. 23C, by way of example. It is assumed that slot 1 labeled 1650_1 is composed of a plurality of slots. In this case, the plurality of slots are present at time N+1 in the frequency where slot 1 labeled 1650_1 is placed in FIG. 23C, and are transmitted using a plurality of antennas, for example.

Note that the above feature applies to FIG. 23D as well.

In FIGS. 23E and 23F, each OFDM symbol (part of OFDM symbol), e.g., OFDM symbol (part of OFDM symbol) 1 labeled 1750_1. OFDM symbol (part of OFDM symbol) 2 labeled 1750_2, OFDM symbol (part of OFDM symbol) 3 labeled 1750_3, and so forth, may be composed of a plurality of OFDM symbols (parts of OFDM symbols). To be more specific, "OFDM symbol (part of OFDM symbol) 1 labeled 1750_1" in FIGS. 23E and 23F, for example, may be composed of a plurality of OFDM symbols (parts of OFDM symbols). In addition, the plurality of OFDM symbols (parts of OFDM symbols) may be transmitted in the same frequency at the same time using a plurality of antennas, for example. That is, each OFDM symbol (part of OFDM symbol) in FIGS. 23E and 23F may be transmitted using MIMO.

A description will be given with reference to FIG. 23E, by way of example. It is assumed that OFDM symbol (part of OFDM symbol) 1 labeled 1750_1 is composed of a plurality of slots. In this case, the plurality of OFDM symbols (parts of OFDM symbols) are placed at time N+1 in the frequency where OFDM symbol (part of OFDM symbol) I labeled 17501 is placed in FIG. 23E, and are transmitted using a plurality of antennas, for example.

Note that the above feature applies to FIG. 23F as well.

A frequency diversity effect can be obtained by using a plurality of NR channels as described above. This produces an effect of improving data reception quality, for example. Not only gNB performs transmission of a modulation signal exemplified in FIGS. 23A, 23B, 23C, 23D, 23E, and 23F. NR-UE, a repeater, a transmission (Tx)/reception (Rx) point (TRP), and an apparatus or system including a communication apparatus may perform transmission of a modulation signal exemplified in FIGS. 23A, 23B, 23C, 23D, 23E, and 23F.

However, the configuration of NR channels composing "frequency band 1610 used by an NR apparatus" is not limited to those in FIGS. 23A, 23B, 23C. 23D, 23E, and 23F, and the same can be implemented and the same effects can be obtained as long as "frequency band 1610 used by an NR apparatus" includes a plurality of "all or part of NR channels".

The "NR channels" in FIGS. 23A, 23B, 23C, 23D, 23E, and 23F may be referred to as NR operating band(s), NR band(s), or component carrier (CC).

Figure 24A:
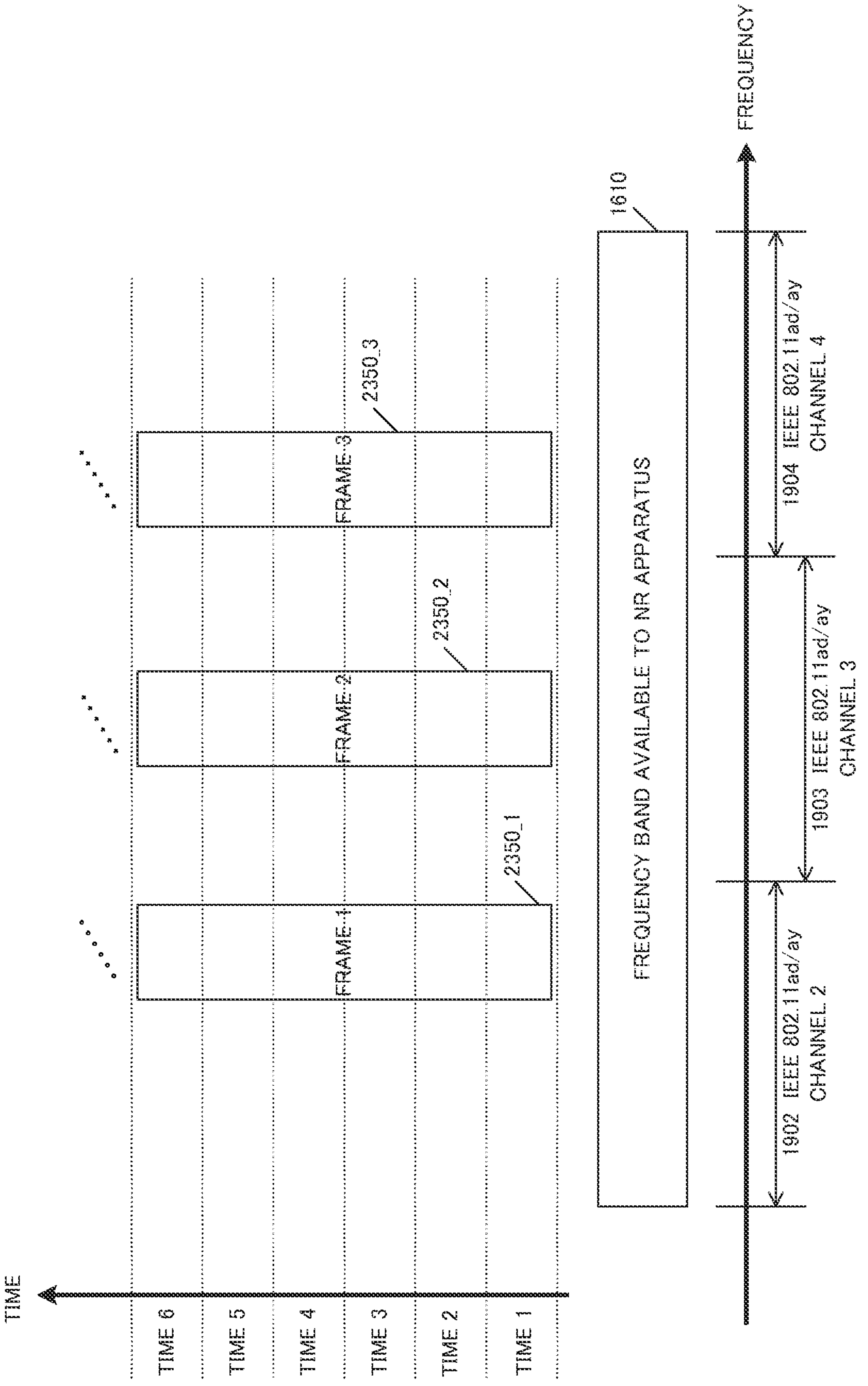
FIG. 24A illustrates an exemplary configuration of frames for a modulation signal transmitted by gNB.

FIG. 24A illustrates an exemplary communication method to address issues described in the example of communication status in above FIG. 18.

FIG. 24A illustrates an exemplary configuration of a frame for a modulation signal transmitted by gNB 1100 in FIG. 18, and the horizontal axis represents frequency while the vertical axis represents time. Note that components that operate in the same manner as in FIGS. 16A and 19A are denoted by the same reference signs, and the description thereof will be partially omitted.

As illustrated in FIG. 24A, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 24A, for example, "frequency band 1610 used by an NR apparatus" is present, and gNB 1100 in FIG. 18 transmits a modulation signal using "frequency band 1610 used by an NR apparatus", for example. Note that, in the example of FIG. 24A, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 24A, gNB 1100 transmits a modulation signal to a communication counterpart such as NR-UE #1 labeled 1101_1 in FIG. 18, for example, in the following manner: for example, at time 1, time 2, time 3, time 4, time 5, and time 6, gNB 1100 transmits modulation signals in "frame 1 labeled 2350_1 included in 'IEEE 802.11ad and/or IEEE 802.11 ay channel 2' labeled 1902", "frame 2 labeled 2350_2 included in 'IEEE 802.11ad and/or IEEE 802.11ay channel 3' labeled 1903", and "frame 3 labeled 2350_3 included in 'IEEE 802.11ad and/or IEEE 802.11ay channel 4' labeled 1904", respectively.

The gNB transmits these modulation signals subjected to frequency allocation as in the example of FIG. 24A. Note that "frame 1 labeled 2350_1", "frame 2 labeled 2350_2", and "frame 3 labeled 2350_3" include data to be transmitted to NR-UE #1 being the communication counterpart labeled 1101_1, for example.

Note that, although not illustrated in FIG. 24A, the modulation signals transmitted by gNB 1100 may include a frame, symbol, slot, etc. other than "frame I labeled 2350_1", "frame 2 labeled 2350_2", and "frame 3 labeled 2350_3" addressed to NR-UE #1 labeled 1101_1. In FIG. 24A. NR channels for the modulation signals transmitted by gNB 1100 are not illustrated.

In FIG. 18, it is assumed that gNB 1100 transmits a modulation signal in frame 1660 as in FIG. 19B using transmit beam 1502. Note that FIG. 19B has already been described, and thus the description thereof will be omitted.

Then, "AP 1110 or UE 1111" detects transmit beam 1502 transmitted by gNB 1100, and "AP 1110 or UE 1111" detects a signal when performing signal detection (corresponding to LBT) for the frequency in which frame 1600 in "IEEE 802.11ad and/or IEEE 802.11ay channel 3" labeled 1903 in FIG. 19B is present. Thus, "AP 1110 or UE 1111" does not transmit a modulation signal using transmit beam 1803 in FIG. 18 for the frequency in which frame 1600 in "IEEE 802.11ad and/or IEEE 802.11ay channel 3" labeled 1903 in FIG. 19B is present. This reduces the data transmission efficiency of the system.

In addition, when "AP 1110 or UE 1111" transmits a modulation signal using transmit beam 1803 in FIG. 18 without performing signal detection for the frequency in which frame 1600 in "IEEE 802.11ad and/or IEEE 802.11ay channel 3" labeled 1903 in FIG. 19B is present, another apparatus may be interfered with. This reduces the transmission efficiency of the system.

Meanwhile, in FIG. 18, it is assumed that gNB 1100 transmits modulation signals in "slot 1 labeled 1650_1, slot 2 labeled 1650_2, slot 3 labeled 1650_3, slot 4 labeled 1650_4, slot 5 labeled 1650_5, slot 6 labeled 1650_6, and so forth" as in FIG. 19A using transmit beam 1502.

When the modulation signals are transmitted in this manner, the modulation signals are present in "IEEE 802.11ad and/or IEEE 802.11ay channel 2", "IEEE 802.11ad and/or IEEE 802.11ay channel 3" labeled 1903, and "IEEE 802.11ad and/or IEEE 802.11ay channel 4" labeled 1904 in FIG. 24A, and the time intervals at which the modulation signals are present can be made shorter than in the case of FIG. 19B. It is thus possible to reduce time of interference with other apparatuses, so as to obtain the effect of preventing a decrease in data transmission efficiency.

A description will be given of an exemplary operation of an NR apparatus in the "area (or country) where LBT is not performed".

In the "area (or country) where LBT is not performed", LBT is not performed before an NR apparatus transmits a modulation signal. For example, an NR apparatus with both the "LBT mode" and "no-LBT mode" operates the "no-LBT mode". In the "area (or country) where LBT is not performed", an NR apparatus with "no-LBT mode" and an NR apparatus without an LBT function may be present.

In this case, such NR apparatuses may transmit modulation signals using a communication method as in the example of FIG. 24A (not limited to the example of FIG. 24A, however) as one of modes that are less likely to cause interference to another apparatus. Note that such NR apparatuses may include a mode of transmitting a modulation signal by a communication method other than that in FIG. 24A. A variation of the "communication method as in the example of FIG. 24A" that is less likely to cause interference to another apparatus will be described later.

A description will be given of an exemplary operation of an NR apparatus in the "area (or country) where LBT may be performed".

In the "area (or country) where LBT may be performed", an NR apparatus may "perform LBT" or may "not perform LBT" before transmitting a modulation signal.

When an NR apparatus with both the "LBT mode" and "no-LBT mode" performs LBT, the NR apparatus operates the "LBT mode" and performs LBT before transmitting a modulation signal.

Meanwhile, when an NR apparatus with both the "LBT mode" and "no-LBT mode" does not perform LBT, the "no-LBT mode" is operated, and at this time, applying a communication method that causes less interference to another apparatus improves the data transmission efficiency of the system. Thus, an NR apparatus may transmit a modulation signal by a communication method as in the example of FIG. 24A (not limited to the example of FIG. 24A, however) as one of methods of the "no-LBT mode".

Note that the NR apparatus with both the "LBT mode" and "no-LBT mode" may include a mode of transmitting a modulation signal by a communication method other than that in FIG. 24A. A variation of the "communication method as in the example of FIG. 24A" that causes less interference to another apparatus will be described later.

In the "area (or country) where LBT may be performed", an NR apparatus with "no-LBT mode" and an NR apparatus without an LBT function may be present. In this case, such NR apparatuses may transmit modulation signals by a communication method as in the example of FIG. 24A (not limited to the example of FIG. 24A, however). This reduces interference to another apparatus and produces an effect of improving data transmission efficiency of the system.

Note that such NR apparatuses may include a mode of transmitting a modulation signal by a communication method other than that in FIG. 24A. A variation of the "communication method as in the example of FIG. 24A" that causes less interference to another apparatus will be described later.

In the "area (or country) where LBT is necessary", an NR apparatus "performs LBT" before transmitting a modulation signal. In this case, the "LBT mode" is operated in the NR apparatus.

At this time, the NR apparatus performs LBT before transmitting a modulation signal, and when determining that the modulation signal can be transmitted, the NR apparatus may transmit the modulation signal by the communication method as in the example of FIG. 24A (not limited to the example of FIG. 24A, however). This reduces interference to another apparatus and produces an effect of improving data transmission efficiency of the system.

Note that the NR apparatuses may include a mode of transmitting a modulation signal by a communication method other than that in FIG. 24A. A variation of the "communication method as in the example of FIG. 24A" that causes less interference to another apparatus will be described later.

Figure 24B:
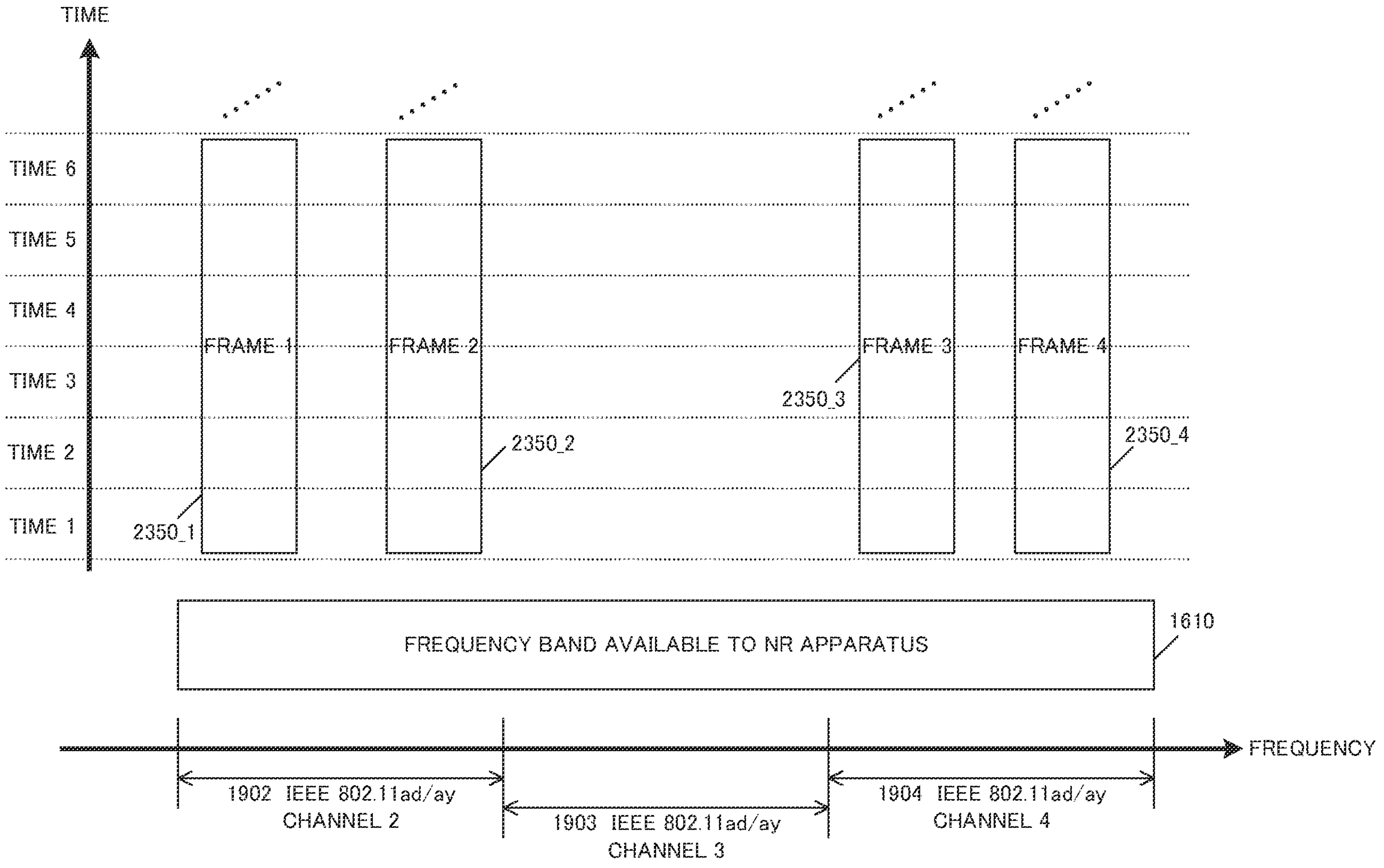
FIG. 24B illustrates an exemplary configuration of frames for a modulation signal transmitted by gNB.
Figure 24C:
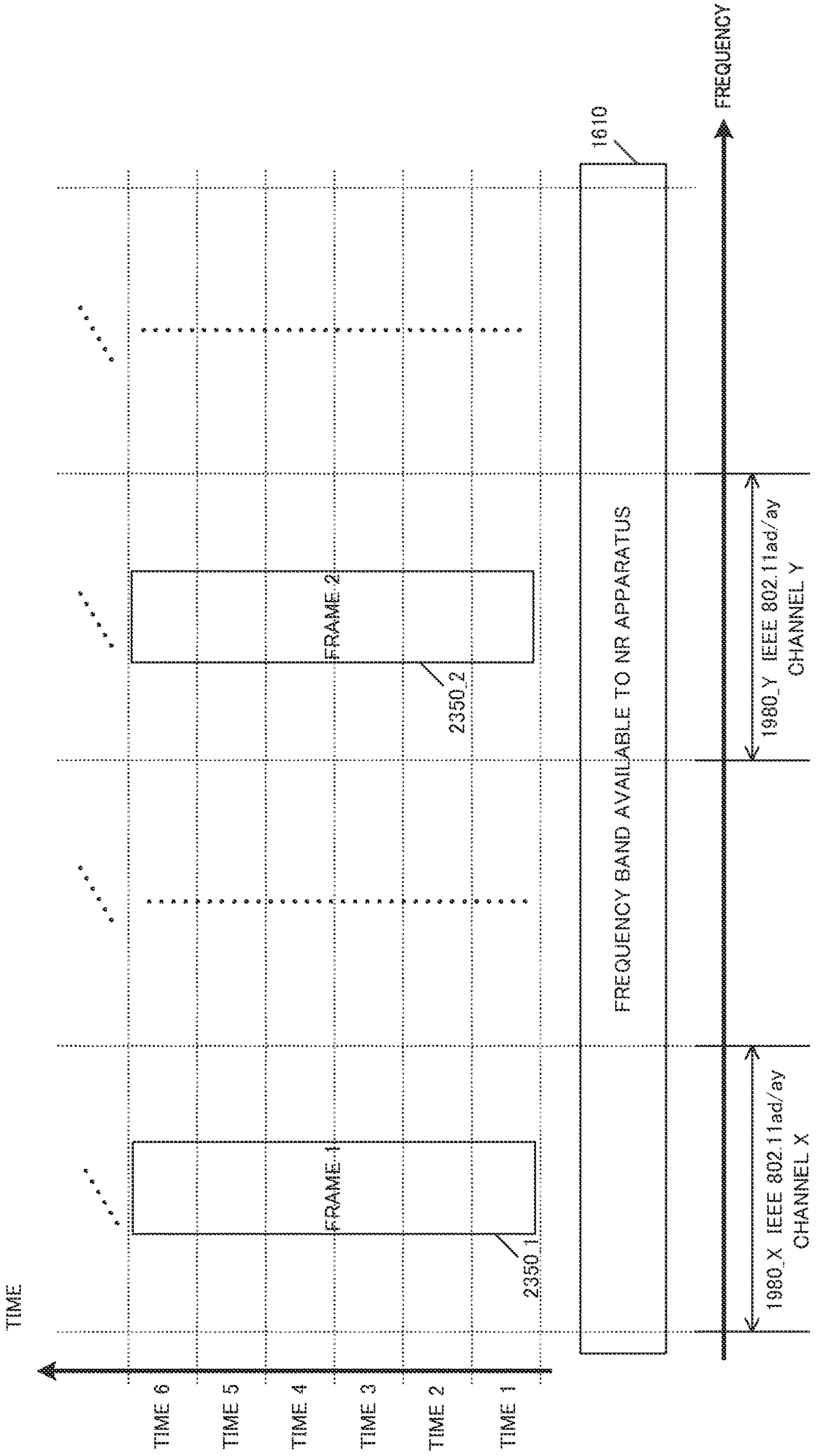
FIG. 24C illustrates an exemplary configuration of frames for a modulation signal transmitted by gNB.

The variation of the "communication method as in the example of FIG. 24A" that causes less interference to another apparatus includes communication methods in FIGS. 24B and 24C.

FIG. 24B illustrates, for example, an exemplary configuration of slots for a modulation signal transmitted by gNB 1100 in FIG. 18, and the horizontal axis represents frequency while the vertical axis represents time. Note that, in FIG. 24B, components that operate in the same manner as in FIGS. 16A, 19A, and 23A are denoted by the same reference signs, and the description thereof will be partially omitted.

As illustrated in FIG. 24B, "IEEE 802.11ad and/or IEEE 802.1 ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 24B, for example, "frequency band 1610 used by an NR apparatus" is present, and gNB 1100 in FIG. 18 transmits a modulation signal using "frequency band 1610 used by an NR apparatus", for example. Note that, in the example of FIG. 24B, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 24B, gNB 1100 transmits a modulation signal to a communication counterpart such as NR-UE #1 labeled 1101_1 in FIG. 18, for example, in the following manner.

At time 1, time 2, time 3, time 4, time 5, and time 6, gNB 1100 transmits modulation signals, for example, in "frame 1 labeled 2350_1 included in 'IEEE 802.11ad and/or IEEE 802.11ay channel 2' labeled 1902", "frame 2 labeled 2350_2 included in 'IEEE 802.11ad and/or IEEE 802.11ay channel 2' labeled 1902", "frame 3 labeled 2350_3 included in 'IEEE 802.11ad and/or IEEE 802.11ay channel 4' labeled 1904", and "frame 4 labeled 2350_4 included in 'IEEE 802.11ad and/or IEEE 802.11ay channel 4' labeled 1904", for example.

The gNB transmits these modulation signals subjected to frequency allocation as in the example of FIG. 24B. Note that "frame 1 labeled 2350_1", "frame 2 labeled 2350_2", "frame 3 labeled 2350_3", and "frame 4 labeled 2350_4" include data to be transmitted to NR-UE #1 being the communication counterpart labeled 1101_1, for example.

Note that, although not illustrated in FIG. 24B, the modulation signals transmitted by gNB 1100 may include a frame, symbol, slot, etc. other than "frame 1 labeled 2350_1", "frame 2 labeled 2350_2", "frame 3 labeled 2350_3", and "frame 4 labeled 2350_4" addressed to NR-UE #1 labeled 1101_1. In FIG. 24B, NR channels for the modulation signals transmitted by gNB 1100 are not illustrated.

FIG. 24C illustrates, for example, an exemplary configuration of slots for a modulation signal transmitted by gNB 1100 in FIG. 18, and the horizontal axis represents frequency while the vertical axis represents time. Note that, in FIG. 24C, components that operate in the same manner as in FIGS. 16A, 19A, 19K, and 23A are denoted by the same reference signs, and the description thereof will be partially omitted.

As illustrated in FIG. 24C, "IEEE 802.11ad and/or IEEE 802.11ay channel X" labeled 1980_X and "IEEE 802.11ad and/or IEEE 802.11ay channel Y" labeled 1980_Y are present for the frequency axis. In FIG. 24C, for example, "frequency band 1610 used by an NR apparatus" is present, and gNB 1100 in FIG. 18 transmits a modulation signal using "frequency band 1610 used by an NR apparatus", for example. Note that, in the example of FIG. 24C, "frequency band 1610 used by an NR apparatus" includes "all or part of 'IEEE 802.11ad and/or IEEE 802.11ay channel X' labeled 1980_X" and "all or part of 'IEEE 802.11ad and/or IEEE 802.11ay channel Y' labeled 1980_Y".

Then, as illustrated in FIG. 24C, gNB 1100 transmits a modulation signal to a communication counterpart such as NR-UE #1 labeled 1101_1 in FIG. 18, for example, in the following manner: at time 1, time 2, time 3, time 4, time 5, and time 6, gNB 1100 transmits modulation signals in "frame I labeled 2350_1 included in 'IEEE 802.11 ad and/or IEEE 802.11ay channel X' labeled 1980_X" and "frame 2 labeled 2350_2 included in 'IEEE 802.11ad and/or IEEE 802.11ay channel Y' labeled 1980_Y", for example.

The gNB transmits these modulation signals as in the example of FIG. 24C. Note that the frames, such as "frame 1 labeled 2350_1" and "frame 2 labeled 2350_2", include data to be transmitted to NR-UE #1 being the communication counterpart labeled 1101_1.

Features in FIG. 24C in this case are as follows.

When at least "the first 'IEEE 802.11ad and/or IEEE 802.11ay channel'" and "the second 'IEEE 802.11ad and/or IEEE 802.11ay channel'" in which the frames are present are present, one or more "IEEE 802.11 ad and/or IEEE 802.11 ay channels" are present between "the first 'IEEE 802.11ad and/or IEEE 802.11ay channel'" and "the second 'IEEE 802.11ad and/or IEEE 802.11ay channel'".

For example, in FIG. 24C, the frames are present in "IEEE 802.11ad and/or IEEE 802.11ay channel X" labeled 1980_X (the first "IEEE 802.11ad and/or IEEE 802.11ay channel") and the frames are present in "IEEE 802.11ad and/or IEEE 802.11ay channel Y" labeled 1980_Y (the second "IEEE 802.11 ad and/or IEEE 802.11 ay channel").

In this case, one or more "IEEE 802.11ad and/or IEEE 802.11ay channels" are present between "IEEE 802.11ad and/or IEEE 802.11ay channel X" labeled 1980_X (the first "IEEE 802.11ad and/or IEEE 802.11ay channel") and "IEEE 802.11ad and/or IEEE 802.11ay channel Y" labeled 1980_Y (the second "IEEE 802.11ad and/or IEEE 802.11ay channel").

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "frame I labeled 2350_1" is present and a second modulation signal defined by IEEE 802.11ay is present at a part where "frame 2 labeled 2350_2" are present in in FIG. 24C, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 24C.

Note that, although not illustrated in FIG. 24B, the modulation signals transmitted by gNB 1100 may include a frame, symbol, slot, etc. other than "frame 1 labeled 2350_1" and "frame 2 labeled 2350_2" addressed to NR-UE #1 labeled 1101_1. In FIG. 24C, NR channels for the modulation signals transmitted by gNB 1100 are not illustrated.

Although exemplary frame arrangements have been described above with reference to FIGS. 24A, 24B, and 24C, the frame arrangement method is not limited to these examples, and frames may be arranged or configured using two or more frame arrangement/configuration methods of the "frame arrangement/configuration method in FIG. 24A", the "frame arrangement/configuration method in FIG. 24B", and the "frame arrangement/configuration method in FIG. 24C", for example.

For example, the IEEE 802.11ad and/or IEEE 802.11ay channels to which the frames belong in FIGS. 24A, 24B, and 24C are not limited to this example.

As long as a plurality of frames are placed in any of the IEEE 802.11ad and/or IEEE 802.11ay channels, such as "'IEEE 802.11ad and/or IEEE 802.11ay channel 2' labeled 1902", "'IEEE 802.11ad and/or IEEE 802.11ay channel 3' labeled 1903", and "'IEEE 802.11ad and/or IEEE 802.11ay channel 4' labeled 1904", on the frequency axis in FIGS. 24A and 24B, the same as the above description can be implemented and the same effects can be obtained as well.

Further, in the cases of FIGS. 24A, 24B, and 24C, the number of IEEE 802.11ad and/or IEEE 802.11ay channels to which the frames belong is two or three, but the present disclosure is not limited to this, and the same as the above description can be implemented and the same effects can be obtained as long as the number of IEEE 802.11ad and/or IEEE 802.11ay channels to which the frames belong is two or more.

Thus, a method of using time and frequency for transmitting a modulation signal by gNB is not limited to the examples of FIGS. 24A, 24B, and 24C, and the number of IEEE 802.11ad and/or IEEE 802.11ay channels to which frames belong only needs to be two or more.

Further, one frame may be present in each IEEE 802.11ad and/or IEEE 802.11ay channel as in FIG. 24A, or two or more frames (two frames in the case of FIG. 24B) may be present in each IEEE 802.11ad and/or IEEE 802.11ay channel as in FIG. 24B.

In the following, a description will be given of exemplary slot arrangement on the frequency and time axes that is a variation of the arrangements in "FIGS. 24A, 24B, and 24C" and is different from the arrangements in "FIGS. 24A, 24B, and 24C".

Figure 24D:
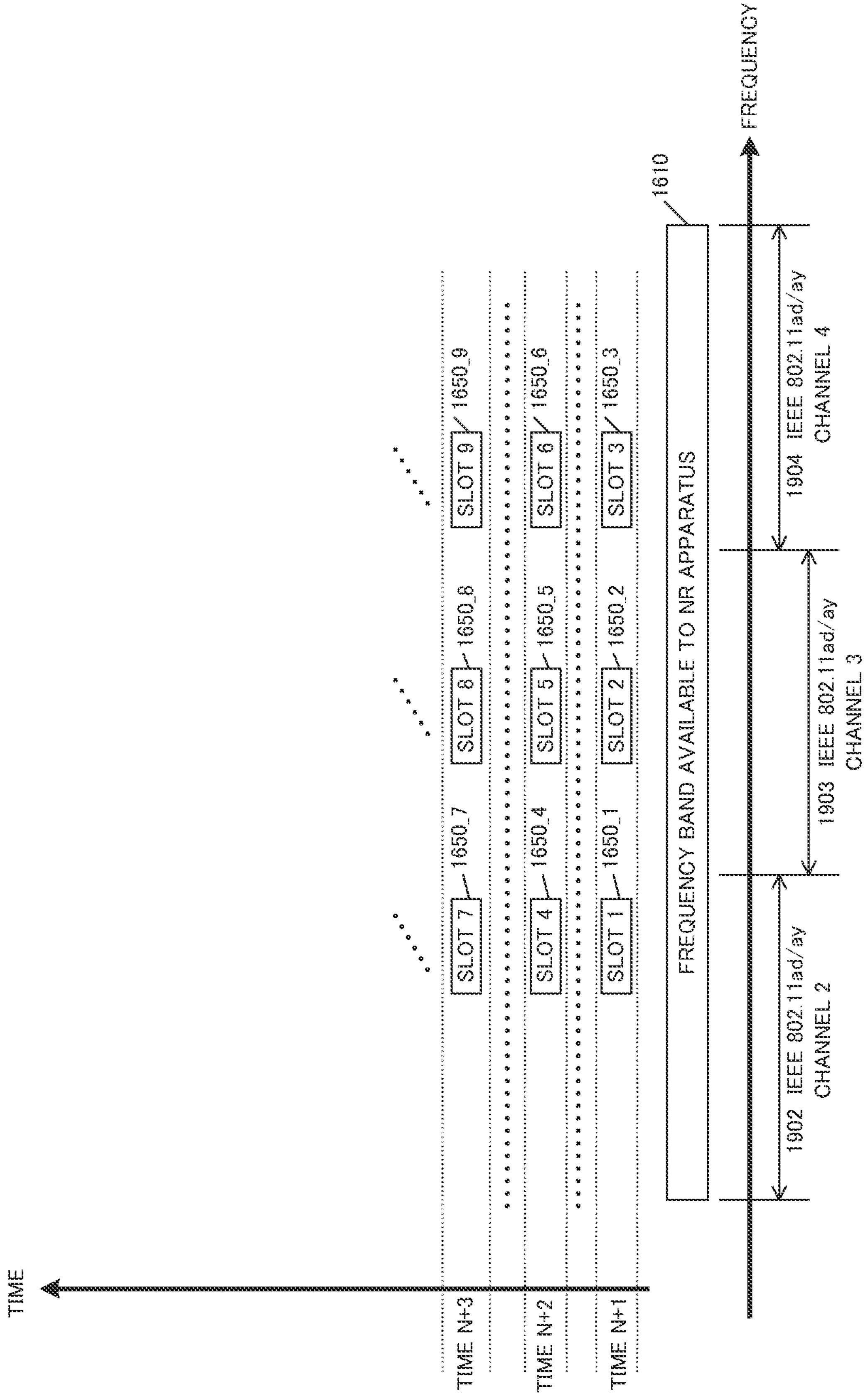
FIG. 24D illustrates an exemplary configuration of slots for a modulation signal transmitted by gNB.

FIG. 24D illustrates, for example, an exemplary configuration of slots for a modulation signal transmitted by gNB 1100 in FIG. 18, and the horizontal axis represents frequency while the vertical axis represents time. Note that, in FIG. 24D, components that operate in the same manner as in FIGS. 16A and 19A are denoted by the same reference signs, and the description thereof will be partially omitted.

As illustrated in FIG. 24D, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 24D, for example, "frequency band 1610 used by an NR apparatus" is present, and gNB 1100 in FIG. 18 transmits a modulation signal using "frequency band 1610 used by an NR apparatus", for example. Note that, in the example of FIG. 24D, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 24D, gNB 1100 transmits a modulation signal to a communication counterpart such as NR-UE #1 labeled 1101_1 in FIG. 18, for example, in the following manner: at time N+1, gNB 1100 transmits a modulation signal in "slot 1 labeled 1650_1 included in 'IEEE 802.11ad and/or IEEE 802.11ay channel 2' labeled 1902", "slot 2 labeled 1650_2 included in 'IEEE 802.11ad and/or IEEE 802.11ay channel 3' labeled 1903", and "slot 3 labeled 1650_3 included in 'IEEE 802.11ad and/or IEEE 802.11ay channel 4' labeled 1904", at time N+2, gNB 1100 transmits a modulation signal in "slot 4 labeled 1650_4 included in 'IEEE 802.11ad and/or IEEE 802.11ay channel 2' labeled 1902". "slot 5 labeled 1650_5 included in 'IEEE 802.11ad and/or IEEE 802.11ay channel 3' labeled 1903", and "slot 6 labeled 1650_6 included in 'IEEE 802.11ad and/or IEEE 802.11ay channel 4' labeled 1904", at time N+3, gNB 1100 transmits a modulation signal in "slot 7 labeled 1650_7 included in 'IEEE 802.11ad and/or IEEE 802.11ay channel 2' labeled 1902", "slot 8 labeled 1650_8 included in 'IEEE 802.11ad and/or IEEE 802.11ay channel 3' labeled 1903", and "slot 9 labeled 1650_9 included in 'IEEE 802.11ad and/or IEEE 802.11ay channel 4' labeled 1904", and so forth.

Note that another "frame, symbol, signal, etc." may be present between time N+I and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals as in the example of FIG. 24D. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9", and so forth.

For example, the frequency of "slot 1 labeled 1650_1", the frequency of "slot 4 labeled 1650_4", and the frequency of "slot 7 labeled 1650_7" may be the same or partially overlap each other.

Likewise, the frequency of "slot 2 labeled 1650_2", the frequency of "slot 5 labeled 1650_5", and the frequency of "slot 8 labeled 1650_8" may, for example, be the same or partially overlap each other.

For example, the frequency of "slot 3 labeled 1650_3", the frequency of "slot 6 labeled 1650_6", and the frequency of "slot 9 labeled 1650_9" may be the same or partially overlap each other.

Note that, although not illustrated in FIG. 24D, the modulation signal transmitted by gNB 1100 may include a frame, symbol, slot, etc. other than "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", "slot 7 labeled 1650_7", "slot 8 labeled 1650_8", "slot 9 labeled 1650_9', and so forth" addressed to NR-UE #1 labeled 1101_1. In FIG. 24D, NR channels for the modulation signals transmitted by gNB 1100 are not illustrated.

Figure 24E:
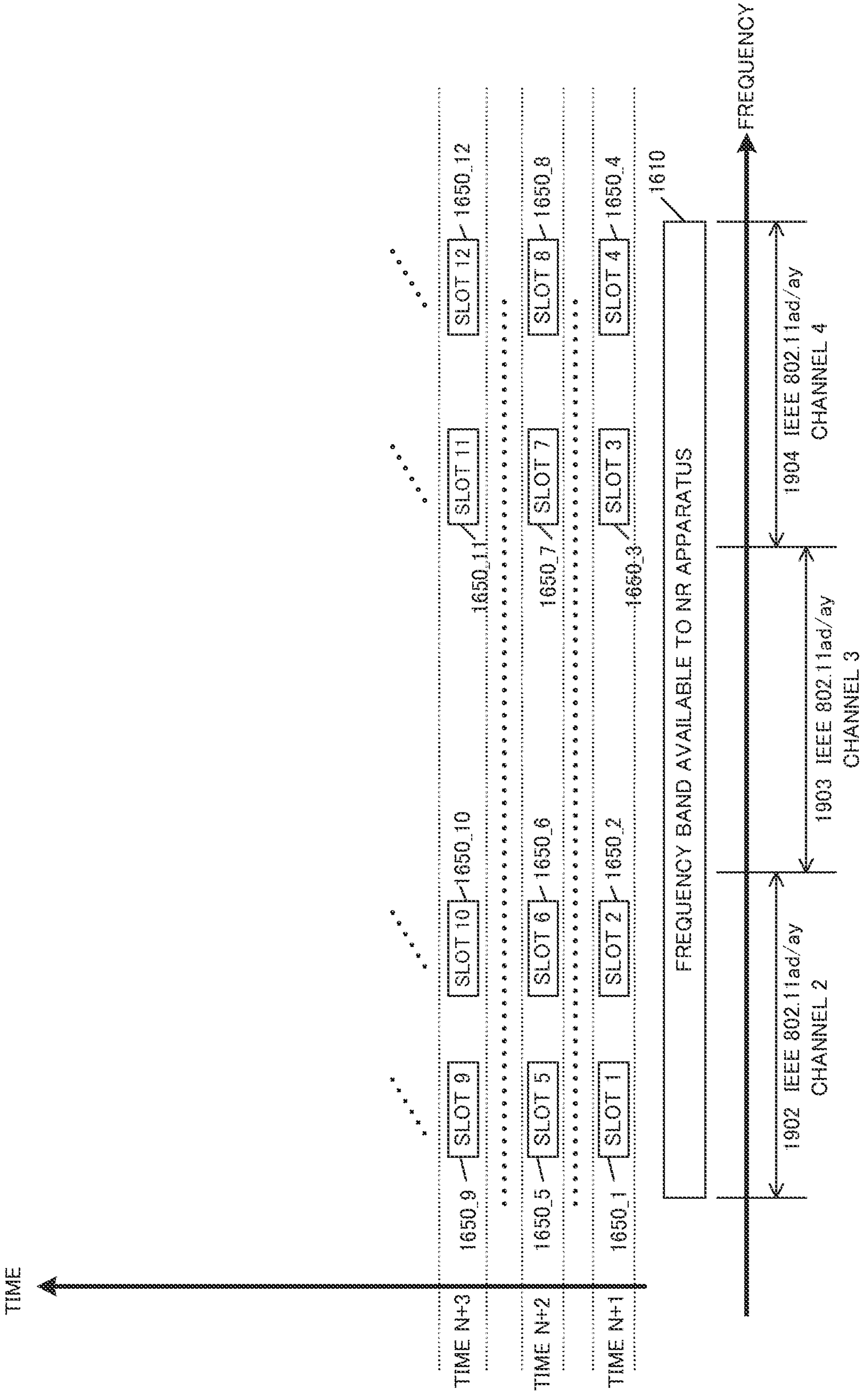
FIG. 24E illustrates an exemplary configuration of slots for a modulation signal transmitted by gNB.

FIG. 24E illustrates, for example, an exemplary configuration of slots for a modulation signal transmitted by gNB 1100 in FIG. 18, and the horizontal axis represents frequency while the vertical axis represents time. Note that, in FIG. 24E, components that operate in the same manner as in FIGS. 16A and 19A are denoted by the same reference signs, and the description thereof will be partially omitted.

As illustrated in FIG. 24E, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 24E, for example, "frequency band 1610 used by an NR apparatus" is present, and gNB 1100 in FIG. 18 transmits a modulation signal using "frequency band 1610 used by an NR apparatus", for example. Note that, in the example of FIG. 24E, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 24E, gNB 1100 transmits a modulation signal to a communication counterpart such as NR-UE #1 labeled 1101_1 in FIG. 18, for example, in the following manner: at time N+1, gNB 1100 transmits a modulation signal in "slot 1 labeled 1650_1 included in 'IEEE 802.11ad and/or IEEE 802.11ay channel 2' labeled 1902", "slot 2 labeled 1650_2 included in 'IEEE 802.11ad and/or IEEE 802.11ay channel 2' labeled 1902", "slot 3 labeled 1650_3 included in 'IEEE 802.11ad and/or IEEE 802.11ay channel 4' labeled 1904", and "slot 4 labeled 1650_4 included in 'IEEE 802.11ad and/or IEEE 802.11ay channel 4' labeled 1904", at time N+2, gNB 1100 transmits a modulation signal in "slot 5 labeled 1650_5 included in 'IEEE 802.11ad and/or IEEE 802.11ay channel 2' labeled 1902", "slot 6 labeled 1650_6 included in 'IEEE 802.11 ad and/or IEEE 802.11ay channel 2' labeled 1902", "slot 7 labeled 1650_7 included in 'IEEE 802.11ad and/or IEEE 802.11ay channel 4' labeled 1904", and "slot 8 labeled 1650_8 included in 'IEEE 802.11ad and/or IEEE 802.11ay channel 4' labeled 1904", at time N+3, gNB 1100 transmits a modulation signal in "slot 9 labeled 1650_9 included in 'IEEE 802.11ad and/or IEEE 802.11ay channel 2' labeled 1902". "slot 10 labeled 1650_10 included in 'IEEE 802.11ad and/or IEEE 802.11ay channel 2' labeled 1902", "slot 11 labeled 1650_11 included in 'IEEE 802.11ad and/or IEEE 802.11ay channel 4' labeled 1904", and "slot 12 labeled 1650_12 included in 'IEEE 802.11ad and/or IEEE 802.11ay channel 4' labeled 1904", and so forth.

Note that another "frame, symbol, signal, etc." may be present between time N+I and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1. The gNB transmits these modulation signals as in the example of FIG. 24E. Note that data to be transmitted to NR-UE #1 being the communication counterpart labeled 1101_1 is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6". "slot 7 labeled 16507", "slot 8 labeled 1650_8", "slot 9 labeled 1650_9", "slot 10 labeled 1650_10", "slot 1I labeled 1650_11", "slot 12 labeled 1650_12", and so forth.

For example, the frequency of "slot 1 labeled 1650_1", the frequency of "slot 5 labeled 1650_5", and the frequency of "slot 6 labeled 1650_6" may be the same or partially overlap each other.

Likewise, the frequency of "slot 2 labeled 1650_2", the frequency of "slot 6 labeled 1650_6", and the frequency of "slot 10 labeled 1650_10" may, for example, be the same or partially overlap each other.

For example, the frequency of "slot 3 labeled 1650_3", the frequency of "slot 7 labeled 1650_7", and the frequency of "slot 11 labeled 1650_11" may be the same or partially overlap each other.

For example, the frequency of "slot 4 labeled 1650_4", the frequency of "slot 8 labeled 1650_8", and the frequency of "slot 12 labeled 1650_12" may be the same or partially overlap each other.

Note that, although not illustrated in FIG. 24E, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', 'slot 7 labeled 1650_7', 'slot 8 labeled 1650_8', 'slot 9 labeled 16509', 'slot 10 labeled 1650_10', 'slot 11 labeled 1650_11', 'slot 12 labeled 1650_12', and so forth" addressed to NR-UE #1 labeled 1101_1. In FIG. 24E, NR channels for the modulation signals transmitted by gNB 1100 are not illustrated.

Figure 24F:
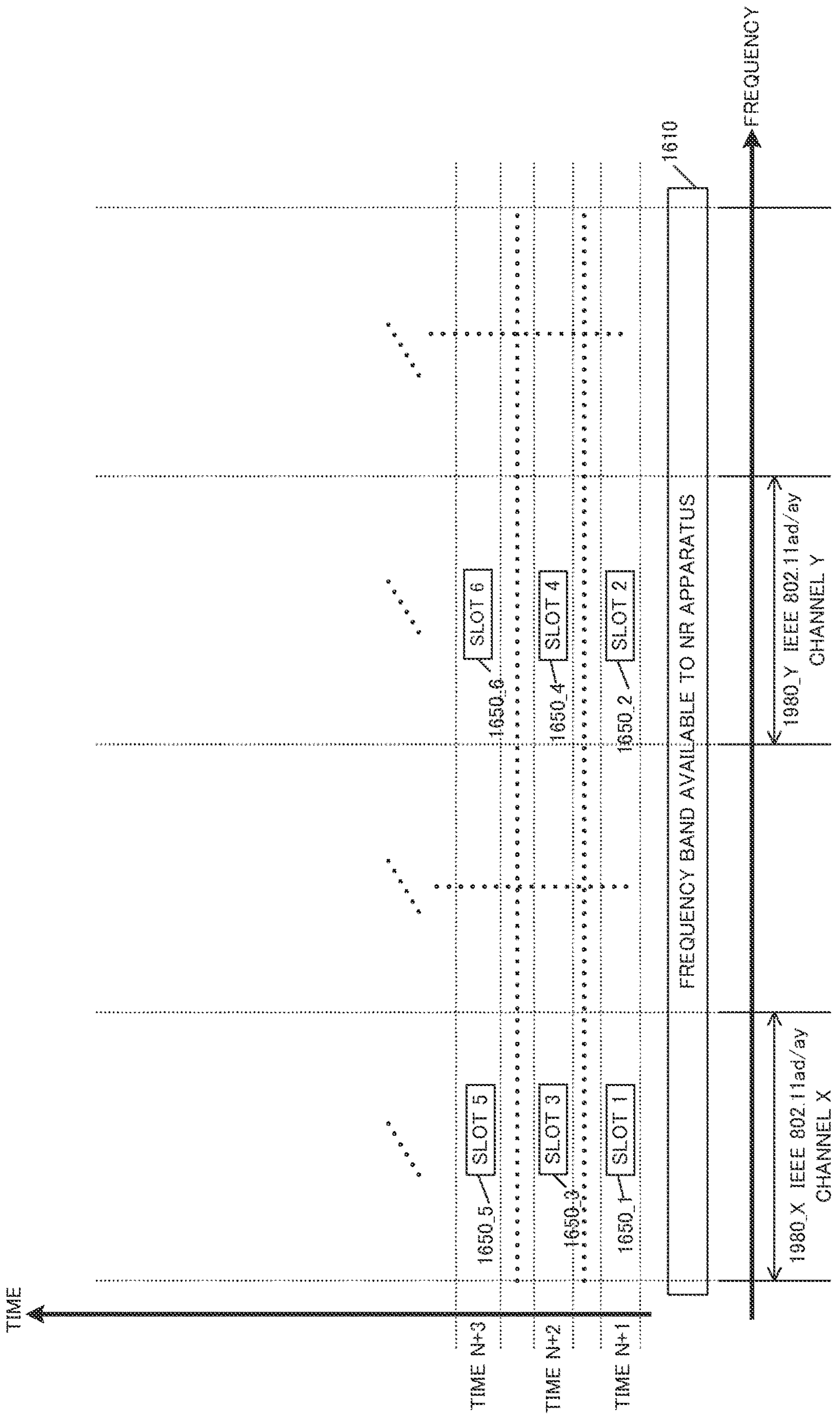
FIG. 24F illustrates an exemplary configuration of slots for a modulation signal transmitted by gNB.

FIG. 24F illustrates, for example, an exemplary configuration of slots for a modulation signal transmitted by gNB 1100 in FIG. 18, and the horizontal axis represents frequency while the vertical axis represents time. Note that, in FIG. 24F, components that operate in the same manner as in FIGS. 16A, 19A, 19K, and 23A are denoted by the same reference signs, and the description thereof will be partially omitted.

As illustrated in FIG. 24F, "IEEE 802.11ad and/or IEEE 802.11ay channel X" labeled 1980_X and "IEEE 802.11ad and/or IEEE 802.11 ay channel Y" labeled 1980_Y are present for the frequency axis. In FIG. 24F, for example, "frequency band 1610 used by an NR apparatus" is present, and gNB 1100 in FIG. 18 transmits a modulation signal using "frequency band 1610 used by an NR apparatus", for example. Note that, in the example of FIG. 24F, "frequency band 1610 used by an NR apparatus" includes "all or part of 'IEEE 802.11ad and/or IEEE 802.11ay channel X' labeled 1980_X" and "all or part of 'IEEE 802.11ad and/or IEEE 802.11ay channel Y' labeled 1980_Y".

Then, as illustrated in FIG. 24F, gNB 1100 transmits a modulation signal to a communication counterpart such as NR-UE #1 labeled 1101_1 in FIG. 18, for example, in the following manner: at time N+1, gNB 1100 transmits a modulation signal in "slot 1 labeled 1650_1 included in 'IEEE 802.11ad and/or IEEE 802.11ay channel X' labeled 1980_X" and "slot 2 labeled 1650_2 included in 'IEEE 802.11ad and/or IEEE 802.11ay channel Y' labeled 1980_Y, at time N+2, gNB 1100 transmits a modulation signal in "slot 3 labeled 1650_3 included in 'IEEE 802.11ad and/or IEEE 802.11ay channel X' labeled 1980_X" and "slot 4 labeled 1650_4 included in 'IEEE 802.11ad and/or IEEE 802.11ay channel Y' labeled 1980_Y, at time N+3, gNB 1100 transmits a modulation signal in "slot 5 labeled 1650_5 included in 'IEEE 802.11ad and/or IEEE 802.11ay channel X' labeled 1980_X" and "slot 6 labeled 1650_6 included in 'IEEE 802.11ad and/or IEEE 802.11ay channel Y' labeled 1980_Y, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here. N is an integer equal to or greater than 0, and i is an integer equal to or greater than 1. The gNB transmits these modulation signals as in the example of FIG. 24F. Note that data to be transmitted to NR-UE #1 being the communication counterpart labeled 1101_1 is included in the frames such as "slot 1 labeled 1650_1", "slot 2 labeled 1650_2". "slot 3 labeled 1650_3", "slot 4 labeled 1650_4", "slot 5 labeled 1650_5", "slot 6 labeled 1650_6", and so forth.

For example, the frequency of "slot 1 labeled 1650_1", the frequency of "slot 3 labeled 1650_3", and the frequency of "slot 5 labeled 1650_5" may be the same or partially overlap each other.

Likewise, the frequency of "slot 2 labeled 1650_2", the frequency of "slot 4 labeled 1650_4", and the frequency of "slot 6 labeled 1650_6" may, for example, be the same or partially overlap each other.

Features in FIG. 24F in this case are as follows. When at least "the first 'IEEE 802.11ad and/or IEEE 802.11ay channel'" and "the second 'IEEE 802.11ad and/or IEEE 802.11ay channel'" in which the slots are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11ay channel'".

For example, in FIG. 24F, slots are present in "IEEE 802.11ad and/or IEEE 802.11ay channel X" labeled 1980_X (the first "IEEE 802.11ad and/or IEEE 802.11ay channel") and slots are present in "IEEE 802.11ad and/or IEEE 802.11ay channel Y" labeled 1980_Y (the second "IEEE 802.11ad and/or IEEE 802.11ay channel").

In this case, one or more "IEEE 802.11ad and/or IEEE 802.11ay channels" are present between "IEEE 802.11ad and/or IEEE 802.11ay channel X" labeled 1980_X (the first "IEEE 802.11ad and/or IEEE 802.11ay channel") and "IEEE 802.11ad and/or IEEE 802.11ay channel Y" labeled 1980Y (the second "IEEE 802.11ad and/or IEEE 802.11ay channel").

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "frame 1 labeled 2350_1" is present and a second modulation signal defined by IEEE 802.11ay is present at a part where "frame 2 labeled 2350_2" are present in in FIG. 24F, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 24F.

Note that, although not illustrated in FIG. 24F, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 24F, NR channels for the modulation signals transmitted by gNB 1100 are not illustrated.

Although exemplary slot arrangements have been described above with reference to FIGS. 24D, 24E, and 24F, the slot arrangement method is not limited to these examples, and slots may be arranged or configured using two or more slot arrangement/configuration methods of the "slot arrangement/configuration method in FIG. 24D", the "slot arrangement/configuration method in FIG. 24E", and the "slot arrangement/configuration method in FIG. 24F", for example.

For example, the IEEE 802.11ad and/or IEEE 802.11ay channels to which the slots belong in FIGS. 24D, 24E and 24F are not limited to this example.

As long as a plurality of slots are placed in any of the IEEE 802.11ad and/or IEEE 802.11ay channels, such as "'IEEE 802.11ad and/or IEEE 802.11ay channel 2' labeled 1902", "'IEEE 802.11ad and/or IEEE 802.11ay channel 3' labeled 1903", and "'IEEE 802.11ad and/or IEEE 802.11ay channel 4' labeled 1904", on the frequency axis in FIGS. 24D and 24E, the same as the above description can be implemented and the same effects can be obtained as well.

Further, in the cases of FIGS. 24D, 24E and 24F, the number of IEEE 802.11ad and/or IEEE 802.11ay channels to which the slots belong is two or three, but the present disclosure is not limited to this, and the same as the above description can be implemented and the same effects can be obtained as long as the number of IEEE 802.11ad and/or IEEE 802.11ay channels to which the slots belong is two or more.

Thus, a method of using time and frequency for transmitting a modulation signal by gNB is not limited to the examples of FIGS. 24D, 24E and 24F, and the number of IEEE 802.11ad and/or IEEE 802.11ay channels to which slots belong only needs to be two or more.

Further, one slot may be present in each IEEE 802.11ad and/or IEEE 802.11ay channel as in FIG. 24D, or two or more slots (two slots in the case of FIG. 24E) may be present in each IEEE 802.11ad and/or IEEE 802.11ay channel as in FIG. 24E.

In the following, a description will be given of exemplary arrangement of OFDM symbols (parts of OFDM symbols) on the frequency and time axes that is a variation of the arrangements in "FIGS. 24A, 24B, 24C, 24D, 24E, and 24F" and is different from the arrangements in "FIGS. 24A, 24B, 24C, 24D, 24E, and 24F".

Figure 24G:
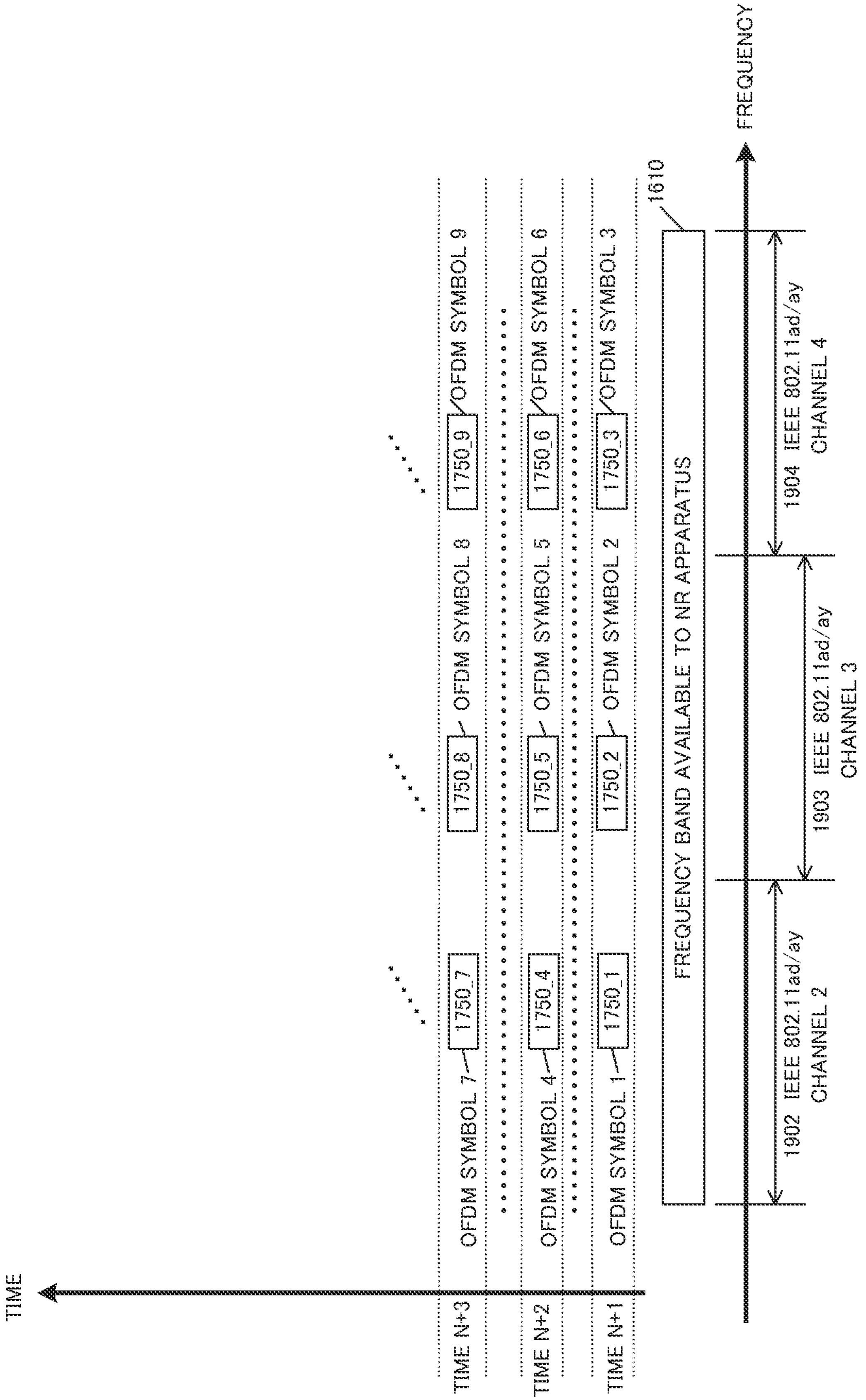
FIG. 24G illustrates an exemplary configuration of OFDM symbols for a modulation signal transmitted by gNB.

FIG. 24G illustrates, for example, an exemplary configuration of slots for a modulation signal transmitted by gNB 1100 in FIG. 18, and the horizontal axis represents frequency while the vertical axis represents time. Note that, in FIG. 24G, components that operate in the same manner as in FIGS. 16A, 17A, and 19A are denoted by the same reference signs, and the description thereof will be partially omitted.

As illustrated in FIG. 24G, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 24G, for example. "frequency band 1610 used by an NR apparatus" is present, and gNB 1100 in FIG. 18 transmits a modulation signal using "frequency band 1610 used by an NR apparatus", for example. Note that, in the example of FIG. 24G, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 24G, gNB 1100 transmits a modulation signal to a communication counterpart such as NR-UE #1 labeled 1101_1 in FIG. 18, for example, in the following manner: at time N+1, gNB 1100 transmits modulation signals in "OFDM symbol 1 (part of OFDM symbol 1) labeled 1750_1 included in 'IEEE 802.11ad and/or IEEE 802.11ay channel 2' labeled 1902", "OFDM symbol 2 (part of OFDM symbol 2) labeled 1750_2 included in 'IEEE 802.11ad and/or IEEE 802.11ay channel 3' labeled 1903", and "OFDM symbol 3 (part of OFDM symbol 3) labeled 1750_3 included in 'IEEE 802.11ad and/or IEEE 802.11ay channel 4' labeled 1904, at time N+2, gNB 1100 transmits modulation signals in "OFDM symbol 4 (part of OFDM symbol 4) labeled 1750_4 included in 'IEEE 802.11ad and/or IEEE 802.11ay channel 2' labeled 1902", "OFDM symbol 5 (part of OFDM symbol 5) labeled 1750_5 included in 'IEEE 802.11ad and/or IEEE 802.11ay channel 3' labeled 1903", and "OFDM symbol 6 (part of OFDM symbol 6) labeled 1750_6 included in 'IEEE 802.11ad and/or IEEE 802.11ay channel 4' labeled 1904, at time N+3, gNB 1100 transmits modulation signals in "OFDM symbol 7 (part of OFDM symbol 7) labeled 1750_7 included in 'IEEE 802.11ad and/or IEEE 802.11ay channel 2' labeled 1902". "OFDM symbol 8 (part of OFDM symbol 8) labeled 1750_8 included in 'IEEE 802.11ad and/or IEEE 802.11ay channel 3' labeled 1903", and "OFDM symbol 9 (part of OFDM symbol 9) labeled 1750_9 included in 'IEEE 802.11ad and/or IEEE 802.11ay channel 4' labeled 1904, and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals as in the example of FIG. 24G. Note that data to be transmitted to NR-UE #1 being the communication counterpart labeled 1101_1 is included in the OFDM symbols (parts of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9", and so forth.

For example, the frequency of "OFDM symbol 1 (part of OFDM symbol 1) labeled 1750_1", the frequency of "OFDM symbol 4 (part of OFDM symbol 4) labeled 1750_4", and the frequency of "OFDM symbol 7 (part of OFDM symbol 7) labeled 1750_7" may be the same or may partially overlap each other.

Likewise, for example, the frequency of "OFDM symbol 2 (part of OFDM symbol 2) labeled 1750_2", the frequency of "OFDM symbol 5 (part of OFDM symbol 5) labeled 1750_5", and the frequency of "OFDM symbol 8 (part of OFDM symbol 8) labeled 1750_8" may be the same or may partially overlap each other.

For example, the frequency of "OFDM symbol 3 (part of OFDM symbol 3) labeled 1750_3", the frequency of "OFDM symbol 6 (part of OFDM symbol 6) labeled 1750_6", and the frequency of "OFDM symbol 9 (part of OFDM symbol 9) labeled 1750_9" may be the same or may partially overlap each other.

Note that, although not illustrated in FIG. 24G, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9', and so forth" addressed to NR-UE #1 labeled 1101_1.

Figure 24H:
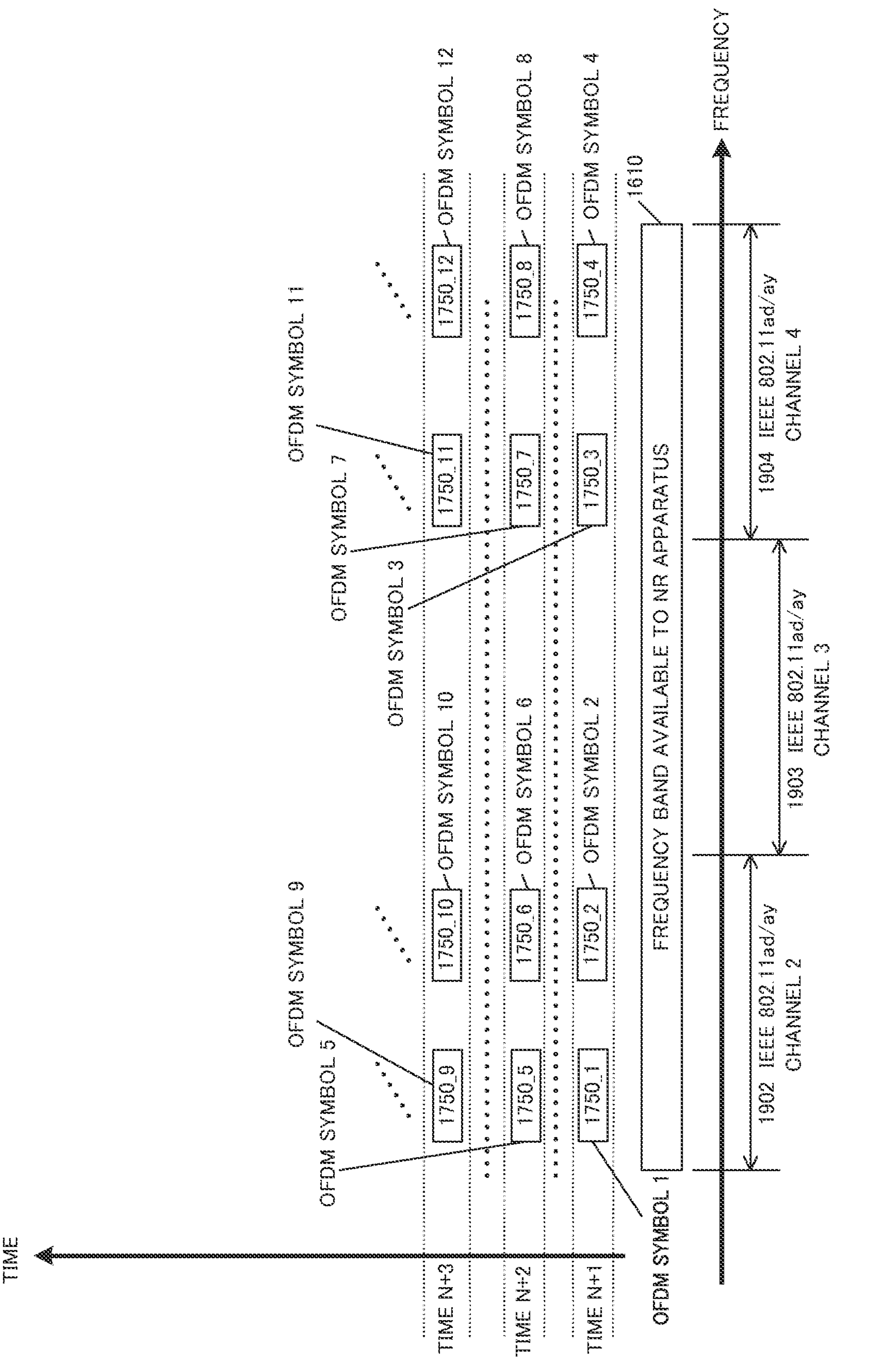
FIG. 24H illustrates an exemplary configuration of OFDM symbols for a modulation signal transmitted by gNB.

FIG. 24H illustrates, for example, an exemplary configuration of slots for a modulation signal transmitted by gNB 1100 in FIG. 18, and the horizontal axis represents frequency while the vertical axis represents time. Note that, in FIG. 24H, components that operate in the same manner as in FIGS. 16A, 17A, and 19A are denoted by the same reference signs, and the description thereof will be partially omitted.

As illustrated in FIG. 24H, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 24H, for example, "frequency band 1610 used by an NR apparatus" is present, and gNB 1100 in FIG. 18 transmits a modulation signal using "frequency band 1610 used by an NR apparatus", for example. Note that, in the example of FIG. 24H, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 24H, gNB 1100 transmits a modulation signal to a communication counterpart such as NR-UE #1 labeled 1101_1 in FIG. 18, for example, in the following manner: at time N+1, gNB 1100 transmits modulation signals in "OFDM symbol 1 (part of OFDM symbol 1) labeled 1750_1 included in 'IEEE 802.11 ad and/or IEEE 802.11ay channel 2' labeled 1902", "OFDM symbol 2 (part of OFDM symbol 2) labeled 1750_2 included in 'IEEE 802.11ad and/or IEEE 802.11ay channel 2' labeled 1902", "OFDM symbol 3 (part of OFDM symbol 3) labeled 1750_3 included in 'IEEE 802.11ad and/or IEEE 802.11ay channel 4' labeled 1904", and "OFDM symbol 4 (part of OFDM symbol 4) labeled 1750_4 included in 'IEEE 802.11ad and/or IEEE 802.11ay channel 4' labeled 1904, at time N+2, gNB 1100 transmits modulation signals in "OFDM symbol 5 (part of OFDM symbol 5) labeled 1750_5 included in 'IEEE 802.11ad and/or IEEE 802.1 ay channel 2' labeled 1902", "OFDM symbol 6 (part of OFDM symbol 6) labeled 1750_6 included in 'IEEE 802.11ad and/or IEEE 802.11ay channel 2' labeled 1902", "OFDM symbol 7 (part of OFDM symbol 7) labeled 1750_7 included in 'IEEE 802.11ad and/or IEEE 802.11ay channel 4' labeled 1904", and "OFDM symbol 8 (part of OFDM symbol 8) labeled 1750_8 included in 'IEEE 802.11ad and/or IEEE 802.11ay channel 4' labeled 1904, at time N+3, gNB 1100 transmits modulation signals in "OFDM symbol 9 (part of OFDM symbol 9) labeled 1750_9 included in 'IEEE 802.11ad and/or IEEE 802.11ay channel 2' labeled 1902", "OFDM symbol 10 (part of OFDM symbol 10) labeled 1750_10 included in 'IEEE 802.11ad and/or IEEE 802.11ay channel 2' labeled 1902", "OFDM symbol 11 (part of OFDM symbol 11) labeled 1750_11 included in 'IEEE 802.11ad and/or IEEE 802.11ay channel 4' labeled 1904", and "OFDM symbol 12 (part of OFDM symbol 12) labeled 1750_12 included in 'IEEE 802.11ad and/or IEEE 802.11ay channel 4' labeled 1904, and so forth.

Note that another "frame, symbol, signal, etc" may be present between time N+1 and time N+2.

Note that another "frame, symbol, signal, etc." may be present between time N+2 and time N+3 and so forth.

That is, another "frame, symbol, signal, etc." may be present in time N+i and time N+i+1. Here, N is an integer equal to or greater than 0, and i is an integer equal to or greater than 1. The gNB transmits these modulation signals as in the example of FIG. 24H. Note that data to be transmitted to NR-UE #1 being the communication counterpart labeled 1101_1 is included in the OFDM symbols (part of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9", "OFDM symbol 10 (part of OFDM symbol 10) labeled 1750_10", "OFDM symbol 11

(part of OFDM symbol 11) labeled 1750_11", "OFDM symbol 12 (part of OFDM symbol 12) labeled 1750_12", and so forth.

For example, the frequency of "OFDM symbol 1 (part of OFDM symbol 1) labeled 1750_1", the frequency of "OFDM symbol 5 (part of OFDM symbol 5) labeled 1750_5", and the frequency of "OFDM symbol 9 (part of OFDM symbol 9) labeled 1750_9" may be the same or may partially overlap each other.

Likewise, for example, the frequency of "OFDM symbol 2 (part of OFDM symbol 2) labeled 1750_2", the frequency of "OFDM symbol 6 (part of OFDM symbol 6) labeled 1750_6", and the frequency of "OFDM symbol 10 (part of OFDM symbol 10) labeled 1750_10" may be the same or may partially overlap each other.

For example, the frequency of "OFDM symbol 3 (part of OFDM symbol 3) labeled 1750_3", the frequency of "OFDM symbol 7 (part of OFDM symbol 7) labeled 1750_7", and the frequency of "OFDM symbol 11 (part of OFDM symbol 11) labeled 1750_11" may be the same or may partially overlap each other.

Likewise, for example, the frequency of "OFDM symbol 4 (part of OFDM symbol 4) labeled 1750_4", the frequency of "OFDM symbol 8 (part of OFDM symbol 8) labeled 1750_8", and the frequency of "OFDM symbol 12 (part of OFDM symbol 12) labeled 1750_12" may be the same or may partially overlap each other.

Note that, although not illustrated in FIG. 24H, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", "OFDM symbol 7 (part of OFDM symbol 7) labeled 1750_7", "OFDM symbol 8 (part of OFDM symbol 8) labeled 1750_8", "OFDM symbol 9 (part of OFDM symbol 9) labeled 1750_9", "OFDM symbol 10 (part of OFDM symbol 10) labeled 1750_10", "OFDM symbol 11 (part of OFDM symbol 11) labeled 1750_11", "OFDM symbol 12 (part of OFDM symbol 12) labeled 1750_12', and so forth" addressed to NR-UE #1 labeled 1101_1.

Figure 24I:
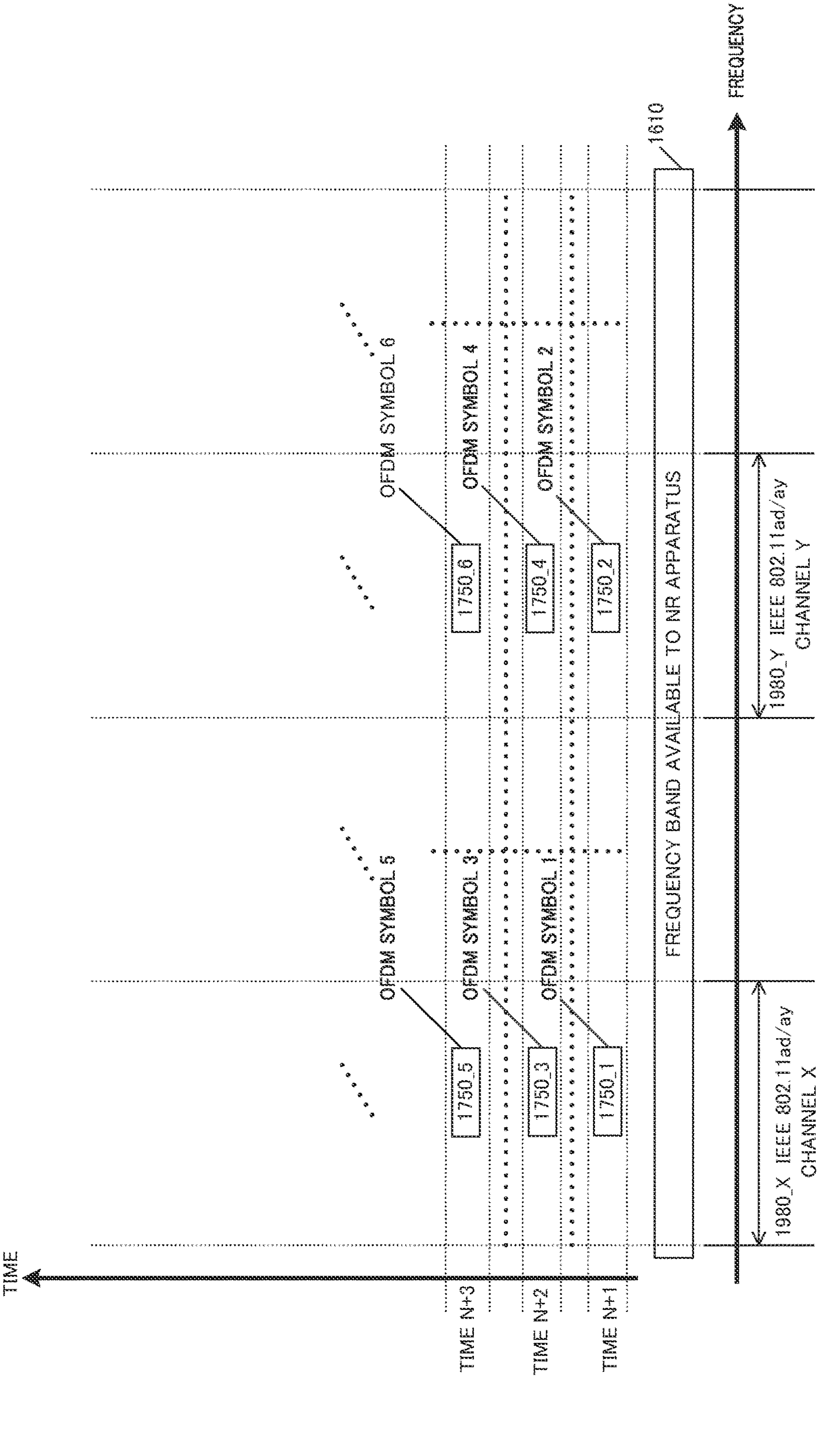
FIG. 24I illustrates an exemplary configuration of OFDM symbols for a modulation signal transmitted by gNB.

FIG. 24I illustrates, for example, an exemplary configuration of slots for a modulation signal transmitted by gNB 1100 in FIG. 18, and the horizontal axis represents frequency while the vertical axis represents time. Note that, in FIG. 24I, components that operate in the same manner as in FIGS. 16A, 17A, 19A, and 19K are denoted by the same reference signs, and the description thereof will be partially omitted.

As illustrated in FIG. 24I, "IEEE 802.11ad and/or IEEE 802.11ay channel X" labeled 1980_X and "IEEE 802.11ad and/or IEEE 802.11ay channel Y" labeled 1980_Y are present for the frequency axis. In FIG. 24I, for example, "frequency band 1610 used by an NR apparatus" is present, and gNB 1100 in FIG. 18 transmits a modulation signal using "frequency band 1610 used by an NR apparatus", for example. Note that, in the example of FIG. 24I, "frequency band 1610 used by an NR apparatus" includes "all or part of 'IEEE 802.11ad and/or IEEE 802.11ay channel X' labeled 1980_X" and "all or part of 'IEEE 802.11ad and/or IEEE 802.11ay channel Y' labeled 1980_Y".

Then, as illustrated in FIG. 24I, gNB 1100 transmits a modulation signal to a communication counterpart such as NR-UE #1 labeled 1101_1 in FIG. 18, for example, in the following manner: at time N+1, gNB 1100 transmits modulation signals in "OFDM symbol 1 (part of OFDM symbol 1) labeled 1750_1 included in 'IEEE 802.11ad and/or IEEE 802.11ay channel X' labeled 1980_X" and "OFDM symbol 2 (part of OFDM symbol 2) labeled 1750_2 included in 'IEEE 802.11ad and/or IEEE 802.11ay channel Y' labeled 1980_Y", at time N+2, gNB 1100 transmits modulation signals in "OFDM symbol 3 (part of OFDM symbol 3) labeled 1750_3 included in 'IEEE 802.11ad and/or IEEE 802.11ay channel X' labeled 1980_X" and "OFDM symbol 4 (part of OFDM symbol 4) labeled 1750_4 included in 'IEEE 802.11ad and/or IEEE 802.11ay channel Y' labeled 1980_Y", at time N+3, gNB 1100 transmits modulation signals in "OFDM symbol 5 (part of OFDM symbol 5) labeled 1750_5 included in 'IEEE 802.11ad and/or IEEE 802.11ay channel X' labeled 1980_X" and "OFDM symbol 6 (part of OFDM symbol 6) labeled 1750_6 included in 'IEEE 802.11ad and/or IEEE 802.11ay channel Y' labeled 1980_Y", and so forth.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals as in the example of FIG. 24I. Note that data to be transmitted to NR-UE #1 being the communication counterpart labeled 1101_1 is included in the OFDM symbols (part of OFDM symbols) such as "OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6", and so forth.

For example, the frequency of "OFDM symbol 1 (part of OFDM symbol 1) labeled 1750_1", the frequency of "OFDM symbol 3 (part of OFDM symbol 3) labeled 1750_3", and the frequency of "OFDM symbol 5 (part of OFDM symbol 5) labeled 1750_5" may be the same or may partially overlap each other.

Likewise, for example, the frequency of "OFDM symbol 2 (part of OFDM symbol 2) labeled 1750_2", the frequency of "OFDM symbol 4 (part of OFDM symbol 4) labeled 1750_4", and the frequency of "OFDM symbol 6 (part of OFDM symbol 6) labeled 1750_6" may be the same or may partially overlap each other.

Features in FIG. 24I in this case are as follows.

When at least "the first 'IEEE 802.11ad and/or IEEE 802.11ay channel'" and "the second 'IEEE 802.11ad and/or IEEE 802.11ay channel'" in which the OFDM symbols (parts of OFDM symbols) are present are present, one or more "IEEE 802.11ad and/or IEEE 802.11ay channels" are present between "the first 'IEEE 802.11ad and/or IEEE 802.11ay channel'" and "the second 'IEEE 802.11ad and/or IEEE 802.11ay channel'".

For example, in FIG. 24I, the OFDM symbols (parts of OFDM symbols) are present in "IEEE 802.11ad and/or IEEE 802.11ay channel X" labeled 1980_X (the first "IEEE 802.11ad and/or IEEE 802.11ay channel") and the OFDM symbols (parts of OFDM symbols) are present in "IEEE 802.11ad and/or IEEE 802.11ay channel Y" labeled 1980_Y (the second "IEEE 802.11ad and/or IEEE 802.11ay channel").

In this case, one or more "IEEE 802.11ad and/or IEEE 802.11ay channels" are present between "IEEE 802.11ad and/or IEEE 802.11ay channel X" labeled 1980_X (the first "IEEE 802.11ad and/or IEEE 802.11ay channel") and "IEEE 802.11ad and/or IEEE 802.11ay channel Y" labeled 1980Y (the second "IEEE 802.11ad and/or IEEE 802.11ay channel").

IEEE 802.11ay defines channel bonding and channel aggregation allowing the use of a plurality of "IEEE 802.11ad and/or IEEE 802.11ay channels". Exemplary simple "channel bonding or channel aggregation" includes the "channel bonding or channel aggregation" using neighboring "IEEE 802.11 ad and/or IEEE 802.11ay channels".

Upon the assumption that the "channel bonding or channel aggregation" is performed using neighboring "IEEE 802.11ad and/or IEEE 802.11ay channels", when a first modulation signal defined by IEEE 802.11ay is present at a part where "OFDM symbol 1 (part of OFDM symbol 1) labeled 1750_1" is present and a second modulation signal defined by IEEE 802.11ay is present at a part where "OFDM symbol 2 (part of OFDM symbol 2) labeled 1750_2" is present in FIG. 24I, the first modulation signal defined by IEEE 802.11ay and the second modulation signal defined by IEEE 802.11ay are different from each other (are different signals).

Thus, even while the "AP labeled 1110 or UE 1111" in FIG. 18 are performing communication using the channel bonding or channel aggregation, it is possible to obtain an effect of reducing the probability of interference with the "AP labeled 1110 or UE 1111" even when gNB 1100 transmits a modulation signal as in FIG. 24I.

Note that, although not illustrated in FIG. 24I, the modulation signal transmitted by gNB 1100 may include a frame, symbol, slot, etc. other than "'OFDM symbol 1 (part of OFDM symbol 1) labeled 1750_1", "OFDM symbol 2 (part of OFDM symbol 2) labeled 1750_2", "OFDM symbol 3 (part of OFDM symbol 3) labeled 1750_3", "OFDM symbol 4 (part of OFDM symbol 4) labeled 1750_4", "OFDM symbol 5 (part of OFDM symbol 5) labeled 1750_5", "OFDM symbol 6 (part of OFDM symbol 6) labeled 1750_6', and so forth" addressed to NR-UE #1 labeled 1101_1. In FIG. 24I, NR channels for the modulation signals transmitted by gNB 1100 are not illustrated.

Although exemplary arrangements of OFDM symbols (parts of OFDM symbols) have been described above with reference to FIGS. 24G, 24H, and 24I, the frame arrangement method is not limited to these examples, and the OFDM symbols (parts of OFDM symbols) may be arranged or configured using two or more arrangement/configuration methods of the "arrangement/configuration method for OFDM symbols (parts of OFDM symbols) in FIG. 24G", the "arrangement/configuration method for OFDM symbols (parts of OFDM symbols) in FIG. 24H" and the "arrangement/configuration method for OFDM symbols (parts of OFDM symbols) in FIG. 24I", for example.

For example, the orders of "IEEE 802.11ad and/or IEEE 802.11ay channels" to which the plurality of OFDM symbols (parts of OFDM symbols) belong in FIGS. 24G, 24H, and 24I is not limited to these examples.

As long as a plurality of OFDM symbols (parts of OFDM symbols) are placed in any of the IEEE 802.11ad and/or IEEE 802.11ay channels, such as "'IEEE 802.11ad and/or IEEE 802.11ay channel 2' labeled 1902", "'IEEE 802.11ad and/or IEEE 802.11ay channel 3' labeled 1903", and "'IEEE 802.11ad and/or IEEE 802.11ay channel 4' labeled 1904", on the frequency axis, the same as the above description can be implemented and the same effects can be obtained as well.

Further, in the cases of FIGS. 24G and 24H, the number of IEEE 802.11ad and/or IEEE 802.11ay channels to which the OFDM symbols (parts of OFDM symbols) belong is two or three, but the present disclosure is not limited to this, and the same as the above description can be implemented and the same effects can be obtained as long as the number of IEEE 802.11ad and/or IEEE 802.11ay channels to which the OFDM symbols (parts of OFDM symbols) belong is two or more.

Thus, a method of using time and frequency for transmitting a modulation signal by gNB is not limited to the examples of FIGS. 24G and 24H, and the number of IEEE 802.11ad and/or IEEE 802.11ay channels to which the OFDM symbols (parts of OFDM symbols) belong only needs to be two or more.

Further, one OFDM symbol (part of an OFDM symbol) may be present in each IEEE 802.11ad and/or IEEE 802.11ay channel at a certain time as in FIG. 24G, or two or more OFDM symbols (parts of OFDM symbols) (two OFDM symbols (parts of OFDM symbols) in the case of FIG. 24H) may be present in each IEEE 802.11ad and/or IEEE 802.11ay channel at a certain time as in FIG. 24H.

As is understood from the above, it is thus possible to reduce time of interference with other apparatuses as in the example of FIG. 24A, so as to obtain the effect of preventing a decrease in data transmission efficiency.

Although FIGS. 24A, 24B, 24C, 24D, 24E, 24F, 24G, 24H, and 24I illustrate exemplary arrangement of "frames, slots, and OFDM symbols (parts of OFDM symbols)" that transmit data on the frequency and time axes, a signal other than the "frames, slots, and OFDM symbols (parts of OFDM symbols)", e.g., RS such as DMRS and PTRS, may be present in a modulation signal to be transmitted. For example, RS such as DMRS and PTRS may be present at any of the times in the frequencies where the "frames, slots, OFDM symbols (parts of OFDM symbols)" are present.

In addition, to indicate information on the frequencies where the "frames, slots, and OFDM symbols (parts of OFDM symbols)" that transmit data are present (information on frequency hopping) and information on a communication method (information on multi-carrier/single carrier, SCS, the time at which the slot is placed, etc.) to a communication counterpart, a frame for transmitting control information including such information may be placed on the frequency and time axes in FIGS. 24A, 24B, 24C, 24D, 24E, 24F, 24G, 24H, and 24I.

In FIGS. 24A, 24B, and 24C, each of the frames (e.g., frame 1 labeled 2350_1, frame 2 labeled 2350_2, frame 3 labeled 2350_3, and the like) may be composed of a plurality of frames. Specifically, for example, frame 1 labeled 2350_1 in FIGS. 24A, 24B, and 24C may be composed of a plurality of frames. In addition, the plurality of frames may be transmitted in the same frequency at the same time using a plurality of antennas, for example. That is, each slot in FIGS. 24A, 24B, and 24C may be transmitted using MIMO.

A description will be given with reference to FIG. 24A, by way of example. It is assumed that frame I labeled 2350_1 is composed of a plurality of frames. In this case, the plurality of frames are present at times 1 to 6 in the frequency where frame I labeled 2350_1 is placed in FIG. 24A, and are transmitted using a plurality of antennas, for example.

Note that the above feature applies to FIGS. 24B and 24C as well.

In FIGS. 24D, 24E, and 24F, each of the slots (e.g., slot 1 labeled 1650_1, slot 2 labeled 1650_2, slot 3 labeled 1650_3, and so forth) may be composed of a plurality of slots. To be more specific, "slot 1 labeled 1650_1" in FIGS. 24D, 24E, and 24F, for example, may be composed of a plurality of slots. In addition, the plurality of slots may be transmitted in the same frequency at the same time using a plurality of antennas, for example. That is, each slot in FIGS. 24D, 24E, and 24F may be transmitted using MIMO.

A description will be given with reference to FIG. 24D, by way of example. It is assumed that slot 1 labeled 1650_1 is composed of a plurality of slots. In this case, the plurality of slots are present at time N+1 in the frequency where slot 1 labeled 1650_1 is placed in FIG. 24D, and are transmitted using a plurality of antennas, for example.

Note that the above feature applies to FIGS. 24E and 24F as well.

In FIGS. 24G, 24H, and 24I, each OFDM symbol (part of OFDM symbol), e.g., OFDM symbol (part of OFDM symbol) 1 labeled 1750_1, OFDM symbol (part of OFDM symbol) 2 labeled 1750_2, OFDM symbol (part of OFDM symbol) 3 labeled 1750_3, and so forth, may be composed of a plurality of OFDM symbols (parts of OFDM symbols). To be more specific, "OFDM symbol (part of OFDM symbol) 1 labeled 1750_1" in FIGS. 24G, 24H, and 24I, for example, may be composed of a plurality of OFDM symbols (parts of OFDM symbols). In addition, the plurality of OFDM symbols (parts of OFDM symbols) may be transmitted in the same frequency at the same time using a plurality of antennas, for example. That is, each OFDM symbol (part of OFDM symbol) in FIGS. 24G, 24H, and 24I may be transmitted using MIMO.

A description will be given with reference to FIG. 24G, by way of example. It is assumed that OFDM symbol (part of OFDM symbol) 1 labeled 1750_1 is composed of a plurality of slots. In this case, the plurality of OFDM symbols (parts of OFDM symbols) are placed at time N+1 in the frequency where OFDM symbol (part of OFDM symbol) I labeled 17501 is placed in FIG. 24G, and are transmitted using a plurality of antennas, for example.

Note that the above feature applies to FIGS. 24H and 24I as well.

A frequency diversity effect can be obtained by using a plurality of IEEE 802.11ad and/or IEEE 802.11ay channels as described above. This produces an effect of improving data reception quality, for example.

Not only gNB performs transmission of a modulation signal exemplified in FIGS. 24A, 24B, 24C, 24D, 24E, 24F, 24G, 24H, and 24I. NR-UE, a repeater, a transmission (Tx)/reception (Rx) point (TRP), and an apparatus or system including a communication apparatus may perform transmission of a modulation signal exemplified in FIGS. 24A, 24B, 24C, 24D, 24E, 24F, 24G, 24H, and 24I.

A configuration of IEEE 802.11ad and/or IEEE 802.11ay channels composing "frequency band 1610 used by an NR apparatus" is not limited to those in FIGS. 24A, 24B, 24C, 24D, 24E, 24F, 24G, 24H, and 24I. The same as described above can be implemented and the same effects can be obtained as long as "frequency band 1610 used by an NR apparatus" includes a plurality of "all or part of IEEE 802.11ad and/or IEEE 802.11ay channels".

Regarding Embodiments 1 and 2, the configuration of transmit beams in a plurality of slots and the configuration of transmit beams in a plurality of OFDM symbols (parts of OFDM symbols) have been described above.

Variations of the above will be described below.

Figure 25A:
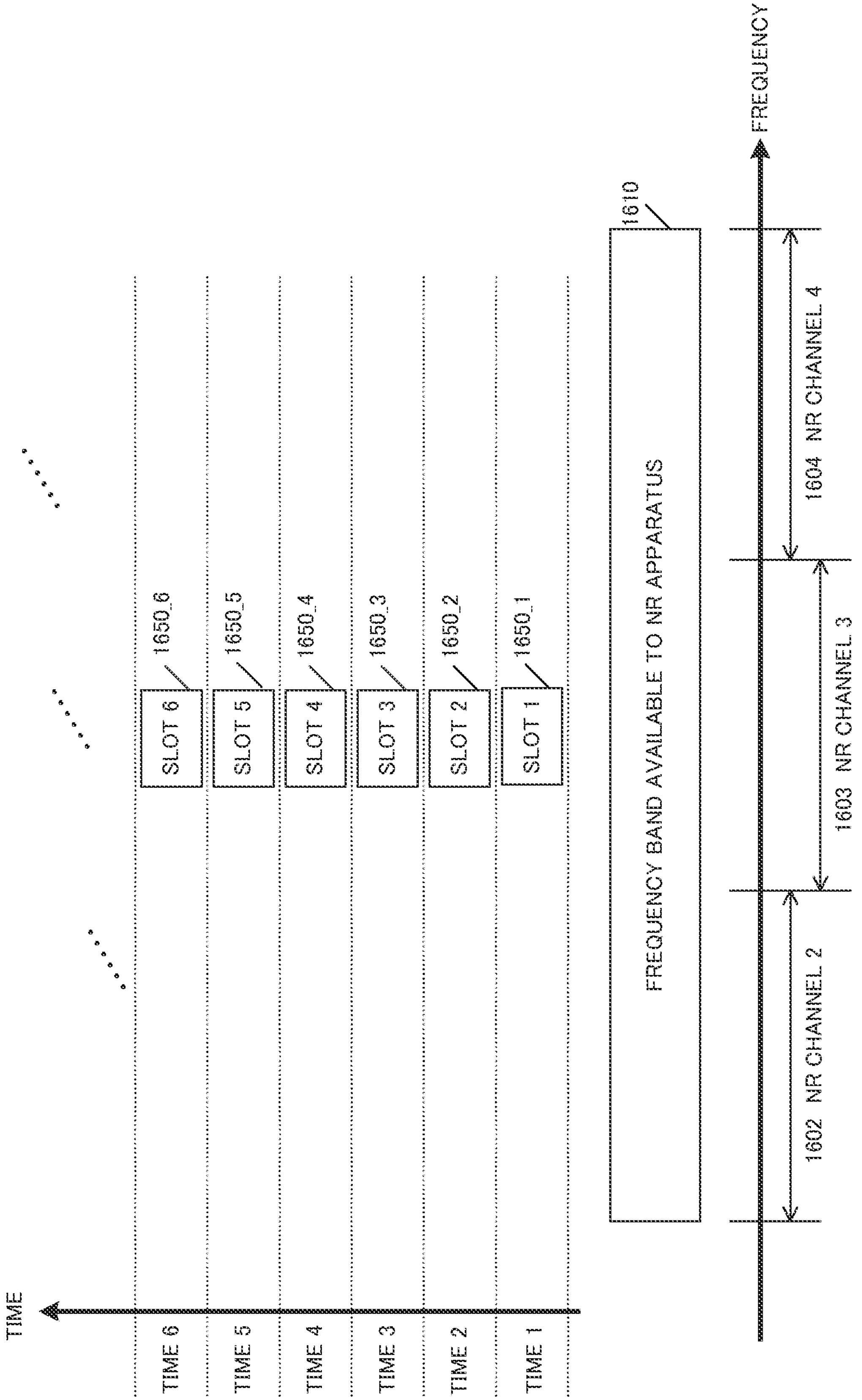
FIG. 25A illustrates an exemplary configuration of frames for a modulation signal transmitted by gNB.

FIG. 25A illustrates, for example, an exemplary configuration of slots for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 25A, NR channel 2 labeled 1602, NR channel 3 labeled 1603, and NR channel 4 labeled 1604 are present for the frequency axis. In FIG. 25A, for example. "frequency band 1610 used by an NR apparatus" is present, and gNB 1100 in FIG. 15 transmits a modulation signal using "frequency band 1610 used by an NR apparatus", for example. Note that, in the example of FIG. 25A, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 25A, gNB 1100 transmits a modulation signal to a communication counterpart such as NR-UE #1 labeled 1101_1 in FIG. 15, for example, in the following manner: at times 1, 2, 3, 4, 5, and 6, gNB 1100 transmits modulation signals in "slot 1 labeled 1650_1 included in NR channel 3 labeled 1603", "slot 2 labeled 1650_2 included in NR channel 3 labeled 1603", "slot 3 labeled 1650_3 included in NR channel 3 labeled 1603", "slot 4 labeled 1650_4 included in NR channel 3 labeled 1603", "slot 5 labeled 1650_5 included in NR channel 3 labeled 1603", and "slot 6 labeled 1650_6 included in NR channel 3 labeled 1603", for example.

The gNB transmits these modulation signals subjected to frequency allocation as in the example of FIG. 25A. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

For example, the frequency of "slot 1 labeled 1650_1", the frequency of "slot 2 labeled 1650_2", the frequency of "slot 3 labeled 1650_3", the frequency of "slot 4 labeled 1650_4", the frequency of "slot 5 labeled 1650_5", and the frequency of "slot 6 labeled 1650_6" may be the same or may partially overlap each other.

Note that, although not illustrated in FIG. 25A, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

The NR apparatuses are capable of generating a plurality of transmit beams to transmit slots as illustrated in FIG. 25A. In addition, for example, the NR apparatuses determine, from among a plurality of transmit beams, a transmit beam to be used for transmission for each slot, and transmits a modulation signal in the slot.

In addition, as one preferred embodiment, FIG. 25A assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner can make it less likely that interference is caused to other apparatuses than this NR apparatus and its communication counterpart. It is thus possible to obtain an effect of enhancing data transmission efficiency.

A description will be given of an exemplary operation of an NR apparatus in the "area (or country) where LBT is not performed".

In the "area (or country) where LBT is not performed". LBT is not performed before an NR apparatus transmits a modulation signal. For example, an NR apparatus with both the "LBT mode" and "no-LBT mode" operates the "no-LBT mode". In the "area (or country) where LBT is not performed", an NR apparatus with "no-LBT mode" and an NR apparatus without an LBT function may be present.

In this case, such NR apparatuses may transmit modulation signals using the transmission method as in the example of FIG. 25A (not limited to the example of FIG. 25A, however) as one of modes that are less likely to cause interference to another apparatus. Note that such NR apparatuses may include a mode of transmitting a modulation signal by a transmission method other than that in FIG. 25A. A variation of the "transmission method as in the example of FIG. 25A" that is less likely to cause interference to another apparatus will be described later.

A description will be given of an exemplary operation of an NR apparatus in the "area (or country) where LBT may be performed".

In the "area (or country) where LBT may be performed", an NR apparatus may "perform LBT" or may "not perform LBT" before transmitting a modulation signal.

When an NR apparatus with both the "LBT mode" and "no-LBT mode" performs LBT, the NR apparatus operates the "LBT mode" and performs LBT before transmitting a modulation signal.

Meanwhile, when an NR apparatus with both the "LBT mode" and "no-LBT mode" does not perform LBT, the "no-LBT mode" is operated, and at this time, applying the transmission method that causes less interference to another apparatus improves the data transmission efficiency of the system. Thus, an NR apparatus may transmit a modulation signal by the transmission method as in the example of FIG. 25A (not limited to the example of FIG. 25A, however) as one of methods of the "no-LBT mode".

Note that the NR apparatus with both the "LBT mode" and "no-LBT mode" may include a mode of transmitting a modulation signal by a transmission method other than that in FIG. 25A. A variation of the "transmission method as in the example of FIG. 25A" that causes less interference to another apparatus will be described later.

In the "area (or country) where LBT may be performed", an NR apparatus with "no-LBT mode" and an NR apparatus without an LBT function may be present. In this case, such NR apparatuses may transmit modulation signals by the transmission method as in the example of FIG. 25A (not limited to the example of FIG. 25A, however). This reduces interference to another apparatus and produces an effect of improving data transmission efficiency of the system.

Note that such NR apparatuses may include a mode of transmitting a modulation signal by a transmission method other than that in FIG. 25A. A variation of the "transmission method as in the example of FIG. 25A" that causes less interference to another apparatus will be described later.

In the "area (or country) where LBT is necessary", an NR apparatus "performs LBT" before transmitting a modulation signal. In this case, the "LBT mode" is operated in the NR apparatus.

At this time, the NR apparatus performs LBT before transmitting a modulation signal, and when determining that the modulation signal can be transmitted, the NR apparatus may transmit the modulation signal by the transmission method as in the example of FIG. 25A (not limited to the example of FIG. 25A, however). This reduces interference to another apparatus and produces an effect of improving data transmission efficiency of the system.

Note that the NR apparatuses may include a mode of transmitting a modulation signal by a transmission method other than that in FIG. 25A. A variation of the "transmission method as in the example of FIG. 25A" that causes less interference to another apparatus will be described later.

Figure 25B:
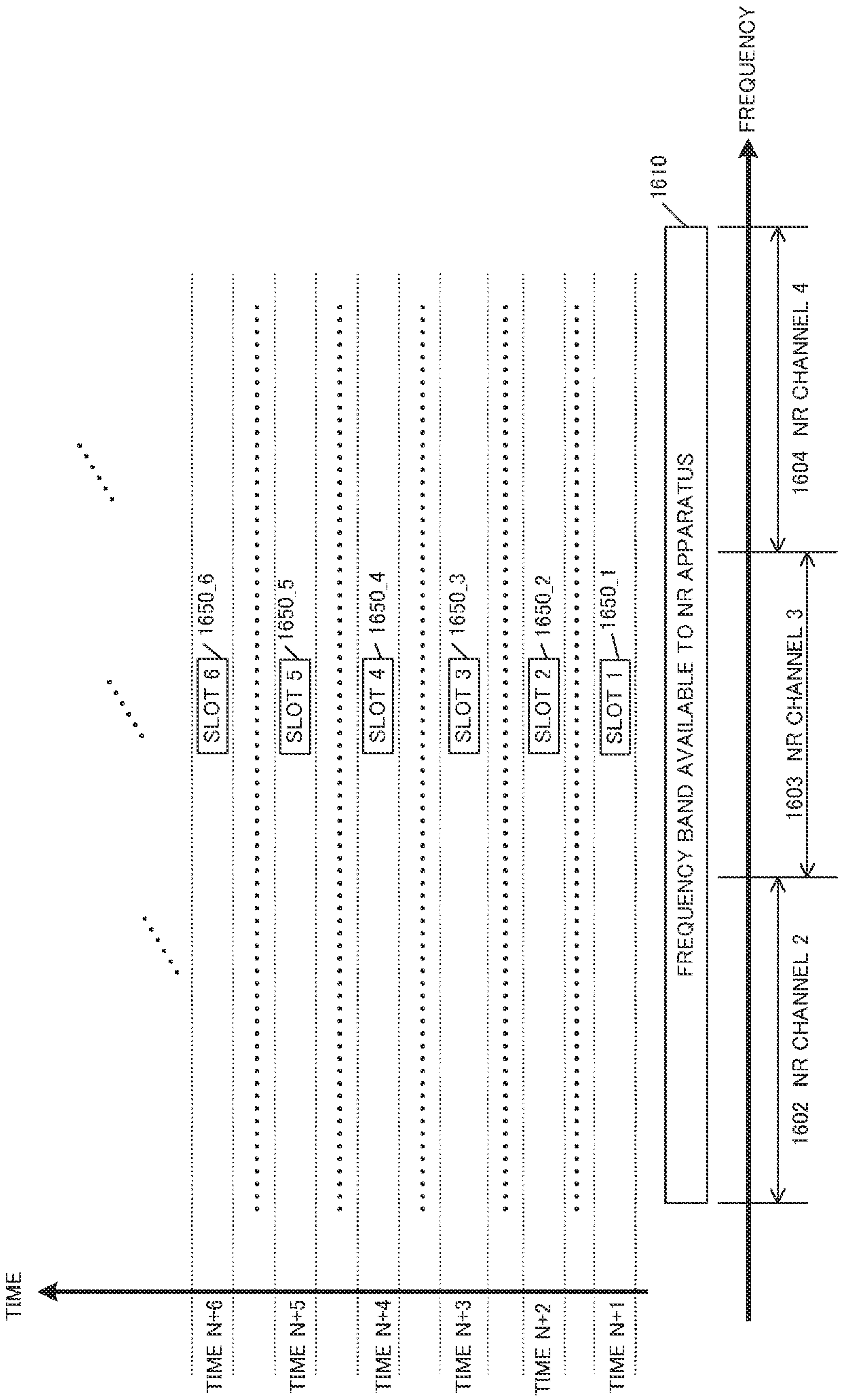
FIG. 25B illustrates an exemplary configuration of frames for a modulation signal transmitted by gNB.
Figure 25C:
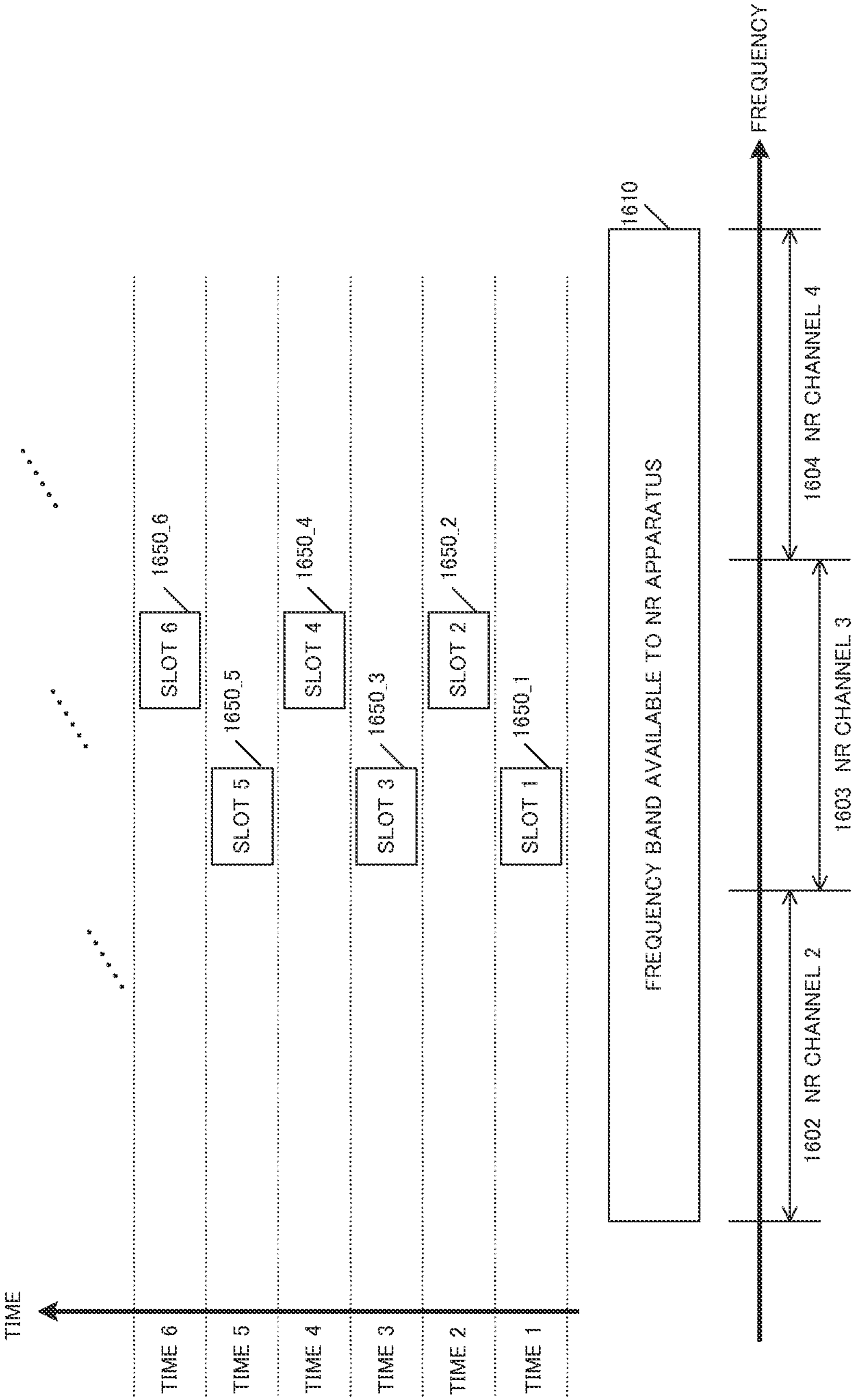
FIG. 25C illustrates an exemplary configuration of frames for a modulation signal transmitted by gNB.
Figure 25D:
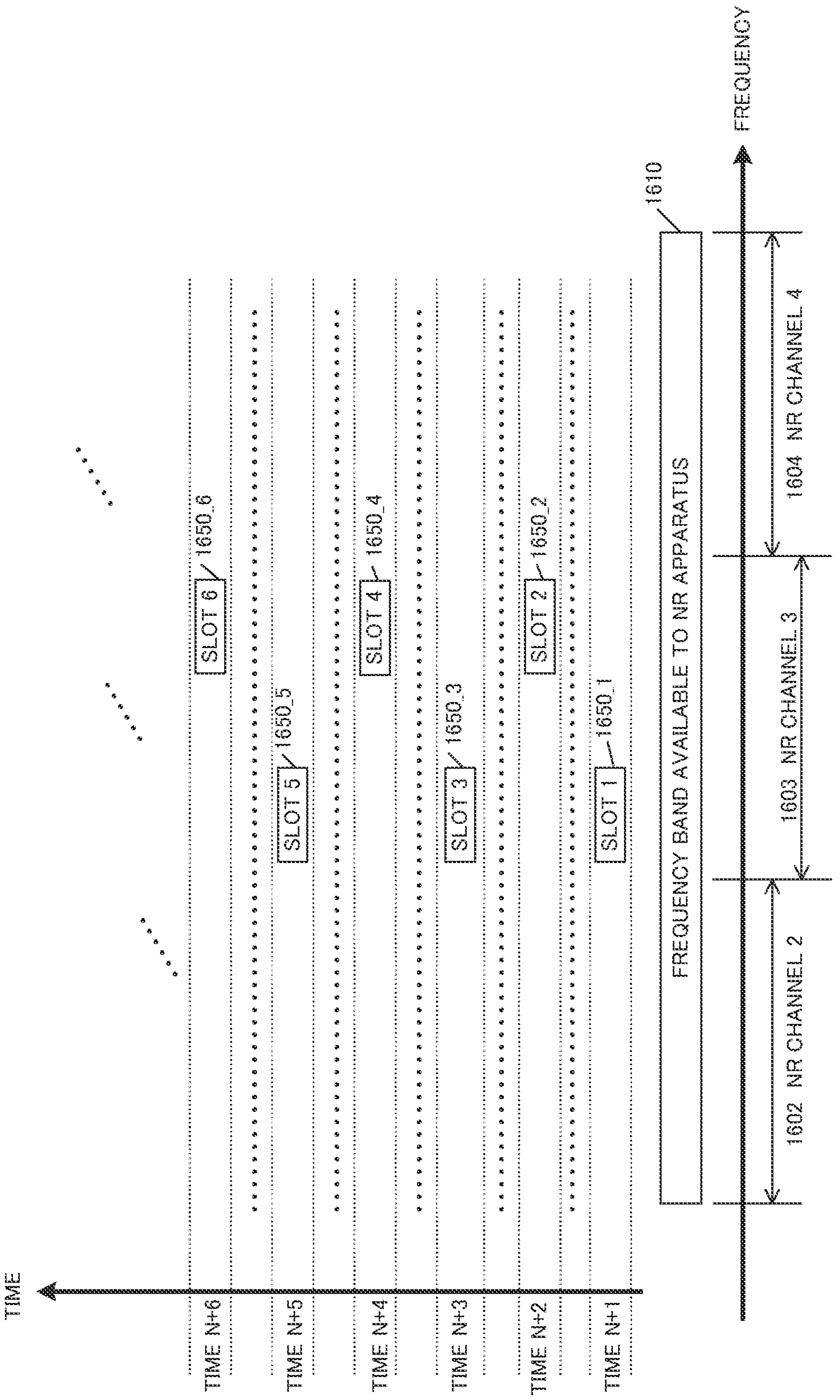
FIG. 25D illustrates an exemplary configuration of frames for a modulation signal transmitted by gNB.

The variation of the "transmission method as in the example of FIG. 25A" that causes less interference to another apparatus includes transmission methods in FIGS. 25B, 25C, and 25D.

FIG. 25B illustrates an exemplary configuration of a frame for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 25B, NR channel 2 labeled 1602, NR channel 3 labeled 1603, and NR channel 4 labeled 1604 are present for the frequency axis. In FIG. 25B, for example, "frequency band 1610 used by an NR apparatus" is present, and gNB 1100 in FIG. 15 transmits a modulation signal using "frequency band 1610 used by an NR apparatus", for example. Note that, in the example of FIG. 25B, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 25B, gNB 1100 transmits a modulation signal to a communication counterpart such as NR-UE #1 labeled 1101_1 in FIG. 15, for example, in the following manner: at times N+1, N+2, N+3, N+4, N+5, and N+6, gNB 1100 transmits modulation signals in "slot 1 labeled 1650_1 included in NR channel 3 labeled 1603", "slot 2 labeled 1650_2 included in NR channel 3 labeled 1603", "slot 3 labeled 1650_3 included in NR channel 3 labeled 1603", "slot 4 labeled 1650_4 included in NR channel 3 labeled 1603", "slot 5 labeled 1650_5 included in NR channel 3 labeled 1603", and "slot 6 labeled 1650_6 included in NR channel 3 labeled 1603", for example.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 25B. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

For example, the frequency of "slot 1 labeled 1650_1", the frequency of "slot 2 labeled 1650_2", the frequency of "slot 3 labeled 1650_3", the frequency of "slot 4 labeled 1650_4", the frequency of "slot 5 labeled 1650_5", and the frequency of "slot 6 labeled 1650_6" may be the same or may partially overlap each other.

Note that, although not illustrated in FIG. 25B, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

The NR apparatuses are capable of generating a plurality of transmit beams to transmit slots as illustrated in FIG. 25B. In addition, for example, the NR apparatuses determine, from among a plurality of transmit beams, a transmit beam to be used for transmission for each slot, and transmits a modulation signal in the slot.

In addition, as one preferred embodiment, FIG. 25B assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner can make it less likely that interference is caused to other apparatuses than this NR apparatus and its communication counterpart. It is thus possible to obtain an effect of enhancing data transmission efficiency.

FIG. 25C illustrates an exemplary configuration of a frame for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 25C, NR channel 2 labeled 1602, NR channel 3 labeled 1603, and NR channel 4 labeled 1604 are present for the frequency axis. In FIG. 25C, for example, "frequency band 1610 used by an NR apparatus" is present, and gNB 1100 in FIG. 15 transmits a modulation signal using "frequency band 1610 used by an NR apparatus", for example. Note that, in the example of FIG. 25C, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 25C, gNB 1100 transmits a modulation signal to a communication counterpart such as NR-UE #1 labeled 1101_1 in FIG. 15, for example, in the following manner.

At times 1, 2, 3, 4, 5, and 6, gNB 1100 transmits modulation signals in "slot 1 labeled 1650_1 included in NR channel 3 labeled 1603", "slot 2 labeled 1650_2 included in NR channel 3 labeled 1603", "slot 3 labeled 1650_3 included in NR channel 3 labeled 1603". "slot 4 labeled 1650_4 included in NR channel 3 labeled 1603", "slot 5 labeled 1650_5 included in NR channel 3 labeled 1603", and "slot 6 labeled 1650_6 included in NR channel 3 labeled 1603", for example.

The gNB transmits these modulation signals subjected to frequency allocation as in the example of FIG. 25C. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4". "slot 5 labeled 1650_5", "slot 6 labeled 1650_6", and so forth.

For example, the frequency of "slot 1 labeled 1650_1", the frequency of "slot 3 labeled 1650_3", and the frequency of "slot 5 labeled 1650_5" may be the same or partially overlap each other.

Likewise, the frequency of "slot 2 labeled 1650_2", the frequency of "slot 4 labeled 1650_4", and the frequency of "slot 6 labeled 1650_6" may, for example, be the same or partially overlap each other.

Note that, although not illustrated in FIG. 25C, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

The NR apparatuses are capable of generating a plurality of transmit beams to transmit slots as illustrated in FIG. 25C. In addition, for example, the NR apparatuses determine, from among a plurality of transmit beams, a transmit beam to be used for transmission for each slot, and transmits a modulation signal in the slot.

In addition, as one preferred embodiment, FIG. 25C assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner can make it less likely that interference is caused to other apparatuses than this NR apparatus and its communication counterpart. It is thus possible to obtain an effect of enhancing data transmission efficiency.

FIG. 25D illustrates an exemplary configuration of a frame for a modulation signal transmitted by gNB 1100 in FIG. 15, and the horizontal axis represents frequency while the vertical axis represents time. Note that components that operate in the same manner as in FIG. 16A are denoted by the same reference signs, and the description thereof will be partially omitted.

As illustrated in FIG. 25D, NR channel 2 labeled 1602, NR channel 3 labeled 1603, and NR channel 4 labeled 1604 are present for the frequency axis. In FIG. 25D, for example, "frequency band 1610 used by an NR apparatus" is present, and gNB 1100 in FIG. 15 transmits a modulation signal using "frequency band 1610 used by an NR apparatus", for example. Note that, in the example of FIG. 25D, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 25D, gNB 1100 transmits a modulation signal to a communication counterpart such as NR-UE #1 labeled 1101_1 in FIG. 15, for example, in the following manner: at times N+1, N+2, N+3, N+4, N+5, and N+6, gNB 1100 transmits modulation signals in "slot 1 labeled 1650_1 included in NR channel 3 labeled 1603", "slot 2 labeled 1650_2 included in NR channel 3 labeled 1603", "slot 3 labeled 1650_3 included in NR channel 3 labeled 1603", "slot 4 labeled 1650_4 included in NR channel 3 labeled 1603", "slot 5 labeled 1650_5 included in NR channel 3 labeled 1603", and "slot 6 labeled 1650_6 included in NR channel 3 labeled 1603", for example.

Note that another "frame, symbol, signal, etc." may be present between time N+I and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 25D. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4". "slot 5 labeled 1650_5", "slot 6 labeled 1650_6", and so forth.

For example, the frequency of "slot 1 labeled 1650_1", the frequency of "slot 3 labeled 1650_3", and the frequency of "slot 5 labeled 1650_5" may be the same or partially overlap each other.

Likewise, the frequency of "slot 2 labeled 1650_2", the frequency of "slot 4 labeled 1650_4", and the frequency of "slot 6 labeled 1650_6" may, for example, be the same or partially overlap each other.

Note that, although not illustrated in FIG. 25D, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1.

The NR apparatuses are capable of generating a plurality of transmit beams to transmit slots as illustrated in FIG. 25D. In addition, for example, the NR apparatuses determine, from among a plurality of transmit beams, a transmit beam to be used for transmission for each slot, and transmits a modulation signal in the slot.

In addition, as one preferred embodiment, FIG. 25D assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner can make it less likely that interference is caused to other apparatuses than this NR apparatus and its communication counterpart. It is thus possible to obtain an effect of enhancing data transmission efficiency.

Although exemplary slot arrangements have been described above with reference to FIGS. 25A, 25B, 25C, and 25D, the slot arrangement method is not limited to these examples, and slots may be arranged or configured using two or more slot arrangement/configuration methods of the "slot arrangement/configuration method in FIG. 25A", the "slot arrangement/configuration method in FIG. 25B", the "slot arrangement/configuration method in FIG. 25C", and the "slot arrangement/configuration method in FIG. 25D", for example.

For example, the NR channels to which the slots belong in FIGS. 25A, 25B, 25C, and 25D are not limited to the examples.

Further, as long as slots are placed in any of the NR channels, such as "NR channel 2 labeled 1602", "NR channel 3 labeled 1603", and "NR channel 4 labeled 1604", on the frequency axis, the same as the above description can be implemented and the same effects can be obtained as well.

While FIGS. 25A, 25B, 25C, and 25D illustrate the exemplary configurations in which "frequency band 1610 available to an NR apparatus" includes three NR channels, the present disclosure is not limited to the examples, and the same can be implemented and the same effects can be obtained as long as "frequency band 1610 available to an NR apparatus" includes one or more NR channels.

While FIGS. 25C and 25D illustrate the examples in which slots are present at two frequencies in one NR channel (NR channel 3 labeled 1603), the present disclosure is not limited to the examples, and the same can be implemented as long as the slots are present at one or more frequencies in one NR channel (NR channel 3 labeled 1603).

In the following, a description will be given of exemplary arrangement of OFDM symbols (parts of OFDM symbols) on the frequency and time axes that is a variation of the arrangements in "FIGS. 25A, 25B, 25C, and 25D" and is different from the arrangements in "FIGS. 25A, 25B, 25C, and 25D".

Figure 26A:
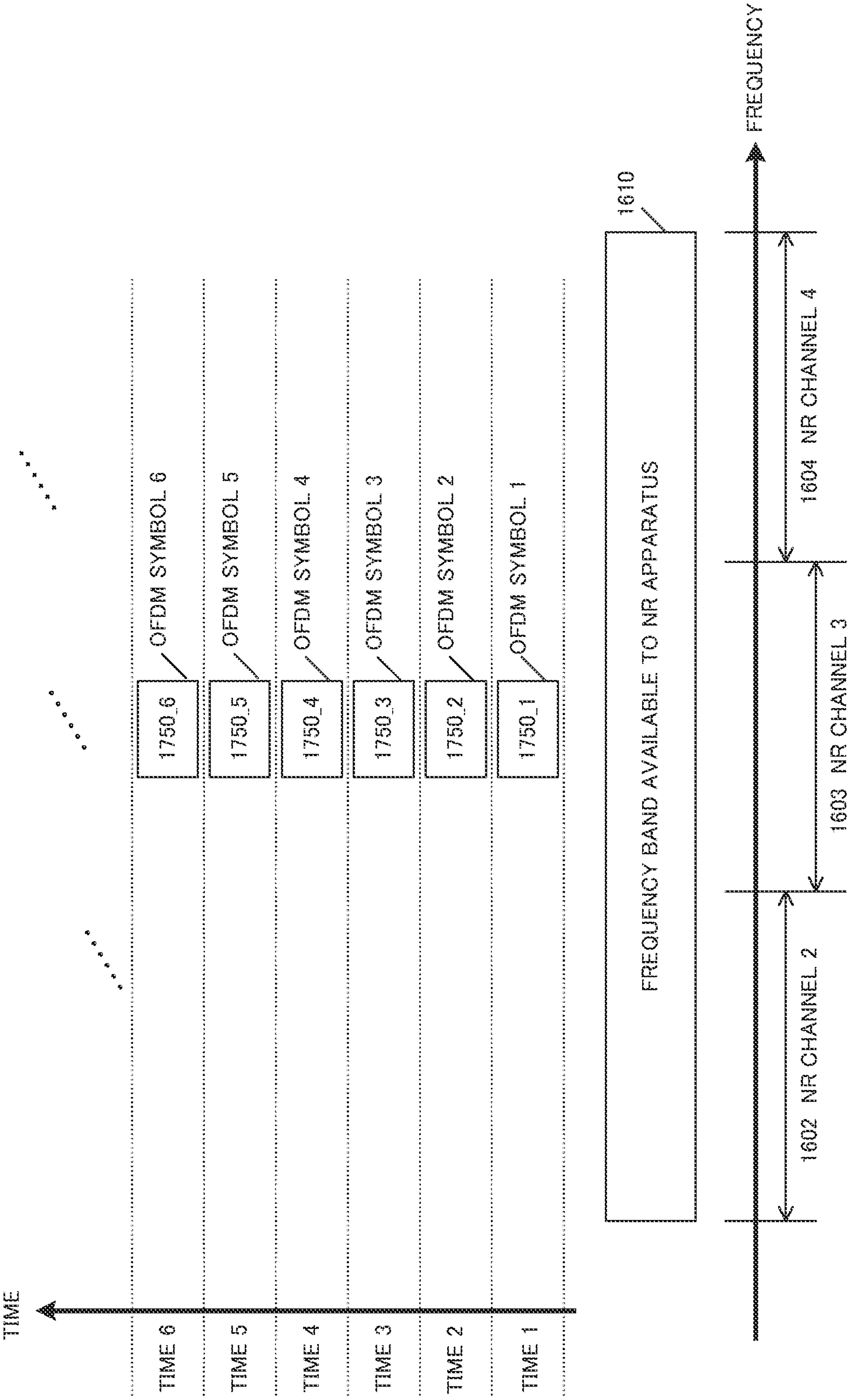
FIG. 26A illustrates an exemplary configuration of frames for a modulation signal transmitted by gNB.

FIG. 26A illustrates an exemplary configuration of a frame for a modulation signal transmitted by gNB 1100 in FIG. 15, and the horizontal axis represents frequency while the vertical axis represents time. Note that components that operate in the same manner as in FIGS. 16A and 17A are denoted by the same reference signs, and the description thereof will be partially omitted.

As illustrated in FIG. 26A, NR channel 2 labeled 1602, NR channel 3 labeled 1603, and NR channel 4 labeled 1604 are present for the frequency axis. In FIG. 26A, for example. "frequency band 1610 used by an NR apparatus" is present, and gNB 1100 in FIG. 15 transmits a modulation signal using "frequency band 1610 used by an NR apparatus", for example. Note that, in the example of FIG. 26A, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 26A, gNB 1100 transmits a modulation signal to a communication counterpart such as NR-UE #1 labeled 1101_1 in FIG. 15, for example, in the following manner.

At times 1, 2, 3, 4, 5, and 6, gNB 1100 transmits modulation signals, for example, in "OFDM symbol (part of OFDM symbol) I labeled 1750_1 included in NR channel 3 labeled 1603", "OFDM symbol (part of OFDM symbol) 2 labeled 1750_2 included in NR channel 3 labeled 1603", "OFDM symbol (part of OFDM symbol) 3 labeled 1750_3 included in NR channel 3 labeled 1603", "OFDM symbol (part of OFDM symbol) 4 labeled 1750_4 included in NR channel 3 labeled 1603", "OFDM symbol (part of OFDM symbol) 5 labeled 1750_5 included in NR channel 3 labeled 1603", and "OFDM symbol (part of OFDM symbol) 6 labeled 1750_6 included in NR channel 3 labeled 1603", respectively.

The gNB transmits these modulation signals subjected to frequency allocation as in the example of FIG. 26A. Note, for example, that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4". "OFDM symbol (part of OFDM symbol) 5 labeled 1750_5", "OFDM symbol (part of OFDM symbol) 6 labeled 1750_6", and so forth.

For example, the frequencies of "'OFDM symbol (part of OFDM symbol) I labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', and so forth" may be the same or may partially overlap each other.

Note that, although not illustrated in FIG. 26A, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1.

The NR apparatuses are capable of generating a plurality of transmit beams to transmit the OFDM symbols (parts of OFDM symbols) as illustrated in FIG. 26A. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 26A assumes that the transmit beam used in OFDM symbol (part of OFDM symbol) i labeled 1750_i and the transmit beam used in OFDM symbol (part of OFDM symbol) (i−1) labeled 1750_(i−1) are different transmit beams, and the transmit beam used in OFDM symbol (part of OFDM symbol) i labeled 1750_i and the transmit beam used in OFDM symbol (part of OFDM symbol) (i+1) labeled 1750_(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Figure 26B:
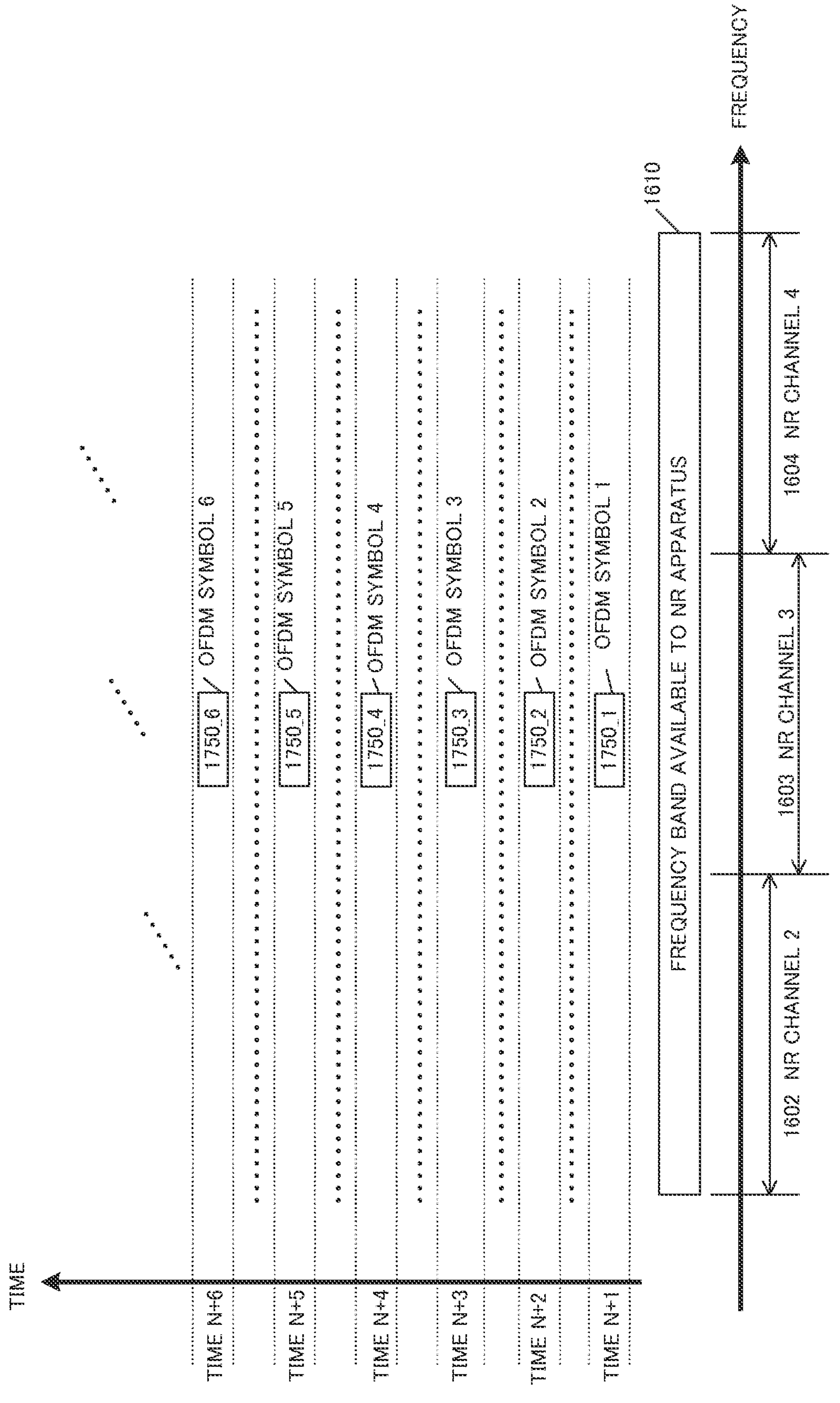
FIG. 26B illustrates an exemplary configuration of frames for a modulation signal transmitted by gNB.

FIG. 26B illustrates an exemplary configuration of a frame for a modulation signal transmitted by gNB 1100 in FIG. 15, and the horizontal axis represents frequency while the vertical axis represents time. Note that components that operate in the same manner as in FIGS. 16A and 17A are denoted by the same reference signs, and the description thereof will be partially omitted.

As illustrated in FIG. 26B, NR channel 2 labeled 1602, NR channel 3 labeled 1603, and NR channel 4 labeled 1604 are present for the frequency axis. In FIG. 26B, for example, "frequency band 1610 used by an NR apparatus" is present, and gNB 1100 in FIG. 15 transmits a modulation signal using "frequency band 1610 used by an NR apparatus", for example. Note that, in the example of FIG. 26B, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 26B, gNB 1100 transmits a modulation signal to a communication counterpart such as NR-UE #1 labeled 1101_1 in FIG. 15, for example, in the following manner.

at times N+1, N+2, N+3, N+4, N+5, and N+6, gNB 1100 transmits modulation signals, for example, in "OFDM symbol (part of OFDM symbol) 1 labeled 1750_1 included in NR channel 3 labeled 1603", "OFDM symbol (part of OFDM symbol) 2 labeled 1750_2 included in NR channel 3 labeled 1603", "OFDM symbol (part of OFDM symbol) 3 labeled 1750_3 included in NR channel 3 labeled 1603", "OFDM symbol (part of OFDM symbol) 4 labeled 1750_4 included in NR channel 3 labeled 1603", "OFDM symbol (part of OFDM symbol) 5 labeled 1750_5 included in NR channel 3 labeled 1603", and "OFDM symbol (part of OFDM symbol) 6 labeled 1750_6 included in NR channel 3 labeled 1603", respectively.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 26B. Note, for example, that data to be transmitted to NR-UE #1 being the communication counterpart labeled 1101_1 is included in the OFDM symbols (parts of OFDM symbols) such as "OFDM symbol (part of OFDM symbol) I labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

For example, the frequencies of "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', and so forth" may be the same or may partially overlap each other.

Note that, although not illustrated in FIG. 26B, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #l labeled 1101_1.

The NR apparatuses are capable of generating a plurality of transmit beams to transmit the OFDM symbols (parts of OFDM symbols) as illustrated in FIG. 26B. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 26B assumes that the transmit beam used in OFDM symbol (part of OFDM symbol) i labeled 1750_i and the transmit beam used in OFDM symbol (part of OFDM symbol) (i−1) labeled 1750_(i−1) are different transmit beams, and the transmit beam used in OFDM symbol (part of OFDM symbol) i labeled 1750_i and the transmit beam used in OFDM symbol (part of OFDM symbol) (i+1) labeled 1750_(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Figure 26C:
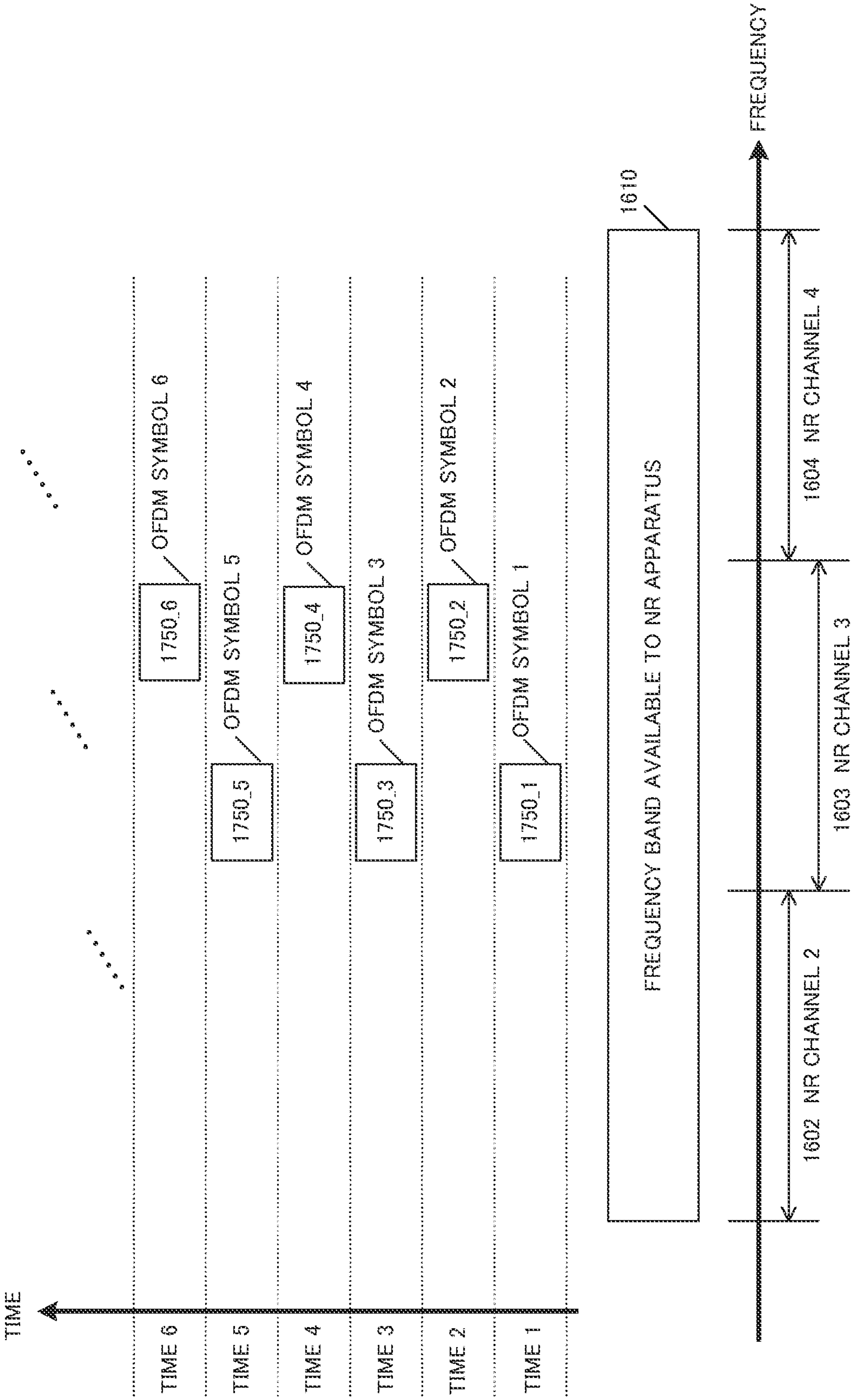
FIG. 26C illustrates an exemplary configuration of frames for a modulation signal transmitted by gNB.

FIG. 26C illustrates an exemplary configuration of a frame for a modulation signal transmitted by gNB 1100 in FIG. 15, and the horizontal axis represents frequency while the vertical axis represents time. Note that components that operate in the same manner as in FIGS. 16A and 17A are denoted by the same reference signs, and the description thereof will be partially omitted.

As illustrated in FIG. 26C, NR channel 2 labeled 1602, NR channel 3 labeled 1603, and NR channel 4 labeled 1604 are present for the frequency axis. In FIG. 26C, for example, "frequency band 1610 used by an NR apparatus" is present, and gNB 1100 in FIG. 15 transmits a modulation signal using "frequency band 1610 used by an NR apparatus", for example. Note that, in the example of FIG. 26C, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 26C, gNB 1100 transmits a modulation signal to a communication counterpart such as NR-UE #1 labeled 1101_1 in FIG. 15, for example, in the following manner.

At times 1, 2, 3, 4, 5, and 6, gNB 1100 transmits modulation signals in "OFDM symbol (part of OFDM symbol) 1 labeled 1750_1 included, for example, in NR channel 3 labeled 1603", "OFDM symbol (part of OFDM symbol) 2 labeled 1750_2 included in NR channel 3 labeled 1603", "OFDM symbol (part of OFDM symbol) 3 labeled 1750_3 included in NR channel 3 labeled 1603", "OFDM symbol (part of OFDM symbol) 4 labeled 1750_4 included in NR channel 3 labeled 1603", "OFDM symbol (part of OFDM symbol) 5 labeled 1750_5 included in NR channel 3 labeled 1603", and "OFDM symbol (part of OFDM symbol) 6 labeled 1750_6 included in NR channel 3 labeled 1603", respectively.

The gNB transmits these modulation signals subjected to frequency allocation as in the example of FIG. 26C. Note, for example, that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4". "OFDM symbol (part of OFDM symbol) 5 labeled 1750_5", "OFDM symbol (part of OFDM symbol) 6 labeled 1750_6", and so forth.

For example, the frequency of "OFDM symbol (part of OFDM symbol) I labeled 1750_1", the frequency of "OFDM symbol (part of OFDM symbol) 3 labeled 1750_3", and the frequency of "OFDM symbol (part of OFDM symbol) 5 labeled 1750_5" may be the same or may partially overlap each other.

Likewise, for example, the frequency of "OFDM symbol (part of OFDM symbol) 2 labeled 1750_2", the frequency of "OFDM symbol (part of OFDM symbol) 4 labeled 1750_4", and the frequency of "OFDM symbol (part of OFDM symbol) 6 labeled 1750_6" may be the same or may partially overlap each other.

Note that, although not illustrated in FIG. 26C, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1.

The NR apparatuses are capable of generating a plurality of transmit beams to transmit the OFDM symbols (parts of OFDM symbols) as illustrated in FIG. 26C. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 26C assumes that the transmit beam used in OFDM symbol (part of OFDM symbol) i labeled 1750_*i* and the transmit beam used in OFDM symbol (part of OFDM symbol) (i−1) labeled 1750_(*i*−1) are different transmit beams, and the transmit beam used in OFDM symbol (part of OFDM symbol) i labeled 1750_*i* and the transmit beam used in OFDM symbol (part of OFDM symbol) (i+1) labeled 1750_(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Figure 26D:
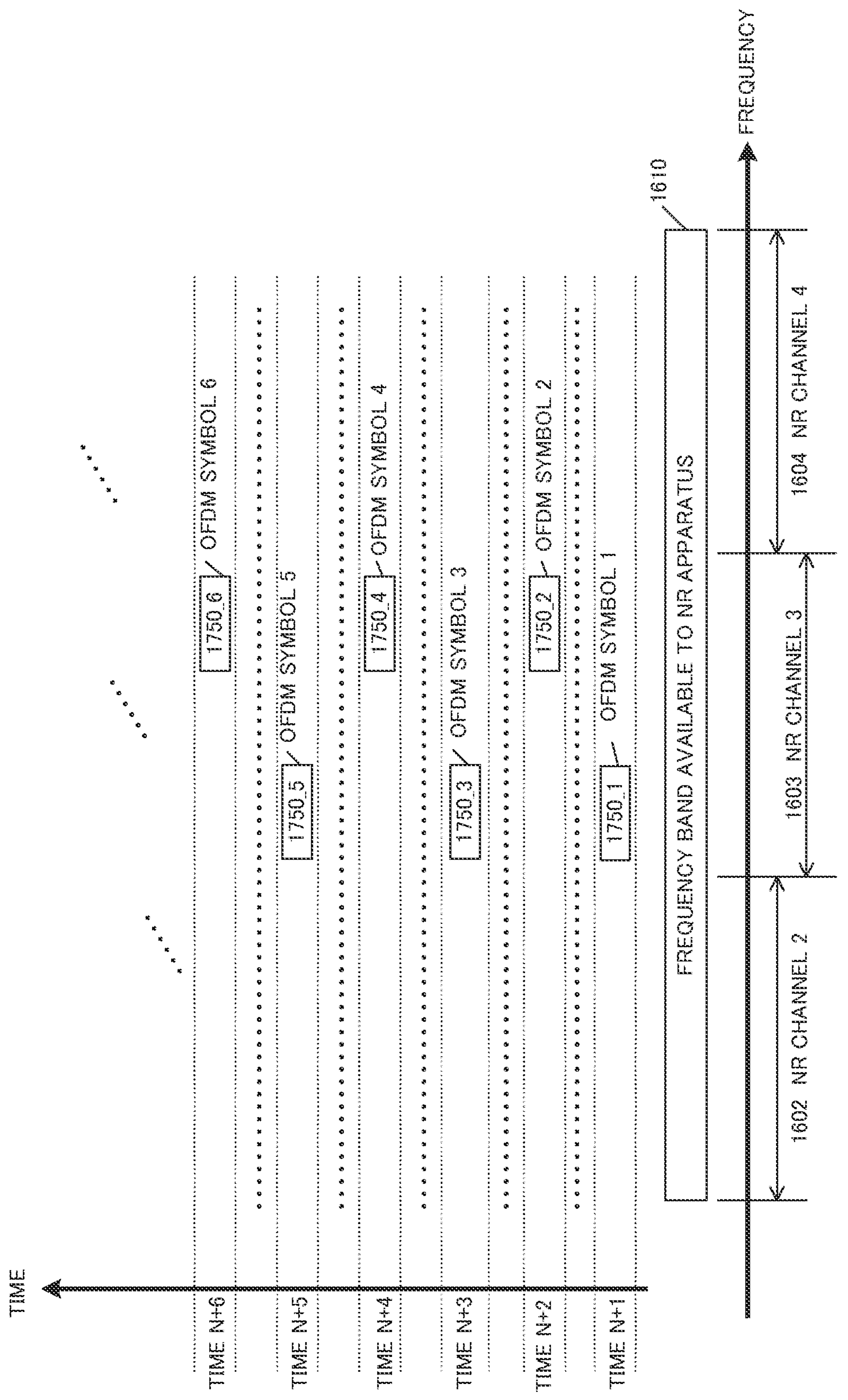
FIG. 26D illustrates an exemplary configuration of frames for a modulation signal transmitted by gNB.

FIG. 26D illustrates an exemplary configuration of a frame for a modulation signal transmitted by gNB 1100 in FIG. 15, and the horizontal axis represents frequency while the vertical axis represents time. Note that components that operate in the same manner as in FIGS. 16A and 17A are denoted by the same reference signs, and the description thereof will be partially omitted.

As illustrated in FIG. 26D, NR channel 2 labeled 1602, NR channel 3 labeled 1603, and NR channel 4 labeled 1604 are present for the frequency axis. In FIG. 26D, for example. "frequency band 1610 used by an NR apparatus" is present, and gNB 1100 in FIG. 15 transmits a modulation signal using "frequency band 1610 used by an NR apparatus", for example. Note that, in the example of FIG. 26D, "frequency band 1610 used by an NR apparatus" includes "all or part of NR channel 2 labeled 1602", "all or part of NR channel 3 labeled 1603", and "all or part of NR channel 4 labeled 1604".

Then, as illustrated in FIG. 26D, gNB 1100 transmits a modulation signal to a communication counterpart such as NR-UE #1 labeled 1101_1 in FIG. 15, for example, in the following manner: at times N+1, N+2, N+3, N+4, N+5, and N+6, gNB 1100 transmits modulation signals, for example, in "OFDM symbol (part of OFDM symbol) 1 labeled 1750_1 included in NR channel 3 labeled 1603", "OFDM symbol (part of OFDM symbol) 2 labeled 1750_2 included in NR channel 3 labeled 1603", "OFDM symbol (part of OFDM symbol) 3 labeled 1750_3 included in NR channel 3 labeled 1603", "OFDM symbol (part of OFDM symbol) 4 labeled 1750_4 included in NR channel 3 labeled 1603", "OFDM symbol (part of OFDM symbol) 5 labeled 1750_5 included in NR channel 3 labeled 1603", and "OFDM symbol (part of OFDM symbol) 6 labeled 1750_6 included in NR channel 3 labeled 1603", respectively.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 26D. Note, for example, that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

For example, the frequency of "OFDM symbol (part of OFDM symbol) I labeled 1750_1", the frequency of "OFDM symbol (part of OFDM symbol) 3 labeled 1750_3", and the frequency of "OFDM symbol (part of OFDM symbol) 5 labeled 1750_5" may be the same or may partially overlap each other.

Likewise, for example, the frequency of "OFDM symbol (part of OFDM symbol) 2 labeled 1750_2", the frequency of "OFDM symbol (part of OFDM symbol) 4 labeled 1750_4", and the frequency of "OFDM symbol (part of OFDM symbol) 6 labeled 1750_6" may be the same or may partially overlap each other.

Note that, although not illustrated in FIG. 26D, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1.

The NR apparatuses are capable of generating a plurality of transmit beams to transmit the OFDM symbols (parts of OFDM symbols) as illustrated in FIG. 26D. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 26D assumes that the transmit beam used in OFDM symbol (part of OFDM symbol) i labeled 1750_*i* and the transmit beam used in OFDM symbol (part of OFDM symbol) (i−1) labeled 1750_(i−1) are different transmit beams, and the transmit beam used in OFDM symbol (part of OFDM symbol) i labeled 1750_*i* and the transmit beam used in OFDM symbol (part of OFDM symbol) (i+1) labeled 1750_(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Although exemplary arrangements of OFDM symbols (parts of OFDM symbols) have been described above with reference to FIGS. 26A, 26B, 26C and 26D, the arrangement method for the OFDM symbols (parts of OFDM symbols) is not limited to these examples, and the OFDM symbols (parts of OFDM symbols) may be arranged or configured using two or more arrangement/configuration methods of the "arrangement/configuration method for OFDM symbols (parts of OFDM symbols) in FIG. 26A", the "arrangement/configuration method for OFDM symbols (parts of OFDM symbols) in FIG. 26B", the "arrangement/configuration method for OFDM symbols (parts of OFDM symbols) in FIG. 26C", and the "arrangement/configuration method for OFDM symbols (parts of OFDM symbols) in FIG. 26D", for example.

For example, in FIGS. 26A, 26B, 26C and 26D, the NR channels to which the plurality of OFDM symbols (parts of OFDM symbols) belong are not limited to these examples.

Further, as long as the OFDM symbols (parts of OFDM symbols) are placed in any of the NR channels, such as "NR channel 2 labeled 1602", "NR channel 3 labeled 1603", and "NR channel 4 labeled 1604", on the frequency axis, the same as the above description can be implemented and the same effects can be obtained as well.

While FIGS. 26A, 26B, 26C and 26D illustrate the exemplary configurations in which "frequency band 1610 available to an NR apparatus" includes three NR channels, the present disclosure is not limited to the examples, and the same can be implemented and the same effects can be obtained as long as "frequency band 1610 available to an NR apparatus" includes one or more NR channels.

While FIGS. 26C and 26D illustrate the examples in which the OFDM symbols (parts of OFDM symbols) are present at two frequencies in one NR channel (NR channel 3 labeled 1603), the present disclosure is not limited to the examples, and the same can be implemented as long as the OFDM symbols (parts of OFDM symbols) are present at one or more frequencies in one NR channel (NR channel 3 labeled 1603).

Figure 27A:
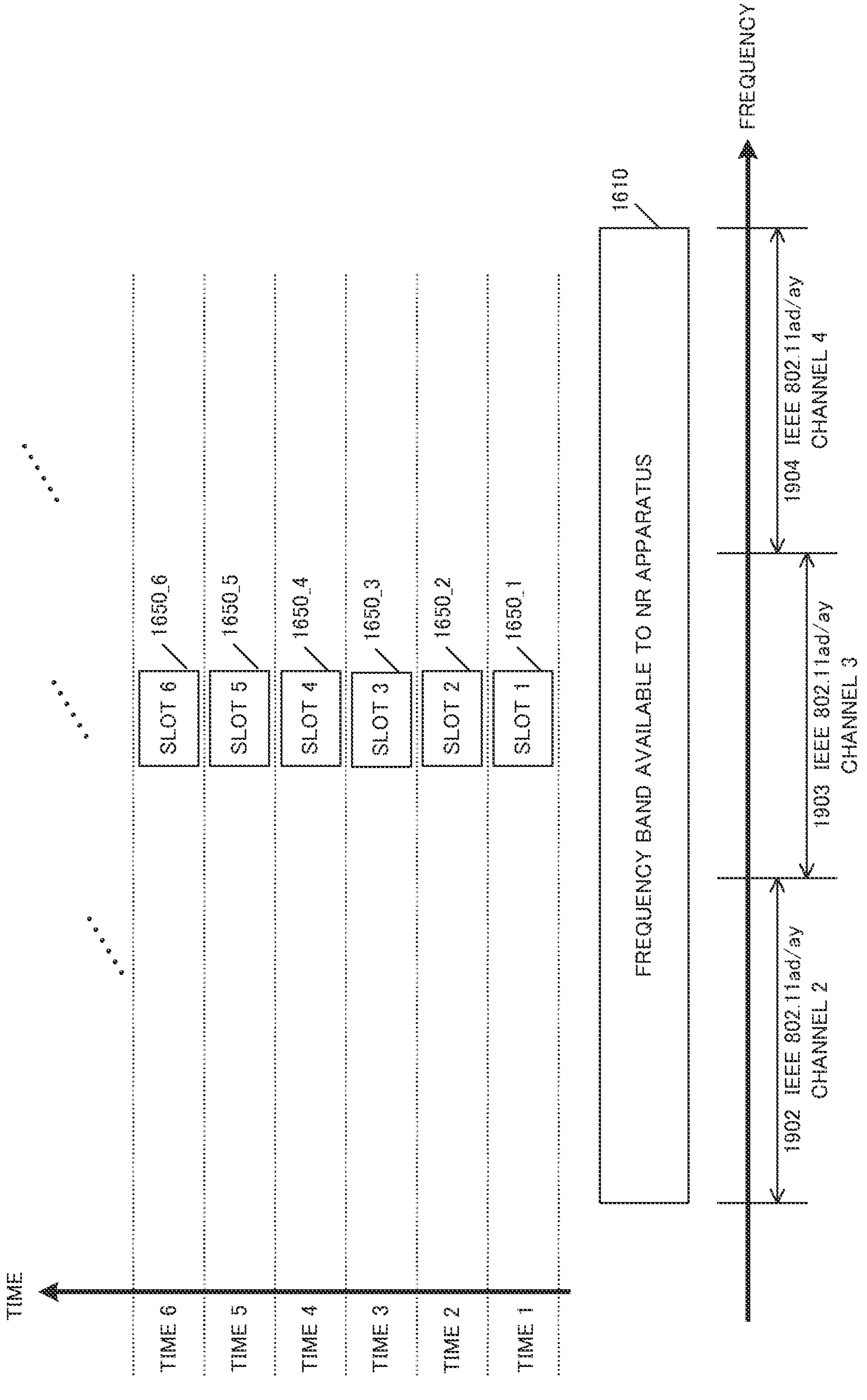
FIG. 27A illustrates an exemplary configuration of frames for a modulation signal transmitted by gNB.

FIG. 27A illustrates a communication method to address issues described as the example of communication status in above FIG. 18.

FIG. 27A illustrates an exemplary configuration of a frame for a modulation signal transmitted by gNB 1100 in FIG. 18, and the horizontal axis represents frequency while the vertical axis represents time. Note that components that operate in the same manner as in FIGS. 16A and 19A are denoted by the same reference signs, and the description thereof will be partially omitted.

As illustrated in FIG. 27A, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 27A, for example, "frequency band 1610 used by an NR apparatus" is present, and gNB 1100 in FIG. 18 transmits a modulation signal using "frequency band 1610 used by an NR apparatus", for example. Note that, in the example of FIG. 27A, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 27A, gNB 1100 transmits a modulation signal to a communication counterpart such as NR-UE #1 labeled 1101_1 in FIG. 18, for example, in the following manner.

At times 1, 2, 3, 4, 5, and 6, gNB 1100 transmits modulation signals in "slot 1 labeled 1650_1 included in 'IEEE 802.11ad and/or IEEE 802.11ay channel 3' labeled 1903", "slot 2 labeled 1650_2 included in 'IEEE 802.11ad and/or IEEE 802.11ay channel 3' labeled 1903", "slot 3 labeled 1650_3 included in ‘IEEE 802.11ad and/or IEEE 802.11ay channel 3’ labeled 1903”, “slot 4 labeled 1650_4 included in ‘IEEE 802.11ad and/or IEEE 802.11ay channel 3’ labeled 1903”, “slot 5 labeled 1650_5 included in ‘IEEE 802.11ad and/or IEEE 802.11ay channel 3’ labeled 1903”, and “slot 6 labeled 1650_6 included in ‘IEEE 802.11ad and/or IEEE 802.11 ay channel 3’ labeled 1903”.

The gNB transmits these modulation signals subjected to frequency allocation as in the example of FIG. 27A. Note that data to be transmitted to NR-UE #1 being the communication counterpart labeled 1101_1, for example, is included in the slots such as “slot 1 labeled 1650_1”, “slot 2 labeled 1650_2”, “slot 3 labeled 1650_3”, “slot 4 labeled 1650_4”, “slot 5 labeled 1650_5”, “slot 6 labeled 1650_6”, and so forth.

For example, the frequency of “slot 1 labeled 1650_1”, the frequency of “slot 2 labeled 1650_2”, the frequency of “slot 3 labeled 1650_3”, the frequency of “slot 4 labeled 1650_4”, the frequency of “slot 5 labeled 1650_5”, and the frequency of “slot 6 labeled 1650_6” may be the same or may partially overlap each other.

Note that, although not illustrated in FIG. 27A, the modulation signal transmitted by gNB 1100 may include a frame, symbol, slot, etc. other than “‘slot 1 labeled 1650_1’, ‘slot 2 labeled 1650_2’, ‘slot 3 labeled 1650_3’, ‘slot 4 labeled 1650_4’, ‘slot 5 labeled 1650_5’, ‘slot 6 labeled 1650_6’, and so forth” addressed to NR-UE #1 labeled 1101_1. In FIG. 27A. NR channels for the modulation signals transmitted by gNB 1100 are not illustrated.

The NR apparatuses are capable of generating a plurality of transmit beams to transmit slots as illustrated in FIG. 27A. In addition, for example, the NR apparatuses determine, from among a plurality of transmit beams, a transmit beam to be used for transmission for each slot, and transmits a modulation signal in the slot.

In addition, as one preferred embodiment, FIG. 27A assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner produces can make it less likely that interference is caused to other apparatuses that this NR apparatus and its communication counterpart. It is thus possible to obtain an effect of enhancing data transmission efficiency.

A description will be given of an exemplary operation of an NR apparatus in the “area (or country) where LBT is not performed”.

In the “area (or country) where LBT is not performed”. LBT is not performed before an NR apparatus transmits a modulation signal. For example, an NR apparatus with both the “LBT mode” and “no-LBT mode” operates the “no-LBT mode”. In the “area (or country) where LBT is not performed”, an NR apparatus with “no-LBT mode” and an NR apparatus without an LBT function may be present.

In this case, such NR apparatuses may transmit modulation signals using the transmission method as in the example of FIG. 27A (not limited to the example of FIG. 27A, however) as one of modes that are less likely to cause interference to another apparatus. Note that such NR apparatuses may include a mode of transmitting a modulation signal by a transmission method other than that in FIG. 27A. A variation of the “transmission method as in the example of FIG. 27A” that is less likely to cause interference to another apparatus will be described later.

A description will be given of an exemplary operation of an NR apparatus in the “area (or country) where LBT may be performed”.

In the “area (or country) where LBT may be performed”, an NR apparatus may “perform LBT” or may “not perform LBT” before transmitting a modulation signal.

When an NR apparatus with both the “LBT mode” and “no-LBT mode” performs LBT, the NR apparatus operates the “LBT mode” and performs LBT before transmitting a modulation signal.

Meanwhile, when an NR apparatus with both the “LBT mode” and “no-LBT mode” does not perform LBT, the “no-LBT mode” is operated, and at this time, applying the transmission method that causes less interference to another apparatus improves the data transmission efficiency of the system. Thus, an NR apparatus may transmit a modulation signal by the transmission method as in the example of FIG. 27A (not limited to the example of FIG. 27A, however) as one of methods of the “no-LBT mode”.

Note that the NR apparatus with both the “LBT mode” and “no-LBT mode” may include a mode of transmitting a modulation signal by a transmission method other than that in FIG. 27A. A variation of the “transmission method as in the example of FIG. 27A” that causes less interference to another apparatus will be described later.

In the “area (or country) where LBT may be performed”, an NR apparatus with “no-LBT mode” and an NR apparatus without an LBT function may be present. In this case, such NR apparatuses may transmit modulation signals by the transmission method as in the example of FIG. 27A (not limited to the example of FIG. 27A, however). This reduces interference to another apparatus and produces an effect of improving data transmission efficiency of the system.

Note that such NR apparatuses may include a mode of transmitting a modulation signal by a transmission method other than that in FIG. 27A. A variation of the “transmission method as in the example of FIG. 27A” that causes less interference to another apparatus will be described later.

In the “area (or country) where LBT is necessary”, an NR apparatus “performs LBT” before transmitting a modulation signal. In this case, the “LBT mode” is operated in the NR apparatus.

At this time, the NR apparatus performs LBT before transmitting a modulation signal, and when determining that the modulation signal can be transmitted, the NR apparatus may transmit the modulation signal by the transmission method as in the example of FIG. 27A (not limited to the example of FIG. 27A, however). This reduces interference to another apparatus and produces an effect of improving data transmission efficiency of the system.

Note that the NR apparatuses may include a mode of transmitting a modulation signal by a transmission method other than that in FIG. 27A. A variation of the “transmission method as in the example of FIG. 27A” that causes less interference to another apparatus will be described later.

Figure 27B:
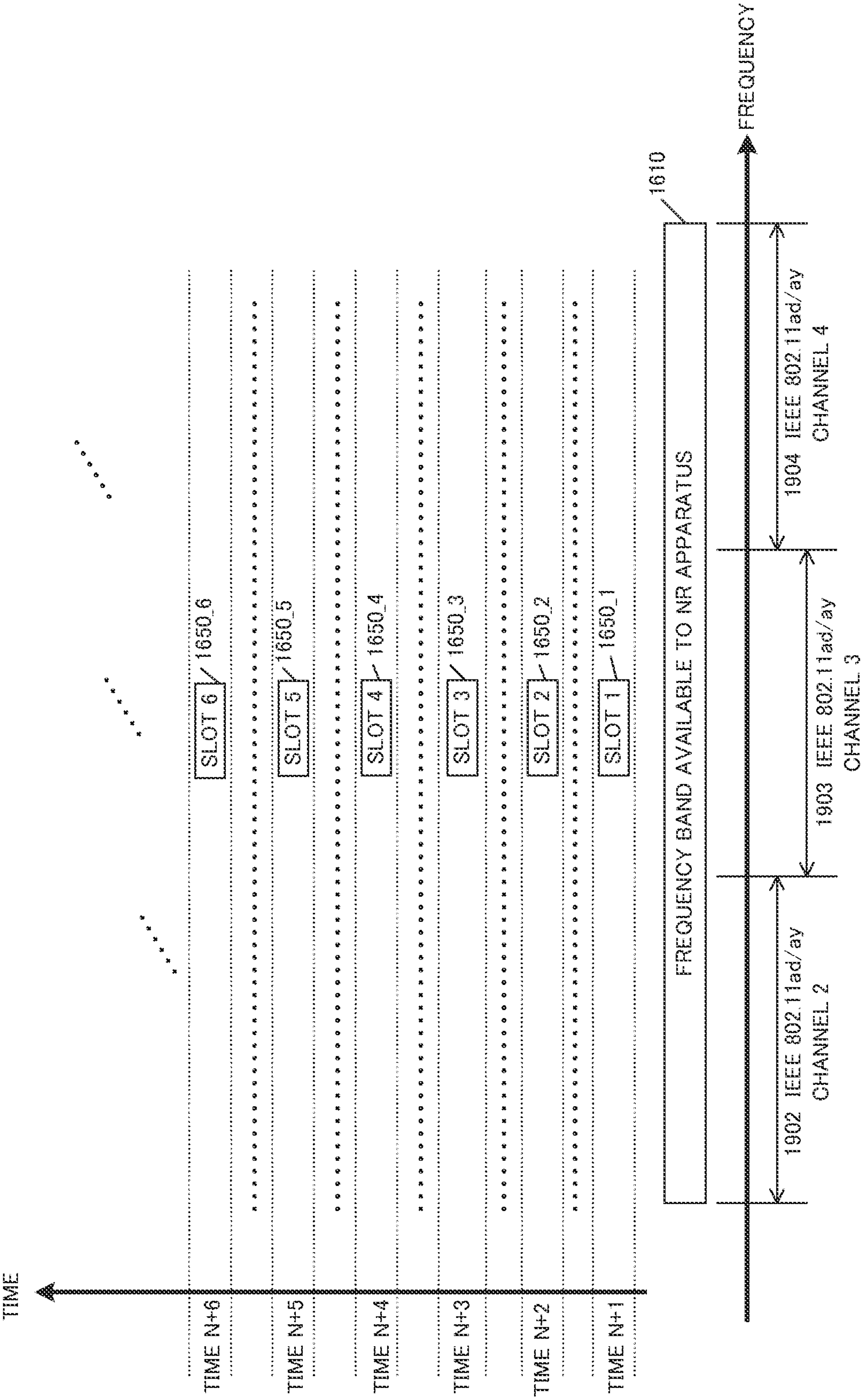
FIG. 27B illustrates an exemplary configuration of frames for a modulation signal transmitted by gNB.
Figure 27C:
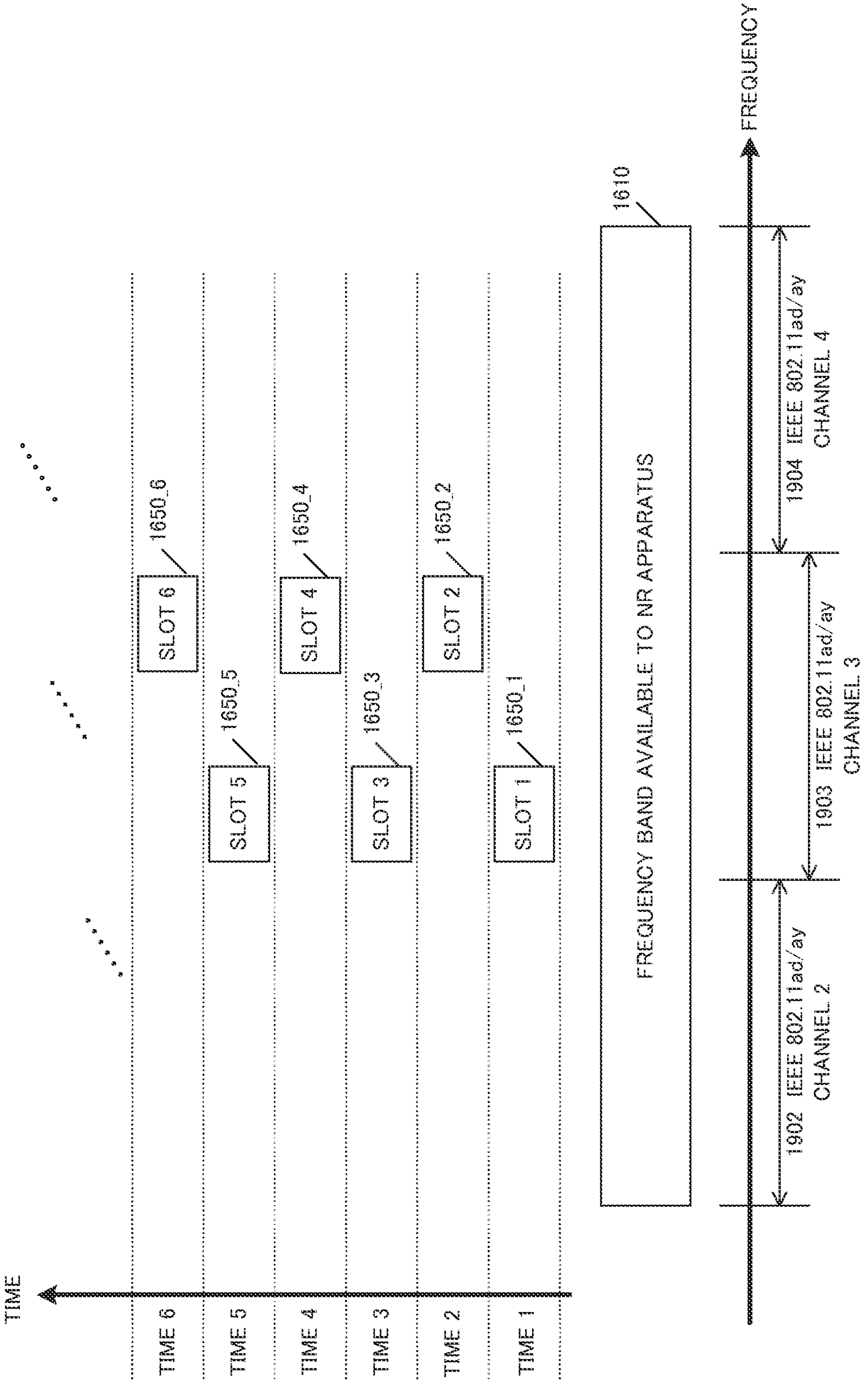
FIG. 27C illustrates an exemplary configuration of frames for a modulation signal transmitted by gNB.
Figure 27D:
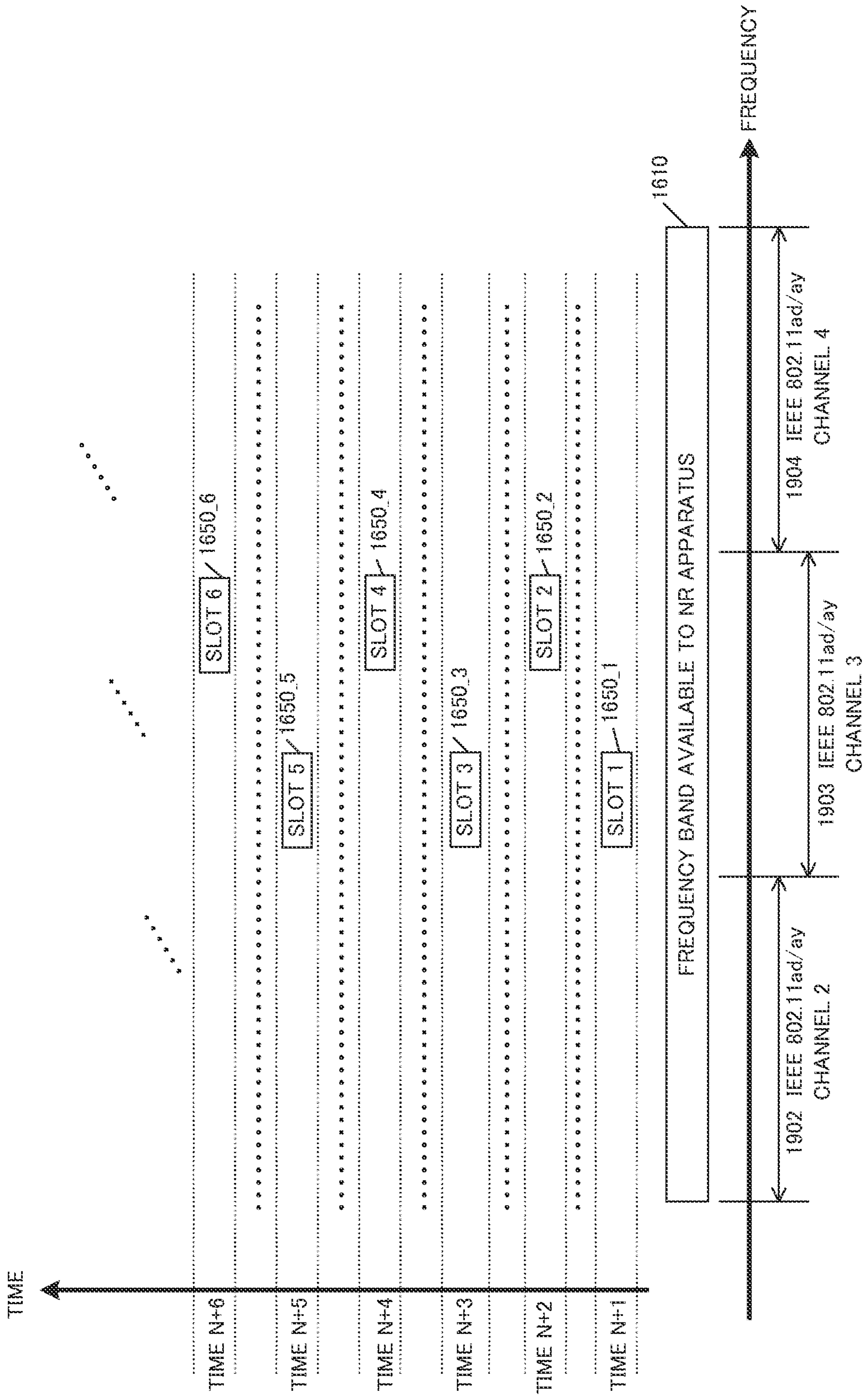
FIG. 27D illustrates an exemplary configuration of frames for a modulation signal transmitted by gNB.

The variation of the “transmission method as in the example of FIG. 27A” that causes less interference to another apparatus includes transmission methods in FIGS. 27B, 27C, and 27D.

FIG. 27B illustrates an exemplary configuration of a frame for a modulation signal transmitted by gNB 1100 in FIG. 18, and the horizontal axis represents frequency while the vertical axis represents time. Note that components that operate in the same manner as in FIGS. 16A and 19A are denoted by the same reference signs, and the description thereof will be partially omitted.

As illustrated in FIG. 27B, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 27B, for example, "frequency band 1610 used by an NR apparatus" is present, and gNB 1100 in FIG. 18 transmits a modulation signal using "frequency band 1610 used by an NR apparatus", for example. Note that, in the example of FIG. 27B, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 27B, gNB 1100 transmits a modulation signal to a communication counterpart such as NR-UE #1 labeled 1101_1 in FIG. 18, for example, in the following manner. At times N+1, N+2, N+3, N+4, N+5, and N+6, gNB 1100 transmits modulation signals, for example, in "slot 1 labeled 1650_1 included in 'IEEE 802.11ad and/or IEEE 802.11ay channel 3' labeled 1903", "slot 2 labeled 1650_2 included in 'IEEE 802.11ad and/or IEEE 802.11ay channel 3' labeled 1903", "slot 3 labeled 1650_3 included in 'IEEE 802.11ad and/or IEEE 802.11ay channel 3' labeled 1903", "slot 4 labeled 1650_4 included in 'IEEE 802.11ad and/or IEEE 802.11ay channel 3' labeled 1903", "slot 5 labeled 1650_5 included in 'IEEE 802.11ad and/or IEEE 802.11ay channel 3' labeled 1903", and "slot 6 labeled 1650_6 included in 'IEEE 802.11ad and/or IEEE 802.11ay channel 3' labeled 1903".

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 27B. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

For example, the frequency of "slot 1 labeled 1650_1", the frequency of "slot 2 labeled 1650_2", the frequency of "slot 3 labeled 1650_3", the frequency of "slot 4 labeled 1650_4", the frequency of "slot 5 labeled 1650_5", and the frequency of "slot 6 labeled 1650_6" may be the same or may partially overlap each other.

Note that, although not illustrated in FIG. 27B, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 27B, NR channels for the modulation signals transmitted by gNB 1100 are not illustrated.

The NR apparatuses are capable of generating a plurality of transmit beams to transmit slots as illustrated in FIG. 27B. In addition, for example, the NR apparatuses determine, from among a plurality of transmit beams, a transmit beam to be used for transmission for each slot, and transmits a modulation signal in the slot.

In addition, as one preferred embodiment, FIG. 27B assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner produces can make it less likely that interference is caused to other apparatuses that this NR apparatus and its communication counterpart. It is thus possible to obtain an effect of enhancing data transmission efficiency.

FIG. 27C illustrates an exemplary configuration of a frame for a modulation signal transmitted by gNB 1100 in FIG. 18, and the horizontal axis represents frequency while the vertical axis represents time. Note that components that operate in the same manner as in FIGS. 16A and 19A are denoted by the same reference signs, and the description thereof will be partially omitted.

As illustrated in FIG. 27C. "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 27C, for example, "frequency band 1610 used by an NR apparatus" is present, and gNB 1100 in FIG. 18 transmits a modulation signal using "frequency band 1610 used by an NR apparatus", for example. Note that, in the example of FIG. 27C, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 27C, gNB 1100 transmits a modulation signal to a communication counterpart such as NR-UE #1 labeled 1101_1 in FIG. 18, for example, in the following manner: at times 1, 2, 3, 4, 5, and 6, gNB 1100 transmits modulation signals in "slot 1 labeled 1650_1 included, for example, in 'IEEE 802.11ad and/or IEEE 802.11ay channel 3' labeled 1903", "slot 2 labeled 1650_2 included in 'IEEE 802.11ad and/or IEEE 802.11ay channel 3' labeled 1903", "slot 3 labeled 1650_3 included in 'IEEE 802.11ad and/or IEEE 802.11ay channel 3' labeled 1903", "slot 4 labeled 1650_4 included in 'IEEE 802.11ad and/or IEEE 802.11ay channel 3' labeled 1903", "slot 5 labeled 1650_5 included in 'IEEE 802.11ad and/or IEEE 802.11ay channel 3' labeled 1903", and "slot 6 labeled 1650_6 included in 'IEEE 802.11ad and/or IEEE 802.11ay channel 3' labeled 1903".

The gNB transmits these modulation signals subjected to frequency allocation as in the example of FIG. 27C. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4". "slot 5 labeled 1650_5", "slot 6 labeled 1650_6", and so forth.

For example, the frequency of "slot 1 labeled 1650_1", the frequency of "slot 3 labeled 1650_3", and the frequency of "slot 5 labeled 1650_5" may be the same or partially overlap each other.

Likewise, the frequency of "slot 2 labeled 1650_2", the frequency of "slot 4 labeled 1650_4", and the frequency of "slot 6 labeled 1650_6" may, for example, be the same or partially overlap each other.

Note that, although not illustrated in FIG. 27C, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 27C. NR channels for the modulation signals transmitted by gNB 1100 are not illustrated.

The NR apparatuses are capable of generating a plurality of transmit beams to transmit slots as illustrated in FIG. 27C. In addition, for example, the NR apparatuses determine, from among a plurality of transmit beams, a transmit beam to be used for transmission for each slot, and transmits a modulation signal in the slot.

In addition, as one preferred embodiment, FIG. 27C assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner produces can make it less likely that interference is caused to other apparatuses that this NR apparatus and its communication counterpart. It is thus possible to obtain an effect of enhancing data transmission efficiency.

FIG. 27D illustrates an exemplary configuration of a frame for a modulation signal transmitted by gNB 1100 in FIG. 18, and the horizontal axis represents frequency while the vertical axis represents time. Note that components that operate in the same manner as in FIGS. 16A and 19A are denoted by the same reference signs, and the description thereof will be partially omitted.

As illustrated in FIG. 27D, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 27D, for example. "frequency band 1610 used by an NR apparatus" is present, and gNB 1100 in FIG. 18 transmits a modulation signal using "frequency band 1610 used by an NR apparatus", for example. Note that, in the example of FIG. 27D, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 27D, gNB 1100 transmits a modulation signal to a communication counterpart such as NR-UE #1 labeled 1101_1 in FIG. 18, for example, in the following manner.

At times N+1, N+2, N+3, N+4, N+5, and N+6, gNB 1100 transmits modulation signals in "slot 1 labeled 1650_1 included, for example, in 'IEEE 802.11ad and/or IEEE 802.11ay channel 3' labeled 1903", "slot 2 labeled 1650_2 included in 'IEEE 802.11ad and/or IEEE 802.11ay channel 3' labeled 1903", "slot 3 labeled 1650_3 included in 'IEEE 802.11ad and/or IEEE 802.11ay channel 3' labeled 1903", "slot 4 labeled 1650_4 included in 'IEEE 802.11ad and/or IEEE 802. Hay channel 3' labeled 1903", "slot 5 labeled 1650_5 included in 'IEEE 802.11ad and/or IEEE 802.11ay channel 3' labeled 1903", and "slot 6 labeled 1650_6 included in 'IEEE 802.11ad and/or IEEE 802.11ay channel 3' labeled 1903".

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 27D. Note that data to be transmitted to NR-UE #1 being the communication counterpart labeled 1101_1, for example, is included in the slots such as "slot 1 labeled 1650_1", "slot 2 labeled 1650_2", "slot 3 labeled 1650_3", "slot 4 labeled 1650_4", "slot 5 labeled 1650_5", "slot 6 labeled 1650_6", and so forth.

For example, the frequency of "slot 1 labeled 1650_1", the frequency of "slot 3 labeled 1650_3", and the frequency of "slot 5 labeled 1650_5" may be the same or partially overlap each other.

Likewise, the frequency of "slot 2 labeled 1650_2", the frequency of "slot 4 labeled 1650_4", and the frequency of "slot 6 labeled 1650_6" may, for example, be the same or partially overlap each other.

Note that, although not illustrated in FIG. 27D, the modulation signal transmitted by gNB 1100 may include a frame, symbol, slot, etc. other than "'slot 1 labeled 1650_1', 'slot 2 labeled 1650_2', 'slot 3 labeled 1650_3', 'slot 4 labeled 1650_4', 'slot 5 labeled 1650_5', 'slot 6 labeled 1650_6', and so forth" addressed to NR-UE #1 labeled 1101_1. In FIG. 27D, NR channels for the modulation signals transmitted by gNB 1100 are not illustrated.

The NR apparatuses are capable of generating a plurality of transmit beams to transmit slots as illustrated in FIG. 27D. In addition, for example, the NR apparatuses determine, from among a plurality of transmit beams, a transmit beam to be used for transmission for each slot, and transmits a modulation signal in the slot.

In addition, as one preferred embodiment, FIG. 27D assumes that the transmit beam used in slot i of 1650_*i* and the transmit beam used in slot (i−1) of 1650_(i−1) are different transmit beams, and the transmit beam used in slot i of 1650_*i* and the transmit beam used in slot (i+1) of 1650_(i+1) are different transmit beams. Note that i is an integer equal to or greater than 2.

Transmitting the slots by an NR apparatus in the above manner produces can make it less likely that interference is caused to other apparatuses that this NR apparatus and its communication counterpart. It is thus possible to obtain an effect of enhancing data transmission efficiency.

In the following, a description will be given of exemplary arrangement of OFDM symbols (parts of OFDM symbols) on the frequency and time axes that is a variation of the arrangements in "FIGS. 27A, 27B, 27C, and 27D" and is different from the arrangements in "FIGS. 27A, 27B, 27C, and 27D".

Figure 28A:
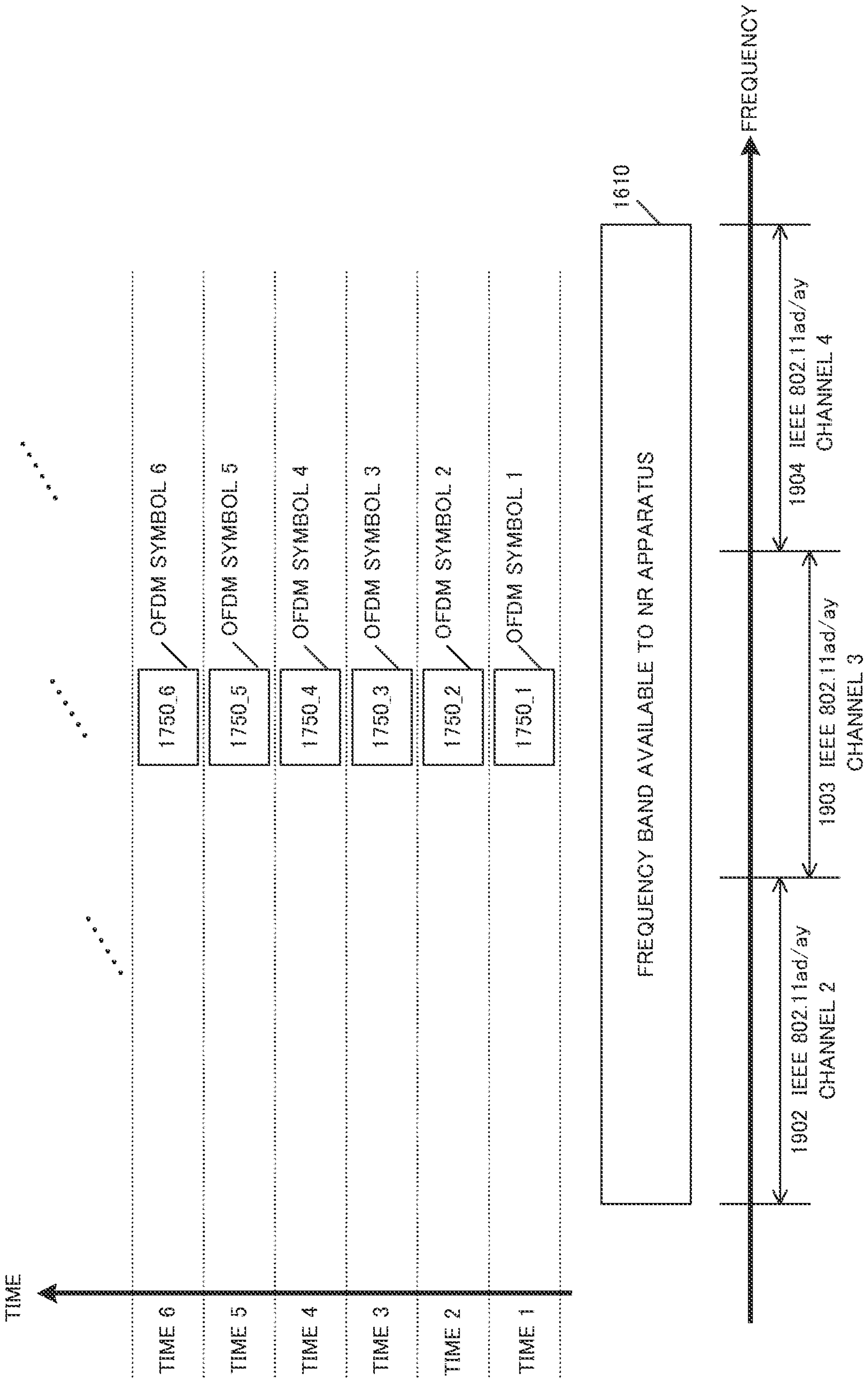
FIG. 28A illustrates an exemplary configuration of frames for a modulation signal transmitted by gNB.

FIG. 28A illustrates an exemplary configuration of a frame for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 28A, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 28A, for example, "frequency band 1610 used by an NR apparatus" is present, and gNB 1100 in FIG. 18 transmits a modulation signal using "frequency band 1610 used by an NR apparatus", for example. Note that, in the example of FIG. 28A, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "'IEEE 802.11 ad and/or IEEE 802.11ay channel 4' labeled 1904".

Then, as illustrated in FIG. 28A, gNB 1100 transmits a modulation signal to a communication counterpart such as NR-UE #1 labeled 1101_1 in FIG. 18, for example, in the following manner.

At times 1, 2, 3, 4, 5, and 6, gNB 1100 transmits modulation signals, for example, in "OFDM symbol (part of OFDM symbol) 1 labeled 1750_1 included in 'IEEE 802.11ad and/or IEEE 802.11ay channel 3' labeled 1903", "OFDM symbol (part of OFDM symbol) 2 labeled 1750_2 included in 'IEEE 802.11ad and/or IEEE 802.11ay channel 3' labeled 1903", "OFDM symbol (part of OFDM symbol) 3 labeled 1750_3 included in 'IEEE 802.11ad and/or IEEE 802.11ay channel 3' labeled 1903", "OFDM symbol (part of OFDM symbol) 4 labeled 1750_4 included in 'IEEE 802.11ad and/or IEEE 802.11ay channel 3' labeled 1903", "OFDM symbol (part of OFDM symbol) 5 labeled 1750_5 included in 'IEEE 802.11ad and/or IEEE 802.11ay channel 3' labeled 1903", and "OFDM symbol (part of OFDM symbol) 6 labeled 1750_6 included in 'IEEE 802.11ad and/or IEEE 802.11ay channel 3' labeled 1903", respectively.

The gNB transmits these modulation signals subjected to frequency allocation as in the example of FIG. 28A. Note, for example, that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

For example, the frequencies of "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', and so forth" may be the same or may partially overlap each other.

Note that, although not illustrated in FIG. 28A, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 28A, NR channels for the modulation signals transmitted by gNB 1100 are not illustrated.

The NR apparatuses are capable of generating a plurality of transmit beams to transmit the OFDM symbols (parts of OFDM symbols) as illustrated in FIG. 28A. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 28A assumes that the transmit beam used in OFDM symbol (part of OFDM symbol) i labeled **1750_*i* and the transmit beam used in OFDM symbol (part of OFDM symbol) (i−1) labeled 1750_(i−1) are different transmit beams, and the transmit beam used in OFDM symbol (part of OFDM symbol) i labeled 1750_*i* and the transmit beam used in OFDM symbol (part of OFDM symbol) (i+1) labeled 1750_**(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Figure 28B:
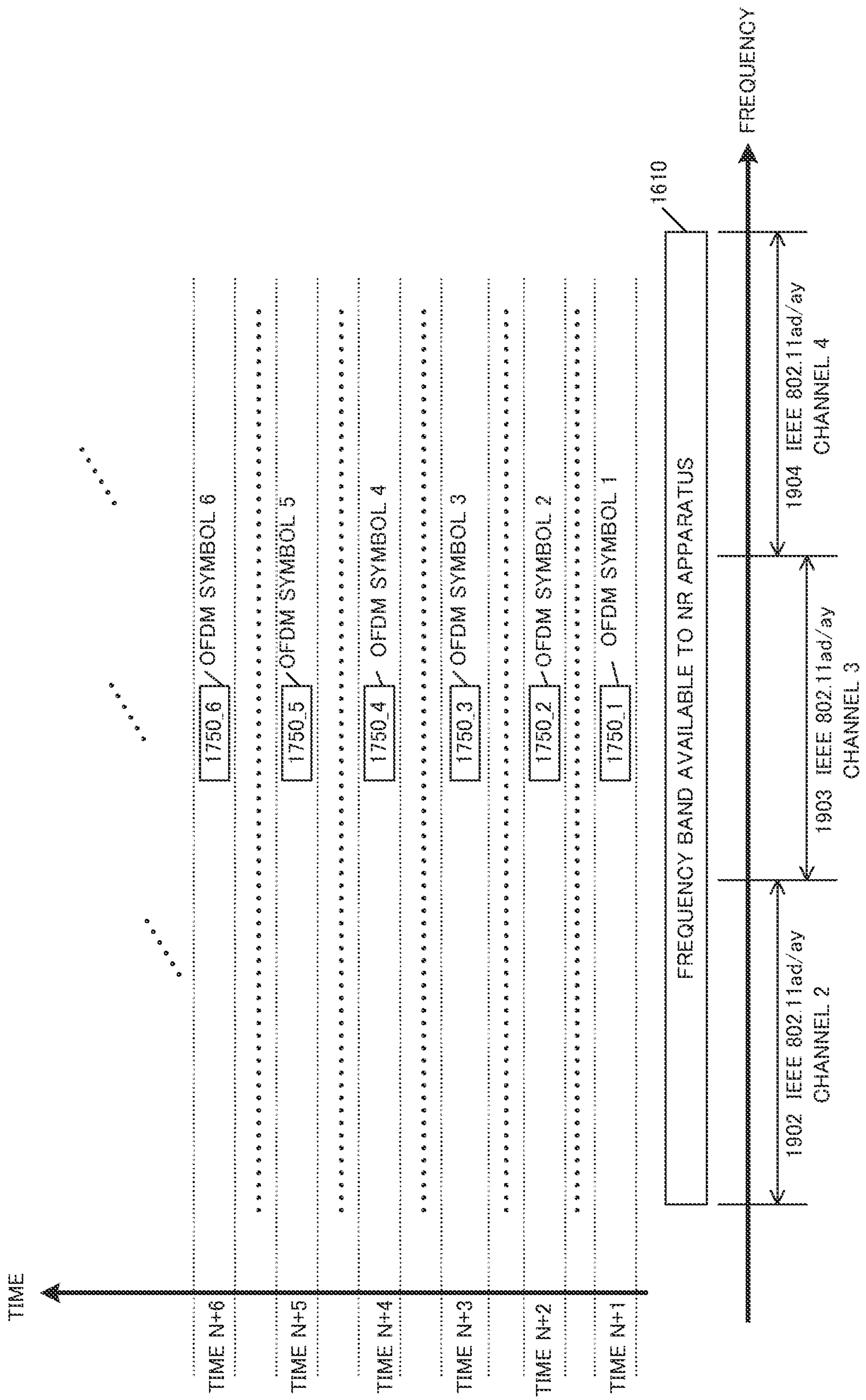
FIG. 28B illustrates an exemplary configuration of frames for a modulation signal transmitted by gNB.

FIG. 28B illustrates an exemplary configuration of a frame for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 28B, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 28B, for example, "frequency band 1610 used by an NR apparatus" is present, and gNB 1100 in FIG. 18 transmits a modulation signal using "frequency band 1610 used by an NR apparatus", for example. Note that, in the example of FIG. 28B, "frequency band 1610 used by an NR apparatus" includes "all or part of 'IEEE 802.11ad and/or IEEE 802.11ay channel 2' labeled 1902", "all or part of 'IEEE 802.11 ad and/or IEEE 802.11 ay channel 3' labeled 1903", and "all or part of 'IEEE 802.11ad and/or IEEE 802.11ay channel 4' labeled 1904".

Then, as illustrated in FIG. 28B, gNB 1100 transmits a modulation signal to a communication counterpart such as NR-UE #1 labeled 1101_1 in FIG. 18, for example, in the following manner.

At times N+1, N+2, N+3, N+4, N+5, and N+6, gNB 1100 transmits modulation signals, for example, in "OFDM symbol (part of OFDM symbol) I labeled 1750_1 included in 'IEEE 802.11ad and/or IEEE 802.11ay channel 3' labeled 1903", "OFDM symbol (part of OFDM symbol) 2 labeled 1750_2 included in 'IEEE 802.11ad and/or IEEE 802.11ay channel 3' labeled 1903", "OFDM symbol (part of OFDM symbol) 3 labeled 1750_3 included in 'IEEE 802.11ad and/or IEEE 802.11ay channel 3' labeled 1903". "OFDM symbol (part of OFDM symbol) 4 labeled 1750_4 included in 'IEEE 802.11ad and/or IEEE 802.11ay channel 3' labeled 1903", "OFDM symbol (part of OFDM symbol) 5 labeled 1750_5 included in 'IEEE 802.11ad and/or IEEE 802.11ay channel 3' labeled 1903", and "OFDM symbol (part of OFDM symbol) 6 labeled 1750_6 included in 'IEEE 802.11ad and/or IEEE 802.11ay channel 3' labeled 1903", respectively.

Note that another "frame, symbol, signal, etc" may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 28B. Note, for example, that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

For example, the frequencies of "'OFDM symbol (part of OFDM symbol) 1 labeled 1750_1', 'OFDM symbol (part of OFDM symbol) 2 labeled 1750_2', 'OFDM symbol (part of OFDM symbol) 3 labeled 1750_3', 'OFDM symbol (part of OFDM symbol) 4 labeled 1750_4', 'OFDM symbol (part of OFDM symbol) 5 labeled 1750_5', 'OFDM symbol (part of OFDM symbol) 6 labeled 1750_6', and so forth" may be the same or may partially overlap each other.

Note that, although not illustrated in FIG. 28B, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 28B, NR channels for the modulation signals transmitted by gNB 1100 are not illustrated.

The NR apparatuses are capable of generating a plurality of transmit beams to transmit the OFDM symbols (parts of OFDM symbols) as illustrated in FIG. 28B. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 28B assumes that the transmit beam used in OFDM symbol (part of OFDM symbol) i labeled 1750_*i* and the transmit beam used in OFDM symbol (part of OFDM symbol) (i−1) labeled 1750_(i−1) are different transmit beams, and the transmit beam used in OFDM symbol (part of OFDM symbol) i labeled 1750_*i* and the transmit beam used in OFDM symbol (part of OFDM symbol) (i+1) labeled 1750_(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Figure 28C:
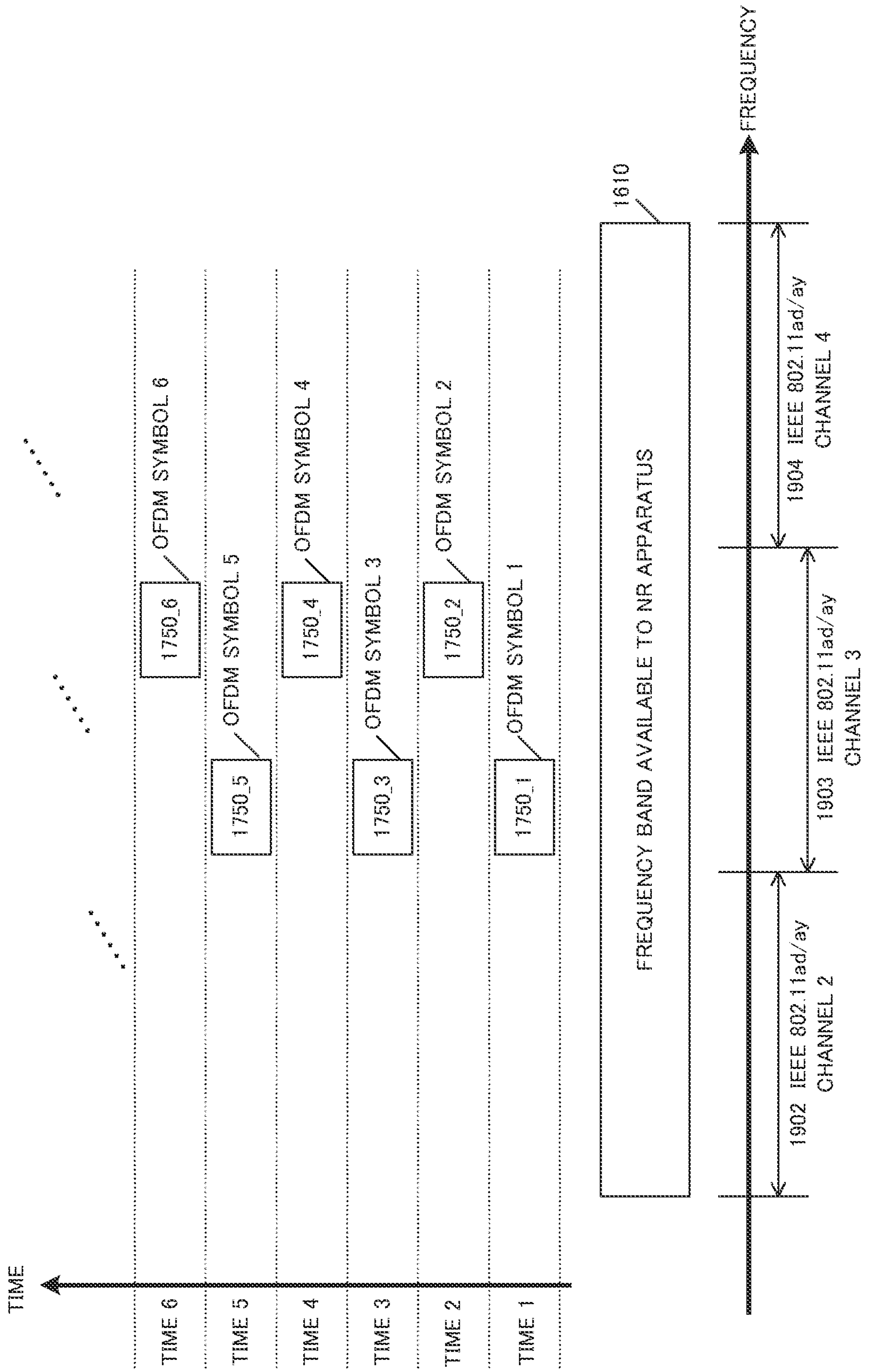
FIG. 28C illustrates an exemplary configuration of frames for a modulation signal transmitted by gNB.

FIG. 28C illustrates an exemplary configuration of a frame for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 28C, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 28C, for example, "frequency band 1610 used by an NR apparatus" is present, and gNB 1100 in FIG. 18 transmits a modulation signal using "frequency band 1610 used by an NR apparatus", for example. Note that, in the example of FIG. 28C, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 28C, gNB 1100 transmits a modulation signal to a communication counterpart such as NR-UE #1 labeled 1101_1 in FIG. 18, for example, in the following manner.

At times 1, 2, 3, 4, 5, and 6, gNB 1100 transmits modulation signals, for example, in "OFDM symbol (part of OFDM symbol) 1 labeled 1750_1 included in 'IEEE 802.11ad and/or IEEE 802.11ay channel 3' labeled 1903", "OFDM symbol (part of OFDM symbol) 2 labeled 1750_2 included in 'IEEE 802.11ad and/or IEEE 802.11ay channel 3' labeled 1903", "OFDM symbol (part of OFDM symbol) 3 labeled 1750_3 included in 'IEEE 802.11ad and/or IEEE 802.11ay channel 3' labeled 1903", "OFDM symbol (part of OFDM symbol) 4 labeled 1750_4 included in 'IEEE 802.11ad and/or IEEE 802.11ay channel 3' labeled 1903", "OFDM symbol (part of OFDM symbol) 5 labeled 1750_5 included in 'IEEE 802.11ad and/or IEEE 802.11ay channel 3' labeled 1903", and "OFDM symbol (part of OFDM symbol) 6 labeled 1750_6 included in 'IEEE 802.11ad and/or IEEE 802.11ay channel 3' labeled 1903", respectively.

The gNB transmits these modulation signals subjected to frequency allocation as in the example of FIG. 28C. Note, for example, that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

For example, the frequency of "OFDM symbol (part of OFDM symbol) 1 labeled 1750_1", the frequency of "OFDM symbol (part of OFDM symbol) 3 labeled 1750_3", and the frequency of "OFDM symbol (part of OFDM symbol) 5 labeled 1750_5" may be the same or may partially overlap each other.

Likewise, for example, the frequency of "OFDM symbol (part of OFDM symbol) 2 labeled 1750_2", the frequency of "OFDM symbol (part of OFDM symbol) 4 labeled 1750_4", and the frequency of "OFDM symbol (part of OFDM symbol) 6 labeled 1750_6" may be the same or may partially overlap each other.

Note that, although not illustrated in FIG. 28C, the modulation signal transmitted by gNB 1100 may include a frame, symbol, slot, etc. other than "OFDM symbol (part of OFDM symbol) I labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 28C, NR channels for the modulation signals transmitted by gNB 1100 are not illustrated.

The NR apparatuses are capable of generating a plurality of transmit beams to transmit the OFDM symbols (parts of OFDM symbols) as illustrated in FIG. 28C. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 28C assumes that the transmit beam used in OFDM symbol (part of OFDM symbol) i labeled 1750_*i* and the transmit beam used in OFDM symbol (part of OFDM symbol) (i−1) labeled 1750_(i−1) are different transmit beams, and the transmit beam used in OFDM symbol (part of OFDM symbol) i labeled 1750_*i* and the transmit beam used in OFDM symbol (part of OFDM symbol) (i+1) labeled 1750_(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Figure 28D:
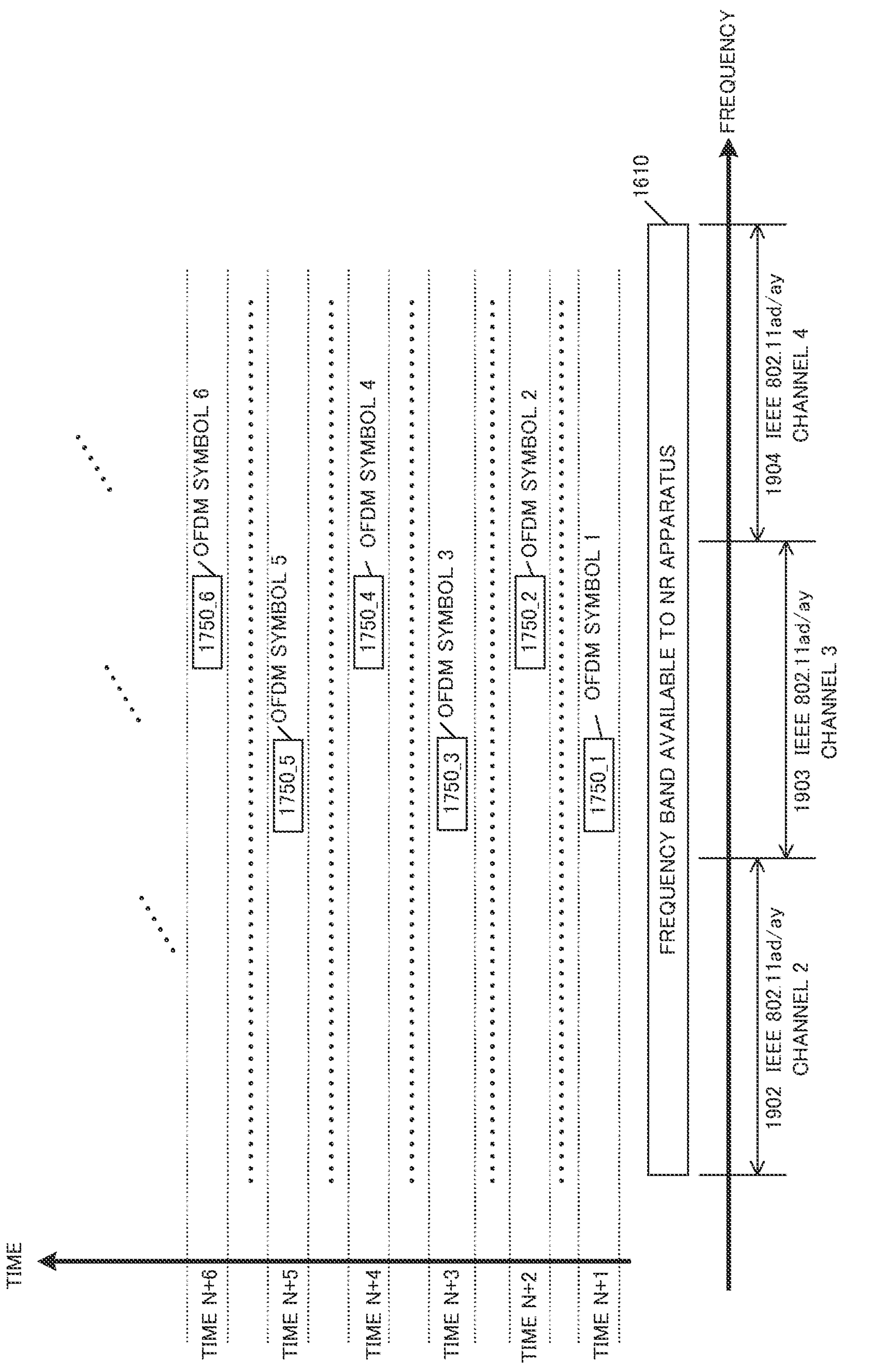
FIG. 28D illustrates an exemplary configuration of frames for a modulation signal transmitted by gNB.
Figure 29:
FIG. 29 illustrates an exemplary communication state of radio communication devices according to a conventional technique.

FIG. 28D illustrates an exemplary configuration of a frame for a modulation signal transmitted by gNB 1100 in FIG. 18, and the horizontal axis represents frequency while the vertical axis represents time. Note that components that operate in the same manner as in FIGS. 16A, 17A, and 19A are denoted by the same reference signs, and the description thereof will be partially omitted.

As illustrated in FIG. 28D, "IEEE 802.11ad and/or IEEE 802.11ay channel 2" labeled 1902, "IEEE 802.11ad and/or IEEE 802.11ay channel 3" labeled 1903, and "IEEE 802.11ad and/or IEEE 802.11ay channel 4" labeled 1904 are present for the frequency axis. In FIG. 28D, for example, "frequency band 1610 used by an NR apparatus" is present, and gNB 1100 in FIG. 18 transmits a modulation signal using "frequency band 1610 used by an NR apparatus", for example. Note that, in the example of FIG. 28D, "frequency band 1610 used by an NR apparatus" includes "all or part of 'IEEE 802.11ad and/or IEEE 802.11ay channel 2' labeled 1902", "all or part of 'IEEE 802.11ad and/or IEEE 802.11ay channel 3' labeled 1903", and "all or part of 'IEEE 802.11ad and/or IEEE 802.11ay channel 4' labeled 1904".

Then, as illustrated in FIG. 28D, gNB 1100 transmits a modulation signal to a communication counterpart such as NR-UE #1 labeled 1101_1 in FIG. 18, for example, in the following manner.

At times N+1, N+2, N+3, N+4, N+5, and N+6, gNB 1100 transmits modulation signals, for example, in "OFDM symbol (part of OFDM symbol) 1 labeled 1750_1 included in 'IEEE 802.11ad and/or IEEE 802.11ay channel 3' labeled 1903", "OFDM symbol (part of OFDM symbol) 2 labeled 1750_2 included in 'IEEE 802.11ad and/or IEEE 802.11ay channel 3' labeled 1903", "OFDM symbol (part of OFDM symbol) 3 labeled 1750_3 included in 'IEEE 802.11ad and/or IEEE 802.11ay channel 3' labeled 1903", "OFDM symbol (part of OFDM symbol) 4 labeled 1750_4 included in 'IEEE 802.11ad and/or IEEE 802.11ay channel 3' labeled 1903", "OFDM symbol (part of OFDM symbol) 5 labeled 1750_5 included in 'IEEE 802.11ad and/or IEEE 802.11ay channel 3' labeled 1903", and "OFDM symbol (part of OFDM symbol) 6 labeled 1750_6 included in 'IEEE 802.11ad and/or IEEE 802.11ay channel 3' labeled 1903", respectively.

Note that another "frame, symbol, signal, etc." may be present between time N+1 and time N+2.

Note that another "frame, symbol, signal, etc." may be present between time N+2 and time N+3 or the other times.

That is, another "frame, symbol, signal, etc." may be present in time N+i and time N+i+1. Here, N is an integer equal to or greater than 0, and i is an integer equal to or greater than 1.

The gNB transmits these modulation signals subjected to frequency allocation as in the example of FIG. 28D. Note, for example, that data to be transmitted to NR-UE #1 being the communication counterpart labeled 1101_1 is included in the OFDM symbols (parts of OFDM symbols) such as "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6", and so forth.

For example, the frequency of "OFDM symbol (part of OFDM symbol) I labeled 1750_1", the frequency of "OFDM symbol (part of OFDM symbol) 3 labeled 1750_3", and the frequency of "OFDM symbol (part of OFDM symbol) 5 labeled 1750_5" may be the same or may partially overlap each other.

Likewise, for example, the frequency of "OFDM symbol (part of OFDM symbol) 2 labeled 1750_2", the frequency of "OFDM symbol (part of OFDM symbol) 4 labeled 1750_4", and the frequency of "OFDM symbol (part of OFDM symbol) 6 labeled 1750_6" may be the same or may partially overlap each other.

Note that, although not illustrated in FIG. 28D, the modulation signal transmitted by gNB 1100 may include a frame, symbol, slot, etc. other than "OFDM symbol (part of OFDM symbol) 1 labeled 1750_1", "OFDM symbol (part of OFDM symbol) 2 labeled 1750_2", "OFDM symbol (part of OFDM symbol) 3 labeled 1750_3", "OFDM symbol (part of OFDM symbol) 4 labeled 1750_4", "OFDM symbol (part of OFDM symbol) 5 labeled 1750_5", "OFDM symbol (part of OFDM symbol) 6 labeled 1750_6', and so forth" addressed to NR-UE #1 labeled 1101_1. In FIG. 28D, NR channels for the modulation signals transmitted by gNB 1100 are not illustrated.

The NR apparatuses are capable of generating a plurality of transmit beams to transmit the OFDM symbols (parts of OFDM symbols) as illustrated in FIG. 28D. In addition, for example, the NR apparatuses determine, from among a plurality of transmit beams, a transmit beam to be used for transmission for each of the OFDM symbols (parts of OFDM symbols), and transmits a modulation signal in the OFDM symbol (part of the OFDM symbol).

In addition, as one preferred embodiment, FIG. 28D assumes that the transmit beam used in OFDM symbol (part of OFDM symbol) i labeled 1750_*i* and the transmit beam used in OFDM symbol (part of OFDM symbol) (i−1) labeled 1750_(i−1) are different transmit beams, and the transmit beam used in OFDM symbol (part of OFDM symbol) i labeled 1750_*i* and the transmit beam used in OFDM symbol (part of OFDM symbol) (i+1) labeled 1750_(i+1) are different transmit beams. Note that i is an integer equal to or greater than 2.

Transmitting the OFDM symbols (parts of OFDM symbols) by an NR apparatus in the above manner can make it less likely that interference is caused to other apparatuses than this NR apparatus and its communication counterpart. It is thus possible to obtain an effect of enhancing data transmission efficiency.

Although exemplary arrangements of OFDM symbols (parts of OFDM symbols) have been described above with reference to FIGS. 28A, 28B, 28C and 28D, the arrangement method for the OFDM symbols (parts of OFDM symbols) is not limited to these examples, and the OFDM symbols (parts of OFDM symbols) may be arranged or configured using two or more arrangement/configuration methods of the "arrangement/configuration method for OFDM symbols (parts of OFDM symbols) in FIG. 28A", the "arrangement/configuration method for OFDM symbols (parts of OFDM symbols) in FIG. 28B", the "arrangement/configuration method for OFDM symbols (parts of OFDM symbols) in FIG. 28C", and the "arrangement/configuration method for OFDM symbols (parts of OFDM symbols) in FIG. 28D", for example.

For example, in FIGS. 28A, 28B, 28C and 28D, the NR channels to which the plurality of OFDM symbols (parts of OFDM symbols) belong are not limited to these examples.

As long as OFDM symbols (parts of OFDM symbols) are placed in any of the "IEEE 802.11ad and/or IEEE 802.11ay channels" such as IEEE 802.11ad and/or IEEE 802.11ay channel 2 labeled 1902, IEEE 802.11ad and/or IEEE 802.11ay channel 3 labeled 1903. IEEE 802.11ad and/or IEEE 802.11ay channel 4 labeled 1904, and the like on the frequency axis, the same as the above description can be implemented and the same effects can be obtained as well.

While FIGS. 28A, 28B, 28C and 28D illustrate the exemplary configurations in which "frequency band 1610 available to an NR apparatus" includes three "IEEE 802.11ad and/or IEEE 802.11ay channels", the present disclosure is not limited to the examples, and the same can be implemented and the same effects can be obtained as long as "frequency band 1610 available to an NR apparatus" includes one or more "IEEE 802.11ad and/or IEEE 802.11ay channels".

While FIGS. 28C and 28D illustrate the examples in which the OFDM symbols (parts of OFDM symbols) are present at two frequencies in one "IEEE 802.11ad and/or IEEE 802.11ay channel" ("IEEE 802.11ad and/or IEEE 802.11ay channel 3" labeled 1903), the present disclosure is not limited to the examples, and the same can be implemented as long as the OFDM symbols (parts of OFDM symbols) are present at one or more frequencies in one "IEEE 802.11 ad and/or IEEE 802.11ay channel" ("IEEE 802.11ad and/or IEEE 802.11ay channel 3" labeled 1903).

Note that the specific contents of the "slots, symbols (parts of OFDM symbols)", the specific contents of the "LBT mode" and the "no-LBT mode", the specific contents of the "mode for performing LBT, the mode for not performing LBT", the SCS of OFDM, and the like have been described in Embodiment 1, and thus detailed explanation thereof is omitted.

Although "FIGS. 25A, 25B, 25C, and 25D", "FIGS. 26A, 26B, 26C, and 26", "FIGS. 27A, 27B, 27C, and 27D", and "FIGS. 28A, 28B, 28C, and 28D" illustrate exemplary arrangement of "frames, slots, and OFDM symbols (parts of OFDM symbols)" that transmit data on the frequency and time axes, a signal other than the "frames, slots, and OFDM symbols (parts of OFDM symbols)", e.g., RS such as DMRS and PTRS, may be present in a modulation signal to be transmitted. For example, RS such as DMRS and PTRS may be present at any of the times in the frequencies where the "frames, slots, OFDM symbols (parts of OFDM symbols)" are present.

In addition, to indicate information on the frequencies where the "frames, slots, and OFDM symbols (parts of OFDM symbols)" that transmit data are present (information on frequency hopping) and information on a communication method (information on multi-carrier/single carrier. SCS, the time at which the slot is placed, etc.) to a communication counterpart, a frame for transmitting control information including such information may be placed on the frequency and time axes in "FIGS. 25A, 25B, 25C, and 25D", "FIGS. 26A, 26B, 26C, and 26D", "FIGS. 27A, 27B, 27C, and 27D", and "FIGS. 28A, 28B, 28C, and 28D".

In "FIGS. 25A, 25B, 25C, and 25D" and "FIGS. 27A, 27B, 27C, and 27D", each slot (e.g., slot 1 labeled 1650_1, slot 2 labeled 1650_2, slot 3 labeled 1650_3, and so forth) may be composed of a plurality of slots. To be more specific, "slot 1 labeled 1650_1" in "FIGS. 25A, 25B, 25C, and 25D" and "FIGS. 27A, 27B, 27C, and 27D", for example, may be composed of a plurality of slots. In addition, the plurality of slots may be transmitted in the same frequency at the same time using a plurality of antennas, for example. That is, each slot in "FIGS. 25A, 25B, 25C, and 25D" and "FIGS. 27A, 27B, 27C, and 27D" may be transmitted using MIMO.

A description will be given with reference to FIG. 25A, by way of example. It is assumed that slot 1 labeled 1650_1 is composed of a plurality of slots. In this case, the plurality of slots are present at time 1 in the frequency where slot 1 labeled 1650_1 is placed in FIG. 25A, and are transmitted using a plurality of antennas, for example.

Note that this applies to "FIGS. 25B, 25C, and 25D" and "FIGS. 27A, 27B, 27C, and 27D" as well.

In "FIGS. 26A, 26B, 26C, and 26D" and "FIGS. 28A, 28B, 28C, and 28D", each OFDM symbol (part of OFDM symbol), e.g., OFDM symbol (part of OFDM symbol) 1 labeled 1750_1, OFDM symbol (part of OFDM symbol) 2 labeled 1750_2. OFDM symbol (part of OFDM symbol) 3 labeled 1750_3, and so forth, may be composed of a plurality of OFDM symbols (parts of OFDM symbols). To be more specific, "OFDM symbol (part of OFDM symbol) 1 labeled 1750_1" in "FIGS. 26A, 26B, 26C, and 26D" and "FIGS. 28A, 28B, 28C, and 28D", for example, may be composed of a plurality of OFDM symbols (parts of OFDM symbols). In addition, the plurality of OFDM symbols (parts of OFDM symbols) may be transmitted in the same frequency at the same time using a plurality of antennas, for example. That is, each OFDM symbol (part of OFDM symbol) in "FIGS. 26A, 26B, 26C, and 26D" and "FIGS. 28A, 28B, 28C, and 28D" may be transmitted using MIMO.

A description will be given with reference to FIG. 26A, by way of example. It is assumed that OFDM symbol (part of OFDM symbol) 1 labeled 1750_1 is composed of a plurality of slots. In this case, the plurality of OFDM symbols (parts of OFDM symbols) are placed at time 1 in the frequency where OFDM symbol (part of OFDM symbol) 1 labeled 1750_1 is placed in FIG. 26A, and are transmitted using a plurality of antennas, for example.

Note that this applies to "FIGS. 26B, 26C, and 26D" and "FIGS. 28A, 28B, 28C, and 28D" as well.

Not only gNB performs transmission of a modulation signal exemplified in "FIGS. 25A, 25B, 25C, and 25D", "FIGS. 26A, 26B, 26C, and 26D", "FIGS. 27A, 27B, 27C, and 27D", and "FIGS. 28A, 28B, 28C, and 28D". NR-UE, a repeater, a transmission (Tx)/reception (Rx) point (TRP), and an apparatus or system including a communication apparatus may perform transmission of a modulation signal exemplified in "FIGS. 25A, 25B, 25C, and 25D", "FIGS. 26A, 26B, 26C, and 26D", "FIGS. 27A, 27B, 27C, and 27D", and "FIGS. 28A, 28B, 28C, and 28D".

The NR apparatuses such as, e.g., gNB, NR-UE, repeater. TRP, and a communication apparatus may support two or more of the communication methods (frames) in "FIGS. 23A, 23B, 23C, 23D, 23E, and 23F", "FIGS. 24A, 24B, 24C, 24D, 24E, 24F, 24G, 24H, and 24I", "FIGS. 25A, 25B, 25C, and 25D", "FIGS. 26A, 26B, 26C, and 26D", "FIGS. 27A, 27B, 27C, and 27D", and "FIGS. 28A, 28B, 28C, and 28D", and may select at least one of the two or more communication methods (frames) to generate and transmit a modulation signal. Note that the NR apparatuses may generate and transmit the modulation signal using a plurality of communication methods (frames) of the two or more communication methods (frames). In addition, the NR apparatuses may, for example, generate and transmit the modulation signal using a plurality of communication methods with FH described in Embodiment 1.

The NR apparatuses such as, e.g., gNB, NR-UE, repeater, TRP, and a communication apparatus may support "one, two, three, or more" of the communication methods (frames) in "FIGS. 23A, 23B, 23C, 23D, 23E, and 23F", "FIGS. 24A, 24B, 24C, 24D, 24E, 24F, 24G, 24H, and 24I", "FIGS. 25A, 25B, 25C, and 25D", "FIGS. 26A, 26B, 26C, and 26D", "FIGS. 27A, 27B. 27C, and 27D", and "FIGS. 28A, 28B, 28C, and 28D", and may select at least one of the "one, two, three, or more" communication methods (frames) to generate and transmit a modulation signal. Note that the NR apparatuses may generate and transmit the modulation signal using a plurality of communication methods (frames) of the "one, two, three, or more" communication methods (frames). In addition, the NR apparatuses may, for example, generate and transmit the modulation signal using a plurality of communication methods with FH described in Embodiment 1.

In this case, the NR apparatuses transmit control information including information on the communication method (frame) being used. Examples of the "information on the communication method (frame) being used" include, but not limited to, "information on a frequency being used", "information on a (sub)carrier being used", "information on an apparatus serving as an addressee of a modulation signal", and the like.

FIGS. 1A, 1B, 1C, 9, and 10 illustrate the configuration of the NR apparatuses such as, e.g., gNB. NR-UE, repeater, TRP, and a communication apparatus. The NR apparatuses are capable of generating a plurality of transmission beams (performing a transmission directivity control) as illustrated in these figures.

Thus, the NR apparatuses are capable of performing the communication method as described below Method 1:

For example, a plurality of frames are present on the time and frequency axes in "FIGS. 23A and 23B" and "FIGS. 24A, 24B, and 24C", and the NR apparatuses transmit the plurality of frames using an identical transmit beam.

Method 2:

For example, a plurality of frames are present on the time and frequency axes in "FIGS. 23A and 23" and "FIGS. 24A, 24B, and 24C", and the NR apparatuses transmit the plurality of frames using a plurality of transmit beams. That is, a set of i and j satisfying that "a transmit beam used in frame i differs from a transmit beam used in frame j" exists. Note that i≠j holds true. In addition, i and j are an integer equal to or greater than 1, for example.

Method 3:

For example, a plurality of slots are present on the time and frequency axes in "FIGS. 23C and 23D", "FIGS. 24D, 24E, and 24F", "FIGS. 25A, 25B, 25C, and 25D", and "FIGS. 27A, 27B, 27C, and 27D", and the NR apparatuses transmit the plurality of slots using an identical transmit beam.

Method 4:

For example, a plurality of slots are present on the time and frequency axes in "FIGS. 23C and 23D", "FIGS. 24D, 24E, and 24F", "FIGS. 25A, 25B, 25C, and 25D", and "FIGS. 27A, 27B, 27C, and 27D", and the NR apparatuses transmit the plurality of slots using a plurality of transmit beams. That is, a set of i and j satisfying that "a transmit beam used in slot i differs from a transmit beam used in slot j" exists. Note that i≠j holds true. In addition, i and j are an integer equal to or greater than 1, for example.

Method 5:

For example, a plurality of OFDM symbols (parts of OFDM symbols) are present on the time and frequency axes in "FIGS. 23A and 23B" and "FIGS. 23E and 23F", "FIGS. 24G, 24H, and 24I", "FIGS. 26A, 26B, 26C, and 26D", and "FIGS. 28A, 28B, 28C, and 28D", and the NR apparatuses transmit the plurality of OFDM symbols (parts of OFDM symbols) using an identical transmit beam.

Method 6:

For example, a plurality of OFDM symbols (parts of OFDM symbols) are present on the time and frequency axes in "FIGS. 23E and 23F", "FIGS. 24G, 24H, and 24I", "FIGS. 26A, 26B, 26C, and 26D", and "FIGS. 28A, 28B, 28C, and 28D", and the NR apparatuses transmit the plurality of OFDM symbols (parts of OFDM symbols) using a plurality of transmit beams. That is, a set of i and j satisfying that "a transmit beam used in an OFDM symbol (part of an OFDM symbol) i differs from a transmit beam used in an OFDM symbol (part of an OFDM symbol) j" exists. Note that i #j holds true. In addition, i and j are an integer equal to or greater than 1, for example.

For example, a plurality of frames are present on the time and frequency axes in "FIGS. 23A and 23B" and "FIGS. 24A, 24B, and 24C", and frame i and frame j satisfying the following exists. Note that i j holds true. In addition, i and j are an integer equal to or greater than 1, for example.

Conditions:

Frame i and frame j include the same data. Alternatively, frame i and frame j are configured to include the same content while "differing from each other in terms of conditions, such as a compression ratio and/or a configuration". Alternatively, frame i and frame j include partly the same data.

Likewise, a plurality of slots are present on the time and frequency axes in "FIGS. 23C and 23D", "FIGS. 24D, 24E, and 24F", "FIGS. 25A, 25B, 25C, and 25D", and "FIGS. 27A, 27B, 27C, and 27D", and slot i and slot j satisfying the following exists. Note that i #j holds true. In addition, i and j are an integer equal to or greater than 1, for example.

Conditions:

Slot i and slot j include the same data. Alternatively, slot i and slot j are configured to include the same content while "differing from each other in terms of conditions, such as a compression ratio and/or a configuration". Alternatively, slot i and slot j include partly the same data.

In addition, for example, a plurality of OFDM symbols (parts of OFDM symbols) are present on the time and frequency axes in "FIGS. 23E and 23F", "FIGS. 24G, 24H, and 24I", "FIGS. 26A, 26B. 26C, and 26D", and "FIGS. 28A, 28B, 28C, and 28D", and an OFDM symbol (part of an OFDM symbol) i and OFDM symbol (part of an OFDM symbol) j are present. Note that i #j holds true. In addition, i and j are an integer equal to or greater than 1, for example.

Conditions:

OFDM symbol (part of OFDM symbol) i and OFDM symbol (part of OFDM symbol) j include the same data. Alternatively. OFDM symbol (part of OFDM symbol) i and OFDM symbol (part of OFDM symbol) j are configured to include the same content while "differing from each other in terms of conditions, such as a compression ratio and/or a configuration". OFDM symbol (part of OFDM symbol) i and OFDM symbol (part of OFDM symbol) j include the same data.

The above operation produces an effect of improving data reception quality, for example.

Note that the frames in "FIGS. 23A and 23B" and "FIGS. 24A, 24B, and 24C" may, for example, belong to any of the PCH, BCH, DL-SCH, UL-SCH, BCCH, PCCH, CCCH, common search space, PBCH, PDCCH, PDSCH, PUCCH, PUSCH, and the like. Note that the present disclosure is not limited to this.

Note that the slots in "FIGS. 23C and 23D", "FIGS. 24D, 24E, and 24F", "FIGS. 25A, 25B, 25C, and 25D", and "FIGS. 27A, 27B, 27C, and 27D" may, for example, belong to any of the PCH, BCH, DL-SCH, UL-SCH, BCCH, PCCH, CCCH, common search space, PBCH, PDCCH, PDSCH, PUCCH, PUSCH, and the like. Note that the present disclosure is not limited to this.

Note that the OFDM symbols (parts of the OFDM symbols) in "FIGS. 23E and 23F", "FIGS. 24G, 24H, and 24I", "FIGS. 26A, 26B, 26C, and 26D", and "FIGS. 28A, 28B, 28C, and 28D" may, for example, belong to any of the PCH, BCH, DL-SCH, UL-SCH, BCCH, PCCH, CCCH, common search space, PBCH, PDCCH, PDSCH, PUCCH, PUSCH, and the like. Note that the present disclosure is not limited to this.

Although the above description is based on the cases of OFDM, by way of example, the present disclosure is not limited to this and the same can be implemented by any multi-carrier systems.

By way of example, the same can also be implemented by a multi-carrier system in which a plurality of signals (carriers) of a single carrier system are arranged in a frequency axis direction. In this case, the "OFDM symbol (part of the OFDM symbol)" used in the above description may be considered as a symbol in implementation. Note that the details in this respect have also been described in Embodiment 1.

Examples of the single carrier system include "Discrete Fourier Transform (DFT)-Spread-Orthogonal Frequency Division Multiplexing (OFDM)" (DFT-S-OFDM), "Trajectory Constrained DFT-Spread OFDM", "Constrained DFT-Spread OFDM" (Constrained DFT-S OFDM), "OFDM based Single Carrier (SC)", "Single Carrier (SC)-Frequency Division Multiple Access (FDMA)", "Guard interval DFT-Spread OFDM", "time-domain implementation single carrier system (e.g., Single Carrier (SC)-QAM)", and the like.

Although the channels. "IEEE 802.11ad and/or IEEE 802.11ay channels", are illustrated in "FIGS. 24A, 24B, 24C, 24D, 24E, 24F, 24G, 24H, and 24I", "FIGS. 27A, 27B, 27C, and 27D", and "FIGS. 28A, 28B, 28C, 28D", it is possible to perform the same operation and to obtain the same effects also when "IEEE 802.11ad and/or IEEE 802.11ay channels" are replaced with "channels of another standard".

The communication method in the present embodiment may be a communication method using a plurality of LBT subbands or a communication method using a plurality of BWPs.

A first communication method which includes a plurality of communication methods, examples of which are those in "FIGS. 23A, 23B, 23C, 23D, 23E, and 23F", "FIGS. 24A, 24B, 24C, 24D, 24E, 24F, 24G, 24H, and 24I", "FIGS. 25A, 25B, 25C, and 25D", "FIGS. 26A, 26B, 26C, and 26D", "FIGS. 27A, 27B, 27C, and 27D", and "FIGS. 28A, 28B, 28C, and 28D" is assumed. Note that the first communication method may be a communication method which does not include any of the communication methods in "FIGS. 23A, 23B, 23C, 23D, 23E, and 23F", "FIGS. 24A, 24B, 24C, 24D, 24E, 24F, 24G, 24H, and 24I", "FIGS. 25A, 25B, 25C, and 25D", "FIGS. 26A, 26B, 26C, and 26D", "FIGS. 27A, 27B, 27C, and 27D", and "FIGS. 28A, 28B, 28C, and 28D".

Those communication methods included in the first communication method belong to either "communication requiring performance of LBT" or "communication not requiring performance of LBT" or to both the communications.

When an NR apparatus existing in an area where LBT is mandatory performs transmission of a modulation signal with a communication method belonging to the "communication requiring performance of LBT", the NR apparatus performs LBT before transmission of the modulation signal to determine whether or not to transmit the modulation signal with the communication method.

When an NR apparatus existing in an area where LBT is mandatory performs transmission of a modulation signal with a communication method belonging to the "communication not requiring performance of LBT", the NR apparatus does not need to perform LBT before transmission of the modulation signal with the communication method.

When an NR apparatus existing in an area where LBT is not mandatory performs transmission of a modulation signal with a communication method belonging to the "communication requiring performance of LBT", the NR apparatus may transmit the modulation signal with the communication method without performing LBT.

When an NR apparatus existing in an area where LBT is not mandatory performs transmission of a modulation signal with a communication method belonging to the "communication not requiring performance of LBT", the NR apparatus does not need to perform LBT before transmission of the modulation signal with the communication method.

In addition, when the communication method in the description of the present embodiment is performed, a case where the amount of data transmitted by an NR apparatus is small (the case of small data) (for example, a case where data for Internet of Things (IoT) is transmitted) is one preferred example of obtaining the advantages of the present embodiment described.

Note that in "FIGS. 23C, 23D, 23E, and 23F", "FIGS. 24D, 24E, 24F, 24G, 24H, and 24I", "FIGS. 25B and 25D", "FIGS. 26B and 26D", "FIGS. 27B and 27D", and "FIGS. 27B and 27D", time between time N+1 and time N+2 may be secured as retuning time for switching (carrier) frequencies or as a transient period.

In addition, in "FIGS. 23C, 23D, 23E, and 23F", "FIGS. 24D, 24E, 24F, 24G, 24H, and 24I", "FIGS. 25B and 25D", "FIGS. 26B and 26D", "FIGS. 27B and 27D", and "FIGS. 27B and 27D", time between time N+2 and time N+3 or the other times may be secured as retuning time for switching (carrier) frequencies or as a transient period.

That is, in "FIGS. 23C, 23D, 23E, and 23F", "FIGS. 24D, 24E, 24F, 24G, 24H, and 24I", "FIGS. 25B and 25D", "FIGS. 26B and 26D", "FIGS. 27B and 27D", and "FIGS. 27B and 27D", time between time N+i and time N+i+1 may be secured as retuning time for switching (carrier) frequencies or as a transient period.

As is understood, the communication performed by the NR apparatuses such as gNB, NR-UE, and the like using the communication method described in the present embodiment increases likelihood to reduce interference with other apparatuses. It is thus possible to obtain an effect of improving data reception quality and enhancing data transmission efficiency.

Note that the configuration of the NR apparatuses and the communication methods described in the present embodiment are merely an example, and the present disclosure is not limited to the examples described in the present embodiment.

(Supplement 1)

It is needless to say that the embodiments described in the present specification may be implemented while combined with each other or combined with other contents.

Further, the embodiments and other contents are merely examples. For example, even though the "modulation scheme, error correction coding scheme (error correction code, code length, coding rate, and the like for use), control information, and the like" are illustrated as the examples, it is possible to implement the embodiments with a similar configuration even when a "modulation scheme, error correction coding scheme (error correction code, code length, coding rate, and the like for use), control information, and the like" different from those in the examples are applied.

Regarding the modulation scheme, the embodiments and other contents described in the present specification can be implemented also by using modulation schemes other than the modulation schemes described in the present specification. For example, amplitude phase shift keying (APSK) (e.g., 16APSK, 64APSK, 128APSK, 256APSK, 1024APSK, 4096APSK), pulse amplitude modulation (PAM) (e.g., 4PAM, 8PAM, 16PAM, 64PAM, 128PAM, 256PAM, 1024PAM, 4096PAM), phase shift keying (PSK) (e.g., BPSK, QPSK, 8PSK, 16PSK, 64PSK, 128PSK, 256PSK, 1024PSK, 4096PSK), quadrature amplitude modulation (QAM) (e.g., 4QAM, 8QAM, 16QAM, 64QAM, 128QAM, 256QAM, 1024QAM, 4096QAM), or the like may be applied, or uniform mapping and non-uniform mapping may be applied for each of the modulation schemes. The number of signal points in in-phase (I)-quadrature (phase) (Q) is not limited to those in the examples above, and may be an integer equal to or greater than 3.

In addition, the method of arranging signal points (e.g., 2, 4, 8, 16, 64, 128, 256, or 1024 signal points) on the I-Q plane (modulation scheme with 2, 4, 8, 16, 64, 128, 256, 1024, or other numbers of signal points) is not particularly limited to the signal point arrangement methods of the modulation schemes described in the present specification. Thus, the function of outputting an in-phase component and a quadrature component based on a plurality of bits is a function in a mapper, and performing a matrix operation (e.g., precoding) to perform MIMO transmission and phase changing for a baseband signal after the outputting function is one of the effective functions of the present disclosure.

In addition, when "∀" and "∃" are present in the present specification, "∀" represents a universal quantifier, and "∃" represents an existential quantifier.

Further, when the present specification describes a complex plane, the unit of phase, such as, e.g., an argument, is "radian".

The use of the complex plane allows representation of complex numbers in polar form as a representation of the complex numbers using polar coordinates. Letting a point (a, b) on the complex plane correspond to a complex number z=a+jb (where both of "a" and "b" are real numbers and "j" is an imaginary unit), a=r×cos θ and b=r×sin θ when this point is expressed as [r, θ] with the polar coordinates.

[Equation 1]

$$r = \sqrt{a^2 + b^2} \quad [1]$$

holds true. The character "r" is the absolute value of z (r=|z|) and θ is the argument. Then, z=a+jb is expressed as $r \times e^{j\theta}$.

In the present specification, the "gNB, NR-UE, terminal, base station, access point, gateway, etc." may be configured to include a reception apparatus and an antenna separately. For example, the reception apparatus includes an interface for inputting, through a cable, a signal received by the antenna or a signal received by the antenna and subjected to frequency conversion, and the reception apparatus performs subsequent processing. Further, the data and information obtained by the reception apparatus are then converted into a video and sound, and displayed on a display (monitor), or outputted from a speaker in the case of sound. Further, the data and information obtained by the reception apparatus may be subjected to signal processing relevant to the video and sound (such signal processing does not have to be performed), and outputted from an RCA terminal (a video terminal and a sound terminal), universal serial bus (USB), high-definition multimedia interface (HDMI) (registered trademark), digital terminal, or the like provided in the reception apparatus.

It is contemplated herein that the transmission apparatus and/or transmitter is included in, for example, communication equipment/broadcasting equipment such as a broadcasting station, base station, access point, terminal, mobile phone, smartphone, tablet, laptop PC, server, PC, personal computer, television, home appliance (household electrical machinery equipment), factory apparatus, and Internet of Things (IoT) equipment or the like, gNodeB (gNB), repeater, node, car, bicycle, motorcycle, ship, satellite, airplane, drone, mobile equipment, robot, transmission (Tx)/reception (Rx) point (TRP), or NR-UE. Meanwhile, it is contemplated that the reception apparatus and/or receiver is included in, for example, communication equipment such as a radio, terminal, personal computer, mobile phone, access point, and base station, communication equipment/broadcasting equipment such as a smartphone, tablet, laptop PC, server, PC, personal computer, television, home appliance (household electrical machinery equipment), factory apparatus, and Internet of Things (IoT) equipment or the like, gNodeB (gNB), repeater, node, car, bicycle, motorcycle, ship, satellite, airplane, drone, mobile equipment, robot, transmission (Tx)/reception (Rx) point (TRP), NR-UE, or the like. Further, it is considered that the transmission apparatus and the reception apparatus in the present disclosure are devices having a communication function, and the devices are configured to be capable of connecting via a certain interface to an apparatus for executing an application of a television, a radio, a personal computer, a mobile phone, or the like. Further, it is considered that the communication apparatus in the present specification is included in, for example, communication equipment/broadcasting equipment such as a broadcasting station, base station, access point, terminal, mobile phone, smartphone, tablet, laptop PC, server, PC, personal computer, television, home appliance (household electrical machinery equipment), factory apparatus, and Internet of Things (IoT) equipment or the like, gNodeB (gNB), repeater, node, car, bicycle, motorcycle, ship, satellite, airplane, drone, mobile equipment, robot, transmission (Tx)/reception (Rx) point (TRP), or NR-UE.

In addition, symbols other than a data symbol (for example, a reference signal (preamble, unique word, postamble, reference symbol, pilot symbol, pilot signal, and the like), a control information symbol, a sector sweep, etc.) may be mapped in any manner in a frame in the present embodiments. Although the present specification uses the terms "reference signal", "control information symbol", and "sector sweep", the important part is the function itself. The sector sweep may be replaced by a sector-level sweep, for example.

It is contemplated that the reference signal and/or a signal relevant to sector sweep are, for example, known symbols modulated using PSK modulation by the transmitter and receiver (alternatively, the receiver may be capable of knowing a symbol transmitted by the transmitter by synchronization by the receiver), non-zero power signals, zero power signals, signals known to the transmitter and receiver, or the like. The receiver performs, using these signals, frequency synchronization, time synchronization, channel estimation (estimation of channel state information (CSI))(for each modulation signal), signal detection, estimation of a reception state, estimation of a transmission state, or the like.

Further, the control information symbol is also a symbol for transmitting information (e.g., a modulation scheme, an error correction coding scheme, and a coding rate of the error correction coding scheme; configuration information in a higher layer; a modulation and coding scheme (MCS); a frame configuration; channel information; information on a using frequency band; information on the number of using channels; and the like used for communication) that needs to be transmitted to a communication counterpart to achieve communication (of an application or the like) other than data communication.

The transmission apparatus and/or reception apparatus sometimes need to be notified of a communication method (MIMO, single-input single-output (SISO), multiple-input single-output (MISO), single-input multiple-output (SIMO), space-time block code, interleaving scheme, MCS, etc.), modulation scheme, and error correction coding scheme. This description may be omitted in some of the embodiments.

The terms such as "precoding", "precoding weight", etc. are sometimes used in the present specification, but they may be called in any manner and the important part is the signal processing itself in the present disclosure.

While MIMO transmission has been described in the present specification, a variation of MIMO transmission may include a method of transmitting a plurality of symbols by sharing some frequencies and using a plurality of antennas in the same time period.

Regarding both the transmission panel antenna of the transmission apparatus and the reception panel antenna of the reception apparatus, a single antenna illustrated in the drawings may be composed of one antenna or a plurality of antennas.

Further, in the explanation of the embodiments and the like, the transmission panel antenna and the reception panel antenna may be described separately; however, a configuration of "transmission/reception panel antenna" serving as both of the transmission panel antenna and the reception panel antenna may be used.

In addition, the transmission panel antenna, reception panel antenna, and transmission/reception panel antenna may be referred to, for example, as an antenna port. The transmission panel antenna, reception panel antenna, and transmission/reception panel antenna may be referred to as another name, and a method of configuring the transmission panel antenna with one or more antennas or a plurality of antennas is conceivable. Additionally, a method of configuring the reception panel antenna with one or more antennas or a plurality of antennas is conceivable. Also, a method of configuring the transmission/reception panel antenna with one or more antennas or a plurality of antennas is conceivable. Further, an apparatus may be configured for each transmission panel antenna, an apparatus may be configured for each reception panel antenna, and an apparatus may be configured for each transmission/reception panel antenna. That is, it may be regarded as a multiple transmitter (TX)/receiver (RX) point (TRP) (multi TRP).

The antenna port may be a logical antenna (antenna group) composed of one or more physical antennas. That is, the antenna port does not necessarily refer to one physical antenna, but may refer to an array antenna or the like composed of a plurality of antennas. For example, the number of physical antennas composing the antenna port is not specified, but the number of physical antennas may be specified as the minimum unit in which a terminal station is capable of transmitting a reference signal. Further, the antenna port may also be specified as a unit or a minimum unit for multiplication by a precoding vector or a weight of a precoding matrix.

There are a plurality of methods of generating a modulation signal by a single-carrier scheme in the present specification, and the present embodiments can be implemented by using any of the schemes. For example, examples of the single-carrier scheme include "discrete Fourier transform (DFT)-spread orthogonal frequency division multiplexing (OFDM)" (DFT-S OFDM), "trajectory constrained DFT-spread OFDM", "constrained DFT-spread OFDM" (constrained DFT-S OFDM), "OFDM based single carrier (SC)", "single carrier (SC)-frequency division multiple access (FDMA)", "guard interval DFT-spread OFDM", a time-domain implementation single carrier scheme (e.g., single carrier (SC)-QAM), and the like.

In the present specification, the ID of the transmission panel antenna and the ID of beamforming are described separately from each other; however, an ID may be assigned without distinguishing between the two.

For example, "ID 0 of beamforming by using transmission panel antenna #1" may be referred to as ID ♭0, "ID 1 of beamforming by using transmission panel antenna #1" may be referred to as ID ♭1, "ID 0 of beamforming by using transmission panel antenna #2" may be referred to as ID ♭2, "ID 1 of beamforming by using transmission panel antenna #2" may be referred to as ID ♭3, and so forth.

Thus, a signal for sector sweep may be generated based on the IDs, and the base station and the terminal may transmit information including the IDs.

It has been indicated above that the waveforms of the modulation signal transmitted by the communication apparatus herein may be either the single-carrier scheme or the multi-carrier scheme such as OFDM. In a case of using the multi-carrier scheme such as OFDM, a frame also includes a symbol on the frequency axis.

In the present specification, a "sector sweep reference signal transmitted by a base station" described in the embodiments may be included in a "synchronization signal (SS) block", "physical broadcast channel (PBCH) block", or SS/PBCH block. In this case, it need not be called the "sector sweep reference signal". In addition, a "feedback signal transmitted by a base station and feedback signal group transmitted by a base station" described in the embodiments may be included in a "synchronization signal (SS) block", "physical broadcast channel (PBCH) block", or SS/PBCH block. In this case, it need not be called the "feedback signal and feedback signal group".

Although it has been explained that a sector sweep reference signal includes the ID of a transmission panel antenna when a base station transmits the sector sweep reference signal, the sector sweep reference signal may include the ID of a sector antenna and/or information on an antenna port number as "the ID of a transmission panel antenna". Likewise, although it has been explained that a sector sweep reference signal includes the ID of a transmission panel antenna when a terminal transmits the sector sweep reference signal, the sector sweep reference signal may include the ID of a sector antenna and/or information on an antenna port number as "the ID of a transmission panel antenna".

The configurations of the transmission panel antenna and the reception panel antenna of the communication apparatus in the present disclosure are not limited to the configurations in FIGS. 3 and 4. The transmission panel antenna and the reception panel antenna may be composed of one or more antennas and/or antenna elements and may be composed of two or more antennas and/or antenna elements.

Additionally, the antennas illustrated in FIGS. 3 and 4 may be composed of one or more antennas and/or antenna elements or may be composed of two or more antennas and/or antenna elements.

In the present specification, the embodiments have been described using OFDM as an example of multi-carrier schemes, but the embodiments in the present specification can be similarly implemented using another multi-carrier scheme.

By way of example, multi-carrier transmission may be implemented by assigning a "single-carrier scheme using a single frequency band" and assigning a "single-carrier scheme using one or more frequency bands" to the frequency band described in the present specification.

As another example, multi-carrier transmission may be implemented by assigning one or more carriers or two or more carriers to the frequency band described in the present specification. Note that the multi-carrier transmission scheme is not limited to the above examples.

In the present specification, a "sector sweep reference signal transmitted by a base station" described in the embodiments may be included in a "physical downlink control channel (PDCCH)". In this case, it need not be called the "sector sweep reference signal".

For example, it is assumed that information A is present as one piece of information in PDCCH. It is also assumed that a "sector sweep reference signal subjected to beamforming #1", "sector sweep reference signal subjected to beamforming #2", . . . , "sector sweep reference signal subjected to beamforming #N" are present as the "sector sweep reference signals transmitted by a base station". Note that N is an integer equal to or greater than 1 or an integer equal to or greater than 2.

At this time, information A is included in the "'sector sweep reference signal subjected to beamforming #1", "sector sweep reference signal subjected to beamforming #2", . . . , "sector sweep reference signal subjected to beamforming #N"". This produces an effect that a terminal is more likely to obtain information A.

A "sector sweep reference signal transmitted by a terminal" described in the embodiments of the present specification may be included in a "physical uplink control channel (PUCCH)". In this case, it need not be called the "sector sweep reference signal".

For example, it is assumed that information B is present as one piece of information in PUCCH. It is also assumed that a "sector sweep reference signal subjected to beamforming $1", "sector sweep reference signal subjected to beamforming $2", . . . , "sector sweep reference signal subjected to beamforming SM" are present as the "sector sweep reference signals transmitted by a terminal". Note that M is an integer equal to or greater than 1 or an integer equal to or greater than 2.

At this time, information B is included in the "'sector sweep reference signal subjected to beamforming $1", "sector sweep reference signal subjected to beamforming $2", . . . , "sector sweep reference signal subjected to beamforming $M"". This produces an effect that a base station is more likely to obtain information B.

Note that, in the present specification, "sections of describing configurations and operations of a base station" may be considered as "configurations and operations of a terminal, AP, or repeater". Likewise, "sections of describing configurations and operations of a terminal" may be considered as "configurations and operations of a base station, AP, or repeater".

In the present specification, a server may provide an application related to processing relevant to the reception apparatus and the receiver, and the terminal may implement the functions of the reception apparatus described in the present specification by installing this application. Note that the application may be provided to the terminal by connection of a communication apparatus including the transmission apparatus described in the present specification to the server via a network, or the application may be provided to the terminal by connection of a communication apparatus having another transmission function to the server via the network.

Likewise, in the present specification, a server may provide an application related to processing relevant to the transmission apparatus and the transmitter, and the communication apparatus may implement the functions of the transmission apparatus described in the present specification by installing this application. Note that a method can be envisaged in which this communication apparatus is provided with the application by connection of another communication apparatus to the server via the network.

Note that the present disclosure is not limited to the embodiments and can be implemented with various modifications. For example, the embodiments are performed by a communication apparatus in the description, but the present invention is not limited to this and the communication methods can be realized by software.

In addition, a program for performing the above communication methods may be stored in read only memory (ROM) in advance, for example, and the program may be executed by a central processor unit (CPU).

Further, a program for performing the communication method may be stored in a computer-readable storage medium, and the program stored in the storage medium may be recorded in a random access memory (RAM) of the computer so that the computer operates according to the program.

Each configuration in the each of the embodiments described above can be typically realized by a large scale integration (LSI), which is an integrated circuit. The LSI may be individually formed as chips, or one chip may be formed so as to include a part or all of the configurations in each embodiment. The LSI here may be referred to as an integrated circuit (IC), a system LSI, a super LSI, or an ultra LSI depending on a difference in the degree of integration. In addition, the technique of implementing an integrated circuit is not limited to the LSI and may be realized by using a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

Note that at least one of the FPGA and the CPU may be configured to download all or some of software required for implementing the communication methods described in the present disclosure by radio communication or wired communication. Further, at least one of the FPGA and the CPU may be configured to download all or some of software for updating by radio communication or wired communication. Then, the downloaded software may be stored in storage, and at least one of the FPGA and the CPU may be operated based on the stored software to execute the digital signal processing described in the present disclosure.

The device including at least one of the FPGA and the CPU may be connected to a communication modem by radio or wire, and the communication methods described in the present disclosure may be implemented by the device and the communication modem.

For example, a communication apparatus such as the base station, AP, and terminal described in the present specification may include at least one of the FPGA and the CPU, and the communication apparatus may include an interface for externally obtaining software for operating at least one of the FPGA and the CPU. Further, the communication apparatus may include storage for storing the externally-obtained software, and the FPGA and/or the CPU may be operated based on the stored software to implement the signal processing described in the present disclosure.

If future integrated circuit technology replaces LSIs as a result of the advancement of semiconductor technology or other derivative technology, the functional blocks could be integrated using the future integrated circuit technology. Biotechnology can also be applied.

The present disclosure is widely applicable to radio systems for transmitting different modulation signals from a plurality of antennas, respectively. It is also applicable to the case of using MIMO transmission in wired communication systems with a plurality of transmission points (e.g., power line communication (PLC) system, optical communication system, and digital subscriber line (DSL) system). The communication apparatus may be referred to as a radio apparatus.

The "data", "data symbol", and "data frame" may be, for example, a physical downlink shared channel (PDSCH) or a physical uplink shared channel (PUSCH).

In the present disclosure, a description has been given of an example where an NR apparatus detects "a signal transmitted by a first standard apparatus" by performing LBT, the NR apparatus may detect a signal transmitted by an apparatus of another standard by performing LBT.

Further, in the present disclosure, a description has been given of an example where an NR apparatus detects "a signal transmitted by a first standard apparatus", the NR apparatus may detect a signal transmitted by an apparatus of another standard.

In the present disclosure, an NR apparatus may detect "a sector sweep signal and/or a signal related to sector sweep implementation" transmitted by another NR apparatus by performing LBT.

For example, NR-UE in the drawings of the present specification may detect a modulation signal transmitted by a "TRP not involved in communication in the drawings and/or NR-UE not related to the drawings" by LBT and perform operations in the present specification.

Further, a TRP in the drawings of the present specification may detect a modulation signal transmitted by a "TRP not involved in communication in the drawings and/or NR-UE not related to the drawings" by LBT and perform operations in the present specification.

Note that the same can be implemented by replacing "LBT" with "initial access" in the above description.

In the present disclosure, it has been explained that the gNB and NR-UE form transmit beams, but not all the transmit beams need to be the same polarization. For example, in a case where the gNB and NR-UE can generate transmit beam #1, transmit beam #2, transmit beam #3, and so forth, it may be configured so that transmit beam #1 is the first polarization, transmit beam #2 is the second polarization other than the first polarization, and so forth.

In addition, it has been explained that the gNB and NR-UE form receive beams, but not all the receive beams need to be the same polarization. For example, in a case where the gNB and NR-UE can generate receive beam #1, receive beam #2, receive beam #3, and so forth, it may be configured so that receive beam #1 is the first polarization, receive beam #2 is the second polarization other than the first polarization, and so forth.

It has been explained that the gNB and NR-UE form transmit beams in the present disclosure, and the polarization of a transmit beam may be changed as time passes. For example, the first polarization is used for transmit beam #1 at the beginning and may be later changed to the second polarization other than the first polarization.

In addition, it has been explained that the gNB and NR-UE form receive beams, and the polarization of a receive beam may be changed as time passes. For example, the first polarization is used for receive beam #1 at the beginning and may be later changed to the second polarization other than the first polarization.

Although it has been explained that "an NR apparatus (gNB or NR-UE) does not transmit or stands by to transmit a modulation signal when detecting a signal in LBT" in the present disclosure, the NR apparatus (gNB or NR-UE) may transmit a modulation signal when detecting a signal in LBT as long as the modulation signal is a short-period modulation signal that is less likely to interfere "an apparatus of another system such as the first standard or another NR apparatus" (e.g., a signal including control information and a reference signal such as DMRS, PTRS, and another RS signal).

Although it has been explained that "an NR apparatus (gNB or NR-UE) does not transmit or stands by to transmit a modulation signal in a direction with a signal detected in LBT" in the present disclosure, the NR apparatus (gNB or NR-UE) may transmit a modulation signal in a direction with a signal detected in LBT as long as the modulation signal is a short-period modulation signal that is less likely to interfere "an apparatus of another system such as the first standard or another NR apparatus" (e.g., a signal including control information and a reference signal such as DMRS, PTRS, and another RS signal).

The gNB and NR-UE may detect signals in a plurality of directions in a single reception period in the LBT processing (note that they may detect signals in a plurality of directions in a plurality of reception periods, and the example has been described in an embodiment of the present disclosure. At this time, time division multiplexing (TDM) is performed on the signals in a plurality of methods in some cases). Note that, when the signals in a plurality of directions are detected, the frequency (bands) of the plurality of signals may be the same or different from each other.

When the gNB and NR-UE detect a signal in the first direction and a signal in the second direction in a single reception period, for example, the frequency (band) of the signal in the first direction may be the same as or different from the frequency (band) of the signal in the second direction. Note that the gNB and NR-UE generate receive beam #1 for detecting the signal in the first direction and generate receive beam #2 for detecting the signal in the second direction, for example.

At this time, the case where the frequency (band) of the signal in the first direction is the same as the frequency (band) of the signal in the second direction produces an effect of spatial multiplexing (spatial division multiplexing (SDM)), and the case where the frequency (band) of the signal in the first direction is different from the frequency (band) of the signal in the second direction produces an effect of frequency division multiplexing (FDM).

Note that the gNB and/or NR-UE may control so that the relationship between the signal in the first direction and the signal in the second direction is any one of "spatial multiplexing (spatial division multiplexing (SDM))", "frequency division multiplexing (FDM)", and "time division multiplexing (TDM)". Further, the gNB and/or NR-UE may switch the relationship between the signal in the first direction and the signal in the second direction so that it is any one of "spatial multiplexing (spatial division multiplexing (SDM))", "frequency division multiplexing (FDM)", and "time division multiplexing (TDM)" as time passes.

It is assumed that the gNB and NR-UE perform LBT and do not use two or more directions for communication. At this time, the gNB and NR-UE may detect signals in a plurality of directions from "the two or more directions" in a single reception period (note that they may detect signals in a plurality of directions from "the two or more directions" in a plurality of reception periods, and the example has been described in an embodiment of the present disclosure. At this time, time division multiplexing (TDM) is sometimes performed since there are signals in a plurality of directions from "the two or more directions" in a plurality of reception periods).

For example, the gNB and NR-UE perform the LBT processing and determine not to use the first direction and the second direction for communication. Then, the gNB and NR-UE may detect a signal in the first direction and a signal in the second direction in a single reception period. At this time, the frequency (band) of the signal in the first direction may be the same as or different from the frequency (band) of the signal in the second direction. Note that the gNB and NR-UE generate receive beam #1 for detecting the signal in the first direction and generate receive beam #2 for detecting the signal in the second direction, for example.

At this time, the case where the frequency (band) of the signal in the first direction is the same as the frequency (band) of the signal in the second direction produces an effect of spatial multiplexing (spatial division multiplexing (SDM)), and the case where the frequency (band) of the signal in the first direction is different from the frequency (band) of the signal in the second direction produces an effect of frequency division multiplexing (FDM).

Note that the gNB and/or NR-UE may control so that the relationship between the signal in the first direction and the signal in the second direction is any one of "spatial multiplexing (spatial division multiplexing (SDM))", "frequency division multiplexing (FDM)", and "time division multiplexing (TDM)". Further, the gNB and/or NR-UE may switch the relationship between the signal in the first direction and the signal in the second direction so that it is any one of "spatial multiplexing (spatial division multiplexing (SDM))". "frequency division multiplexing (FDM)", and "time division multiplexing (TDM)" as time passes.

In addition, after the LBT processing, the gNB and NR-UE may simultaneously transmit modulation signals in a plurality of directions in which communication can be performed (note that they may transmit modulation signals in a plurality of directions in a plurality of reception periods, and the example has been described in an embodiment of the present disclosure. At this time, time division multiplexing (TDM) is performed on the modulation signals in a plurality of methods in some cases).

For example, it is assumed that the gNB and NR-UE determine that communication can be performed in the first direction and the second direction by the LBT processing. In this case, when the gNB and NR-UE transmit the first modulation signal from the first direction and the second modulation signal from the second direction, the first modulation signal and the second modulation signal may be present in the same time period. Note that the first modulation signal and the second modulation signal may be signals addressed to the same terminal or may be signals addressed to different terminals. Note that the gNB and NR-UE generate transmit beam #1 for transmitting a signal in the first direction and generate transmit beam #2 for transmitting a signal in the second direction, for example.

The frequency (band) of the first modulation signal may be the same as or different from the frequency (band) of the second modulation signal. At this time, the case where the frequency (band) of the first modulation signal is the same as the frequency (band) of the second modulation signal produces an effect of spatial multiplexing (spatial division multiplexing (SDM)), and the case where the frequency (band) of the first modulation signal is different from the frequency (band) of the second modulation signal produces an effect of frequency division multiplexing (FDM).

Note that the gNB and/or NR-UE may control so that the relationship between the first modulation signal and the second modulation signal is any one of "spatial multiplexing (spatial division multiplexing (SDM))", "frequency division multiplexing (FDM)", and "time division multiplexing (TDM)". Further, the gNB and/or NR-UE may switch the relationship between the first modulation signal and the second modulation signal so that it is any one of "spatial multiplexing (spatial division multiplexing (SDM))", "frequency division multiplexing (FDM)", and "time division multiplexing (TDM)" as time passes.

As another example, it is assumed that the gNB and NR-UE perform the LBT processing and do not use two or more directions for communication. At this time, the gNB and NR-UE may perform signal detection in "the two or more directions" and simultaneously transmit modulation signals in two or more directions in transmitting modulation signals in two or more directions (note that it need not be simultaneous, and the example has been described in an embodiment of the present disclosure. In this case, time division multiplexing (TDM) is performed in some cases).

For example, it is assumed that the gNB and NR-UE perform the LBT processing and do not perform communication in the first direction and the second direction. Then, the gNB and NR-UE may perform signal detection in the first direction and the second direction and simultaneously transmit modulation signals in the first direction and the second direction. Note that the signal in the first direction and the signal in the second direction may be signals addressed to the same terminal or may be signals addressed to different terminals. Note that the gNB and NR-UE generate transmit beam #1 for transmitting a signal in the first direction and generate transmit beam #2 for transmitting a signal in the second direction, for example.

The frequency (band) of the signal in the first direction may be the same as or different from the frequency (band) of the signal in the second direction. The case where the frequency (band) of the signal in the first direction is the same as the frequency (band) of the signal in the second direction produces an effect of spatial multiplexing (spatial division multiplexing (SDM)), and the case where the frequency (band) of the signal in the first direction is different from the frequency (band) of the signal in the second direction produces an effect of frequency division multiplexing (FDM).

Note that the gNB and/or NR-UE may control so that the relationship between the signal in the first direction and the signal in the second direction is any one of "spatial multiplexing (spatial division multiplexing (SDM))", "frequency division multiplexing (FDM)", and "time division multiplexing (TDM)". Further, the gNB and/or NR-UE may switch the relationship between the signal in the first direction and the signal in the second direction so that it is any one of "spatial multiplexing (spatial division multiplexing (SDM))", "frequency division multiplexing (FDM)", and "time division multiplexing (TDM)" as time passes.

That is, a receive beam generated by the gNB (or NR-UE) for the LBT and a transmit beam in which the gNB (or NR-UE) transmits the modulation signal during communication are related to each other. For example, when the gNB (or NR-UE) detects a signal in receive beam #1, the gNB (or NR-UE) does not transmit a modulation signal (does not start communication) in transmit beam #1. Meanwhile, when the gNB (or NR-UE) detects no signal in receive beam #1, the gNB (or NR-UE) transmits a modulation signal (starts communication).

The "bandwidth of a signal transmitted/received by gNB or NR-UE" may be the same as or different from the "bandwidth of a signal transmitted/received by a first standard apparatus".

In the present disclosure. LBT may be referred to as a "channel access procedure" or "part of channel access procedure".

The unlicensed band may be referred to as a shared spectrum.

In a case where an apparatus of NR such as gNB and NR-UE transmits a synchronization signal block (SSB), the SSB may include the sector sweep reference signal described in the present specification.

Communication in which a plurality of channels are aggregated may be referred to as channel aggregation. Communication in which a plurality of carriers are aggregated may be referred to as carrier aggregation. The first standard is not limited to IEEE 802.11ad or IEEE 802.11ay. The first standard may be, for example, IEEE 802.11aj. Omni-directional LBT may also be referred to as quasi-omni-directional LBT.

Note that "A and/or B" in the present specification may be interpreted as "A and B" or may also be interpreted as "A or B".

Although apparatuses in FIGS. 1A, 1B, 1C, 9, 10, etc. have been described as a configuration of NR apparatus such as gNB and NR-UE in the present embodiment, the configuration is not limited to these. For example, the NR apparatus may be an apparatus that includes "one or more or two or more transmission antennas" and "one or more or two or more reception antennas", transmits one or more modulation signals, and receives one or more modulation signals. The transmission antenna and the reception antenna may be a transmission and reception sharing antenna.

In addition, sections described as the operations for NR-UE may be performed by gNB, a base station, a repeater, a TRP, an access point, a mobile station including a communication apparatus.

In the present specification, gNB uses transmit beams in transmitting modulation signals, and NR-UE selects a suitable beam from the transmit beams used by the gNB in receiving the modulation signals transmitted by the gNB. At this time, the selection of a receive beam used by the NR-UE, which is selection of the transmit beam to be used by the gNB, may be referred to as beam switching.

The values mentioned in the present specification as frequencies used by an NR apparatus are merely examples. Although the present specification provides specific values of frequency in the above, the contents described in the present specification can be similarly implemented by using a frequency other than the above specific frequencies. In addition, the contents described in the present specification can be applicable to not only an unlicensed band but also a licensed band.

For example, gNB transmits a plurality of data frames to the first NR-UE as described in the present specification. At this time, the gNB may apply (downlink) spatial division multiplexing (SDM), which uses the same timing and the same frequency to transmit the plurality of data frames, for the first NR-UE.

In addition, the gNB may apply (downlink) frequency division multiplexing (FDM), which uses "a plurality of frequencies or a plurality of carriers" to transmit the plurality of data frames, for the first NR-UE.

Further, the gNB may apply (downlink) time division multiplexing (TDM), which uses a first frequency and divides the time into pluralities to transmit the plurality of data frames, for the first NR-UE.

Further, for example, the second NR-UE transmits a plurality of data frames to the gNB as described in the present specification. At this time, the second NR-UE may apply (uplink) SDM, which uses the same timing and the same frequency to transmit the plurality of data frames, for the gNB.

In addition, the second NR-UE may apply (uplink) FDM, which uses "a plurality of frequencies or a plurality of carriers" to transmit the plurality of data frames, for the gNB.

Further, the second NR-UE may apply (uplink) TDM, which uses a second frequency and divides the time into pluralities to transmit the plurality of data frames, for the gNB.

The gNB and NR-UE may be able to change or configure the frequency bandwidth of LBT, that is, the frequency bandwidth may be configured in any manner. At this time, the modulation signal transmitted by the gNB and NR-UE may be a signal of a multi-carrier scheme such as OFDM or a signal of a single-carrier scheme.

In a case where the scheme of a modulation signal is a single-carrier scheme, for example, it is considered to transmit a modulation signal in units of channel bandwidth by FDD, TDD, etc. Thus, when the gNB and NR-UE perform LBT on a plurality of channels in performing LBT, it is possible to collectively detect a channel with a signal detected and a channel with no signal detected. This allows the gNB and NR-UE to transmit a modulation signal by selecting the channel with no signal detected.

For example, it is assumed that the gNB is configured to be able to switch between transmission of a modulation signal of a single-carrier scheme and transmission of a modulation signal of a multi-carrier scheme such as OFDM. In this case, the gNB configures "the frequency bandwidth of LBT performed before transmitting a modulation signal of a single-carrier scheme" and configures "the frequency bandwidth of LBT performed before transmitting a modulation signal of a multi-carrier scheme such as OFDM". For example, "the frequency bandwidth of LBT performed before transmitting a modulation signal of a single-carrier scheme" and "the frequency bandwidth of LBT performed before transmitting a modulation signal of a multi-carrier scheme such as OFDM" may be different from each other.

Note that a channel access method such as LBT may be categorized as follows, and any of Category 1 to Category 4 may be applied to the LBT described in the present specification.

Category 1

Transmit immediately after a short switching period. (Transmit without performing LBT)

Category 2;

Perform LBT without random backoff.

For example, perform carrier sensing in a fixed sensing time before transmission, and transmit when a channel is available.

Category 3:

Perform LBT with random backoff having a fixed-size contention window.

For example, randomly generate a value within a predetermined range before transmission, repeat carrier sensing in a fixed sensing slot time, then transmit when confirming that a channel is available for the generated value.

Category 4:

Perform LBT with random backoff having a variable-size contention window.

For example, randomly generate a value within a predetermined range before transmission, repeat carrier sensing in a fixed sensing slot time, then transmit when confirming that a channel is available for the generated value. In this case, the generation range of the random backoff value (contention window) is variable according to a communication failure state due to collision with communication of another system.

The disclosure of Japanese Patent Application No. 2021-204450, filed on Dec. 16, 2021, including the specification, drawings and abstract, is incorporated herein by reference in its entirety.

INDUSTRIAL APPLICABILITY

The present disclosure is widely applicable to radio systems for transmitting modulation signals from one or more antennas, and is suitable for the application to, for example, a communication system using a single carrier and a communication system using a multi-carrier transmission scheme such as OFDM. The present disclosure is also applicable to wired communication systems such as, e.g., a power line communication (PLC) system, an optical communication system, and a digital subscriber line (DSL) system.

REFERENCE SIGNS LIST

100 Control signal
**101_*i*** i-th data
**102_*i*** i-th transmitter
**103_*i*** i-th modulation signal
104 First processor
**105*j*** j-th transmission signal
**106_*j*** Transmission panel antenna j
**151_*i*** Reception panel antenna i
**152_*i*** i-th received signal
153 Second processor
154 j-th signal-processing-subjected signal
**155_*j*** j-th receiver
**156_*j*** j-th control data
**157_*j*** j-th data
158 Third processor
200 Control signal
201 Data
202 Data symbol generator
203 Data symbol modulation signal
204 Sector sweep reference signal generator
205 Sector sweep reference signal
206 Other-signal generator
207 Other signals
251 Processor
252 Frame configuration-based modulation signal
300 Control signal
301 Transmission signal
302 Distributor
303_1 First transmission signal
303_2 Second transmission signal
303_3 Third transmission signal
303_4 Fourth transmission signal
304_1, 304_2, 304_3, 304_4 Multiplier
305_1 Coefficient-multiplication-subjected first transmission signal
305_2 Coefficient-multiplication-subjected second transmission signal
305_3 Coefficient-multiplication-subjected third transmission signal
305_4 Coefficient-multiplication-subjected fourth transmission signal
306_1, 306_2, 306_3, 306_4 Antenna
400 Control signal
401_1, 401_2, 401_3, 401_4 Antenna
402_1 First received signal
402_2 Second received signal
402_3 Third received signal
402_4 Fourth received signal
403_1, 403_2, 403_3, 403_4 Multiplier
404_1 Coefficient-multiplication-subjected first received signal
404_2 Coefficient-multiplication-subjected second received signal
404_3 Coefficient-multiplication-subjected third received signal
404_4 Coefficient-multiplication-subjected fourth received signal
405 Coupler/combiner
406 Modulation signal
501 Constellation mapper
502 Serial/parallel converter
503 IFFT
601 Rx FE processing
602 FFT
603 Parallel/serial converter
604 Demapper
701 Rx FE processing
702 CP removal
703 FFT

704 Tone demapping
705 FDE
706 DFT
707 Demapper
801 Rx FE processing
802 Down-sampling and match filtering
803 TDE
804 CP removal
805 Demapper
901_1 Base station #1
902_1 Terminal #1
902_2 Terminal #2
902_3 Terminal #3
1100 gNB
1101_1 NR-UE #1
1101_2 NR-UE #2
1101_3 NR-UE #3
1101_4 NR-UE #4
1101_5 NR-UE #5
1101_6 NR-UE #6
1101_7 NR-UE #7
1110 AP
1111 UE

The invention claimed is:

1. A communication apparatus that performs communication using a frequency band available in a radio system, the communication apparatus comprising:
- a signal processor that generates a modulation signal; and
- a transmitter that transmits the modulation signal, wherein
- the frequency band available in the radio system includes a plurality of channels, and
- the transmitter
  - transmits the modulation signal in a first time period using a first channel of the plurality of channels, and
  - transmits the modulation signal in a second time period following the first time period using a second channel different from the first channel.

2. The communication apparatus according to claim 1, wherein:
- the transmitter
  - transmits the modulation signal in the first time period using a first slot for the first channel, and
  - transmits the modulation signal in a third time period after the second time period using a second slot for the first channel, the second slot differing in frequency band from the first slot.

3. The communication apparatus according to claim 1, wherein
- the modulation signal is a modulation signal of an Orthogonal Frequency Division Multiplexing (OFDM) symbol.

4. A communication apparatus that belongs to a first radio system and performs communication using a frequency band available in the first radio system, the communication apparatus comprising:
- a signal processor that generates a modulation signal; and
- a transmitter that transmits the modulation signal, wherein
- the frequency band available in the first radio system overlaps with a frequency band available in a second radio system,
- the frequency band available in the second radio system includes a plurality of channels, and
- the transmitter
  - transmits the modulation signal in a first time period using a frequency band which is within the frequency band available in the first radio system and which overlaps with a first channel of the plurality of channels, and
  - transmits the modulation signal in a second time period following the first time period using the frequency band which is within the frequency band available in the first radio system and which overlaps with a second channel different from the first channel.

5. The communication apparatus according to claim 4, wherein:
- the transmitter
  - transmits the modulation signal in the first time period using a first slot for the first channel, and
  - transmits the modulation signal in a third time period after the second time period using a second slot for the first channel, the second slot differing in frequency band from the first slot.

6. The communication apparatus according to claim 4, wherein
- the modulation signal is a modulation signal of an Orthogonal Frequency Division Multiplexing (OFDM) symbol.

7. A communication apparatus that performs communication using a frequency band available in a radio system, the communication apparatus comprising:
- a signal processor that generates a modulation signal; and
- a transmitter that transmits the modulation signal, wherein
- the frequency band available in the radio system includes a plurality of channels, and
- the transmitter transmits the modulation signal in a first time period by a first transmit beam using a first channel of the plurality of channels, and transmits the modulation signal in a second time period following the first time period using the first channel by a second transmit beam different from the first transmit beam.

8. A communication method by a communication apparatus that performs communication using a frequency band available in a radio system, wherein
- the frequency band available in the radio system includes a plurality of channels, and
- the communication apparatus
  - generates a modulation signal,
  - transmits the modulation signal in a first time period using a first channel of the plurality of channels, and
  - transmits the modulation signal in a second time period following the first time period using a second channel different from the first channel.

9. A communication method by a communication apparatus that belongs to a first radio system and that performs communication using a frequency band available in the first radio system, wherein
- the frequency band available in the first radio system overlaps with a frequency band available in a second radio system,
- the frequency band available in the second radio system includes a plurality of channels, and
- the communication apparatus
  - generates a modulation signal,
  - transmits the modulation signal in a first time period using the frequency band which is within the frequency band available in the first radio system and which overlaps with a first channel of the plurality of channels, and transmits the modulation signal in a second time period following the first time period using the frequency band which is within the frequency band available in the first radio system and which overlaps with a second channel different from the first channel.

* * * * *